(12) United States Patent
Cosic

(10) Patent No.: US 10,592,822 B1
(45) Date of Patent: Mar. 17, 2020

(54) UNIVERSAL ARTIFICIAL INTELLIGENCE ENGINE FOR AUTONOMOUS COMPUTING DEVICES AND SOFTWARE APPLICATIONS

(71) Applicant: Jasmin Cosic, Miami, FL (US)

(72) Inventor: Jasmin Cosic, Miami, FL (US)

(*) Notice: Subject to any disclaimer, the term of this patent is extended or adjusted under 35 U.S.C. 154(b) by 867 days.

(21) Appl. No.: 15/227,971

(22) Filed: Aug. 4, 2016

Related U.S. Application Data

(63) Continuation of application No. 14/839,982, filed on Aug. 30, 2015, now Pat. No. 9,443,192.

(51) Int. Cl.
*G06F 9/44* (2018.01)
*G06F 11/36* (2006.01)
*G06F 17/00* (2019.01)
*G06F 17/24* (2006.01)
*G06K 9/62* (2006.01)
*G06N 20/00* (2019.01)
*G06N 5/04* (2006.01)

(52) U.S. Cl.
CPC .............. *G06N 20/00* (2019.01); *G06N 5/048* (2013.01)

(58) Field of Classification Search
CPC ................................ G06N 20/00; G06N 5/048
USPC ...................................................... 706/1–62
See application file for complete search history.

(56) References Cited

U.S. PATENT DOCUMENTS

| | | |
|---|---|---|
| 4,370,707 A | 1/1983 | Phillips et al. |
| 4,730,315 A | 3/1988 | Saito et al. |
| 4,860,203 A | 8/1989 | Corrigan et al. |
| 5,560,011 A | 9/1996 | Uyama |
| 5,602,982 A | 2/1997 | Judd et al. |
| 6,026,234 A | 2/2000 | Hanson et al. |
| 6,088,731 A | 7/2000 | Kiraly et al. |
| 6,106,299 A | 8/2000 | Ackermann et al. |
| 6,126,330 A | 10/2000 | Knight |
| 6,314,558 B1 | 11/2001 | Angel et al. |
| 6,408,262 B1 | 6/2002 | Leerberg et al. |
| 6,643,842 B2 | 11/2003 | Angel et al. |
| 6,728,689 B1 | 4/2004 | Drissi et al. |
| 6,735,632 B1 | 5/2004 | Kiraly et al. |
| 6,754,631 B1 | 6/2004 | Din |
| 6,801,912 B2 | 10/2004 | Moskowitz et al. |
| 6,842,877 B2 | 1/2005 | Robarts et al. |
| 6,915,105 B2 | 7/2005 | Masuda |
| 6,973,446 B2 | 12/2005 | Mamitsuka et al. |
| 7,017,153 B2 | 3/2006 | Gouriou et al. |
| 7,052,277 B2 | 5/2006 | Kellman |
| 7,113,946 B2 | 9/2006 | Cosic |
| 7,117,225 B2 | 10/2006 | Cosic |
| 7,222,127 B1 | 5/2007 | Bem et al. |

(Continued)

OTHER PUBLICATIONS

Chen et al. Case-Based Reasoning System and Artificial Neural Networks: A Review Neural Comput & Applic (2001) 10: pp. 264-276.

(Continued)

*Primary Examiner* — Brandon S Cole

(57) ABSTRACT

Aspects of the disclosure generally relate to computing devices and may be generally directed to devices, systems, methods, and/or applications for learning the operation of a computing device or software application, storing this knowledge in a knowledgebase, neural network, or other repository, and enabling autonomous operation of the computing device or software application with partial, minimal, or no user input.

20 Claims, 64 Drawing Sheets

(56) References Cited

U.S. PATENT DOCUMENTS

| | | | |
|---|---|---|---|
| 7,240,335 B2 | 7/2007 | Angel et al. | |
| 7,249,349 B2 | 7/2007 | Hundt et al. | |
| 7,424,705 B2 | 9/2008 | Lewis et al. | |
| 7,478,371 B1 | 1/2009 | Gove | |
| 7,484,205 B2 | 1/2009 | Venkatapathy | |
| 7,565,340 B2 | 7/2009 | Herlocker et al. | |
| 7,721,218 B2 | 5/2010 | Awe et al. | |
| 7,765,537 B2 | 7/2010 | Havin et al. | |
| 7,797,259 B2 | 9/2010 | Jiang et al. | |
| 7,840,060 B2 | 11/2010 | Podilchuk | |
| 7,925,984 B2 | 4/2011 | Awe et al. | |
| 7,987,144 B1 | 7/2011 | Drissi et al. | |
| 8,005,828 B2 | 8/2011 | Buchner et al. | |
| 8,019,699 B2 | 9/2011 | Baxter | |
| 8,078,556 B2 | 12/2011 | Adi et al. | |
| 8,090,669 B2 | 1/2012 | Shahani et al. | |
| 8,137,112 B2 | 3/2012 | Woolf et al. | |
| 8,166,463 B2 | 4/2012 | Gill et al. | |
| 8,195,674 B1 | 6/2012 | Bem et al. | |
| 8,196,119 B2 | 6/2012 | Gill et al. | |
| 8,244,730 B2 | 8/2012 | Gupta | |
| 8,251,704 B2 | 8/2012 | Woolf et al. | |
| 8,261,199 B2 | 9/2012 | Cradick et al. | |
| 8,266,608 B2 | 9/2012 | Hecht et al. | |
| 8,335,805 B2 | 12/2012 | Cosic | |
| 8,356,026 B2 * | 1/2013 | Heimendinger | G06F 16/245 707/713 |
| 8,364,612 B2 | 1/2013 | Van Gael et al. | |
| 8,386,401 B2 | 2/2013 | Virkar et al. | |
| 8,397,227 B2 | 3/2013 | Fan et al. | |
| 8,417,740 B2 | 4/2013 | Cosic | |
| 8,464,225 B2 | 6/2013 | Greifeneder | |
| 8,549,359 B2 | 10/2013 | Zheng | |
| 8,572,035 B2 | 10/2013 | Cosic | |
| 8,589,414 B2 | 11/2013 | Waite et al. | |
| 8,595,154 B2 | 11/2013 | Breckenridge et al. | |
| 8,655,260 B2 | 2/2014 | Yueh et al. | |
| 8,655,900 B2 | 2/2014 | Cosic | |
| 8,667,472 B1 | 3/2014 | Molinari | |
| 8,996,432 B1 | 3/2015 | Fu | |
| 9,047,324 B2 | 6/2015 | Cosic | |
| 9,158,813 B2 * | 10/2015 | Ntoulas | G06F 16/24535 |
| 9,268,454 B2 | 2/2016 | Hamilton, II et al. | |
| 9,305,216 B1 | 4/2016 | Mishra | |
| 9,488,984 B1 | 11/2016 | Williams et al. | |
| 10,162,740 B1 * | 12/2018 | Setty | G06F 11/3672 |
| 10,452,974 B1 * | 10/2019 | Cosic | G06N 5/022 |
| 2003/0065662 A1 | 4/2003 | Cosic | |
| 2004/0117771 A1 | 6/2004 | Venkatapathy | |
| 2005/0149517 A1 | 7/2005 | Cosic | |
| 2005/0149542 A1 | 7/2005 | Cosic | |
| 2005/0240412 A1 | 10/2005 | Fujita | |
| 2005/0289105 A1 | 12/2005 | Cosic | |
| 2006/0184410 A1 | 8/2006 | Ramamurthy et al. | |
| 2006/0190930 A1 | 8/2006 | Hecht et al. | |
| 2006/0265406 A1 | 11/2006 | Chkodrov et al. | |
| 2007/0006159 A1 | 1/2007 | Hecht et al. | |
| 2007/0050606 A1 | 3/2007 | Ferren et al. | |
| 2007/0050719 A1 | 3/2007 | Lui et al. | |
| 2007/0061735 A1 | 3/2007 | Hoffberg et al. | |
| 2008/0215508 A1 | 9/2008 | Hanneman et al. | |
| 2008/0254429 A1 | 10/2008 | Woolf et al. | |
| 2008/0281764 A1 | 11/2008 | Baxter | |
| 2009/0044113 A1 | 2/2009 | Jones et al. | |
| 2009/0067727 A1 | 3/2009 | Hirohata | |
| 2009/0136095 A1 | 5/2009 | Marcon et al. | |
| 2009/0287643 A1 | 11/2009 | Corville et al. | |
| 2010/0023541 A1 | 1/2010 | Cosic | |
| 2010/0082536 A1 | 4/2010 | Cosic | |
| 2010/0114746 A1 | 5/2010 | Bobbitt et al. | |
| 2010/0138370 A1 | 6/2010 | Wu et al. | |
| 2010/0278420 A1 | 11/2010 | Shet et al. | |
| 2011/0007079 A1 | 1/2011 | Perez et al. | |
| 2011/0085734 A1 | 4/2011 | Berg et al. | |
| 2011/0218672 A1 | 9/2011 | Maisonnier et al. | |
| 2011/0270794 A1 | 11/2011 | Drory et al. | |
| 2012/0150773 A1 | 6/2012 | DiCorpo et al. | |
| 2012/0167057 A1 | 6/2012 | Schmich et al. | |
| 2012/0192096 A1 * | 7/2012 | Bowman | G06F 3/0481 715/780 |
| 2012/0284026 A1 | 11/2012 | Cardillo et al. | |
| 2012/0290347 A1 | 11/2012 | Elazouni et al. | |
| 2013/0007532 A1 | 1/2013 | Miller et al. | |
| 2013/0218932 A1 | 8/2013 | Cosic | |
| 2013/0226974 A1 | 8/2013 | Cosic | |
| 2013/0238533 A1 | 9/2013 | Virkar et al. | |
| 2013/0278501 A1 | 10/2013 | Bulzacki | |
| 2014/0075249 A1 | 3/2014 | Sato et al. | |
| 2014/0177946 A1 | 6/2014 | Lim et al. | |
| 2014/0211988 A1 | 7/2014 | Fan et al. | |
| 2014/0278754 A1 * | 9/2014 | Cronin | G06Q 30/0201 705/7.29 |
| 2015/0006171 A1 | 1/2015 | Westby et al. | |
| 2015/0264306 A1 | 9/2015 | Marilly et al. | |
| 2015/0269156 A1 * | 9/2015 | Awadallah | G06F 16/24578 707/732 |
| 2015/0269415 A1 | 9/2015 | Gelbman | |
| 2015/0310041 A1 | 10/2015 | Kier et al. | |
| 2015/0324685 A1 | 11/2015 | Bohn et al. | |
| 2015/0339213 A1 | 11/2015 | Lee et al. | |
| 2016/0063118 A1 * | 3/2016 | Campbell | G06F 16/9535 |
| 2016/0077166 A1 | 3/2016 | Morozov et al. | |
| 2016/0167226 A1 | 6/2016 | Schnittman | |
| 2016/0243701 A1 | 8/2016 | Gildert et al. | |
| 2016/0274187 A1 | 9/2016 | Menon et al. | |
| 2016/0328480 A1 | 11/2016 | Owens et al. | |
| 2017/0161958 A1 | 6/2017 | Eilat | |
| 2018/0068564 A1 | 3/2018 | Tanigawa et al. | |
| 2018/0101146 A1 | 4/2018 | Hariharan et al. | |
| 2018/0120813 A1 | 5/2018 | Coffman et al. | |
| 2019/0107839 A1 | 4/2019 | Parashar et al. | |

OTHER PUBLICATIONS

About Event Tracing, retrieved from <URL: http://msdn.microsoft.com/en-us/library/aa363668(d=default,I=en-us,v=vs.85).aspx> on Jan. 12, 2014, 2 pages.

Add dynamic Java code to your application, retrieved from <URL: http://www.javaworld.com/article/2071777/design-patterns/add-dynamic-java-code-to-your-application.html> on May 13, 2014, 6 pages.

BCEL, retrieved from <URL: http://commons.apache.org> on May 13, 2014, 2 pages.

Artificial intelligence, retrieved from <URL: http://wikipedia.com> on May 21, 2014, 28 pages.

Artificial neural network, retrieved from <URL: http://wikipedia.com> on May 21, 2014, 12 pages.

Branch (computer science), retrieved from <URL: http://wikipedia.com> on May 6, 2014, 2 pages.

Branch trace, retrieved from <URL: http://wikipedia.com> on May 28, 2014, 2 pages.

C Function Call Conventions and the Stack, retrieved from <URL: http://www.csee.umbc.edu/~chang/cs313.s02/stack.shtml> on Jan. 11, 2014, 4 pages.

Call stack, retrieved from <URL: http://wikipedia.com> on Jan. 11, 2014, 5 pages.

Program compilation and execution flow, retrieved from <URL: http://cs.stackexchange.com/questions/6187/program-compilation-and-execution-flow> on Jan. 9, 2014, 2 pages.

Control unit, retrieved from <URL: http://wikipedia.com> on May 25, 2014, 2 pages.

Create dynamic applications with javax.tools, retrieved from <URL: http://www.ibm.com/developerworks/library/j-jcomp/> on May 13, 2014, 11 pages.

Creating a Debugging and Profiling Agent with JVMTI, retrieved from <URL: http://www.oracle.com/technetwork/articles/java/jvmti-136367.html> on Jan. 11, 2014, 18 pages.

Decision tree learning, retrieved from <URL: http://wikipedia.com> on Jun. 24, 2014, 5 pages.

(56) References Cited

OTHER PUBLICATIONS

Dynamic Bytecode Instrumentation, retrieved from <URL: http://www.drdobbs.com/tools/dynamic-bytecode-Instrumentation/184406433> on Apr. 26, 2014, 6 pages.
Dynamic programming language, retrieved from <URL: http://wikipedia.com> on May 7, 2014, 4 pages.
Dynamic recompilation, retrieved from <URL: http://wikipedia.com> on May 19, 2014, 4 pages.
Eval(), retrieved from <URL: https://developer.mozilla.org/en-US/docs/Web/JavaScript/Reference/Global_Objects/eval> on May 7, 2014, 13 pages.
Function, retrieved from <URL: https://developer.mozilla.org/en-US/docs/Web/JavaScript/Reference/Global_Objects/Function> on May 7, 2014, 11 pages.
FunctionEnter2 Function, retrieved from <URL: https://msdn.microsoft.com/en-us/library/aa964981(d=default,I=en-us,v=vs.110).aspx> on Mar. 19, 2014, 2 pages.
FunctionLeave2 Function, retrieved from <URL: https://msdn.microsoft.com/en-us/library/aa964942(d=default,I=en-us,v=vs.110).aspx> on Mar. 19, 2014, 1 pages.
Heuristic, retrieved from <URL: http://wikipedia.com> on May 22, 2014, 5 pages.
How to: Configure Trace Switches, retrieved from <URL: https://msdn.microsoft.com/en-us/library/vstudio/t06xyy08(d=default,I=en-us,v=vs.100).aspx> on Mar. 19, 2014, 3 pages.
Indirect branch, retrieved from <URL: http://wikipedia.com> on May 5, 2014, 1 pages.
Instruction cycle, retrieved from <URL: http://wikipedia.com> on Apr. 30, 2014, 2 pages.
Instruction set, retrieved from <URL: http://wikipedia.com> on Apr. 29, 2014, 6 pages.
Interrupt, retrieved from <URL: http://wikipedia.com> on May 15, 2014, 5 pages.
Introduction to Instrumentation and Tracing, retrieved from <URL: http://msdn.microsoft.com/en-us/library/aa983649(d=default,I=en-us,v=vs.71).aspx> on Jan. 10, 2014, 2 pages.
Java bytecode, retrieved from <URL: http://wikipedia.com> on May 27, 2014, 4 pages.
Package java.util.logging, retrieved from <URL: http://docs.oracle.com/javase/1.5.0/docs/api/java/util/logging/package-summary.html> on Mar. 19, 2014, 2 pages.
Iavac—Java programming language compiler, retrieved from <URL: http://docs.oracle.com/javase/7/docs/technotes/tools/windows/javac.html> on May 13, 2014, 12 pages.
Interface JavaCompiler, retrieved from <URL: http://wikipedia.com> on May 13, 2014, 4 pages.
Javassist, retrieved from <URL: http://wikipedia.com> on May 13, 2014, 2 pages.
Just-in-time compilation, retrieved from <URL: http://wikipedia.com> on May 19, 2014, 5 pages.
JVM Tool Interface, retrieved from <URL: http://docs.oracle.com/javase/7/docs/plafform/jvmti/jvmti.html> on Apr. 26, 2014, 127 pages.
Machine code, retrieved from <URL: http://wikipedia.com> on Apr. 30, 2014, 3 pages.
Metaprogramming, retrieved from <URL: http://wikipedia.com> on May 8, 2014, 3 pages.
Microsoft.VisualBasic.Logging Namespace, retrieved from <URL: http://msdn.microsoft.com/en-us/library/ms128122(d=default,I=en-us,v=vs.110).aspx> on Jan. 13, 2014, 1 pages.
Pin (computer program), retrieved from <URL: http://wikipedia.com> on May 6, 2014, 3 pages.
Processor register, retrieved from <URL: http://wikipedia.com> on Apr. 29, 2014, 4 pages.
Profiling (computer programming), retrieved from <URL: http://wikipedia.com> on Jan. 10, 2014, 4 pages.
Profiling Overview, retrieved from <URL: http://msdn.microsoft.com/en-us/library/bb384493(d=default,I=en-us,v=vs.110).aspx> on Jan. 12, 2014, 6 pages.
Program counter, retrieved from <URL: http://wikipedia.com> on Apr. 24, 2014, 2 pages.
Ptrace, retrieved from <URL: http://wikipedia.com> on Apr. 24, 2014, 2 pages.
Reflection (computer programming), retrieved from <URL: http://wikipedia.com> on May 7, 2014, 5 pages.
Class Runtime, retrieved from <URL: http://docs.oracle.com/javase/7/docs/api/java/lang/Runtime.html> on Jan. 10, 2014, 10 pages.
Self-modifying code, retrieved from <URL: http://wikipedia.com> on Jan. 12, 2014, 6 pages.
Subjective logic, retrieved from <URL: http://wikipedia.com> on May 22, 2014, 5 pages.
System.CodeDom.Compiler Namespace, retrieved from <URL: http://msdn.microsoft.com/en-us/library/z6b99ydt(d=default,I=en-us,v=vs.110).aspx> on May 13, 2014, 2 pages.
System.Reflection.Emit Namespace, retrieved from <URL: http://msdn.microsoft.com/en-us/library/xd5fw18y(d=default,=en-us,v=vs.110).aspx> on May 13, 2014, 2 pages.
Tracing (software), retrieved from <URL: http://wikipedia.com> on Jan. 10, 2014, 3 pages.
Tree (data structure), retrieved from <URL: http://wikipedia.com> on Jun. 24, 2014, 6 pages.
Ptrace(2), retrieved from <URL: http://unixhelp.ed.ac.uk/CGI/man-cgi?ptrace> on Mar. 19, 2014, 5 pages.
Wevtutil, retrieved from <URL: http://technet.microsoft.com/en-us/library/cc732848(d=default,I=en-us,v=ws.11).aspx> on Apr. 28, 2014, 5 pages.
Intel Processor Trace, retrieved from <URL: https://software.intel.com/en-us/blogs/2013/09/18/processor-tracing> on Apr. 28, 2014, 3 pages.
Younghoon Jung, Java Dynamics Reflection and a lot more, Oct. 10, 2012, 55 pages, Columbia University.
Amitabh Srivastava, Alan Eustace, Atom A System for Building Customized Program Analysis Tools, May 3, 2004, 12 pages.
Mathew Smithson, Kapil Anand, Aparna Kotha, Khaled Elwazeer, Nathan Giles, Rajeev Barua, Binary Rewriting without Relocation Information, Nov. 10, 2010, 11 pages, University of Maryland.
Marek Olszewski, Keir Mierte, Adam Czajkowski, Angela Demle Brown, JIT Instrumentation—A Novel Approach To Dynamically Instrument Operating Systems, Feb. 12, 2007, 14 pages, University of Toronto.
Chen et al. Case-Based Reasoning System and Artificial Neural Networks: A Review Neural Comput & Applic (2001) 10: pp. 264-276, 13 pages.
John J. Grefenstette, Connie Loggia Ramsey, Alan C. Schultz, Learning Sequential Decision Rules Using Simulation Models and Competition, 1990, Navy Center for Applied Research in Artificial Intelligence, Naval Research Laboratory, Washington, DC, 27 pages.
Alan C. Schultz, John J. Grefenstette, Using a Genetic Algorithm to Learn Behaviors for Autonomous Vehicles, 1992, Navy Center for Applied Research in Artificial Intelligence, Naval Research Laboratory, Washington, DC, 12 pages.
Koppula et al., "Anticipating human activities using object affordances for reactive robotic response", IEEE TRAMI 2016, published May 5, 2015, 16 pages.
Orme, "System design tips for entry level smartphones—part 3", found online at "https://community.arm.com/processors/b/blog/posts/system-design-tips-for-entry-level-smartphones---part-3", Oct. 21, 2013, 12 pages.
Nowostawski, Mariusz et al., "Dynamic Demes Parallel Genetic Algorithm", May 13, 1999, 6 pages.
Stack Overflow, How can I quantify difference between two images?, accessed Aug. 2, 2017 at https://stackoverflow.com/questions/189943/how-can-i-quantify-difference-between-two-images, 8 pages.
Skolicki, Zbigniew et al., "The Influence of Migration Sizes and Intervals on Island Models", Jun. 29, 2005, 8 pages.
Vahid Lari, et al., "Decentralized dynamic resource management support for massively parallel processor arrays", Sep. 11, 2011, 8 pages.
Vahid Lari, et al., "Distributed resource reservation in massively parallel processor arrays", May 16, 2011, 4 pages.

(56) References Cited

OTHER PUBLICATIONS

Mohsen Hayati and Yazdan Shirvany, "Artificial Neural Network Approach for Short Term Load Forecasting for Illam Region", Jan. 2007, 5 pages.

Hasim Sak, Andrew Senior, and Francoise Beaufays, "Long Short-Term Memory Recurrent Neural Network Architectures for Large Scale Acoustic Modeling", Jan. 2014, 5 pages.

Jorg Walter and Klaus Schulten, "Implementation of self-organizing neural networks for visuo-motor control of an industrial robot", Jan. 1993, 10 pages.

Heikki Hyotyniemi and Aarno Lehtola, "A Universal Relation Database Interface for Knowledge Based Systems", Apr. 1991, 5 pages.

Mrissa, Michael, et al. "An avatar architecture for the web of things." IEEE Internet Computing 19.2 (2015): 30-38., 9 pages.

Luck, Michael, and Ruth Aylett. "Applying artificial intelligence to virtual reality: Intelligent virtual environments." Applied Artificial Intelligence 14.1 (2000): 3-32., 30 pages.

Terdjimi, Mehdi, et al. "An avatar-based adaptation workflow for the web of things." Enabling Technologies: Infrastructure for Collaborative Enterprises (WETICE), 2016 IEEE 25th International Conference on. IEEE, 2016., 6 pages.

Bogdanovych, Anton, et al. "Authentic interactive reenactment of cultural heritage with 3D virtual worlds and artificial intelligence." Applied Artificial Intelligence 24.6 (2010): 617-647., 32 pages.

Hernandez, Marco E. Perez, and Stephan Reiff-Marganiec. "Autonomous and self controlling smart objects for the future internet." Future internet of things and cloud (FiCloud), 2015 3rd international conference on. IEEE, 2015., 8 pages.

Medini et al., "Building a Web of Things with Avatars", Managing the Web of Things (2017), 30 pages.

\* cited by examiner

| Operation | | | | | | |
|---|---|---|---|---|---|---|
| Function1( | Parameter1, | Parameter2, | Parameter3, | Parameter4, | Parameter5, | ...) Time Stamp |
| 10 | 10 | 10 | 10 | 9 | 7 | 2 |
| 10 | 10 | 10 | 10 | 10 | 10 | 10 |

FIG. 16A

| Operation | | | | | | | |
|---|---|---|---|---|---|---|---|
| Function1( | Parameter1, | Parameter2, | Parameter3, | Parameter4, | Parameter5, | ...) Time Stamp | Importance Index |

FIG. 16B

UNIVERSAL ARTIFICIAL INTELLIGENCE ENGINE FOR AUTONOMOUS COMPUTING DEVICES AND SOFTWARE APPLICATIONS

CROSS REFERENCE TO RELATED APPLICATION

This application is a continuation of, and claims priority under 35 U.S.C. § 120 from, nonprovisional U.S. patent application Ser. No. 14/839,982 entitled "UNIVERSAL ARTIFICIAL INTELLIGENCE ENGINE FOR AUTONOMOUS COMPUTING DEVICES AND SOFTWARE APPLICATIONS", filed on Aug. 30, 2015. The disclosure of the foregoing document is incorporated herein by reference.

FIELD

The disclosure generally relates to computing devices. The disclosure includes devices, apparatuses, systems, and related methods for providing advanced learning, anticipating, automation, and/or other functionalities to computing devices and/or software applications.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Computing devices and software applications operating thereon have become essential in many areas of people's lives. Computing devices and/or software applications have been built for purposes that range from web browsing, word processing, gaming, and others to vehicle automation, factory automation, robot control, and others. Operating a computing device and/or software application commonly requires a user to manually direct the flow of execution to accomplish desired results. Depending on the user interface, these directions may be conveyed to the computing device and/or software application through simple actions such as selecting items in a graphical user interface or through complex and lengthy computer instructions. As such, operating a computing device and/or software application to gain its benefits is often a time consuming task itself. Also, operating a complex computing device and/or software application may only be reserved for expensive and well-trained computer operators, thereby also incurring additional cost.

SUMMARY OF THE INVENTION

In some aspects, the disclosure relates to a system for autonomous application operating. The system may operate on one or more computing devices. In some embodiments, the system comprises a computing device including a processor circuit that is coupled to a memory unit. The system may further include an application, running on the processor circuit, for performing operations on the computing device. The system may further include an interface configured to receive a first instruction set and a second instruction set, the interface further configured to receive a new instruction set, wherein the first, the second, and the new instruction sets are executed by the processor circuit and are part of the application for performing operations on the computing device. The system may further include a knowledgebase configured to store at least one portion of the first instruction set and at least one portion of the second instruction set, the knowledgebase comprising a plurality of portions of instruction sets. The system may further include a decision-making unit configured to: compare at least one portion of the new instruction set with at least one portion of the first instruction set from the knowledgebase, and determine that there is a substantial similarity between the new instruction set and the first instruction set from the knowledgebase. The processor may be caused to execute the second instruction set from the knowledgebase.

In certain embodiments, the application includes at least one of: a software application, an executable program, a web browser, a word processing application, an operating system, a media application, a global positioning system application, a game application, a robot control application, a database application, a software hardcoded on a chip, or a software hardcoded on a hardware element.

In some embodiments, the first instruction set may be followed by the second instruction set. In further embodiments, the first instruction set includes a comparative instruction set whose portions can be used for comparisons with portions of the new instruction set. In further embodiments, the second instruction set includes an anticipatory instruction set that can be used for anticipation of an instruction set subsequent to the new instruction set.

In certain embodiments, each of the first, the second, and the new instruction set includes one or more commands, keywords, symbols, instructions, operators, variables, values, objects, functions, parameters, characters, digits, or references thereto. In further embodiments, each of the first, the second, and the new instruction set includes a source code, a bytecode, an intermediate code, a compiled code, an interpreted code, a translated code, a runtime code, an assembly code, a structured query language (SQL) code, or a machine code. In further embodiments, each of the first, the second, and the new instruction set includes one or more code segments, lines of code, statements, instructions, functions, routines, subroutines, or basic blocks. In further embodiments, each of the first, the second, and the new instruction set includes an absolute or a relative instruction set.

In some embodiments, the receiving the first, the second, and the new instruction sets includes obtaining the first, the second, and the new instruction sets. In further embodiments, the receiving the first, the second, and the new instruction sets includes receiving the first, the second, and the new instruction sets from the processor circuit as the processor circuit executes them. In further embodiments, the receiving the first, the second, and the new instruction sets includes receiving the first, the second, and the new instruction sets from at least one of: the application, the memory unit, the processor circuit, the computing device, a virtual machine, a runtime engine, a hard drive, a storage device, a peripheral device, a network connected device, or an user. In further embodiments, the receiving the first, the second, and the new instruction sets includes receiving the first, the second, and the new instruction sets at a source code write time, a compile time, an interpretation time, a translation time, a linking time, a loading time, or a runtime. In further embodiments, the receiving the first, the second, and the new instruction sets includes receiving the first, the second, and the new instruction sets used for operating an object of the application. In further embodiments, the receiving the first, the second, and the new instruction sets includes at least one of: tracing, profiling, or instrumentation of the application's a source code, a bytecode, an intermediate code, a compiled code, an interpreted code, a translated code, a runtime code, an assembly code, a structured query language (SQL) code, or a machine code. In further embodiments, the receiving the first, the second, and the new instruction sets includes at least one of: tracing, profiling, or instrumentation of the memory unit, a register of the processor circuit, a storage, or a repository where the application's instruction sets may be stored. In further embodiments, the receiving the first, the second, and the new instruction sets includes at least one of: tracing, profiling, or instrumentation of the application or an object of the application. In further embodiments, the receiving the first, the second, and the new instruction sets includes at least one of: tracing, profiling, or instrumentation of the processor circuit, the computing device, a virtual machine, a runtime engine, an operating system, an execution stack, a program counter, or an element used in running the application. In further embodiments, the receiving the first, the second, and the new instruction sets includes at least one of: tracing, profiling, or instrumentation at a source code write time, a compile time, an interpretation time, a translation time, a linking time, a loading time, or a runtime. In further embodiments, the receiving the first, the second, and the new instruction sets includes at least one of: tracing, profiling, or instrumentation of one or more of the application's code segments, lines of code, statements, instructions, functions, routines, subroutines, or basic blocks. In further embodiments, the receiving the first, the second, and the new instruction sets includes at least one of: tracing, profiling, or instrumentation of an user input. In further embodiments, the receiving the first, the second, and the new instruction sets includes at least one of: a manual, an automatic, a dynamic, or a just in time (JIT) tracing, profiling, or instrumentation of the application. In further embodiments, the receiving the first, the second, and the new instruction sets includes utdizing at least one of: a .NET tool, a .NET application programming interface (API), a Java tool, a Java API, a logging tool, or an independent tool for receiving the application's instruction sets. In further embodiments, the receiving the first, the second, and the new instruction sets includes utilizing an assembly language. In further embodiments, the receiving the first, the second, and the new instruction sets includes a branch tracing, or a simulation tracing.

In certain embodiments, the interface may be further configured to receive at least one extra information associated with the first instruction set, at least one extra information associated with the second instruction set, and at least one extra information associated with the new instruction set. The at least one extra information may include one or more of: contextual information, time information, geospatial information, environmental information, situational information, observed information, computed information, pre-computed information, analyzed information, or inferred information. The at least one extra information may include one or more of: an information on an instruction set, an information on the application, an information on an object of the application, an information on the computing device, or an information on an user. The at least one extra information may include one or more of: a time stamp, an user specific information, a group specific information, a version of the application, a type of the application, a type of the computing device, or a type of an user. The at least one extra information may include one or more of: a text property, a text formatting, a preceding text, or a subsequent text. The at least one extra information may include one or more of: a location, a direction, a type, a speed, or a posture of an object of the application. The at least one extra information may include one or more of: a relationship, a distance, or an allegiance of an object of the application relative to another object of the application. The at least one extra information may include an information on an object of the application within an area of interest. In some embodiments, the receiving the at least one extra information includes associating an importance with an extra information. In further embodiments, the knowledgebase may be further configured to store the at least one extra information.

In some embodiments, the interface may be further configured to modify the application. The modifying the application may include redirecting the application's execution to one or more alternate instruction sets, the alternate instruction sets comprising an anticipatory instruction set. The modifying the application may include redirecting the application's execution to the second instruction set. The modifying the application may include causing the processor circuit to execute the second instruction set instead of or prior to an instruction set that would have followed the new instruction set. The modifying the application may include modifying one or more instruction sets of the application. The modifying the application may include modifying at least one of the application's: a source code, a bytecode, an intermediate code, a compiled code, an interpreted code, a translated code, a runtime code, an assembly code, or a machine code. The modifying the application may include modifying at least one of: the memory unit, a register of the processor circuit, a storage, or a repository where the application's instruction sets may be stored. The modifying the application may include modifying instruction sets used for operating an object of the application. The modifying the application may include modifying at least one of: an element of the processor circuit, an element of the computing device, a virtual machine, a runtime engine, an operating system, an execution stack, a program counter, or an user input used in running the application. The modifying the application may include modifying the application at a source code write time, a compile time, an interpretation time, a translation time, a linking time, a loading time, or a runtime. The modifying the application may include modifying one or more of the application's code segments, lines of code, statements, instructions, functions, routines, subroutines, or basic blocks. The modifying the application may include a manual, an automatic, a dynamic, or a just in time (JIT) instrumentation of the application. The modifying the application may include utilizing one or more of a .NET tool, a .NET application programming interface (API), a Java tool, a Java API, an operating system tool, or an independent tool for modifying the application. The modifying the application may include utilizing at least one of: a dynamic, an interpreted, or a scripting programming language. The modifying the application may include utilizing at least one of: a dynamic code, a dynamic cass loading, or a reflection. The modifying the application may include utilizing an assembly language. The modifying the application may include utilizing at least one of: a metaprogramming, a self-modifying code, or an application modification tool. The modifying the application may include utilizing at least one of: just in time (JIT) compiling, JIT interpretation, JIT translation, dynamic recompiling, or binary rewriting. The modifying the application may include utilizing at least one of: a dynamic expression creation, a dynamic expression execution, a dynamic function creation, or a dynamic function execution. The modifying the application may include adding or inserting additional code into the application code. The modifying the application may include at least one of: modifying, removing, rewriting, or overwriting the application code. The modifying the application may include at least one of: branching, redirecting, extending, or hot swapping the application code. The branching or redirecting the application code may include inserting at least one of: a branch, a jump, a trampoline, a trap, or a system for redirecting the application execution. In some embodiments, the interface may be part of, operating on, or coupled with the processor circuit.

In certain embodiments, the first instruction set includes a comparative instruction set whose stored portions can be used for comparisons with portions of the new instruction set, and the second instruction set includes an anticipatory instruction set whose stored portions can be used for anticipation of an instruction set subsequent to the new instruction set. In further embodiments, a portion of the first, the second, or the new instruction set includes one or more commands, keywords, symbols, instructions, operators, variables, values, objects, functions, parameters, characters, digits, or references thereto. In further embodiments, the knowledgebase includes one or more data structures, objects, files, tables, databases, database management systems, memory structures, or repositories. In further embodiments, the storing the at least one portion of the first instruction set and the at least one portion of the second instruction set includes storing the at least one portion of the first instruction set followed by the at least one portion of the second instruction set. In further embodiments, the storing the at least one portion of the first instruction set and the at least one portion of the second instruction set includes storing the at least one portion of the first instruction set and the at least one portion of the second instruction set into a knowledge cell. The knowledge cell may include a knowledge cell stored in the knowledgebase, the knowledgebase comprising one or more knowledge cells.

In some embodiments, the knowledgebase includes a remote or a global knowledgebase operating on a remote computing device. In further embodiments, the knowledgebase includes one or more user specific or group specific knowledgebases. In further embodiments, the knowledgebase includes an artificial intelligence system for knowledge structuring, storing, or representation. The artificial intelligence system for knowledge structuring, storing, or representation may include at least one of: a deep learning system, a supervised learning system, an unsupervised learning system, a neural network, a search-based system, an optimization-based system, a logic-based system, a fuzzy logic-based system, a tree-based system, a graph-based system, a hierarchical system, a symbolic system, a sub-symbolic system, an evolutionary system, a genetic system, a multi-agent system, a deterministic system, a probabilistic system, or a statistical system. In further embodiments, the knowledgebase includes a user's knowledge, style, or methodology of operating the application or an object of the application.

In certain embodiments, the plurality of portions of instruction sets in the knowledgebase include portions of instruction sets received from a plurality of memory units, processor circuits, computing devices, virtual machines, runtime engines, hard drives, storage devices, peripheral devices, network connected devices, or users via a plurality of interfaces. In further embodiments, the knowledgebase may be further configured to store at least one extra information associated with the first instruction set and at least one extra information associated with the second instruction set. The at least one extra information associated with the first instruction set may be stored together with the at least one portion of the first instruction set and the at least one extra information associated with the second instruction set may be stored together with the at least one portion of the second instruction set. In further embodiments, the knowledgebase may be further configured to store an importance associated with the first instruction set and an importance associated with the second instruction set. In some embodiments, the knowledgebase may be part of, operating on, or coupled with the processor circuit.

In certain embodiments, the comparing the at least one portion of the new instruction set with the at least one portion of the first instruction set from the knowledgebase includes comparing at least one portion of the new instruction set with at least one portion of comparative instruction sets from the knowledgebase, the comparative instruction sets comprising the first instruction set. In further embodiments, the comparing the at least one portion of the new instruction set with the at least one portion of the first instruction set from the knowledgebase includes comparing the portions of their respective instruction sets as separate strings of characters. In further embodiments, the comparing the at least one portion of the new instruction set with the at least one portion of the first instruction set from the knowledgebase includes comparing the portions of their respective instruction sets as combined strings of characters. In further embodiments, the comparing the at least one portion of the new instruction set with the at least one portion of the first instruction set from the knowledgebase includes comparing the portions comprising numeric values as numbers. In further embodiments, the comparing the at least one portion of the new instruction set with the at least one portion of the first instruction set from the knowledgebase includes comparing the portions factoring in an importance of one or more of the portions. In further embodiments, the comparing the at least one portion of the new instruction set with the at least one portion of the first instruction set from the knowledgebase includes comparing the portions factoring in semantically equivalent variations of one or more of the portions. In further embodiments, the comparing the at least one portion of the new instruction set with the at least one portion of the first instruction set from the knowledgebase includes comparing the portions factoring in a rating of one or more of the instruction sets. In further embodiments, the comparing the at least one portion of the new instruction set with the at least one portion of the first instruction set from the knowledgebase includes comparing an order of a portion of the new instruction set with an order of a portion of an instruction set from the knowledgebase. In further embodiments, the comparing the at least one portion of the new instruction set with the at least one portion of the first instruction set from the knowledgebase includes comparing at least one portion of the new instruction set with at least one portion of instruction sets from a knowledge cell, the knowledge cell stored in the knowledgebase. In further embodiments, the comparing the at least one portion of the new instruction set with the at least one portion of the first instruction set from the knowledgebase may be part of a substantial similarity comparison of the new instruction set with the instruction sets from the knowledgebase. The substantial similarity comparison may include a comparison strictness function for adjusting a strictness of the comparison.

In certain embodiments, the determining that there is a substantial similarity between the new instruction set and the first instruction set from the knowledgebase includes finding a match between all but a threshold number of portions of the new instruction set and all but a threshold number of portions of the first instruction set from the knowledgebase. In further embodiments, the determining that there is a substantial similarity between the new instruction set and the first instruction set from the knowledgebase includes finding a match between at least one portion of the new instruction set and at least one portion of the first instruction set from the knowledgebase. In further embodiments, the determining that there is a substantial similarity between the new instruction set and the first instruction set from the knowledgebase includes finding a match between important portions of the new instruction set and important portions of the first instruction set from the knowledgebase. In further embodiments, the determining that there is a substantial similarity between the new instruction set and the first instruction set from the knowledgebase includes determining that there is a substantial similarity between at least one portion of the new instruction set and at least one portion of the first instruction set from the knowledgebase.

In some embodiments, the decision-making unit may be further configured to compare at least one extra information associated with the new instruction set with at least one extra information associated with the first instruction set from the knowledgebase. The determining that there is a substantial similarity between the new instruction set and the first instruction set from the knowledgebase may include finding a match between all but a threshold number of extra information associated with the new instruction set and all but a threshold number of extra information associated with the first instruction set from the knowledgebase. The determining that there is a substantial similarity between the new instruction set and the first instruction set from the knowledgebase may include finding a match between at least one extra information associated with the new instruction set and at least one extra information associated with the first instruction set from the knowledgebase.

In certain embodiments, the decision-making unit may be further configured to anticipate the second instruction set. The anticipating the second instruction set may include finding the at least one portion of the first instruction set followed by the at least one portion of the second instruction set in the knowledgebase. The anticipating the second instruction set may include finding a knowledge cell comprising the at least one portion of the first instruction set followed by the at least one portion of the second instruction set. The anticipating the second instruction set may include inferring that the second instruction set is an instruction set to be executed following the new instruction set. The anticipating the second instruction set includes causing the processor circuit to execute the second instruction set prior to an instruction set that would have followed the new instruction set.

In some embodiments, the decision-making unit may be further configured to generate a comparison accuracy index, the comparison accuracy index indicating a similarity between the new instruction set and the first instruction set from the knowledgebase. In further embodiments, the decision-making unit may be further configured to analyze a contextual information, the contextual information including at least one of: information about the first, the second, or the new instruction set, information about the application or an object of the application, information about the computing device, or information useful in the comparing the at least one portion of the new instruction set with the at least one portion of the first instruction set from the knowledgebase. In certain embodiments, the decision-making unit may be part of, operating on, or coupled with the processor circuit.

In some embodiments, the executing the second instruction set from the knowledgebase includes performing an operation defined by the second instruction set from the knowledgebase. An operation defined by the second instruction set from the knowledgebase may include at least one of: an operation of a forms-based application, an operation of a web browser, an operation of an operating system, an operation of a word processing application, an operation of a media application, an operation of a global positioning system (GPS) application, an operation of a game application, an operation of a robot control application, or an operation of a database application. In further embodiments, the executing the second instruction set from the knowledgebase includes executing the second instruction set from the knowledgebase in response to the determining that there is a substantial similarity between the new instruction set and the first instruction set from the knowledgebase. In further embodiments, the executing the second instruction set from the knowledgebase includes implementing a user's knowledge, style, or methodology of operating the application or an object of the application, the user's knowledge, style, or methodology of operating the application or an object of the application represented by the instructions sets stored in the knowledgebase. In further embodiments, the executing the second instruction set from the knowledgebase includes executing a modified second instruction set from the knowledgebase. In further embodiments, the executing the second instruction set from the knowledgebase includes executing an external application or process.

In some embodiments, the system further comprises: a command disassembler configured to disassemble the first, the second, and the new instruction sets into their portions. The disassembling the first, the second, and the new instruction sets into their portions may include identifying at least one of: a command, a keyword, a symbol, an instruction, an operator, a variable, a value, an object, a function, a parameter, a character, or a digit of the first, the second, and the new instruction sets as a portion. The disassembling the first, the second, and the new instruction sets into their portions may include identifying types of the first, the second, and the new instruction sets. The disassembling the first, the second, and the new instruction sets into their portions may include associating an importance with a portion of the first, the second, and the new instruction sets. The command disassembler may be part of, operating on, or coupled with the processor circuit.

In further embodiments, the system further comprises: a modifier configured to modify the second instruction set. The modifying the second instruction set may include replacing at least one portion of the second instruction set with at least one portion of the first, the new, or an another instruction set. The modifying the second instruction set may include replacing at least one portion of the second instruction set with a command, a keyword, a symbol, an instruction, an operator, a variable, a value, an object, a function, a parameter, a character, or a digit from the first, the new, or an another instruction set. The modifying the second instruction set may include replacing at least one portion of the second instruction set with at least one extra information associated with the first, the new, or an another instruction set. The modifying the second instruction set may include replacing at least one portion of the second instruction set with a contextual information, a time information, a geo-spatial information, an environmental information, a situational information, an observed information, a computed information, a pre-computed information, an analyzed information, or an inferred information. The modifying the second instruction set may include replacing at least one portion of the second instruction set with information derived from projecting a path, a movement, a trajectory, or a pattern in portions of one or more of the first, the new, or an another instruction set. The modifying the second instruction set may include replacing at least one portion of the second instruction set with semantically equivalent variations of at least one portion of the first, the new, or an another instruction set. The modifying the second instruction set may include replacing the second instruction set with an instruction set generated by a non-UAIE system or process. In some embodiments, the modifier may be part of, operating on, or coupled with the processor circuit.

In certain embodiments, the system further comprises: a display configured to display the second instruction set as an option to be selected, modified, or canceled by a user. The displaying the second instruction set as an option to be selected, modified, or canceled by a user may include displaying a comparison accuracy indicating a similarity between the new instruction set and the first instruction set from the knowledgebase. The second instruction set may include a previously modified second instruction set.

In some embodiments, the system further comprises: a rating system configured to rate the executed second instruction set. The rating the executed second instruction set may include displaying the executed second instruction set along with one or more rating values as options to be selected by a user. The rating the executed second instruction set may include automatically rating the executed second instruction set. The rating the executed second instruction set may include associating a rating value with the executed second instruction set and storing the rating value in the knowledgebase. The executed second instruction set may include a previously modified second instruction set. In further embodiments, the rating system may be part of, operating on, or coupled with the processor circuit.

In certain embodiments, the system further comprises: a cancellation system configured to cancel the execution of the executed second instruction set. The canceling the execution of the executed second instruction set may include displaying the executed second instruction set as an option to be selected for cancelation by a user. The canceling the execution of the executed second instruction set may include associating a cancelation with the executed second instruction set and storing the cancelation in the knowledgebase. The canceling the execution of the executed second instruction set may include restoring the computing device to a prior state. The restoring the computing device to a prior state may include saving the state of the computing device prior to executing the second instruction set. The executed second instruction set may include a previously modified second instruction set. In further embodiments, the cancelation system may be part of, operating on, or coupled with the processor circuit.

In some embodiments, the system further comprises: a command assembler configured to assemble the second instruction set from its portions. In further embodiments, the command assembler may be part of, operating on, or coupled with the processor circuit.

In certain embodiments, the system further comprises: a knowledge structuring unit configured to create a knowledge cell, the knowledge cell comprising the at least one portion of the first instruction set and the at least one portion of the second instruction set. The at least one portion of the first instruction set may be followed by the at least one portion of the second instruction set. In further embodiments, the knowledge structuring unit may be further configured to cause a storing of the knowledge cell into knowledgebase, the knowledgebase comprising one or more knowledge cells. In further embodiments, the knowledge cell comprises at least one portion of one or more comparative instruction sets, the one or more comparative instruction sets including one or more least recently executed instruction sets from a plurality of recently executed instruction sets. The one or more comparative instruction sets may include the first instruction set. In further embodiments, the knowledge cell comprises at least one portion of one or more anticipatory instruction sets, the one or more anticipatory instruction sets including one or more most recently executed instruction sets from a plurality of recently executed instruction sets. The one or more anticipatory instruction sets may include the second instruction set. The knowledge cell may include a user's knowledge, style, or methodology of operating the application or an object of the application. In further embodiments, the knowledge structuring unit may be part of, operating on, or coupled with the processor circuit.

In some embodiments, the system further comprises: an universal artificial intelligence engine (UAIE) for autonomous application operating. In further embodiments, the UAIE comprises at least one of: the interface, the knowledgebase, the decision-making unit, a command disassembler, a collection of recently executed instruction sets, a knowledge structuring unit, a modifier, a command assembler, a rating system, or a cancelation system. In further embodiments, the autonomous application operating includes a partially or a fully autonomous application operating. The partially autonomous application operating may include executing the second instruction set or a modified second instruction set responsive to a confirmation by a user. The fully autonomous application operating may include executing the second instruction set or a modified second instruction set without a confirmation. In further embodiments, the autonomous application operating includes executing one or more instruction sets generated by the UAIE. The one or more instruction sets generated by the UAIE may include the second instruction set or a modified second instruction set. The one or more instruction sets generated by the UAIE may include one or more instruction sets for operating the application or an object of the application. The one or more instruction sets generated by the UAIE may include one or more instruction sets stored in the knowledgebase. In further embodiments, the autonomous application operating includes automatic or auto-pilot operating. The automatic or auto-pilot operating may include executing one or more instruction sets generated by the UAIE. In further embodiments, the autonomous application operating includes executing one or more instruction sets generated by a non-UAIE system or process.

In certain embodiments, the UAIE includes an UAIE that operates independently from the computing device. In further embodiments, the UAIE includes an UAIE attachable to the computing device. In further embodiments, the UAIE includes an UAIE built into the computing device. In further embodiments, the UAIE includes an UAIE that operates independently from the application. In further embodiments, the UAIE includes an UAIE attachable to the application. In further embodiments, the UAIE includes an UAIE built into the application. In further embodiments, the UAIE includes an UAIE provided as a feature of the computing device's operating system. In further embodiments, the application includes an application running on the computing device and the UAIE includes an UAIE running on a remote computing device. In further embodiments, the UAIE includes an UAIE running on the computing device and the application includes an application running on a remote computing device. In further embodiments, the UAIE includes a remote or a global UAIE operating on a remote computing device. In further embodiments, the UAIE may be configured to load one or more instruction sets into the knowledgebase. In further embodiments, the UAIE may be configured to load one or more knowledge cells into the knowledgebase. In further embodiments, the UAIE may be configured to load one or more knowledgebases into the UAIE. In further embodiments, the UAIE may be configured to take control from, share control with, or release control to the application or an object of the application. In further embodiments, the UAIE may be configured to learn a user's knowledge, style, or methodology of operating the application or an object of the application. The learning a user's knowledge, style, or methodology of operating the application or an object of the application may include storing the at least one portion of the first instruction set and the at least one portion of the second instruction set into the knowledgebase. In further embodiments, the UAIE may be part of, operating on, or coupled with the processor circuit.

In some aspects, the disclosure relates to a non-transitory computer storage medium having a computer program stored thereon, the program comprising instructions that when executed by one or more computing devices cause the one or more computing devices to perform operations comprising: receiving a first instruction set and a second instruction set, wherein the first and the second instruction sets are executed by a processor circuit and are part of an application for performing operations on a computing device. The operations may further include storing at least one portion of the first instruction set and at least one portion of the second instruction set into a knowledgebase, the knowledgebase comprising a plurality of portions of instruction sets. The operations may further include receiving a new instruction set, wherein the new instruction set is executed by the processor circuit and is part of the application for performing operations on the computing device. The operations may further include comparing at least one portion of the new instruction set with at least one portion of the first instruction set from the knowledgebase. The operations may further include determining that there is a substantial similarity between the new instruction set and the first instruction set from the knowledgebase. The operations may further include causing the processor circuit to execute the second instruction set from the knowledgebase.

In some aspects, the disclosure relates to a method comprising: (a) receiving, by a processor circuit via an interface, a first instruction set and a second instruction set, wherein the first and the second instruction sets are executed by the processor circuit and are part of an application for performing operations on a computing device. The method may further include (b) storing at least one portion of the first instruction set and at least one portion of the second instruction set into a knowledgebase, the knowledgebase comprising a plurality of portions of instruction sets, the storing of (b) caused by the processor circuit. The method may further include (c) receiving, by the processor circuit via the interface, a new instruction set, wherein the new instruction set is executed by the processor circuit and is part of the application for performing operations on the computing device. The method may further include (d) comparing at least one portion of the new instruction set with at least one portion of the first instruction set from the knowledgebase, the comparing of (d) performed by the processor circuit. The method may further include (e) determining that there is a substantial similarity between the new instruction set and the first instruction set from the knowledgebase, the determining of (e) performed by the processor circuit. The method may further include executing the second instruction set from the knowledgebase by the processor circuit.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In certain embodiments, the application includes at least one of: a software application, an executable program, a web browser, a word processing application, an operating system, a media application, a global positioning system application, a game application, a robot control application, a database application, a software hardcoded on a chip, or a software hardcoded on a hardware element.

In some embodiments, the first instruction set may be followed by the second instruction set. In further embodiments, the first instruction set includes a comparative instruction set whose portions can be used for comparisons with portions of the new instruction set. In further embodiments, the second instruction set includes an anticipatory instruction set that can be used for anticipation of an instruction set subsequent to the new instruction set.

In some embodiments, the first, the second, and the new instruction set includes one or more commands, keywords, symbols, instructions, operators, variables, values, objects, functions, parameters, characters, digits, or references thereto. In further embodiments, each of the first, the second, and the new instruction set includes a source code, a bytecode, an intermediate code, a compiled code, an interpreted code, a translated code, a runtime code, an assembly code, a structured query language (SQL) code, or a machine code. In further embodiments, each of the first, the second, and the new instruction set includes one or more code segments, lines of code, statements, instructions, functions, routines, subroutines, or basic blocks. In further embodiments, each of the first, the second, and the new instruction set includes an absolute or a relative instruction set.

In certain embodiments, the receiving the first, the second, and the new instruction sets includes obtaining the first, the second, and the new instruction sets. In further embodiments, the receiving the first, the second, and the new instruction sets includes receiving the first, the second, and the new instruction sets from the processor circuit as the processor circuit executes them. In further embodiments, the receiving the first, the second, and the new instruction sets includes receiving the first, the second, and the new instruction sets from at least one of: the application, the memory unit, the processor circuit, the computing device, a virtual machine, a runtime engine, a hard drive, a storage device, a peripheral device, a network connected device, or an user. In further embodiments, the receiving the first, the second, and the new instruction sets includes receiving the first, the second, and the new instruction sets at a source code write time, a compile time, an interpretation time, a translation time, a linking time, a loading time, or a runtime. In further embodiments, the receiving the first, the second, and the new instruction sets includes receiving the first, the second, and the new instruction sets used for operating an object of the application. In further embodiments, the receiving the first, the second, and the new instruction sets includes at least one of: tracing, profiling, or instrumentation of the application's a source code, a bytecode, an intermediate code, a compiled code, an interpreted code, a translated code, a runtime code, an assembly code, a structured query language (SQL) code, or a machine code. In further embodiments, the receiving the first, the second, and the new instruction sets includes at least one of: tracing, profiling, or instrumentation of the memory unit, a register of the processor circuit, a storage, or a repository where the application's instruction sets may be stored. In further embodiments, the receiving the first, the second, and the new instruction sets includes at least one of: tracing, profiling, or instrumentation of the application or an object of the application. In further embodiments, the receiving the first, the second, and the new instruction sets includes at least one of: tracing, profiling, or instrumentation of the processor circuit, the computing device, a virtual machine, a runtime engine, an operating system, an execution stack, a program counter, or an element used in running the application. In further embodiments, the receiving the first, the second, and the new instruction sets includes at least one of: tracing, profiling, or instrumentation at a source code write time, a compile time, an interpretation time, a translation time, a linking time, a loading time, or a runtime. In further embodiments, the receiving the first, the second, and the new instruction sets includes at least one of: tracing, profiling, or instrumentation of one or more of the application's code segments, lines of code, statements, instructions, functions, routines, subroutines, or basic blocks. In further embodiments, the receiving the first, the second, and the new instruction sets includes at least one of: tracing, profiling, or instrumentation of an user input. In further embodiments, the receiving the first, the second, and the new instruction sets includes at least one of: a manual, an automatic, a dynamic, or a just in time (JIT) tracing, profiling, or instrumentation of the application. In further embodiments, the receiving the first, the second, and the new instruction sets includes utilizing at least one of: a .NET tool, a .NET application programming interface (API), a Java tool, a Java API, a logging tool, or an independent tool for receiving the application's instruction sets. In further embodiments, the receiving the first, the second, and the new instruction sets includes utilizing an assembly language. In further embodiments, the receiving the first, the second, and the new instruction sets includes a branch tracing, or a simulation tracing.

In certain embodiments, the non-transitory computer storage medium and/or the method further comprise: receiving at least one extra information associated with the first instruction set, at least one extra information associated with the second instruction set, and at least one extra information associated with the new instruction set. The at least one extra information may include one or more of: contextual information, time information, geo-spatial information, environmental information, situational information, observed information, computed information, pre-computed information, analyzed information, or inferred information. The at least one extra information may include one or more of: an information on an instruction set, an information on the application, an information on an object of the application, an information on the computing device, or an information on an user. The at least one extra information may include one or more of: a time stamp, an user specific information, a group specific information, a version of the application, a type of the application, a type of the computing device, or a type of an user. The at least one extra information may include one or more of: a text property, a text formatting, a preceding text, or a subsequent text. The at least one extra information may include one or more of: a location, a direction, a type, a speed, or a posture of an object of the application. The at least one extra information may include one or more of: a relationship, a distance, or an allegiance of an object of the application relative to another object of the application. The at least one extra information may include an information on an object of the application within an area of interest. In further embodiments, the receiving the at least one extra information includes associating an importance with an extra information. In certain embodiments, the non-transitory computer storage medium and/or the method further comprise: storing the at least one extra information into the knowledgebase.

In some embodiments, the non-transitory computer storage medium and/or the method further comprise: modifying the application. The modifying the application may include redirecting the application's execution to one or more alternate instruction sets, the alternate instruction sets comprising an anticipatory instruction set. The modifying the application may include redirecting the application's execution to the second instruction set. The modifying the application may include causing the processor circuit to execute the second instruction set instead of or prior to an instruction set that would have followed the new instruction set. The modifying the application may include modifying one or more instruction sets of the application. The modifying the application may include modifying at least one of the application's: a source code, a bytecode, an intermediate code, a compiled code, an interpreted code, a translated code, a runtime code, an assembly code, or a machine code. The modifying the application may include modifying at least one of: the memory unit, a register of the processor circuit, a storage, or a repository where the application's instruction sets may be stored. The modifying the application may include modifying instruction sets used for operating an object of the application. The modifying the application may include modifying at least one of: an element of the processor circuit, an element of the computing device, a virtual machine, a runtime engine, an operating system, an execution stack, a program counter, or an user input used in running the application. The modifying the application may include modifying the application at a source code write time, a compile time, an interpretation time, a translation time, a linking time, a loading time, or a runtime. The modifying the application may include modifying one or more of the application's code segments, lines of code, statements, instructions, functions, routines, subroutines, or basic blocks. The modifying the application may include a manual, an automatic, a dynamic, or a just in time (JIT) instrumentation of the application. The modifying the application may include utilizing one or more of a .NET tool, a .NET application programming interface (API), a Java tool, a Java API, an operating system tool, or an independent tool for modifying the application. The modifying the application may include utilizing at least one of: a dynamic, an interpreted, or a scripting programming language. The modifying the application may include utilizing at least one of: a dynamic code, a dynamic class loading, or a reflection. The modifying the application may include utilizing an assembly language. The modifying the application may include utilizing at least one of: a metaprogramming, a self-modifying code, or an application modification tool. The modifying the application may include utilizing at least one of: just in time (JIT) compiling, JIT interpretation, JIT translation, dynamic recompiling, or binary rewriting. The modifying the application may include utilizing at least one of: a dynamic expression creation, a dynamic expression execution, a dynamic function creation, or a dynamic function execution. The modifying the application may include adding or inserting additional code into the application code. The modifying the application may include at least one of: modifying, removing, rewriting, or overwriting the application code. The modifying the application may include at least one of: branching, redirecting, extending, or hot swapping the application code. The branching or redirecting the application code may include inserting at least one of: a branch, a jump, a trampoline, a trap, or a system for redirecting the application execution. In further embodiments, the modifying the application may be performed by the processor circuit.

In some embodiments, the first instruction set includes a comparative instruction set whose stored portions can be used for comparisons with portions of the new instruction set, and the second instruction set includes an anticipatory instruction set whose stored portions can be used for anticipation of an instruction set subsequent to the new instruction set. In further embodiments, a portion of the first, the second, or the new instruction set includes one or more commands, keywords, symbols, instructions, operators, variables, values, objects, functions, parameters, characters, digits, or references thereto. In further embodiments, the knowledgebase includes one or more data structures, objects, files, tables, databases, database management systems, memory structures, or repositories.

In certain embodiments, the storing the at least one portion of the first instruction set and the at least one portion of the second instruction set includes storing the at least one portion of the first instruction set followed by the at least one portion of the second instruction set. In further embodiments, the storing the at least one portion of the first instruction set and the at least one portion of the second instruction set includes storing the at least one portion of the first instruction set and the at least one portion of the second instruction set into a knowledge cell. The knowledge cell may include a knowledge cell stored in the knowledgebase, the knowledgebase comprising one or more knowledge cells.

In some embodiments, the knowledgebase includes a remote or a global knowledgebase operating on a remote computing device. In further embodiments, the knowledgebase includes one or more user specific or group specific knowledgebases. In further embodiments, the knowledgebase includes an artificial intelligence system for knowledge structuring, storing, or representation. The artificial intelligence system for knowledge structuring, storing, or representation may include at least one of: a deep learning system, a supervised learning system, an unsupervised learning system, a neural network, a search-based system, an optimization-based system, a logic-based system, a fuzzy logic-based system, a tree-based system, a graph-based system, a hierarchical system, a symbolic system, a sub-symbolic system, an evolutionary system, a genetic system, a multi-agent system, a deterministic system, a probabilistic system, or a statistical system. In further embodiments, the knowledgebase includes a user's knowledge, style, or methodology of operating the application or an object of the application. In further embodiments, the plurality of portions of instruction sets in the knowledgebase include portions of instruction sets received from a plurality of memory units, processor circuits, computing devices, virtual machines, runtime engines, hard drives, storage devices, peripheral devices, network connected devices, or users via a plurality of interfaces.

In certain embodiments, the non-transitory computer storage medium and/or the method further comprise: storing at least one extra information associated with the first instruction set and at least one extra information associated with the second instruction set into the knowledgebase. The at least one extra information associated with the first instruction set may be stored together with the at least one portion of the first instruction set and the at least one extra information associated with the second instruction set may be stored together with the at least one portion of the second instruction set.

In some embodiments, the non-transitory computer storage medium and/or the method further comprise: storing an importance associated with the first instruction set and an importance associated with the second instruction set into the knowledgebase.

In certain embodiments, the comparing the at least one portion of the new instruction set with the at least one portion of the first instruction set from the knowledgebase includes comparing at least one portion of the new instruction set with at least one portion of comparative instruction sets from the knowledgebase, the comparative instruction sets comprising the first instruction set. In further embodiments, the comparing the at least one portion of the new instruction set with the at least one portion of the first instruction set from the knowledgebase includes comparing the portions of their respective instruction sets as separate strings of characters. In further embodiments, the comparing the at least one portion of the new instruction set with the at least one portion of the first instruction set from the knowledgebase includes comparing the portions of their respective instruction sets as combined strings of characters. In further embodiments, the comparing the at least one portion of the new instruction set with the at least one portion of the first instruction set from the knowledgebase includes comparing the portions comprising numeric values as numbers. In further embodiments, the comparing the at least one portion of the new instruction set with the at least one portion of the first instruction set from the knowledgebase includes comparing the portions factoring in an importance of one or more of the portions. In further embodiments, the comparing the at least one portion of the new instruction set with the at least one portion of the first instruction set from the knowledgebase includes comparing the portions factoring in semantically equivalent variations of one or more of the portions. In further embodiments, the comparing the at least one portion of the new instruction set with the at least one portion of the first instruction set from the knowledgebase includes comparing the portions factoring in a rating of one or more of the instruction sets. In further embodiments, the comparing the at least one portion of the new instruction set with the at least one portion of the first instruction set from the knowledgebase includes comparing an order of a portion of the new instruction set with an order of a portion of an instruction set from the knowledgebase. In further embodiments, the comparing the at least one portion of the new instruction set with the at least one portion of the first instruction set from the knowledgebase includes comparing at least one portion of the new instruction set with at least one portion of instruction sets from a knowledge cell, the knowledge cel stored in the knowledgebase. In further embodiments, the comparing the at least one portion of the new instruction set with the at least one portion of the first instruction set from the knowledgebase may be part of a substantial similarity comparison of the new instruction set with the instruction sets from the knowledgebase. The substantial similarity comparison may include a comparison strictness function for adjusting a strictness of the comparison.

In certain embodiments, the determining that there is a substantial similarity between the new instruction set and the first instruction set from the knowledgebase includes finding a match between all but a threshold number of portions of the new instruction set and al but a threshold number of portions of the first instruction set from the knowledgebase. In further embodiments, the determining that there is a substantial similarity between the new instruction set and the first instruction set from the knowledgebase includes finding a match between at least one portion of the new instruction set and at least one portion of the first instruction set from the knowledgebase. In further embodiments, the determining that there is a substantial similarity between the new instruction set and the first instruction set from the knowledgebase includes finding a match between important portions of the new instruction set and important portions of the first instruction set from the knowledgebase. In further embodiments, the determining that there is a substantial similarity between the new instruction set and the first instruction set from the knowledgebase includes determining that there is a substantial similarity between at least one portion of the new instruction set and at least one portion of the first instruction set from the knowledgebase.

In certain embodiments, the non-transitory computer storage medium and/or the method further comprise: comparing at least one extra information associated with the new instruction set with at least one extra information associated with the first instruction set from the knowledgebase. The determining that there is a substantial similarity between the new instruction set and the first instruction set from the knowledgebase may include finding a match between all but a threshold number of extra information associated with the new instruction set and all but a threshold number of extra information associated with the first instruction set from the knowledgebase. The determining that there is a substantial similarity between the new instruction set and the first instruction set from the knowledgebase may include finding a match between at least one extra information associated with the new instruction set and at least one extra information associated with the first instruction set from the knowledgebase.

In some embodiments, the non-transitory computer storage medium and/or the method further comprise: anticipating the second instruction set. The anticipating the second instruction set may include finding the at least one portion of the first instruction set followed by the at least one portion of the second instruction set in the knowledgebase. The anticipating the second instruction set may include finding a knowledge cell comprising the at least one portion of the first instruction set followed by the at least one portion of the second instruction set. The anticipating the second instruction set may include inferring that the second instruction set is an instruction set to be executed following the new instruction set. The anticipating the second instruction set may include causing the processor circuit to execute the second instruction set prior to an instruction set that would have followed the new instruction set. In further embodiments, the anticipating the second instruction set may be performed by the processor circuit.

In certain embodiments, the non-transitory computer storage medium and/or the method further comprise: generating a comparison accuracy index, the comparison accuracy index indicating a similarity between the new instruction set and the first instruction set from the knowledgebase.

In certain embodiments, the non-transitory computer storage medium and/or the method further comprise: analyzing a contextual information, the contextual information including at least one of: information about the first, the second, or the new instruction set, information about the application or an object of the application, information about the computing device, or information useful in the comparing the at least one portion of the new instruction set with the at least one portion of the first instruction set from the knowledgebase.

In some embodiments, the executing the second instruction set from the knowledgebase includes performing an operation defined by the second instruction set from the knowledgebase. An operation defined by the second instruction set from the knowledgebase may include at least one of: an operation of a forms-based application, an operation of a web browser, an operation of an operating system, an operation of a word processing application, an operation of a media application, an operation of a global positioning system (GPS) application, an operation of a game application, an operation of a robot control application, or an operation of a database application. In further embodiments, the executing the second instruction set from the knowledgebase includes executing the second instruction set from the knowledgebase in response to the determining that there is a substantial similarity between the new instruction set and the first instruction set from the knowledgebase. In further embodiments, the executing the second instruction set from the knowledgebase includes implementing a user's knowledge, style, or methodology of operating the application or an object of the application, the user's knowledge, style, or methodology of operating the application or an object of the application represented by the instructions sets stored in the knowledgebase. In further embodiments, the executing the second instruction set from the knowledgebase includes executing a modified second instruction set from the knowledgebase. In further embodiments, the executing the second instruction set from the knowledgebase includes executing an external application or process.

In certain embodiments, the non-transitory computer storage medium and/or the method further comprise: disassembling the first, the second, and the new instruction sets into their portions. The disassembling the first, the second, and the new instruction sets into their portions may include identifying at least one of: a command, a keyword, a symbol, an instruction, an operator, a variable, a value, an object, a function, a parameter, a character, or a digit of the first, the second, and the new instruction sets as a portion. The disassembling the first, the second, and the new instruction sets into their portions may include identifying types of the first, the second, and the new instruction sets. The disassembling the first, the second, and the new instruction sets into their portions may include associating an importance with a portion of the first, the second, and the new instruction sets. The disassembling the first, the second, and the new instruction sets into their portions may be performed by the processor circuit.

In some embodiments, the non-transitory computer storage medium and/or the method further comprise: modifying the second instruction set. The modifying the second instruction set may include replacing at least one portion of the second instruction set with at least one portion of the first, the new, or an another instruction set. The modifying the second instruction set may include replacing at least one portion of the second instruction set with a command, a keyword, a symbol, an instruction, an operator, a variable, a value, an object, a function, a parameter, a character, or a digit from the first, the new, or an another instruction set. The modifying the second instruction set may include replacing at least one portion of the second instruction set with at least one extra information associated with the first, the new, or an another instruction set. The modifying the second instruction set may include replacing at least one portion of the second instruction set with a contextual information, a time information, a geo-spatial information, an environmental information, a situational information, an observed information, a computed information, a pre-computed information, an analyzed information, or an inferred information. The modifying the second instruction set may include replacing at least one portion of the second instruction set with information derived from projecting a path, a movement, a trajectory, or a pattern in portions of one or more of the first, the new, or an another instruction set. The modifying the second instruction set may include replacing at least one portion of the second instruction set with semantically equivalent variations of at least one portion of the first, the new, or an another instruction set. The modifying the second instruction set may include replacing the second instruction set with an instruction set generated by a non-UAIE system or process. The modifying the second instruction set may be performed by the processor circuit.

In certain embodiments, the non-transitory computer storage medium and/or the method further comprise: displaying the second instruction set as an option to be selected, modified, or canceled by a user. The displaying the second instruction set as an option to be selected, modified, or canceled by a user may include displaying a comparison accuracy indicating a similarity between the new instruction set and the first instruction set from the knowledgebase. The second instruction set may include a previously modified second instruction set.

In certain embodiments, the non-transitory computer storage medium and/or the method further comprise: rating the executed second instruction set. The rating the executed second instruction set may include displaying the executed second instruction set along with one or more rating values as options to be selected by a user. The rating the executed second instruction set may include automatically rating the executed second instruction set. The rating the executed second instruction set may include associating a rating value with the executed second instruction set and storing the rating value in the knowledgebase. The executed second instruction set may include a previously modified second instruction set. The rating the executed second instruction set may be performed by the processor circuit.

In certain embodiments, the non-transitory computer storage medium and/or the method further comprise: canceling the execution of the executed second instruction set. The canceling the execution of the executed second instruction set may include displaying the executed second instruction set as an option to be selected for cancelation by a user. The canceling the execution of the executed second instruction set may include associating a cancelation with the executed second instruction set and storing the cancelation in the knowledgebase. The canceling the execution of the executed second instruction set may include restoring the computing device to a prior state. The restoring the computing device to a prior state may include saving the state of the computing device prior to executing the second instruction set. The executed second instruction set may include a previously modified second instruction set. The canceling the execution of the executed second instruction set may be performed by the processor circuit.

In certain embodiments, the non-transitory computer storage medium and/or the method further comprise: assembling the second instruction set from its portions. The assembling the second instruction set from its portions may be performed by the processor circuit.

In certain embodiments, the non-transitory computer storage medium and/or the method further comprise: creating a knowledge cell, the knowledge cell comprising the at least one portion of the first instruction set and the at least one portion of the second instruction set. The at least one portion of the first instruction set may be followed by the at least one portion of the second instruction set. In some embodiments, the non-transitory computer storage medium and/or the method further comprise: storing the knowledge cell into knowledgebase, the knowledgebase comprising one or more knowledge cells. In further embodiments, the knowledge cell comprises at least one portion of one or more comparative instruction sets, the one or more comparative instruction sets including one or more least recently executed instruction sets from a plurality of recently executed instruction sets. The one or more comparative instruction sets may include the first instruction set. In further embodiments, the knowledge cell comprises at least one portion of one or more anticipatory instruction sets, the one or more anticipatory instruction sets including one or more most recently executed instruction sets from a plurality of recently executed instruction sets. The one or more anticipatory instruction sets may include the second instruction set. In further embodiments, the knowledge cell includes a user's knowledge, style, or methodology of operating the application or an object of the application. The creating the knowledge cell may be performed by the processor circuit.

In certain embodiments, the non-transitory computer storage medium and/or the method further comprise: an autonomous operating of the application caused by an universal artificial intelligence engine (UAIE). In further embodiments, the UAIE comprises at least one of: the interface, the knowledgebase, a decision-making unit, a command disassembler, a collection of recently executed instruction sets, a knowledge structuring unit, a modifier, a command assembler, a rating system, or a cancelation system. In further embodiments, the autonomous application operating includes a partially or a fully autonomous application operating. The partially autonomous application operating may include executing the second instruction set or a modified second instruction set responsive to a confirmation by a user. The fully autonomous application operating may include executing the second instruction set or a modified second instruction set without a confirmation. In further embodiments, the autonomous application operating includes executing one or more instruction sets generated by the UAIE. The one or more instruction sets generated by the UAIE may include the second instruction set or a modified second instruction set. The one or more instruction sets generated by the UAIE may include one or more instruction sets for operating the application or an object of the application. The one or more instruction sets generated by the UAIE may include one or more instruction sets stored in the knowledgebase. In further embodiments, the autonomous application operating includes automatic or auto-pilot operating. The automatic or auto-pilot operating may include executing one or more instruction sets generated by the UAIE. In further embodiments, the autonomous application operating includes executing one or more instruction sets generated by a non-UAIE system or process.

In some embodiments, the UAIE includes an UAIE that operates independently from the computing device. In further embodiments, the UAIE includes an UAIE attachable to the computing device. In further embodiments, the UAIE includes an UAIE built into the computing device. In further embodiments, the UAIE includes an UAIE that operates independently from the application. In further embodiments, the UAIE includes an UAIE attachable to the application. In further embodiments, the UAIE includes an UAIE built into the application. In further embodiments, the UAIE includes an UAIE provided as a feature of the computing device's operating system. In further embodiments, the application includes an application running on the computing device and the UAIE includes an UAIE running on a remote computing device. In further embodiments, the UAIE includes an UAIE running on the computing device and the application includes an application running on a remote computing device. In further embodiments, the UAIE includes a remote or a global UAIE operating on a remote computing device.

In certain embodiments, the non-transitory computer storage medium and/or the method further comprise: loading one or more instruction sets into the knowledgebase by UAIE. In some embodiments, the non-transitory computer storage medium and/or the method further comprise: loading one or more knowledge cells into the knowledgebase by UAIE. In certain embodiments, the non-transitory computer storage medium and/or the method further comprise: loading one or more knowledgebases into the UAIE. In some embodiments, the non-transitory computer storage medium and/or the method further comprise: taking control from, sharing control with, or releasing control to the application or an object of the application, the taking, sharing, or releasing control performed by the UAIE. In certain embodiments, the non-transitory computer storage medium and/or the method further comprise: learning a user's knowledge, style, or methodology of operating the application or an object of the application by the UAIE. The learning a user's knowledge, style, or methodology of operating the application or an object of the application may include storing the at least one portion of the first instruction set and the at least one portion of the second instruction set into the knowledgebase. The operation of the UAIE may be performed by the processor circuit.

In some aspects, the disclosure relates to a system for learning an application's operations. The system may operate on one or more computing devices. In some embodiments, the system comprises a computing device including a processor circuit that is coupled to a memory unit. The system may further include an application, running on the processor circuit, for performing operations on the computing device. The system may further include an interface configured to receive a plurality of recently executed instruction sets, the plurality of recently executed instruction sets comprise instruction sets executed immediately prior to and including a currently executed instruction set, wherein the plurality of recently executed instruction sets are part of the application for performing operations on the computing device. The system may further include a knowledgebase configured to store portions of comparative instruction sets and portions of anticipatory instruction sets, the knowledgebase comprising a plurality of portions of comparative instruction sets and portions of anticipatory instruction sets, wherein the comparative instruction sets include the least recently executed instruction sets of the plurality of recently executed instruction sets and the anticipatory instruction sets include the most recently executed instruction sets of the plurality of recently executed instruction sets.

In some embodiments, the interface may be further configured to receive at least one extra information associated with the plurality of recently executed instruction sets. The knowledgebase may be further configured to store the at least one extra information associated with the comparative instruction sets and store the at least one extra information associated with the anticipatory instruction sets. The knowledgebase may be further configured to store the at least one extra information associated with the comparative instruction sets together with the portions of the comparative instruction sets, and store the at least one extra information associated with the anticipatory instruction sets together with the portions of the anticipatory instruction sets.

In certain embodiments, the storing portions of comparative instruction sets and portions of anticipatory instruction sets includes storing portions of comparative instruction sets followed by portions of anticipatory instruction sets. In further embodiments, the comparative instruction sets include one or more comparative instruction sets and the anticipatory instruction sets include one or more anticipatory instruction sets. In further embodiments, the comparative instruction sets include instruction sets whose portions can be used for comparisons with portions of new instruction sets, and the anticipatory instruction sets include instruction sets whose portions can be used for anticipation of instruction sets subsequent to the new instruction sets. In further embodiments, the storing portions of comparative instruction sets and portions of anticipatory instruction sets includes storing portions of comparative instruction sets and portions of anticipatory instruction sets into a knowledge cell. The knowledge cell includes a knowledge cell stored in the knowledgebase, the knowledgebase comprising one or more knowledge cells.

In some aspects, the disclosure relates to a non-transitory computer storage medium having a computer program stored thereon, the program comprising instructions that when executed by one or more computing devices cause the one or more computing devices to perform operations comprising: receiving a plurality of recently executed instruction sets, the plurality of recently executed instruction sets comprise instruction sets executed immediately prior to and including a currently executed instruction set, wherein the plurality of recently executed instruction sets are part of an application for performing operations on a computing device. The operations may further include storing portions of comparative instruction sets and portions of anticipatory instruction sets into a knowledgebase, the knowledgebase comprising a plurality of portions of comparative instruction sets and portions of anticipatory instruction sets, wherein the comparative instruction sets include the least recently executed instruction sets of the plurality of recently executed instruction sets and the anticipatory instruction sets include the most recently executed instruction sets of the plurality of recently executed instruction sets.

In some aspects, the disclosure relates to a method comprising: (a) receiving, by a processor circuit via an interface, a plurality of recently executed instruction sets, the plurality of recently executed instruction sets comprise instruction sets executed immediately prior to and including a currently executed instruction set, wherein the plurality of recently executed instruction sets are part of an application for performing operations on a computing device. The method may further include (b) storing portions of comparative instruction sets and portions of anticipatory instruction sets into a knowledgebase, the knowledgebase comprising a plurality of portions of comparative instruction sets and portions of anticipatory instruction sets, wherein the comparative instruction sets include the least recently executed instruction sets of the plurality of recently executed instruction sets and the anticipatory instruction sets include the most recently executed instruction sets of the plurality of recently executed instruction sets, the storing of (b) caused by the processor circuit.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In certain embodiments, the non-transitory computer storage medium and/or the method further comprise: receiving, by the processor circuit via the interface, at least one extra information associated with the plurality of recently executed instruction sets. In some embodiments, the non-transitory computer storage medium and/or the method further comprise: storing the at least one extra information associated with the comparative instruction sets, and storing the at least one extra information associated with the anticipatory instruction sets. In certain embodiments, the non-transitory computer storage medium and/or the method further comprise: storing the at least one extra information associated with the comparative instruction sets together with the portions of the comparative instruction sets, and storing the at least one extra information associated with the anticipatory instruction sets together with the portions of the anticipatory instruction sets.

In some embodiments, the storing portions of comparative instruction sets and portions of anticipatory instruction sets includes storing portions of comparative instruction sets followed by portions of anticipatory instruction sets. In further embodiments, the comparative instruction sets include one or more comparative instruction sets and the anticipatory instruction sets include one or more anticipatory instruction sets. In further embodiments, the comparative instruction sets include instruction sets whose portions can be used for comparisons with portions of new instruction sets, and the anticipatory instruction sets include instruction sets whose portions can be used for anticipation of instruction sets subsequent to the new instruction sets. In further embodiments, the storing portions of comparative instruction sets and portions of anticipatory instruction sets into the knowledgebase includes storing portions of comparative instruction sets and portions of anticipatory instruction sets into a knowledge cell. The knowledge cell may include a knowledge cell stored in the knowledgebase, the knowledgebase comprising one or more knowledge cells.

In some aspects, the disclosure relates to a system for anticipating an application's operations. The system may operate on one or more computing devices. In some embodiments, the system comprises a computing device including a processor circuit that is coupled to a memory unit. The system may further include an application, running on the processor circuit, for performing operations on the computing device. The system may further include a knowledgebase that stores portions of comparative instruction sets and portions of anticipatory instruction sets, the knowledgebase comprising a plurality of portions of comparative instruction sets and portions of anticipatory instruction sets, wherein the comparative and the anticipatory instruction sets are part of the application for performing operations on the computing device. The system may further include an interface configured to receive new instruction sets, wherein the new instruction sets are part of the application for performing operations on the computing device. The system may further include a decision-making unit configured to: compare portions of the new instruction sets with portions of the comparative instruction sets in the knowledgebase, determine that there is substantial similarity between one or more new instruction sets and one or more comparative instruction sets in the knowledgebase, and anticipate one or more anticipatory instruction sets in the knowledgebase.

In some embodiments, the comparative instruction sets include the least recently executed instruction sets of a plurality of previously executed instruction sets and the anticipatory instruction sets include the most recently executed instruction sets of the plurality of previously executed instruction sets, the plurality of previously executed instruction sets comprise instruction sets executed immediately prior to and including an instruction set executed at a past time point. In further embodiments, the portions of comparative instruction sets and portions of anticipatory instruction sets stored in the knowledgebase include the portions of comparative instruction sets folowed by the portions of anticipatory instruction sets. In further embodiments, the knowledgebase further stores at least one extra information associated with the comparative instruction sets and at least one extra information associated with the anticipatory instruction sets.

In some embodiments, the system may be further configured to: receive at least one extra information associated with the new instruction sets.

In certain embodiments, the determining that there is substantial similarity between one or more new instruction sets and one or more comparative instruction sets in the knowledgebase includes finding a match between all but a threshold number of portions of the one or more new instruction sets and all but a threshold number of portions of the one or more comparative instruction sets. In further embodiments, the determining that there is substantial similarity between one or more new instruction sets and one or more comparative instruction sets in the knowledgebase includes finding a match between at least one portion of the one or more new instruction sets and at least one portion of the one or more comparative instruction sets.

In some embodiments, the decision-making unit may be further configured to compare at least one extra information associated with the new instruction sets with at least one extra information associated with the comparative instruction sets in the knowledgebase. The determining that there is substantial similarity between one or more new instruction sets and one or more comparative instruction sets in the knowledgebase may include finding a match between al but a threshold number of extra information associated with the one or more new instruction sets and all but a threshold number of extra information associated with the one or more comparative instruction sets. The determining that there is substantial similarity between one or more new instruction sets and one or more comparative instruction sets in the knowledgebase may include finding a match between the at least one extra information associated with the one or more new instruction sets and the at least one extra information associated with the one or more comparative instruction sets.

In certain embodiments, the anticipating the one or more anticipatory instruction sets includes finding one or more comparative instruction sets followed by the one or more anticipatory instruction sets in the knowledgebase. In further embodiments, the processor circuit may be caused to execute the one or more anticipatory instruction sets from the knowledgebase. In further embodiments, the portions of the comparative instruction sets and the portions of the anticipatory instruction sets may be stored in one or more knowledge cells.

In some aspects, the disclosure relates to a non-transitory computer storage medium having a computer program stored thereon, the program comprising instructions that when executed by one or more computing devices cause the one or more computing devices to perform operations comprising: accessing a knowledgebase that stores portions of comparative instruction sets and portions of anticipatory instruction sets, the knowledgebase comprising a plurality of portions of comparative instruction sets and portions of anticipatory instruction sets, wherein the comparative and the anticipatory instruction sets are part of an application for performing operations on a computing device. The operations may further include receiving new instruction sets, wherein the new instruction sets are part of the application for performing operations on the computing device. The operations may further include comparing portions of the new instruction sets with portions of the comparative instruction sets in the knowledgebase. The operations may further include determining that there is a substantial similarity between one or more new instruction sets and one or more comparative instruction sets in the knowledgebase. The operations may further include anticipating one or more anticipatory instruction sets in the knowledgebase.

In some aspects, the disclosure relates to a method comprising: (a) accessing a knowledgebase that stores portions of comparative instruction sets and portions of anticipatory instruction sets, the knowledgebase comprising a plurality of portions of comparative instruction sets and portions of anticipatory instruction sets, wherein the comparative and the anticipatory instruction sets are part of an application for performing operations on a computing device, the accessing of (a) performed by a processor circuit. The method may further include (b) receiving new instruction sets, wherein the new instruction sets are part of the application for performing operations on the computing device, the receiving of (b) performed by the processor circuit. The method may further include (c) comparing portions of the new instruction sets with portions of the comparative instruction sets in the knowledgebase, the comparing of (c) performed by the processor circuit. The method may further include (d) determining that there is a substantial similarity between one or more new instruction sets and one or more comparative instruction sets in the knowledgebase, the determining of (d) performed by the processor circuit. The method may further include (e) anticipating one or more anticipatory instruction sets in the knowledgebase, the anticipating of (e) performed by the processor circuit.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In some embodiments, the comparative instruction sets include the least recently executed instruction sets of a plurality of previously executed instruction sets and the anticipatory instruction sets include the most recently executed instruction sets of the plurality of previously executed instruction sets, the plurality of previously executed instruction sets comprise instruction sets executed immediately prior to and including an instruction set executed at a past time point. In further embodiments, the portions of comparative instruction sets and portions of anticipatory instruction sets stored in the knowledgebase include the portions of comparative instruction sets followed by the portions of anticipatory instruction sets. In further embodiments, the knowledgebase further stores at least one extra information associated with the comparative instruction sets and at least one extra information associated with the anticipatory instruction sets.

In certain embodiments, the non-transitory computer storage medium and/or the method further comprise: receiving at least one extra information associated with the new instruction sets, the receiving performed by the processor circuit.

In some embodiments, the determining that there is substantial similarity between one or more new instruction sets and one or more comparative instruction sets in the knowledgebase includes finding a match between all but a threshold number of portions of the one or more new instruction sets and all but a threshold number of portions of the one or more comparative instruction sets. In further embodiments, the determining that there is substantial similarity between one or more new instruction sets and one or more comparative instruction sets in the knowledgebase includes finding a match between at least one portion of the one or more new instruction sets and at least one portion of the one or more comparative instruction sets.

In certain embodiments, the non-transitory computer storage medium and/or the method further comprise: comparing at least one extra information associated with the new instruction sets with at least one extra information associated with the comparative instruction sets in the knowledgebase, the comparing performed by the processor circuit. The determining that there is substantial similarity between one or more new instruction sets and one or more comparative instruction sets in the knowledgebase may include finding a match between all but a threshold number of extra information associated with the one or more new instruction sets and all but threshold number of extra information associated with the one or more comparative instruction sets. The determining that there is substantial similarity between one or more new instruction sets and one or more comparative instruction sets in the knowledgebase may include finding a match between the at least one extra information associated with the one or more new instruction sets and the at least one extra information associated with the one or more comparative instruction sets.

In further embodiments, the anticipating the one or more anticipatory instruction sets includes finding one or more comparative instruction sets followed by the one or more anticipatory instruction sets in the knowledgebase.

In certain embodiments, the non-transitory computer storage medium and/or the method further comprise: executing the one or more anticipatory instruction sets by the processor circuit.

In further embodiments, the portions of the comparative instruction sets and the portions of the anticipatory instruction sets may be stored in one or more knowledge cells.

In some aspects, the disclosure relates to a system for autonomous application operating. The system may operate on one or more computing devices. In some embodiments, the system comprises a computing device including a processor circuit that is coupled to a memory unit. The system may further include an application, running on the processor circuit, for performing operations on the computing device. The system may further include an interface configured to receive a first instruction set and a second instruction set, the interface further configured to receive a new instruction set, wherein the first, the second, and the new instruction sets are executed by the processor circuit and are part of the application for performing operations on the computing device. The system may further include a neural network configured to store at least one portion of the first instruction set and at least one portion of the second instruction set, the neural network comprising a plurality of portions of instruction sets. The system may further include a decision-making unit configured to: compare at least one portion of the new instruction set with at least one portion of the first instruction set from the neural network, and determine that there is a substantial similarity between the new instruction set and the first instruction set from the neural network. The processor circuit may be caused to execute the second instruction set from the neural network.

In certain embodiments, the application includes at least one of: a software application, an executable program, a web browser, a word processing application, an operating system, a media application, a global positioning system application, a game application, a robot control application, a database application, a software hardcoded on a chip, or a software hardcoded on a hardware element.

In some embodiments, the first instruction set may be followed by the second instruction set. In further embodiments, the first instruction set includes a comparative instruction set whose portions can be used for comparisons with portions of the new instruction set. In further embodiments, the second instruction set includes an anticipatory instruction set that can be used for anticipation of an instruction set subsequent to the new instruction set.

In certain embodiments, each of the first, the second, and the new instruction set includes one or more commands, keywords, symbols, instructions, operators, variables, values, objects, functions, parameters, characters, digits, or references thereto. In further embodiments, each of the first, the second, and the new instruction set includes a source code, a bytecode, an intermediate code, a compiled code, an interpreted code, a translated code, a runtime code, an assembly code, a structured query language (SQL) code, or a machine code. In further embodiments, each of the first, the second, and the new instruction set includes one or more code segments, lines of code, statements, instructions, functions, routines, subroutines, or basic blocks. In further embodiments, each of the first, the second, and the new instruction set includes an absolute or a relative instruction set.

In some embodiments, the receiving the first, the second, and the new instruction sets includes obtaining the first, the second, and the new instruction sets. In further embodiments, the receiving the first, the second, and the new instruction sets includes receiving the first, the second, and the new instruction sets from the processor circuit as the processor circuit executes them. In further embodiments, the receiving the first, the second, and the new instruction sets includes receiving the first, the second, and the new instruction sets from at least one of: the application, the memory unit, the processor circuit, the computing device, a virtual machine, a runtime engine, a hard drive, a storage device, a peripheral device, a network connected device, or an user. In further embodiments, the receiving the first, the second, and the new instruction sets includes receiving the first, the second, and the new instruction sets at a source code write time, a compile time, an interpretation time, a translation time, a linking time, a loading time, or a runtime. In further embodiments, the receiving the first, the second, and the new instruction sets includes receiving the first, the second, and the new instruction sets used for operating an object of the application. In further embodiments, the receiving the first, the second, and the new instruction sets includes at least one of: tracing, profiling, or instrumentation of the application's a source code, a bytecode, an intermediate code, a compiled code, an interpreted code, a translated code, a runtime code, an assembly code, a structured query language (SQL) code, or a machine code. In further embodiments, the receiving the first, the second, and the new instruction sets includes at least one of: tracing, profiling, or instrumentation of the memory unit, a register of the processor circuit, a storage, or a repository where the application's instruction sets may be stored. In further embodiments, the receiving the first, the second, and the new instruction sets includes at least one of: tracing, profiling, or instrumentation of the application or an object of the application. In further embodiments, the receiving the first, the second, and the new instruction sets includes at least one of: tracing, profiling, or instrumentation of the processor circuit, the computing device, a virtual machine, a runtime engine, an operating system, an execution stack, a program counter, or an element used in running the application. In further embodiments, the receiving the first, the second, and the new instruction sets includes at least one of: tracing, profiling, or instrumentation at a source code write time, a compile time, an interpretation time, a translation time, a linking time, a loading time, or a runtime. In further embodiments, the receiving the first, the second, and the new instruction sets includes at least one of: tracing, profiling, or instrumentation of one or more of the application's code segments, lines of code, statements, instructions, functions, routines, subroutines, or basic blocks. In further embodiments, the receiving the first, the second, and the new instruction sets includes at least one of: tracing, profiling, or instrumentation of an user input. In further embodiments, the receiving the first, the second, and the new instruction sets includes at least one of: a manual, an automatic, a dynamic, or a just in time (JIT) tracing, profiling, or instrumentation of the application. In further embodiments, the receiving the first, the second, and the new instruction sets includes utilizing at least one of: a .NET tool, a .NET application programming interface (API), a Java tool, a Java API, a logging tool, or an independent tool for receiving the application's instruction sets. In further embodiments, the receiving the first, the second, and the new instruction sets includes utilizing an assembly language. In further embodiments, the receiving the first, the second, and the new instruction sets includes a branch tracing, or a simulation tracing.

In some embodiments, the interface may be further configured to receive at least one extra information associated with the first instruction set, at least one extra information associated with the second instruction set, and at least one extra information associated with the new instruction set. The at least one extra information may include one or more of: contextual information, time information, geo-spatial information, environmental information, situational information, observed information, computed information, precomputed information, analyzed information, or inferred information. The at least one extra information include one or more of: an information on an instruction set, an information on the application, an information on an object of the application, an information on the computing device, or an information on an user. The at least one extra information may include one or more of: a time stamp, an user specific information, a group specific information, a version of the application, a type of the application, a type of the computing device, or a type of an user. The at least one extra information may include one or more of: a text property, a text formatting, a preceding text, or a subsequent text. The at least one extra information may include one or more of: a location, a direction, a type, a speed, or a posture of an object of the application. The at least one extra information may include one or more of: a relationship, a distance, or an allegiance of an object of the application relative to another object of the application. The at least one extra information may include an information on an object of the application within an area of interest. The receiving the at least one extra information may include associating an importance with an extra information. The neural network may be further configured to store the at least one extra information.

In certain embodiments, the interface may be further configured to modify the application. The modifying the application may include redirecting the application's execution to one or more alternate instruction sets, the alternate instruction sets comprising an anticipatory instruction set. The modifying the application may include redirecting the application's execution to the second instruction set. The modifying the application may include causing the processor circuit to execute the second instruction set instead of or prior to an instruction set that would have followed the new instruction set. The modifying the application may include modifying one or more instruction sets of the application. The modifying the application may include modifying at least one of the application's: a source code, a bytecode, an intermediate code, a compiled code, an interpreted code, a translated code, a runtime code, an assembly code, or a machine code. The modifying the application may include modifying at least one of: the memory unit, a register of the processor circuit, a storage, or a repository where the application's instruction sets may be stored. The modifying the application may include modifying instruction sets used for operating an object of the application. The modifying the application may include modifying at least one of: an element of the processor circuit, an element of the computing device, a virtual machine, a runtime engine, an operating system, an execution stack, a program counter, or an user input used in running the application. The modifying the application may include modifying the application at a source code write time, a compile time, an interpretation time, a translation time, a linking time, a loading time, or a runtime. The modifying the application may include modifying one or more of the application's code segments, lines of code, statements, instructions, functions, routines, subroutines, or basic blocks. The modifying the application may include a manual, an automatic, a dynamic, or a just in time (JIT) instrumentation of the application. The modifying the application may include utilizing one or more of a .NET tool, a .NET application programming interface (API), a Java tool, a Java API, an operating system tool, or an independent tool for modifying the application. The modifying the application may include utilizing at least one of: a dynamic, an interpreted, or a scripting programming language. The modifying the application may include utilizing at least one of: a dynamic code, a dynamic class loading, or a reflection. The modifying the application may include utilizing an assembly language. The modifying the application may include utilizing at least one of: a metaprogramming, a self-modifying code, or an application modification tool. The modifying the application may include utilizing at least one of: just in time (JIT) compiling, JIT interpretation, JIT translation, dynamic recompiling, or binary rewriting. The modifying the application may include utilizing at least one of: a dynamic expression creation, a dynamic expression execution, a dynamic function creation, or a dynamic function execution. The modifying the application may include adding or inserting additional code into the application code. The modifying the application may include at least one of: modifying, removing, rewriting, or overwriting the application code. The modifying the application may include at least one of: branching, redirecting, extending, or hot swapping the application code. The branching or redirecting the application code may include inserting at least one of: a branch, a jump, a trampoline, a trap, or a system for redirecting the application execution. In further embodiments, the interface may be part of, operating on, or coupled with the processor circuit.

In certain embodiments, the first instruction set includes a comparative instruction set whose stored portions can be used for comparisons with portions of the new instruction set, and the second instruction set includes an anticipatory instruction set whose stored portions can be used for anticipation of an instruction set subsequent to the new instruction set. In further embodiments, a portion of the first, the second, or the new instruction set includes one or more commands, keywords, symbols, instructions, operators, variables, values, objects, functions, parameters, characters, digits, or references thereto.

In some embodiments, the neural network includes a plurality of nodes interconnected by one or more connections. A node may include one or more instruction sets, portions of an instruction set, data structures, objects, or data. A connection may include an occurrence count and weight. The occurrence count may comprise the number of observations that an instruction set included in one node was followed by an instruction set included in another node. The occurrence count may comprise the number of observations that an instruction set included in one node was preceded by an instruction set included in another node. The weight may include the number of occurrences of one connection originating from a node divided by a sum of occurrences of all connections originating from the node. The weight may include the number of occurrences of one connection pointing to a node divided by a sum of occurrences of all connections pointing to the node. The neural network may include at least one layer, each layer comprising one or more nodes.

In certain embodiments, the neural network includes one or more comparative layers and one or more anticipatory layers. The storing the at least one portion of the first instruction set and the at least one portion of the second instruction set into the neural network may include storing the at least one portion of the first instruction set into a node of a comparative layer of the neural network and the at least one portion of the second instruction set into a node of an anticipatory layer of the neural network. The comparative layer may be followed the anticipatory layer. One or more nodes of successive layers may be interconnected by connections. The one or more comparative layers may include one or more nodes comprising at least one portion of one or more least recently executed instruction sets from a plurality of recently executed instruction sets. The one or more anticipatory layers may include one or more nodes comprising at least one portion of one or more most recently executed instruction sets from a plurality of recently executed instruction sets.

In some embodiments, the storing the at least one portion of the first instruction set and the at least one portion of the second instruction set includes storing the at least one portion of the first instruction set followed by the at least one portion of the second instruction set.

In certain embodiments, the storing the at least one portion of the first instruction set and the at least one portion of the second instruction set into the neural network includes storing the at least one portion of the first instruction set into a first node of the neural network and the at least one portion of the second instruction set into a second node of the neural network. The first node and the second node may be connected by a connection. The first node may be part of a first layer of the neural network and the second node may be part of a second layer of the neural network. The first layer may be followed by the second layer. The first layer may include a comparative layer and the second layer includes an anticipatory layer.

In some embodiments, the storing the at least one portion of the first instruction set and the at least one portion of the second instruction set into the neural network includes applying the at least one portion of the first instruction set and the at least one portion of the second instruction set onto the neural network.

In certain embodiments, the neural network includes a remote or a global neural network operating on a remote computing device. In further embodiments, the neural network includes one or more user specific or group specific neural networks. In further embodiments, the neural network includes an artificial intelligence system for knowledge structuring, storing, or representation. The artificial intelligence system for knowledge structuring, storing, or representation may include at least one of: a deep learning system, a supervised learning system, an unsupervised learning system, a feed-forward neural network, a back-propagating neural network, a recurrent neural network, a convolutional neural network, a custom neural network, a search-based system, an optimization-based system, a logic-based system, a fuzzy logic-based system, a tree-based system, a graph-based system, a hierarchical system, a symbolic system, a sub-symbolic system, an evolutionary system, a genetic system, a multi-agent system, a deterministic system, a probabilistic system, or a statistical system. In further embodiments, the neural network includes a user's knowledge, style, or methodology of operating the application or an object of the application. In further embodiments, the plurality of portions of instruction sets in the neural network include portions of instruction sets received from a plurality of memory units, processor circuits, computing devices, virtual machines, runtime engines, hard drives, storage devices, peripheral devices, network connected devices, or users via a plurality of interfaces.

In some embodiments, the neural network may be further configured to store at least one extra information associated with the first instruction set and at least one extra information associated with the second instruction set. The at least one extra information associated with the first instruction set may be stored in a same node of the neural network as the at least one portion of the first instruction set and the at least one extra information associated with the second instruction set may be stored in a same node of the neural network as the at least one portion of the second instruction set.

In certain embodiments, the neural network may be further configured to store an importance associated with the first instruction set and an importance associated with the second instruction set. In further embodiments, the neural network may be part of, operating on, or coupled with the processor circuit.

In some embodiments, the comparing the at least one portion of the new instruction set with the at least one portion of the first instruction set from the neural network may be part of comparing at least one portion of the new instruction set with at least one portion of instruction sets stored in nodes of one or more comparative layers of the neural network. The instruction sets stored in nodes of one or more comparative layers of the neural network may include the first instruction set. In further embodiments, the comparing the at least one portion of the new instruction set with the at least one portion of the first instruction set from the neural network includes comparing the portions of their respective instruction sets as separate strings of characters. In further embodiments, the comparing the at least one portion of the new instruction set with the at least one portion of the first instruction set from the neural network includes comparing the portions of their respective instruction sets as combined strings of characters. In further embodiments, the comparing the at least one portion of the new instruction set with the at least one portion of the first instruction set from the neural network includes comparing the portions comprising numeric values as numbers. In further embodiments, the comparing the at least one portion of the new instruction set with the at least one portion of the first instruction set from the neural network includes comparing the portions factoring in an importance of one or more of the portions. In further embodiments, the comparing the at least one portion of the new instruction set with the at least one portion of the first instruction set from the neural network includes comparing the portions factoring in semantically equivalent variations of one or more of the portions. In further embodiments, the comparing the at least one portion of the new instruction set with the at least one portion of the first instruction set from the neural network includes comparing the portions factoring in a rating of one or more of the instruction sets. In further embodiments, the comparing the at least one portion of the new instruction set with the at least one portion of the first instruction set from the neural network includes comparing an order of a portion of the new instruction set with an order of a portion of an instruction set from the neural network. In further embodiments, the comparing the at least one portion of the new instruction set with the at least one portion of the first instruction set from the neural network may be part of a substantial similarity comparison of the new instruction set with the instruction sets from the neural network. The substantial similarity comparison may include a comparison strictness function for adjusting a strictness of the comparison.

In some embodiments, the determining that there is a substantial similarity between the new instruction set and the first instruction set from the neural network includes finding a match between all but a threshold number of portions of the new instruction set and all but a threshold number of portions of the first instruction set from the neural network. In further embodiments, the determining that there is a substantial similarity between the new instruction set and the first instruction set from the neural network includes finding a match between at least one portion of the new instruction set and at least one portion of the first instruction set from the neural network. In further embodiments, the determining that there is a substantial similarity between the new instruction set and the first instruction set from the neural network includes finding a match between important portions of the new instruction set and important portions of the first instruction set from the neural network. In further embodiments, the determining that there is a substantial similarity between the new instruction set and the first instruction set from the neural network includes determining that there is a substantial similarity between at least one portion of the new instruction set and at least one portion of the first instruction set from the neural network.

In certain embodiments, the decision-making unit may be further configured to compare at least one extra information associated with the new instruction set with at least one extra information associated with the first instruction set from the neural network. The determining that there is a substantial similarity between the new instruction set and the first instruction set from the neural network may include finding a match between all but a threshold number of extra information associated with the new instruction set and all but a threshold number of extra information associated with the first instruction set from the neural network. The determining that there is a substantial similarity between the new instruction set and the first instruction set from the neural network may include finding a match between at least one extra information associated with the new instruction set and at least one extra information associated with the first instruction set from the neural network.

In some embodiments, the decision-making unit may be further configured to anticipate the second instruction set. The anticipating the second instruction set may include finding a node of the neural network comprising at least one portion of the first instruction set and a node of the neural network comprising at least one portion of the second instruction set, the nodes comprising the at least one portion of the first and the second instruction sets connected by a highest weight connection. The anticipating the second instruction set may include selecting a path of nodes of the neural network, the nodes connected by one or more connections and including a node comprising at least one portion of the first instruction set followed by a node comprising at least one portion of the second instruction set. The anticipating the second instruction set may include inferring that the second instruction set is an instruction set to be executed following the new instruction set. The anticipating the second instruction set may include causing the processor circuit to execute the second instruction set prior to an instruction set that would have followed the new instruction set.

In certain embodiments, the decision-making unit may be further configured to generate a comparison accuracy index, the comparison accuracy index indicating a similarity between the new instruction set and the first instruction set from the neural network.

In some embodiments, the decision-making unit may be further configured to analyze a contextual information, the contextual information including at least one of: information about the first, the second, or the new instruction set, information about the application or an object of the application, information about the computing device, or information useful in the comparing the at least one portion of the new instruction set with the at least one portion of the first instruction set from the neural network. In further embodiments, the decision-making unit may be part of, operating on, or coupled with the processor circuit.

In certain embodiments, the executing the second instruction set from the neural network includes performing an operation defined by the second instruction set from the neural network. An operation defined by the second instruction set from the neural network may include at least one of: an operation of a forms-based application, an operation of a web browser, an operation of an operating system, an operation of a word processing application, an operation of a media application, an operation of a global positioning system (GPS) application, an operation of a game application, an operation of a robot control application, or an operation of a database application. In further embodiments, the executing the second instruction set from the neural network includes executing the second instruction set from the neural network in response to the determining that there is a substantial similarity between the new instruction set and the first instruction set from the neural network. In further embodiments, the executing the second instruction set from the neural network includes implementing a user's knowledge, style, or methodology of operating the application or an object of the application, the user's knowledge, style, or methodology of operating the application or an object of the application represented by the instructions sets stored in the neural network. In further embodiments, the executing the second instruction set from the neural network includes executing a modified second instruction set from the neural network. In further embodiments, the executing the second instruction set from the neural network includes executing an external application or process.

In some embodiments, the system further comprises: a command disassembler configured to disassemble the first, the second, and the new instruction sets into their portions. The disassembling the first, the second, and the new instruction sets into their portions may include identifying at least one of a command, a keyword, a symbol, an instruction, an operator, a variable, a value, an object, a function, a parameter, a character, or a digit of the first, the second, and the new instruction sets as a portion. The disassembling the first, the second, and the new instruction sets into their portions may include identifying types of the first, the second, and the new instruction sets. The disassembling the first, the second, and the new instruction sets into their portions may include associating an importance with a portion of the first, the second, and the new instruction sets. In further embodiments, the command disassembler may be part of, operating on, or coupled with the processor circuit.

In certain embodiments, the system further comprises: a modifier configured to modify the second instruction set. The modifying the second instruction set may include replacing at least one portion of the second instruction set with at least one portion of the first, the new, or an another instruction set. The modifying the second instruction set may include replacing at least one portion of the second instruction set with at least one of: a command, a keyword, a symbol, an instruction, an operator, a variable, a value, an object, a function, a parameter, a character, or a digit from the first, the new, or an another instruction set. The modifying the second instruction set may include replacing at least one portion of the second instruction set with at least one extra information associated with the first, the new, or an another instruction set. The modifying the second instruction set may include replacing at least one portion of the second instruction set with a contextual information, a time information, a geo-spatial information, an environmental information, a situational information, an observed information, a computed information, a pre-computed information, an analyzed information, or an inferred information. The modifying the second instruction set may include replacing at least one portion of the second instruction set with information derived from projecting a path, a movement, a trajectory, or a pattern in portions of one or more of the first, the new, or an another instruction set. The modifying the second instruction set may include replacing at least one portion of the second instruction set with semantically equivalent variations of at least one portion of the first, the new, or an another instruction set. The modifying the second instruction set may include replacing the second instruction set with an instruction set generated by a non-UAIE system or process. In further embodiments, the modifier may be part of, operating on, or coupled with the processor circuit.

In some embodiments, the system further comprises: a display configured to display the second instruction set as an option to be selected, modified, or canceled by a user. The displaying the second instruction set as an option to be selected, modified, or canceled by a user may include displaying a comparison accuracy indicating a similarity between the new instruction set and the first instruction set from the neural network. The second instruction set may include a previously modified second instruction set.

In certain embodiments, the system further comprises: a rating system configured to rate the executed second instruction set. The rating the executed second instruction set may include displaying the executed second instruction set along with one or more rating values as options to be selected by a user. The rating the executed second instruction set may include automatically rating the executed second instruction set. The rating the executed second instruction set may include associating a rating value with the executed second instruction set and storing the rating value in the neural network. The executed second instruction set may include a previously modified second instruction set. In further embodiments, the rating system may be part of, operating on, or coupled with the processor circuit.

In some embodiments, the system further comprises: a cancelation system configured to cancel the execution of the executed second instruction set. The canceling the execution of the executed second instruction set may include displaying the executed second instruction set as an option to be selected for cancelation by a user. The canceling the execution of the executed second instruction set may include associating a cancelation with the executed second instruction set and storing the cancelation in the neural network. The canceling the execution of the executed second instruction set may include restoring the computing device to a prior state. The restoring the computing device to a prior state may include saving the state of the computing device prior to executing the second instruction set. The executed second instruction set may include a previously modified second instruction set. In further embodiments, the cancelation system may be part of, operating on, or coupled with the processor circuit.

In certain embodiments, the system further comprises: a command assembler configured to assemble the second instruction set from its portions. In further embodiments, the command assembler may be part of, operating on, or coupled with the processor circuit.

In some embodiments, the system further comprises: a knowledge structuring unit configured to cause the storing of the at least one portion of the first instruction set and the at least one portion of the second instruction set into the neural network. In further embodiments, the knowledge structuring unit may be part of, operating on, or coupled with the processor circuit.

In certain embodiments, the system further comprises: an universal artificial intelligence engine (UAIE) for autonomous application operating. The UAIE may comprise at least one of: the interface, the neural network, the decision-making unit, a command disassembler, a collection of recently executed instruction sets, a knowledge structuring unit, a modifier, a command assembler, a rating system, or a cancelation system. In further embodiments, the autonomous application operating includes a partially or a fully autonomous application operating. The partially autonomous application operating may include executing the second instruction set or a modified second instruction set responsive to a confirmation by a user. The fully autonomous application operating may include executing the second instruction set or a modified second instruction set without a confirmation. In further embodiments, the autonomous application operating includes executing one or more instruction sets generated by the UAIE. The one or more instruction sets generated by the UAIE may include the second instruction set or a modified second instruction set. The one or more instruction sets generated by the UAIE may include one or more instruction sets for operating the application or an object of the application. The one or more instruction sets generated by the UAIE may include one or more instruction sets stored in the neural network. In further embodiments, the autonomous application operating includes automatic or auto-pilot operating. The automatic or auto-pilot operating may include executing one or more instruction sets generated by the UAIE. In further embodiments, the autonomous application operating includes executing one or more instruction sets generated by a non-UAIE system or process.

In some embodiments, the UAIE includes an UAIE that operates independently from the computing device. In further embodiments, the UAIE includes an UAIE attachable to the computing device. In further embodiments, the UAIE includes an UAIE built into the computing device. In further embodiments, the UAIE includes an UAIE that operates independently from the application. In further embodiments, the UAIE includes an UAIE attachable to the application. In further embodiments, the UAIE includes an UAIE built into the application. In further embodiments, the UAIE includes an UAIE provided as a feature of the computing device's operating system. In further embodiments, the application includes an application running on the computing device and the UAIE includes an UAIE running on a remote computing device. In further embodiments, the UAIE includes an UAIE running on the computing device and the application includes an application running on a remote computing device. In further embodiments, the UAIE includes a remote or a global UAIE operating on a remote computing device. In further embodiments, the UAIE may be configured to load one or more instruction sets into the neural network. In further embodiments, the UAIE may be configured to load one or more neural networks into the UAIE. In further embodiments, the UAIE may be configured to take control from, share control with, or release control to the application or an object of the application. In further embodiments, the UAIE may be configured to learn a user's knowledge, style, or methodology of operating the application or an object of the application. The learning a user's knowledge, style, or methodology of operating the application or an object of the application may include storing the at least one portion of the first instruction set and the at least one portion of the second instruction set into the neural network. In further embodiments, the UAIE may be part of, operating on, or coupled with the processor circuit.

In some aspects, the disclosure relates to a non-transitory computer storage medium having a computer program stored thereon, the program comprising instructions that when executed by one or more computing devices cause the one or more computing devices to perform operations comprising: receiving a first instruction set and a second instruction set, wherein the first and the second instruction sets are executed by a processor circuit and are part of an application for performing operations on a computing device. The operations may further include storing at least one portion of the first instruction set and at least one portion of the second instruction set into a neural network, the neural network comprising a plurality of portions of instruction sets. The operations may further include receiving a new instruction set, wherein the new instruction set is executed by the processor circuit and is part of the application for performing operations on the computing device. The operations may further include comparing at least one portion of the new instruction set with at least one portion of the first instruction set from the neural network. The operations may further include determining that there is a substantial similarity between the new instruction set and the first instruction set from the neural network. The operations may further include causing the processor circuit to execute the second instruction set from the neural network.

In some aspects, the disclosure relates to a method comprising: (a) receiving, by a processor circuit via an interface, a first instruction set and a second instruction set, wherein the first and the second instruction sets are executed by the processor circuit and are part of an application for performing operations on a computing device. The method may further include (b) storing at least one portion of the first instruction set and at least one portion of the second instruction set into a neural network, the neural network comprising a plurality of portions of instruction sets, the storing of (b) caused by the processor circuit. The method may further include (c) receiving, by the processor circuit via the interface, a new instruction set, wherein the new instruction set is executed by the processor circuit and is part of the application for performing operations on the computing device. The method may further include (d) comparing at least one portion of the new instruction set with at least one portion of the first instruction set from the neural network, the comparing of (d) performed by the processor circuit. The method may further include (e) determining that there is a substantial similarity between the new instruction set and the first instruction set from the neural network, the determining of (e) performed by the processor circuit. The method may further include executing the second instruction set from the neural network by the processor circuit.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In some embodiments, the application includes at least one of: a software application, an executable program, a web browser, a word processing application, an operating system, a media application, a global positioning system application, a game application, a robot control application, a database application, a software hardcoded on a chip, or a software hardcoded on a hardware element.

In certain embodiments, the first instruction set may be followed by the second instruction set. In further embodiments, the first instruction set includes a comparative instruction set whose portions can be used for comparisons with portions of the new instruction set. In further embodiments, the second instruction set includes an anticipatory instruction set that can be used for anticipation of an instruction set subsequent to the new instruction set.

In some embodiments, each of the first, the second, and the new instruction set includes one or more commands, keywords, symbols, instructions, operators, variables, values, objects, functions, parameters, characters, digits, or references thereto. In further embodiments, each of the first, the second, and the new instruction set includes a source code, a bytecode, an intermediate code, a compiled code, an interpreted code, a translated code, a runtime code, an assembly code, a structured query language (SQL) code, or a machine code. In further embodiments, each of the first, the second, and the new instruction set includes one or more code segments, lines of code, statements, instructions, functions, routines, subroutines, or basic blocks. In further embodiments, each of the first, the second, and the new instruction set includes an absolute or a relative instruction set.

In certain embodiments, the receiving the first, the second, and the new instruction sets includes obtaining the first, the second, and the new instruction sets. In further embodiments, the receiving the first, the second, and the new instruction sets includes receiving the first, the second, and the new instruction sets from the processor circuit as the processor circuit executes them. In further embodiments, the receiving the first, the second, and the new instruction sets includes receiving the first, the second, and the new instruction sets from at least one of: the application, the memory unit, the processor circuit, the computing device, a virtual machine, a runtime engine, a hard drive, a storage device, a peripheral device, a network connected device, or an user. In further embodiments, the receiving the first, the second, and the new instruction sets includes receiving the first, the second, and the new instruction sets at a source code write time, a compile time, an interpretation time, a translation time, a linking time, a loading time, or a runtime. In further embodiments, the receiving the first, the second, and the new instruction sets includes receiving the first, the second, and the new instruction sets used for operating an object of the application. In further embodiments, the receiving the first, the second, and the new instruction sets includes at least one of: tracing, profiling, or instrumentation of the application's a source code, a bytecode, an intermediate code, a compiled code, an interpreted code, a translated code, a runtime code, an assembly code, a structured query language (SQL) code, or a machine code. In further embodiments, the receiving the first, the second, and the new instruction sets includes at least one of: tracing, profiling, or instrumentation of the memory unit, a register of the processor circuit, a storage, or a repository where the application's instruction sets may be stored. In further embodiments, the receiving the first, the second, and the new instruction sets includes at least one of: tracing, profiling, or instrumentation of the application or an object of the application. In further embodiments, the receiving the first, the second, and the new instruction sets includes at least one of: tracing, profiling, or instrumentation of the processor circuit, the computing device, a virtual machine, a runtime engine, an operating system, an execution stack, a program counter, or an element used in running the application. In further embodiments, the receiving the first, the second, and the new instruction sets includes at least one of: tracing, profiling, or instrumentation at a source code write time, a compile time, an interpretation time, a translation time, a linking time, a loading time, or a runtime. In further embodiments, the receiving the first, the second, and the new instruction sets includes at least one of: tracing, profiling, or instrumentation of one or more of the application's code segments, lines of code, statements, instructions, functions, routines, subroutines, or basic blocks. In further embodiments, the receiving the first, the second, and the new instruction sets includes at least one of: tracing, profiling, or instrumentation of an user input. In further embodiments, the receiving the first, the second, and the new instruction sets includes at least one of: a manual, an automatic, a dynamic, or a just in time (JIT) tracing, profiling, or instrumentation of the application. In further embodiments, the receiving the first, the second, and the new instruction sets includes utilizing at least one of: a .NET tool, a .NET application programming interface (API), a Java tool, a Java API, a logging tool, or an independent tool for receiving the application's instruction sets. In further embodiments, the receiving the first, the second, and the new instruction sets includes utilizing an assembly language. In further embodiments, the receiving the first, the second, and the new instruction sets includes a branch tracing, or a simulation tracing.

In certain embodiments, the non-transitory computer storage medium and/or the method further comprise: receiving at least one extra information associated with the first instruction set, at least one extra information associated with the second instruction set, and at least one extra information associated with the new instruction set. The at least one extra information may include one or more of: contextual information, time information, geo-spatial information, environmental information, situational information, observed information, computed information, pre-computed information, analyzed information, or inferred information. The at least one extra information may include one or more of: an information on an instruction set, an information on the application, an information on an object of the application, an information on the computing device, or an information on an user. The at least one extra information may include one or more of: a time stamp, an user specific information, a group specific information, a version of the application, a type of the application, a type of the computing device, or a type of an user. The at least one extra information may include one or more of: a text property, a text formatting, a preceding text, or a subsequent text. The at least one extra information may include one or more of: a location, a direction, a type, a speed, or a posture of an object of the application. The at least one extra information may include one or more of: a relationship, a distance, or an allegiance of an object of the application relative to another object of the application. The at least one extra information may include an information on an object of the application within an area of interest. The receiving the at least one extra information may include associating an importance with an extra information. In further embodiments, the non-transitory computer storage medium and/or the method further comprise: storing the at least one extra information into the neural network.

In some embodiments, the non-transitory computer storage medium and/or the method further comprise: modifying the application. The modifying the application may include redirecting the application's execution to one or more alternate instruction sets, the alternate instruction sets comprising an anticipatory instruction set. The modifying the application may include redirecting the application's execution to the second instruction set. The modifying the application may include causing the processor circuit to execute the second instruction set instead of or prior to an instruction set that would have followed the new instruction set. The modifying the application may include modifying one or more instruction sets of the application. The modifying the application may include modifying at least one of the application's: a source code, a bytecode, an intermediate code, a compiled code, an interpreted code, a translated code, a runtime code, an assembly code, or a machine code. The modifying the application may include modifying at least one of: the memory unit, a register of the processor circuit, a storage, or a repository where the application's instruction sets may be stored. The modifying the application may include modifying instruction sets used for operating an object of the application. The modifying the application may include modifying at least one of: an element of the processor circuit, an element of the computing device, a virtual machine, a runtime engine, an operating system, an execution stack, a program counter, or an user input used in running the application. The modifying the application may include modifying the application at a source code write time, a compile time, an interpretation time, a translation time, a linking time, a loading time, or a runtime. The modifying the application may include modifying one or more of the application's code segments, lines of code, statements, instructions, functions, routines, subroutines, or basic blocks. The modifying the application may include a manual, an automatic, a dynamic, or a just in time (JIT) instrumentation of the application. The modifying the application may include utilizing one or more of a .NET tool, a .NET application programming interface (API), a Java tool, a Java API, an operating system tool, or an independent tool for modifying the application. The modifying the application may include utilizing at least one of: a dynamic, an interpreted, or a scripting programming language. The modifying the application may include utilizing at least one of: a dynamic code, a dynamic class loading, or a reflection. The modifying the application may include utilizing an assembly language. The modifying the application may include utilizing at least one of: a metaprogramming, a self-modifying code, or an application modification tool. The modifying the application may include utilizing at least one of: just in time (JIT) compiling, JIT interpretation, JIT translation, dynamic recompiling, or binary rewriting. The modifying the application may include utilizing at least one of: a dynamic expression creation, a dynamic expression execution, a dynamic function creation, or a dynamic function execution. The modifying the application may include adding or inserting additional code into the application code. The modifying the application may include at least one of: modifying, removing, rewriting, or overwriting the application code. The modifying the application may include at least one of: branching, redirecting, extending, or hot swapping the application code. The branching or redirecting the application code may include inserting at least one of: a branch, a jump, a trampoline, a trap, or a system for redirecting the application execution. The modifying the application may be performed by the processor circuit.

In some embodiments, the first instruction set includes a comparative instruction set whose stored portions can be used for comparisons with portions of the new instruction set, and the second instruction set includes an anticipatory instruction set whose stored portions can be used for anticipation of an instruction set subsequent to the new instruction set. In further embodiments, a portion of the first, the second, or the new instruction set includes one or more commands, keywords, symbols, instructions, operators, variables, values, objects, functions, parameters, characters, digits, or references thereto.

In certain embodiments, the neural network includes a plurality of nodes interconnected by one or more connections. A node may include one or more instruction sets, portions of an instruction set, data structures, objects, or data. A connection may include an occurrence count and weight. The occurrence count may comprise the number of observations that an instruction set included in one node was followed by an instruction set included in another node. The occurrence count may comprise the number of observations that an instruction set included in one node was preceded by an instruction set included in another node. The weight may include the number of occurrences of one connection originating from a node divided by a sum of occurrences of all connections originating from the node. The weight may include the number of occurrences of one connection pointing to a node divided by a sum of occurrences of all connections pointing to the node. The neural network may include at least one layer, each layer comprising one or more nodes.

In some embodiments, the neural network includes one or more comparative layers and one or more anticipatory layers. The storing the at least one portion of the first instruction set and the at least one portion of the second instruction set into the neural network may include storing the at least one portion of the first instruction set into a node of a comparative layer of the neural network and the at least one portion of the second instruction set into a node of an anticipatory layer of the neural network. The comparative layer may be followed the anticipatory layer. One or more nodes of successive layers may be interconnected by connections. The one or more comparative layers may include one or more nodes comprising at least one portion of one or more least recently executed instruction sets from a plurality of recently executed instruction sets. The one or more anticipatory layers may include one or more nodes comprising at least one portion of one or more most recently executed instruction sets from a plurality of recently executed instruction sets.

In certain embodiments, the storing the at least one portion of the first instruction set and the at least one portion of the second instruction set may include storing the at least one portion of the first instruction set followed by the at least one portion of the second instruction set.

In some embodiments, the storing the at least one portion of the first instruction set and the at least one portion of the second instruction set into the neural network includes storing the at least one portion of the first instruction set into a first node of the neural network and the at least one portion of the second instruction set into a second node of the neural network. The first node and the second node may be connected by a connection. The first node may be part of a first layer of the neural network and the second node may be part of a second layer of the neural network. The first layer may be followed by the second layer. The first layer may include a comparative layer and the second layer may include an anticipatory layer.

In certain embodiments, the storing the at least one portion of the first instruction set and the at least one portion of the second instruction set into the neural network includes applying the at least one portion of the first instruction set and the at least one portion of the second instruction set onto the neural network.

In some embodiments, the neural network includes a remote or a global neural network operating on a remote computing device. In further embodiments, the neural network includes one or more user specific or group specific neural networks. In further embodiments, the neural network includes an artificial intelligence system for knowledge structuring, storing, or representation. The artificial intelligence system for knowledge structuring, storing, or representation may include at least one of: a deep learning system, a supervised learning system, an unsupervised learning system, a feed-forward neural network, a back-propagating neural network, a recurrent neural network, a convolutional neural network, a custom neural network, a search-based system, an optimization-based system, a logic-based system, a fuzzy logic-based system, a tree-based system, a graph-based system, a hierarchical system, a symbolic system, a sub-symbolic system, an evolutionary system, a genetic system, a multi-agent system, a deterministic system, a probabilistic system, or a statistical system. In further embodiments, the neural network includes a user's knowledge, style, or methodology of operating the application or an object of the application. In further embodiments, the plurality of portions of instruction sets in the neural network include portions of instruction sets received from a plurality of memory units, processor circuits, computing devices, virtual machines, runtime engines, hard drives, storage devices, peripheral devices, network connected devices, or users via a plurality of interfaces.

In certain embodiments, the non-transitory computer storage medium and/or the method further comprise: storing at least one extra information associated with the first instruction set and at least one extra information associated with the second instruction set into the neural network. The at least one extra information associated with the first instruction set may be stored in a same node of the neural network as the at least one portion of the first instruction set and the at least one extra information associated with the second instruction set may be stored in a same node of the neural network as the at least one portion of the second instruction set.

In certain embodiments, the non-transitory computer storage medium and/or the method further comprise: storing an importance associated with the first instruction set and an importance associated with the second instruction set into the neural network.

In some embodiments, the comparing the at least one portion of the new instruction set with the at least one portion of the first instruction set from the neural network may be part of comparing at least one portion of the new instruction set with at least one portion of instruction sets stored in nodes of one or more comparative layers of the neural network. The instruction sets stored in nodes of one or more comparative layers of the neural network may include the first instruction set. In further embodiments, the comparing the at least one portion of the new instruction set with the at least one portion of the first instruction set from the neural network includes comparing the portions of their respective instruction sets as separate strings of characters. In further embodiments, the comparing the at least one portion of the new instruction set with the at least one portion of the first instruction set from the neural network includes comparing the portions of their respective instruction sets as combined strings of characters. In further embodiments, the comparing the at least one portion of the new instruction set with the at least one portion of the first instruction set from the neural network includes comparing the portions comprising numeric values as numbers. In further embodiments, the comparing the at least one portion of the new instruction set with the at least one portion of the first instruction set from the neural network includes comparing the portions factoring in an importance of one or more of the portions. In further embodiments, the comparing the at least one portion of the new instruction set with the at least one portion of the first instruction set from the neural network includes comparing the portions factoring in semantically equivalent variations of one or more of the portions. In further embodiments, the comparing the at least one portion of the new instruction set with the at least one portion of the first instruction set from the neural network includes comparing the portions factoring in a rating of one or more of the instruction sets. In further embodiments, the comparing the at least one portion of the new instruction set with the at least one portion of the first instruction set from the neural network includes comparing an order of a portion of the new instruction set with an order of a portion of an instruction set from the neural network. In further embodiments, the comparing the at least one portion of the new instruction set with the at least one portion of the first instruction set from the neural network may be part of a substantial similarity comparison of the new instruction set with the instruction sets from the neural network. The substantial similarity comparison may include a comparison strictness function for adjusting a strictness of the comparison.

In certain embodiments, the determining that there is a substantial similarity between the new instruction set and the first instruction set from the neural network includes finding a match between all but a threshold number of portions of the new instruction set and al but a threshold number of portions of the first instruction set from the neural network. In further embodiments, the determining that there is a substantial similarity between the new instruction set and the first instruction set from the neural network includes finding a match between at least one portion of the new instruction set and at least one portion of the first instruction set from the neural network. In further embodiments, the determining that there is a substantial similarity between the new instruction set and the first instruction set from the neural network includes finding a match between important portions of the new instruction set and important portions of the first instruction set from the neural network. In further embodiments, the determining that there is a substantial similarity between the new instruction set and the first instruction set from the neural network includes determining that there is a substantial similarity between at least one portion of the new instruction set and at least one portion of the first instruction set from the neural network.

In certain embodiments, the non-transitory computer storage medium and/or the method further comprise: comparing at least one extra information associated with the new instruction set with at least one extra information associated with the first instruction set from the neural network. The determining that there is a substantial similarity between the new instruction set and the first instruction set from the neural network may include finding a match between all but a threshold number of extra information associated with the new instruction set and all but a threshold number of extra information associated with the first instruction set from the neural network. The determining that there is a substantial similarity between the new instruction set and the first instruction set from the neural network may include finding a match between at least one extra information associated with the new instruction set and at least one extra information associated with the first instruction set from the neural network.

In some embodiments, the non-transitory computer storage medium and/or the method further comprise: anticipating the second instruction set. The anticipating the second instruction set may include finding a node of the neural network comprising at least one portion of the first instruction set and a node of the neural network comprising at least one portion of the second instruction set, the nodes comprising the at least one portion of the first and the second instruction sets connected by a highest weight connection. The anticipating the second instruction set may include selecting a path of nodes of the neural network, the nodes connected by one or more connections and including a node comprising at least one portion of the first instruction set followed by a node comprising at least one portion of the second instruction set. The anticipating the second instruction set may include inferring that the second instruction set is an instruction set to be executed following the new instruction set. The anticipating the second instruction set may include causing the processor circuit to execute the second instruction set prior to an instruction set that would have followed the new instruction set. The anticipating the second instruction set may be performed by the processor circuit.

In certain embodiments, the non-transitory computer storage medium and/or the method further comprise: generating a comparison accuracy index, the comparison accuracy index indicating a similarity between the new instruction set and the first instruction set from the neural network.

In some embodiments, the non-transitory computer storage medium and/or the method further comprise: analyzing a contextual information, the contextual information including at least one of: information about the first, the second, or the new instruction set, information about the application or an object of the application, information about the computing device, or information useful in the comparing the at least one portion of the new instruction set with the at least one portion of the first instruction set from the neural network.

In certain embodiments, the executing the second instruction set from the neural network includes performing an operation defined by the second instruction set from the neural network. An operation defined by the second instruction set from the neural network may include at least one of: an operation of a forms-based application, an operation of a web browser, an operation of an operating system, an operation of a word processing application, an operation of a media application, an operation of a global positioning system (GPS) application, an operation of a game application, an operation of a robot control application, or an operation of a database application. In further embodiments, the executing the second instruction set from the neural network includes executing the second instruction set from the neural network in response to the determining that there is a substantial similarity between the new instruction set and the first instruction set from the neural network. In further embodiments, the executing the second instruction set from the neural network includes implementing a user's knowledge, style, or methodology of operating the application or an object of the application, the user's knowledge, style, or methodology of operating the application or an object of the application represented by the instructions sets stored in the neural network. In further embodiments, the executing the second instruction set from the neural network includes executing a modified second instruction set from the neural network. In further embodiments, the executing the second instruction set from the neural network includes executing an external application or process.

In certain embodiments, the non-transitory computer storage medium and/or the method further comprise: disassembling the first, the second, and the new instruction sets into their portions. The disassembling the first, the second, and the new instruction sets into their portions may include identifying at least one of: a command, a keyword, a symbol, an instruction, an operator, a variable, a value, an object, a function, a parameter, a character, or a digit of the first, the second, and the new instruction sets as a portion. The disassembling the first, the second, and the new instruction sets into their portions may include identifying types of the first, the second, and the new instruction sets. The disassembling the first, the second, and the new instruction sets into their portions may include associating an importance with a portion of the first, the second, and the new instruction sets. The disassembling the first, the second, and the new instruction sets into their portions may be performed by the processor circuit.

In some embodiments, the non-transitory computer storage medium and/or the method further comprise: modifying the second instruction set. The modifying the second instruction set may include replacing at least one portion of the second instruction set with at least one portion of the first, the new, or an another instruction set. The modifying the second instruction set may include replacing at least one portion of the second instruction set with at least one of: a command, a keyword, a symbol, an instruction, an operator, a variable, a value, an object, a function, a parameter, a character, or a digit from the first, the new, or an another instruction set. The modifying the second instruction set may include replacing at least one portion of the second instruction set with at least one extra information associated with the first, the new, or an another instruction set. The modifying the second instruction set may include replacing at least one portion of the second instruction set with a contextual information, a time information, a geo-spatial information, an environmental information, a situational information, an observed information, a computed information, a pre-computed information, an analyzed information, or an inferred information. The modifying the second instruction set may include replacing at least one portion of the second instruction set with information derived from projecting a path, a movement, a trajectory, or a pattern in portions of one or more of the first, the new, or an another instruction set. The modifying the second instruction set may include replacing at least one portion of the second instruction set with semantically equivalent variations of at least one portion of the first, the new, or an another instruction set. The modifying the second instruction set may include replacing the second instruction set with an instruction set generated by a non-UAIE system or process. The modifying the second instruction set may be performed by the processor circuit.

In certain embodiments, the non-transitory computer storage medium and/or the method further comprise: displaying the second instruction set as an option to be selected, modified, or canceled by a user. The displaying the second instruction set as an option to be selected, modified, or canceled by a user may include displaying a comparison accuracy indicating a similarity between the new instruction set and the first instruction set from the neural network. The second instruction set may include a previously modified second instruction set.

In some embodiments, the non-transitory computer storage medium and/or the method further comprise: rating the executed second instruction set. The rating the executed second instruction set may include displaying the executed second instruction set along with one or more rating values as options to be selected by a user. The rating the executed second instruction set may include automatically rating the executed second instruction set. The rating the executed second instruction set may include associating a rating value with the executed second instruction set and storing the rating value in the neural network. The executed second instruction set may include a previously modified second instruction set. The rating the executed second instruction set may be performed by the processor circuit.

In certain embodiments, the non-transitory computer storage medium and/or the method further comprise: canceling the execution of the executed second instruction set. The canceling the execution of the executed second instruction set may include displaying the executed second instruction set as an option to be selected for cancelation by a user. The canceling the execution of the executed second instruction set may include associating a cancelation with the executed second instruction set and storing the cancelation in the neural network. The canceling the execution of the executed second instruction set may include restoring the computing device to a prior state. The restoring the computing device to a prior state may include saving the state of the computing device prior to executing the second instruction set. The executed second instruction set may include a previously modified second instruction set. The canceling the execution of the executed second instruction set may be performed by the processor circuit.

In some embodiments, the non-transitory computer storage medium and/or the method further comprise: assembling the second instruction set from its portions. The assembling the second instruction set from its portions may be performed by the processor circuit.

In certain embodiments, the non-transitory computer storage medium and/or the method further comprise: an autonomous operating of the application caused by an universal artificial intelligence engine (UAIE). The UAIE may comprise at least one of: the interface, the neural network, the decision-making unit, a command disassembler, a collection of recently executed instruction sets, a knowledge structuring unit, a modifier, a command assembler, a rating system, or a cancelation system. In further embodiments, the autonomous application operating includes a partially or a fully autonomous application operating. The partially autonomous application operating may include executing the second instruction set or a modified second instruction set responsive to a confirmation by a user. The fully autonomous application operating may include executing the second instruction set or a modified second instruction set without a confirmation. In further embodiments, the autonomous application operating includes executing one or more instruction sets generated by the UAIE. The one or more instruction sets generated by the UAIE may include the second instruction set or a modified second instruction set. The one or more instruction sets generated by the UAIE may include one or more instruction sets for operating the application or an object of the application. The one or more instruction sets generated by the UAIE may include one or more instruction sets stored in the neural network. In further embodiments, the autonomous application operating includes automatic or auto-pilot operating. The automatic or auto-pilot operating may include executing one or more instruction sets generated by the UAIE. In further embodiments, the autonomous application operating includes executing one or more instruction sets generated by a non-UAIE system or process.

In further embodiments, the UAIE includes an UAIE that operates independently from the computing device. In further embodiments, the UAIE includes an UAIE attachable to the computing device. In further embodiments, the UAIE includes an UAIE built into the computing device. In further embodiments, the UAIE includes an UAIE that operates independently from the application. In further embodiments, the UAIE includes an UAIE attachable to the application. In further embodiments, the UAIE includes an UAIE built into the application. In further embodiments, the UAIE includes an UAIE provided as a feature of the computing device's operating system. In further embodiments, the application includes an application running on the computing device and the UAIE includes an UAIE running on a remote computing device. In further embodiments, the UAIE includes an UAIE running on the computing device and the application includes an application running on a remote computing device. In further embodiments, the UAIE includes a remote or a global UAIE operating on a remote computing device.

In some embodiments, the non-transitory computer storage medium and/or the method further comprise: loading one or more instruction sets into the neural network. In certain embodiments, the non-transitory computer storage medium and/or the method further comprise: loading one or more neural networks into the UAIE. In some embodiments, the non-transitory computer storage medium and/or the method further comprise: taking control from, sharing control with, or releasing control to the application or an object of the application, the taking, sharing, or releasing control performed by the UAIE. In certain embodiments, the non-transitory computer storage medium and/or the method further comprise: learning a user's knowledge, style, or methodology of operating the application or an object of the application. The learning a user's knowledge, style, or methodology of operating the application or an object of the application may include storing the at least one portion of the first instruction set and the at least one portion of the second instruction set into the neural network. The operation of the UAIE may be performed by the processor circuit.

In some aspects, the disclosure relates to a system for learning an application's operations. The system may operate on one or more computing devices. In some embodiments, the system comprises a computing device including a processor circuit that is coupled to a memory unit. The system may further include an application, running on the processor circuit, for performing operations on the computing device. The system may further include an interface configured to receive a plurality of recently executed instruction sets, the plurality of recently executed instruction sets comprise instruction sets executed immediately prior to and including a currently executed instruction set, wherein the plurality of recently executed instruction sets are part of the application for performing operations on the computing device. The system may further include a neural network configured to store portions of the least recently executed instruction sets of the plurality of recently executed instruction sets into nodes of comparative layers of the neural network and store portions of the most recently executed instruction sets of the plurality of recently executed instruction sets into nodes of anticipatory layers of the neural network.

In some embodiments, the interface may be further configured to receive at least one extra information associated with the plurality of recently executed instruction sets. The neural network may be further configured to store the at least one extra information associated with the least recently executed instruction sets into the nodes of comparative layers of the neural network and store the at least one extra information associated with the most recently executed instruction sets into the nodes of anticipatory layers of the neural network. The neural network may be further configured to store the at least one extra information associated with the least recently executed instruction sets into the nodes comprising the portions of the least recently executed instruction sets and, and wherein the neural network may be further configured to store the at least one extra information associated with the most recently executed instruction sets into the nodes comprising the portions of the most recently executed instruction sets.

In certain embodiments, the least recently executed instruction sets of the plurality of recently executed instruction sets include instruction sets whose portions can be used for comparisons with portions of new instruction sets and the most recently executed instruction sets of the plurality of recently executed instruction sets include instruction sets whose portions can be used for anticipation of instruction sets subsequent to the new instruction sets. In further embodiments, the least recently executed instruction sets of the plurality of recently executed instruction sets include one or more instruction sets and the most recently executed instruction sets of the plurality of recently executed instruction sets include one or more instruction sets. In further embodiments, the comparative layers include one or more comparative layers and the anticipatory layers include one or more anticipatory layers. In further embodiments, the comparative layers may be followed by anticipatory layers. In further embodiments, one or more nodes of successive layers may be interconnected by connections.

In some aspects, the disclosure relates to a non-transitory computer storage medium having a computer program stored thereon, the program comprising instructions that when executed by one or more computing devices cause the one or more computing devices to perform operations comprising: receiving a plurality of recently executed instruction sets, the plurality of recently executed instruction sets comprise instruction sets executed immediately prior to and including a currently executed instruction set, wherein the plurality of recently executed instruction sets are part of an application for performing operations on a computing device. The operations may further include storing portions of the least recently executed instruction sets of the plurality of recently executed instruction sets into nodes of comparative layers of a neural network. The operations may further include storing portions of the most recently executed instruction sets of the plurality of recently executed instruction sets into nodes of anticipatory layers of the neural network.

In some aspects, the disclosure relates to a method comprising: (a) receiving, by a processor circuit via an interface, a plurality of recently executed instruction sets, the plurality of recently executed instruction sets comprise instruction sets executed immediately prior to and including a currently executed instruction set, wherein the plurality of recently executed instruction sets are part of an application for performing operations on a computing device. The method may further include (b) storing portions of the least recently executed instruction sets of the plurality of recently executed instruction sets into nodes of comparative layers of a neural network, the storing of (b) caused by the processor circuit. The method may further include (c) storing portions of the most recently executed instruction sets of the plurality of recently executed instruction sets into nodes of anticipatory layers of the neural network, the storing of (c) caused by the processor circuit.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In certain embodiments, the non-transitory computer storage medium and/or the method further comprise: receiving, by the processor circuit via the interface, at least one extra information associated with the plurality of recently executed instruction sets. In further embodiments, the non-transitory computer storage medium and/or the method further comprise: storing the at least one extra information associated with the least recently executed instruction sets into the nodes of comparative layers of the neural network, and storing the at least one extra information associated with the most recently executed instruction sets into the nodes of anticipatory layers of the neural network. In further embodiments, the non-transitory computer storage medium and/or the method further comprise: storing the at least one extra information associated with the least recently executed instruction sets into the nodes comprising the portions of the least recently executed instruction sets, and storing the at least one extra information associated with the most recently executed instruction sets into the nodes comprising the portions of the most recently executed instruction sets.

In further embodiments, the least recently executed instruction sets of the plurality of recently executed instruction sets include instruction sets whose portions can be used for comparisons with portions of new instruction sets and the most recently executed instruction sets of the plurality of recently executed instruction sets include instruction sets whose portions can be used for anticipation of instruction sets subsequent to the new instruction sets. In further embodiments, the least recently executed instruction sets of the plurality of recently executed instruction sets include one or more instruction sets and the most recently executed instruction sets of the plurality of recently executed instruction sets include one or more instruction sets. In further embodiments, the comparative layers include one or more comparative layers and the anticipatory layers include one or more anticipatory layers. In further embodiments, the comparative layers may be followed by anticipatory layers. In further embodiments, one or more nodes of successive layers may be interconnected by connections.

In some aspects, the disclosure relates to a system for anticipating an application's operations. The system may operate on one or more computing devices. In some embodiments, the system comprises a computing device including a processor circuit that is coupled to a memory unit. The system may further include an application, running on the processor circuit, for performing operations on the computing device. The system may further include a neural network that stores portions of comparative instruction sets and portions of anticipatory instruction sets, the neural network comprising a plurality of portions of comparative instruction sets and portions of anticipatory instruction sets, wherein the comparative and the anticipatory instruction sets are part of the application for performing operations on the computing device. The system may further include an interface configured to receive new instruction sets, the new instruction sets are part of the application for performing operations on the computing device. The system may further include a decision-making unit configured to: compare portions of the new instruction sets with the portions of the comparative instruction sets in the neural network, determine that there is a substantial similarity between one or more new instruction sets and one or more comparative instruction sets in the neural network, and anticipate one or more anticipatory instruction sets in the neural network.

In some embodiments, the comparative instruction sets include the least recently executed instruction sets of a plurality of previously executed instruction sets and the anticipatory instruction sets include the most recently executed instruction sets of the plurality of previously executed instruction sets, the plurality of previously executed instruction sets comprise instruction sets executed immediately prior to and including an instruction set executed at a past time. In further embodiments, the portions of comparative instruction sets may be stored into nodes of comparative layers of the neural network and the portions of anticipatory instruction sets may be stored into nodes of anticipatory layers of the neural network. The comparative layers may be followed by anticipatory layers. In further embodiments, the neural network further stores at least one extra information associated with the comparative instruction sets and at least one extra information associated with the anticipatory instruction sets.

In certain embodiments, the interface may be further configured to receive at least one extra information associated with the new instruction sets.

In some embodiments, the determining that there is a substantial similarity between one or more new instruction sets and one or more comparative instruction sets in the neural network includes finding a match between all but a threshold number of portions of the one or more new instruction sets and all but a threshold number of portions of the one or more comparative instruction sets. In further embodiments, the determining that there is a substantial similarity between one or more new instruction sets and one or more comparative instruction sets in the neural network includes finding a match between at least one portion of the one or more new instruction sets and at least one portion of the one or more comparative instruction sets. In further embodiments, the decision-making unit may be further configured to compare at least one extra information associated with the new instruction sets with at least one extra information associated with the comparative instruction sets in the neural network. The determining that there is a substantial similarity between one or more new instruction sets and one or more comparative instruction sets in the neural network may include finding a match between all but a threshold number of extra information associated with the one or more new instruction sets and all but a threshold number of extra information associated with the one or more comparative instruction sets. The determining that there is a substantial similarity between one or more new instruction sets and one or more comparative instruction sets in the neural network may include finding a match between the at least one extra information associated with the one or more new instruction sets and the at least one extra information associated with the one or more comparative instruction sets.

In certain embodiments, the portions of the comparative instruction sets may be stored in nodes of comparative layers of the neural network and the portions of the anticipatory instruction sets may be stored in nodes of anticipatory layers of the neural network. The anticipating the one or more anticipatory instruction sets in the neural network may include selecting a path of nodes through comparative layers of the neural network followed by a path of nodes through anticipatory layers of the neural network, the nodes in successive comparative and successive anticipatory layers connected by one or more connections. In further embodiments, the processor circuit is caused to execute the one or more anticipatory instruction sets from the neural network.

In some aspects, the disclosure relates to a non-transitory computer storage medium having a computer program stored thereon, the program comprising instructions that when executed by one or more computing devices cause the one or more computing devices to perform operations comprising: accessing a neural network that stores portions of comparative instruction sets and portions of anticipatory instruction sets, the neural network comprising a plurality of portions of comparative instruction sets and portions of anticipatory instruction sets, wherein the comparative and the anticipatory instruction sets are part of an application for performing operations on a computing device. The operations may further include receiving new instruction sets, wherein the new instruction sets are part of the application for performing operations on the computing device. The operations may further include comparing portions of the new instruction sets with the portions of the comparative instruction sets in the neural network. The operations may further include determining that there is a substantial similarity between one or more new instruction sets and one or more comparative instruction sets in the neural network. The operations may further include anticipating one or more anticipatory instruction sets in the neural network.

In some aspects, the disclosure relates to a method comprising: (a) accessing a neural network that stores portions of comparative instruction sets and portions of anticipatory instruction sets, the neural network comprising a plurality of portions of comparative instruction sets and portions of anticipatory instruction sets, wherein the comparative and the anticipatory instruction sets are part of an application for performing operations on a computing device, the accessing of (a) performed by a processor circuit. The method may further include (b) receiving new instruction sets, wherein the new instruction sets are part of the application for performing operations on the computing device, the receiving of (b) performed by the processor circuit. The method may further include (c) comparing portions of the new instruction sets with the portions of the comparative instruction sets in the neural network, the comparing of (c) performed by the processor circuit. The method may further include (d) determining that there is a substantial similarity between one or more new instruction sets and one or more comparative instruction sets in the neural network, the determining of (d) performed by the processor circuit. The method may further include (e) anticipating one or more anticipatory instruction sets in the neural network, the anticipating of (e) performed by the processor circuit.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In some embodiments, the comparative instruction sets include the least recently executed instruction sets of a plurality of previously executed instruction sets and the anticipatory instruction sets include the most recently executed instruction sets of the plurality of previously executed instruction sets, the plurality of previously executed instruction sets comprise instruction sets executed immediately prior to and including an instruction set executed at a past time. In further embodiments, the portions of comparative instruction sets may be stored into nodes of comparative layers of the neural network and the portions of anticipatory instruction sets may be stored into nodes of anticipatory layers of the neural network. The comparative layers may be followed by anticipatory layers. In further embodiments, the neural network further stores at least one extra information associated with the comparative instruction sets and at least one extra information associated with the anticipatory instruction sets.

In certain embodiments, the non-transitory computer storage medium and/or the method further comprise: receiving at least one extra information associated with the new instruction sets, the receiving performed by the processor circuit.

In some embodiments, the determining that there is a substantial similarity between one or more new instruction sets and one or more comparative instruction sets in the neural network includes finding a match between all but a threshold number of portions of the one or more new instruction sets and all but a threshold number of portions of the one or more comparative instruction sets. In further embodiments, the determining that there is a substantial similarity between one or more new instruction sets and one or more comparative instruction sets in the neural network includes finding a match between at least one portion of the one or more new instruction sets and at least one portion of the one or more comparative instruction sets.

In certain embodiments, the non-transitory computer storage medium and/or the method further comprise: comparing at least one extra information associated with the new instruction sets with at least one extra information associated with the comparative instruction sets in the neural network, the comparing performed by the processor circuit. The determining that there is a substantial similarity between one or more new instruction sets and one or more comparative instruction sets in the neural network may include finding a match between all but a threshold number of extra information associated with the one or more new instruction sets and all but a threshold number of extra information associated with the one or more comparative instruction sets. The determining that there is a substantial similarity between one or more new instruction sets and one or more comparative instruction sets in the neural network may include finding a match between the at least one extra information associated with the one or more new instruction sets and the at least one extra information associated with the one or more comparative instruction sets.

In some embodiments, the portions of the comparative instruction sets may be stored in nodes of comparative layers of the neural network and the portions of the anticipatory instruction sets may be stored in nodes of anticipatory layers of the neural network. The anticipating the one or more anticipatory instruction sets in the neural network may include selecting a path of nodes through comparative layers of the neural network followed by a path of nodes through anticipatory layers of the neural network, the nodes in successive comparative and successive anticipatory layers connected by one or more connections.

In certain embodiments, the non-transitory computer storage medium and/or the method further comprise: executing the one or more anticipatory instruction sets by the processor circuit.

In some aspects, the disclosure relates to a method comprising: (a) receiving, by a first processor circuit via an interface, a first instruction set and a second instruction set, wherein the first and the second instruction sets are executed by a second processor circuit and are part of an application for performing operations on a computing device. The method may further include (b) storing at least one portion of the first instruction set and at least one portion of the second instruction set into a knowledgebase, the knowledgebase comprising a plurality of portions of instruction sets, the storing of (b) caused by the first processor circuit. The method may further include (c) receiving, by the first processor circuit via the interface, a new instruction set, wherein the new instruction set is executed by the second processor circuit and is part of the application for performing operations on the computing device. The method may further include (d) comparing at least one portion of the new instruction set with at least one portion of the first instruction set from the knowledgebase, the comparing of (d) performed by the first processor circuit. The method may further include (e) determining that there is a substantial similarity between the new instruction set and the first instruction set from the knowledgebase, the determining of (e) performed by the first processor circuit. The method may further include (f) executing the second instruction set from the knowledgebase by the second processor circuit.

The operations or steps of the method may be performed by any of the elements of the above described systems as applicable. The method may include any of the operations, steps, and embodiments of the above described systems as applicable.

In some aspects, the disclosure relates to a method comprising: method comprising: (a) receiving, by a first processor circuit via an interface, a plurality of recently executed instruction sets, the plurality of recently executed instruction sets comprise instruction sets executed by a second processor circuit immediately prior to and including a currently executed instruction set, wherein the plurality of recently executed instruction sets are part of an application for performing operations on a computing device. The method may further include (b) storing portions of comparative instruction sets and portions of anticipatory instruction sets into a knowledgebase, the knowledgebase comprising a plurality of portions of comparative instruction sets and portions of anticipatory instruction sets, wherein the comparative instruction sets include the least recently executed instruction sets of the plurality of recently executed instruction sets and the anticipatory instruction sets include the most recently executed instruction sets of the plurality of recently executed instruction sets, the storing of (b) caused by the first processor circuit.

The operations or steps of the method may be performed by any of the elements of the above described systems as applicable. The method may include any of the operations, steps, and embodiments of the above described systems as applicable.

In some aspects, the disclosure relates to a method comprising: method comprising: (a) accessing a knowledgebase that stores portions of comparative instruction sets and portions of anticipatory instruction sets, the knowledgebase comprising a plurality of portions of comparative instruction sets and portions of anticipatory instruction sets, wherein the comparative and the anticipatory instruction sets were executed by a second processor circuit and are part of an application for performing operations on a computing device, the accessing of (a) performed by a first processor circuit. The method may further include (b) receiving new instruction sets, wherein the new instruction sets are executed by the second processor circuit and are part of the application for performing operations on the computing device, the receiving of (b) performed by the first processor circuit. The method may further include (c) comparing portions of the new instruction sets with portions of the comparative instruction sets in the knowledgebase, the comparing of (c) performed by the first processor circuit. The method may further include (d) determining that there is a substantial similarity between one or more new instruction sets and one or more comparative instruction sets in the knowledgebase, the determining of (d) performed by the first processor circuit. The method may further include (e) anticipating one or more anticipatory instruction sets in the knowledgebase, the anticipating of (e) performed by the first processor circuit.

The operations or steps of the method may be performed by any of the elements of the above described systems as applicable. The method may include any of the operations, steps, and embodiments of the above described systems as applicable.

In some aspects, the disclosure relates to a method comprising: method comprising: (a) receiving, by a first processor circuit via an interface, a first instruction set and a second instruction set, wherein the first and the second instruction sets are executed by a second processor circuit and are part of an application for performing operations on a computing device. The method may further include (b) storing at least one portion of the first instruction set and at least one portion of the second instruction set into a neural network, the neural network comprising a plurality of portions of instruction sets, the storing of (b) caused by the first processor circuit. The method may further include (c) receiving, by the first processor circuit via the interface, a new instruction set, wherein the new instruction set is executed by the second processor circuit and is part of the application for performing operations on the computing device. The method may further include (d) comparing at least one portion of the new instruction set with at least one portion of the first instruction set from the neural network, the comparing of (d) performed by the first processor circuit. The method may further include (e) determining that there is a substantial similarity between the new instruction set and the first instruction set from the neural network, the determining of (e) performed by the first processor circuit. The method may further include (f) executing the second instruction set from the neural network by the second processor circuit.

The operations or steps of the method may be performed by any of the elements of the above described systems as applicable. The method may include any of the operations, steps, and embodiments of the above described systems as applicable.

In some aspects, the disclosure relates to a method comprising: method comprising: (a) receiving, by a first processor circuit via an interface, a plurality of recently executed instruction sets, the plurality of recently executed instruction sets comprise instruction sets executed by a second processor circuit immediately prior to and including a currently executed instruction set, wherein the plurality of recently executed instruction sets are part of an application for performing operations on a computing device. The method may further include (b) storing portions of the least recently executed instruction sets of the plurality of recently executed instruction sets into nodes of comparative layers of a neural network, the storing of (b) caused by the first processor circuit. The method may further include (c) storing portions of the most recently executed instruction sets of the plurality of recently executed instruction sets into nodes of anticipatory layers of the neural network, the storing of (c) caused by the first processor circuit.

The operations or steps of the method may be performed by any of the elements of the above described systems as applicable. The method may include any of the operations, steps, and embodiments of the above described systems as applicable.

In some aspects, the disclosure relates to a method comprising: method comprising: (a) accessing a neural network that stores portions of comparative instruction sets and portions of anticipatory instruction sets, the neural network comprising a plurality of portions of comparative instruction sets and portions of anticipatory instruction sets, wherein the comparative and the anticipatory instruction sets were executed by a second processor circuit and are part of an application for performing operations on a computing device, the accessing of (a) performed by a first processor circuit. The method may further include (b) receiving new instruction sets, wherein the new instruction sets are executed by the second processor circuit and are part of the application for performing operations on the computing device, the receiving of (b) performed by the first processor circuit. The method may further include (c) comparing portions of the new instruction sets with the portions of the comparative instruction sets in the neural network, the comparing of (c) performed by the first processor circuit. The method may further include (d) determining that there is a substantial similarity between one or more new instruction sets and one or more comparative instruction sets in the neural network, the determining of (d) performed by the first processor circuit. The method may further include (e) anticipating one or more anticipatory instruction sets in the neural network, the anticipating of (e) performed by the first processor circuit.

The operations or steps of the method may be performed by any of the elements of the above described systems as applicable. The method may include any of the operations, steps, and embodiments of the above described systems as applicable.

Other features and advantages of the disclosure will become apparent from the following description, including the claims and drawings.

BRIEF DESCRIPTION OF THE DRAWINGS

FIG. 16A illustrates an embodiment of Importance Index 640 used for Instruction Set Portions 620 and Extra Info 630.

FIG. 16B illustrates an embodiment of Importance Index 640 used for Operation 610.

Figure 1:
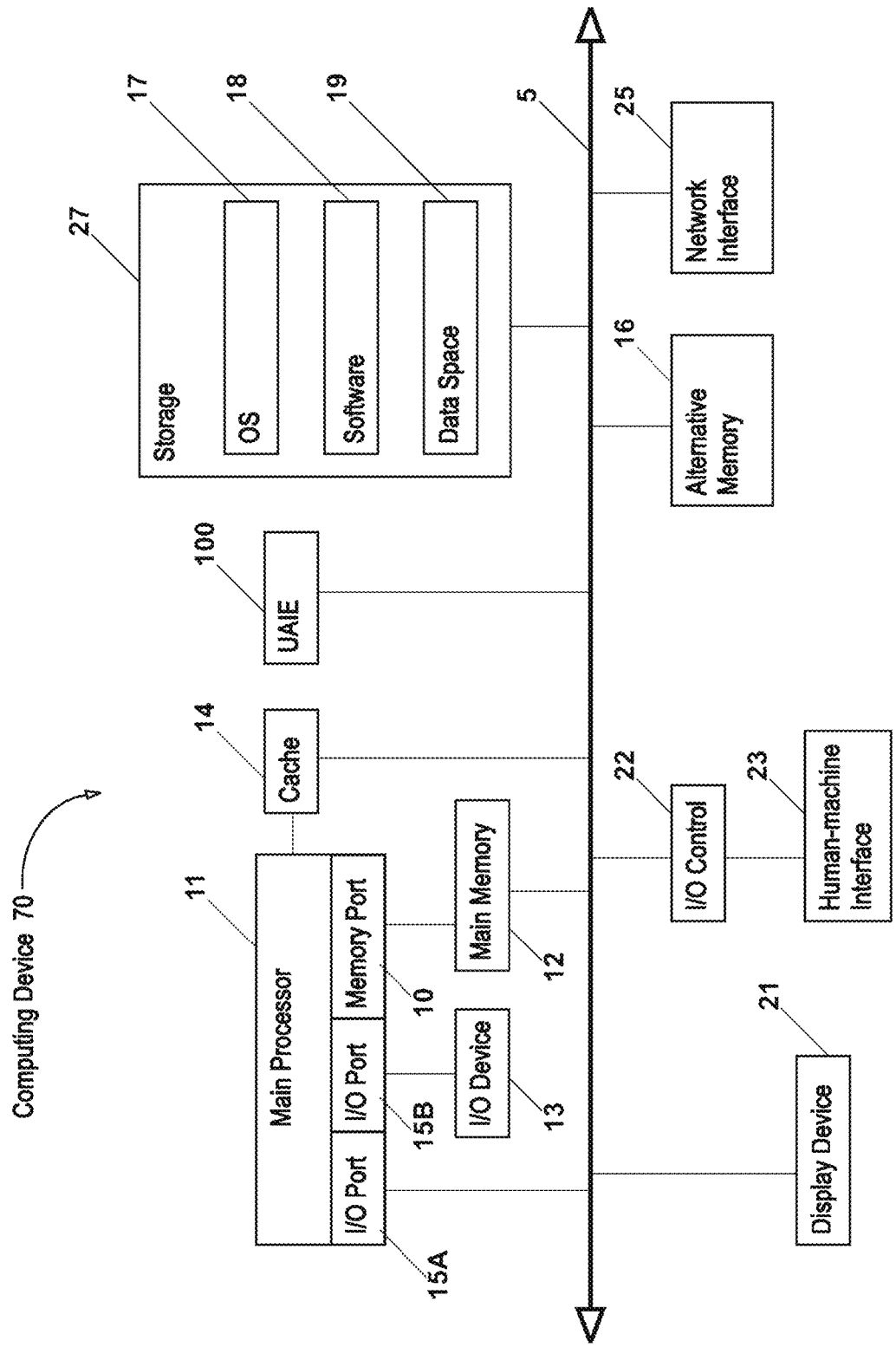
FIG. 1 illustrates a block diagram of Computing Device 70 that can provide processing capabilities used in some of the disclosed embodiments.

Like reference numerals in different figures indicate like elements. Horizontal or vertical " . . . " or other such indicia may be used to indicate additional instances of the same type of element. n, m, n+m, n−m or other such letters or indicia represent integers or other sequential numbers that follow the sequence where they are indicated. It should be noted that n, m, and/or other such letters or indicia may represent different numbers in different elements even where the elements are depicted in the same figure. In general, n, m, and/or other such letters or indicia follow the immediate sequence and/or context where they are indicated. Any of these or other such indicia may be used interchangeably according to the context and space available. The drawings are not necessarily to scale, with emphasis instead being placed upon illustrating the embodiments, principles, and concepts of the disclosure. A line or arrow between any of the disclosed elements comprises an interface that enables the coupling, connection, and/or interaction between the elements.

DETAILED DESCRIPTION

The disclosed universal artificial intelligence engine for computing devices and software applications comprises systems, apparatuses, methods, features, functionalities, and/or applications for learning the operation of a computing device or software application, and storing this knowledge in a knowledgebase, neural network, or other repository. Then, using this stored knowledge, the engine enables autonomous operation of the computing device or software application with partial, minimal, or no user input. The disclosed universal artificial intelligence engine for computing devices and software applications, any of its elements, any of its embodiments, or a combination thereof are generally referred to as UAIE, UAIE 100, UAIE application, or as other similar name or reference.

Referring now to FIG. 1, an embodiment is illustrated of Computing Device 70 (also referred to simply as computing device or other similar name or reference, etc.) that can provide processing capabilities used in some embodiments of the forthcoming disclosure. Later described devices and systems, in combination with processing capabilities of Computing Device 70, enable universal artificial intelligence functionalities for computing devices and software applications. Various embodiments of the disclosed devices, apparatuses, systems, and/or methods include hardware, functions, logic, programs, and/or a combination thereof that may be provided or implemented on any type or form of computing or other device such as a mobile device, a computer, a computing capable telephone, a server, a cloud device, a gaming device, a television device, a digital camera, a GPS receiver, a media player, an embedded device, a supercomputer, or any other type or form of computing or other device capable of performing the operations described herein.

In some designs, Computing Device 70 comprises hardware, processing techniques or capabilities, programs, or a combination thereof. Computing device 70 includes a central processing unit, which may also be referred to as main processor 11. Main processor 11 includes one or more memory ports 10 and/or one or more input-output ports, also referred to as I/O ports 15, such as I/O ports 15A and 15B. Main processor 11 may be special or general purpose. Computing Device 70 may further include a memory, also referred to as main memory 12, which can be connected to the remainder of the components of Computing Device 70 via bus 5. Memory 12 can be connected to main processor 11 via memory port 10. Computing Device 70 may also include display device 21 such as a monitor, projector, glasses, and/or other display device. Computing Device 70 may also include Human-machine Interface 23 such as a keyboard, a pointing device, a mouse, a touchscreen, a joystick, and/or other input device that can be connected with the remainder of the Computing Device 70 components via I/O control 22. In some implementations, Human-machine Interface 23 can be directly connected with bus 5 or specific components of Computing Device 70. Computing Device 70 may include additional optional elements, such as one or more input/output devices 13. Main processor 11 may include or be interfaced with cache memory 14. Storage 27 may include memory, which provides an operating system, also referred to as OS 17, additional software 18 operating on OS 17, and/or data space 19 in which additional data or information can be stored. Alternative memory device 16 can be connected to the remaining components of Computing Device 70 via bus 5. Network interface 25 can also be connected with bus 5 and be used to communicate with external computing devices via a network. Some or all described elements of Computing Device 70 can be directly or operatively connected or coupled with each other or with other additional elements as depicted in FIG. 1 or using any other connection means known in art in alternate implementations.

Main processor 11 includes any logic circuitry that can respond to and process instructions fetched from main memory unit 12 or other element. Main processor 11 may also include any combination of hardware and/or processing techniques or capabilities for implementing and executing logic functions or programs. Main processor 11 may include a single core or a multi core processor. Main processor 11 includes the functionality for loading operating system 17 and operating any software 18 thereon. In some embodiments, main processor 11 can be provided in a microprocessing or a processing unit, such as, for example, Snapdragon processor produced by Qualcomm Inc., processor by Intel Corporation of Mountain View, Calif., processor manufactured by Motorola Corporation of Schaumburg, III; processor manufactured by Transmeta Corporation of Santa Clara, Calif.; the RS/6000 processor, processor manufactured by International Business Machines of White Plains, N.Y.; processor manufactured by Advanced Micro Devices of Sunnyvale, Calif., or any computing unit for performing similar functions. In other embodiments, main processor 11 can be provided in a graphics processor unit (GPU), visual processor unit (VPU), or other highly parallel processing unit or circuit such as, for example, nVidia GeForce line of GPUs, AMD Radeon line of GPUs, and/or others. Such GPUs or other highly parallel processing units may provide superior performance in processing operations on later described neural networks. Computing Device 70 may be based on one or more of these or any other processors capable of operating as described herein, whether on a mobile or embedded device, or a more conventional machine.

Memory 12 includes one or more memory chips capable of storing data and allowing any storage location to be accessed by microprocessor 11, such as Static random access memory (SRAM), Flash memory, Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). Memory 12 may be based on any of the above described memory chips, or any other available memory chips capable of operating as described herein. In some embodiments, main processor 11 can communicate with memory 12 via a system bus 5. In other embodiments, main processor 11 can communicate directly with main memory 12 via a memory port 10.

Main processor 11 can communicate directly with cache memory 14 via a connection means such as a secondary bus which may also sometimes be referred to as a backside bus. In some embodiments, main processor 11 can communicate with cache memory 14 using the system bus 5. Memory 12, I/O device 13, and/or other components of Computing Device 70 can be connected with any other components via similar secondary bus, depending on design. Cache memory 14, however, may typically have a faster response time than main memory 12 and can include a type of memory which is considered faster than main memory 12, such as for example SRAM, BSRAM, or EDRAM. Cache memory includes any structure such as multilevel caches, for example. In some embodiments, main processor 11 can communicate with one or more I/O devices 13 via a system bus 5. Various busses can be used to connect main processor 11 to any of the I/O devices 13, such as a VESA VL bus, an ISA bus, an EISA bus, a MicroChannel Architecture (MCA) bus, a PCI bus, a PCI-X bus, a PCI-Express bus, or a NuBus. In some embodiments, main processor 11 can communicate directly with I/O device 13 via HyperTransport, Rapid I/O, or InfiniBand. In further embodiments, local busses and direct communication may be mixed. For example, main processor 11 can communicate with an I/O device 13 using a local interconnect bus while communicating with another I/O device 13 directly. Similar configurations can be used for any other components described herein.

Computing Device 70 may further include alternative memory such as a SD memory slot, a USB memory stick, an optical drive such as a CD-ROM drive, a CD-R/RW drive, a DVD-ROM drive or a BlueRay disc, a hard-drive, and/or any other device comprising non-volatile memory suitable for storing data or installing application programs. Computing device 70 may further include a storage device 27 comprising any type or form of non-volatile memory for storing an operating system (OS) such as any type or form of Windows OS, Mac OS, Unix OS, Linux OS, Android OS, iPhone OS, mobile version of Windows OS, an embedded OS, or any other OS that can operate on Computing Device 70. Computing Device 70 may also include software 18, and/or data space 19 for storing additional data or information. In some embodiments, alternative memory 16 can be used as or similar to storage device 27. Additionally, OS 17 and/or software 18 can be run from a bootable medium, such as for example, a flash drive, a micro SD card, a bootable CD for GNU/Linux that is available as a GNU/Linux distribution from knoppix.net, and/or other bootable medium.

Software 18 (also referred to as program, computer program, application, software application, script, code, etc.) comprises instructions that can provide functionality when executed by processor 11. Software 18 can be implemented in a high-level procedural or object-oriented programming language, or in a low-level machine or assembly language. Any language used can be a compiled, interpreted, or otherwise translated language. Software 18 can be deployed in any form including as a stand-alone program or as a module, component, subroutine, or other unit suitable for use in a computing system. Software 18 does not necessarily correspond to a file in a file system. A program can be stored in a portion of a file that can hold other programs or data, in a single file dedicated to the program, or in multiple files (i.e. files that store one or more modules, sub programs, or portions of code, etc.). Software 18 can be deployed on one computer or on multiple computers (i.e. cloud, distributed, or parallel computing, etc.), or at one site or distributed across multiple sites interconnected by a network. In some designs, Software 18 comprises one or more Software Applications 120 (later described) and these terms may be used interchangeably herein.

Network interface 25 can be utilized for interfacing Computing Device 70 with other devices via a network through a variety of connections including standard telephone lines, wired or wireless connections, LAN or WAN links (i.e. 802.11, T1, T3, 56 kb, X.25, etc.), broadband connections (i.e. ISDN, Frame Relay, ATM, etc.), or a combination thereof. Examples of networks include the Internet, an intranet, an extranet, a local area network (LAN), a wide area network (WAN), a personal area network (PAN), a home area network (HAN), a campus area network (CAN), a metropolitan area network (MAN), a global area network (GAN), a storage area network (SAN), virtual network, a virtual private network (VPN), Bluetooth network, a wireless network, a wireless LAN, a radio network, a HomePNA, a power line communication network, a G.hn network, an optical fiber network, an Ethernet network, an active networking network, a client-server network, a peer-to-peer network, a bus network, a star network, a ring network, a mesh network, a star-bus network, a tree network, a hierarchical topology network, and/or other networks known in art. Network interface 25 may include a built-in network adapter, network interface card, PCMCIA network card, card bus network adapter, wireless network adapter, Bluetooth network adapter, WiFi network adapter, USB network adapter, modem, and/or any other device suitable for interfacing Computing Device 70 with any type of network capable of communication and/or operations described herein.

Still referring to FIG. 1, I/O devices 13 may be present in various shapes or forms in Computing Device 70. Examples of I/O device 13 capable of input include a joystick, a keyboard, a mouse, a trackpad, a trackpoint, a touchscreen, a trackball, a microphone, a drawing tablet, a glove, a tactile input device, a video camera, and/or other input device. Examples of I/O device 13 capable of output include a video display, a touchscreen, a projector, a glasses, a speaker, a tactile output device, and/or other output device. Examples of I/O device 13 capable of input and output include a disk drive, an optical storage device, a modem, a network card, and/or other input/output device. I/O device 13 can be interfaced with processor 11 via an I/O port 15, for example. I/O device 13 can also be controlled by I/O control 22 in some implementations. I/O control 22 may control one or more I/O devices such as Human-machine Interface 23 (i.e. keyboard, pointing device, touchscreen, joystick, mouse, optical pen, etc.). I/O control 22 enables any type or form of a detecting device such as a video camera or microphone to be interfaced with other components of Computing Device 70. Furthermore, I/O device 13 may also provide storage such as or similar to storage 27, and/or alternative memory such as or similar to alternative memory 16 in some implementations. For example, Computing Device 70 may receive handheld USB storage device such as USB flash drive line of devices manufactured by Twintech Industry, Inc. of Los Alamitos, Calif.

An output interface such as a graphical user interface, an acoustical output interface, a tactile output interface, any device driver (i.e. audio, video, or other driver), and/or other output interface or system can be utilized to process output from Computing Device 70 elements for conveyance on an output device such as Display 21. In some aspects, Display 21 or other output device itself may include an output interface for processing output from Computing Device 70 elements. Further, an input interface such as a keyboard listener, a keypad listener, a touchscreen listener, a mouse listener, a trackball listener, any device driver (i.e. audio, video, keyboard, mouse, touchscreen, or other driver), a speech recognizer, a video interpreter, and/or other input interface or system can be utilized to process input from Human-machine Interface 23 or other input device for use by Computing Device 70 elements. In some aspects, Human-machine Interface 23 or other input device itself may include an input interface for processing input for use by Computing Device 70 elements.

Computing Device 70 may include or be connected to multiple display devices 21. Display devices 21 can each be of the same or different type or form. Computing Device 70 and/or its elements comprise any type or form of suitable hardware, programs, or a combination thereof to support, enable, or provide for the connection and use of multiple display devices 21 or multiple detection devices. In one example, Computing Device 70 includes any type or form of video adapter, video card, driver, and/or library to interface, communicate, connect, or otherwise use display devices 21. In some aspects, a video adapter may include multiple connectors to interface to multiple display devices 21. In other aspects, Computing Device 70 includes multiple video adapters, with each video adapter connected to one or more display devices 21. In some embodiments, any portion of Computing Device's 70 operating system can be configured for using multiple displays 21. In other embodiments, one or more display devices 21 may be provided by one or more other computing devices such as remote computing devices connected to Computing Device 70 via a network. In some aspects, main processor 11 can use an Advanced Graphics Port (AGP) to communicate with one or more display devices 21.

In some embodiments, I/O device 13 can be a bridge between system bus 5 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, and/or other bus.

Computing Device 70 can operate under the control of an operating system 17, which may support Computing Device's 70 basic functions, interface with and manage hardware resources, interface with and manage peripherals, provide common services for application programs, schedule tasks, and/or perform other functionalities. A modem operating system enables features and functionalities such as a high resolution display, graphical user interface (GUI), touchscreen, cellular network connectivity (i.e. mobile operating system, etc.), Bluetooth connectivity, WiFi connectivity, global positioning system (GPS) capabilities, mobile navigation, microphone, speaker, still picture camera, video camera, voice recorder, speech recognition, music player, video player, near field communication, personal digital assistant (PDA), and/or other features, functionalities, or applications. For example, Computing Device 70 can use any conventional operating system, any embedded operating system, any real-time operating system, any open source operating system, any video gaming operating system, any proprietary operating system, any online operating system, any operating system for mobile computing devices, or any other operating system capable of running on Computing Device 70 and performing operations described herein. Typical operating systems include: Windows XP, Windows 7, Windows 8, etc. manufactured by Microsoft Corporation of Redmond, Wash.; Mac OS, iPhone OS, etc. manufactured by Apple Computer of Cupertino, Calif.; OS/2 manufactured by International Business Machines of Armonk, N.Y.; Linux, a freely-available operating system distributed by Caldera Corp. of Salt Lake City, Utah; or any type or form of a Unix operating system, among others. Similarly, any operating systems such as the ones for Android devices can be utilized, just as those of Microsoft or Apple.

Computing Device 70 can be implemented as or be part of various different model architectures such as web services, distributed computing, grid computing, cloud computing, and/or other architectures or environments. For example, in addition to the traditional desktop, server, or mobile operating system architectures, a cloud-based operating system can be utilized to provide the structure on which embodiments of the disclosure can be implemented. Other aspects of Computing Device 70 can also be implemented in the cloud without departing from the spirit and scope of the disclosure. For example, memory, storage, processing, and/or other elements can be hosted in the cloud. In some embodiments, Computing Device 70 can be implemented on multiple devices. For example, a portion of Computing Device 70 can be implemented on a mobile device and another portion can be implemented on wearable electronics.

Computing Device 70 can be, or include, any mobile device, a mobile phone, a smartphone (i.e. iPhone, Windows phone, Blackberry, Android phone, etc.), a tablet, a personal digital assistant (PDA), wearable electronics, implantable electronics, or another mobile device capable of implementing the functionalities described herein. In other embodiments, Computing Device 70 can be, or include, an embedded device, which can be any device or system with a dedicated function within another device or system. Embedded systems range from the simplest ones dedicated to one task with no user interface to complex ones with advanced user interface that may resemble modern desktop computer systems. Simple embedded devices can use buttons, light emitting diodes (LEDs), graphic or character LCDs with a simple menu system. More sophisticated devices can use a graphical screen with touch sensing or screen-edge buttons where the meaning of the buttons changes with the screen. Examples of devices comprising an embedded device include a mobile telephone, a personal digital assistant (PDA), a gaming device, a media player, a digital still or video camera, a pager, a television device, a set-top box, a personal navigation device, a global positioning system (GPS) receiver, a portable storage device (i.e. a USB flash drive, etc.), a digital watch, a DVD player, a printer, a microwave oven, a washing machine, a dishwasher, a gateway, a router, a hub, an automobile entertainment system, an automobile navigation system, a refrigerator, a washing machine, a factory automation device, an assembly line device, a factory floor monitoring device, a thermostat, an automobile, a factory controller, a telephone, a network bridge, and/or other devices. An embedded device can operate under control of an operating system for embedded devices such as MicroC/OS-II, QNX, VxWorks, eCos, TinyOS, Windows Embedded, Embedded Linux, and/or other embedded device operating systems.

Computing Device 70 may include any combination of processors, operating systems, input/output devices, and/or other elements to implement the device's purpose. In one example, Computing Device 70 comprises a Snapdragon by Qualcomm, Inc., or Tegra processors by nVidia, or any other mobile device processor or a microprocessor for a similar application. Computing Device 70 can be operated under the control of the Android OS, iPhone OS, Palm OS, or any other operating system for a similar purpose. Computing Device 70 may also include a stylus input device as well as a five-way navigator device. In another example, Computing Device 70 comprises a Wii video game console released by Nintendo Co. operating an es operating system. I/O devices may include a video camera or an infrared camera for recording or tracking movements of a player or a participant of a Wii video game. Other I/O devices may include a joystick, a keyboard, or an RF wireless remote control device. Similarly, Computing Device 70 can be tailored to any workstation, mobile or desktop computer, laptop or notebook computer, smartphone device or tablet, server, handheld computer, gaming device, embedded device, or any other computer or computing product, or other type or form of computing or telecommunication device that has sufficient processor power and memory capacity to perform the functionalities described herein.

Various implementations of the disclosed devices, apparatuses, systems, and/or methods can be realized in digital electronic circuitry, integrated circuitry, specially designed application specific integrated circuits (ASICs), field programmable gate arrays (FPGAs), computer hardware, firmware, programs, virtual machines, and/or combinations thereof including their structural, logical, and/or physical equivalents.

The disclosed devices, apparatuses, systems, and/or methods may include clients and servers. A client and server are generally remote from each other and typically interact through a network. The relationship of a client and server may arise by virtue of computer programs running on the respective computers and having a client-server relationship to each other.

The disclosed devices, apparatuses, systems, and/or methods can be implemented in a computing system that includes a back end component, a middleware component, a front end component, or any combination thereof. The components of the system can be interconnected by any form or medium of digital data communication such as, for example, a network.

Computing Device 70 may include or be interfaced with a computer program product comprising instructions or logic encoded on a computer-readable medium that, when performed in a computing device, programs a processor to perform the operations and/or functionalities disclosed herein. For example, a computer program can be provided or encoded on a computer-readable medium such as an optical medium (i.e. DVD-ROM, etc.), flash drive, hard drive, any memory, or other medium such as firmware or microcode in one or more ROM, RAM, or PROM chips. Computer program can be installed onto a computing device to cause the computing device to perform the operations and/or functionalities disclosed herein. As used in this disclosure, machine-readable medium, computer-readable medium, or other such terms may refer to any computer program product, apparatus, and/or device for providing instructions and/or data to a programmable processor. As such, machine-readable medium includes any medium that can send or receive machine instructions as a machine-readable signal. The term machine-readable signal may refer to any signal used for providing instructions and/or data to a programmable processor. Examples of a machine-readable medium include a volatile and/or non-volatile medium, a removable and/or non-removable medium, a communication medium, a storage medium, and/or other medium. A communication medium, for example, can transmit computer readable instructions and/or data in a modulated data signal such as a carrier wave or other transport technique, and may include any other form of information delivery medium known in art. A non-transitory machine-readable medium comprises all machine-readable media except for a transitory, propagating signal.

Any of the described files can reside in any repository accessible by an embodiment of the disclosed devices, apparatuses, systems, and/or methods. In each instance where a specific file or file type is mentioned, other files, file types, or formats can be substituted.

Where a reference to a data structure is used herein, it should be understood that any variety of data structures can be used such as, for example, array, list, linked list, doubly linked list, queue, tree, heap, graph, map, grid, matrix, multi-dimensional matrix, table, database, database management system (DBMS), file, neural network, and/or any other type or form of a data structure including a custom one. A data structure may include one or more fields or data fields that are part of or associated with the data structure. A field or data field may include a data, an object, a data structure, and/or any other element or a reference/pointer thereto. A data structure can be stored in one or more memories, files, or other repositories. A data structure and/or any elements thereof, when stored in a memory, file, or other repository, may be stored in a different arrangement than the arrangement of the data structure and/or any elements thereof. For example, a sequence of instruction sets or other elements herein can be stored in an arrangement other than a sequence in a memory, file, or other repository.

Where a reference to a repository is used herein, it should be understood that a repository may be or include one or more files or file systems, one or more storage locations or structures, one or more storage systems, one or more data structures or objects, one or more memory locations or structures, and/or other storage, memory, or data arrangements.

Where a reference to an interface is used herein, it should be understood that the interface comprises any hardware, device, system, program, method, and/or combination thereof that enable direct or operative coupling, connection, and/or interaction of the elements between which the interface is indicated. A line or arrow shown in the figures between any of the depicted elements comprises such interface. Examples of an interface include a direct connection, an operative connection, a wired connection (i.e. wire, cable, etc.), a wireless connection, a device, a network, a bus, a circuit, a firmware, a driver, a bridge, a program, a combination thereof, and/or others.

Where a reference to an element coupled or connected to a processor is used herein, it should be understood that the element may be part of or operating on the processor. Also, one of ordinary skill in art will understand that an element coupled or connected to another element may include the element in communication or any other interactive relationship with the other element. Furthermore, an element coupled or connected to another element can be coupled or connected to any other element in alternate implementations. Terms coupled, connected, interfaced, or other such terms may be used interchangeably herein.

Where a mention of a function, method, routine, subroutine, or other such procedure is used herein, it should be understood that the function, method, routine, subroutine, or other such procedure comprises a call, reference, or pointer to the function, method, routine, subroutine, or other such procedure.

Where a mention of data, object, data structure, item, element, or thing is used herein, it should be understood that the data, object, data structure, item, element, or thing comprises a reference or pointer to the data, object, data structure, item, element, or thing.

The term operating or operation, when used casually, can refer to processing, executing, or other such actions, and vice versa. Therefore, the terms operating, operation, processing, executing, or other such actions may be used interchangeably herein.

The term collection of elements can refer to plurality of elements without implying that the collection is an element itself.

Figure 2:
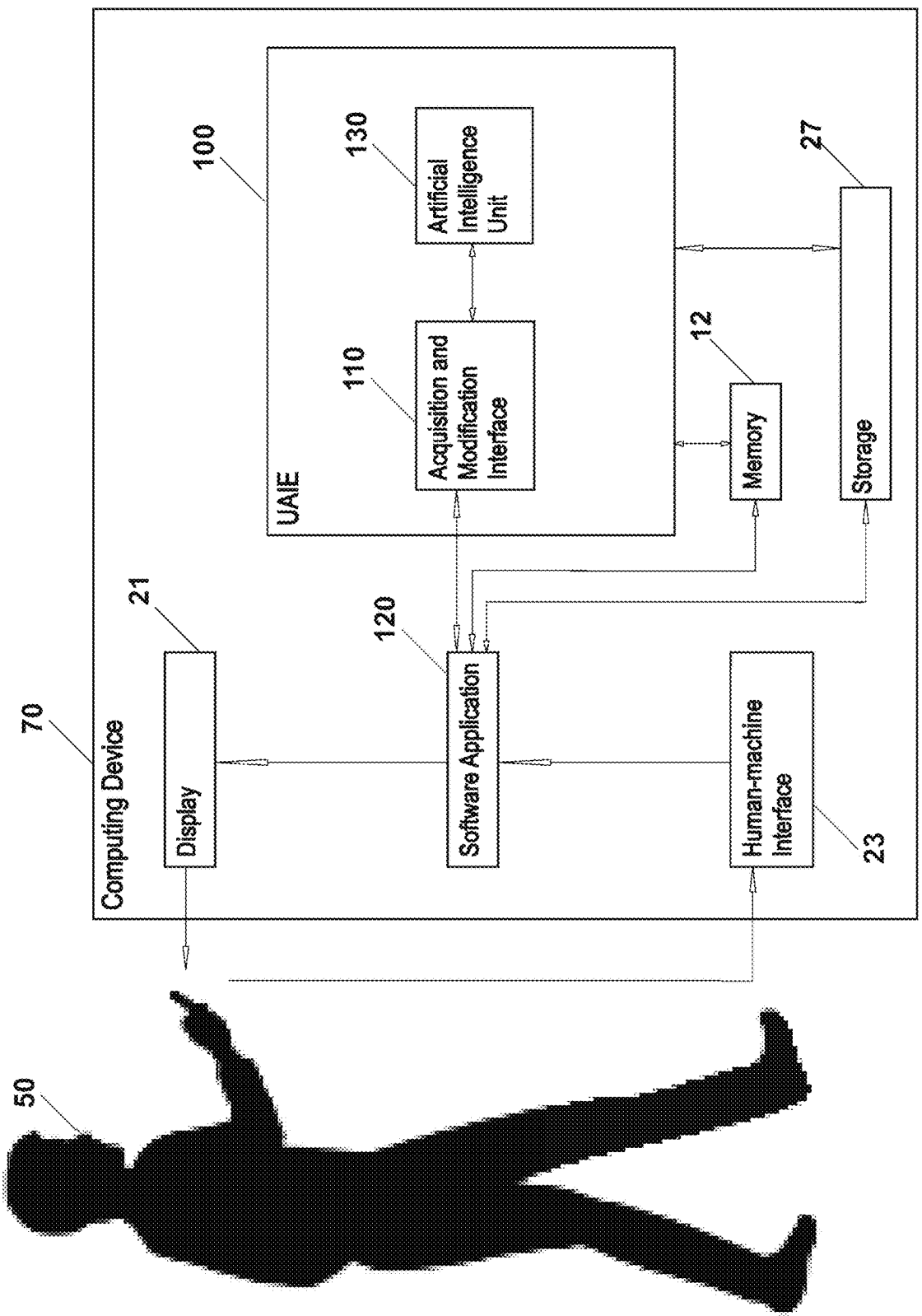
FIG. 2 is a diagram showing an embodiment of UAIE implemented on Computing Device 70.

Referring to FIG. 2, an embodiment of UAIE implemented on Computing Device 70 is illustrated. UAIE comprises interconnected Acquisition and Modification Interface 110 and Artificial Intelligence Unit 130. UAIE is coupled with Software Application 120, Memory 12, and Storage 27. Display 21 and Human-machine Interface 23 are also provided in Computing Device 70 as shown. Other additional elements can be included as needed, or some of the disclosed ones can be excluded, or a combination thereof can be utilized in alternate embodiments.

UAIE comprises any hardware, programs, or a combination thereof. UAIE comprises the functionality for learning the operation of a computing device or Software Application 120. UAIE comprises the functionality for storing this knowledge in a knowledgebase, neural network, or other repository. UAIE comprises the functionality for anticipating a computing device's or Software Application's 120 operations. UAIE comprises the functionality for enabling autonomous operation of a computing device or Software Application 120 with partial, minimal, or no user input. UAIE comprises the functionality for interfacing with or attaching to a computing device or Software Application 120. UAIE comprises the functionality for obtaining instructions, data, and/or other information used, implemented, and/or executed by a computing device or Software Application 120. UAIE also comprises other functionalities disclosed herein. In some embodiments, UAIE can be implemented in a device (i.e. microchip, circuitry, electronic device, computing device, special or general purpose processor, etc.) or system that comprises (i.e. hard coded, internally stored, etc.) or is provided with (i.e. externally stored, etc.) instructions for implementing UAIE functionalities. As such, UAIE and/or any of its elements comprise the processing, memory, storage, and/or other features and embodiments of Processor 11 and/or other elements of Computing Device 70. Such device or system can operate on its own, be embedded in another device or system, work in combination with other devices or systems, or be available in any other configuration. In other embodiments, UAIE can be implemented as a computer program and executed by one or more Processors 11 as previously described. As such, UAIE and/or any of its elements can be implemented in one or more modules or units of a single or multiple computer programs. In yet other embodiments, UAIE may be included in Alternative Memory 16 that provides instructions for implementing UAIE functionalities to one or more Processors 11. In further embodiments, UAIE can be implemented as network, web, distributed, cloud, or other such application accessed on one or more remote computing devices via Network Interface 25, such remote computing devices including processing capabilities and instructions for implementing UAIE functionalities. In some aspects, UAIE may be attached to or interfaced with any computing device or software application, UAIE may be included as a feature of an operating system running on a computing device, UAIE may be built (i.e. hard coded, etc.) into any computing device or software application, and/or UAIE may be available in any other configuration to provide its functionalities.

In one example, UAIE can be interfaced or connected with one or more registers (later described) of Processor 11, thereby enabling UAIE to read and change the registers to implement UAIE functionalities. In another example, UAIE can be installed as a separate computer program that attaches to or interfaces with, inspects, and/or modifies another computer program or application to implement UAIE functionalities.

In a further example, the teaching presented by the disclosure can be implemented in a device or system for autonomous application operating. The device or system may include a processor coupled to a memory unit. The device or system may further include an application, running on the processor, for performing operations on a computing device. The device or system may further include an interface for receiving a first instruction set and a second instruction set, the interface further configured to receive a new instruction set, wherein the first, the second, and the new instruction sets are executed by the processor and are part of the application for performing operations on the computing device. The device or system may further include a knowledgebase, neural network, or other repository configured to store at least one portion of the first instruction set and at least one portion of the second instruction set, the knowledgebase, neural network, or other repository comprising a plurality of portions of instruction sets. The device or system may further include a decision-making unit configured to compare at least one portion of the new instruction set with at least one portion of the first instruction set from the knowledgebase, neural network, or other repository. The decision-making unit may also be configured to determine that there is a substantial similarity between the new instruction set and the first instruction set from the knowledgebase, neural network, or other repository. The processor may then be caused to execute the second instruction set from the knowledgebase, neural network, or other repository. Any of the operations of the described elements can be performed repeatedly and/or in different orders in alternate embodiments. Specifically, in this example, Processor 11 can be implemented as a device or processing circuit that receives Software Application's 120 instructions, data, and/or other information from Memory 12. Processor 11 may use, implement, or execute Software Application's 120 instructions, data, and/or other information. Software Application 120 may receive User's 50 operating instructions via Human-machine Interface 23 or another input device, perform corresponding operations, and produce results that can be presented via Display 21 or another output device. Acquisition and Modification Interface 110 can also be implemented as a device or processor that receives or obtains Software Application's 120 instructions, data, and/or other information used, implemented, and/or executed by Processor 11. Artificial Intelligence Unit 130 can also be implemented as a device or processor that comprises Knowledgebase 530 (later described) or Neural Network 850 (later described), Decision-making Unit 540 (later described), and/or other elements. Acquisition and Modification Interface 110 may provide Software Application's 120 instructions, data, and/or other information to Artificial Intelligence Unit 130. Artificial Intelligence Unit 130 may learn the operation of Software Application 120 by storing the knowledge of its operation into Knowledgebase 530, Neural Network 850, or other repository. Decision-making Unit 540 may then anticipate or determine Software Application's 120 instructions, data, and/or other information most likely to be used, implemented, or executed in the future. Acquisition and Modification Interface 110 may modify Software Application 120 or cause Processor 11 to implement or execute the anticipated instructions, data, and/or other information, thereby enabling autonomous operation of a computing device or Software Application 120 with partial, minimal, or no user input. Acquisition and Modification Interface 110 (or its functionalities), Artificial Intelligence Unit 130 (or its functionalities), and/or other disclosed elements can be implemented as separate or integrated hardware components or processors, they can be implemented as a single program or objects/modules/functions of one or more programs operating on Processor 11, they can be provided in other suitable configurations, or a combination thereof in alternate embodiments. In some designs, Artificial Intelligence Unit 130 comprises some or all of the functionalities of other disclosed elements such as Acquisition and Modification Interface 110 in which case the elements whose functionalities are integrated with Artificial Intelligence Unit 130 can be omitted. The device or system for autonomous application operating can also include any actions or operations of any of the disclosed methods such as methods 6100, 6200, 6300, 6400, 7100, 7200, 7300, and 7400 (all later described).

In a further example, UDMI can be implemented as a Java Micro Edition (ME), Java Standard Edition (SE), or other Java Edition (also referred to as Java or Java platform) application or program. Java ME is generally designed for mobile and embedded devices that provides a robust and flexible environment for application programs including flexible user interfaces, robust security, built-in network protocols, powerful application programming interfaces, database or DBMS connectivity and interfacing functionalities, file manipulation capabilities, support for networked and offline applications, and/or other features or functionalities. Application programs based on Java ME can be portable across many devices, yet leverage each device's native capabilities. The feature-rich Java SE is generally designed for traditional computing devices, but more mobile and embedded devices continue to support it. Java SE supports the feature sets of most smartphones and a broad range of high-end connected devices while still fitting within their resource constraints. Java platforms include one or more basic application programming interfaces (APIs) and virtual machine features comprising a runtime environment for application programs such as some embodiments of UDMI. Java platforms provide a wide range of user-level functionalities that can be implemented in application programs such as an Internet browser, displaying text and graphics, playing and recording audio content, displaying and recording visual content, communicating with another computing device, and/or other functionalities. In one example, UDMI can be implemented as a Xlet within a Java platform. A Xlet may include a Java applet or application configured to execute on a mobile, embedded, and/or other computing device. UDMI is programming language, platform, and operating system independent. Programming languages that can be used in addition to Java include C, C++, Cobol, Python, Java Script, Tcl, Visual Basic, Pascal, VB Script, Pen, PHP, Ruby, and/or other programming languages capable of implementing the functionalities described herein.

Software Application 120 (also referred to as application, software, program, script, or other such reference) comprises the functionality for performing operations on Computing Device 70, and/or other functionalities. As Software Application 120 provides functionality or operations on Computing Device 70 and Computing Device 70 executes Software Application 120 to gain the functionality or operations, the two may be used interchangeably herein in some contexts. Software Application 120 comprises a collection of instructions (i.e. instruction sets, etc.), which upon implementation or execution by processor, may cause Computing Device 70 to perform operations or tasks for which Software Application 120 is designed. Instructions or instruction sets may include source code, byte code, compiled, interpreted, or otherwise translated code, machine or object code, and/or other code. Software Application 120 can be delivered in various forms such as, for example, executable files, libraries, scripts, plugins, addons, applets, interfaces, console applications, web applications, application service provider (ASP) type applications, operating systems, and/or other forms. The disclosed devices, apparatuses, systems, and/or methods are independent of the type of programming language, platform, or compiler, interpreter, or other translator used to implement Software Application 120. The following is a very simple example of Software Application 120 created in Java programming language.

```
public class HelloWorldApp {
public static void main(String[ ] args) {
System.out.println("Hello World!"); //Display the string
}
}
```

In some embodiments, Software Application 120 can be an abstraction layer in a computing system and, as such, Software Application 120 can interact or interface with other layers. For example, Software Application 120 can be an abstraction layer that includes user interface and performs desired user operations, database or DBMS can be another layer that stores data needed in Software Application 120, and/or other abstraction layers can perform other tasks in the overall computing system. In this type of layered architecture, Software Application 120 may interact or interface with the underlying database or DBMS, and/or other abstraction layers, which themselves can implement artificial intelligence techniques described herein. Software Application 120 may be one of the applications stored in Software 18 and it includes all features, functionalities, and embodiments of Software 18.

User 50 (also referred to simply as user, etc.) comprises a human user or non-human user. A non-human User 50 includes any device, system, program, and/or other mechanism for controlling or manipulating Software Application 120, and/or other disclosed elements. User 50 may issue an operating instruction to Software Application 120 responsive to which Software Application's 120 internal instructions or instruction sets may be executed to perform a desired operation on Computing Device 70. User's 50 operating instructions comprise any user inputted data (i.e. values, text, symbols, etc.), directions (i.e. move right, move up, move forward, copy an item, click on a link, etc.), instructions (i.e. manually inputted instructions, etc.), and/or other data, information, instructions, operations, and/or inputs. The term operating instruction when used casually may refer to an instruction (i.e. instruction set, etc.) to be executed in Software Application 120, and User 50 can issue both an operating instruction to Software Application 120 as well as an instruction to be executed in Software Application 120. Therefore, the terms operating instruction and instruction may be used interchangeably herein in some contexts. A non-human User 50 can utilize more suitable interfaces instead of, or in addition to, Human-machine Interface 23 and Display 21 for controlling Software Application 120 and/or other disclosed elements. Examples of such interfaces include application programming interface (API), bridge (i.e. bridge between applications or devices, etc.), driver, socket, direct or operative connection, handle, and/or other interfaces.

Figure 3:
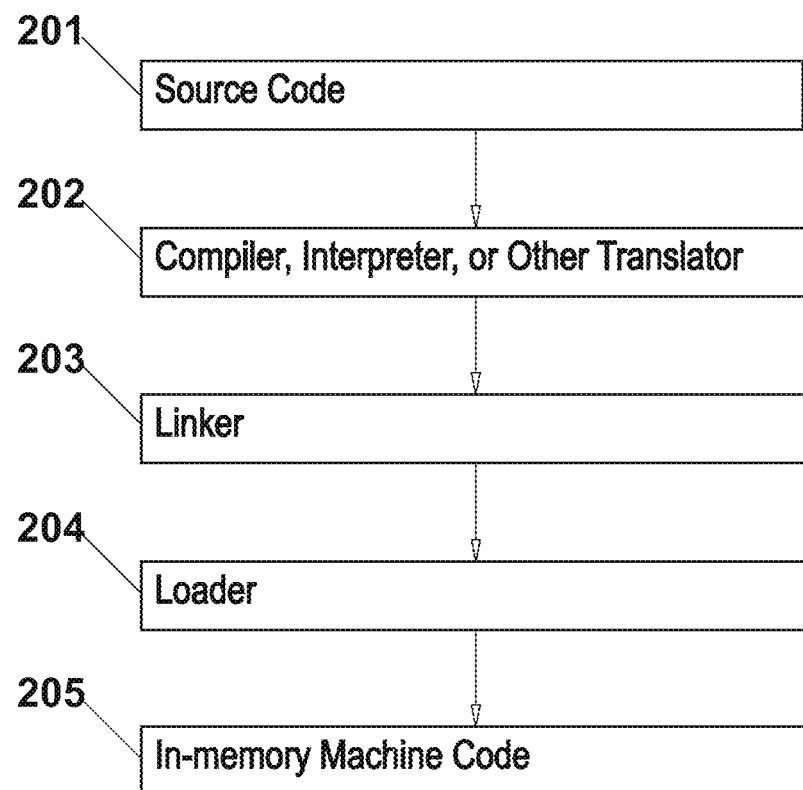
FIG. 3 illustrates an embodiment of typical elements or steps that may lead to Software Application's 120 execution on Computing Device 70.

Referring to FIG. 3, an embodiment is illustrated with typical elements or steps that lead to Software Application's 120 execution on Computing Device 70. Source Code 201 can be written in a high-level programming language (i.e. Java, C++, etc.), a low-level programming language (i.e. assembly language etc.), or machine language. In some embodiments, Compiler, Interpreter, or Other Translator 202 is utilized to convert source code directly into machine code. In further embodiments, Linker 203 is utilized to link any libraries, packages, objects, or other needed elements with Software Application 120. In yet some embodiments, Loader 204 is utilized to load Software Application 120 including any linked libraries, packages, objects, or other needed elements into Memory 12. In-memory Machine Code 205 can then be executed by Processor 11. In-memory Machine Code 205 may include binary values forming processor instructions (i.e. instruction sets, etc.) that can change computer state. For example, an instruction or instruction set can perform a computation, change a value stored in a particular storage location, cause something to appear on a display of the computer system, and/or perform other operations. Additional elements or steps such as virtual machine, bytecode compiler, interpreter, or other translator, pre-processor, and/or other elements can be included, or some of the disclosed ones can be excluded, or a combination thereof can be utilized in alternate implementations of Software Application's 120 creation and/or execution. In one example, source code may be compiled, interpreted or otherwise translated into bytecode that a virtual machine or other system can convert into machine code. In another example, source code may be compiled, interpreted or otherwise translated into any intermediary code such as assembly or other code that assembler, compiler, interpreter, translator, or other system can convert into machine code.

Software Application 120 comprises instructions or instruction sets, which, when processed or executed by Processor 11, can cause Computing Device 70 to perform corresponding operations as previously described. When the disclosed UAIE functionalities are applied on Computing Device 70 or Software Application 120, Computing Device 70 or Software Application 120 may become autonomous computing device or software application (collectively or separately referred to as autonomous application as per context). Therefore, autonomous application comprises Computing Device 70 and/or Software Application 120 along with UAIE or UAIE functionalities. UAIE may take control from, share control with, or release control to Computing Device 70 and/or Software Application 120 or its objects to implement autonomous application operation. In some aspects, autonomous application comprises anticipatory instructions (i.e. instruction sets, etc.) that user did not issue or cause to be executed. Such anticipatory instructions (i.e. instruction sets, etc.) include instructions that user may want or is likely to issue or cause to be executed. Anticipatory instructions or instruction sets can be generated by UAIE or any of its elements. As such, an autonomous application may include some or all original instructions (i.e. instruction sets, etc.) of Software Application 120 and/or any anticipatory instructions (i.e. instruction sets, etc.) generated by UAIE. Therefore, autonomous application operating may include executing some or all original instructions or instruction sets of Software Application 120 and/or any anticipatory instructions or instruction sets generated by UAIE. In some embodiments, UAIE can overwrite or rewrite the original instructions (i.e. instruction sets, etc.) of Software Application 120 with UAIE-generated instructions (i.e. instruction sets, etc.). In other embodiments, UAIE can insert or embed UAIE-generated instructions (i.e. instruction sets, etc.) among the original instructions (i.e. instruction sets, etc.) of Software Application 120. In further embodiments, UAIE can branch, redirect, or jump to UAIE-generated instructions (i.e. instruction sets, etc.) from the original instructions (i.e. instruction sets, etc.) of Software Application 120.

In some embodiments, autonomous application operating can be implemented with partial, minimal, or no user input. In an example involving autonomous application operating with partial user input, a user can issue or cause to be executed one or more instructions or instruction sets and UAIE may anticipate subsequent one or more instructions or instruction sets. In an example involving autonomous application operating with minimal user input, a user can issue or cause to be executed a portion of an instruction (i.e. instruction sets, etc.) and UAIE may anticipate the rest of the instruction (i.e. instruction sets, etc.) along with any subsequent instructions or instruction sets. In an example involving autonomous application operating with no user input, UAIE may anticipate any instructions (i.e. instruction sets, etc.) based on the disclosed UAIE functionalities. In other embodiments, autonomous application operating comprises determining, by UAIE, a next instruction (i.e. instruction set, etc.) to be executed prior to the user issuing or causing to be executed the next instruction (i.e. instruction set, etc.). In further embodiments, autonomous application operating comprises determining, by UAIE, a next instruction (i.e. instruction set, etc.) to be executed prior to the system receiving the next instruction (i.e. instruction set, etc.). In yet further embodiments, autonomous application operating includes a partially or fully autonomous operating. In an example involving partially autonomous application operating, a user confirms UAIE-generated instructions or instruction sets prior to their execution. In an example involving fully autonomous application operating, UAIE-generated instructions (i.e. instruction sets, etc.) are executed without user or other system confirmation. In further embodiments, autonomous application operating comprises generating, by UAIE, and executing, by a processor, instructions (i.e. instruction sets, etc.) related to or associated with an object, a data structure, a repository, a thread, or a function of the application. In yet other embodiments, autonomous application operating comprises generating instructions (i.e. instruction sets, etc.) by a non-UAIE system or process, and executing the instructions (i.e. instruction sets, etc.) by a processor.

Figure 4:
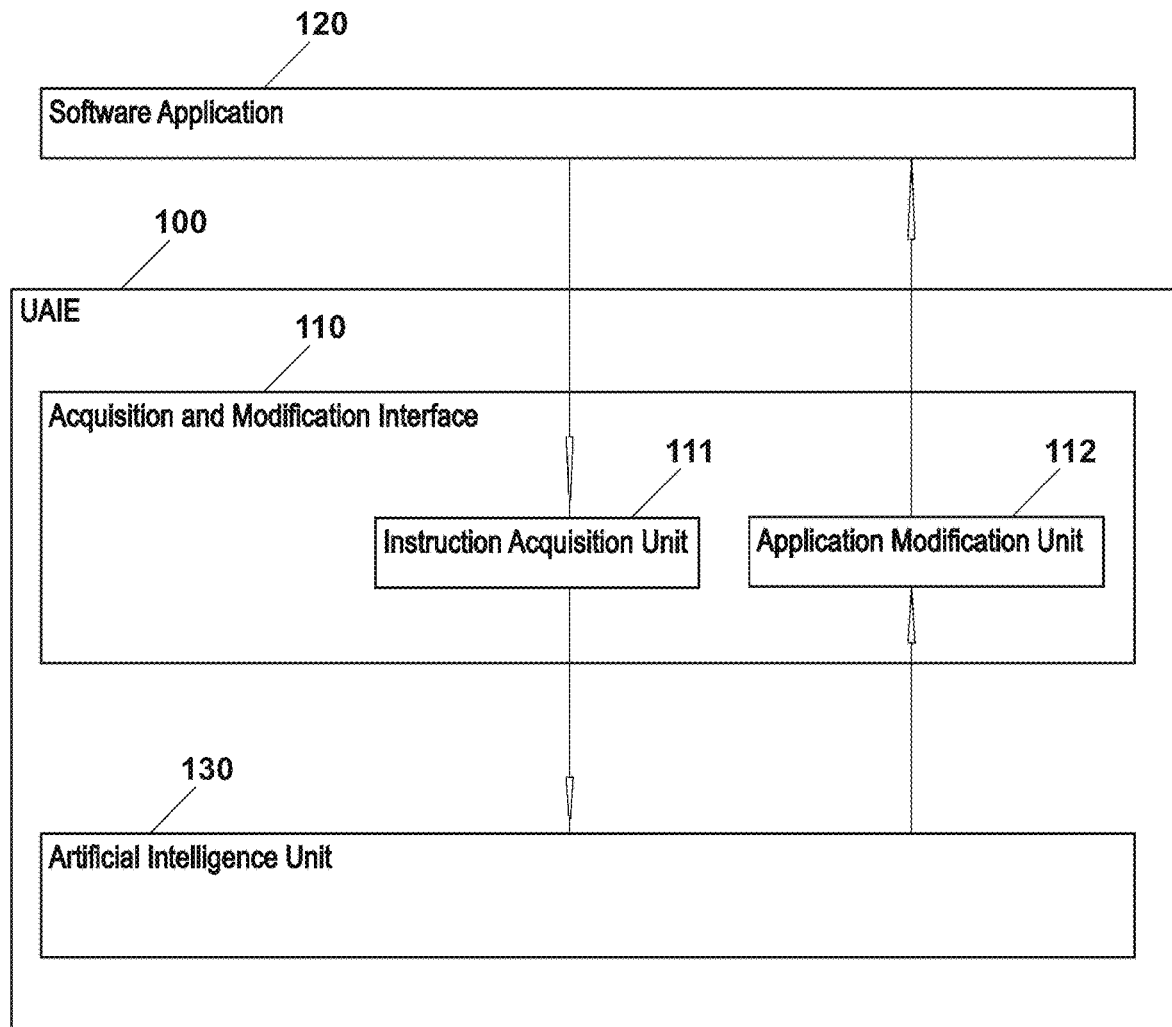
FIG. 4 is a diagram showing an embodiment of Acquisition and Modification Interface 110.

Referring to FIG. 4, an embodiment of Acquisition and Modification Interface 110 is illustrated. Acquisition and Modification Interface 110 comprises the functionality for interfacing between Artificial Intelligence Unit 130 and Software Application 120 or Computing Device 70 elements, and/or other functionalities. Acquisition and Modification Interface 110 comprises the functionality for attaching Artificial Intelligence Unit 130 to Software Application 120 or Computing Device 70 elements. Additionally, Acquisition and Modification Interface 110 comprises the functionality to direct or control the flow of instructions, data, and/or other information among the elements of UAIE and Software Application 120 or Computing Device 70 elements. In some aspects, Acquisition and Modification Interface 110 includes Instruction Acquisition Unit 111 and Application Modification Unit 112. Other additional elements can be included as needed, or some of the disclosed ones can be excluded, or a combination thereof can be utilized in alternate embodiments.

Instruction Acquisition Unit 111 comprises the functionality for obtaining or receiving Software Application's 120 instructions (i.e. instruction sets, etc.), data, and/or other information, and/or other functionalities. Instruction Acquisition Unit 111 comprises the functionality for obtaining Software Application's 120 instructions (i.e. instruction sets, etc.), data, and/or other information during Software Application's 120 execution (i.e. runtime). An instruction may include any computer command, instruction set, operation, statement, or other instruction used in an application. Therefore, the terms instruction, command, instruction set, operation, statement, or other such terms may be used interchangeably herein. Data may include user inputs, variables, parameters, values, and/or other data used in an application. Other information may include objects, data structures, contextual information, and/or other information used in an application. Instruction Acquisition Unit 111 also comprises the functionality for attaching to or interfacing with Software Application 120 and/or Computing Device 70 elements. In one example, Instruction Acquisition Unit 111 comprises the functionality to access and/or read runtime engine/environment, virtual machine, operating system, compiler, just-in-time (JIT) compiler, interpreter, translator, execution stack, program counter, memory, processor registers, files, objects, data structures, and/or other computing system elements. In another example, Instruction Acquisition Unit 111 comprises the functionality to access and/or read functions, methods, procedures, routines, subroutines, and/or other elements of an application. In a further example, Instruction Acquisition Unit 111 comprises the functionality to access and/or read source code, bytecode, compiled, interpreted, or otherwise translated code, machine code, and/or other code. In a further example, Instruction Acquisition Unit 111 comprises the functionality to access and/or read values, variables, parameters, and/or other data or information. Instruction Acquisition Unit 111 also comprises the functionality for transmitting the obtained instructions, data, and/or other information to Artificial Intelligence Unit 130. As such, Instruction Acquisition Unit 111 provides input into Artificial Intelligence Unit 130 for knowledge structuring, decision making, anticipating, and/or other functionalities later in the process.

In some embodiments, UAIE can be selective in learning Software Application's 120 instructions, data, and/or other information to those implemented, utilized, or related to a specific object, data structure, repository, thread, function, and/or other specific element. In one example, Instruction Acquisition Unit 111 can obtain Software Application's 120 instructions, data, and/or other information implemented, utilized, or related to a certain object in an object oriented Software Application 120. In another example, Instruction Acquisition Unit 111 can obtain moves, behaviors, and/or other actions implemented, utilized, or related to a player's character or avatar in a computer game application. In a further example, Instruction Acquisition Unit 111 can obtain user's clicks implemented, utilized, or related to mouse click event handler in a web browser application. In a further example, Instruction Acquisition Unit 111 can obtain instructions, data, and/or other information implemented, utilized, or related to a specific document in a word processing application. In a further example, Instruction Acquisition Unit 111 can obtain database instructions, data, and/or other information implemented, utilized, or related to a specific database in a database management system (DBMS) application.

Instruction Acquisition Unit 111 can employ various techniques for attaching to and/or obtaining Software Application's 120 instructions, data, and/or other information. In one example, Instruction Acquisition Unit 111 can attach to and/or obtain Software Application's 120 instructions, data, and/or other information through tracing or profiling, or other techniques. Tracing or profiling is used in software design as a technique of outputting an application's instructions, data, and/or other information during the application's execution (runtime). Tracing or profiling may include adding trace code (i.e. instrumentation, etc.) to an application and/or outputting trace information to a specific target. The outputted trace information (i.e. Software Application's 120 instructions, data, and/or other information, etc.) can then be provided to or recorded into a file, a table, a database, a DBMS, a data structure, a repository, an application, and/or other system or target that may receive such trace information. As such, Instruction Acquisition Unit 111 can utilize tracing or profiling to obtain Software Application's 120 instructions, data, and/or other information and provide them as input into Artificial Intelligence Unit 130 that may structure them into knowledge for future autonomous operation of Software Application 120. In some aspects, instrumentation can be performed in source code, bytecode, compiled, interpreted, or otherwise translated code, machine code, and/or other code. In other aspects, instrumentation can be performed in various elements of a computing system such as memory, virtual machine, runtime engine/environment, operating system, compiler, interpreter, translator, processor registers, execution stack, program counter, and/or other elements. In yet other aspects, instrumentation can be performed in various abstraction layers of a computing system such as in software layer (i.e. Software Application 120, etc.), in virtual machine (if VM is used), in operating system, in processor, and/or in other layers or areas that may exist in a particular computing system implementation. In yet other aspects, instrumentation can be performed at various time periods in an application's execution such as source code write time, compile time, interpretation time, translation time, linking time, loading time, runtime, and/or other time periods. In yet other aspects, instrumentation (and therefore knowledge structuring) can be performed at various granularities or code segments such as some or all lines of code, some or all statements, some or all instructions (i.e. instruction sets, etc.), some or all basic blocks, some or all functions/routines/subroutines, and/or some or all other code segments.

In some embodiments, Software Application 120 can be automatically instrumented. In one example, Instruction Acquisition Unit 111 can access Software Application's 120 source code, bytecode, or machine code and select instrumentation points of interest. Selecting instrumentation points may include finding portions of the source code, bytecode, or machine code corresponding to function calls, function entries, function exits, object creations, object destructions, event handler calls, new lines (i.e. to instrument al lines of code, etc.), thread creations, throws, and/or other portions of code. Instrumentation code can then be inserted at the instrumentation points of interest to output Software Application's 120 instructions, data, and/or other information. The instrumented Software Application 120 may then be executed at which time the inserted instrumentation code is executed to perform its functionalities. In response to executing instrumentation code, Software Application's 120 instructions, data, and/or other information may be received by Instruction Acquisition Unit 111 and provided to Artificial Intelligence Unit 130. In some aspects, Software Application's 120 source code, bytecode, or machine code can be dynamically instrumented. For example, instrumentation code can be dynamically inserted into Software Application 120 at runtime. Any instrumentation may also include additional instrumentation code to enable, disable, reset, or otherwise manage or control specific instrumentation code.

In other embodiments, Software Application 120 can be manually instrumented. In one example, a programmer can instrument a function call by placing an instrumenting instruction immediately after the function call as in the following example.

loadPage("http://www.youtube.com", activeWindow.tabs.activeTab);
traceApplication('loadPage("http://www.youtube.com", activeWindow.tabs.activeTab);');

In another example, an instrumenting instruction can be placed immediately before the function call, or at the beginning, end, or anywhere within the function itself. A programmer may instrument all function calls or only function calls of interest. In yet another example, a programmer can instrument al lines of code within Software Application 120 or only code lines of interest. Instrumenting all lines of code may provide the most detail about the operation of Software Application 120. In yet another example, a programmer can instrument other elements or operations utilized or implemented within Software Application 120 such as objects and/or any of their functions or operations, event handlers and/or any of their functions or operations, memory and/or any of its functions or operations (i.e. allocation, etc.), threads and/or any of their functions or operations, and/or other such elements or operations. Similar instrumentation as in preceding examples can be performed automatically or dynamically as previously described. In some embodiments where manual code instrumentation is utilized, Instruction Acquisition Unit 111 can optionally be omitted and Software Application's 120 instructions, data, and/or other information may be transmitted directly to Artificial Intelligence Unit 130.

One of ordinary skill in art will understand that, while all possible variations of the techniques to obtain Software Application's 120 instructions, data, and/or other information are too voluminous to list, all of these techniques are within the scope of this disclosure in various implementations. Various computing systems and/or platforms may provide native tools for application tracing or profiling, or other techniques. Also, independent software vendors may provide portable tools with similar functionalities that can be utilized across different computing systems and/or platforms. These native and portable tools may provide a wide range of functionalities to obtain runtime and other information on a software application such as outputting custom text messages, logging application or system errors and warnings, outputting objects or data structures, outputting binary data, tracing function/routine/subroutine invocations, following and outputting variable values, outputting thread or process behaviors, performing live application monitoring via network or pipes, outputting call or other stacks, outputting processor registers, providing runtime memory access, and/or other capabilities. In some aspects, obtaining an application's instructions, data, and/or other information comprises introspection, which includes the ability to examine the type or properties of an object at runtime.

In one example, attaching to and/or obtaining an application's instructions, data, and/or other information can be implemented through the .NET platform's native tools for application tracing or profiling such as System.Diagnostics.Trace, System.Diagnostics.Debug, and System.Diagnostics.TraceSource classes for tracing execution flow, and System.Diagnostics.Process, System.Diagnostics.EventLog, and System.Diagnostics.PerformanceCounter classes for profiling code, accessing local and remote processes, starting and stopping system processes, and interacting with Windows event logs, etc. For example, a set of trace switches can be created that output an application's information. The switches can be configured using the .config file. For a Web application, this may typically be Web.config file associated with the project. In a Windows application, this file may typically be named applicationName.exe.config. Trace code can be added to the application code automatically or manually as previously described. Appropriate listener can be created where the trace output is received. Trace code may output trace messages to a specific target such as a file, a log, a database, a DBMS, an object, a data structure, and/or other repository or system. Instruction Acquisition Unit 111 or Artificial Intelligence Unit 130 can then read or obtain the trace information from these targets. In some aspects, trace code may output trace messages directly to Instruction Acquisition Unit 111. In other aspects, trace code may output trace messages directly to Artificial Intelligence Unit 130. In the case of outputting trace messages to Instruction Acquisition Unit 111 or directly to Artificial Intelligence Unit 130, custom listeners can be built to accommodate these specific targets. Other platforms, tools, and/or techniques can provide equivalent or similar functionalities as the above described ones.

In another example, attaching to and/or obtaining an application's instructions, data, and/or other information can be implemented through the .NET platform's Profiling API that can be used to create a custom profiler application for tracing, monitoring, interfacing with, and/or managing a profiled application. The Profiling API provides an interface that includes methods to notify the profiler of events in the profiled application. The Profiling API may also provide an interface to enable the profiler to call back into the profiled application to obtain information about the state of the profiled application. The Profiling API may further provide call stack profiling functionalities. Call stack (also referred to as execution stack, control stack, runtime stack, machine stack, the stack, etc.) includes a data structure that can store information about active subroutines of a computer program. The Profiling API may provide a stack snapshot method, which enables a trace of the stack at a particular point in time. The Profiling API may also provide a shadow stack method, which tracks the call stack at every instant. A shadow stack can obtain function arguments, return values, and information about generic instantiations. A function such as FunctionEnter can be utilized to notify the profiler that control is being passed to a function and can provide information about the stack frame and function arguments. A function such as FunctionLeave can be utilized to notify the profiler that a function is about to return to the caller and can provide information about the stack frame and function return value. An alternative to call stack profiling includes call stack sampling in which the profiler can periodically examine the stack. The method at the top of the stack may be assumed to have been running since the last examination and can be outputted as a trace message. In some aspects, the Profiling API enables the profiler to change the in-memory code stream for a routine before it is just-in-time (JIT) compiled where the profiler can dynamically add instrumentation code to all or particular routines of interest. Other platforms, tools, and/or techniques may provide equivalent or similar functionalities as the above described ones.

In a further example, attaching to and/or obtaining an application's instructions, data, and/or other information can be implemented through Java platform's APIs for application tracing or profiling such as Java Virtual Machine Profiling Interface (JVMPI), Java Virtual Machine Tool Interface (JVMTI), and/or other APIs or tools. These APIs can be used for instrumentation of an application, for notification of Java Virtual Machine (VM) events, and/or other functionalities. One of the profiling techniques that can be utilized includes bytecode instrumentation. The profiler can insert bytecodes into all or some of the classes. In application execution profiling, for example, these bytecodes may include methodEntry and methodExit calls. In memory profiling, for example, the bytecodes may be inserted after each new or after each constructor. In some aspects, insertion of instrumentation bytecode can be performed either by a post-compiler or a custom class loader. An alternative to bytecode instrumentation includes monitoring events generated by the JVMPI or JVMTI interfaces. Both APIs can generate events for method entry/exit, object allocation, and/or other events. In some aspects, JVMTI can be utilized for dynamic bytecode instrumentation where insertion of instrumentation bytecodes is performed at runtime. The profiler may insert the necessary instrumentation when a selected class is invoked in an application. This can be accomplished using the JVMTI's redefineClasses method, for example. This approach also enables changing of the level of profiling as the application is running. If needed, these changes can be made adaptively without restarting the application. Other platforms, tools, and/or techniques may provide equivalent or similar functionalities as the above described ones.

In a further example, attaching to and/or obtaining an application's instructions, data, and/or other information can be implemented through JVMTI's programming interface that enables creation of software agents that can monitor and control a Java application. An agent may use the functionality of the interface to register for notification of events as they occur in the application, and to query and control the application. A JVMTI agent may use JVMTI functions to extract information from a Java application. A JVMTI agent can be utilized to obtain an application's runtime information such as method calls, memory allocation, CPU utilization, lock contention, and/or other information. JVMTI may include functions to obtain information about variables, fields, methods, classes, and/or other information. JVMTI may also provide notification for numerous events such as method entry and exit, exception, field access and modification, thread start and end, and/or other events. Examples of JVMTI built-in methods include GetMethodName to obtain the name of an invoked method, GetThreadInfo to obtain information for a specific thread, GetClassSignature to obtain information about the class of an object, GetStackTrace to obtain information about the stack including information about stack frames, and/or other methods. Other platforms, tools, and/or techniques may provide equivalent or similar functionalities as the above described ones.

In a further example, attaching to and/or obtaining an application's instructions, data, and/or other information can be implemented through java.lang.Runtime class that provides an interface for application tracing or profiling.

Examples of methods provided in java.lang.Runtime that can be used to obtain an application's instructions, data, and/or other information include tracemethodcalls, traceinstructions, and/or other methods. These methods prompt the Java Virtual Machine to output trace information for a method or instruction in the virtual machine as it is executed. The destination of trace output may be system dependent and include a file, a listener, and/or other destinations where Instruction Acquisition Unit 111, Artificial Intelligence Unit 130, and/or other disclosed elements can access needed information. Other platforms, tools, and/or techniques may provide equivalent or similar functionalities as the above described ones.

In addition to tracing or profiling tools native to their respective computing systems and/or platforms, many independent tools exist that provide tracing or profiling functionalities on more than one computing system and/or platform. Examples of these tools include Pin, DynamoRIO, KernInst, DynInst, Kprobes, OpenPAT, DTrace, SystemTap, and/or others.

In a further example, attaching to and/or obtaining an application's instructions, data, and/or other information can be implemented through logging tools of the platform and/or operating system on which an application runs. Logging tools may include nearly full feature sets of the tracing or profiling tools previously described. In one example, Visual Basic enables logging of runtime messages through its Microsoft.VisualBasic.Logging namespace that provides a log listener where the log listener may direct logging output to a file and/or other target. In another example, Java enables logging through its java.util.logging class. In some aspects, obtaining an application's instructions, data, and/or other information can be implemented through logging capabilities of the operating system on which an application runs. For example, Windows NT features centralized log service that applications and operating-system components can utilize to report their events including any messages. Windows NT provides functionalities for system, application, security, and/or other logging. An application log may include events logged by applications. Windows NT, for example, may include support for defining an event source (i.e. application that created the event, etc.). Windows Vista, for example, supports a structured XML log-format and designated log types to allow applications to more precisely log events and to help interpret the events. Examples of different types of event logs include administrative, operational, analytic, debug, and/or other log types including any of their subcategories. Examples of event attributes that can be utilized include eventID, level, task, opcode, keywords, and/or other event attributes. Windows wevtutil tool enables access to events, their structures, registered event publishers, and/or their configuration even before the events are fired. Wevtutil supports capabilities such as retrieval of the names of all logs on a computing device; retrieval of configuration information for a specific log; retrieval of event publishers on a computing device; reading events from an event log, from a log file, or using a structured query; exporting events from an event log, from a log file, or using a structured query to a specific target; and/or other capabilities. Operating system logs can be utilized solely if they contain sufficient information on an application's instructions, data, and/or other information. Alternatively, operating system logs can be utilized in combination with another source of information (i.e. trace information, call stack, processor registers, memory, etc.) to reconstruct the application's instructions, data, and/or other information needed for Artificial Intelligence Unit 130 and/or other disclosed functionalities. In addition to logging capabilities native to their respective platforms and/or operating systems, many independent tools exist that provide logging on different platforms and/or operating systems. Examples of these tools include Log 4j, Logback, SmartInspect, NLog, log 4net, Microsoft Enterprise Library, ObjectGuy Framework, and/or others. Other platforms, tools, and/or techniques may provide equivalent or similar functionalities as the above described ones.

In some aspects, attaching to and/or obtaining an application's instructions, data, and/or other information can be implemented through tracing or profiling the operating system on which an application runs. As in tracing or profiling an application, one of the techniques that can be utilized includes adding instrumentation code to the operating system's source code before kernel compilation or recompilation. This type of instrumentation may involve defining or finding locations in the operating system's source code where instrumentation code is inserted. Kernel instrumentation can also be performed without the need for kernel recompilation or rebooting. In some aspects, instrumentation code can be added at locations of interest through binary rewriting of compiled kernel code. In other aspects, kernel instrumentation can be performed dynamically where instrumentation code is added and/or removed where needed at runtime. Dynamic instrumentation may overwrite kernel code with a branch and/or trap instruction that redirects execution to instrumentation code or instrumentation routine. In yet other aspects, kernel instrumentation can be performed using just-in-time (JIT) dynamic instrumentation where execution may be redirected to a copy of kernel's code segment that includes instrumentation code. This type of instrumentation may include a JIT compiler and creation of a copy of the original code segment having instrumentation code or calls to instrumentation routines embedded into the original code segment. Instrumentation of the operating system may enable total system visibility including visibility into an application's behavior by enabling generation of low level trace information. Other platforms, tools, and/or techniques may provide equivalent or similar functionalities as the above described ones.

In some aspects, attaching to and/or obtaining an application's instructions, data, and/or other information can be implemented through tracing or profiling the processor on which an application runs. For example, some Intel processors provide Intel Processor Trace (i.e. Intel PT, etc.), a low-level tracing feature that enables recording executed instructions, and/or other data or information of one or more applications. Intel PT is facilitated by the Processor Trace Decoder Library along with its related tools. Intel PT is a low-overhead execution tracing feature that records information about application execution on each hardware thread using dedicated hardware facilities. The recorded execution/trace information is collected in data packets that can be buffered internally before being sent to a memory subsystem or any element or system in general (i.e. Instruction Acquisition Unit 111, Artificial Intelligence Unit, etc.). Intel PT also enables navigating the recorded execution/trace information via reverse stepping commands. Intel PT can be included in an operating system's core files and provided as a feature of the operating system. Intel PT can trace globally some or all applications running on an operating system. Instruction Acquisition Unit 111 or Artificial Intelligence Unit 130 can read or obtain the recorded execution/trace information from Intel PT for implementation of UAIE functionalities. Other platforms, tools, and/or techniques may provide equivalent or similar functionalities as the above described ones.

In a further example, attaching to and/or obtaining an application's instructions, data, and/or other information can be implemented through branch tracing or profiling. Branch tracing may include an abbreviated instruction trace in which only the successful branch instructions are traced or recorded. Branch tracing can be implemented through utilizing dedicated processor commands, for example. Executed branches may be saved into special branch trace store area of memory. With the availability and reference to a compiler listing of the application together with a branch trace information, a full path of executed instructions can be reconstructed if needed. The full path can also be reconstructed with a memory dump (containing the program storage) and a branch trace information. In some aspects, branch tracing can be utilized for pre-learning or automated learning of an application's instructions, data, and/or other information where a number of application simulations (i.e. simulations of likely/common operations, etc.) are performed. As such, UAIE may learn the application's operation automatically saving the time that would be needed to learn the application's operation from a user. Other platforms, tools, and/or techniques may provide equivalent or similar functionalities as the above described ones.

In a further example, attaching to and/or obtaining an application's instructions, data, and/or other information can be implemented through assembly language. Assembly language is a low-level programming language for a computer or other programmable device in which there is a strong correlation between the language and the architecture's machine instructions. Syntax, addressing modes, operands, and/or other elements of an assembly language instruction may translate directly into numeric (i.e. binary, etc.) representations of that particular instruction. Because of this direct relationship with the architecture's machine instructions, assembly language can be a powerful tool for tracing or profiling an application's execution in processor registers, memory, and/or other computing device components. For example, using assembly language, memory locations of a loaded application can be accessed, instrumented, and/or otherwise manipulated. In some aspects, assembly language can be used to rewrite or overwrite original in-memory instructions of an application with instrumentation instructions. In other aspects, assembly language can be used to redirect application's execution to instrumentation routine/subroutine or other code segment elsewhere in memory by inserting a jump or trampoline into the application's in-memory code, by redirecting program counter, or by other techniques. Some operating systems may implement protection from changes to applications loaded into memory. Operating system, processor, or other low level commands such as Linux mprotect command or similar commands in other operating systems may be used to unprotect the protected locations in memory before the change. In yet other aspects, assembly language can be used to obtain an application's instructions, data, and/or other information through accessing and/or reading instruction register, program counter, other processor registers, memory locations, and/or other components of the computing system. In yet other aspects, high-level programming languages may call or execute an external assembly language program to facilitate obtaining an application's instructions, data, and/or other information as previously described. In yet other aspects, relatively low-level programming languages such as C may allow embedding assembly language directly in their source code such as, for example, using asm keyword of C. Other platforms, tools, and/or techniques may provide equivalent or similar functionalities as the above described ones.

In a further example, it may be sufficient to obtain user or other inputs, variables, parameters, and/or other data in some procedural, simple object oriented, or other applications to implement Instruction Acquisition Unit 111, Acquisition and Modification Interface 110, and/or other functionalities. For example, a simple procedural application executes a sequence of instructions until the end of the program. During its execution, the application may receive user or other input, store the input in a variable, and perform calculations using the variable to reach a result. The value of the variable can be obtained or traced. In another example, a more complex procedural application comprises a function that itself includes a sequence of instructions. The application may execute a main sequence of instructions with a branch to the function. During its execution, the application may receive user or other input, store the input in a variable, and pass the variable as a parameter to the function. The function may perform calculations using the parameter and return a value that the rest of the application can use to reach a result. The value of the variable, parameter passed to the function, and/or return value can be obtained or traced. Values of user or other inputs, variables, parameters, and/or other items of interest can be obtained through previously described instrumentation and/or other techniques. The values of user or other inputs, variables, parameters, and/or other items can be used for knowledge structuring and anticipating of autonomous operation of the application later described. Other platforms, tools, and/or techniques may provide equivalent or similar functionalities as the above described ones.

Figure 5:
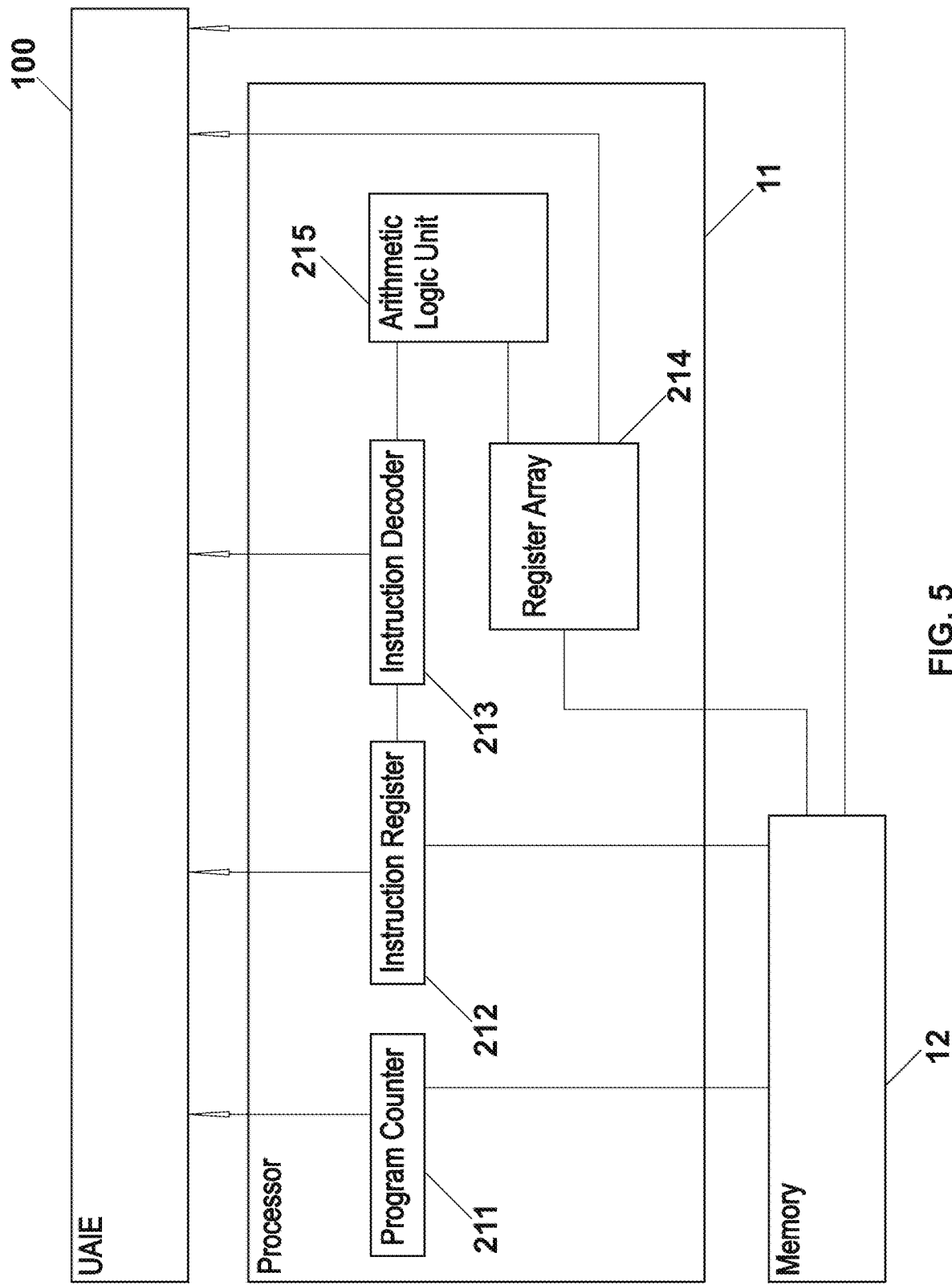
FIG. 5 shows an embodiment of tracing, profiling, or sampling of instructions or data in processor registers, memory, or other computing device components.

Referring to FIG. 5, in yet another example, attaching to and/or obtaining an application's instructions, data, and/or other information can be implemented through tracing, profiling, or sampling of instructions or data in processor registers, memory, or other computing device components. Such tracing, profiling, or sampling can be implemented in software, combination of hardware and software, or purely hardware system. For example, Instruction Register 212 may be part of Processor 11 (or processor's control unit, etc.) and it stores an instruction currently being executed or decoded. In some processors, Program Counter 211 (also referred to as instruction pointer, instruction address register, instruction counter, or part of instruction sequencer) can be incremented after fetching an instruction, and it holds or points to the memory address of a next instruction to be executed. In a processor where the incrementation precedes the fetch, Program Counter 211 points to the current instruction being executed. In the instruction cycle, an instruction may be loaded into Instruction Register 212 after Processor 11 fetches it from location in Memory 12 pointed to by Program Counter 211. Instruction Register 212 holds the instruction while it is decoded by Instruction Decoder 213, prepared, and executed. In some aspects, data (i.e. operands, etc.) needed for instruction execution can be loaded from Memory 12 into a register within Register Array 214. In other aspects, the data can be loaded directly into Arithmetic Logic Unit 215. As instructions pass through Instruction Register 212 during application execution, they can be transmitted to UAIE as shown in FIG. 5. As such, UAIE may then learn the operation of the software application, store this knowledge in a knowledgebase, and enable autonomous operation of the software application with partial, minimal, or no user input. Examples of the steps in execution of a machine instruction include decoding the opcode (i.e. portion of a machine instruction that specifies the operation to be performed), determining where the operands are located (depending on architecture, operands may be in registers, the stack, memory, I/O ports, etc.), retrieving the operands, allocating processor resources to execute the instruction (needed in some types of processors), performing the operation indicated by the instruction, saving the results of execution, and/or other execution steps. Examples of the types of machine instructions that can be utilized include arithmetic, data handling, logical, program control, as well as special and/or other instruction types. In addition to the ones described or shown, examples of other computing device or processor components that can be used during an instruction cycle include memory address register (MAR) that can hold the address of a memory block to be read from or written to; memory data register (MDR) that can hold data fetched from memory or data waiting to be stored in memory; data registers that can hold numeric values, characters, small bit arrays, or other data; address registers that can hold addresses used by instructions that indirectly access memory; general purpose registers (GPRs) that can store both data and addresses; conditional registers that can hold truth values often used to determine whether some instruction should or should not be executed; floating point registers (FPRs) that can store floating point numbers; constant registers that can hold read-only values such as zero, one, or pi; special purpose registers (SPRs) such as status register, program counter, or stack pointer that can hold information on program state; machine-specific registers that can store data and settings related to a particular processor; Register Array 214 that may include an array of any number of processor registers; Arithmetic Logic Unit 215 that may perform arithmetic and logic operations; control unit that may direct processor's operation; and/or other circuits or components.

One of ordinary skill in art will recognize that FIG. 5 depicts one of many implementations of a processor or computing device components, and that various other components can be utilized in addition to or in combination with the ones shown or described, or some components can be excluded in alternate implementations. Also, various types of connections can be implemented among processor registers and/or other processor or computing device components including busses, direct connections, operative connections, and/or other connections. Processor or computing device components may be connected or interlinked differently in alternate implementations. Any of the described or other connections can be implemented among any processor or computing device components and UAIE. In one example, the connection between Instruction Register 212 and UAIE may include any number of connections such as, for example, a dedicated connection for each bit of Instruction Register 212 (i.e. 32 connections for a 32 bit Instruction Register 212, etc.). In some aspects, dedicated hardware may be built per the disclosed specification to perform tracing, profiling, or sampling of processor registers or any computing device components with marginal or no impact to computing overhead.

Other additional techniques or elements can be utilized as needed for obtaining an application's instructions, data, and/or other information, or some of the disclosed techniques or elements can be excluded, or a combination thereof can be utilized in alternate embodiments.

Figure 6:
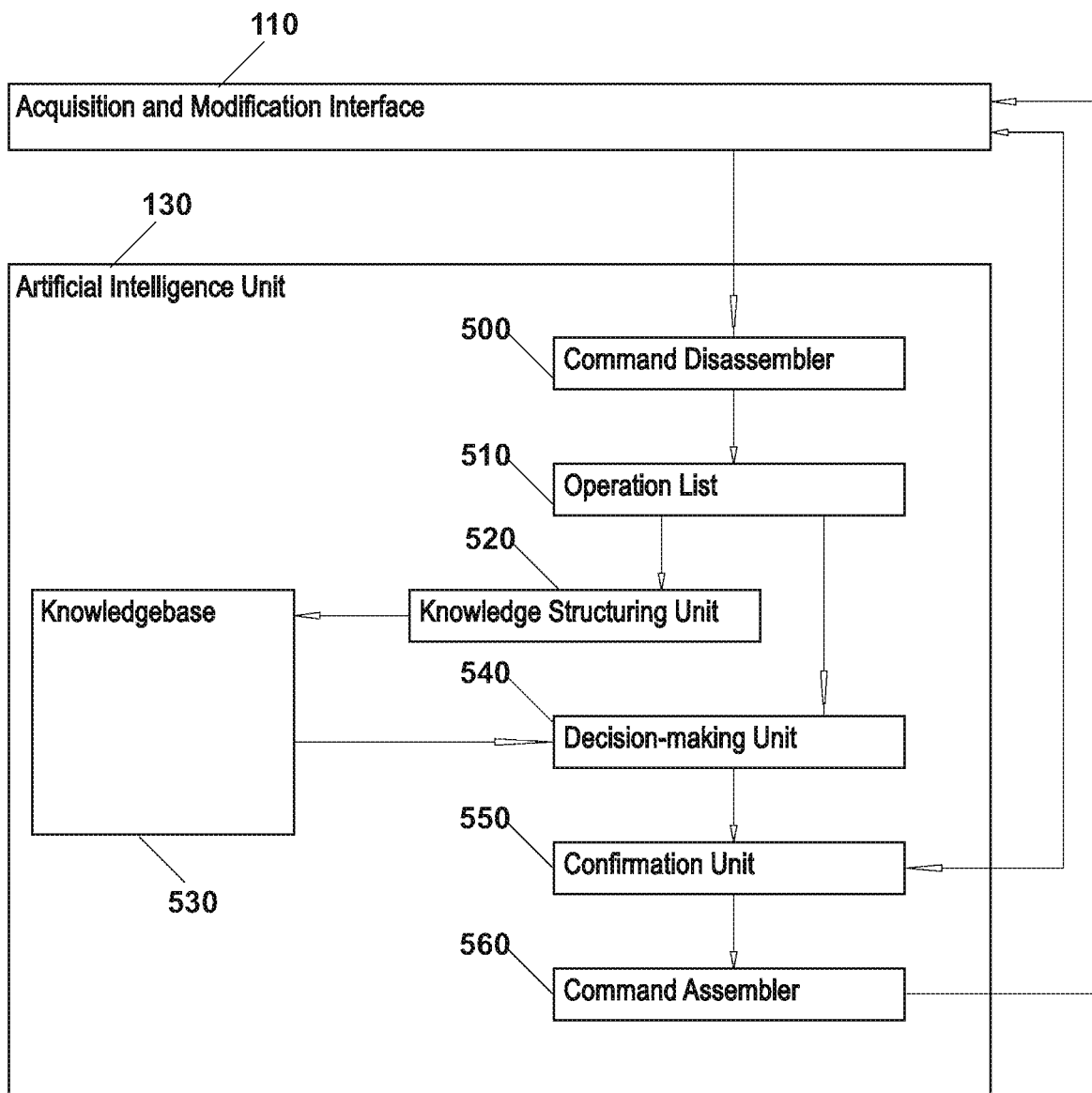
FIG. 6 is a diagram showing an embodiment of Artificial Intelligence Unit 130 comprising Knowledgebase 530.

Referring to FIG. 6, Artificial Intelligence Unit 130 comprises the functionality for learning one or more Software Application's 120 previously (i.e. recently, etc.) executed instructions (i.e. instruction sets, etc.) or operations, and/or other functionalities. Artificial Intelligence Unit 130 comprises the functionality for anticipating one or more Software Application's 120 future instructions (i.e. instruction sets, etc.) or operations. Artificial Intelligence Unit 130 also comprises the functionality for determining one or more instructions (i.e. instruction sets, etc.), operations, or sequences thereof, which Software Application 120 may implement autonomously with partial, minimal, or no user input. Artificial Intelligence Unit 130 also comprises the functionality for identifying a particular number of instructions (i.e. instruction sets, etc.), operations, or sequences thereof to be presented to User 50 as options to be selected, which the system has determined User 50 may want to execute. The number of instructions (i.e. instruction sets, etc.), operations, or sequences thereof to be executed, implemented, or presented may vary based on the determinations of Artificial Intelligence Unit 130 or it may alternatively be predetermined.

In some embodiments, Artificial Intelligence Unit 130 includes interconnected Command Disassembler 500, Operation List 510, Knowledge Structuring Unit 520, Knowledgebase 530, Decision-making Unit 540, Confirmation Unit 550, and Command Assembler 560. Other additional elements can be included as needed, or some of the disclosed ones can be excluded, or a combination thereof can be utilized in alternate embodiments.

Figure 7:
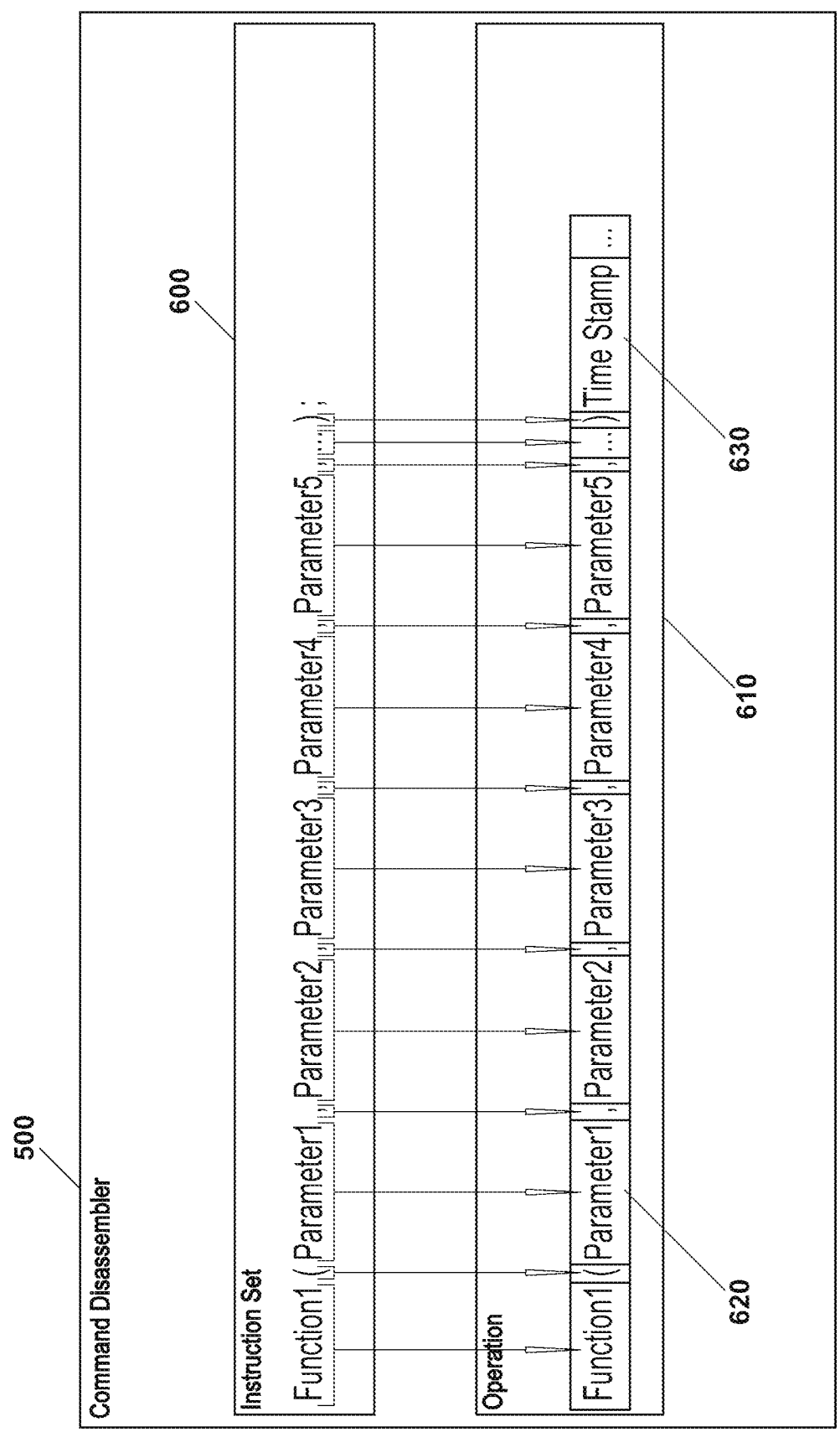
FIG. 7 illustrates an embodiment of Command Disassembler 500 processing a function.

Referring to FIG. 7, Command Disassembler 500 comprises the functionality for disassembling Instruction Set 600 (also referred to as instruction, operation, command, and/or other such reference, etc.) into its Instruction Set Portions 620 (also referred to as Inst Set Por 620, etc.) or subsets of Instruction Set 600, and/or other functionalities.

Instruction Set 600 includes one or more commands, keywords, symbols (i.e. parentheses, brackets, commas, semicolons, etc.), instructions, operators (i.e. =, <, >, etc.), variables, values, objects (i.e. file handle, network connection, game player, etc.), data structures (i.e. table, database, user defined data structure, etc.), functions (i.e. Function1( ), FIRST( ), MIN( ), SQRT( ), etc.), parameters, references thereto, and/or other components for performing an operation on Computing Device 70. In some aspects, each component of Instruction Set 600 can be captured in an Instruction Set Portion 620. In other aspects, Command Disassembler 500 can be very detailed in its disassembling of Instruction Set 600 where each character, digit, symbol, and/or other detailed element may be captured in an Instruction Set Portion 620. Instruction Set 600 can be implemented in a high-level programming language such as Java or C++, a low-level language such as assembly or machine language, an intermediate language or construct such as bytecode, and/or any other language or construct.

When an Instruction Set 600 is processed by Command Disassembler 500, the Instruction Set 600 is divided or split into one or more Instruction Set Portions 620 that can be stored in Operation 610. An Instruction Set 600 disassembled into its Instruction Set Portions 620 and/or stored in Operation 610 becomes more convenient to compare to other Instruction Sets 600 or Operations 610. Operation 610 comprises the functionality for storing Instruction Set Portions 620 of a particular Instruction Set 600, Extra Info 630 related to or associated with the Instruction Set 600, and/or other information. Operation 610 may be or include any data structure (i.e. array, list, linked list, doubly linked list, queue, matrix, table, file, etc.) comprising one or more data fields that can store Instruction Set Portions 620, Extra Info 630, and/or other information. Therefore, an Instruction Set 600 corresponds to a particular Operation 610 identified by that Instruction Set 600, and vice versa. Also, the Instruction Set 600 may be referred to as the Operation 610, and vice versa, as this Operation 610 is a representation and/or logical equivalent of this particular Instruction Set 600. Therefore, Instruction Set 600 and Operation 610 may be used interchangeably herein.

In some embodiments, Command Disassembler 500 comprises the functionality for identifying or recognizing specific commands, keywords, symbols, instructions, operators, variables, values, objects, data structures, functions, parameters, references thereto, and/or other components of Instruction Set 600. In some aspects, the commands, keywords, symbols, instructions, operators, variables, values, objects, data structures, functions, parameters, references thereto, and/or other components may be provided in a lexicon containing all possible or most used commands, keywords, symbols, instructions, operators, variables, values, objects, data structures, functions, parameters, references thereto, and/or other components specific to the programming language used, and/or specific to Software Application 120. The lexicon can be stored or organized in any data structure (i.e. a list, array, table, database, etc.), object, and/or other repository. In some embodiments, the lexicon may be predefined and change as the components used within Software Application 120 change. For example, in response to changing the name of a variable within Software Application's 120 source code, the variable's name may be updated in the lexicon, so Command Disassembler 500 would recognize the updated variable name as an Instruction Set Portion 620 in its next run. In other embodiments, the lexicon can be created on-fly by obtaining commands, keywords, symbols, instructions, operators, variables, values, objects, data structures, functions, parameters, references thereto, and/or other components used in Software Application 120 when needed. For example, components (i.e. table names, report names, column names, relations, etc.) of a database application or DBMS may be obtained from data dictionary or other metadata repository of the database. The on-fly created lexicon may also include commands, keywords, symbols, instructions, operators, variables, values, objects, data structures, functions, parameters, references thereto, and/or other components used in Software Application's 120 programming language. For example, components (i.e. commands, operators, built-in functions, etc.) of a programming language can be obtained from the programming language's reference index, instruction set listing, and/or other listing that may be available from the programming language manufacturer, from a public web site, and/or from other source.

In an embodiment shown in FIG. 7, Instruction Set 600 includes the following function call construct:

Function1 (Parameter1, Parameter2, Parameter3, Parameter4, Parameter5, . . . );

An example of a function call applying the above construct includes the following Instruction Set 600:

clickButton (rightPane, 412, 377);

The function or reference thereto "clickButton" is Instruction Set Portion 620 of Instruction Set 600 and therefore it may be extracted and stored in a data field of Operation 610. The next Instruction Set Portion 620 that may be extracted and stored includes the symbol "(" representing the start of the function's parameters. The next Instruction Set Portion 620 that may be extracted and stored includes the parameter "rightPane" indicating the pane in which the button to be clicked on is located. The next Instruction Set Portion 620 that may be extracted and stored includes the symbol "," representing parameter divider. The next Instruction Set Portion 620 that may be extracted and stored includes the parameter "412" indicating the X coordinate of the button to be clicked. The next Instruction Set Portion 620 that may be extracted and stored includes the symbol "," representing parameter divider. The next Instruction Set Portion 620 that may be extracted and stored includes the parameter "377" indicating the Y coordinate of the button to be clicked. The next Instruction Set Portion 620 that may be extracted and stored includes the symbol ")" representing the end of the function's parameters. Other Instruction Set Portions 620 not shown in this particular example can be utilized in alternate embodiments. Various types of Instruction Sets 600 may include different Instruction Set Portions 620 stored in Operation 610. For example, a function may include function name, parameters, and/or other components, whereas, a FOR loop may include keyword "FOR" and its associated counting variable (i.e. i, etc.), operators (i.e. <, <=, >, >=, etc.), counter (i.e. i++, i--, i+3, i-107, etc.), and/or other components.

Figure 8:
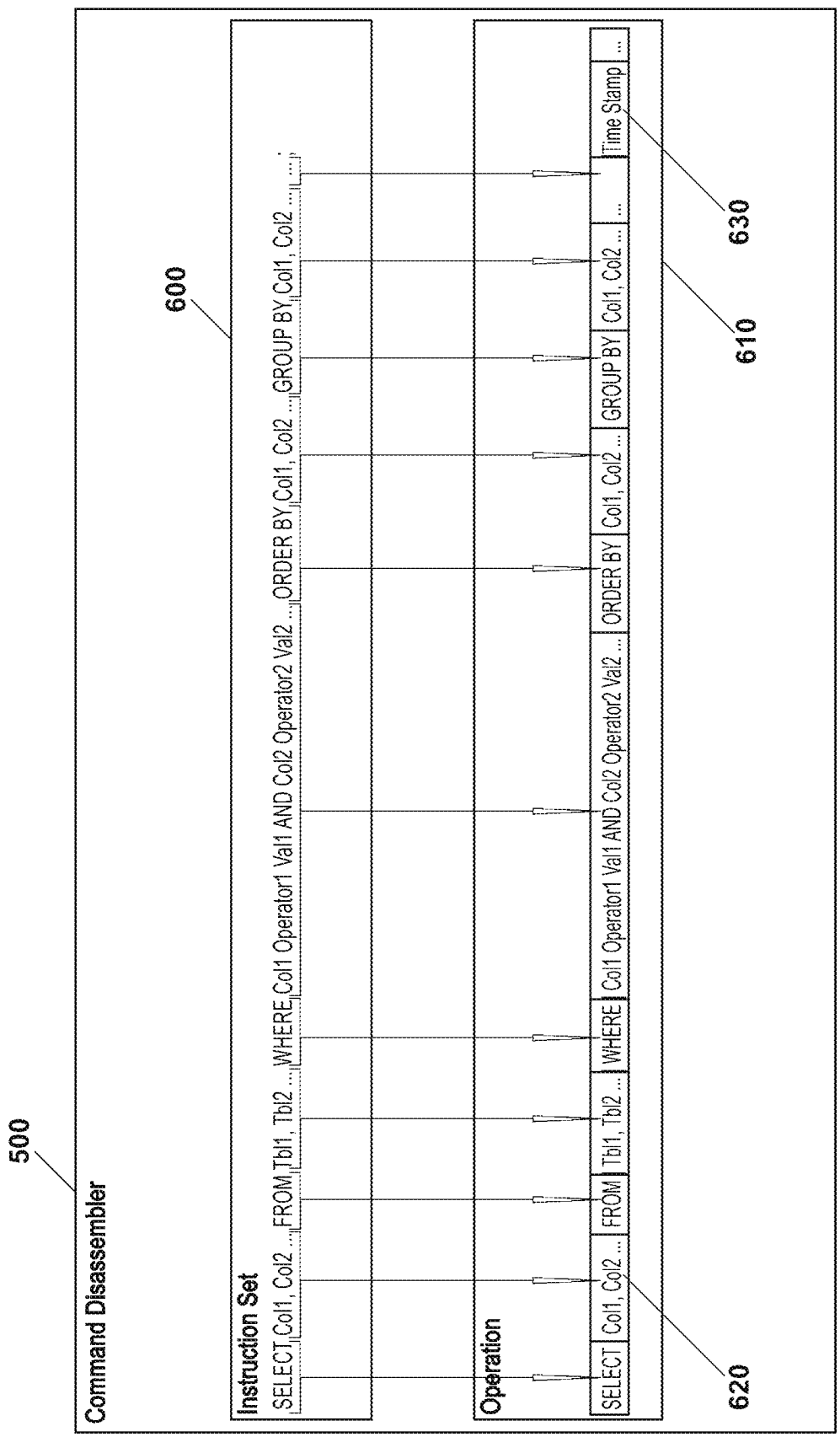
FIG. 8 illustrates an embodiment of Command Disassembler 500 processing SQL statement.
Figure 9:
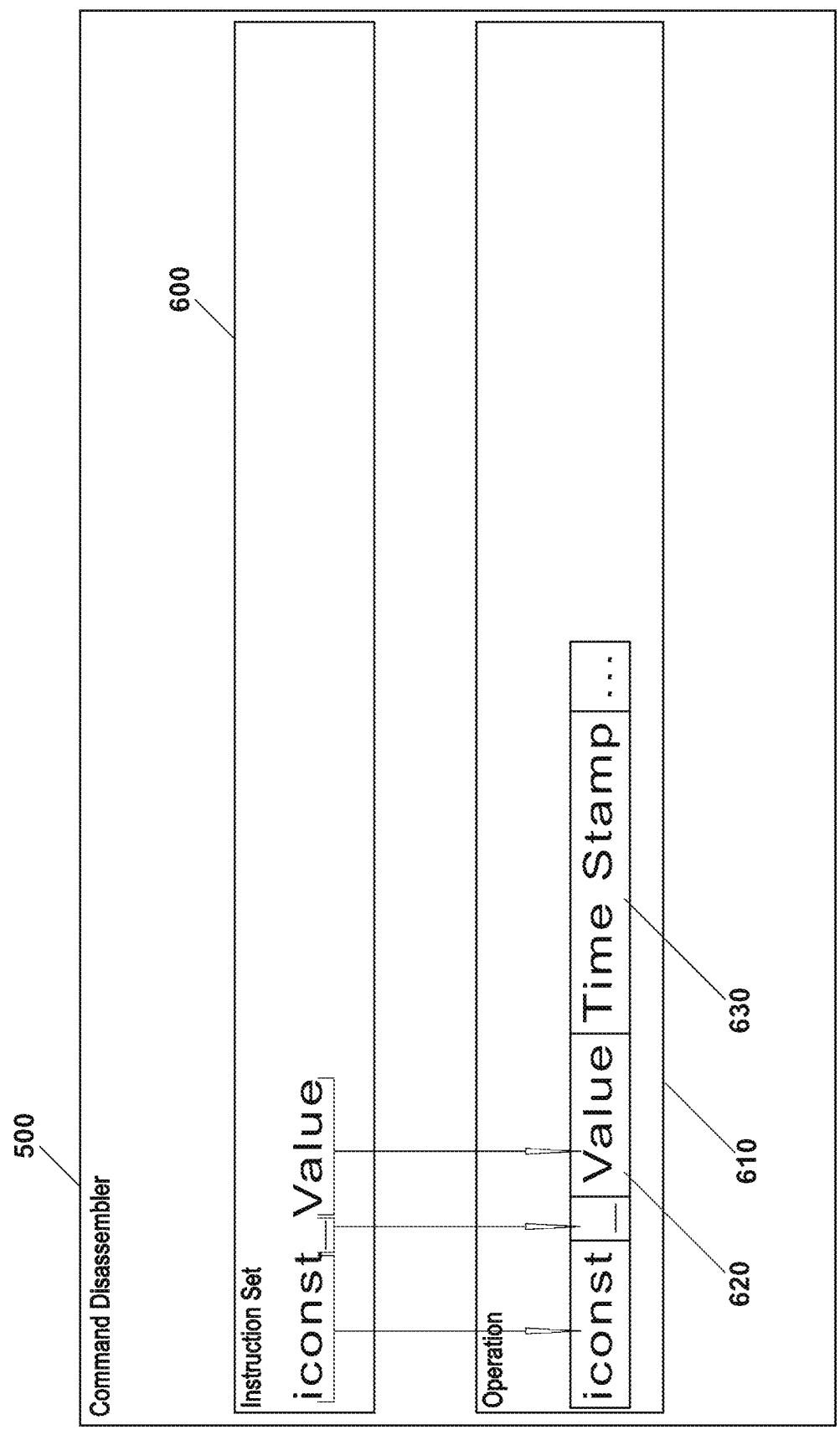
FIG. 9 illustrates an embodiment of Command Disassembler 500 processing bytecode.
Figure 10:
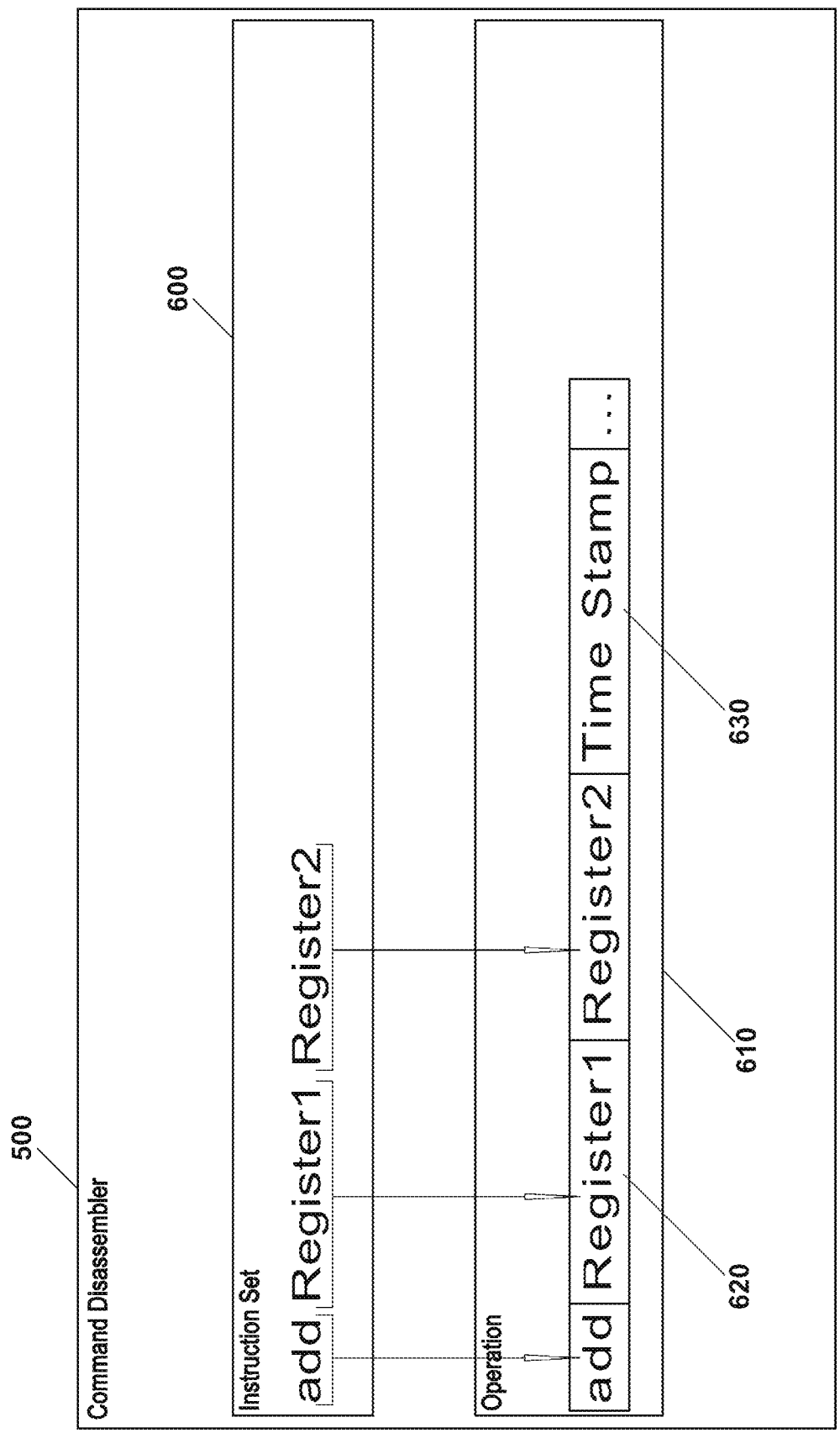
FIG. 10 illustrates an embodiment of Command Disassembler 500 processing assembly code.
Figure 11:
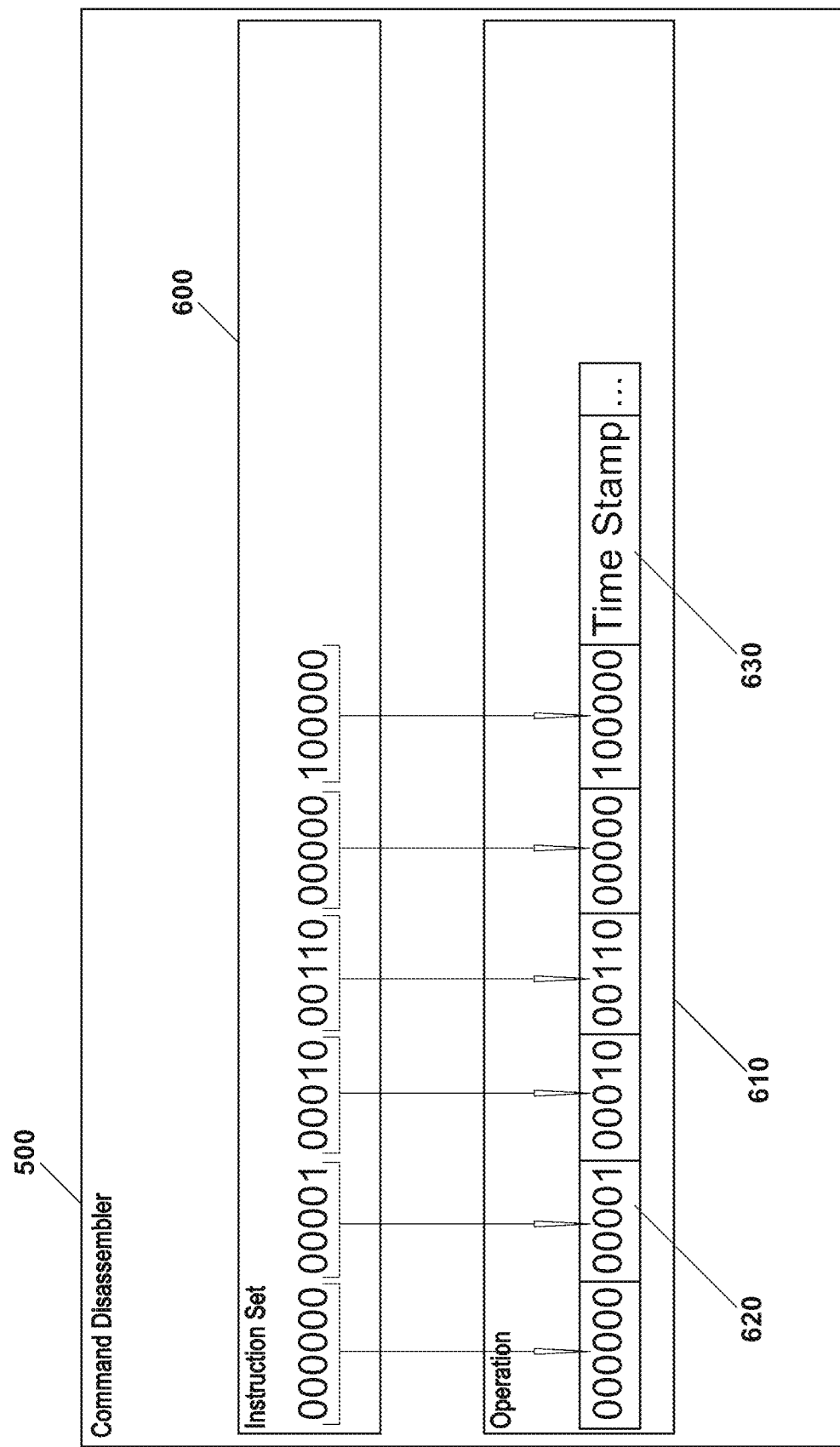
FIG. 11 illustrates an embodiment of Command Disassembler 500 processing machine code.

In another embodiment shown in FIG. 8, Instruction Set 600 includes structured query language (SQL). In a further embodiment shown in FIG. 9, Instruction Set 600 includes bytecode (i.e. Java bytecode, Python bytecode, CLR bytecode, etc.). In a further embodiment shown in FIG. 10, Instruction Set 600 includes assembly code. In a further embodiment shown in FIG. 11, Instruction Set 600 includes machine code. In each of the above-described or other embodiments, Command Disassembler 500 may extract or disassemble Instruction Set Portions 620 from the Instruction Set 600. Command Disassembler 500 may identify or recognize specific commands, keywords, symbols, instructions, operators, variables, values, objects, data structures, functions, parameters, references thereto, and/or other components of SQL, bytecode, assembly code, machine code, any programming language, or other code or language included in the Instruction Set 600 as previously described.

In addition to Instruction Set's 600 Instruction Set Portions 620, extra information or Extra Info 630 can be stored in Operation 610. Acquisition and Modification Interface 110 or any of its elements, Command Disassembler 500, and/or any other element can obtain or receive Extra Info 630, which can then be stored in Operation 610. Examples of Extra Info 630 that can be stored in Operation 610 include time stamp or other time information, user specific information, group user information, version of Software Application 120, the type of Software Application 120 (i.e. web browser, computer game, word processing, database, CAD/CAM software, etc.), the type of computing device executing Software Application 120, the type of user (novice, moderate, skilled, expert), and/or other information. Any extra, contextual, and/or other information may be stored in Extra Info 630. Extra Info 630 can be utilized to provide additional or as much information as possible for best anticipation of future operations of Software Application 120. In one example, time stamp or any time information stored in Extra Info 630 may be useful for anticipation of future operations related to a specific time period. In another example in which Software Application 120 is a computer game application, Extra Info 630 includes the type of Software Application 120 being a computer game, the type of computing device being based on an AMD x86 microprocessor, the type of graphics chip being NVIDIA GeForce GTX 660, the type of player being novice, and/or other information. In a further example, Extra Info 630 includes geo-spatial information about the player's character/avatar and/or objects around the player's character/avatar. Extra Info 630 may include player's avatar's coordinates within the game and player's avatar's direction of movement. Extra Info 630 may further include the types (i.e. enemy player, friend player, rock, forest, pond, building, etc.) and/or coordinates of objects and/or other players and their directions of movement. Such Extra Info 630 can provide geo-spatial and situational awareness and/or capabilities to the disclosed devices, apparatuses, systems, and/or methods.

In some embodiments, observed information can be stored in Extra Info 630. In one example, an object's location (i.e. player's avatar's coordinates, etc.) in a computer game application can be stored in Extra Info 630. In another example, formatting of words written prior to the currently written word in a word processing application can be stored in Extra Info 630. In other embodiments, computed information can be stored in Extra Info 630. UAIE may include computational functionalities to create Extra Info 630 by performing calculations using observed and/or other information. In one example, an object's distance, bearing (i.e. angle or direction of movement, etc.), speed, and/or other information may be calculated or estimated from the object's coordinates in a computer game application by utilizing Pythagorean theorem, Euclidean distance formula, trigonometry, and/or other theorems, formulas, or disciplines.

In some aspects, different Extra Info 630 may be stored for different types of Software Application 120. In one example, types and coordinates of objects surrounding user's avatar in a first shooter, flight simulation, or other similar computer game or context reliant application may be stored in Extra Info 630. In another example, locations and arrangements of top-line elements in a tetris-like or other similar computer game or context reliant application may be stored in Extra Info 630. In a further example, formatting of characters or words around a pasted section of text in a word processing application may be stored in Extra Info 630. Which information is stored in Extra Info 630 can be set by User 50 or UAIE administrator, determined by UAIE automatically, or acquired from an outside source or repository. In one example, UAIE enables User 50 to set which information is stored in Extra Info 630. In another example, UAIE may determine which information is stored in Extra Info 630 by analyzing the type of application or types of instructions performed, by analyzing the construct of the application (i.e. 2D or 3D construct, multiple players or users construct, etc.), and/or by performing other context analysis. In a further example, a database or other repository identifying which information is of interest to be stored in Extra Info 630 for specific types or specific applications can be utilized.

In some embodiments, extra information or Extra Info 630 may include or be referred to as contextual information, and contextual information may include or be referred to as extra information or Extra Info 630. Therefore, these terms may be used interchangeably herein.

In some aspects, Command Disassembler 500 can structure or store Instruction Set Portions 620, Extra Info 630, and/or other information into any data structure or object (i.e. other than Operation 610) such as, for example, array, list, linked list, doubly linked list, queue, sequence, tree, heap, graph, map, grid, matrix, multi-dimensional matrix, table, database, hierarchical data structure, file, neural network, and/or any other type or form of a data structure or object.

Figure 12:
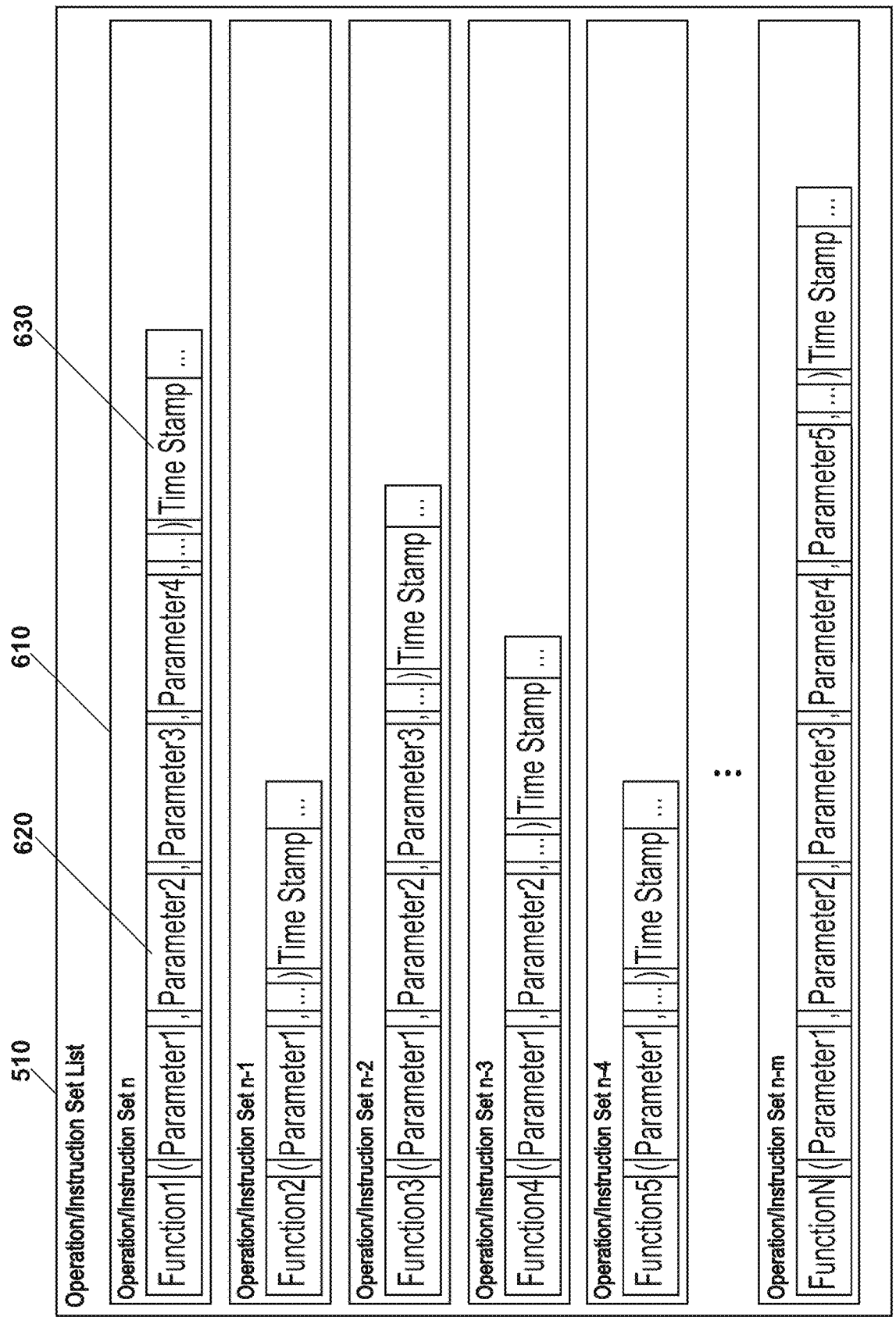
FIG. 12 is a diagram showing an embodiment of Operation/Instruction Set List 510.

Referring to FIG. 12, Operation/Instruction Set List 510 (also referred to as Operation List 510 or Instruction Set List 510, etc.) comprises the functionality for storing one or more Operations 610 and/or their corresponding Instruction Sets 600, and/or other functionalities. Operation List 510 may include any data structure (i.e. array, list, linked list, matrix, table, etc.) that can store one or more Operations 610 and/or their corresponding Instruction Sets 600.

In some embodiments, Operation List 510 receives Operations 610 or Instruction Sets 600 from Command Disassembler 500 and stores a number of Operations 610 or Instruction Sets 600 that were most recently (also referred to simply as recently, etc.) used or executed in Software Application 120. The number of Operations 610 or Instruction Sets 600 most recently used or executed may vary depending on the embodiments. In one example, anywhere between 1 and 10000 most recently used or executed Operations 610 or Instruction Sets 600 can be stored. In another example, the number of stored Operations 610 or Instruction Sets 600 may be between 2 and 10, such as for example 2, 5, 6, or 9. In yet another example, the number of Operations 610 or Instruction Sets 600 may be between 10 and 50, such as for example 12, 15, 20, 30, 40 or 50. In yet another example, the number of Operations 610 or Instruction Sets 600 stored may be between 50 and 200, such as for example 50, 70, 80, 100, 130, 180 or 200. In yet another example, the number of Operations 610 or Instruction Sets 600 stored may be between 200 and 10000, such as for example 500, 1000, 3000, 5000, 8000 or 10000. The number of most recently used or executed Operations 610 or Instruction Sets 600 stored can be even greater than 10000, as one of ordinary skill in art would recognize that the number of stored Operations 610 or Instruction Sets 600 may be any number that can be stored in any memory or storage described herein.

In some embodiments in which five recently used or executed Operations 610 or Instruction Sets 600 are stored in Operation List 510, Operations 610 or Instruction Sets 600 may be identified such that the current Operation 610 or Instruction Set 600 is identified as Operation n, the most recent Operation 610 or Instruction Set 600 prior to the current is identified as Operation n−1, and so on until the least recent Operation 610 or Instruction Set 600 being stored is labeled as Operation n−4. Each time Operation List 510 receives another new Operation 610 or Instruction Set 600 from Command Disassembler 500, it may erase the least recent Operation 610 or Instruction Set 600, such as Operation n−4, and insert current Operation 610 or Instruction Set 600 received as Operation n. Naturally, all the most recently used or executed Operations 610 or Instruction Sets 600 that are stored in this list or queue may be shifted by one count further towards Operation n−4. This way, the system can maintain a queue of most recently used or executed Operations 610 or Instruction Sets 600. In some aspects, such Operation List 510 or queue may be associated with or related to a particular time point. For example, Operation List 510 associated with the present time point may be referred to as a current Operation List 510 or as another suitable name or reference. In another example, when referenced from a time point (i.e. past or future time point, etc.) other than the present time point, Operation List 510 may be referred to as a "then current" Operation List 510, or simply as a "current" Operation List 510 where the time point with which Operation List 510 is associated is implied from context. In a further example, a past Operation List 510 (i.e. Operation List 510 stored in a Knowledge Cell 800, Operation List 510 stored in Knowledgebase 530, Operation List 510 stored in Neural Network 850, any past Operation List 510, etc.) may be referred to as a previous Operation List 510 or as previously used or executed Operations 610 or Instruction Sets 600. Any other suitable name or reference can be utilized for Operation List 510 associated with or related to various time points. Although, Operation List 510 may often refer to recently or most recently used or executed Operations 610 or Instruction Sets 600, Operation List 510 may generally refer to any collection of Operations 610 or Instruction Sets 600 used or executed at any time point depending on context.

In some aspects, the processor, a virtual machine, and/or other processing element of Computing Device 70 may include a repository of stored executed or simulated (i.e. simulated execution, etc.) application's instructions (i.e. Operations 610 or Instruction Sets 600, etc.), data, and/or other information. In such instances, Operation List 510 may be or include the entire or a subset of such repository. Any subset of such repository can be utilized in/as Operation List 510, not only a recent or the most recent subset. In one example, the entire or a subset of instructions (i.e. Operations 610 or Instruction Sets 600, etc.), data, and/or other information in such repository can be transferred to Operation List 510. In another example, the entire or a subset of such repository itself can serve as Operation List 510 in which case Operation List 510 as a separate element can be omitted. In such instances, the later described knowledge structuring, storing, and/or other operations involving Operation List 510 can utilize the entire or a subset of a repository comprising executed or simulated (i.e. simulated execution, etc.) application's instructions (i.e. Operations 610 or Instruction Sets 600, etc.), data, and/or other information.

In certain aspects, Operation List 510 comprises one or more recently used or executed Operations 610 or Instruction Sets 600 that User 50 issued or caused to be executed. In other aspects, Operation List 510 comprises one or more recently used or executed Operations 610 or Instruction Sets 600 that UAIE anticipated and/or caused to be executed as later described. As such, UAIE anticipated/generated Operations 610 or Instruction Sets 600 can be inputted into UAIE as any other User 50 initiated Operation 610 or Instruction Set 600, thereby enabling UAIE to learn its own previously anticipated/generated Operations 610 or Instruction Sets 600 in addition to User 50 initiated Operations 610 or Instruction Sets 600. In yet some aspects, UAIE can be configured or reach such level of autonomy to be able to anticipate all Software Application's 120 Operations 610 or Instruction Sets 600 autonomously with no input from User 50 in which case Operation List 510 would include only recently used or executed Operations 610 or Instruction Sets 600 that were anticipated/generated by UAIE. As such, UAIE may learn its own previously anticipated/generated Operations 610 or Instruction Sets 600.

Figure 13:
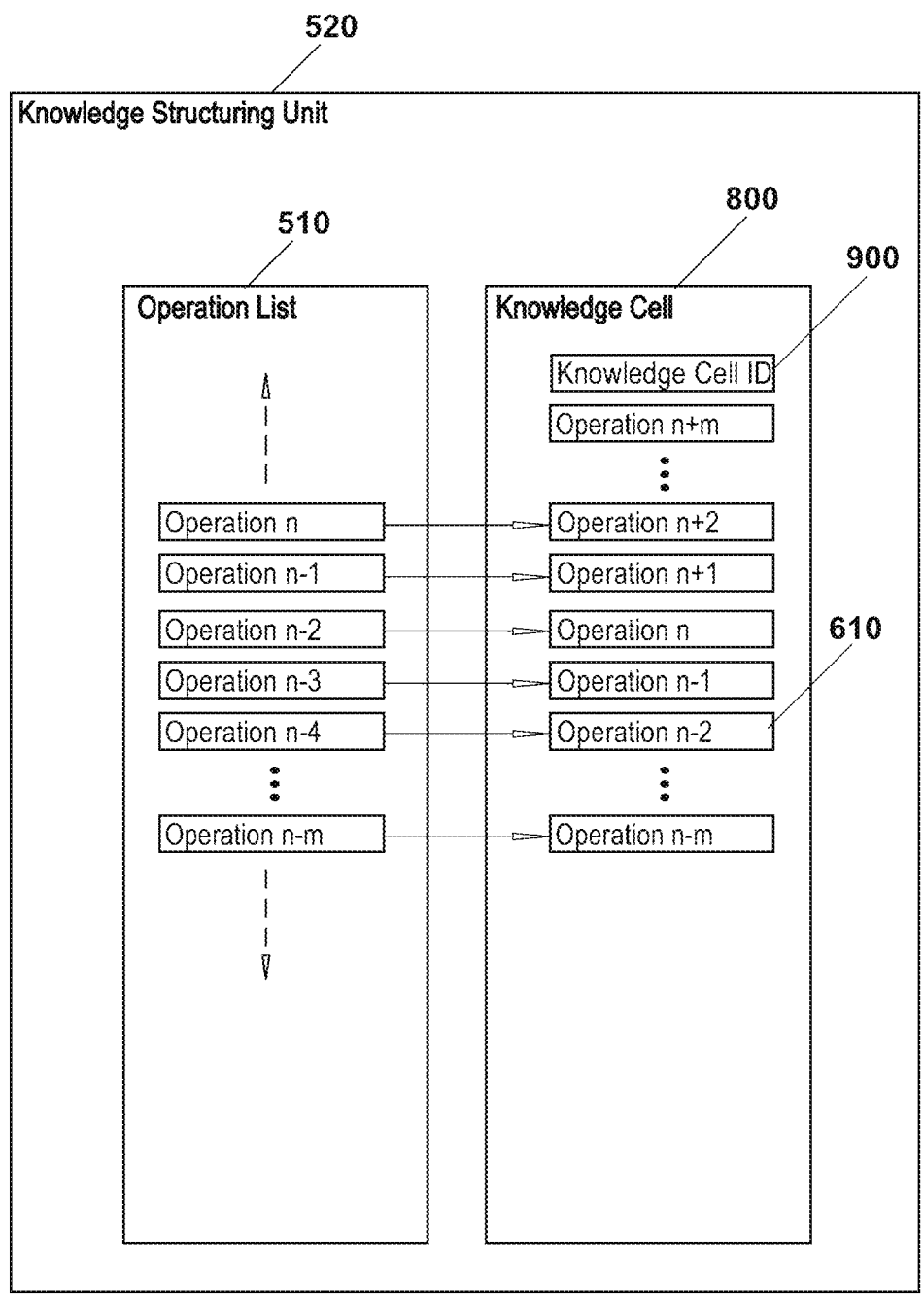
FIG. 13 is a diagram showing an embodiment of Knowledge Structuring Unit 520.

Referring to FIG. 13, Knowledge Structuring Unit 520 comprises the functionality for structuring knowledge of Software Application's 120 operations, and/or other functionalities. Knowledge Structuring Unit 520 comprises the functionality for structuring knowledge of used or executed Operations 610 or Instruction Sets 600. Knowledge Structuring Unit 520 comprises the functionality for structuring the stored sequence (i.e. Operation List 510) of used or executed Operations 610 or Instruction Sets 600 into usable knowledge for future anticipating of Operations 610 or Instruction Sets 600. Knowledge Structuring Unit 520 comprises the functionality to produce any variations of Operations 610 or Instruction Sets 600 that may ever be used in Software Application 120.

In some embodiments, Knowledge Structuring Unit 520 receives current Operation List 510 and creates Knowledge Cell 800 by copying Operations 610 or Instruction Sets 600 from Operation List 510 into the Knowledge Cell 800. For example, Knowledge Structuring Unit 520 may copy Operation n from Operation List 510 into Operation n+2 of Knowledge Cell 800, by copying Operation n−1 from Operation List 510 into Operation n+1 of Knowledge Cell 800, by copying Operation n−2 from Operation List 510 into Operation n of Knowledge Cell 800, and so forth. Knowledge Cell 800 comprises the functionality for storing Software Application's 120 instructions (i.e. Instruction Sets 600 or Operations 610, etc.), and/or other functionalities. Knowledge Cell 800 comprises the functionality for storing Software Application's 120 used or executed Operations 610 or Instruction Sets 600. Knowledge Cell 800 comprises the functionality for storing a sequence of Software Application's 120 used or executed Operations 610 or Instruction Sets 600. Knowledge Cell 800 may include any data structure (i.e. array, list, linked list, matrix, table, etc.) that can store Software Application's 120 Operations 610 or Instruction Sets 600. In some aspects, Operation n, Operation n−1, and Operation n−2 in a Knowledge Cell 800 can later be used for comparison with the then Software Application's 120 recent (i.e. including current, etc.) operations, and Operation n+1 and Operation n+2 can later be used for anticipation of Software Application's 120 future or subsequent operations, for example. Therefore, Operations 610 or Instruction Sets 600 with an order number greater than n may be anticipatory and the rest of the Operations 610 or Instruction Sets 600 may be comparative, although this particular split can differ in alternate embodiments. Any number of comparative and any number of anticipatory Operations 610 or Instruction Sets 600 can be included in a Knowledge Cell 800, and any number of Knowledge Cells 800 can be used in UAIE. In some designs, a long Knowledge Cell 800 can be used in which case comparisons of Operations 610 or Instruction Sets 600 may be performed in a traversing pattern as explained below. Also, as indicated by the up and down vertical dotted arrows, the copying of Operation n from Operation List 510 into Knowledge Cell 800 can start at any Operation n+m through Operation n−m of the Knowledge Cell 800. This way, the number of comparative and anticipatory Operations 610 or Instruction Sets 600 may differ and it can be determined by a user, by UAIE administrator, or automatically by the system. In one example, Knowledge Cell 800 includes only one anticipatory Operation 610 or Instruction Set 600 in the case where copying of the Operation List 510 into Knowledge Cell 800 starts with copying Operation n of the Operation List 510 into Operation n+1 of the Knowledge Cell 800. In another example, Knowledge Cell 800 includes four anticipatory Operations 610 or Instruction Sets 600 in the case where the copying of the Operation List 510 into the Knowledge Cell 800 starts with copying Operation n of the Operation List 510 into Operation n+4 of the Knowledge Cell 800. It should be noted that n, m, and/or other such letters or indicia may be different numbers in different elements even where the elements are depicted in the same figure. In general, n, m, and/or other such letters or indicia may follow the immediate sequence and/or context where they are indicated. Therefore, an Operation 610 from Operation List 510 having a same letter or indicia as Operation 610 from Knowledge Cell 800 may be a different Operation 610. In one example, Operation n from Operation List 510 may be different than Operation n from Knowledge Cell 800. In another example, Operation n−2 from Operation List 510 may be different than Operation n−2 from Knowledge Cell 800.

In some aspects, since an Operation List 510 may be associated with or related to a particular time point as previously described, a Knowledge Cell 800 created using such Operation List 510 may also be associated with or related to that time point. Therefore, a Knowledge Cell 800 may include recently used or executed Operations 610 or Instruction Sets 600 associated with or related to a particular time point. For example, one Knowledge Cell 800 can store recently used or executed Operations 610 or Instruction Sets 600 at time t1, another Knowledge Cell 800 can store recently used or executed Operations 610 or Instruction Sets 600 at time t2, a further Knowledge Cell 800 can store recently used or executed Operations 610 or Instruction Sets 600 at time t3, and so on. The time points may be consecutive, but such consecutive order is not required and any other order can be utilized in alternate embodiments. Further, a time point with which a Knowledge Cell 800 is associated or related can be stored in the Knowledge Cell 800 and utilized later if needed.

In certain aspects, Knowledge Structuring Unit 520 can utilize any subset of Operations 610 or Instruction Sets 600 from Operation List 510 in the knowledge structuring process (i.e. Knowledge Cell 800 creation, etc.), not only the most recent Operations 610 or Instruction Sets 600 from Operation List 510 or the entire Operation List 510. In one example, Knowledge Structuring Unit 520 can utilize a subset of Operations 610 or Instruction Sets 600 close to or in the middle of Operation List 510. In another example, Knowledge Structuring Unit 520 can utilize a subset of Operations 610 or Instruction Sets 600 close to or at the end of Operation List 510. Knowledge Structuring Unit 520 can utilize a subset of Operations 610 or Instruction Sets 600 anywhere in Operation List 510.

In some embodiments, Knowledge Structuring Unit 520 can structure or store Operations 610 or Instruction Sets 600 into any data structure or object (i.e. other than Knowledge Cell 800) such as, for example, array, list, linked list, doubly linked list, queue, sequence, tree, heap, graph, map, grid, matrix, multi-dimensional matrix, table, database, neural network, hierarchical data structure, file, and/or any other type or form of a data structure or object.

Figure 14:
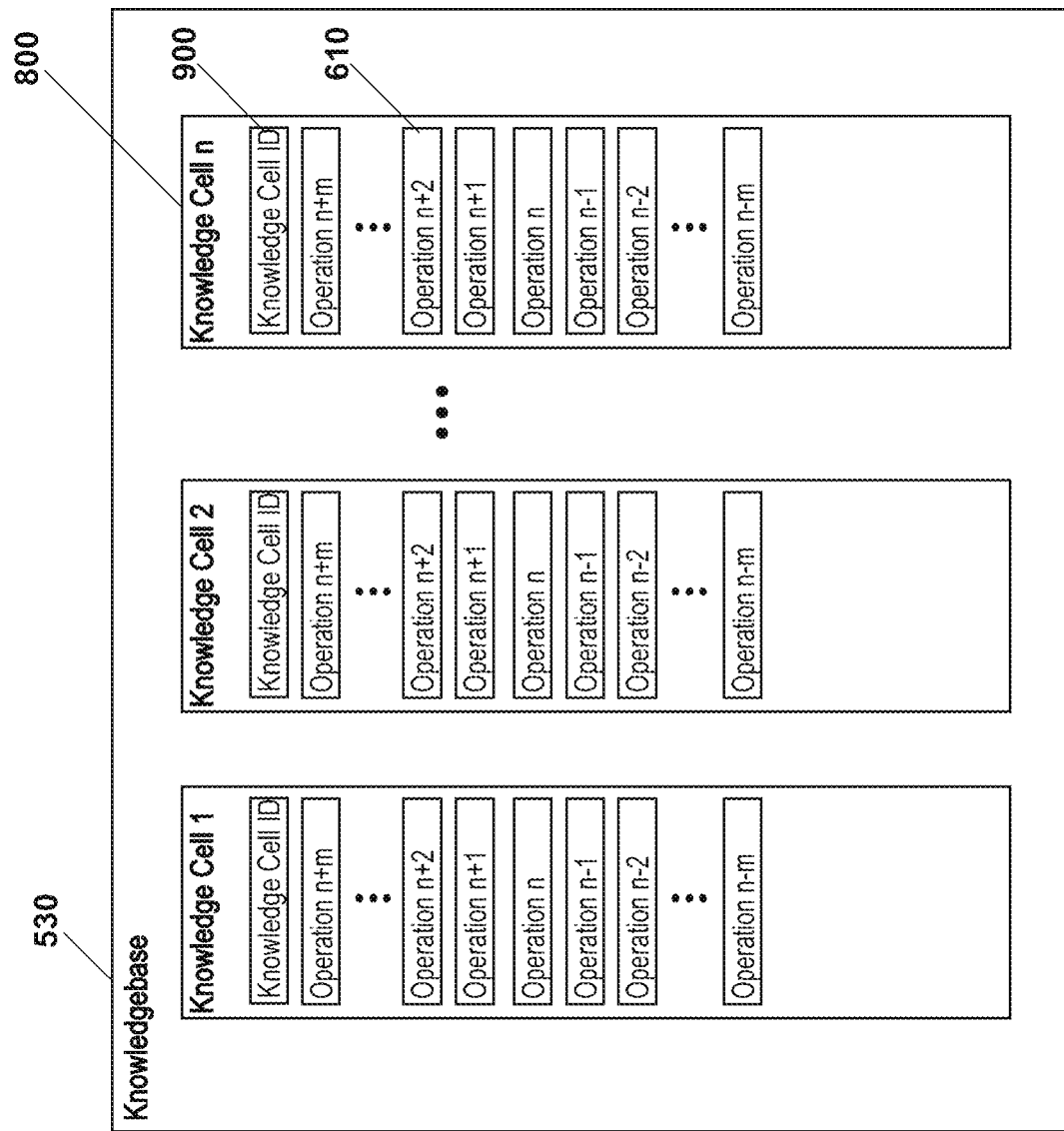
FIG. 14 is a diagram showing an embodiment of Knowledgebase 530.

Referring to FIG. 14, Knowledgebase 530 comprises the functionality for storing Operations 610 or Instruction Sets 600, and/or other functionalities. Knowledgebase 530 comprises the functionality for storing Operations 610 or Instruction Sets 600 structured into one or more Knowledge Cells 800. Knowledgebase 530 comprises the functionality for storing Knowledge Cells 800, and/or Operations 610 or Instruction Sets 600 in a particular order to enable easier access and usage of stored data. Knowledgebase 530 comprises the functionality for managing, modifying, and/or providing Knowledge Cells 800, and/or Operations 610 or Instruction Sets 600 as necessary. Knowledgebase 530 comprises the functionality to store and manage all the Knowledge Cells 800, and/or Operations 610 or Instruction Sets 600 that were used or executed by any users in the past. Knowledgebase 530 can store any variations of Knowledge Cells 800, and/or Operations 610 or Instruction Sets 600 that may ever be used by a user.

In an embodiment shown in FIG. 14, Knowledgebase 530 includes one or more Knowledge Cells 800, each of which comprises one or more Operations 610 or Instruction Sets 600. In some aspects, Knowledgebase 530 includes a table, although, one or more tables, databases, files, or other data structures can be used. For example, in the case of a single table being used as Knowledgebase 530, a Knowledge Cell 800 can be stored within the table where each Operation 610 or Instruction Set 600 of the Knowledge Cell 800 is a record with a common Knowledge Cell Identifier (ID) 900 that signifies its association with its parent Knowledge Cell 800. Each record within the table may include data fields storing Instruction Set Portions 620 and Extra Info 630 of the corresponding Operation 610 or Instruction Set 600. Later in the process, a call to the table to read all records with a specific Knowledge Cell ID 900 may reconstruct the Knowledge Cell 800. In other embodiments, Knowledgebase 530 includes an entire database management system (DBMS) dedicated to Knowledgebase 530 functionalities. In further embodiments, Knowledgebase 530 includes a neural network (later described). Knowledgebase 530 may include any data structure or repository to implement its functionalities.

In some designs, Operations 610 or Instruction Sets 600 can be stored directly within Knowledgebase 530 without using Knowledge Cell 800 as the intermediary data structure. As such, Operations 610 or Instruction Sets 600 can be stored in one or more sequences (i.e. lists, arrays, tables, etc.) within Knowledgebase 530. Substantial Similarity Comparisons 1010 (later described) can be performed by traversing the one or more sequences of Operations 610 or Instruction Sets 600 to find a match. In one example, Knowledgebase 530 includes all used or executed Operations 610 or Instruction Sets 600 in a single long sequence (i.e. list, array, table, etc.). In another example, Knowledgebase 530 includes used or executed Operations 610 or Instruction Sets 600 in a plurality of long sequences such as daily, weekly, monthly, yearly, or other periodic (i.e. monthly tables, monthly lists, monthly arrays, etc.) or other sequences. In the case of any long sequence, Substantial Similarity Comparisons 1010 may compare Operations 610 or Instruction Sets 600 of a current Operation List 510 with subsequences of a long sequence in Knowledgebase 530 in incremental or other traversing pattern. The incremental traversing pattern may start from one of the ends of the single long sequence in Knowledgebase 530 and move the comparison subsequence up or down the list one incremental Operation 610 or Instruction Set 600 at a time. Other traversing patterns or methods can be employed such as starting from the middle of the sequence and subdividing the resulting sub-sequences in a recursive pattern, or any other traversing pattern or method. Parallel processors such as a plurality of Processors 11 can be utilized for processing subsequences simultaneously.

In some aspects, Substantial Similarity Comparison 1010 (later described) can be utilized to compare a newly structured Knowledge Cell 800 (i.e. produced by Knowledge Structuring Unit 520, etc.) with Knowledge Cells 800 in the Knowledgebase 530 to find a substantially similar Knowledge Cell 800. If a substantially similar Knowledge Cell 800 is found, storing the newly structured Knowledge Cell 800 in Knowledgebase 530 can optionally be omitted. For example, if a Knowledge Cell 800 in Knowledgebase 530 is found to be nearly identical or substantially similar (i.e. with a high degree of similarity, etc.) to a compared newly structured Knowledge Cell 800, storing the newly structured Knowledge Cell 800 in Knowledgebase 530 may not add much or any additional knowledge to the Knowledgebase 530. Therefore, storing it can be omitted to save storage resources and limit the number of Knowledge Cells 800 that may later need to be processed or compared. Any of the features, functionalities, and embodiments of Substantial Similarity Comparison 1010, Importance Index 640 (later described), Comparison Accuracy Index 650 (later described), and/or other disclosed elements can be utilized to facilitate determination whether to store a newly structured Knowledge Cell 800 into Knowledgebase 530.

In some embodiments, Operations 610 or Instruction Sets 600, and/or their portions can be compiled, interpreted, or otherwise translated into machine code, bytecode, or other code to be readily available for execution when needed. The machine code, bytecode, or other code may be associated with the original Operations 610 or Instruction Sets 600, and/or their portions and stored in Knowledgebase 530. In one example, Operations' 610 or Instruction Sets' 600, and/or their portions' machine code can be readily executable by a processor when needed. In another example, Operations' 610 or Instruction Sets' 600, and/or their portions' bytecode can be readily executable by a virtual machine when needed. In some aspects, compiler, just-in-time (JIT) compiler, interpreter, or other translator can be implemented to perform the compilation, interpretation, or other translation. In one example, Operations' 610 or Instruction Sets' 600, and/or their portions' compiled, interpreted, or otherwise translated code can be utilized in Substantial Similarity Comparisons 1010 (later described).

Figure 15:
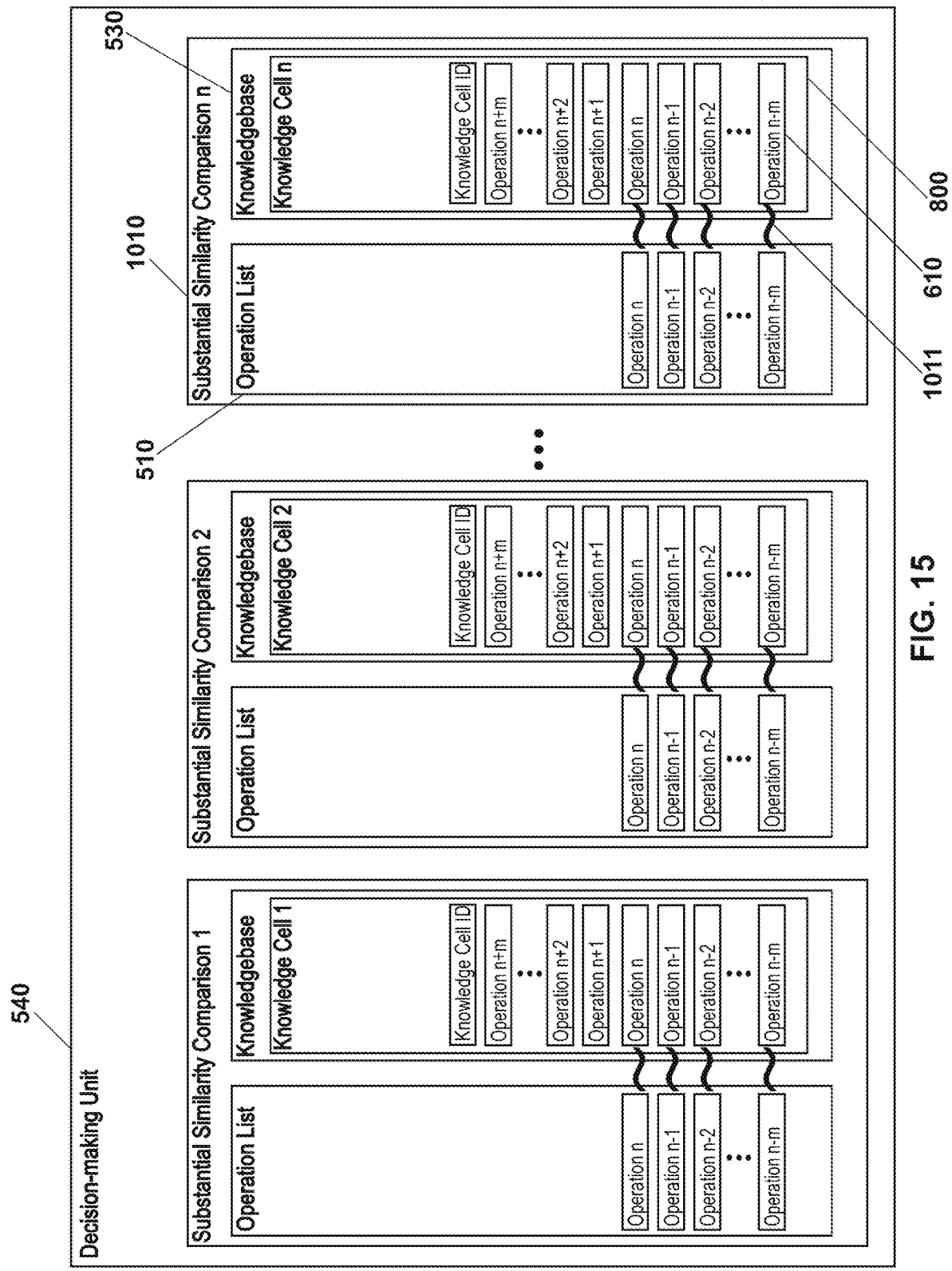
FIG. 15 is a diagram showing an embodiment of Decision-making Unit 540.

Referring to FIG. 15, Decision-making Unit 540 comprises the functionality for anticipating Software Application's 120 future operations (i.e. Operations 610 or Instruction Sets 600), and/or other functionalities. Decision-making Unit 540 comprises functions, rules, and/or logic to determine which Operation 610 or Instruction Set 600 is most suitable or likely to be used or executed next. Similarly, Decision-making Unit 540 comprises the functionality to determine which Operation 610 or Instruction Set 600 is second most suitable or likely to be used or executed, which Operation 610 or Instruction Set 600 is third most suitable or likely to be used or executed, and so on. Furthermore, Decision-making Unit 540 comprises the functionality to determine a sequence or order in which Operations 610 or Instruction Sets 600 are most likely to be used or executed.

In some embodiments, Decision-making Unit 540 may anticipate Software Application's 120 future operations (i.e. future Operations 610 or Instruction Sets 600) by performing Substantial Similarity Comparisons 1010 between current Operation List 510 and Knowledge Cells 800 stored in Knowledgebase 530. Substantial Similarity Comparisons 1010 can be performed one Knowledge Cell 800 at a time, by traversing one long knowledge cell as previously described, by traversing one or more trees of knowledge cells, by traversing one or more hierarchies of knowledge cells, or by utilizing other methods or data structures depending on design and/or data structures used.

Substantial Similarity Comparison 1010 comprises the functionality for comparing or matching Operations 610 or Instruction Sets 600, and/or other functionalities. Substantial Similarity Comparison 1010 comprises the functionality for comparing or matching Operations 610 or Instruction Sets 600 from Operation List 510 with Operations 610 or Instruction Sets 600 stored in Knowledgebase 530, Neural Network 850 (later described), or other repository. Substantial Similarity Comparison 1010 comprises the functionality for comparing or matching Operations 610 or Instruction Sets 600 from Operation List 510 with Operations 610 or Instruction Sets 600 from Knowledge Cells 800. In some aspects, comparing or matching may include comparing Operations 610 or Instruction Sets 600 from Operation List 510 with corresponding comparative Operations 610 or Instruction Sets 600 from Knowledge Cells 800. Substantial Similarity Comparison 1010 may include functions, rules, and/or logic for performing matching or comparisons and for determining that while a perfect match is not found, a substantially similar match has been found. As such, Substantial Similarity Comparison 1010 comprises the functionality for determining substantial similarity or substantial similarity match (also referred to as match in some contexts, etc.) between individually compared Operations 610 or Instruction Sets 600. Substantial Similarity Comparison 1010 also comprises the functionality for determining substantial similarity or substantial similarity match (also referred to as match in some contexts, etc.) between collections of Operations 610 or Instruction Sets 600. In some aspects, Substantial Similarity Comparison 1010 may determine substantial similarity or substantial similarity match between an Operation List 510 and a Knowledge Cell 800 based on substantial similarity between one or more Operations 610 or Instruction Sets 600 from the Operation List 510 and the Knowledge Cell 800.

In some embodiments such as the one illustrated in FIG. 15, Substantial Similarity Comparison 1010 includes comparing a number of most recently used or executed Operations 610 or Instruction Sets 600 (i.e. Operation n, Operation n−1, Operation n−2, etc.) from Operation List 510 with corresponding comparative Operations 610 or Instruction Sets 600 from Knowledge Cells 800 in Knowledgebase 530. If a substantially similar pattern of most recently used or executed Operations 610 or Instruction Sets 600 (i.e. Operation n, Operation n−1, Operation n−2, etc.) from Operation List 510 is found in comparative Operations 610 or Instruction Sets 600 from a Knowledge Cell 800, subsequent Operations 610 or Instruction Sets 600 can be anticipated in the anticipatory Operations 610 or Instruction Sets 600 (i.e. Operation n+1, Operation n+2, etc.) from the Knowledge Cell 800. Any number of Operations 610 or Instruction Sets 600 can be compared in alternate embodiments of Substantial Similarity Comparisons 1010.

Substantial Similarity Comparison 1010 may include a Comparison Strictness Function 1011. Although FIG. 15 illustrates each Substantial Similarity Comparison 1010 including its own Comparison Strictness Function 1011, Comparison Strictness Function 1011 may be a single function, in connection with Decision-making Unit 540, servicing multitude Substantial Similarity Comparisons 1010. Comparison Strictness Function 1011 comprises the functionality for determining or defining strictness criteria or rules for finding a substantial similarity match between Operations 610 or Instruction Sets 600, and/or other functionalities. Comparison Strictness Function 1011 comprises the functionality for determining or defining strictness criteria or rules for finding a substantial similarity match between Operations 610 or Instruction Sets 600 in Operation List 510 and Operations 610 or Instruction Sets 600 in Knowledgebase 530, Neural Network 850 (later described), or other repository. Comparison Strictness Function 1011 comprises the functionality for determining or defining strictness criteria or rules for finding a substantial similarity match between Operations 610 or Instruction Sets 600 in Operation List 510 and Operations 610 or Instruction Sets 600 in Knowledge Cells 800. Comparison Strictness Function 1011 may therefore define appropriately strict rules for finding or determining substantial similarity between the compared Operations 610 or Instruction Sets 600. In some aspects, if the rules are too strict, Substantial Similarity Comparisons 1010 may not find a matching Knowledge Cell 800. On the other hand, if the rules are too lenient Substantial Similarity Comparisons 1010 may find too many matching Knowledge Cells 800 and anticipate inaccurate Software Application's 120 future operations (i.e. future Operations 610 or Instruction Sets 600). Comparison Strictness Function 1011 may therefore include the functionality for setting and resetting the strictness of rules for finding or determining substantial similarity between the compared Operations 610 or Instruction Sets 600, thereby, fine tuning Substantial Similarity Comparisons 1010 so that the rules for finding a match are not too strict nor too lenient.

Appropriately strict rules for substantial similarity can be defined based on the type of Software Application 120, experience, testing, inquiry, analysis, synthesis, or other techniques. As such, strictness rules of Comparison Strictness Function 1011 can be set by a user, by UAIE administrator, or automatically by the system based on such experience, knowledge, and/or input. In some embodiments, substantial similarity can be achieved when most of the Instruction Set Portions 620 and/or Extra Info 630 of the most recently used or executed Operations 610 or Instruction Sets 600 (i.e. Operation n, Operation n−1, and Operation n−2, etc.) from Operation List 510 match or substantially match the Instruction Set Portions 620 and/or Extra Info 630 of the corresponding (i.e. comparative) Operations 610 or Instruction Sets 600 from Knowledge Cell 800. Alternatively, total equivalence is found when al Instruction Set Portions 620 and/or Extra Info 630 of the most recently used or executed Operations 610 or Instruction Sets 600 from Operation List 510 match the Instruction Set Portions 620 and/or Extra Info 630 of all corresponding (i.e. comparative) Operations 610 or Instruction Sets 600 from Knowledge Cell 800. In other embodiments, when a total equivalence match is not found, Substantial Similarity Comparison 1010 can omit less important Instruction Set Portions 620 and/or Extra Info 630 from the comparison. Importance of an Instruction Set Portion 620 and/or Extra Info 630 may be indicated by Importance Index 640 (later described) or other importance ranking technique. In one example, some or all Instruction Set Portions 620 and/or Extra Info 630 containing values, operators, or other components can be omitted from Substantial Similarity Comparison 1010. In another example, some or all Extra Info 630 can be omitted from Substantial Similarity Comparison 1010. In yet another example (i.e. context reliant applications, etc.), some or all Instruction Set Portions 620 can be omitted from Substantial Similarity Comparison 1010.

Comparison Strictness Function 1011 comprises the functionality to automatically adjust its level of strictness for finding or determining a substantial similarity match between the compared Operations 610 or Instruction Sets 600. Depending on design, various levels of strictness can be used. In some embodiments, Comparison Strictness Function 1011 may set the rules for substantial similarity match to include perfect matches between the compared Operations 610 or Instruction Sets 600. If such a match is not found, Comparison Strictness Function 1011 can decrease the strictness level. In some aspects, in response to decreasing the strictness level, Comparison Strictness Function 1011 may set the strictness of the rules for substantial similarity match in terms of a total equivalence with respect to command or other portions of the Operation 610 or Instruction Set 600 only, thereby tolerating mismatches in variable and/or object names, for example. Comparison Strictness Function 1011 can choose to relax the rules in response to determining that no total equivalence match had been found. For example, substantial similarity is achieved when a match is found in terms of a correct operation, but for a different object than the one presently operated on. In such instances, upon presenting (if user confirmation is enabled) the user with the substantial similarity match (i.e. substantially similar knowledge cell), UAIE may give the user an anticipatory Operation 610 or Instruction Set 600 from the matched Knowledge Cell 800, thereby allowing the user to change object names into the ones desired, still saving the user work on inputting the commands. In further embodiments, Comparison Strictness Function 1011 may, upon determining that a perfect match is not found, allow for matching all but one of the Operations 610 or Instruction Sets 600 from Operation List 510 or Knowledge Cell 800. In further embodiments, Comparison Strictness Function 1011 may set the rules to find a match with all but two or more Operations 610 or Instruction Sets 600 from Operation List 510 or Knowledge Cell 800.

All the aforementioned settings of strictness of substantial similarity can be set, or reset, by Comparison Strictness Function 1011, in response to another strictness level determination. For example, Comparison Strictness Function 1011 may adjust strictness level for identifying or determining a substantial similarity match for an Operation 610 or Instruction Set 600 whose Instruction Set Portions 620 corresponding to command words are a total match with Instruction Set Portions 620 of the compared Operation 610 or Instruction Set 600, while tolerating mismatches in variable names, object names, and/or other components. Such an adjustment in strictness can be done by Comparison Strictness Function 1011 in response to determining that a total equivalence match for an entire Operation 610 or Instruction Set 600 is not found. Similarly, Comparison Strictness Function 1011 may adjust the strictness level for identifying or determining a substantial similarity match for an Operation 610 or Instruction Set 600 whose Instruction Set Portions 620 match all but one Instruction Set Portion 620 of the compared Operation 610 or Instruction Set 600. Also, Comparison Strictness Function 1011 may adjust the strictness level for identifying or determining a substantial similarity match for an Operation 610 or Instruction Set 600 whose Instruction Set Portions 620 match all but two or more Instruction Set Portions 620 of the compared Operation 610 or Instruction Set 600. Such an adjustment in strictness can be done by Comparison Strictness Function 1011 in response to determining that not a sufficient number of matches had been found using a higher strictness level.

Comparison Strictness Function 1011 can therefore increase or decrease the strictness of the rules for finding or determining a substantial similarity match depending on whether or not perfect matches (i.e. perfect equivalents between the compared Operations 610 or Instruction Sets 600) had been found. As such, Comparison Strictness Function 1011 can utilize two thresholds, an upper and lower thresholds, to define the strictness of the rules used for determining a substantial similarity match. The upper threshold may correspond to the number of substantial similarity matches that are too high to be presented (if user confirmation is enabled) to the user (i.e. too many matching results, too vague suggestions). Alternatively, the lower threshold may correspond to the strictness level that results in too few results to be presented (if user confirmation is enabled) to the user, for example. Comparison Strictness Function 1011 can make any combination of the aforementioned adjustments to achieve that the number of substantial similarity matches between the compared Operations 610 or Instruction Sets 600 falls between the upper and lower thresholds. As such, Comparison Strictness Function 1011 can keep adjusting the strictness rules for finding the substantially similar match until both thresholds are satisfied, thereby adjusting the results until the best set of results is found.

In some designs, Comparison Strictness Function 1011 can adjust the strictness level by choosing the number of Operations 610 or Instruction Sets 600 that it will use to find a substantial similarity match. For example, as first three Operations 610 or Instruction Sets 600 are used or executed, Comparison Strictness Function 1011 may run these three Operations 610 or Instruction Sets 600 against Knowledge Cells 800 in Knowledgebase 530. If Substantial Similarity Comparison 1010 provides a number of matching results (i.e. total equivalences) that is above a particular threshold, Comparison Strictness Function 1011 can decide to increase the strictness of the rules to decrease the number of results. In response, Substantial Similarity Comparison 1010 can then decide to wait for a fourth Operation 610 or Instruction Set 600 to be used or executed, thereby allowing Substantial Similarity Comparison 1010 to use the fourth Operation 610 or Instruction Set 600 in addition to the earlier three to find a smaller number of matching results. Once the fourth Operation 610 or Instruction Set 600 is used or executed, Substantial Similarity Comparison 1010 can use all four Operations 610 or Instruction Sets 600 to find a match. If the number of matching results (i.e. total equivalences) is sufficiently small, the system may present (if user confirmation is enabled) the user with these results. If however, the number of matching results is still too high, Comparison Strictness Function 1011 may determine to further increase the strictness by requiring additional Operations 610 or Instruction Sets 600 to be used or executed and thereby further narrow the search results before presenting (if user confirmation is enabled) the user with the suggested results. In some embodiments, the additional Operations 610 or Instruction Sets 600 may include an incomplete Operation 610 or Instruction Set 600 such as first one or more Instruction Set Portions 620 (i.e. as user is inputting them, etc.). In other embodiments, the additional Operations 610 or Instruction Sets 600 may include a portion of Operation 610 or Instruction Set 600 such as one or more characters, digits, symbols, and/or other items (i.e. as user is inputting them, etc.).

In some embodiments, to increase comparison accuracy, Substantial Similarity Comparison 1010 can use Extra Info 630 (i.e. time stamp, contextual information, etc.) and/or other information for finding or determining a match between Operations 610 or Instruction Sets 600 from Operation List 510 and the corresponding (i.e. comparative) Operations 610 or Instruction Sets 600 from Knowledge Cells 800. Concerning time stamp, for example, user may perform some Software Application's 120 operations (i.e. checking email, scanning for viruses, etc.) periodically such as during a specific time of day, week, month, year, or other time period. Substantial Similarity Comparison 1010 can utilize time stamp in the comparisons to determine a match in the case of time-sensitive Operations 610 or Instruction Sets 600.

In further embodiments, another technique for increasing comparison accuracy of Substantial Similarity Comparison 1010 and/or adjusting strictness level of Comparison Strictness Function 1011 includes semantic analysis. For example, an Operation 610 or Instruction Set 600 from Operation List 510 may contain an object called Customers. Instead of or in addition to searching for the exact name match in the corresponding (i.e. comparative) Operation 610 or Instruction Set 600 from Knowledge Cells 800, Substantial Similarity Comparison 1010 can employ semantic analysis and attempt to match Cust, Cst, Cstm, Cstmr, Cstmrs, or other semantically equivalent variations of the object name with a meaning Customers. In addition to object names, Semantic analysis can be utilized with any differing field or segment (i.e. Instruction Set Portion 620, Extra Info 630, etc.) of an Operation 610 or Instruction Set 600 with potentially same meaning such as various operators with same meanings, various values with same meanings, various keywords with same meanings, etc. In one example, semantic analysis can be implemented using a thesaurus or dictionary. In another example, semantic analysis can be implemented using a table where each row comprises semantically equivalent variations of an Instruction Set Portion 620 and/or Extra Info 630.

Referring to FIG. 16A and FIG. 16B, some embodiments of Importance Index 640 are illustrated. Importance Index 640 comprises the functionality for storing importance of the element to or with which the index is assigned or associated. Importance Index 640 comprises the functionality for storing importance of Instruction Set Portion 620 or Extra Info 630 to or with which the index is assigned or associated as shown in FIG. 16A. Importance Index 640 comprises the functionality for storing importance of Operation 610 or Instruction Set 600 to or with which the index is assigned or associated as shown in FIG. 16B. Importance Index 640 comprises the functionality for storing importance of Knowledge Cell 800 to or with which the index is assigned or associated. Importance Index 640 on a scale from 0 to 10 can be utilized, for example. Any other range can also be utilized as Importance Index 640. In some aspects, Importance Index 640 can be used for adjusting strictness level and/or comparison accuracy of Substantial Similarity Comparison 1010. In one example, a higher Importance Index 640 can be assigned to Instruction Set Portions 620 comprising commands, functions, parameters, and/or objects. In another example, a higher Importance Index 640 can be assigned to Extra Info 630 comprising time stamps, computed information, and/or other contextual information. In a further example, a higher Importance Index 640 can be assigned to front-most Instruction Set Portions 620 of an Instruction Set 600 or Operation 610. In a further example, a higher Importance Index 640 can be assigned to the most recently used or executed Operations 610 or Instruction Sets 600 in an Operation List 510. In a further example, a higher Importance Index 640 can be assigned to the most recently used or executed comparative Operations 610 or Instruction Sets 600 in a Knowledge Cell 800. Any Importance Index 640 can be assigned to or associated with any Instruction Set Portion 620, Extra Info 630, Operation 610 or Instruction Set 600, and/or other element. Assignment of Importance Indexes 640 can be implemented using a table (not shown) where one column comprises elements, and another column comprises their Importance Indexes 640. For example, one column of a table may include Instruction Set Portions 620 and/or Extra Info 630 or types of Instruction Set Portions 620 and/or Extra Info 630, and another column may include their Importance Indexes 640. Importance Indexes 640 of various Instruction Set Portions 620 and/or Extra Info 630 can be defined based on the type of Software Application 120, experience, testing, inquiry, analysis, synthesis, or other techniques. As such, Importance Index 640 of various Instruction Set Portions 620 and/or Extra Info 630 can be set by a user, by UAIE administrator, or automatically by the system. In some aspects, Importance Indexes 640 can be assigned to or associated with Instruction Set Portions 620 and/or Extra Info 630 by Command Disassembler 500. Importance Indexes 640 can be stored in various arrangements. In one example, Importance Index 640 pertaining to an Instruction Set Portion 620 or Extra Info 630 can be stored in a data field of Operation 610 or Instruction Set 600, the data field associated with the Instruction Set Portion 620 or Extra Info 630. In another example, Importance Index 640 pertaining to an Operation 610 or Instruction Set 600 can be stored in Extra Info 630 or any data field of the Operation 610 or Instruction Set 600. In a further example, Importance Index 640 pertaining to a Knowledge Cell 800 can be stored in a data field of the Knowledge Cell 800. In a further example, Importance Index 640 can be associated with an Instruction Set Portion 620, Extra Info 630, Operation 610 or Instruction Set 600, Knowledge Cell 800, or other element and stored somewhere else such as in a separate repository.

Figure 17A:
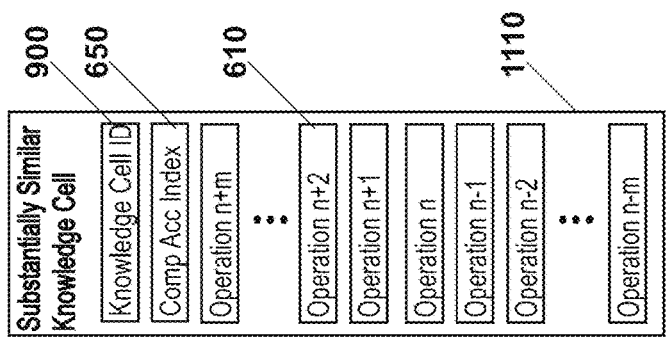
FIG. 17A illustrates an embodiment of Comparison Accuracy Index 650 used for Substantially Similar Knowledge Cell 1110.
Figure 17B:
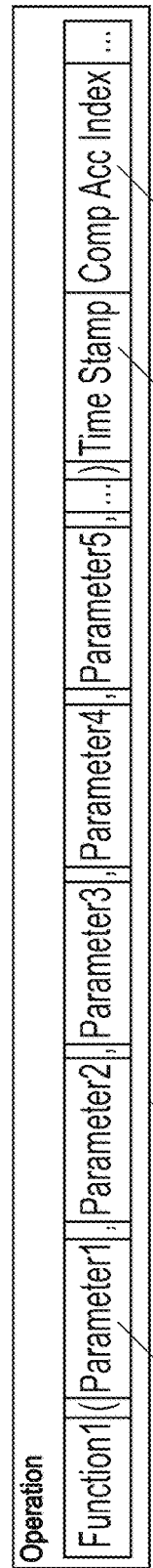
FIG. 17B illustrates an embodiment of Comparison Accuracy Index 650 used for Operation 610.

Referring to FIG. 17A and FIG. 17B, some embodiments of Comparison Accuracy Index 650 (also referred to as Comp Acc Index) are illustrated. Comparison Accuracy Index 650 comprises the functionality for storing a measure of how well an element to or with which the index is assigned or associated is matched with another element. Comparison Accuracy Index 650 comprises the functionality for storing a measure of how well a Knowledge Cell 800 such as, for example, Substantially Similar Knowledge Cell 1110 (later described) to or with which the index is assigned or associated is matched with Operation List 510 as shown in FIG. 17A. Comparison Accuracy Index 650 comprises the functionality for storing a measure of how well an Operation 610 or Instruction Set 600 to or with which the index is assigned or associated is matched with another Operation 610 or Instruction Set 600 as shown in FIG. 17B. Comparison Accuracy Index 650 comprises the functionality for storing a measure of how well an Instruction Set Portion 620 and/or Extra Info 630 to or with which the index is assigned or associated is matched with another Instruction Set Portion 620 and/or Extra Info 630. Comparison Accuracy Index 650 comprises the functionality for storing a measure of how well a Knowledge Cell 800 to or with which the index is assigned or associated is matched with another Knowledge Cell 800. Comparison Accuracy Index 650 on a scale from 0 to 10 can be utilized, for example. Any other range can also be utilized as Comparison Accuracy Index 650. In some designs, Comparison Accuracy Index 650 can be determined during Substantial Similarity Comparison 1010 based on how well matched are the compared Operations 610 or Instruction Sets 600. In one example, Comparison Accuracy Index 650 can be determined for an Operation 610 or Instruction Set 600 based on a ratio/percentage of matched Instruction Set Portions 620 and/or Extra Info 630 relative to the number of al Instruction Set Portions 620 and/or Extra Info 630 in the Operation 610 or Instruction Set 600. Specifically, Comparison Accuracy Index 650 of is determined if all Instruction Set Portions 620 and/or Extra Info 630 match. Similarly, Comparison Accuracy Index 650 of 8.2 is determined if 82% of Instruction Set Portions 620 and/or Extra Info 630 match. In another example, importance (as indicated by Importance Index 640 or other importance ranking technique) of one or more Instruction Set Portion 620 and/or Extra Info 630 may be included in the calculation of a weighted Comparison Accuracy Index 650. Any other formula or technique can be utilized to determine or calculate Comparison Accuracy Index 650. Comparison Accuracy Index 650 can be stored in various arrangements. In one example, Comparison Accuracy Index 650 pertaining to a Substantially Similar Knowledge Cell 1110 or any Knowledge Cell 800 can be stored in a data field of the Substantially Similar Knowledge Cell 1110 or any Knowledge Cell 800. In another example, Comparison Accuracy Index 650 pertaining to an Operation 610 or Instruction Set 600 can be stored in Extra Info 630 or any data field of the Operation 610 or Instruction Set 600. In a further example, Comparison Accuracy Index 650 can be associated with a Knowledge Cell 800, Operation 610 or Instruction Set 600, or other element and stored somewhere else such as in a separate repository. Comparison Accuracy Index 650 can be used for various purposes. In one example, Comparison Accuracy Index 650 can be presented to a user in User Confirmation 1130 to help streamline the confirmation process (if user confirmation is enabled). In another example, Comparison Accuracy Index 650 can be used to autonomously execute anticipatory Operations 610 or Instruction Sets 600 without user confirmation if the index is sufficiently high (i.e. 9 or 10 on a 0-10 scale, etc.). In a further example, Comparison Accuracy Index's 650 indication of how well matched are Operations 610 or Instruction Sets 600 from Operation List 510 and a Knowledge Cell 800 in Substantial Similarity Comparison 1010 can be used to determine how many anticipatory Operations 610 or Instruction Sets 600 from the Knowledge Cell 800 may be anticipated. For instance, if a perfect or strong substantial similarity match is found between Operations 610 or Instruction Sets 600 from Operation List 510 and a Knowledge Cell 800 (i.e. Substantially Similar Knowledge Cell 1110, etc.), the system may decide to anticipate all anticipatory Operations 610 or Instruction Sets 600 from the Knowledge Cell 800. Conversely, if a weak substantial similarity match is found, the system may decide to anticipate only one or a few anticipatory Operations 610 or Instruction Sets 600 from the Knowledge Cell 800. Any other number of anticipatory Operations 610 or Instruction Sets 600 can be anticipated in between the two ends of the spectrum depending on Comparison Accuracy Index 650. Comparison Accuracy Index 650 can be used for any other purpose.

Referring to Decision-making Unit 540, in some embodiments, Decision-making Unit 540 comprises the functionality for analyzing context in which Instruction Sets 600 or Operations 610 have been performed, and/or other functionalities. In other embodiments, Decision-making Unit 540 comprises computational functionalities for creating or analyzing computed information. Computed information can be created or analyzed by performing computations using Instruction Set Portions 620, Extra Info 630, contextual information, time information, geo-spatial information, environmental information, situational information, observed information, other computed information, pre-computed information, analyzed information, inferred information, and/or other information. In further embodiments, Decision-making Unit 540 comprises the functionality to create or analyze inferred information. Inferred information can be created or analyzed by drawing an inference from Instruction Set Portions 620, Extra Info 630, contextual information, time information, geo-spatial information, environmental information, situational information, observed information, computed information, pre-computed information, analyzed information, other inferred information, and/or other information. These functionalities can be utilized in some implementations of Substantial Similarity Comparisons 1010 to find the most accurate substantially similar knowledge cell for particular types of Software Applications 120 such as context reliant applications (i.e. certain computer games, etc.). In one example, Decision-making Unit 540 may analyze a Knowledge Cell 800 that represents movements of a user's character (i.e. avatar, etc.) in a computer game. Decision-making Unit 540 can infer that, in a situation where a specific object (i.e. opponent character, building, forest, rock, etc.) was near, user's character (i.e. avatar, etc.) had moved toward the object. The inference that user's character had moved toward the object can be drawn by computing that the distance between the user's character and the object decreased. The computations can be performed using coordinates of user's character, coordinates of the object (i.e. opponent character, building, forest, rock, etc.), and/or other attributes, properties, Extra Info 630, location information, or other information. The computations or estimations can be performed using Pythagorean theorem, Euclidean distance formula, trigonometry, and/or other theorems, formulas, or disciplines, as applicable. In other examples, user's character's bearing, speed, and/or other attributes, properties, or other information can similarly be computed. In some aspects, computed contextual or other information (i.e. distance, bearing, speed, etc.) can be stored in Extra Info 630 of an Operation 610 or Instruction Set 600, in a Knowledge Cell 800, or in another repository to be used later in the process (i.e. in Confirmation Unit 550, Context Interpreter 1120, etc.). Decision-making Unit 540 may include some or all the features and embodiments of Confirmation Unit 550 and/or Context Interpreter 1120 described later.

Figure 18:
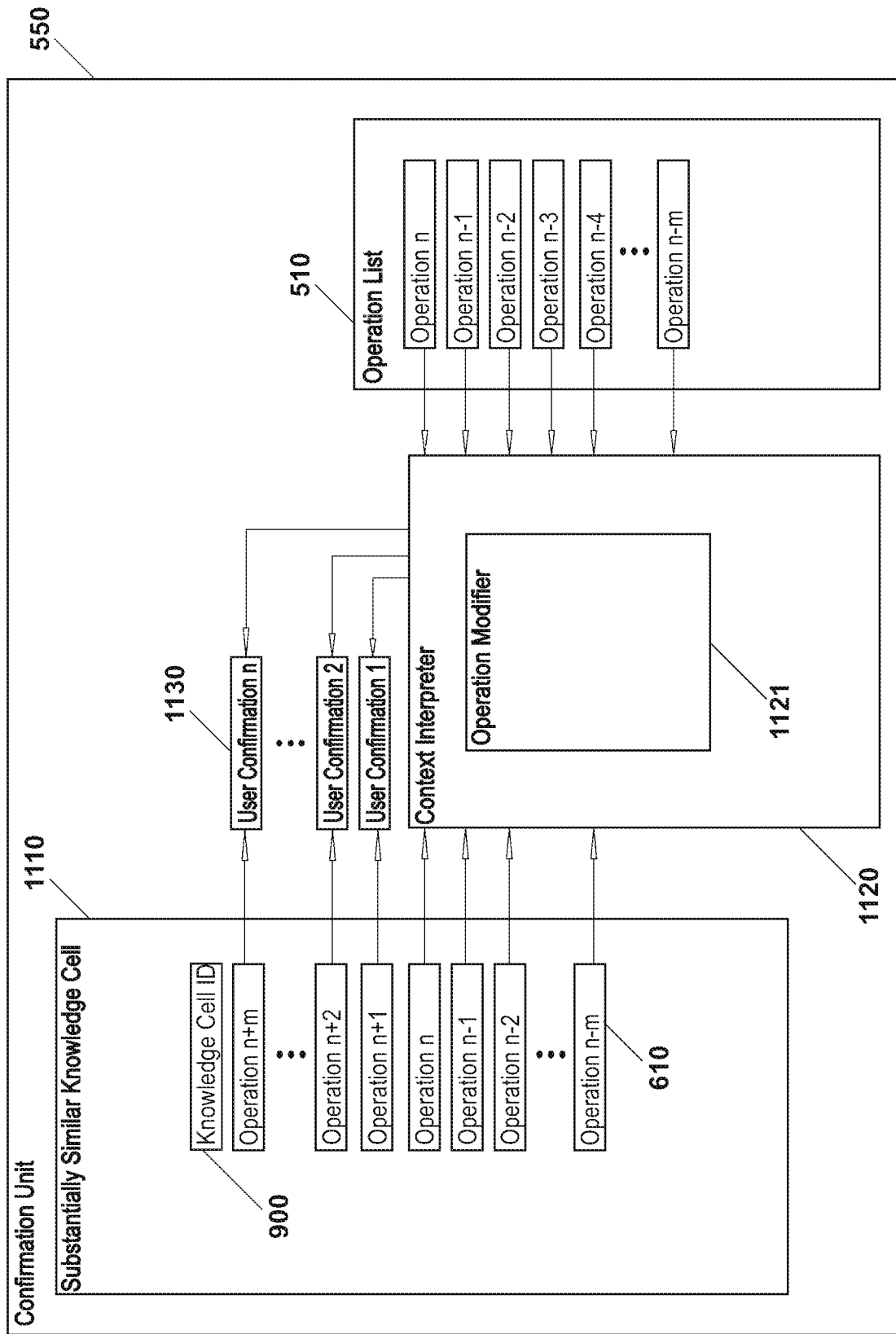
FIG. 18 is a diagram showing an embodiment of Confirmation Unit 550 comprising Substantially Similar Knowledge Cell 1110.

Referring to FIG. 18, Confirmation Unit 550 comprises the functionality for confirming, editing (i.e. modifying, etc.), evaluating (i.e. rating, etc.), and/or canceling anticipatory Operations 610 or Instruction Sets 600 (i.e. anticipated Software Application's 120 instructions or operations, etc.), and/or other functionalities. Confirmation Unit 550 comprises the functionality for analyzing or interpreting a context in which Instruction Sets 600 or Operations 610 may have been performed. Confirmation Unit 550 comprises the functionality for modifying anticipatory Operations 610 or Instruction Sets 600 (i.e. anticipated Software Application's 120 instructions or operations) based on context analysis or interpretation. Confirmation Unit 550 may include some or all features, functionalities, and embodiments of Decision-making Unit 540 as applicable.

Confirmation Unit 550 comprises Substantially Similar Knowledge Cell 1110, Context Interpreter 1120, Operation Modifier 1121, User Confirmation 1130, and Operation List 510. Other additional elements can be included as needed, or some of the disclosed ones can be excluded, or a combination thereof can be utilized in alternate embodiments. In some aspects, Substantially Similar Knowledge Cell 1110 is a Knowledge Cell 800 whose comparative Operations 610 or Instruction Sets 600 are found or determined to be substantially similar to the most recently used or executed Operations 610 or Instruction Sets 600 from Operation List 510. Substantially Similar Knowledge Cell 1110 may therefore be a result of or output from Decision-making Unit 540, Substantial Similarity Comparison 1010, and/or other related elements or steps.

In some embodiments, Confirmation Unit 550 can serve as a means of confirming anticipatory Operations 610 or Instruction Sets 600. For example, UAIE may determine most likely anticipatory Operations 610 or Instruction Sets 600 and provide them to User 50 for confirmation. User 50 may be provided with an interface (i.e. graphical user interface, selectable list of anticipatory Operations 610 or Instruction Sets 600, etc.) to approve or confirm execution of the anticipatory Operations 610 or Instruction Sets 600. In other embodiments, Confirmation Unit 550 can serve as a means of editing or modifying anticipatory Operations 610 or Instruction Sets 600. For example, UAIE may determine most likely anticipatory Operations 610 or Instruction Sets 600 and provide them to User 50 for editing. User 50 may be provided with an interface (i.e. graphical user interface, etc.) to edit the anticipatory Operations 610 or Instruction Sets 600 before their execution. In further embodiments, Confirmation Unit 550 can serve as a means of evaluating or rating anticipatory Operations 610 or Instruction Sets 600 if they matched the indented operation of User 50. For example, UAIE may determine most likely anticipatory Operations 610 or Instruction Sets 600 and autonomously execute them. User 50 may be provided with an interface (i.e. graphical user interface, etc.) to rate (i.e. on a scale from 0 to 10, etc.) how well UAIE predicted anticipatory Operations 610 or Instruction Sets 600. Similar to the previously described Comparison Accuracy Index 650, a rating can be stored in the rated anticipatory Operation 610 or Instruction Set 600, in Extra info 630 of the rated anticipatory Operation 610 or Instruction Set 600, in the rated Substantially Similar Knowledge Cell 1110 or any Knowledge Cell 800, and/or in other repository for improvement of future decision making or matching. In some aspects, rating can be automatic and based on a particular function or method that rates how well the anticipatory Operations 610 or Instruction Sets 600 matched the desired operation. In one example, a rating function or method can assign a higher rating to anticipatory Operations 610 or Instruction Sets 600 that were least modified in the confirmation process. In another example, a rating function or method can assign a higher rating to anticipatory Operations 610 or Instruction Sets 600 that were canceled least number of times by User 50. Any other automatic rating function or method can be utilized. In yet other embodiments, Confirmation Unit 550 can serve as a means of canceling anticipatory Operations 610 or Instruction Sets 600 if they did not match the indented operation of User 50. For example, UAIE may determine most likely anticipatory Operations 610 or Instruction Sets 600 and autonomously execute them. UAIE may save the state of Software Application 120 (i.e. save its variables, data structures, objects, location of its current instruction, and/or other necessary elements in files, databases, environmental variables, data structures, objects, etc.) before executing anticipatory Operations 610 or Instruction Sets 600. User 50 may be provided with an interface (i.e. selectable list of prior executed anticipatory Operations 610 or Instruction Sets 600, etc.) to cancel one or more of the prior executed anticipatory Operations 610 or Instruction Sets 600, and restore Software Application 120 or Computing Device 70 to a prior state. Similar to the previously described rating, a cancelation can be stored in the canceled anticipatory Operation 610 or Instruction Set 600, in Extra info 630 of the canceled anticipatory Operation 610 or Instruction Set 600, in a canceled Substantially Similar Knowledge Cell 1110 or any Knowledge Cell 800, and/or in other repository for improvement of future decision making or matching.

Context Interpreter 1120 comprises the functionality for analyzing or interpreting a context in which Operations 610 or Instruction Sets 600 were performed, and/or other functionalities. Context Interpreter 1120 comprises the functionality for analyzing or interpreting a context in which Operations 610 or Instruction Sets 600 from Operation List 510 and/or Knowledge Cells 800 were performed. In some embodiments, context includes any information related to an Operation 610 or Instruction Set 600 such as its type, time (i.e. time stamp, etc.) of its execution, and/or other contextual information. In other embodiments, context includes any information related to Software Application 120 and/or Computing Device 70 such as type of Software Application 120 (i.e. web browser, game, word processing, database, CAD/CAM software, etc.), type of Computing Device 70 executing Software Application 120, version of Software Application 120, type of User 50 (novice, moderate, skilled, expert), user specific information, group user information, and/or other contextual information. In other embodiments, context includes any component of Instruction Set 600 not captured as an Instruction Set Portion 620, any Instruction Set Portion 620 or component thereof that is not used in Substantial Similarity Comparison 1010, and/or any information about Operation 610 or Instruction Set 600 that may be useful in anticipating Software Application's 120 future operations (i.e. anticipatory Operations 610 or Instruction Sets 600). In general, context or contextual information may include any Instruction Set Portion 620, Extra Info 630, time information, geo-spatial information, environmental information, situational information, observed information, computed information, pre-computed information, analyzed information, inferred information, and/or other information. Contextual information can be stored in Extra Info 630 of an Operation 610, in Knowledge Cell 800, in Knowledgebase 530, and/or in other data structure or repository. In some aspects, Context Interpreter 1120 performs an extra analysis step and it attempts to capture information, steps, and/or elements that may have been omitted by Command Disassembler 500, Knowledge Structuring Unit 520, Decision-making Unit 540, Substantial Similarity Comparison 1010, and/or by other elements or steps.

In some embodiments, Context Interpreter 1120 comprises the functionality for obtaining observable information such as reading time from system clock, reading user or group information from operating system's user or group account files, reading type or version of Software Application 120 from Software Application's 120 system files, reading type of Computing Device 70 from operating system's files, obtaining coordinates or other attributes of an object from an application's work files or runtime engine, and/or obtaining other observable information. In other embodiments, Context Interpreter 1120 comprises the functionality for reading or extracting values or ranges of values from Instruction Set Portions 620 and/or Extra Info 630 of an Operation 610 or Instruction Set 600, and/or reading or extracting values or ranges of values from other elements. In other embodiments, Context Interpreter 1120 comprises the functionality for drawing inferences such as whether value of a variable or parameter is increasing or decreasing in consecutive Operations 610 or Instruction Sets 600, whether an object is approaching or retreating from another object, whether an object is moving in a direction of another object, and/or drawing other inferences. Any of the previously described features, functionalities, and embodiments related to inference-making can be used in Context Interpreter 1120. In further embodiments, Context Interpreter 1120 comprises computational functionalities to create or analyze computed information such as computing an object's distance, bearing/direction, speed, and/or other attributes, properties, or information. Any of the previously described features, functionalities, and embodiments related to computed information can be used in Context Interpreter 1120. In further embodiments, Context Interpreter 1120 comprises semantic analysis functionalities such as utilizing semantically equivalent variations of an object's name to find a match, and/or utilizing semantically equivalent variations of other elements. Any of the previously described features, functionalities, and embodiments related to semantic analysis can be used in Context Interpreter 1120. Context Interpreter 1120 comprises the functionality for performing any other context analysis or interpretation.

In some aspects, Context Interpreter 1120 includes Operation Modifier 1121 (also referred to as automatic operation modifier, etc.). Operation Modifier 1121 comprises the functionality for modifying an Operation 610 or Instruction Set 600. Operation Modifier 1121 comprises the functionality for modifying an Operation 610 or Instruction Set 600 (i.e. anticipatory Operation 610 or Instruction Set 600, etc.) by replacing one or more Instruction Set Portions 620 and/or Extra Info 630 of the Operation 610 or Instruction Set 600. Operation Modifier 1121 comprises the functionality for modifying an Operation 610 or Instruction Set 600 (i.e. anticipatory Operation 610 or Instruction Set 600, etc.) based on context analysis or interpretation, observation, inferences drawn, computation, and/or other functionalities of Context Interpreter 1120, Decision-making Unit 540, and/or other elements. Operation Modifier 1121 comprises the functionality for modifying an Operation 610 or Instruction Set 600 (i.e. anticipatory Operation 610 or Instruction Set 600, etc.) based on any technique, function, or method such as, for example, function for projecting, computing, or estimating a path, movement, or trajectory of any objects or other items in Software Application 120. Operation Modifier 1121 comprises the functionality for modifying one or more Operations 610 or Instruction Sets 600 of Substantially Similar Knowledge Cell 1110 or any Knowledge Cell 800.

In one example of a computer game application, Substantially Similar Knowledge Cell 1110 includes Operations 610 or Instruction Sets 600 that store movements of a user's character (i.e. avatar, etc.) in Instruction Set Portions 620 and that store any contextual information (i.e. nearby objects, nearby object's coordinates, nearby object types, etc.) in Extra Info 630. The Instruction Set Portions 620 may include portions of a function (i.e. moveAvatar(Xcoord, Ycoord, . . . ), etc.) used to implement movements of user's character. Context Interpreter 1120, Decision-making Unit 540, or other element with context interpreting functionalities can infer that user's character moved north toward a specific object (i.e. opponent character, building, forest, rock, etc.), for example, based on the coordinates of the movement function stored in Instruction Set Portions 620 and coordinates of nearby objects stored in Extra Info 630. The inference that user's character moved toward the object can be drawn from a determination that the distance between the user's character and the object decreased. If user's character encounters a situation that includes a similar object (i.e. opponent character, building, forest, rock, etc.) east of user's character, for example, Operation Modifier 1121 can then modify or replace Instruction Set Portions 620 representing movement coordinates of anticipatory Operations 610 or Instruction Sets 600 of Substantially Similar Knowledge Cell 1110, thereby causing movement of user's character east toward the object regardless of where those coordinates pointed before the modification. Any inferences can be drawn related to any other information such as distance, bearing/direction, speed, and/or other attributes, properties, or information.

In another example, Context Interpreter 1120, Decision-making Unit 540, or other element with context interpreting functionalities can project a path, movement, or trajectory of user's character or other object based on a computed or estimated formula of the user's character's or other object's prior movement coordinates. In some aspects, user's character's and/or other object's prior movement coordinates can be read or extracted from Instruction Set Portions 620 and/or Extra Info 630 of comparative Operations 610 or Instruction Sets 600 of Substantially Similar Knowledge Cell 1110. A mathematical or computational technique, function, or method can then be applied to compute or estimate the formula that best fits or describes the coordinates. Examples of the mathematical or computational techniques, functions, or methods for computing or estimating the formula include best fit, trend, curve fitting, linear least squares, non-linear least squares, and/or other techniques, functions, or methods. Examples of formulas for a path, movement, or trajectory include any linear (i.e. flat, angular, diagonal, etc.), non-linear (i.e. curved, circular, elliptical, rectangular, triangular, zig-zag, etc.), or other formula. Subsequent movement coordinates can then be calculated using the formula. Operation Modifier 1121 can then modify or replace Instruction Set Portions 620 representing movement coordinates of anticipatory Operations 610 or Instruction Sets 600 of Substantially Similar Knowledge Cell 1110, thereby causing movement of the user's character or other object on the projected path, movement, or trajectory. Similar techniques, functions, or methods can be utilized for projecting a series or sequence of values. For example, user may input a series or sequence of values such as [4, 5, 6] into an input object (i.e. text box, cell, etc.) of an object-oriented or forms-based Software Application 120. A mathematical or computational technique, function, or method can then be applied to compute or estimate the formula that best fits or describes the series or sequence. Context Interpreter 1120, Decision-making Unit 540, or other element with context interpreting functionalities can project subsequent values (i.e. [7, 8, 9, . . . ], etc.) in the series or sequence using the formula. Operation Modifier 1121 can then modify or replace Instruction Set Portions 620 representing the input values of anticipatory Operations 610 or Instruction Sets 600 of Substantially Similar Knowledge Cell 1110, thereby causing autonomous input of values of the projected series or sequence. Any series or sequence can similarly be projected examples of which include [1, 2, 3, . . . ], [2, 3, 5, . . . ], [14, 16, 18, . . . ], [32, 42, 52, . . . ], [93, 103, 113, . . . ], [257, 307, 357, . . . ], [10, 20, 30, . . . ], [100, 200, 300, . . . ], [1000, 2000, 3000, . . . ], and/or others.

In a further example, Context Interpreter 1120, Decision-making Unit 540, or other elements with context interpreting functionalities can read or extract values or ranges of values from Instruction Set Portions 620 and/or Extra Info 630 of one or more Operations 610 or Instruction Sets 600. The one or more Operations 610 or Instruction Sets 600 can be stored in Operation List 510, Substantially Similar Knowledge Cell 1110 or any Knowledge Cell 800, or other data structure or repository. Operation Modifier 1121 can then modify or replace Instruction Set Portions 620 of anticipatory Operations 610 or Instruction Sets 600 of Substantially Similar Knowledge Cell 1110 with the extracted values, thereby configuring anticipatory Operations 610 or Instruction Sets 600 to execute with same values or ranges of values as in previously used or implemented Operations 610 or Instruction Sets 600. Similarly, Context Interpreter 1120, Decision-making Unit 540, or other elements with context interpreting functionalities can read or extract object names from Instruction Set Portions 620 and/or Extra Info 630 of one or more Operations 610 or Instruction Sets 600. Operation Modifier 1121 can then modify or replace Instruction Set Portions 620 of anticipatory Operations 610 or Instruction Sets 600 of Substantially Similar Knowledge Cell 1110 with the extracted object names, thereby configuring anticipatory Operations 610 or Instruction Sets 600 to execute with same object names as in previously used or implemented Operations 610 or Instruction Sets 600. Any other numeric or non-numeric values or ranges thereof can be similarly extracted and utilized.

In a further example, Context Interpreter 1120, Decision-making Unit 540, or other elements with context interpreting functionalities can perform semantic analysis to determine that a semantically equivalent variation of an Instruction Set Portion 620 and/or Extra Info 630 is utilized in an Operation 610 or Instruction Set 600. Semantic analysis can be implemented using thesaurus or dictionary, or a table comprising semantically equivalent variations of Instruction Set Portions 620 and/or Extra Info 630 as previously described. Operation Modifier 1121 can then modify or replace Instruction Set Portions 620 of anticipatory Operations 610 or Instruction Sets 600 of Substantially Similar Knowledge Cell 1110 with the correct semantically equivalent variation of the Instruction Set Portions 620, thereby configuring anticipatory Operations 610 or Instruction Sets 600 to execute with same variation of the Instruction Set Portions 620 as in previously used or implemented Operations 610 or Instruction Sets 600. For instance, object name customer and cstmr referring to the same object can be used in different Operations 610 or Instruction Sets 600, thereby needing semantic analysis to equate the two object names.

In a further example, Context Interpreter 1120, Decision-making Unit 540, or other elements with context interpreting functionalities can obtain observable information such as system time, coordinates or other attributes of an object, user or group specific information, type or version of Software Application 120, type of Computing Device 70, and/or other observable information as previously described. Operation Modifier 1121 can be configured to modify or replace Instruction Set Portions 620 of anticipatory Operations 610 or Instruction Sets 600 of Substantially Similar Knowledge Cell 1110 differently for different observable information. In one instance, Operation Modifier 1121 may modify or replace Instruction Set Portions 620 of anticipatory Operations 610 or Instruction Sets 600 of Substantially Similar Knowledge Cell 1110 differently for different users or groups of users. Specifically, in this instance, Operation Modifier 1121 may modify or replace Instruction Set Portions 620 representing movement of user's character or other object in anticipatory Operations 610 or Instruction Sets 600 of Substantially Similar Knowledge Cell 1110 to cause slower movement of the user's character or other object for novice users or groups of users in a computer game application. In another instance, Operation Modifier 1121 may modify or replace Instruction Set Portions 620 of anticipatory Operations 610 or Instruction Sets 600 of Substantially Similar Knowledge Cell 1110 differently for different times of day, month, year, or other time period. Specifically, in this instance, Operation Modifier 1121 may modify or replace Instruction Set Portions 620 representing temperature values in anticipatory Operations 610 or Instruction Sets 600 of Substantially Similar Knowledge Cell 1110 to allow lower temperature in a building during the night in an energy management application. In a further instance, Operation Modifier 1121 may modify or replace Instruction Set Portions 620 of anticipatory Operations 610 or Instruction Sets 600 of Substantially Similar Knowledge Cell 1110 differently for different Computing Devices 70, Computing Device 70 configurations (i.e. different displays, different display settings, different 110 devices, different processors, etc.), versions of Software Application 120, and/or other considerations. Specifically, in this instance, Operation Modifier 1121 may modify or replace Instruction Set Portions 620 representing movement of user's character or other object in anticipatory Operations 610 or Instruction Sets 600 of Substantially Similar Knowledge Cell 1110 to cause the movement of the user's character or other object to appear correctly on smaller screens in a computer game application.

Any combinations of the disclosed and/or other features, functionalities, and embodiments of Operation Modifier 1121 can be utilized in alternate implementations.

In some embodiments, Comparison Accuracy Index's 650 or other comparison ranking technique's indication of how well matched are Operations 610 or Instruction Sets 600 from Operation List 510 and a Knowledge Cell 800 in Substantial Similarity Comparison 1010 can be used to determine how much anticipatory Operations 610 or Instruction Sets 600 from the Knowledge Cell 800 should be modified. For instance, if a perfect or strong substantial similarity match is found between Operations 610 or Instruction Sets 600 from Operation List 510 and a Knowledge Cell 800 (i.e. Substantially Similar Knowledge Cell 1110, etc.), anticipatory Operations 610 or Instruction Sets 600 from the Knowledge Cell 800 may not need to be modified at al. Conversely, if a weak substantial similarity match is found, anticipatory Operations 610 or Instruction Sets 600 from the Knowledge Cell 800 may need to be modified substantially. Any amount of modification can be implemented in between the two ends of the spectrum. If modification is needed, Operations 610 or Instruction Sets 600 from Substantially Similar Knowledge Cell 1110 or other Knowledge Cel 800 can be modified using any of the previously described or other techniques such as inferring, projecting, computing, inserting extracted values, performing semantic analysis, inserting obtained observable information, and/or others. In some aspects, after the initial modification, Operations 610 or Instruction Sets 600 from Operation List 510 can be re-compared (i.e. by Substantial Similarity Comparison 1010, etc.) with the modified Operations 610 or Instruction Sets 600 from Substantially Similar Knowledge Cell 1110 to find whether a better substantial similarity is found. This process can be performed iteratively until Operations 610 or Instruction Sets 600 from Substantially Similar Knowledge Cell 1110 are modified for optimal substantial similarity with Operations 610 or Instruction Sets 600 from Operation List 510. Such optimally modified Operations 610 or Instruction Sets 600 from Substantially Similar Knowledge Cell 1110 may include optimal or optimally modified anticipatory Operations 610 or Instruction Sets 600.

User Confirmation 1130 comprises the functionality for enabling a user to confirm and/or edit anticipatory Operations 610 or Instruction Sets 600, and/or other functionalities. In some aspects, User Confirmation 1130 comprises the functionality for automating user confirmation if comparison accuracy information (i.e. Comparison Accuracy Index 650, etc.) is available as previously described. In one example, if one or more comparative Operations 610 or Instruction Sets 600 from Substantially Similar Knowledge Cell 1110 were found to be a perfect or highly accurate match, anticipatory Operations 610 or Instruction Sets 600 can be autonomously executed without asking user to confirm them. Conversely, if one or more comparative Operations 610 or Instruction Sets 600 from Substantially Similar Knowledge Cell 1110 were found to be less than a highly accurate match, anticipatory Operations 610 or Instruction Sets 600 can be presented to user for confirmation and/or editing including presenting comparison accuracy information (i.e. Comparison Accuracy Index 650, etc.) for user's consideration. In some aspects, depending on the type of Software Application 120 and/or other factors, User Confirmation 1130 and/or other elements of Confirmation Unit 550 can optionally be disabled or omitted in order to provide an uninterrupted operation of Software Application 120. For example, a form-based application may be suitable for implementing the user confirmation step, whereas, a game may be less suitable for implementing such interrupting step due to the real time nature of game playing/execution.

Figure 19:
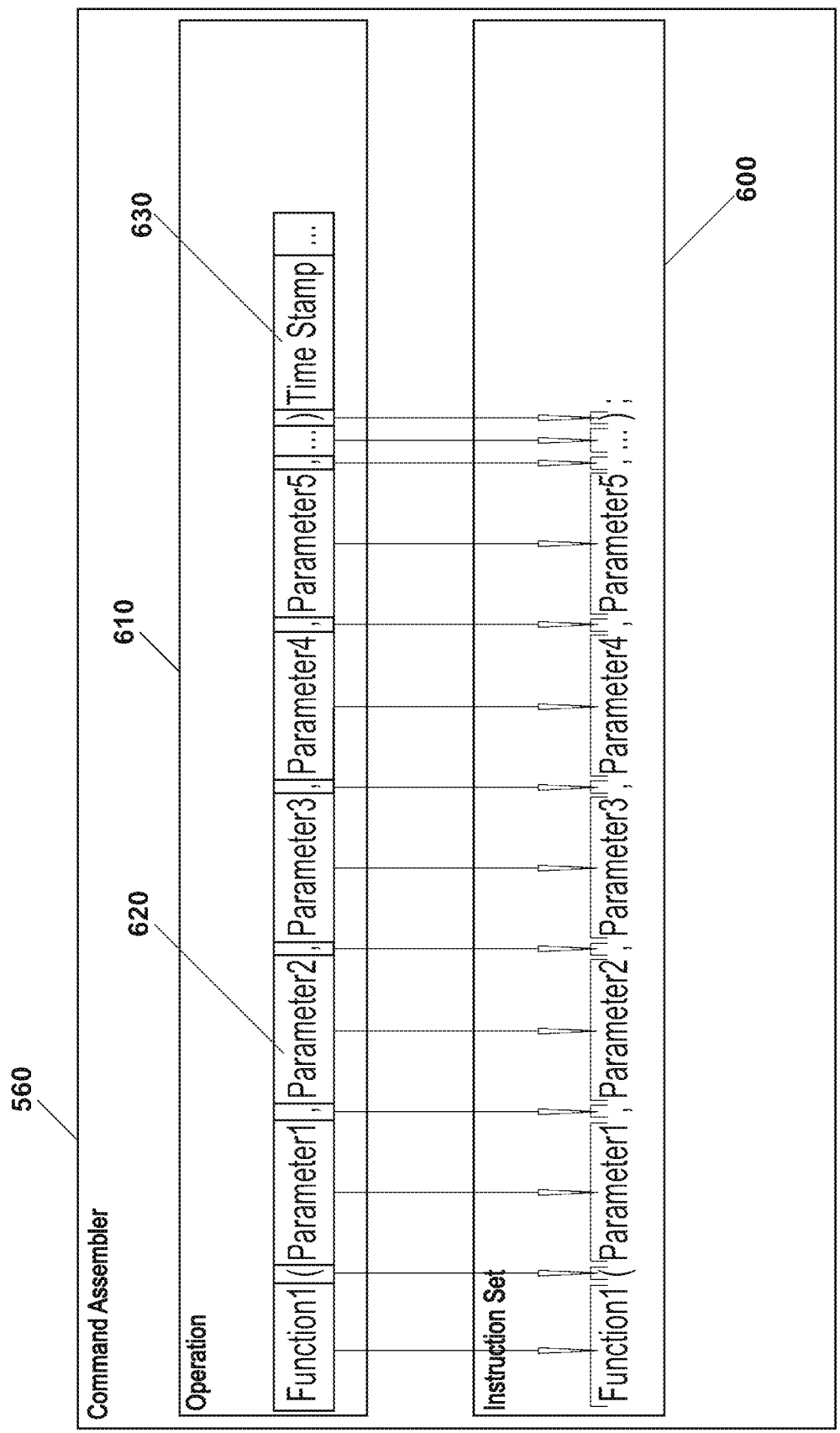
FIG. 19 is a diagram showing an embodiment of Command Assembler 560.

Referring to FIG. 19, Command Assembler 560 comprises the functionality for assembling an Instruction Set 600, and/or other functionalities. Command Assembler 560 comprises the functionality for assembling an Instruction Set 600 from Instruction Set Portions 620 stored in Operation 610. Command Assembler 560 may, in effect, perform a reverse action relative to Command Disassembler 500. In some aspects, Instruction Set 600 can be passed directly to Operation List 510 without being disassembled in which case Command Disassembler 500 and/or any if its elements may be omitted from the overall system. In such implementations, Operation List 510, Knowledge Cells 800, Knowledgebase 530, Neural Network 850 (later described), and/or data structures or repositories may include original Instruction Sets 600 instead of disassembled Operations 610. As such, Substantial Similarity Comparisons 1010 can be performed either directly (i.e. letter for letter, word for word, etc.) between Instruction Sets 600 or indirectly by performing extraction or disassembling of Instruction Set Portions 620 in the comparison step. If Operations 610 are not used and no assembly of various Instruction Set Portions 620 is needed, Command Assembler 560 may simply verify that an Instruction Set 600 is ready for use or execution, or Command Assembler 560 may be omitted.

In some embodiments, instead of or in addition to executing anticipatory Operations 610 or Instruction Sets 600, UAIE or any disclosed element can trigger an external application or process. The external application or process may be an application or process of a system within which Software Application 120 or UAIE operates or with which Software Application 120 or UAIE is connected (i.e. over a network, etc.). For example, UAIE can be used or embedded within a smartphone including a digital camera where UAIE may learn that user often posts a captured photo on an Internet's photo sharing service such as flickr.com, tinypic.com, imgur.com, postimage.org, photobucket.com, and/or other photo sharing service. UAIE can trigger an Internet photo sharing application or process in response to user's capturing a digital photograph through the digital camera's photo capturing software (i.e. digital camera's Software Application 120).

In other embodiments, UAIE can attach to and learn operations of more than one or even all applications on a computing device simultaneously. Acquisition and Modification Interface 110 can obtain instructions (i.e. Instruction Sets 600 or Operations 610, etc.) of any application through tracing or profiling, and/or other previously described techniques. Instructions (i.e. Instruction Sets 600 or Operations 610, etc.) of any application obtained by Acquisition and Modification Interface 110 may be learned and later autonomously implemented as previously described. In some aspects, all instructions (i.e. Instruction Sets 600 or Operations 610, etc.) of more than one application may be learned in the order in which the instructions occurred. In other aspects, all instructions (i.e. Instruction Sets 600 or Operations 610, etc.) of a primary application may be learned where instructions of additional applications may be learned only if they are significantly related to the primary application. In one example, a user may often save a text file and email it to someone (i.e. emailing work to his/her boss, etc.). UAIE can learn text file saving instructions (i.e. Instruction Sets 600 or Operations 610, etc.) of the word processing application and/or contextual information (i.e. Extra Info 630, etc.) such as file name or portions thereof. UAIE can also learn text file emailing instructions (i.e. Instruction Sets 600 or Operations 610, etc.) of the email application and/or contextual information (i.e. Extra Info 630, etc.) such as email address to which the text file was sent. When user saves a text file with similar name in the future, UAIE can implement text file emailing autonomously. In another example, a user may often receive calls on his/her smartphone from phone numbers that user does not recognize (i.e. phone number not in user's contacts, etc.) and, before answering the call, user may seek information about the phone number on a phone number lookup website (i.e. callercenter.com, numberguru.com, etc.) through smartphone's web browser. UAIE can learn call receiving instructions (i.e. Instruction Sets 600 or Operations 610, etc.) of the telephonic application and/or contextual information (i.e. Extra Info 630, etc.) such as phone number or portions thereof. UAIE can also learn phone number lookup instructions (i.e. Instruction Sets 600 or Operations 610, etc.) of the web browser and/or contextual information (i.e. Extra Info 630, etc.) such as the web site that was used to lookup information about the phone number. When user receives a call from a phone number that user does not recognize in the future, UAIE can implement information lookup on the phone number through a web browser autonomously to help user decide whether to answer the cal.

In further embodiments, UAIE can be configured to run automatically and/or perform Software Application 120 operations completely autonomously. For example, UAIE and/or any disclosed element may periodically (i.e. daily, weekly, monthly, yearly, etc.) automatically run to analyze (i.e. through Substantial Similarity Comparison 1010 or other process, etc.) time stamps of some or all Operations 610 or Instruction Sets 600 in Knowledgebase 530, Neural Network 850 (later described), or other data structure or repository to determine which Operations 610 or Instruction Sets 600 have been used or executed in particular time periods. If repetitive Operations 610 or Instruction Sets 600 are found in specific time periods, they can be executed automatically regardless of whether Software Application 120 is running and/or without User's 50 confirmation. In some aspects, automatic execution can be conditional, for example, upon how accurate or confident the substantial similarity match is as indicated by Comparison Accuracy Index 650 or other comparison accuracy ranking technique. Other determinations in addition to analyzing the time stamp can be performed in alternate embodiments.

In further embodiments, UAIE can implement or execute anticipatory instructions (i.e. anticipatory Instruction Sets 600 or Operations 610, etc.) from a Substantially Similar Knowledge Cell 1110 prior to, during, or after execution of instructions from another Substantially Similar Knowledge Cell 1110. For example, as anticipatory Operations 610 or Instruction Sets 600 from one Substantially Similar Knowledge Cell 1110 are executed, UAIE may find another Substantially Similar Knowledge Cell 1110 that is a better fit from that point on. Anticipatory Operations 610 or Instruction Set 600 from the newly found Substantially Similar Knowledge Cell 1110 can then be executed.

Figure 20:
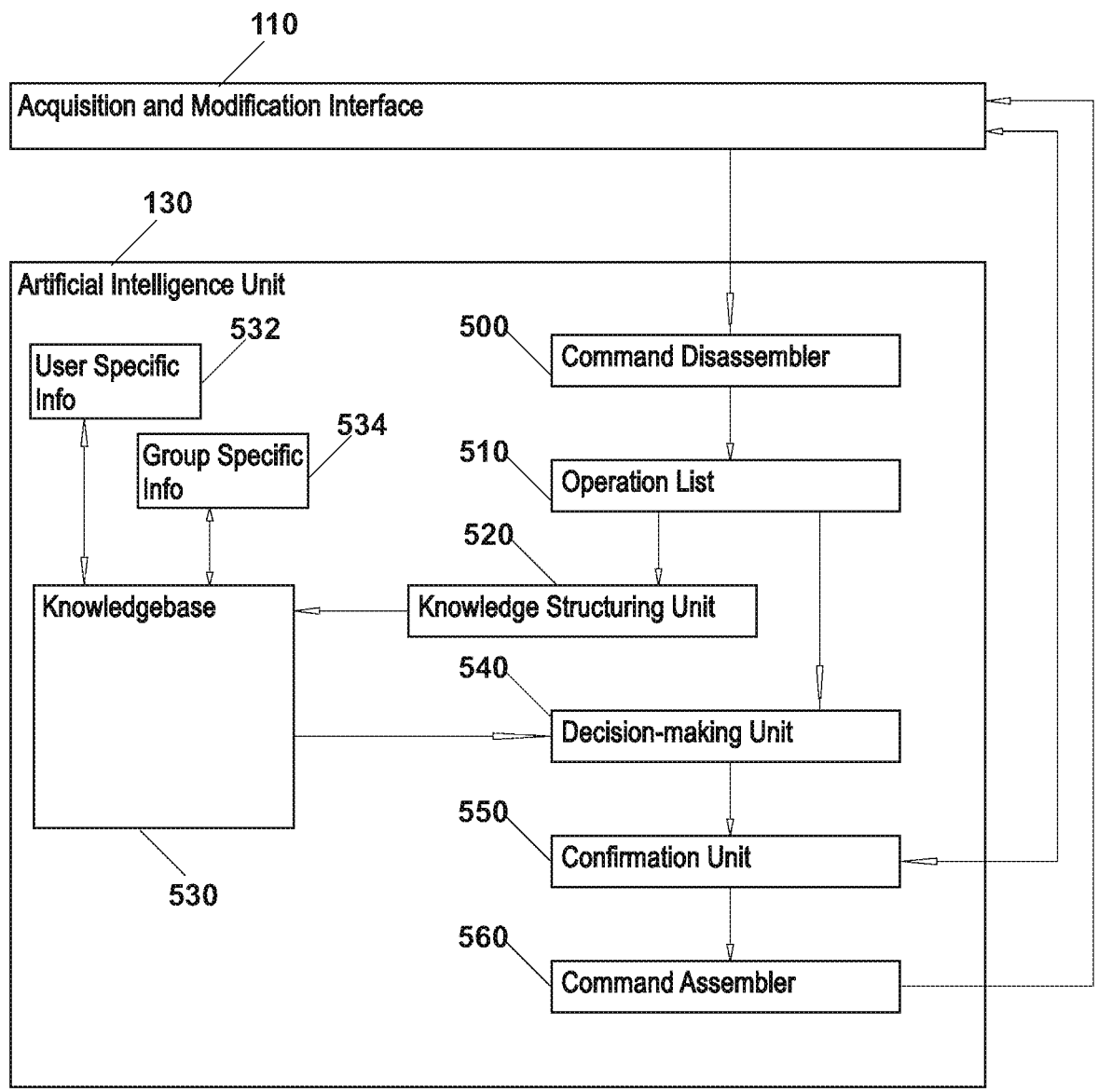
FIG. 20 is a diagram showing an embodiment of Artificial Intelligence Unit 130 comprising User Specific Info 532 and Group Specific Info 534.

Referring to FIG. 20, in some aspects, instead of or in addition to information stored in Extra Info 630, UAIE may include additional information either within Knowledgebase 530, within additional knowledgebases, or within any other element of the overall system. This additional information can assist Substantial Similarity Comparison 1010 and/or other elements or process steps in performance of their respective functions (i.e. more accurately anticipate Software Application's 120 future operations, etc.). For example, UAIE may include additional knowledgebases such as User Specific Information 532, Group Specific Information 534, and/or other additional knowledgebases. These additional knowledgebases can be directly or operatively coupled with Knowledgebase 530 and/or with any other elements of the system as needed.

User Specific Information 532, or User Specific Info 532 comprises the functionality for storing information pertaining to a specific user, and/or other functionalities. There may be plurality of User Specific Infos 532 on the system, one for each user. User Specific Info 532 may include information on the most prevalent Operations 610 or Instruction Sets 600 the user may be using, information on objects on which the user may have most often performed operations, information on types of Operations 610 or Instruction Sets 600 the user most often performs, information on the sequence of Operations 610 or Instruction Sets 600 which the user may perform or have performed most often, and more. User Specific Info 532 may further include the information along with a time stamp for each Operation 610 or Instruction Set 600 which the user has performed in the past, thereby allowing the system to determine which Operations 610 or Instruction Sets 600 the user has most recently been using and which Operations 610 or Instruction Sets 600 the user has not used in a while.

Group Specific Information 534, or Group Specific Info 534 comprises the functionality for storing information pertaining to a group of users, and/or other functionalities. The group of users may be a group having a particular access level to Software Application 120, such as for example group of administrators, group of general users, group of managers, group of guests, and more. Each group can be given a different access level and different level of control over the system. There may be plurality of or Group Specific Infos 534 on the system, one for each group of users. Group Specific Info 534 may include the information on the most prevalent Operations 610 or Instruction Sets 600 the users of the group may be using, information on objects on which the users of the group may have most often performed operations, information on types of operations the users of the group most often perform, information on the sequence of Operations 610 or Instruction Sets 600 which the users of the group may perform or have perform most often, and more. Group Specific Info 534 may further include the information along with a time stamp for each Operation 610 or Instruction Set 600 which the users of the group have performed in the past, thereby allowing the system to determine which Operations 610 or Instruction Sets 600 the users of the group have most recently been using and which Operations 610 or Instruction Sets 600 the user have not used in a while.

Referring now to Acquisition and Modification Interface 110, Application Modification Unit 112 may be an element of Acquisition and Modification Interface 110 as previously described. Application Modification Unit 112 comprises the functionality for modifying execution and/or functionality of Software Application 120, and/or other functionalities. Application Modification Unit 112 comprises the functionality for modifying execution and/or functionality of Software Application 120 during Software Application's 120 execution (i.e. runtime, etc.). Application Modification Unit 112 comprises the functionality for modifying execution and/or functionality of Software Application 120 based on UAIE functionalities. Application Modification Unit 112 comprises the functionality for modifying execution and/or functionality of Software Application 120 based on Artificial Intelligence Unit's 130 anticipatory instructions (i.e. anticipatory Instruction Sets 600 or Operations 610, etc.). Application Modification Unit 112 may include any functionality to access, create, delete, modify, and/or perform other manipulations on source code, bytecode, compiled, interpreted, or otherwise translated code, machine code, and/or other code. Application Modification Unit 112 may include any functionality to access, modify, and/or perform other manipulations on runtime engine/environment, virtual machine, operating system, compiler, just-in-time (JIT) compiler, interpreter, translator, execution stack, program counter, memory, processor registers, files, repositories, objects, data structures, variables, parameters, functions, methods, procedures, routines, subroutines, and/or other computing system elements.

Various techniques can be utilized to modify execution and/or functionality of Software Application 120 depending on embodiments. One of ordinary skill in art will understand that, while all these techniques are too voluminous to list, all of these techniques are within the scope of this disclosure in various implementations of the functionalities described herein. Various platforms and/or computing systems may provide native tools for modifying execution and/or functionality of an application. Independent software vendors may provide tools with similar functionalities that can be utilized across different platforms. These tools enable a wide range of techniques or capabilities for modifying execution and/or functionality of an application such as, for example, self-modifying code capabilities, dynamic code capabilities, branching, code rewriting, code overwriting, instrumentation, hot swapping, and/or other capabilities. Additionally, previously described tools and/or techniques can be utilized for modification of execution and/or functionality of an application. Code instrumentation, for example, may involve inserting additional code, overwriting or rewriting existing code, and/or branching to a separate segment of code (i.e. function, routine/subroutine, method, etc.) as previously described. For example, code instrumentation may include the following:

loadPage("http://www.youtube.com", activeWindow.tabs.activeTab);
modifyApplication( );

In the above sample code, instrumented call to Application Modification Unit's 112 function (i.e. modifyApplication, etc.) can be placed after the web page loading function (i.e. loadPage, etc.) of an application such as web browser, for example. Similar call to application modifying function can be placed after or before some or all functions/routines/subroutines, some or all lines of code, some or all statements, some or all instructions or instruction sets, some or all basic blocks, and/or some or all other code segments of web browser or other application. One or more application modifying function calls can be placed anywhere in the application's code and can be executed at any points in the application's execution. The application modifying function (i.e. modifyApplication, etc.) may include UAIE determined anticipatory instructions (i.e. anticipatory Instruction Sets 600 or Operations 610, etc.) that can modify the application (i.e. web browser in this example, etc.) to which UAIE is attached. In some embodiments, previously described obtaining Software Application's 120 instructions, data, and/or other information as well as modifying execution and/or functionality of Software Application 120 can be implemented in a single function that performs both tasks (i.e. traceAndModifyApplication, etc.). In some aspects, modifying execution and/or functionality of an application may include adding, modifying, removing, rewriting or overwriting application code in memory at runtime. In other aspects, modifying execution and/or functionality of an application may include reflection, which comprises ability to examine and modify the structure and behavior of an application or object at runtime.

In one example, modifying execution and/or functionality of an application can be implemented through utilizing metaprogramming techniques, which include applications that can self-modify or that can create, modify, and/or manipulate other applications. Self-modifying code, dynamic code, reflection, and/or other techniques can be used to facilitate metaprogramming. In some aspects, metaprogramming is facilitated through a programming language's ability to access and manipulate the internals of the runtime engine directly or via an API. In other aspects, metaprogramming is facilitated through dynamic execution of expressions (i.e. anticipatory instructions from Artificial Intelligence Unit 130, etc.) that can be created and/or executed at runtime. In yet other aspects, metaprogramming is facilitated through application modification tools, which can perform any modification on an application regardless of whether the application's programming language enables any metaprogramming capabilities. Some operating systems may protect an application loaded into memory by restricting access to the loaded application. This protection mechanism can be circumvented by utilizing operating system's, processor's, and/or other low level computing device component's features or commands to unprotect the loaded application. For example, a self-modifying application may need to modify the in-memory image of itself. To do so, the application can obtain the in-memory address of its code. The application may then change the operating system's or platform's protection on this memory range allowing it to modify the code (i.e. insert anticipatory instructions from Artificial Intelligence Unit 130, etc.). Linux mprotect command can be used to change protection (i.e. unprotect, etc.) for a region of memory, for example. Other platforms, tools, and/or techniques may provide equivalent or similar functionalities as the above described ones.

In a further example, modifying execution and/or functionality of an application can be implemented through native capabilities of dynamic, interpreted, and/or scripting programming languages and/or platforms. Most of these languages and/or platforms can perform functionalities at runtime that static programming languages may perform during compilation. Dynamic, interpreted, and/or scripting languages provide native functionalities such as self-modification of code, dynamic code, extending the application, adding new code, extending objects and definitions, modifying the type system, and/or other functionalities that can modify an application's execution and/or functionality at runtime. Examples of dynamic, interpreted, and/or scripting languages include Lisp, Pert, PHP, JavaScript, Ruby, Python, Smalltalk, Td, VBScript, and/or others. Similar functionalities can also be provided in languages such as Java, C, and/or others using reflection. Reflection includes the ability of an application to examine and modify the structure and behavior of the application at runtime. For example, JavaScript can modify its own code as it runs by utilizing Function object constructor as follows:

myFunc=new Function(arg1, arg2, argN, functionBody);
Sample code above causes a new function object to be created with the specified arguments and body. The body and/or arguments of the new function object may include anticipatory instructions (i.e. anticipatory Operations 610 or Instruction Sets 600) from Artificial Intelligence Unit 130. The new function can be invoked as any other function in the original code. In another example, JavaScript can utilize eval method that accepts a string of JavaScript statements (i.e. anticipatory instructions from Artificial Intelligence Unit 130, etc.) and execute them as if they were within the original code. An example of how eval method can be used to implement the disclosed functionalities includes the following JavaScript code:

anticipatoryInstructions='window.open("http://www.cnn.com","_blank");';

if (anticipatoryInstructions !=" "&& anticipatoryInstructions !=null)
{
eval(anticipatoryInstructions);
}

In the sample code above, Artificial Intelligence Unit 130 may generate anticipatory instructions (i.e. instructions for opening a URL http://www.cnn.com in a new tab or window, etc.) and save them in anticipatoryInstructions variable, which eval method may then execute. Lisp is another example of dynamic, interpreted, and/or scripting language that includes similar capabilities as previously described JavaScript. For example, Lisp's compile command can create a function at runtime, eval command may parse and evaluate an expression at runtime (similar to previously described JavaScript eval), and exec command may execute a given instruction (i.e. string, etc.) at runtime. In another example, dynamic as well as some non-dynamic languages may provide macros, which combine code introspection and/or eval capabilities. In some aspects, macros can access inner workings of the compiler, interpreter, virtual machine, runtime environment/engine, and/or other components of the computing platform enabling the definition of language-like constructs and/or generation of sections of or complete programs. Other platforms, tools, and/or techniques may provide equivalent or similar functionalities as the above described ones.

In a further example, modifying execution and/or functionality of an application can be implemented through dynamic code, dynamic class loading, reflection, and/or other native functionalities of a programming language or platform. In static applications or static programming, a class can be defined and/or loaded at compile time. Conversely, in dynamic applications or dynamic programming, a class can be loaded into a running environment at runtime. For example, Java Runtime Environment (JRE) may not require that all classes be loaded at compile time and class loading can occur when a class is first referenced at runtime. Dynamic class loading enables inclusion or injection of on-demand software components and/or functionalities at runtime. System provided or custom class loaders may enable loading of classes into the running environment. Custom class loaders can be defined to enable custom functionalities such as, for example, specifying a remote location from which a class is loaded. In addition to dynamic loading of a pre-defined class, a class can also be created at runtime. In some aspects, a class source code can be created at runtime. A compiler such as javac, com.sun.tools.javac.Main, javax.tools, javax.tools.JavaCompiler, and/or other packages can then be utilized to compile the source code. Javac, com.sun.tools.javac.Main, javax.tools, javax.tools.JavaCompiler, and/or other packages may include an interface to invoke Java compiler from within running applications. A Java compiler may accept source code in a file, string, object (i.e. Java String, StringBuffer, CharSequence, etc.) and/or other source, and may generate bytecode (i.e. class file, etc.) conforming to Java Virtual Machine specification. Once compiled, a class loader can then load the compiled class into the running environment. In other aspects, a tool such as Javaassist (i.e. Java programming assistant) can be utilized to enable an application to create or modify a class at runtime. Javaassist may include a Java library that provides functionalities to create and/or manipulate Java bytecode of an application and provides reflection capabilities. Javassist may provide source-level and bytecode-level APIs. Using the source-level API, a class can be created and/or modified using only source code, which Javassist may compile seamlessly on the fly. Javassist source-level API can therefore be used without knowledge of Java bytecode specification. Bytecode-level API enables creating and/or editing a class bytecode directly. In yet other aspects, similar functionalities to the above described ones may be provided in tools such as Apache Commons BCEL (Byte Code Engineering Library), ObjectWeb ASM, CGLIB (Byte Code Generation Library), and/or others. Once a dynamic code or class is created and loaded, reflection in high-level programming languages such as Java and/or others can be used to manipulate or change the runtime behavior of an application. Examples of reflective programming languages and/or platforms include Java, JavaScript, Smalltalk, Lisp, Python, .NET Common Language Runtime (CLR), Td, Ruby, Pen, PHP, Scheme, PL/SQL, and/or others. Reflection can be used in an application to access, examine, modify, and/or manipulate a loaded class and/or its elements. Reflection in Java can be implemented by utilizing a reflection API such as java.lang.Reflect package. The reflection API provides functionalities such as, for example, loading or reloading a class, instantiating a new instance of a class, determining class and instance methods, invoking class and instance methods, accessing and manipulating a class, fields, methods and constructors, determining the modifiers for fields, methods, classes, and interfaces, and/or other functionalities. The above described dynamic code, dynamic class loading, reflection, and/or other functionalities are similarly provided in the .NET platform through its tools such as, for example, System.CodeDom.Compiler namespace, System.Reflection.Emit namespace, and/or other native or other .NET tools. Other platforms in addition to Java and .NET may provide similar tools and/or functionalities. Dynamic code, dynamic class loading, reflection, and/or other functionalities can be used to facilitate the disclosed functionalities by inserting or injecting anticipatory instructions (i.e. anticipatory Operations 610 or Instruction Sets 600) from Artificial Intelligence Unit 130 into a running application. For example, an existing or dynamically created class comprising UAIE functionalities can be loaded into a running application through manual, automatic, or dynamic instrumentation. Once the class is created and loaded, an instance of UAIE class may be constructed. The instance of UAIE can then take or exert control of the application and/or implement anticipatory instructions (i.e. anticipatory Operations 610 or Instruction Sets 600) from Artificial Intelligence Unit 130 at any point in the application's execution. Other platforms, tools, and/or techniques may provide equivalent or similar functionalities as the above described ones.

In a further example, modifying execution and/or functionality of an application can be implemented through independent tools that can be utilized across different platforms. Many tools exist that provide instrumentation and/or other capabilities on more than one platform or computing system, which may enable application modification or insertion of instructions such as anticipatory instructions (i.e. anticipatory Operations 610 or Instruction Sets 600) from Artificial Intelligence Unit 130. Examples of these tools include Pin, DynamoRIO, DynInst, Kprobes, KemInst, OpenPAT, DTrace, SystemTap, and/or others. In some aspects, Pin and/or any of its systems, methods, and/or techniques can be utilized for dynamic instrumentation. Pin can perform instrumentation by taking control of an application after it loads into memory. Pin may insert itself into the address space of an executing application, enabling it to take control. Pin JIT compiler can then compile and implement alternate code such as anticipatory instructions (i.e. anticipatory Operations 610 or Instruction Sets 600) from Artificial Intelligence Unit 130. Pin provides an extensive API for instrumentation at many abstraction levels. Pin supports two modes of instrumentation, JIT mode and probe mode. JIT mode uses a just-in-time compiler to recompile program code and insert instrumentation while probe mode uses code trampolines for instrumentation. Pin was designed for architecture and operating system independence. In other aspects, KemInst and/or any of its systems, methods, and/or techniques can be utilized for dynamic instrumentation. KemInst may include an instrumentation framework designed for dynamically inserting code into a running kernel (i.e. operating system kernel, etc.). KemInst implements probe-based dynamic instrumentation where code can be inserted, changed, and/or removed at will. Keminst API enables client tools to construct their own tools for dynamic kernel instrumentation to suit variety of purposes such as insertion of anticipatory instructions (i.e. anticipatory Operations 610 or Instruction Sets 600) from Artificial Intelligence Unit 130. Client tools can also communicate with KemInst over a network (i.e. internet, wireless network, LAW, WAN, etc). Other platforms, tools, and/or techniques may provide equivalent or similar functionalities as the above described ones.

In a further example, modifying execution and/or functionality of an application can be implemented through utilizing operating system's native tools or capabilities such as Unix ptrace command. Ptrace includes a system call that may enable one process to control another allowing the controller to inspect and manipulate the internal state of its target. Ptrace can be used by specialized programs (i.e. UAIE, etc.) to modify running applications such as modifying an application with anticipatory instructions (i.e. anticipatory Operations 610 or Instruction Sets 600) from Artificial Intelligence Unit's 130. By attaching to an application using the ptrace call, the controlling program can gain extensive control over the operation of its target. This may include manipulation of its instructions, execution path, file descriptors, memory, registers, and/or other components. Ptrace can single-step through the target's code, observe and intercept system calls and their results, manipulate the target's signal handlers, receive and send signals on the target's behalf, and/or perform other operations within the target application. Ptrace's ability to write into the target application's memory space enables the controller to modify the running code of the target application. Other platforms, tools, and/or techniques may provide equivalent or similar functionalities as the above described ones.

In a further example, modifying execution and/or functionality of an application can be implemented through utilizing just-in-time (JIT) compiling. JIT compilation (also known as dynamic translation, dynamic compilation, etc.) includes compilation performed during an application's execution (i.e. runtime, etc.). A code can be compiled when it is about to be executed, and it may be cached and reused later without the need for additional compilation. In some aspects, JIT compilers convert source code or byte code to machine code. In other aspects, JIT compilers convert source code to byte code or machine code. JIT compiling may generally be performed directly in memory. For example, JIT compiler can output machine code directly into memory and immediately execute it. JIT compilation can be performed per-file, per-function, or with an arbitrary code segment. Platforms such as Java, .NET, and/or others may implement JIT compilation as their native functionality. Many platform independent tools for custom system design include JIT compilation functionality as well. In some aspects, JIT compilation includes redirecting application's execution to a JIT compiler from a specific entry point. For example, one of the widely used tools, Pin, can insert its JIT compiler into the address space of an application. Once execution is redirected to it, JIT compiler may receive alternate instructions such as anticipatory instructions (i.e. anticipatory Operations 610 or Instruction Sets 600) from Artificial Intelligence Unit 130 immediately before their compilation (i.e. if they are not previously compiled). The compiled instructions such as anticipatory instructions from Artificial Intelligence Unit 130 can be stored in memory or another repository from where they may be retrieved and executed. Alternatively, for example, JIT compiler can create a copy of the original application code or a segment thereof, and insert (including modifying, rewriting, overwriting, etc. of the original code) alternate code such as anticipatory instructions (i.e. anticipatory Operations 610 or Instruction Sets 600) from Artificial Intelligence Unit's 130 before compiling the modified code copy. Since the modified code copy can be stored and executed from a new location, JIT compiler may modify the application's control instructions to account for this change. Direct control instructions may point directly to the modified code copy if its location is known. Indirect control instructions such as indirect branches, jumps, calls, return instructions, or others may point to address in a register, memory location, or other repository that may hold the location of the modified code. In some embodiments, this address may only be known and computed by the system at runtime. In some aspects, JIT compiler includes a specialized memory such as fast cache memory dedicated to JIT compiler functionalities from which the modified code can be fetched rapidly. JIT compilation and/or any compilation in general may include compilation, interpretation, or other translation into machine code, bytecode, and/or other formats or types of code. Other platforms, tools, and/or techniques may provide equivalent or similar functionalities as the above described ones.

In a further example, modifying execution and/or functionality of an application can be implemented through dynamic recompilation. Dynamic recompilation include recompiling an application or a part thereof during execution. An application can be modified with alternate features or instructions that may take effect after recompilation. Dynamic recompilation may be practical in various types of applications including object oriented, event driven, forms based, graphical user interface (GUI), and/or other applications. In a typical windows-based application that includes GUI, most of the action after initial startup occurs in response to user or system events such as moving the mouse, selecting a menu option, typing text, running a scheduled task, making a network connection, and/or other events when an event handler is called to perform an operation appropriate for the event. Generally, when no events are being generated, the program can be idle. For example, when an event occurs and an appropriate event handler is called, instrumentation can be implemented in the application's source code to insert (including modifying, rewriting, overwriting, etc. of the source code) alternate instructions such as anticipatory instructions (i.e. anticipatory Operations 610 or Instruction Sets 600) from Artificial Intelligence Unit 130 at which point the modified source code can be recompiled and/or executed. In some aspects, the state of the application can be saved before recompiling its modified source code so that the application may continue from its prior state. Saving the application's state can be achieved by saving its variables, data structures, objects, location of its current instruction, and/or other necessary information in environmental variables, data structures, objects, or other elements where they can be accessed once the application is recompiled. In other aspects, application's variables, data structures, objects, address of its current instruction, and/or other necessary information can be saved in a repository such as file, database, or other repository accessible to the application after recompilation of its source code. Other platforms, tools, and/or techniques may provide equivalent or similar functionalities as the above described ones.

In a further example, modifying execution and/or functionality of an application can be implemented through modifying or redirecting the application's execution path. Generally, an application can be loaded into memory and the flow of execution proceeds from one statement or instruction to the next until the end of the application. An application may include a branching mechanism that can be driven by keyboard or other input devices, system events, and/or other computing device components or events that may impact the execution path. The execution path can also be altered by an external application through acquiring control of execution and/or redirecting execution to a function, routine/subroutine, or an alternate code segment at any point in the application's execution. A branch, jump, trampoline, trap, or another similar mechanism can be utilized to implement the redirected execution. For example, a jump instruction can be inserted at a specific point in an application's execution to redirect execution to an alternate code segment. A jump instruction may include, for example, an unconditional branch, which always results in branching, or a conditional branch, which may or may not result in branching depending on a condition. When executing an application, a computer may fetch and execute instructions in sequence until it encounters a branch instruction. If the instruction is an unconditional branch, or it is conditional and the condition is satisfied, the computer may fetch its next instruction from a different instruction sequence or code segment as specified by the branch instruction. After the execution of the alternate code segment, control may be redirected back to the original jump point or to another point in the application. In some aspects, the disclosed functionalities can be implemented by redirecting the execution of an application to anticipatory instructions (i.e. anticipatory Operations 610 or Instruction Sets 600) from Artificial Intelligence Unit 130. Depending on design, platform, programming language, and/or other factors, anticipatory instructions can be pre-compiled, pre-interpreted, or otherwise pre-translated and ready for execution. Anticipatory instructions can also be JIT compiled, interpreted, or otherwise translated before execution. Other platforms, tools, and/or techniques may provide equivalent or similar functionalities as the above described ones.

In a further example, modifying execution and/or functionality of an application can be implemented through assembly language. Assembly language instructions may be directly related with the architecture's machine instructions as previously described. Assembly language can, therefore, be a powerful tool for implementing direct hardware (i.e. processor registers, memory, etc.) manipulations and access to specialized processor features or instructions. Assembly language can also be a powerful tool for implementing low-level embedded systems, real-time systems, interrupt handlers, self or dynamically modifying code, and/or other applications. Specifically, self or dynamically modifying code that can be used to facilitate the disclosed functionalities can be seamlessly implemented using assembly language. For example, using assembly language, instructions can be dynamically created and loaded into memory similar to the ones that a compiler may generate. Furthermore, using assembly language, memory space of a loaded application can be accessed to modify (including rewriting, overwriting, etc.) original instructions or to insert jumps or trampolines to alternate code elsewhere in memory. Some operating systems may implement protection from changes to applications loaded into memory. Operating system's, processor's, or other low level computing device component's features or commands can be used to unprotect the protected locations in memory before the change as previously described. Alternatively, a pointer that may reside in a memory location where it could be readily altered can be utilized where the pointer may reference alternate code. In some aspects, assembly language can be utilized to write anticipatory instructions (i.e. anticipatory Operations 610 or Instruction Sets 600) from Artificial Intelligence Unit 130 into a location in memory outside a running application's memory space. Assembly language can then be utilized to redirect the application's execution to the alternate code (i.e. anticipatory instructions, etc.) by inserting a jump or trampoline into the application's in-memory code, by redirecting program counter, or by other technique. In other aspects, assembly language can be utilized to overwrite or rewrite the entire or part of an application's in-memory code with alternate code (i.e. anticipatory instructions, etc.). In yet other aspects, high-level programming languages can call an external assembly language program to facilitate application modification as previously described. In yet other aspects, relatively low-level programming languages such as C may allow embedding assembly language directly in their source code such as, for example, using asm keyword of C. Other platforms, tools, and/or techniques may provide equivalent or similar functionalities as the above described ones.

In a further example, modifying execution and/or functionality of an application can be implemented through binary rewriting. Binary rewriting tools and/or techniques may modify an application's executable. In some aspects, modification can be minor such as in the case of optimization where the original executable's functionality is kept. In other aspects, modification may change the application's functionality such as by inserting anticipatory instructions (i.e. anticipatory Operations 610 or Instruction Sets 600) from Artificial Intelligence Unit 130. Examples of binary rewriting tools include SecondWrite, ATOM, DynamoRIO, Purify, Pin, EEL, DynInst, PLTO, and/or others. Binary rewriting may include disassembly, analysis, and/or modification of target application. Since binary rewriting works directly on machine code executable, it is independent of source language, compiler, virtual machine (if one is utilized), and/or other higher level abstraction layers. Also, binary rewriting tools can perform application modifications without access to original source code. Binary rewriting tools include static rewriters, dynamic rewriters, minimally-invasive rewriters, and/or others. Static binary rewriters can modify an executable when the executable is not in use (i.e. not running). The rewritten executable may then be executed including any new or modified functionality. Dynamic binary rewriters can modify an executable during its execution, therefore, modifying an application's functionality at runtime. In some aspects, dynamic rewriters can be used for instrumentation or selective application modifications such as insertion of anticipatory instructions (i.e. anticipatory Operations 610 or Instruction Sets 600) from Artificial Intelligence Unit 130, and/or for other runtime transformations or modifications. For example, some dynamic rewriters can be configured to intercept an application's execution at indirect control transfers and insert instrumentation or other application modifying code. Minimally-invasive rewriters may keep the original machine code to the greatest extent possible. They support limited modifications such as insertion of jumps into and out of instrumentation code. Other platforms, tools, and/or techniques may provide equivalent or similar functionalities as the above described ones.

Figure 21:
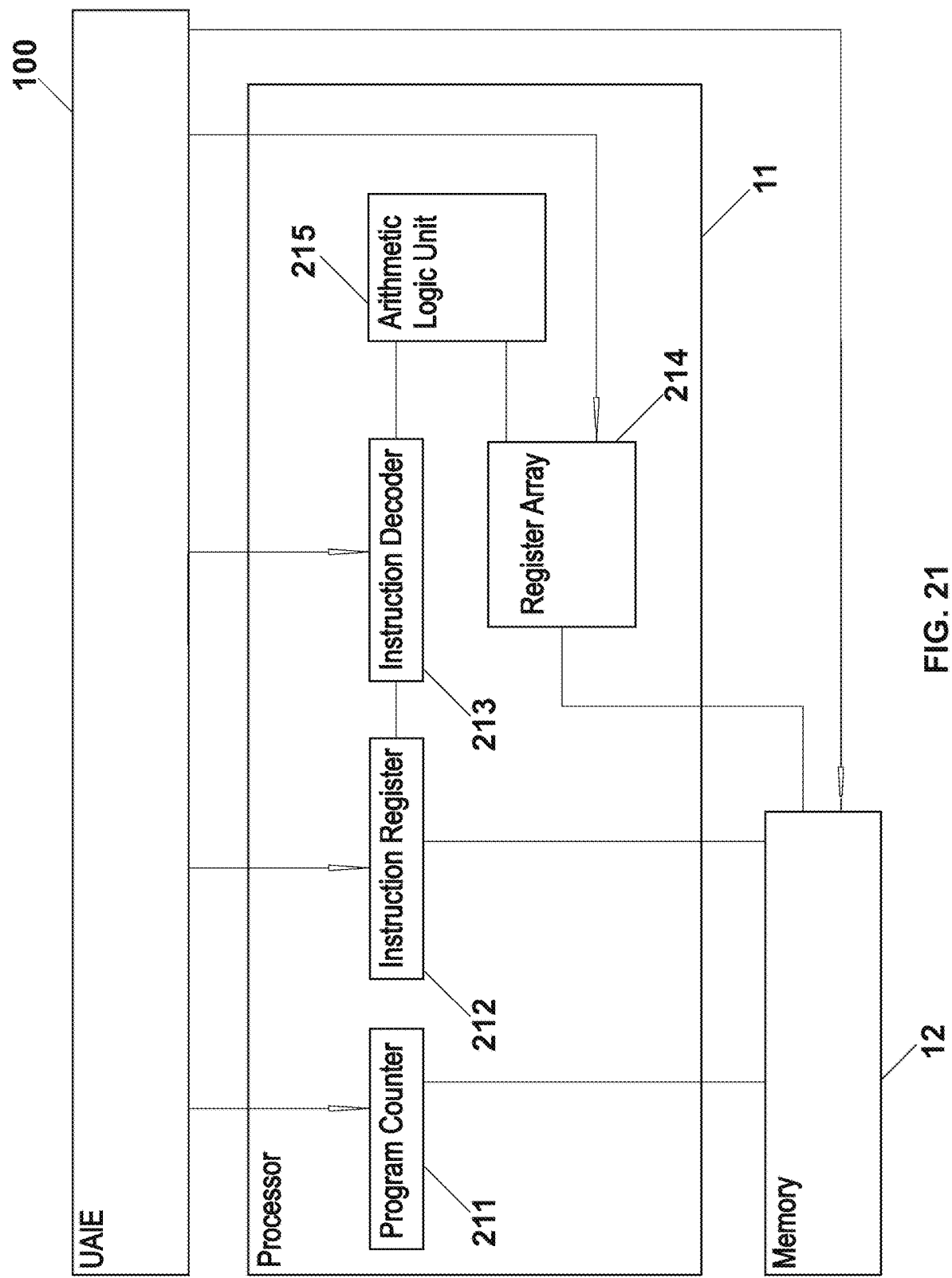
FIG. 21 shows an embodiment of modifying instructions or data in processor registers, memory, or other computing device components.

Referring to FIG. 21, in yet another example, modifying execution and/or functionality of an application can be implemented through modification of instructions or data in processor registers, memory, or other computing device components where an application's instructions, data, and/or other information may be stored or used. Such modification can be implemented in software, a combination of software and hardware, or purely hardware system. In some aspects, the disclosed functionalities can be implemented by redirecting the execution of an application to Artificial Intelligence Unit's 130 anticipatory instructions (i.e. anticipatory Operations 610 or Instruction Sets 600). In one example, Program Counter 211 may hold or point to the memory address of Software Application's 120 next instruction that will be executed. Artificial Intelligence Unit 130 may generate anticipatory instructions (i.e. anticipatory Operations 610 or Instruction Sets 600) as previously described and they can be stored in Memory 12. Application Modification Unit 112 may then change Program Counter 211 to point to the location in Memory 12 where anticipatory instructions are stored. The anticipatory instructions can then be fetched from location in Memory 12 pointed to by the modified Program Counter 211 and loaded into Instruction Register 212 for decoding and execution as previously described. Once anticipatory instructions are executed, Application Modification Unit 112 may change Program Counter 211 to point to the last (or subsequent) Software Application's 120 instruction before the redirection or any other Software Application's 120 instruction. In other aspects, anticipatory instructions (i.e. anticipatory Operations 610 or Instruction Sets 600) can be loaded directly into Instruction Register 212 (i.e. after issuing an interrupt, etc.) if the computing architecture allows for such loading. As previously described, examples of other computing device or processor components that can be used during an instruction cycle include memory address register (MAR), memory data register (MDR), data registers, address registers, general purpose registers (GPRs), conditional registers, floating point registers (FPRs), constant registers, special purpose registers, machine-specific registers, Register Array 214, Arithmetic Logic Unit 215, control unit, and/or other circuits or components. Any of the described processor registers, memory, or other computing device components can be accessed and/or modified during an application's execution to facilitate the functionalities described herein. In some aspects, processor interrupt may be issued after which arbitrary manipulations of processor registers, memory, and/or other components can be performed to modify an application's functionality such as execution of anticipatory instructions (i.e. anticipatory Operations 610 or Instruction Sets 600) from Artificial Intelligence Unit 130. In other aspects, the disclosed devices, apparatuses, systems, and/or methods can be implemented in dedicated hardware that may send an interrupt signal to processor and that can perform arbitrary manipulations of processor registers, memory, and/or other components to modify an application's functionality. A hardware solution can be implemented with marginal or no impact to computing overhead. Other platforms, tools, and/or techniques may provide equivalent or similar functionalities as the above described ones.

Another example of modifying execution and/or functionality of an application includes the use of delegates, and/or other similar techniques. In some aspects, using a delegate may enable referencing one or more methods inside a delegate object. The delegate object can then be passed to code which may call the referenced methods without having to know which methods may be invoked at compile time.

Other additional techniques or elements can be utilized as needed for modifying execution and/or functionality of an application, or some of the disclosed techniques or elements can be excluded, or a combination thereof can be utilized in alternate embodiments.

Figure 22:
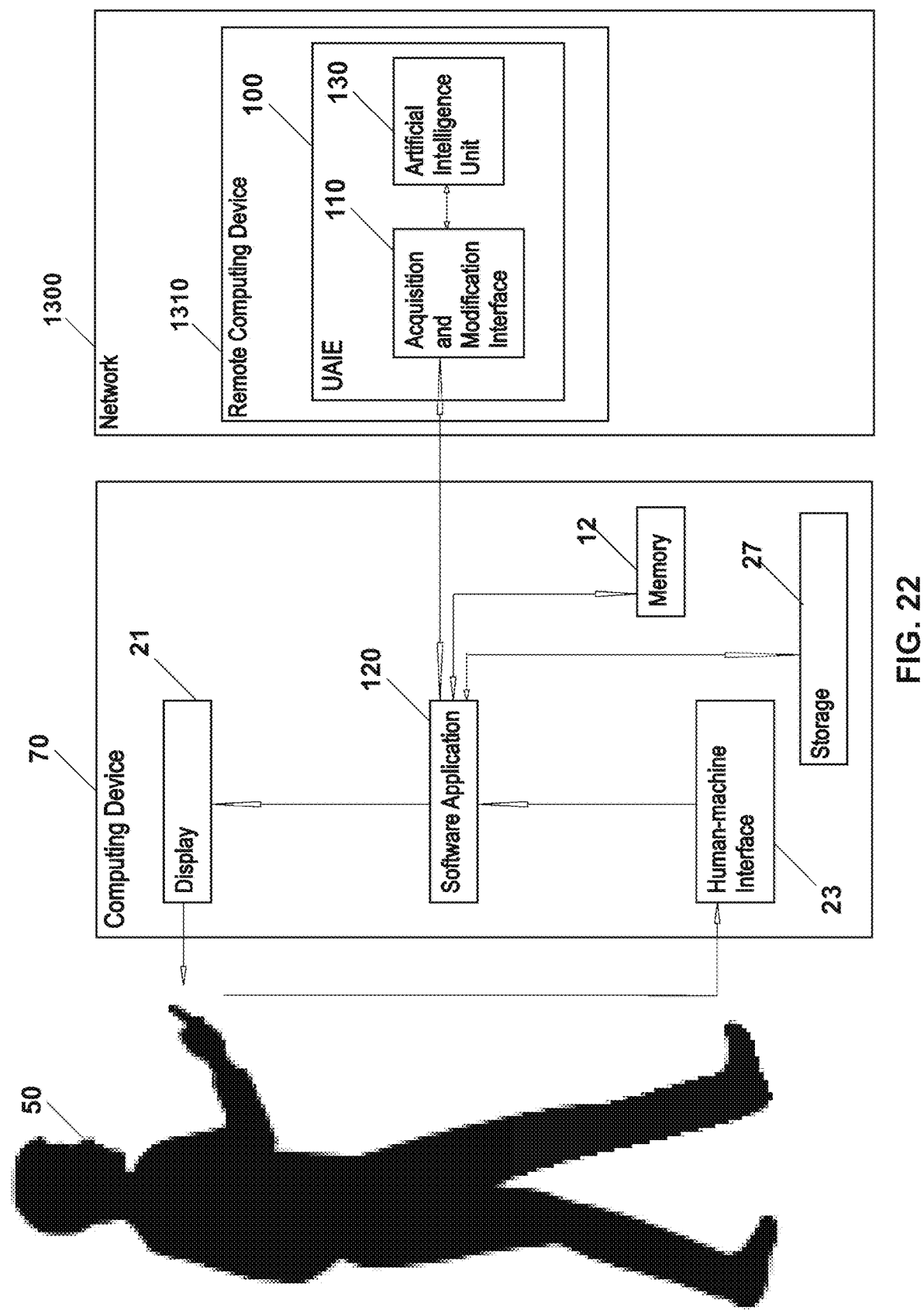
FIG. 22 is a diagram showing an embodiment of UAIE executing on Remote Computing Device 1310.

Referring to FIG. 22, an embodiment is illustrated in which Software Application 120 executes on User's 50 Computing Device 70 and UAIE executes on a Remote Computing Device 1310. Remote Computing Device 1310 can be any computing device remote from Computing Device 70, such as a remote computer, a remote server, another Computing Device 70, or another similar type of remote computing device to which Computing Device 70 may connect over Network 1300. One of ordinary skill in art will recognize that Remote Computing Device 1310 may include any functionalities and/or elements of Computing Device 70, including any memory, processing, and/or other elements. One of ordinary skill in art will also recognize that User's 50 Computing Device 70 can connect to Remote Computing Device 1310 over Network 1300 which may include various networks, connection types, protocols, interfaces, APIs, and/or other mechanisms or techniques all of which are within the scope of this disclosure. In some aspects, the connection with Software Application 120 can be implemented through a networking interface, API, or capabilities of the platform (i.e. Java or .NET networking interface or API, etc.) or the operating system on which Software Application 120 runs. In other aspects, the connection with Software Application 120 can be implemented through networking capabilities of the previously described tools (i.e. JVMTI, Pin, DynamoRIO, KemInst,␣DynInst, Kprobes, OpenPAT, DTrace, SystemTap, assembly language, hardware components, etc.) used to implement Acquisition and Modification Interface 110 functionalities. In yet other aspects, the connection with Software Application 120 can be implemented through custom-built interface or capabilities specifically designed to facilitate functionalities described herein. Any of the previously described network or connection types, networking interfaces, and/or other networking elements or techniques can similarly be utilized.

Figure 23:
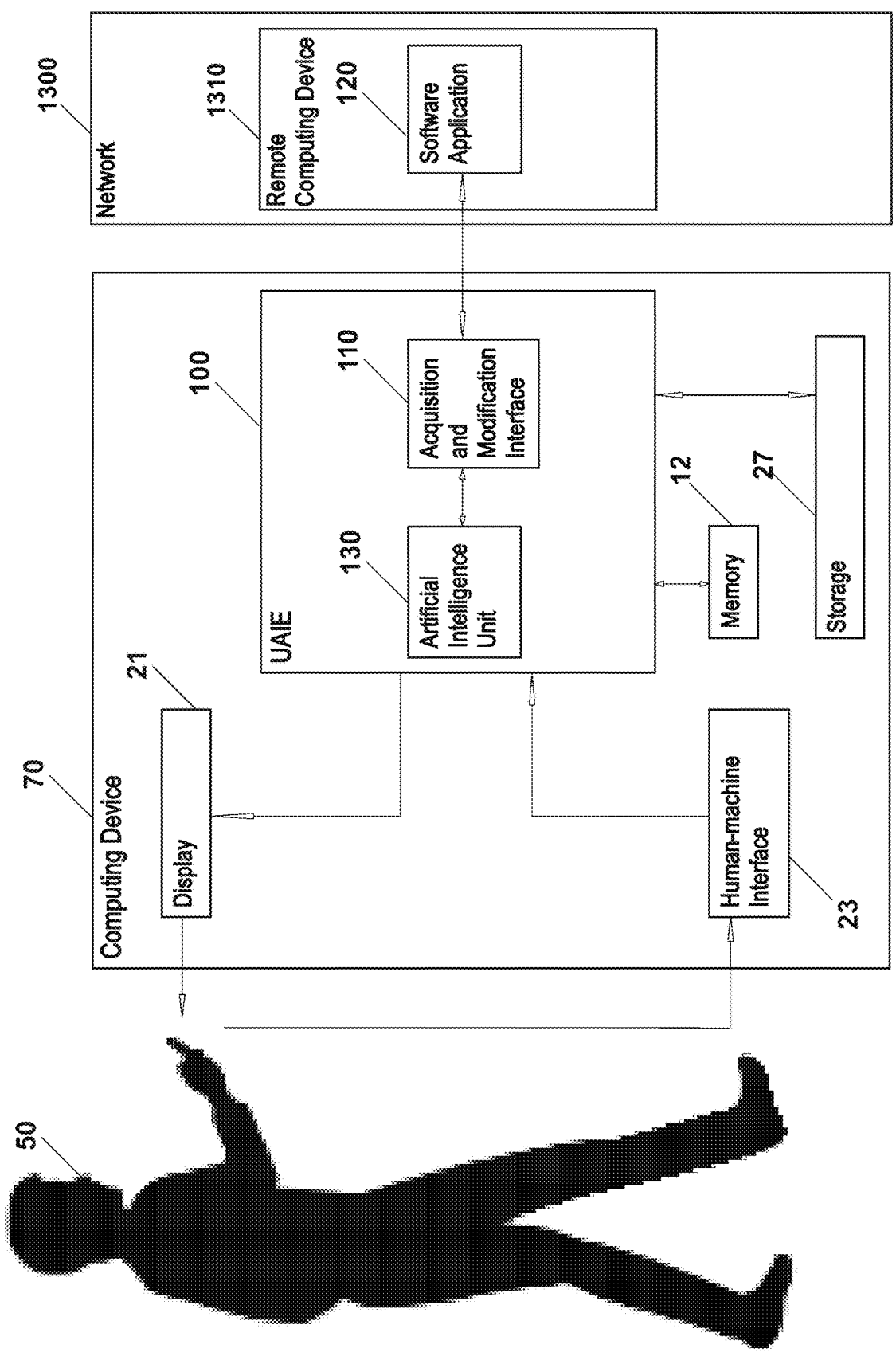
FIG. 23 is a diagram showing an embodiment of Software Application 120 executing on Remote Computing Device 1310.

Referring to FIG. 23, an embodiment is illustrated in which UAIE executes on User's 50 Computing Device 70 and Software Application 120 executes on a Remote Computing Device 1310 where User's 50 Computing Device 70 may connect to Remote Computing Device 1310 over Network 1300.

Figure 24:
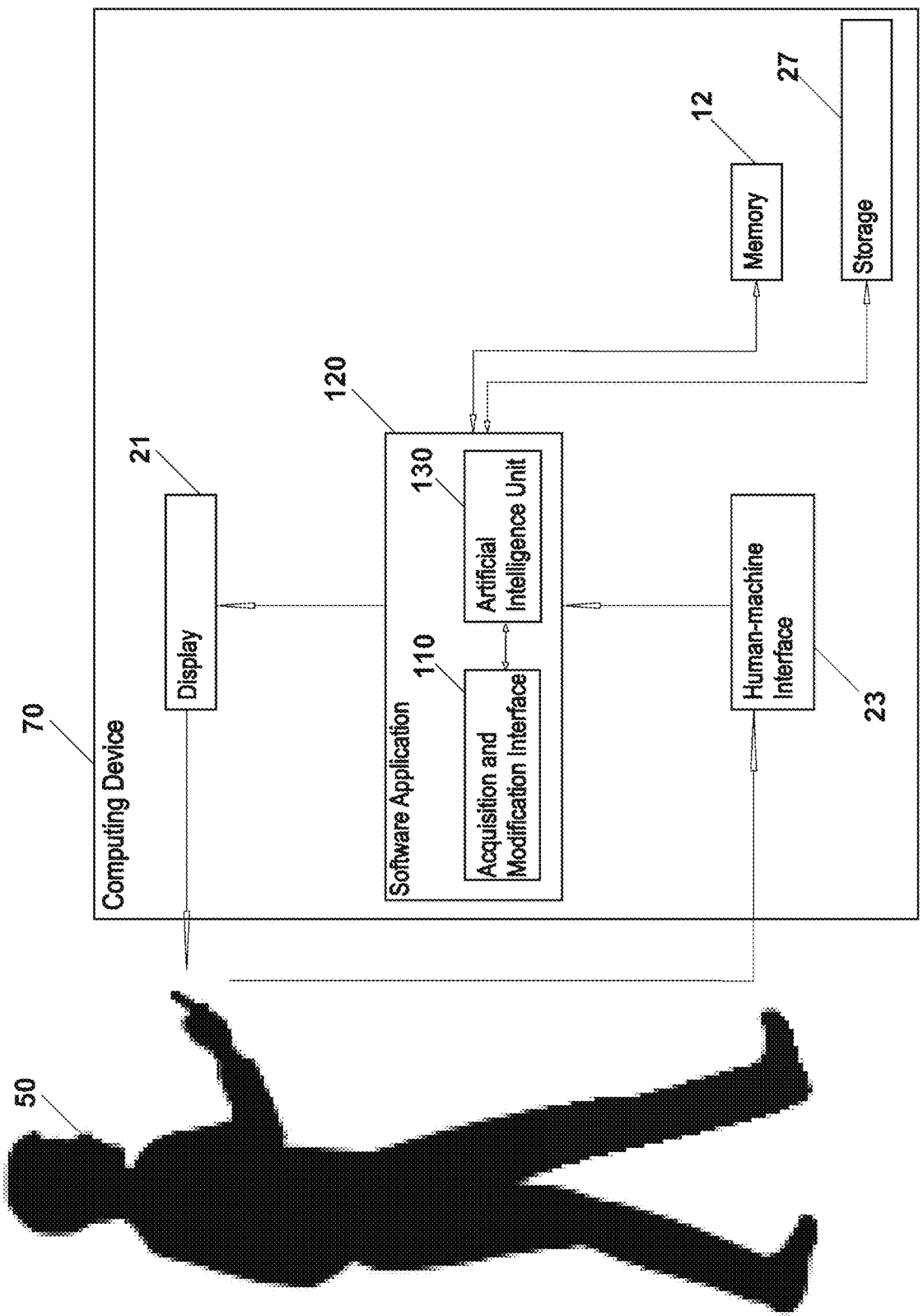
FIG. 24 is a diagram showing an embodiment of Software Application 120 including Acquisition and Modification Interface 110, and Artificial Intelligence Unit 130.

Referring to FIG. 24, an embodiment is illustrated in which Software Application 120 includes Acquisition and Modification Interface 110 and/or Artificial Intelligence Unit 130. In such integrated implementation, Artificial Intelligence Unit 130 may directly access internal functions, processes, libraries, files, objects, data structures, and/or other elements of Software Application 120. Acquisition and Modification Interface 110 and/or any of its functionalities or elements may optionally be omitted in such integrated implementations.

Figure 25:
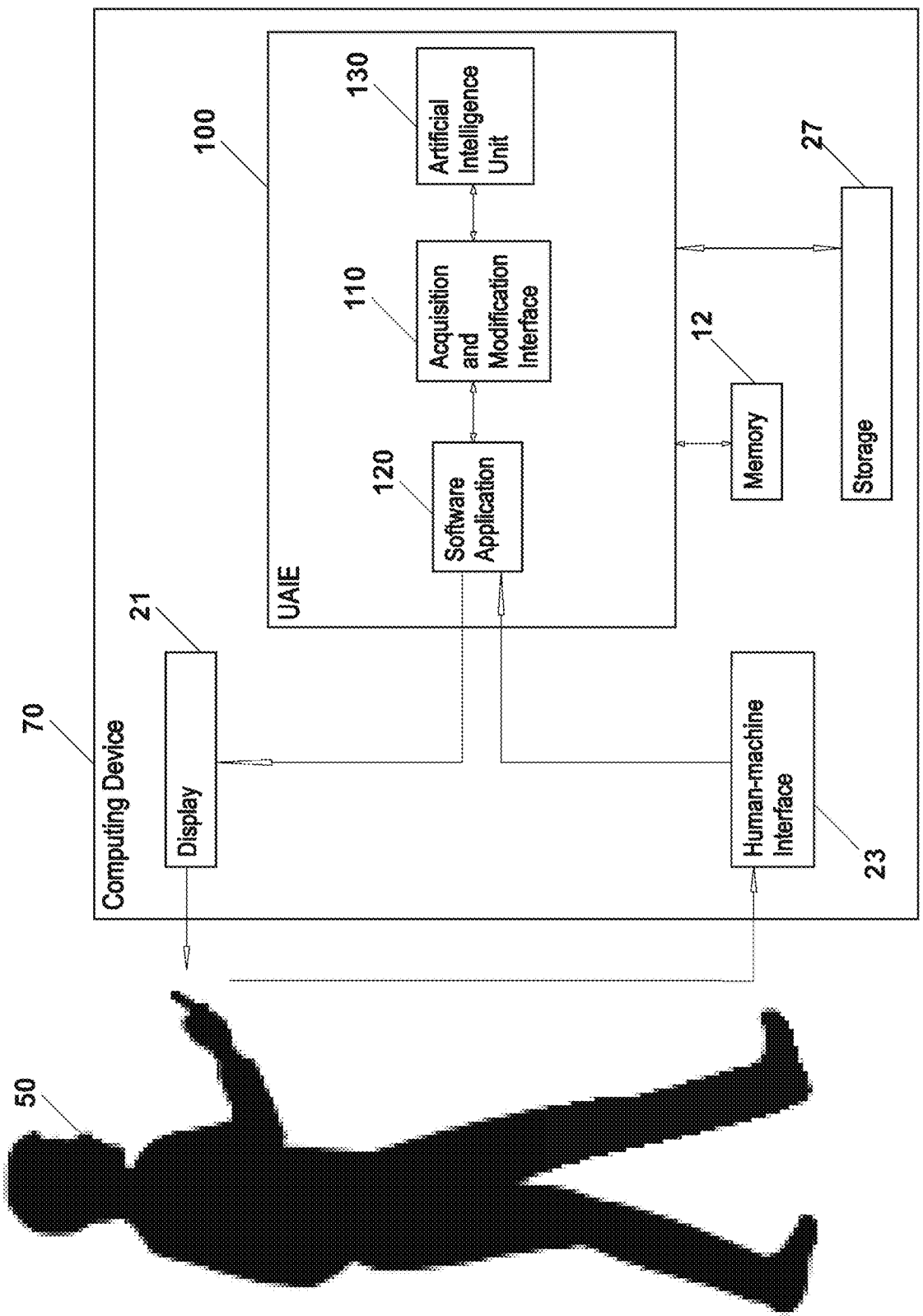
FIG. 25 is a diagram showing an embodiment of UAIE including Software Application 120, Acquisition and Modification Interface 110, and Artificial Intelligence Unit 130.

Referring to FIG. 25, an embodiment is illustrated in which UAIE includes Software Application 120. In such integrated implementations, Software Application 120 may be custom-built for a specific artificial intelligence application. Acquisition and Modification Interface 110 and/or any of its functionalities or elements can optionally be omitted in such integrated implementations.

Figure 26:
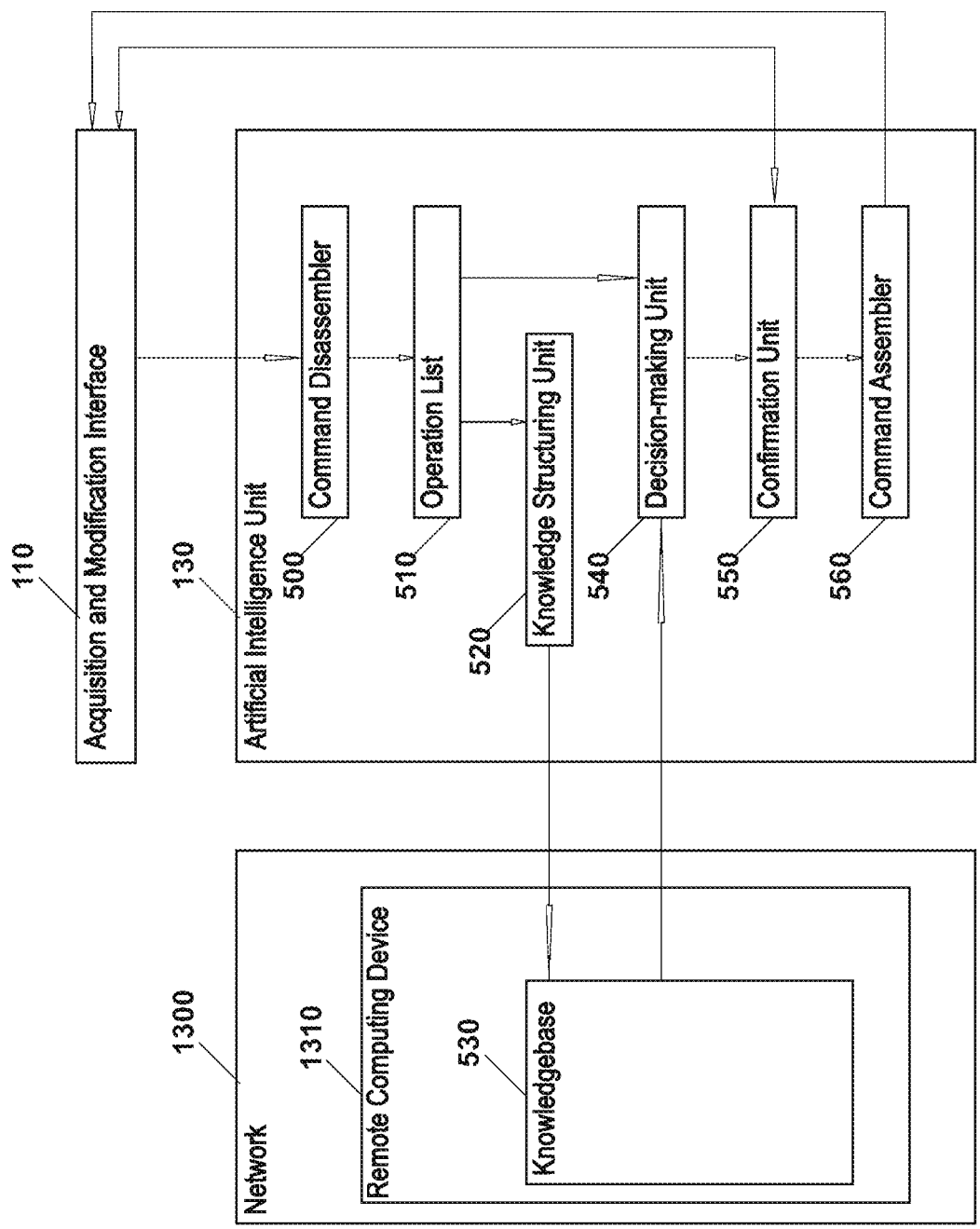
FIG. 26 is a diagram showing an embodiment of Knowledgebase 530 residing on Remote Computing Device 1310.

Referring to FIG. 26, an embodiment is illustrated in which Knowledgebase 530 (i.e. remote Knowledgebase 530) resides on a Remote Computing Device 1310 (i.e. application server, cloud, etc.) accessible via Network 1300 (i.e. corporate enterprise network, Internet, etc.). Such remote Knowledgebase 530 may include knowledge (i.e. Operations 610 or Instruction Sets 600, Knowledge Cells 800, etc.) of operation of one or more Software Applications 120 from any number of computing devices wherever on the Network 1300 they are located. In turn, users of any computing devices can utilize the remote Knowledgebase 530 to enable autonomous operation of their Software Applications 120. Remote Knowledgebase 530 may include a global Knowledgebase 530. In some aspects, a global Knowledgebase 530 resides on a Remote Computing Device 1310 on the Internet available to all the world's computing devices configured to transmit operations of their Software Applications 120 and/or configured to utilize the global Knowledgebase 530 to automate their Software Applications' 120 operations. The global Knowledgebase 530 can be offered as a network service (i.e. online application, etc.) in some implementations. In other aspects, knowledge (i.e. Operations 610 or Instruction Sets 600, Knowledge Cells 800, etc.) of Software Application's 120 operation from various computing devices can be loaded into a local Knowledgebase 530 (i.e. Knowledgebase 530 stored on user's Computing Device 70, etc.) to make the knowledge immediately available and/or to speed up UAIE's learning process. The various computing devices may include computing devices of various different users. In further aspects, a knowledgebase from another computing device can be loaded into UAIE. Remote Knowledgebase 530 may include or be replaced with remote Neural Network 850 (later described) and/or other repository for storing Software Application's 120 operation. Therefore, Neural Network 850 and/or other repository comprises all features, functionalities, and embodiments of remote Knowledgebase 530.

Figure 27:
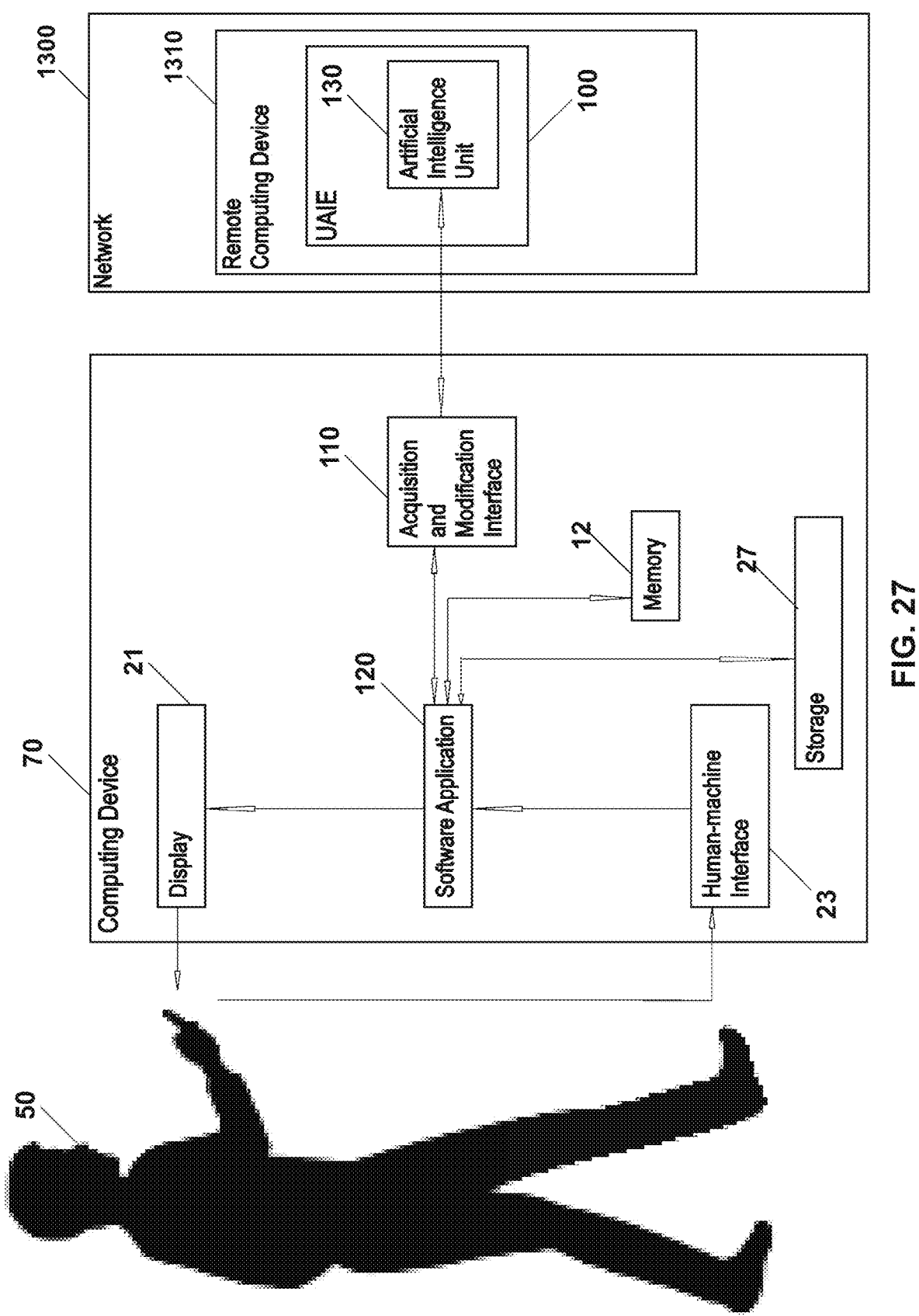
FIG. 27 is a diagram showing an embodiment of Artificial Intelligence Unit 130 residing on Remote Computing Device 1310.

Referring to FIG. 27, an embodiment is illustrated in which UAIE including Artificial Intelligence Unit 130 (i.e. remote UAIE or Artificial Intelligence Unit 130) resides and/or executes on a Remote Computing Device 1310 (i.e. application server, cloud, etc.). In such implementations, Acquisition and Modification Interface 110 executing on Computing Device 70 may connect to UAIE and/or Artificial Intelligence Unit 130 via Network 1300.

Various other embodiments including other additional elements, or excluding some of the disclosed elements, or implementing a combination of elements are within the scope of this disclosure.

Figure 28:
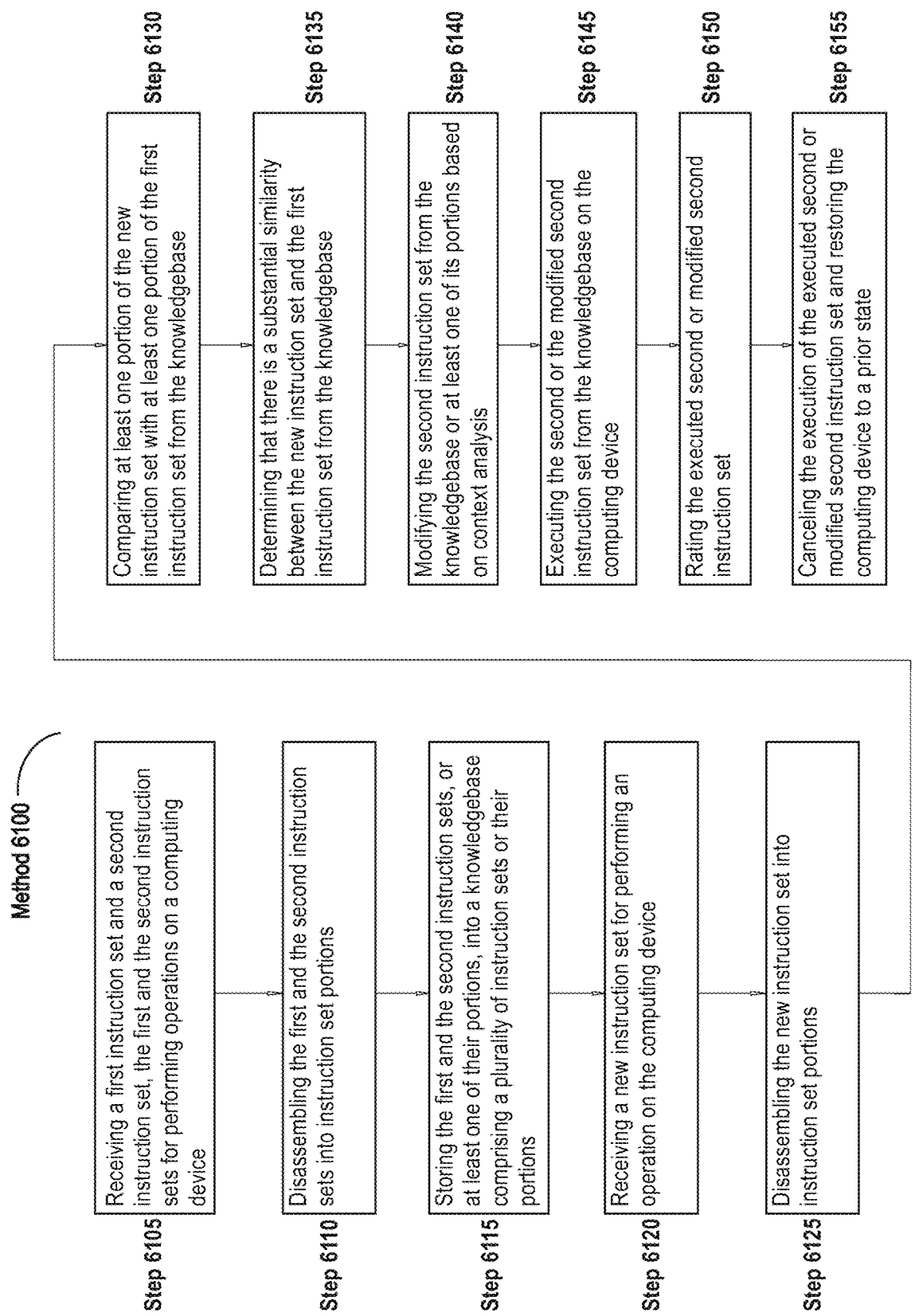
FIG. 28 illustrates a flow chart diagram of an embodiment of a method 6100 implemented by UAIE.

Referring to FIG. 28, the illustration shows an embodiment of a method 6100 for autonomous application operating based on UAIE functionalities (i.e. learning, anticipating, etc.). The method can therefore be used on a computing device to enable autonomous operation of the application with partial, minimal, or no user input. In some embodiments, the method can be used on a computing device operating an interface for UAIE that enables autonomous operation of the application with partial, minimal, or no user input. Method 6100 may include any action or operation of any of the disclosed methods such as, for example, methods 6200, 6300, 6400, and/or others. Other additional steps, actions, or operations can be included as needed, or some of the disclosed ones can be optionally omitted, or a different order thereof can be implemented in alternate embodiments of method 6100.

At step 6105, a first instruction set and a second instruction set are received, the first and the second instruction sets for performing operations on a computing device. The first instruction set may be followed by the second instruction set, which may be followed by a third instruction set, and so on. The first, the second, and/or any other instruction sets can also be received in different orders other than a sequential order or one instruction set followed by another. An instruction set (i.e. Instruction Set 600, etc.) may be part of an application (i.e. Software Application 120, etc.) for performing operations on a computing device (i.e. Computing Device 70, etc.). The application can run or execute on one or more processors (i.e. Processors 11, etc.) or other processing devices. The first, the second, and/or other instruction sets and/or their portions can be part of a list (i.e. Operation List 510, etc.) of recently executed instruction sets. In some aspects, the list of recently executed instruction sets comprises instruction sets executed immediately prior to and including a currently executed instruction set. In other aspects, the list of recently executed instruction sets comprises instruction sets executed immediately prior to, but not including a currently executed instruction set. In further aspects, the list of recently executed instruction sets comprises any instruction sets executed prior to a currently executed instruction set. In further aspects, the list of recently executed instruction sets comprises any instruction sets executed at any time points. A plurality of lists of recently executed instruction sets can be received at various time points depending on where the application is in its operation. Therefore a list of recently executed instruction sets may correspond to a specific time point or stage in the application's operation. An instruction set may include one or more commands, keywords, symbols (i.e. parentheses, braces, commas, semicolons, etc.), instructions, operators (i.e. =, <, >, etc.), variables, values, objects (i.e. file, table, network connection, game player, etc.), functions (i.e. Function1, FIRST( ), MIN( ), MAX( ), SQRT( ), etc.), parameters, references thereto, and/or other components for performing an operation on a computing device. An instruction set may include source code, bytecode, intermediate code, compiled, interpreted, or otherwise translated code, runtime code, assembly code, machine code, and/or any other computer code. An instruction set can be compiled, interpreted or otherwise translated into machine code or any intermediate code (i.e. bytecode, assembly code, etc.). An instruction set can be received from memory (i.e. Memory 12, etc.), hard drive, or any other storage element or repository. An instruction set can be received over a network such as Internet, local area network, wireless network, and/or other network. An instruction set can also be received by an interface (i.e. Acquisition and Modification Interface 110, etc.) for UAIE operating on a computing device. An instruction set can be received by or from a computing device (i.e. Computing Device 70, etc.), or by any other computing device in general. An instruction set can be received by any element of the UAIE system. Receiving comprises any action or operation by or for an Acquisition and Modification Interface 110, and/or other disclosed elements.

At step 6110, the first and the second instruction sets are disassembled into instruction set portions. An instruction set portion (i.e. Instruction Set Portion 620, etc.) may include a command, keyword, symbol, instruction, operator, variable, value, object, function, parameter, reference thereto, and/or other component of an instruction set. Disassembling may also include a more detailed disassembling where some or all characters, digits, symbols, and/or other detailed elements of an instruction set are captured in instruction set portions. Disassembling may include identifying one or more instruction set portions. Disassembling may include identifying the type of instruction set. Disassembling may include recording any extra information (i.e. Extra Info 630, etc.) pertinent for facilitating UAIE functionalities. Extra information comprises contextual information such as time stamp or other time information, geo-spatial information, environmental information, observed information, computed information, analyzed information, inferred information, and/or other information. Time stamp, for example, can indicate the time when an instruction set has been received or executed. Disassembling may also include storing instruction set portions of an instruction set and/or any related extra information in a data structure such as Operation 610, or in any other data structure or repository. Disassembling may further include identifying a user which entered or executed an instruction set or identifying a group to which the user belongs. Disassembling may also include assigning or associating an importance index (i.e. Importance Index 640, etc.) or weight to one or more instruction sets or their portions. In some aspects, disassembling can optionally be disabled or omitted in which case the first and the second instructions sets can be stored in knowledgebase. Disassembling comprises any action or operation by or for a Command Disassembler 500, Knowledge Structuring Unit 520, and/or other disclosed elements.

At step 6115, the first and the second instruction sets, or at least one of their portions, are stored into a knowledgebase comprising a plurality of instruction sets or their portions. Knowledgebase (i.e. Knowledgebase 530, etc.) comprises any number of instruction sets and/or their portions, which can be stored in various arrangements including data structures, objects, files, tables, databases, DBMSs, memory structures, and/or other computer repositories. In some implementations, the first and the second instruction sets, or at least one of their portions, can be stored in the knowledgebase so that the first instruction set or at least one of its portions is followed by the second instruction set or at least one of its portions. In other aspects, no such arrangement or relationship between the first and the second instruction sets, or at least one of their portions, is required, and the first and the second instruction sets, or at least one of their portions, can be stored in any other arrangement in the knowledgebase. In further aspects, knowledgebase includes a number of knowledge cells where each knowledge cell (i.e. Knowledge Cell 800, etc.) comprises a number of instruction sets and/or their corresponding portions. In further aspects, knowledgebase includes a number of instruction set sequences. For example, a knowledge cell comprises a sequence of instruction sets or their portions in some designs. In further aspects, knowledgebase includes a single long knowledge cell comprising all instruction sets and/or their corresponding portions ever executed, or executed in a specific time period (i.e. month, year, etc.). In further aspects, knowledgebase includes one or more long knowledge cells. In some aspects, an instruction set and/or its portions can be stored in a list (i.e. Operation List 510, etc.) of recently executed instruction sets that can be used for knowledge cell creation or any other knowledge structuring. In one example, a knowledge cell includes a number of instruction sets and/or their portions. In another example, a knowledge cell includes a number of Operations 610 each comprising an instruction set and/or its portions. In some aspects, the most recent instruction sets (i.e. the second instruction set, etc.) from the list of recently executed instruction sets may become anticipatory instruction sets in the corresponding knowledge cel, whereas, the least recent instruction sets (i.e. the first instruction set, etc.) from the list of recently executed instruction sets may become comparative instruction sets in the corresponding knowledge cell. Instruction sets and/or their portions can be compiled, interpreted, or otherwise translated into machine code or intermediate code (i.e. bytecode, assembly code, etc.). The compiled, interpreted, or otherwise translated code can be associated with the original instruction sets and/or their portions and stored in knowledgebase. In some embodiments, knowledgebase includes instruction sets and/or their portions from a computing device (i.e. Computing Device 70, etc.) from or on which the instruction sets and/or their portions are received or executed. In other embodiments, knowledgebase includes instruction sets and/or their portions from any number of computing devices. Knowledgebase or additional knowledgebases can also be populated to include user specific and/or group specific information gathered with respect to the instruction set. Also stored in knowledgebase may be the importance index (i.e. Importance Index 640, etc.) or weight assigned to or associated with an instruction set and/or its portions. Any of the disclosed storing of instruction sets and/or their portions can also be implemented for storing any related extra information into the knowledgebase, or other data structures or repositories. Knowledgebase may include or be replaced with various artificial intelligence methods, systems, and/or models for knowledge structuring, storing, and/or representation such as deep learning, supervised learning, unsupervised learning, neural networks (i.e. Neural Network 850, convolutional neural network, recurrent neural network, etc.), search-based, optimization-based, logic and/or fuzzy logic-based, tree/graph/other data structure-based, hierarchical, symbolic and/or sub-symbolic, evolutionary, genetic, multi-agent, any deterministic, probabilistic, statistical, and/or other methods, systems, and/or models. Storing comprises any action or operation by or for a Knowledgebase 530, Knowledge Cell 800, Operation List 510, Knowledge Structuring Unit 520, and/or other disclosed elements.

At step 6120, a new instruction set for performing an operation on the computing device is received. Step 6120 may include any action or operation described in Step 6105 as applicable.

At step 6125, the new instruction set is disassembled into instruction set portions. Step 6125 may include any action or operation described in Step 6110 as applicable.

At step 6130, at least one portion of the new instruction set are compared with at least one portion of the first instruction set from the knowledgebase. The at least one portion of the new instruction set can be compared as a single string of characters with at least one portion of the first instruction set in the knowledgebase. Comparison can also be implemented by treating each instruction set portion as a separate string to be matched independently. Instruction set portions comprising numeric values can be compared as numbers, wherein a tolerance or threshold can be utilized in determining a match. The first instruction set may be one of plurality of instruction sets stored in the knowledgebase whose portions can be compared with portions of the new instruction set. Comparison can be implemented by matching all portions of the new instruction set with all portions of an instruction set stored in a knowledgebase. Comparison can also be implemented by matching all but one portion of the new instruction set with all but one portion of an instruction set stored in the knowledgebase. Comparison can also be implemented by matching all but two or more (i.e. any threshold number can be used, etc.) portions of the new instruction set with all but two or more portions of an instruction set stored in the knowledgebase. In some aspects, comparison can be implemented by comparing one or more portions of the new instruction set with one or more portions of the instruction sets from the knowledgebase, factoring in an importance index (i.e. Importance Index 640, etc.) or weight for each of the instruction set portions. As such, matching some portions of the new instruction set or the instruction set from the knowledgebase may be more important than other portions having smaller importance or weight. In other aspects, comparison may include semantic analysis that accounts for semantically equivalent variations of instruction set portions. For example, a number of most recently used or executed instruction sets (i.e. new instruction set, etc.) and/or their portions from a list (i.e. Operation List 510, etc.) of recently executed instruction sets can be compared (i.e. Substantial Similarity Comparison 1010, etc.) with comparative instruction sets (i.e. first instruction set, etc.) and/or their portions from a knowledge cell in the knowledgebase. If a substantially similar pattern of most recently used or executed instruction sets from the list of recently executed instruction sets is found in comparative instruction sets of a knowledge cell (i.e. Substantially Similar Knowledge Cell 1110, etc.), subsequent instruction sets can be anticipated in anticipatory instruction sets (i.e. second instruction set, etc.) of the knowledge cell. Any of the disclosed comparing of instruction sets or their portions can similarly be implemented for comparing any related extra (i.e. Extra Information 630, etc.) or contextual information. Comparing comprises any action or operation by or for a Substantial Similarity Comparison 1010, Comparison Strictness Function 1011, Decision Making Unit 540, and/or other disclosed elements.

At step 6135, a determination is made that there is a substantial similarity between the new instruction set and the first instruction set from the knowledgebase. During the comparison of the at least one portion of the new instruction set and the at least one portion of the first instruction set a perfect match may be found. In some aspects, plurality of perfect matches can be found between the new instruction set and instruction sets stored in knowledgebase. If the number of matches exceeds a threshold for maximum number of substantial similarity results, strictness used for determining a substantial similarity match can be increased to include additional one or more instruction set portions in order to narrow down or reduce the number of perfect matching results. If no perfect match is found, or if the number of matches is lower than a threshold for minimum amount of substantially similar results, then strictness can be reduced to allow for finding a match that is imperfect. Strictness can be adjusted to allow for a match of more important (as indicated by Importance Index 640 or other importance ranking technique) instruction set portions. The more important instruction set portions may include portions comprising function names or command words. For example, a substantial similarity match can be found when function names or command words from the one or more portions of the new instruction set match function names or command words in one or more instruction sets in the knowledgebase, even if one or more variable names or values are not matched. Substantial similarity match can also be found when all but one portion of the new instruction set match all but one portion of an instruction set in the knowledgebase. Similarly, a substantial similarity match may be found when all but two or more (i.e. any threshold number can be used, etc.) portions of the new instruction set match all but two or more portions of an instruction set in the knowledgebase. The one, two, or more non-matched instruction set portions may be portions having smaller or smallest importance index (i.e. Importance Index 640, etc.) or weight. In one example, the non-matched instruction set portions may include variable names, values, or other instruction set portions that may be less important than the function names or commands. Determination of substantial similarity between any instruction sets and/or their portions may include any one of, or any combination of, substantial similarity determination or decision making techniques or embodiments discussed herein. In some aspects, determining and/or decision making may include various artificial intelligence methods, systems, and/or models such as deep learning, supervised learning, unsupervised learning, neural networks (i.e. Neural Network 850, convolutional neural network, recurrent neural network, etc.), search-based, optimization-based, logic and/or fuzzy logic-based, tree/graph/other data structure-based, hierarchical, symbolic and/or sub-symbolic, evolutionary, genetic, multi-agent, any deterministic, probabilistic, statistical, and/or other methods, systems, and/or models. Any of the disclosed determining of substantial similarity with respect to instruction sets and/or their portions can similarly be implemented with respect to any related extra (i.e. Extra Information 630, etc.) or contextual information. Determining comprises any action or operation by or for a Substantial Similarity Comparison 1010, Comparison Strictness Function 1011, Decision Making Unit 540, Substantially Similar Knowledge Cell 1110, and/or other disclosed elements.

At step 6140, the second instruction set from the knowledgebase or at least one of its portions are modified based on context analysis. Modifying the second instruction set from the knowledgebase or at least one of its portions includes modifying a copy of the second instruction set or at least one of its portions stored in the knowledgebase without changing the stored second instruction set or at least one of its portions. In some aspects, extra or contextual information can be recorded in the processing or disassembling of an instruction set, and stored along with its instruction set portions in the knowledgebase. Extra or contextual information may generally include time stamp or other time information, geo-spatial information, environmental information, observed information, computed information, analyzed information, inferred information, and/or other information. In some embodiments, contextual information may include time stamp, user specific information, group user information, version of application, type of application (i.e. web browser, computer game, word processing, database, CAD/CAM software, etc.), type of computing device, type of user (novice, moderate, skilled, expert), and/or other information. In embodiments involving computer games or other such applications, contextual information may include player's avatar's coordinates, speed, direction of movement, and/or other information. Contextual information may further include the types (i.e. enemy player, friend player, rock, forest, pond, budding, etc.) of objects around player's avatar and their coordinates, speeds, directions of movement, and/or other information. Such contextual information can provide geo-spatial and situational awareness and/or capabilities. Furthermore, in embodiments involving computer games or other such applications, extra or contextual information can be as important (as indicated by Importance Index 640 or other importance ranking technique) or more important than the instruction sets and/or their portions. In yet other embodiments, contextual information includes observed information such as an object's location (i.e. coordinates, etc.), system time, user or group specific information, type or version of the application, type of computing device, and/or other observable information. In yet other embodiments, contextual information includes computed information that can be created or calculated from instruction set portions, extra information, observed information, and/or other information. For example, an object's distance, bearing (i.e. angle or direction of movement, etc.), speed, and/or other information can be calculated or estimated from the object's coordinates by utilizing Pythagorean theorem, Euclidean distance formula, trigonometry, and/or other theorems, formulas, or disciplines. In yet other embodiments, contextual information may include any component of an instruction set not captured as an instruction set portion, any instruction set portion or component thereof that is not used in substantial similarity comparison, and/or any information about instruction sets that may be useful in anticipating future instruction sets. In general, contextual information can be utilized to provide additional or as much information as possible for best anticipation of future instruction sets. In some aspects, context analysis includes analysis of context in which an instruction set was performed. Context analysis may include computational functionalities to create, compute, or analyze information from instruction set portions, extra or contextual information, and/or other available information. Context analysis may also include the functionality to draw inferences from any available contextual or other information. Context analysis may further include reading or extracting values or ranges of values from instruction set portions, extra or contextual information, and/or other available information. Context analysis may further include semantic analysis to account for semantically equivalent variations in instruction set portions and/or other information. Context analysis may further include obtaining any observable information such as system time, user or group specific information, type or version of the application, type of computing device, coordinates or other attributes of an object, and/or other observable information. In other aspects, a context interpreter can be utilized to interpret or analyze contextual information. Context interpreter may perform an extra analysis step and it may attempt to capture some or all information, steps, and/or elements that may have been omitted by other elements or steps of the overall system. In one example, context interpreter can discover or read the values or ranges of values used in the new instruction set by extracting the values from its instruction set portions. The system can then automatically modify the second instruction set, copy thereof, and/or its portions to include these values or ranges of values. In another example, the second instruction set, copy thereof, and/or its portions can be automatically modified to indicate the same object as was indicated in the new instruction set. In another example, the second instruction set, copy thereof, and/or its portions can be automatically modified to indicate the same variable as was indicated in the new instruction set, and so on. In some embodiments, the second instruction set, copy thereof, and/or its portions can be automatically modified based on inferences drawn in context analysis. In other embodiments, the second instruction set, copy thereof, and/or its portions can be automatically modified based on any technique, function, or method such as, for example, function for projecting a path, movement, or trajectory of any objects or other items in a computer game, for example. In some aspects, the second instruction set, copy thereof, and/or its portions, can be automatically modified responsive to the determination at step 6135. Automatic modification can optionally be disabled or omitted based on user preferences, application type, and/or other factors in some implementations. Context analysis and/or modifying comprise any action or operation by or for Extra Info 630, Context Interpreter 1120, Operation Modifier 1121, and/or other disclosed elements.

At step 6145, the second or the modified second instruction set from the knowledgebase is executed on the computing device. In some embodiments, the new instruction set can also be executed prior to executing the second instruction set. In one example, the new instruction set can be executed when it is received by UAIE. In another example, the new instruction set can be executed before it is received by UAIE or at any point independent of when it is received by UAIE. Execution may include performing, by a processor or a computing device, one or more operations defined by, or corresponding to, the new instruction set and the second or the modified second instruction set. Operations include any operation that can be performed on any computing device. In some embodiments involving form-based applications, examples of operations include writing into a text field, selecting an option in a drop-down menu, checking a checkbox, editing a text area, clicking a button, and/or other operations. In some embodiments involving web browsers, examples of operations include editing a URL box to visit a web page, clicking a link, saving a web page, scrolling the view of a web page, selecting and copying a portion of a web page, creating a bookmark, and/or other operations. In some embodiments involving computer games and/or 2D/3D applications, examples of operations include moving a player's character or avatar, picking up an object, opening a door or other object, utilizing an object, shooting, selecting an item, and/or other operations. In some embodiments involving word processing applications, examples of operations include writing text, editing text, formatting text, opening a text file, saving a text file, converting a text file, publishing a text file, and/or other operations. In some embodiments involving database applications, examples of operations include accessing, modifying, creating or deleting data, table, database, and/or other operations. One of ordinary skill in art will recognize that, while all possible variations of operations on the computing device are too voluminous to list and limited only by a programmer's design and/or user's utilization, all possible operations are within the scope of this disclosure in various implementations.

At step 6150, the executed second or modified second instruction set is rated. In some embodiments, a user can be provided with an option and the user may choose to rate a previously executed instruction set such as the second or the modified second instruction set. Rating can serve as evaluator or feedback of how well the system predicted an instruction set. Rating can be associated with an instruction set and stored in knowledgebase for improvement of future predictions or matching. Rating can similarly be implemented for a knowledge cell of which the second or the modified second instruction set may be part. In some aspects, user rating can be implemented through displaying previously executed instruction sets along with their possible rating values (i.e. 0-10, etc.) via a graphical user interface (GUI) or other such means for user's viewing and consideration. User's rating action can be recorded and/or affect a particular instruction set's rating, which can be used for improved instruction set anticipation in the future. In other aspects, rating may be automatic based on a particular function or method that measures how well an anticipated instruction set matched the desired operation. Depending on the type of application and/or other factors, rating can optionally be disabled or omitted in some implementations.

At step 6155, the execution of the executed second or modified second instruction set is canceled and the computing device is restored to a prior state. In some embodiments, a user may decide that an executed instruction set such as the second or the modified second instruction set did not performed a desired operation. As such, the user may decide to cancel the execution of the second or the modified second instruction set and restore the computing device or application to a prior state. Cancelation can be implemented through displaying a previously executed instruction set via a GUI or other such means for user's viewing and consideration. Restoring the computing device or application to a prior state may include prior saving the state of the computing device or application before the execution of a particular instruction set. Saving the state of the computing device or application comprises saving its variables, data structures, objects, location of its current instruction, and/or other necessary elements in files, databases, environmental variables, data structures, objects, and/or other repositories. A canceling action can be recorded and/or affect a particular instruction set's rating, which can be used for improved instruction set anticipation in the future. Depending on the type of application and/or other factors, canceling and/or restoring may optionally be disabled or omitted in some implementations.

Figure 29:
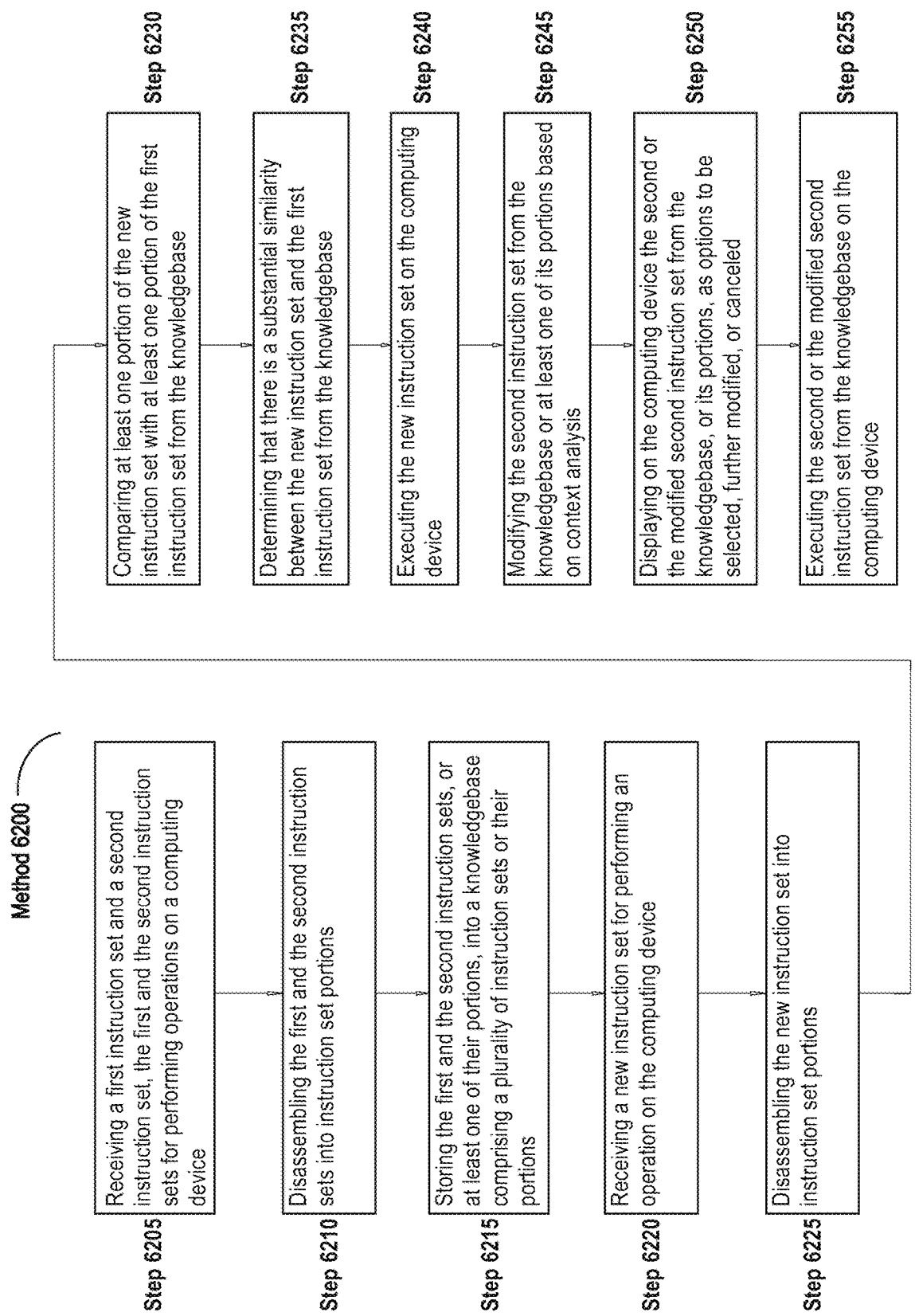
FIG. 29 illustrates a flow chart diagram of an embodiment of a method 6200 implemented by UAIE.

Referring to FIG. 29, the illustration shows an embodiment of a method 6200 for autonomous application operating based UAIE functionalities. The method can therefore be used on a computing device to enable autonomous operation of the application with partial, minimal, or no user input. In some embodiments, the method can be used on a computing device operating an interface for UAIE that enables autonomous operation of the application with partial, minimal, or no user input. Method 6200 may include any action or operation of any of the disclosed methods such as, for example, methods 6100, 6300, 6400, and/or others. Other additional steps, actions, or operations can be included as needed, or some of the disclosed ones can be optionally omitted, or a different order thereof can be implemented in alternate embodiments of method 6200.

Steps 6205-6235 may include any action or operation described in steps 6105-6135 of method 6100 as applicable.

At step 6240, the new instruction set is executed on the computing device. Step 6240 may include any action or operation described in step 6145 of method 6100 as applicable. In some embodiments, the new instruction set can be executed earlier in the process such as when it is received by UAIE. In other embodiments, the new instruction set can be executed before it is received by UAIE or at any point independent of when it is received by UAIE in which case step 6240 can be omitted.

At step 6245, the second instruction set from the knowledgebase or at least one of its portions are modified based on context analysis. Step 6245 may include any action or operation described in step 6140 of method 6100 as applicable.

At step 6250, the second or the modified second instruction set from the knowledgebase, or its portions, are displayed on the computing device as options to be selected, further modified, or canceled. In some embodiments, the previously automatically modified (if this functionality was enabled and/or if modification was performed, etc.) second instruction set, a copy thereof, and/or its portions can be displayed on the computing device responsive to the determination at step 6235. In some aspects, the previously automatically modified second instruction set, a copy thereof, and/or its portions can be displayed along with one or more anticipatory instruction sets and/or their portions that may immediately follow the second instruction set. The system may include an editor, graphical user interface (GUI), and/or other means through which a user can view and/or manually modify, if user chooses, the previously automatically modified second instruction set and/or its portions. For example, a GUI can be utilized to receive or read the previously automatically modified second instruction set and/or its portions, display (i.e. via text fields, drop-down menus, check boxes, and other GUI components, etc.) the previously automatically modified second instruction set and/or its portions, and ask the user to manually modify the previously automatically modified second instruction set and/or its portions by manipulating GUI components (i.e. changing values in text fields, selecting options in drop-down menus, etc.). In some embodiments, extra or contextual information, and/or other information can be displayed and/or modified by the user as well. In some aspects, user selection of the previously automatically modified second instruction set may effectively serve as user's confirmation of his/her intention to execute the previously modified second instruction set. In other aspects, the user may choose not to approve or implement (i.e. cancel, etc.) any anticipatory instruction sets including the previously modified second instruction set. In yet other aspects, the user may choose to approve or implement some of the anticipatory instruction sets including the previously modified second instruction set, and choose not to approve or implement (i.e. cancel, etc.) others. Depending on the type of application and/or other factors, displaying, selecting, further modifying, and/or canceling can optionally be disabled or omitted in order to provide an uninterrupted operation of the application. For example, a form based application may be suitable for implementing the user confirmation step, whereas, a game is less suitable for implementing such interrupting step due to the real time nature of game playing/execution. Components and/or features of the computing device or its operating system such as display, keyboard, pointing device, touchscreen, microphone, camera, video camera, speech recognition, sound player, video player, tactile input/output device, and/or other components, features, or applications can be utilized to implement the displaying, selecting, further modifying, and/or canceling of the previously automatically modified second instruction set and/or its portions. Displaying, selecting, further modifying, and/or canceling comprise any action or operation by or for Confirmation Unit 550, and/or other disclosed elements. In some aspects, step 6250 may include any action or operation described in steps 6150 and 6155 of method 6100 as applicable.

At step 6255, the second or the modified second instruction set from the knowledgebase is executed on the computing device. Step 6255 may include any action or operation described in step 6145 of method 6100 as applicable.

Figure 30:
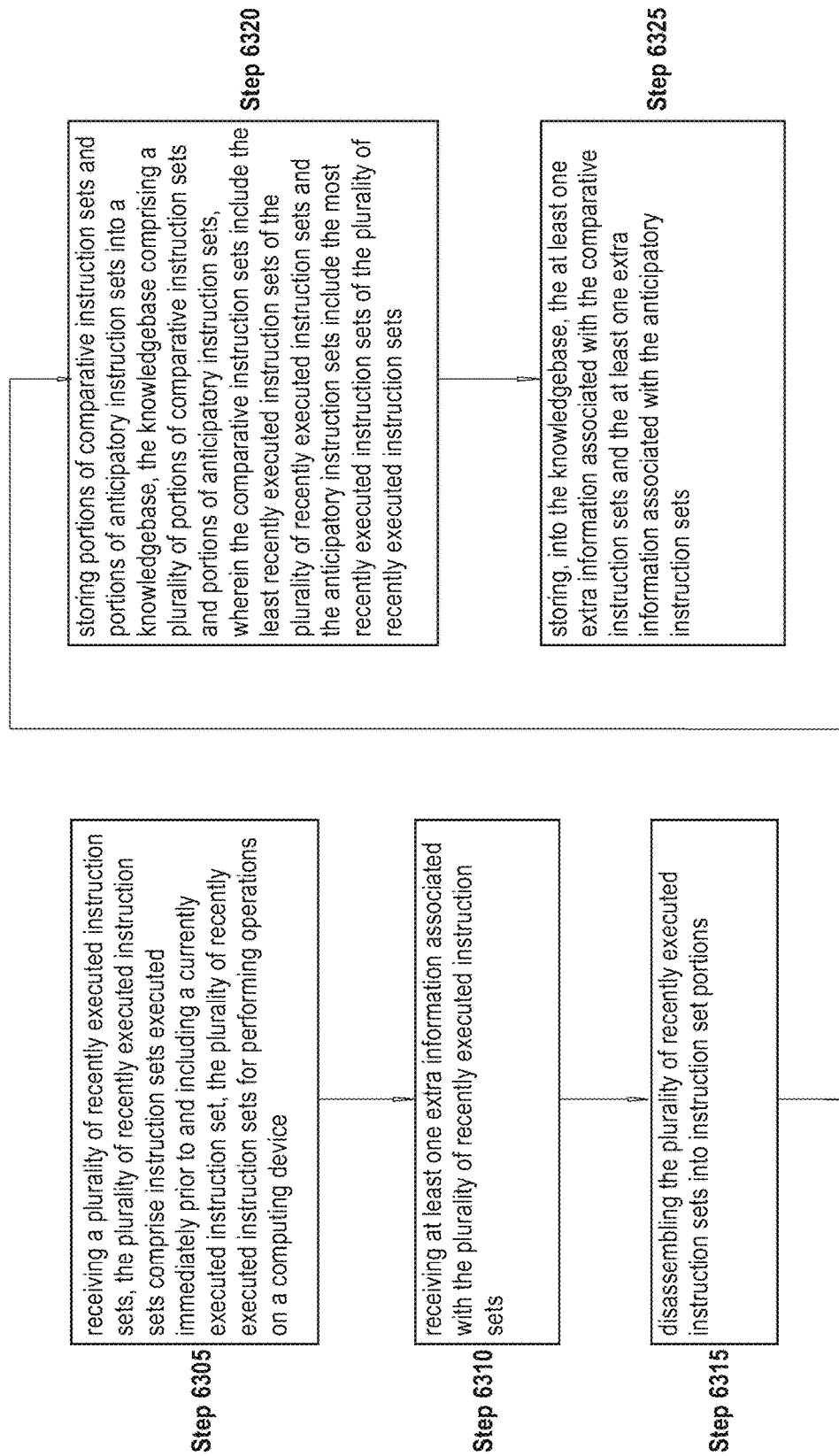
FIG. 30 illustrates a flow chart diagram of an embodiment of a method 6300 implemented by UAIE.

Referring to FIG. 30, the illustration shows an embodiment of a method 6300 for learning an application's operations based UAIE functionalities. The method can therefore be used on a computing device to structure and/or store knowledge of an application's operations that can be used for anticipation of the application's future operations or autonomous application operating. In some embodiments, the method can be used on a computing device operating an interface for UAIE to structure and/or store knowledge of an application's operations that can be used for anticipation of the application's future operations or autonomous application operating. Method 6300 may include any action or operation of any of the disclosed methods such as, for example, methods 6100, 6200, 6400, and/or others. Other additional steps, actions, or operations can be included as needed, or some of the disclosed ones can be optionally omitted, or a different order thereof can be implemented in alternate embodiments of method 6300.

At step 6305, a plurality of recently executed instruction sets are received, the plurality of recently executed instruction sets comprise instruction sets executed immediately prior to and including a currently executed instruction set, the plurality of recently executed instruction sets for performing operations on a computing device. At step 6310, at least one extra information associated with the plurality of recently executed instruction sets are received. At step 6315, the plurality of recently executed instruction sets are disassembled into instruction set portions. At step 6320, portions of comparative instruction sets and portions of anticipatory instruction sets are stored into a knowledgebase, the knowledgebase comprising a plurality of portions of comparative instruction sets and portions of anticipatory instruction sets, wherein the comparative instruction sets include the least recently executed instruction sets of the plurality of recently executed instruction sets and the anticipatory instruction sets include the most recently executed instruction sets of the plurality of recently executed instruction sets. At step 6325, the at least one extra information associated with the comparative instruction sets and the at least one extra information associated with the anticipatory instruction sets are store into the knowledgebase.

Figure 31:
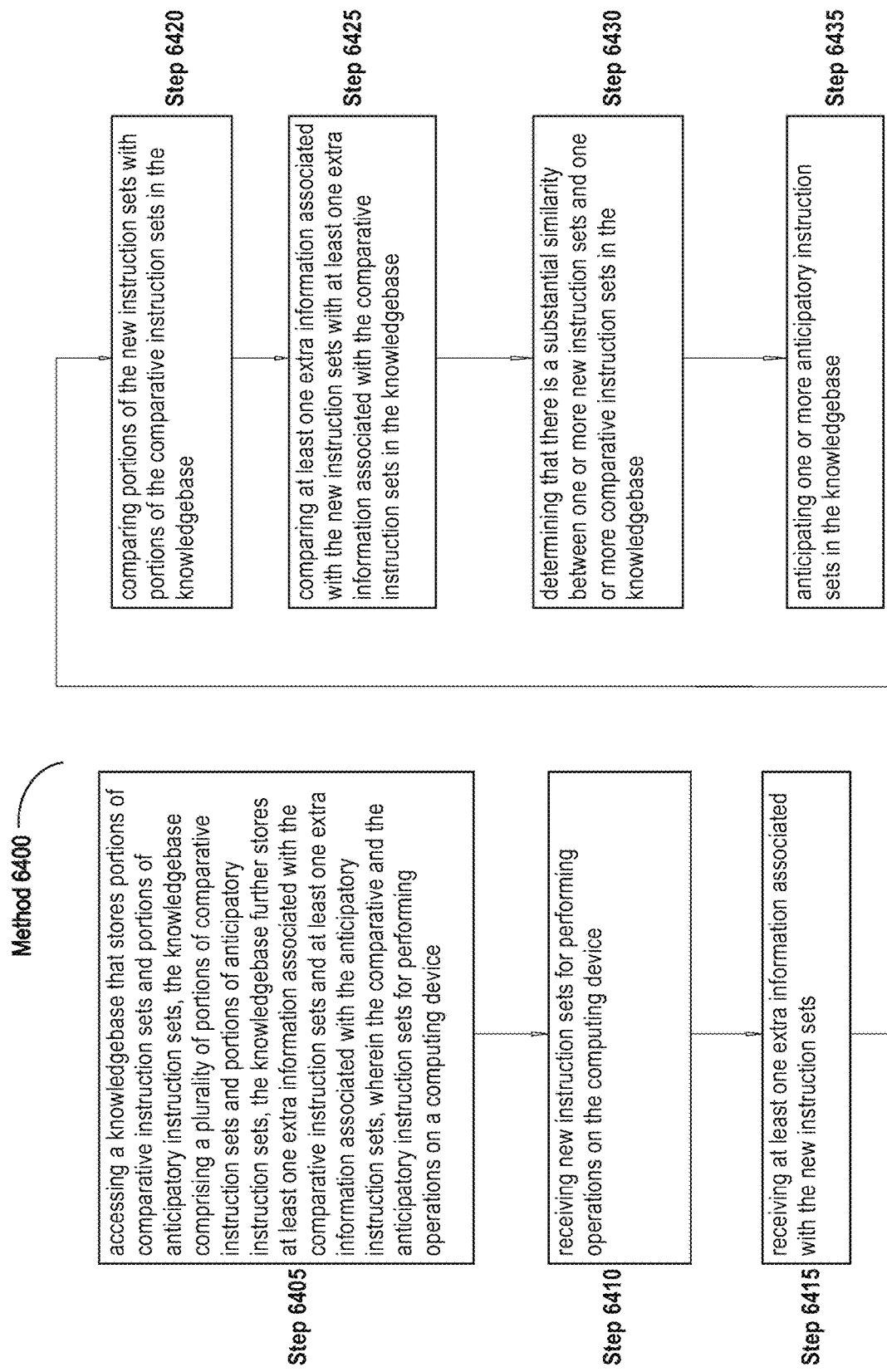
FIG. 31 illustrates a flow chart diagram of an embodiment of a method 6400 implemented by UAIE.

Referring to FIG. 31, the illustration shows an embodiment of a method 6400 for anticipating an application's operations based UAIE functionalities. The method can therefore be used on a computing device to anticipate an application's operations from stored knowledge of the application's operations. In some embodiments, the method can be used on a computing device operating an interface for UAIE to anticipate an application's operations from stored knowledge of the application's operations. Method 6400 may include any action or operation of any of the disclosed methods such as, for example, methods 6100, 6200, 6300, and/or others. Other additional steps, actions, or operations can be included as needed, or some of the disclosed ones can be optionally omitted, or a different order thereof can be implemented in alternate embodiments of method 6400.

At step 6405, a knowledgebase is accessed that stores portions of comparative instruction sets and portions of anticipatory instruction sets, the knowledgebase comprising a plurality of portions of comparative instruction sets and portions of anticipatory instruction sets, the knowledgebase further stores at least one extra information associated with the comparative instruction sets and at least one extra information associated with the anticipatory instruction sets, wherein the comparative and the anticipatory instruction sets for performing operations on a computing device. At step 6410, new instruction sets for performing operations on the computing device are received. At step 6415, at least one extra information associated with the new instruction sets are received. At step 6420, portions of the new instruction sets are compared with portions of the comparative instruction sets in the knowledgebase. At step 6425, at least one extra information associated with the new instruction sets are compared with at least one extra information associated with the comparative instruction sets in the knowledgebase. At step 6430, a determination is made that there is a substantial similarity between one or more new instruction sets and one or more comparative instruction sets in the knowledgebase. At step 6435, one or more anticipatory instruction sets in the knowledgebase are anticipated.

Figure 32:
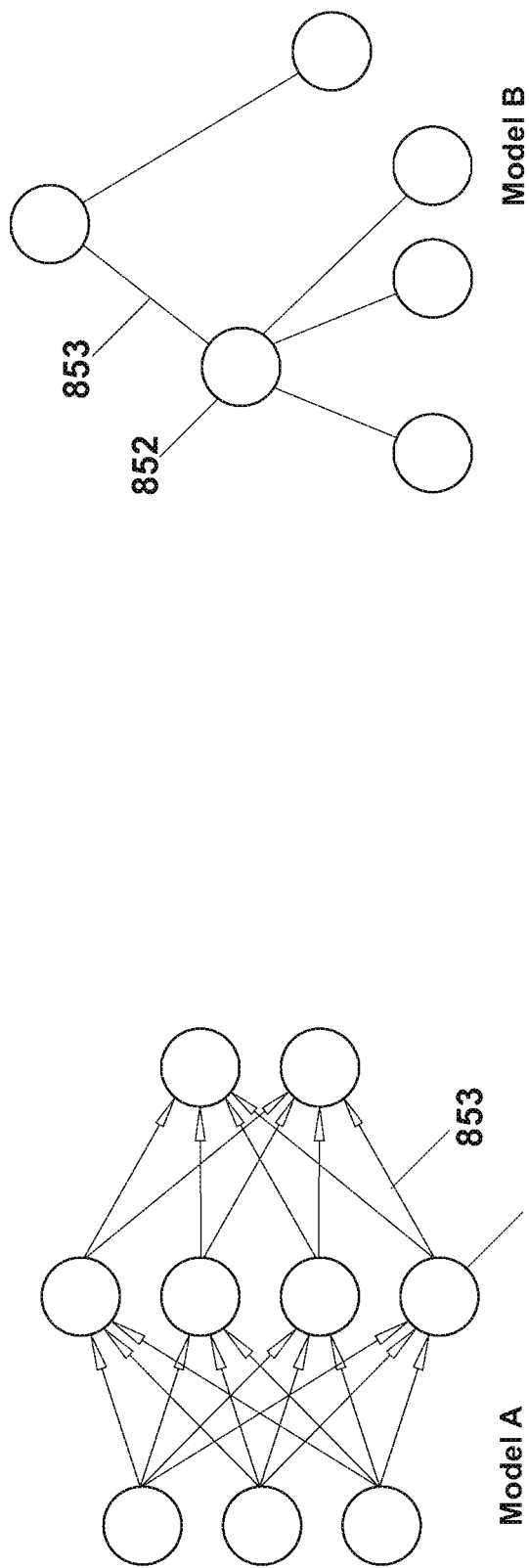
FIG. 32 shows various artificial intelligence methods, systems, and/or models that can be utilized in UAIE embodiments.

Referring to FIG. 32, the teaching presented by the disclosure can be implemented to include various artificial intelligence methods, systems, and/or models instead of or in addition to the ones previously described. UAIE is independent of the artificial intelligence method, system, and/or model used and any method, system, and/or model can be utilized to facilitate functionalities described herein. Examples of these methods, systems, and/or models include deep learning, supervised learning, unsupervised learning, neural networks (i.e. Neural Network 850, convolutional neural network, recurrent neural network, etc.), search-based, logic and/or fuzzy logic-based, optimization-based, tree/graph/other data structure-based, hierarchical, symbolic and/or sub-symbolic, evolutionary, genetic, multi-agent, deterministic, probabilistic, statistical, and/or other methods, systems, and/or models.

In one example shown in Model A in FIG. 32, UAIE, Artificial Intelligence Unit 130, and/or other elements of the disclosure may include a neural network (also referred to as artificial neural network, etc.). As such, machine learning, knowledge representation or structure, pattern recognition, decision making, and/or other artificial intelligence functionalities may include a network of Nodes 852 (also referred to as neurons in the context of neural networks, etc.) and Connections 853 similar to that of a brain. Node 852 can store any data, object, data structure, and/or other item, or reference thereto. Node 852 may also include a function for transforming or manipulating any data, object, data structure, and/or other item. Examples of such transformation function include mathematical functions (i.e. addition, subtraction, multiplication, divisions, etc.), object manipulation functions (i.e. creating an object, modifying an object, deleting an object, appending objects, etc.), data structure manipulation functions (i.e. creating a data structure, modifying a data structure, deleting a data structure, creating a data field, modifying a data field, deleting a data field, etc.), and/or other transformation functions. A computational model can be utilized to compute values from inputs based on a pre-programmed or learned function or method. For example, a neural network may include one or more input neurons that can be activated by inputs such as Operations 610 or Instruction Sets 600, or their Instruction Set Portions 620. Activations of these neurons can then be passed on, weighted, and transformed by a function to other neurons. This process can be repeated until one or more output neurons is/are activated such as neurons comprising anticipatory Operations 610 or Instruction Sets 600, or their Instruction Set Portions 620. Artificial neural network types may vary from those with only one or two layers of single direction logic, to multi-input many directional feedback loops and layers. Neural network systems can use weights to change the parameters of the throughput and the varying connections among the neurons. As such, an artificial neural network can be autonomous (i.e. facilitate autonomous Software Application's 120 operation, etc.) and learn by input from its designer, environment, outside teacher, and/or self-teaching from written-in rules. An exemplary embodiment of Neural Network 850 is described later.

In another example shown in Model B in FIG. 32, UAIE, Artificial Intelligence Unit 130, and/or other elements of the disclosure may include a tree or a tree-like structure. As such, machine learning, knowledge representation or structure, pattern recognition, decision making, and/or other artificial intelligence functionalities may include Nodes 852 and Connections 853 (i.e. references, edges, etc.) similar to that of a tree. In some aspects, a tree data structure comprises a collection of Nodes 852 where a Node 852 may include a value and/or Connections 853 (i.e. references, edges, etc.) to other or children Nodes 852. Trees can be utilized as one of the predictive modeling approaches used in machine learning. In some aspects, a decision tree can be utilized as a predictive model that can map observations about an item to conclusions about the item's target value. In other aspects, a decision tree can be used to represent decisions and decision making. In yet other aspects, a decision tree may describe data instead of decisions, and it can be an input for decision making. In yet other aspects, a decision tree can be utilized as a model that may predict the value of a target variable based on several input variables where each interior node corresponds to an input variable and each edge to a children node corresponds to a possible value of the input variable, and where each leaf node may represent a value of the target variable given the values of the input variables represented by the path from the root node to the leaf node. A decision tree may include various types of nodes such as decision nodes, chance nodes, end nodes, and/or other types of nodes. Each node may include any data structure or object, or a reference thereto, such as array, list, linked list, doubly linked list, queue, tree, heap, graph, map, grid, matrix, multi-dimensional matrix, table, database, DBMS, file, and/or any other type or form of a data structure.

In a further example shown in Model C in FIG. 32, UAIE, Artificial Intelligence Unit 130, and/or other elements of the disclosure may include a hierarchical structure or system. As such, machine learning, knowledge representation or structure, pattern recognition, decision making, and/or other artificial intelligence functionalities may include a structure of Nodes 852 and Connections 853 organized as a hierarchy. A hierarchical structure may include nodes in a tree-like structure, although data structures other than a tree can be used. In some aspects, instructions, tasks, and/or goals to be accomplished may flow down the hierarchy's layers from superior nodes to subordinate nodes whereas results and/or other information may flow up the hierarchy's layers from subordinate to superior nodes. Nodes can also communicate with their siblings.

In yet another example UAIE, Artificial Intelligence Unit 130, and/or other elements of the disclosure may include a search-based method, system, and/or model. As such, machine learning, knowledge representation or structure, pattern recognition, decision making, and/or other artificial intelligence functionalities may include searching through a collection of possible solutions. For example, a search method can search through a list, tree, graph, or other data structure (i.e. Knowledgebase 530, etc.) that includes goals (i.e. Operations 610 or Instruction Sets 600) and/or sub-goals (i.e. Instruction Set Portions 620, etc.) to find a path to a target goal (i.e. anticipatory Operations 610 or Instruction Sets 600, or Instruction Set Portions 620, etc.), where each step may include application of a function (i.e. Substantial Similarity Comparison 1010, etc.) or rule (i.e. inference rule, logic rule, probability rule, statistical rule, etc.). A search method may use heuristics to limit the search for solutions into a smaller sample size by eliminating choices that are unlikely to lead to the goal. Heuristics provide a best guess solution. A search can also include optimization. For example, a search may begin with a guess and then refine the guess incrementally until no more refinements can be made. In a further example UAIE, Artificial Intelligence Unit 130, and/or other elements of the disclosure may include logic-based method, system, and/or model. As such, machine learning, knowledge representation or structure, pattern recognition, decision making, and/or other artificial intelligence functionalities can use formal or another type of logic. Logic based systems may involve inferences or deriving conclusions from a set of premises. As such, a logic based system can extend a knowledgebase automatically using inferences. Examples of the types of logic that can be utilized include propositional or sentential logic that comprises logic of statements which can be true or false; first-order logic that may allow the use of quantifiers and predicates, and that can express facts about objects, their properties, and their relations with each other; fuzzy logic that may allow degrees of truth to be represented as a value between 0 and 1, rather than simply true (1) or false (0), which can be used for uncertain reasoning; subjective logic that comprises a type of probabilistic logic that may take uncertainty and belief into account, which can be suitable for modeling and analyzing situations involving uncertainty, incomplete knowledge and different world views; and/or other types of logic. Any logic-based method, system, and/or model can be utilized herein that can take inputs such as Operations 610 or Instruction Sets 600, or their Instruction Set Portions 620, and produce outputs such as anticipatory Operations 610 or Instruction Sets 600, or their Instruction Set Portions 620. In a further example UAIE, Artificial Intelligence Unit 130, and/or other elements of the disclosure may include a probabilistic method, system, and/or model. As such, machine learning, knowledge representation or structure, pattern recognition, decision making, and/or other artificial intelligence functionalities can be implemented to operate with incomplete or uncertain information where probabilities may affect outcomes. Bayesian network, among other models, is an example of a tool for general artificial intelligence functionalities such as reasoning, learning, planning, perception, and/or others. Probabilistic methods can also be used for functionalities such as filtering, prediction, smoothing, and finding explanations for streams of data, thereby, helping to analyze processes that occur over time, and/or other functionalities. Any probabilistic method, system, and/or model can be utilized herein that can take inputs such as Operations 610 or Instruction Sets 600, or their Instruction Set Portions 620, and produce outputs such as anticipatory Operations 610 or Instruction Sets 600, or their Instruction Set Portions 620. One of ordinary skill in art will understand that, while all possible variations of artificial intelligence methods, systems, and/or models are too voluminous to list, all of these methods, systems, and/or models are within the scope of this disclosure in various implementations. One of ordinary skill in art will also recognize that an intelligent system or agent may solve a specific problem by using any approach that works such as, for example, some systems or agents can be symbolic and logical, some can be sub-symbolic neural networks, some can be deterministic or probabilistic, some can be hierarchical, some may include searching techniques, while others may use other or a combination of approaches. For example, any artificial intelligence method, system, and/or model can be utilized that may accept inputs such as Operations 610 or Instruction Sets 600, and/or their Instruction Set Portions 620, and produce outputs such as anticipatory Operations 610 or Instruction Sets 600, and/or their Instruction Set Portions 620 that may ultimately affect or control Software Application's 120 operation.

Figure 33:
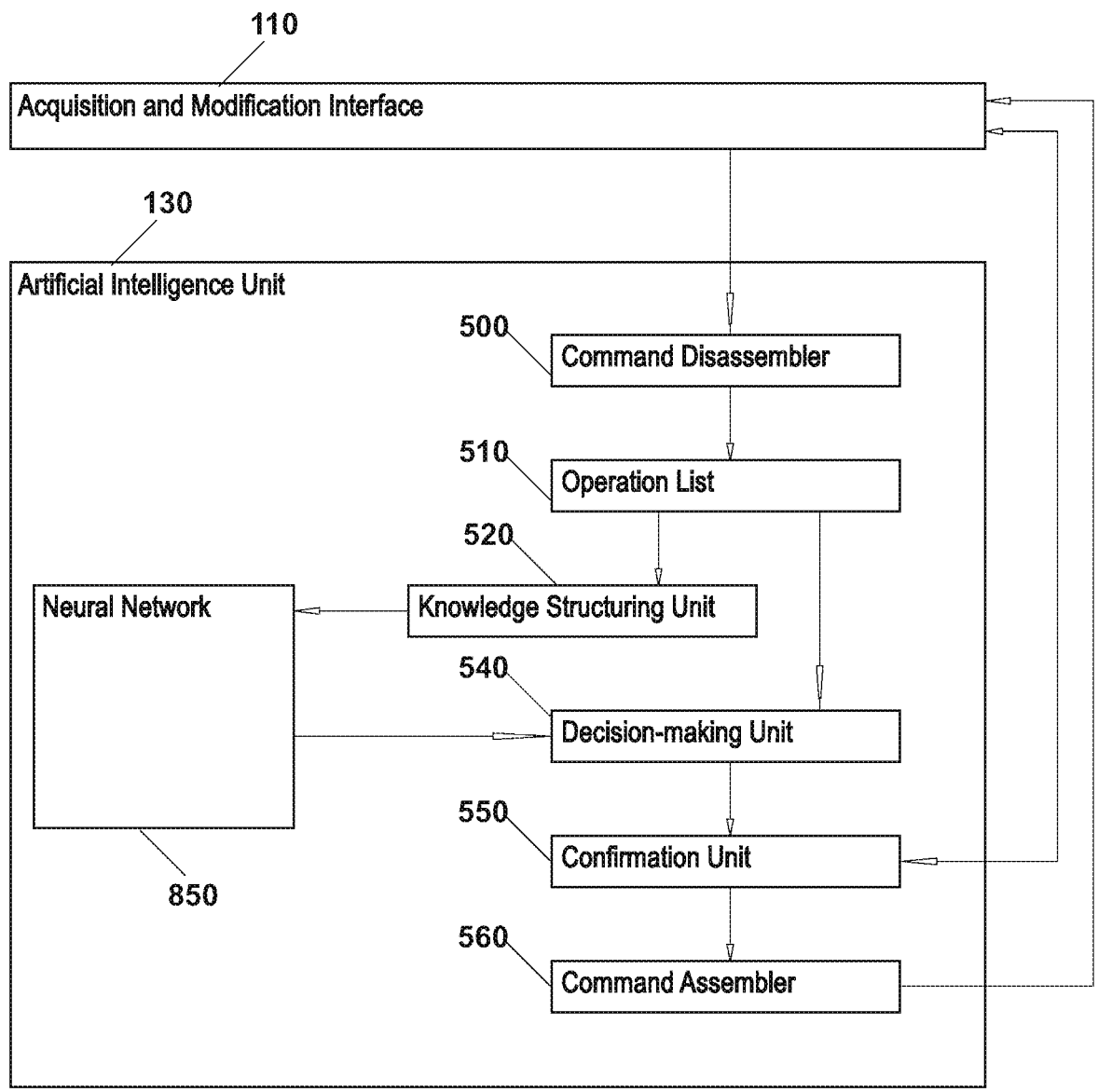
FIG. 33 illustrates an embodiment of Artificial Intelligence Unit 130 comprising Neural Network 850.

Referring to FIG. 33, Artificial Intelligence Unit 130 comprising Neural Network 850 is illustrated. In some embodiments, Artificial Intelligence Unit 130 includes interconnected Command Disassembler 500, Operation List 510, Knowledge Structuring Unit 520, Neural Network 850, Decision-making Unit 540, Confirmation Unit 550, and Command Assembler 560. Other additional elements can be included as needed, or some of the disclosed ones can be excluded, or a combination thereof can be utilized in alternate embodiments.

Figure 34:
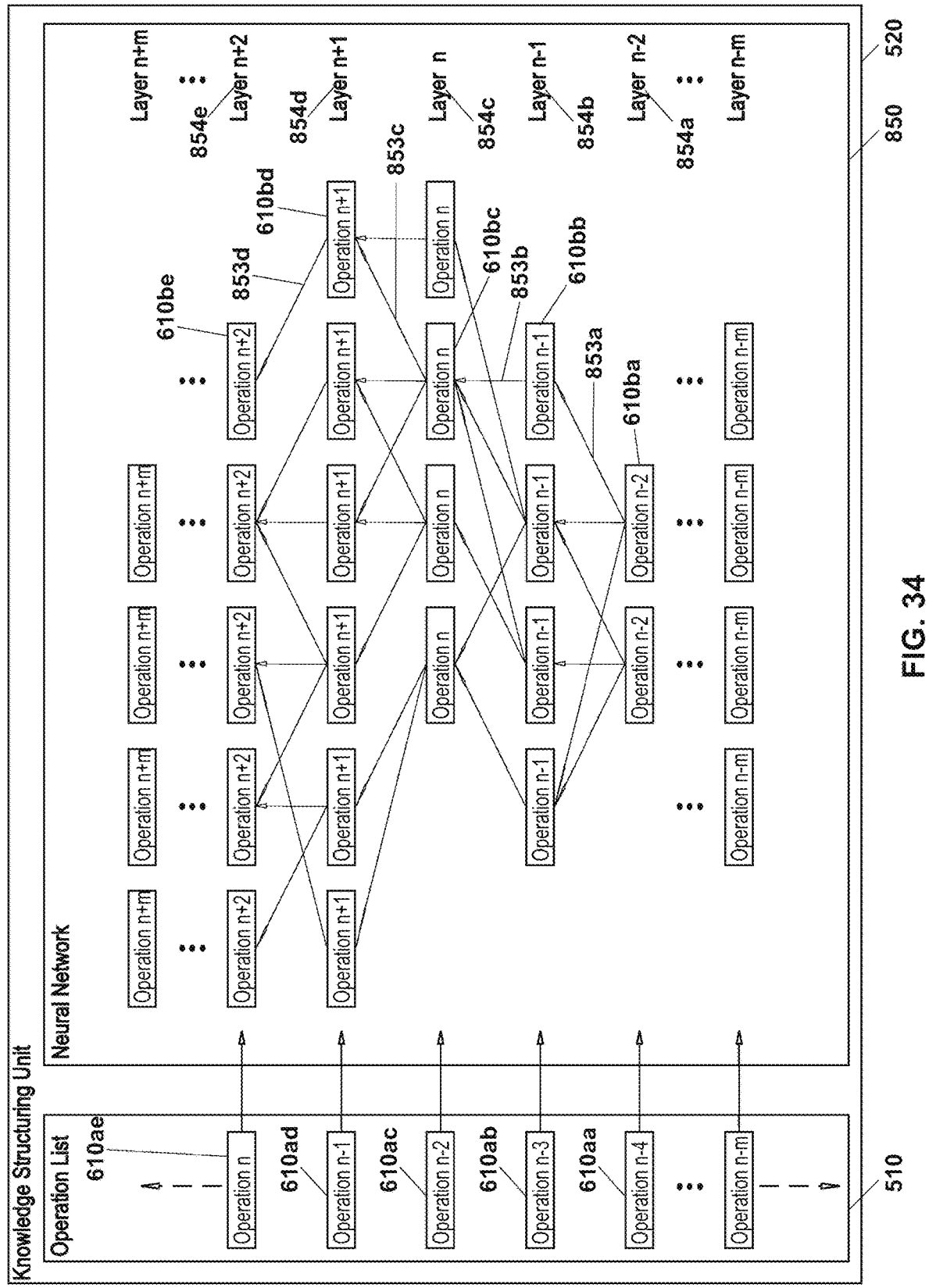
FIG. 34 illustrates an embodiment of Knowledge Structuring Unit 520 learning Operations 610 or Instruction Sets 600 utilizing Neural Network 850.

Referring to FIG. 34, an embodiment of Knowledge Structuring Unit 520 learning Operations 610 or Instruction Sets 600 utilizing Neural Network 850 is illustrated. Neural Network 850 includes a number of neurons or Nodes 852 interconnected by Connections 853 as previously described. Operations 610 are shown instead of Nodes 852 to simplify the illustration as Node 852 includes Operation 610, for example. Therefore, Operations 610 and Nodes 852 can be used interchangeably herein depending on context. Also, to simplify description, a mention or reference to Operation 610 includes a reference to Instruction Set 600 from which the Operation 610 originates as previously described. One of ordinary skill in art will understand that Node 852 may include other elements and/or functionalities instead of or in addition to Operation 610. In some designs, Neural Network 850 comprises a number of Layers 854 each of which may include one or more Operations 610. Operations 610 in successive Layers 854 can be connected by Connections 853. Connection 853 may include occurrence count and weight as described later. It should be understood that, in some embodiments, Operations 610 in one Layer 854 of Neural Network 850 need not be connected only with Operations 610 in a successive Layer 854, but also in any other Layer 854, thereby creating shortcuts (i.e. shortcut Connections 853, etc.) through Neural Network 850. For example, creating a shortcut Connection 853 can be implemented by performing Substantial Similarity Comparisons 1010 of an Operation 610 from Operation List 510 with Operations 610 in more than one Layer 854 when applying (i.e. storing, copying, etc.) the Operation 610 from Operation List 510 onto Neural Network 850. Once created, shortcut Connections 853 enable a wider variety of Operations 610 to be considered when selecting a path through Neural Network 850. An Operation 610 can also be connected to itself such as, for example, in recurrent neural networks. In general, any Operation 610 can be connected with any other Operation 610 anywhere else in Neural Network 850. In further embodiments, back-propagation of any data or information can be utilized. In one example, back-propagation of comparison accuracy indexes of compared Operations 610 in a path through Neural Network 850 can be implemented. In another example, back-propagation of errors can be implemented. Such back-propagations can then be used to adjust occurrence counts and/or weights of Connections 853 for better future predictions, for example. Any other back-propagation can be implemented for other purposes. Any combination of Nodes 852 (i.e. Nodes 852 comprising Operations 610, etc.), Connections 853, Layers 854, and/or other elements or techniques can be implemented in alternate embodiments. Neural Network 850 may include any type or form of a neural network known in art such as a feed-forward neural network, a back-propagating neural network, a recurrent neural network, a convolutional neural network, and/or others including a custom neural network.

In some embodiments, Knowledge Structuring Unit 520 may apply (i.e. copy, store, etc.) the most recent Operations 610 (i.e. Operation n, Operation n−1, etc.) from Operation List 510 onto anticipatory Layers 854 (i.e. Layer n+2, Layer n+1, etc.) of Neural Network 850 and apply the least recent Operations 610 (i.e. Operation n−2, Operation n−3, Operation n−4, etc.) from Operation List 510 onto comparative Layers 854 (i.e. Layer n, Layer n−1, Layer n−2, etc.) of Neural Network 850, for example. The term apply or applying may refer to storing, copying, inserting, or other similar action, therefore, these terms may be used interchangeably herein depending on context. Specifically, for example, Knowledge Structuring Unit 520 can apply Operation n from Operation List 510 onto Layer n+2 of Neural Network 850, apply Operation n−1 from Operation List 510 onto Layer n+1 of Neural Network 850, apply Operation n−2 from Operation List 510 onto Layer n of Neural Network 850, and so forth. Therefore, Operations 610 with an order number greater than n may become anticipatory Operations 610 in their respective anticipatory Layers 854 and the rest of the Operations 610 may become comparative Operations 610 in their respective comparative Layers 854, although this particular split can differ in alternate embodiments. Also, as indicated by the up and down vertical dotted arrows, application of Operation n from Operation List 510 can start at any Layer 854 of Neural Network 850. This way, the number of comparative and anticipatory Layers 854 can be adjusted for a particular application based on the type of Software Application 120, experience, testing, inquiry, analysis, synthesis, or other techniques. The number of comparative and anticipatory Layers 854 can be determined or set by a user, by UAIE administrator, or automatically by the system based on such knowledge or information. Any number of comparative and any number of anticipatory Layers 854, or Operations 610 therein, can be utilized in Neural Network 850. In effect, Neural Network 850 stores Software Application's 120 operations (i.e. Operations 610 or Instruction Sets 600) where, for example, Layer n, Layer n−1, and Layer n−2 can later be used for comparison (i.e. comparative Layers 854, etc.) with the then Software Application's 120 recent operations (i.e. including current, etc.), and Layer n+1 and Layer n+2 can later be used for anticipation (i.e. anticipatory Layers 854, etc.) of Software Application's 120 future or subsequent operations. It should be noted that n, m, and/or other such letters or indicia in any of the figures may be different numbers in different elements even where the elements are depicted in the same figure. In general, n, m, and/or other such letters or indicia may follow the immediate sequence and/or context where they are indicated. Therefore, an Operation 610 from Operation List 510 having a same letter or indicia as an Operation 610 from Neural Network 850 may be a different Operation 610. In one example, Operation n from Operation List 510 may be different than any Operation n from Neural Network 850. In another example, Operation n−2 from Operation List 510 may be different than any Operation n−2 from Neural Network 850. Also, Operations 610 in a same Layer 854 may be different Operations 610 belonging to that Layer 854. In one example, Operations n−2 are different Operations 610 belonging to Layer n−2. In another example, Operations n+1 are different Operations 610 belonging to Layer n+1.

In some embodiments, Knowledge Structuring Unit 520 receives a current Operation List 510 and applies the least recent Operations 610 from Operation List 510 onto Neural Network 850 first and the most recent Operations 610 from Operation List 510 last, thereby implementing learning of Operations 610 from Operation List 510. This is an example of how Operations 610 from Operation List 510 may be processed or applied from the least recent one to the most recent one and/or how Neural Network 850 or a portion thereof can be traversed forward in the learning process. Knowledge Structuring Unit 520 can perform Substantial Similarity Comparisons 1010 of an Operation 610 in Operation List 510 with one or more Operations 610 in a corresponding Layer 854 of Neural Network 854. If substantially similar Operation 610 is found in the corresponding Layer 854, Knowledge Structuring Unit 520 may update occurrence count and weight of Connection 853 to that Operation 610 from an Operation 610 in a prior Layer 854 (i.e. prior lower numbered Layer 854, etc.), and update any other Connections 853 of the Operation 610 in the prior Layer 854. On the other hand, if substantially similar Operation 610 is not found, Knowledge Structuring Unit 520 may insert (i.e. copy, store, etc.) Operation 610 from Operation List 510 into the corresponding Layer 854 of Neural Network 850, and create a Connection 853 to the inserted Operation 610 from an Operation 610 in a prior Layer 854 (i.e. prior lower numbered Layer 854, etc.) including assigning an occurrence count to the new Connection 853, calculating a weight of the new Connection 853, and updating any other Connections 853 of the Operation 610 in the prior Layer 854. Furthermore, inserting an Operation 610 into a Layer 854 of Neural Network 850 may also include creating a Connection 853 between the inserted Operation 610 and an Operation 610 in a subsequent (i.e. subsequent higher numbered Layer 854, etc.) Layer 854, thereby fully connecting the inserted Operation 610. Creating the Connection 853 between the inserted Operation 610 and an Operation 610 in the subsequent Layer 854 may be performed after the next Substantial Similarity Comparison 1010 when the target Operation 610 from the subsequent Layer 854 is determined.

In one example, Knowledge Structuring Unit 520 can perform Substantial Similarity Comparisons 1010 of Operation 610aa from Operation List 510 and Operations 610 in the corresponding Layer 854a. In the case that Knowledge Structuring Unit 520 finds a substantially similar match between Operation 610aa and Operation 610ba, Knowledge Structuring Unit 520 may create a Connection 853 between Operation 610ba and an Operation 610 in a prior Layer 854 (none in this example) if the Operation 610 in the prior Layer 854 is newly inserted, the created Connection 853 having occurrence count of 1 and weight of 1. If the Operation 610 in the prior Layer 854 is pre-existing (i.e. not newly inserted, etc.), Knowledge Structuring Unit 520 may update occurrence count and weight of a Connection 853 between Operation 610ba and the Operation 610 in the prior Layer 854, and update weights of any other Connections 853 originating from the Operation 610 in the prior Layer 854 as later described. Knowledge Structuring Unit 520 can then perform Substantial Similarity Comparisons 1010 of Operation 610ab from Operation List 510 and Operations 610 in the corresponding Layer 854b. In the case that Knowledge Structuring Unit 520 does not find a substantially similar match, Knowledge Structuring Unit 520 may insert Operation 610bb into Layer 854b and copy Operation 610ab into the inserted Operation 610bb. Knowledge Structuring Unit 520 may also create Connection 853a between Operation 610ba and Operation 610bb with occurrence count of 1 and weight calculated based on the occurrence count as later described. Knowledge Structuring Unit 520 may also update weights of other Connections 853 originating from Operation 610ba to account for the newly created Connection 853a as later described. Knowledge Structuring Unit 520 can then perform Substantial Similarity Comparisons 1010 of Operation 610ac from Operation List 510 and Operations 610 in the corresponding Layer 854c. In the case that Knowledge Structuring Unit 520 finds a substantially similar match between Operation 610ac and Operation 610bc, Knowledge Structuring Unit 520 may create Connection 853b between Operation 610bb and Operation 610bc with occurrence count of 1 and weight of 1. Knowledge Structuring Unit 520 can then perform Substantial Similarity Comparisons 1010 of Operation 610ad from Operation List 510 and Operations 610 in the corresponding Layer 854d. In the case that Knowledge Structuring Unit 520 does not find a substantially similar match, Knowledge Structuring Unit 520 may insert Operation 610bd into Layer 854d and copy Operation 610ad into the inserted Operation 610bd. Knowledge Structuring Unit 520 may also create Connection 853c between Operation 610bc and Operation 610bd with occurrence count of 1 and weight calculated based on the occurrence count as later described. Knowledge Structuring Unit 520 may also update weights of other Connections 853 originating from Operation 610bc to account for the newly created Connection 853c as later described. Knowledge Structuring Unit 520 can then perform Substantial Similarity Comparisons 1010 of Operation 610ae from Operation List 510 and Operations 610 in the corresponding Layer 854e. In the case that Knowledge Structuring Unit 520 does not find a substantially similar match, Knowledge Structuring Unit 520 may insert Operation 610be into Layer 854e and copy Operation 610ae into the inserted Operation 610be. Knowledge Structuring Unit 520 may also create Connection 853d between Operation 610bd and Operation 610be with occurrence count of 1 and weight of 1. As indicated by the up and down dotted arrows, Operation List 510 can be aligned differently with Layers 854 of Neural Network 850, thereby adjusting the split between comparative and anticipatory Layers 854 in alternate embodiments. Therefore, application of any additional Operations 610 from Operation List 510 onto Layers 854 of Neural Network 850 follows the same logic or process as above-described.

Substantial Similarity Comparison 1010 used in some embodiments involving Neural Network 850 comprises the functionality for comparing or matching an Operation 610 or Instruction Set 600 from Operation List 510 with Operation 610 or Instruction Set 600 from Neural Network 850, and/or other functionalities. The rules for substantial similarity or substantial similarity match can be defined based on the type of Software Application 120, experience, testing, inquiry, analysis, synthesis, or other techniques. As such, the rules of Substantial Similarity Comparison 1010 can be set by a user, by UAIE administrator, or automatically by the system based on such experience, knowledge, and/or input. All previously described features, functionalities, and embodiments of Substantial Similarity Comparison 1010 can be utilized in embodiments of UAIE comprising Neural Network 850 as applicable.

In some aspects, Substantial Similarity Comparison 1010 can determine total equivalence when all Instruction Set Portions 620 and/or Extra Info 630 of the compared Operations 610 or Instructions Sets 600 match. If total equivalence is not found, Substantial Similarity Comparison 1010 may attempt to determine substantial similarity between the compared Operations 610 or Instructions Set 600. In one example, substantial similarity can be achieved when all but one Instruction Set Portion 620 and/or Extra Info 630 of the compared Operations 610 or Instruction Sets 600 match. In another example, substantial similarity can be achieved when all but two, three, or more (any threshold number can be used, etc.) Instruction Set Portions 620 and/or Extra Info 630 of the compared Operations 610 or Instruction Sets 600 match. The number of allowable non-matching Instruction Set Portions 620 and/or Extra Info 630 can be defined by a user, by UAIE administrator, or automatically by the system.

In further aspects, Substantial Similarity Comparison 1010 can determine substantial similarity in terms of matches in more important Instruction Set Portions 620 and/or Extra Info 630, thereby tolerating mismatches in less important Instruction Set Portions 620 and/or Extra Info 630. In one example, Substantial Similarity Comparison 1010 can determine substantial similarity in terms of matches in commands, functions, objects, and/or parameters thereby tolerating mismatches in variable names and/or values. Importance of an Instruction Set Portion 620 and/or Extra Info 630 may be indicated by the previously described Importance Index 640, or by another importance ranking technique. In some designs, Substantial Similarity Comparison 1010 can be configured to omit any Instruction Set Portions 620 and/or Extra Info 630 from the comparison. In one example, some or all Instruction Set Portions 620 and/or Extra Info 630 containing values can be omitted. In another example, some or all Instruction Set Portions 620 and/or Extra Info 630 containing operators, or other components can be omitted. In another example, some or all Extra Info 630 can be omitted. In yet another example (i.e. context reliant applications, etc.), some or all Instruction Set Portions 620 can be omitted.

In yet other aspects, Substantial Similarity Comparison 1010 may include Comparison Strictness Function 1011 that comprises the functionality to define appropriately strict rules for determining substantial similarity between the compared Operations 610 or Instruction Sets 600. All previously described features, functionalities, and embodiments of Comparison Strictness Function 1011 can be utilized in embodiments of UAIE comprising Neural Network 850 as applicable. In one example, Comparison Strictness Function 1011 can set, reset, and/or adjust the strictness of the rules for finding or determining substantial similarity between the compared Operations 610 or Instruction Sets 600, thereby fine tuning Substantial Similarity Comparison 1010 so that the rules for determining substantial similarity are appropriately strict.

All previously described features, functionalities, and embodiments related to Substantial Similarity Comparison 1010 such as usage of Extra Info 630 (i.e. time stamps, contextual information, etc.), usage of contextual information, usage of Importance Index 640, usage of Comparison Accuracy Index 650, performing semantic analysis, analyzing context in which Instruction Sets 600 or Operations 610 have been performed, creating or analyzing computed information, and/or drawing inferences from any available contextual, computed, or other information can similarly be utilized in embodiments involving Neural Network 850.

Figure 35A:
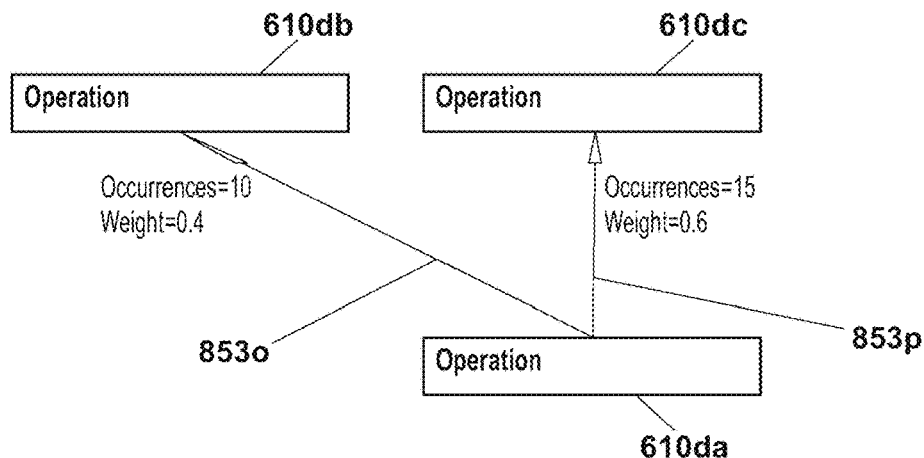
FIG. 35A shows an example of Operations 610 interconnected by Connections 853 in a neural network.
Figure 35B:
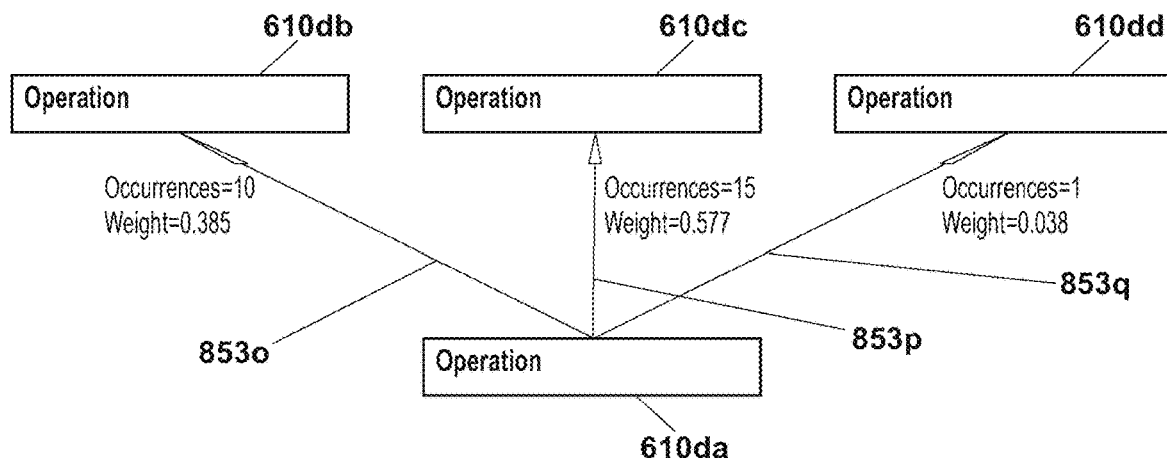
FIG. 35B shows an example of inserting an Operation 610.
Figure 35C:
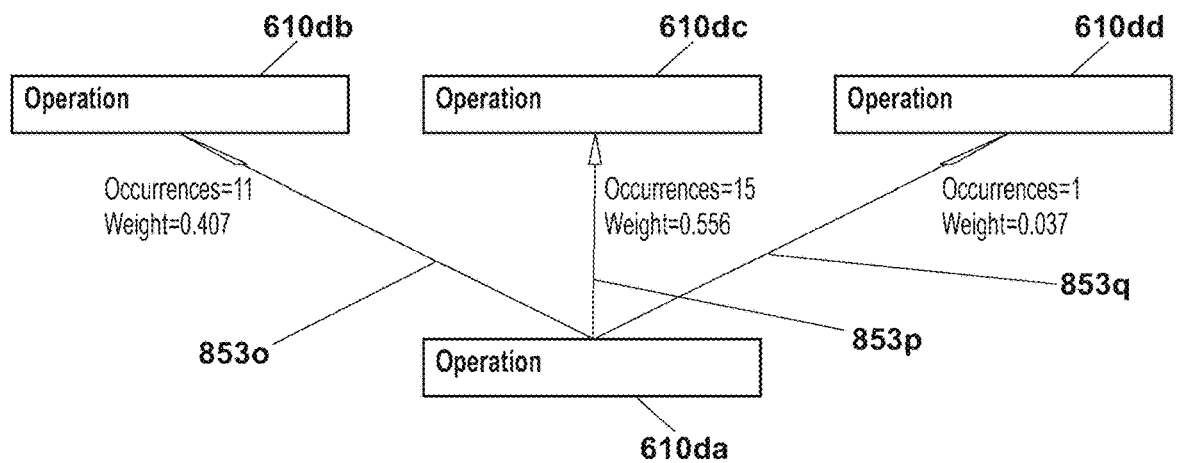
FIG. 35C shows an example of an observation of an additional occurrence of a Connection 853.

Referring to FIG. 35A, FIG. 35B, and FIG. 35C, exemplary embodiments of updating weights of Connections 853 are illustrated. In some aspects, Knowledge Structuring Unit 520 may apply the least recent Operations 610 from Operation List 510 onto Neural Network 850 first and the most recent Operations 610 from Operation List 510 last (i.e. apply Operations 610 from the least recent one to the most recent one, etc.) as previously described. As shown for example in FIG. 35A, Operation 610*da* is connected to Operation 610*db* and Operation 610*dc* by Connection 853*o* and Connection 853*p*, respectively. Operation 610*da* may reside in one Layer 854 of Neural Network 850, whereas, Operation 610*db* and Operation 610*dc* may reside in another Layer 854. Each of Connection 853*o* and Connection 853*p* may include number of occurrences and weight. The number of occurrences may track or store the number of observations that an Operation 610 (or substantially similar Operation 610) was followed by another Operation 610 (or substantially similar Operation 610) indicating a connection or relationship between them. For example, Operation 610*da* (or substantially similar Operation 610 to Operation 610*da*) was followed by Operation 610*db* (or substantially similar Operation 610 to Operation 610*db*) 10 times as indicated in the number of occurrences of Connection 853*o*. Also, Operation 610*da* (or substantially similar Operation 610 to Operation 610*da*) was followed by Operation 610*dc* (or substantially similar Operation 610 to Operation 610*dc*) 15 times as indicated in the number of occurrences of Connection 853*p*. The weight of Connection 853*o* can be calculated or determined as the number of occurrences of Connection 853*o* divided by the sum of occurrences of all connections (i.e. Connection 853*o* and Connection 853*p*, etc.) originating from Operation 610*da*. Therefore, the weight of Connection 853*o* can be calculated or determined as 10/(10+15)= 0.4, for example. Also, the weight of Connection 853*p* can be calculated or determined as 15/(10+15)=0.6, for example. Therefore, the sum of weights of Connection 853*o*, Connection 853*p*, and/or any other Connections 853 originating from Operation 610*da* may equal to 1 or 100%. As shown for example in FIG. 35B, in the case that Operation 610*dd* is inserted and an observation is made that Operation 610*dd* follows Operation 610*da*, Connection 853*q* can be created between Operation 610*da* and Operation 610*dd*. The occurrence count of Connection 853*q* can be set to 1 and weight determined as 1/(10+15+1)=0.038. The weights of all other connections (i.e. Connection 853*o*, Connection 853*p*, etc.) originating from Operation 610*da* may be updated to account for the creation of Connection 853*q*. Therefore, the weight of Connection 853*o* can be updated as 10/(10+15+1)=0.385. The weight of Connection 853*p* can also be updated as 15/(10+15+1)=0.577. As shown for example in FIG. 35C, in the case that an additional occurrence of Connection 853*o* is observed (i.e. Operation 610*db* followed Operation 610*da*, etc.), occurrence count of Connection 853*o* and weights of all connections (i.e. Connection 853*o*, Connection 853*p*, and Connection 853*q*, etc.) originating from Operation 610*da* may be updated to account for this observation. The occurrence count of Connection 853*o* can be increased by 1 and its weight updated as 11/(11+15+1)= 0.407. The weight of Connection 853*p* can also be updated as 15/(11+15+1)=0.556. The weight of Connection 853*q* can also be updated as 1/(11+15+1)=0.037.

In some embodiments, instead of applying Operations 610 from Operation List 510 onto Neural Network 850 individually as previously described, Knowledge Structuring Unit 520 can store (i.e. copy, insert, etc.) some or all Operations 610 from Operation List 510 into Neural Network 850 collectively as a separate sequence or path. Operations 610 in such separate sequence or path may not be cross-connected with Operations 610 in other sequences or paths. In such embodiments, Substantial Similarity Comparison 1010 can be utilized to compare Operations 610 from Operation List 510 with Operations 610 from Neural Network 850 to find a separate sequence or path in the Neural Network 850 comprising Operations 610 that are substantially similar to Operations 610 from Operation List 510. Any features, functionalities, and embodiments of the later described Decision-making Unit 540 can be utilized in finding such separate sequence or path. If substantially similar separate sequence or path is found, storing (i.e. copying, inserting, etc.) Operations 610 from Operation List 510 into Neural Network 850 can optionally be omitted. For example, if Operations 610 in a separate sequence or path through Neural Network 850 are found to be nearly identical or substantially similar (i.e. with a high degree of similarity, etc.) to Operations 610 in Operation List 510, storing (i.e. copying, inserting, etc.) Operations 610 from Operation List 510 into Neural Network 850 may not add much or any additional knowledge to Neural Network 850. Therefore, storing the Operations 610 from Operation List 510 into Neural Network 850 can be omitted to save storage resources and limit the number of Operations 610 that may later need to be processed or compared. Conversely, for example, if Operations 610 in none of the separate sequences or paths through Neural Network 850 are found to be substantially similar to Operations 610 in Operation List 510, Knowledge Structuring Unit 520 can store into Neural Network 850 a new separate sequence or path comprising the Operations 610 from Operation List 510, thereby implementing learning of Operations 610 from Operation List 510. Any features, functionalities, and embodiments of Substantial Similarity Comparison 1010, Importance Index 640, Comparison Accuracy Index 650, and/or other disclosed elements can be utilized to facilitate the determination whether to apply or store Operations 610 from Operation List 510 onto/into Neural Network 850 individually or collectively.

There may be advantages to storing some or all Operations 610 from Operation List 510 into Neural Network 850 collectively as a separate sequence or path. In some aspects, storing Operations 610 from Operation List 510 into Neural Network 850 collectively as a separate sequence or path enables the system to decide whether to store the entire Operation List 510 into Neural Network 850 or not store the Operation List 510 at all (i.e. all or nothing, etc.). In other aspects, storing Operations 610 from Operation List 510 into Neural Network 850 collectively as a separate sequence or path eliminates or reduces the need to keep track of and use occurrence counts and weights of Connections 853 since an Operation 610 stored in a separate sequence or path is connected only with a previous and subsequent Operation 610 in the sequence or path. In further aspects, storing Operations 610 from Operation List 510 into Neural Network 850 collectively as a separate sequence or path may resolve a potential issue of one or more Connections 853 in Neural Network 850 becoming so frequent and dominant that selecting a path through Neural Network 850 would frequently "default" to go through these Connections 853, thereby not allowing alternative paths to be considered or selected.

Figure 36:
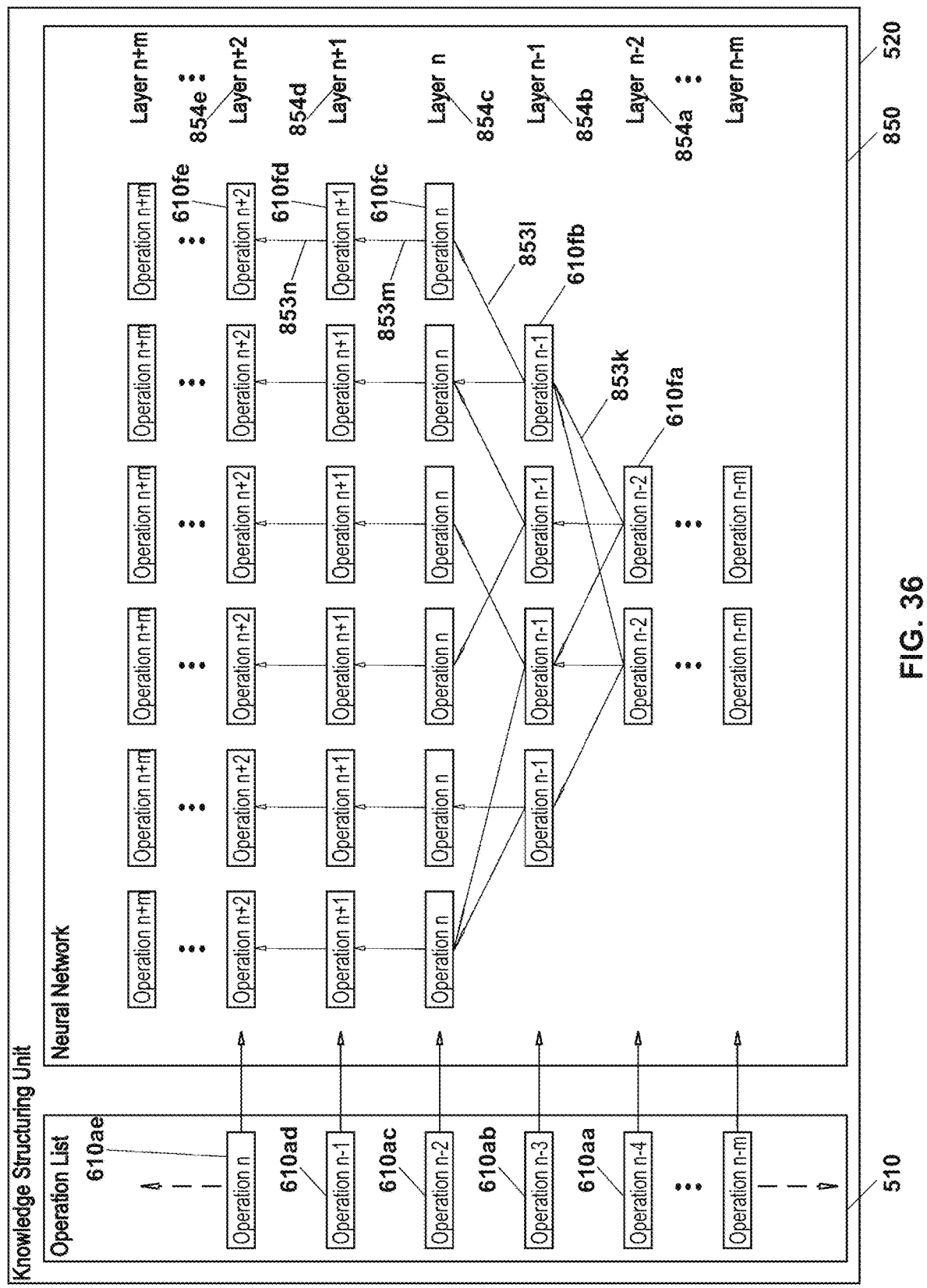
FIG. 36 illustrates another embodiment of Knowledge Structuring Unit 520 learning Operations 610 or Instruction Sets 600 utilizing Neural Network 850.

Referring to FIG. 36, an embodiment of Knowledge Structuring Unit 520 learning Operations 610 or Instruction Sets 600 utilizing Neural Network 850 is illustrated. In some aspects, Knowledge Structuring Unit 520 receives a current Operation List 510 and implements a combination of applying Operations 610 from Operation List 510 individually and storing Operations 610 from Operation List 510 collectively onto/into Neural Network 850. For example, some Operations 610 from Operation List 510 can be applied individually onto corresponding Layers 854 of Neural Network 850, whereas, other Operations 610 from Operation List 510 can be stored collectively into corresponding Layers 854 of Neural Network 850, thereby creating a partially separate sequence or path in Neural Network 850. Specifically, for instance, the least recently used or executed Operations 610 (i.e. Operation n-2, Operation n-3, Operation n-4, etc.) from Operation List 510 can be applied individually onto comparative Layers 854 of Neural Network 850, whereas, the most recently used or executed Operations 610 (i.e. Operation n, Operation n-1, etc.) from Operation List 510 can be stored collectively into anticipatory Layers 854 of Neural Network 850. In such implementations, Operations 610 in comparative Layers 854 of Neural Network 850 may be interconnected with other Operations 610, whereas, Operations 610 in anticipatory Layers 854 of Neural Network 850 may be stored in their own separate sequences or paths as described in an exemplary embodiment below. Any other combination of applying and storing Operations 610 from Operation List 510 individually or collectively onto/into Neural Network 850 can be implemented in alternate embodiments. It should be understood that, in addition to the combinations of applying and storing Operations 610 from Operation List 510 individually and collectively onto/into Neural Network 850, each of these techniques can be implemented solely for the entire Neural Network 850 without combining it with the other technique, or other techniques in general. For example, only individual applying or only collective storing of Operations 610 from Operation List 510 onto/into Neural Network 850 can be implemented.

In some embodiments, Knowledge Structuring Unit 520 receives a current Operation List 510 and applies/stores the most recent Operations 610 from Operation List 510 onto/into Neural Network 850 first and the least recent Operations 610 from Operation List 510 last, thereby implementing learning of Operations 610 from Operation List 510. This is an example of how Operations 610 from Operation List 510 may be processed or applied/stored from the most recent one to the least recent one and/or how Neural Network 850 or a portion thereof can be traversed backward in the learning process. Also, Knowledge Structuring Unit 520 may store the most recent Operations 610 from Operation List 510 into corresponding anticipatory Layers 854 of Neural Network 850 collectively as separate sequences or paths, and apply the least recent Operations 610 from Operation List 510 onto corresponding comparative Layers 854 of Neural Network 850 individually, for example. Storing the most recent Operations 610 from Operation List 510 into corresponding anticipatory Layers 854 of Neural Network 850 collectively as separate sequences or paths can be implemented by performing Substantial Similarity Comparisons 1010 to compare the most recent Operations 610 from Operation List 510 with Operations 610 from anticipatory Layers 854 of Neural Network 850 to find a separate sequence or path in the anticipatory Layers 854 of Neural Network 850 comprising Operations 610 that are substantially similar to the most recent Operations 610 from Operation List 510. If such separate sequence or path is not found, Knowledge Structuring Unit 520 can store into anticipatory Layers 854 of Neural Network 850 a new separate sequence or path comprising the most recent Operations 610 from Operation List 510 as previously described. Applying the least recent Operations 610 from Operation List 510 onto corresponding comparative Layers 854 of Neural Network 850 individually can be implemented by performing Substantial Similarity Comparisons 1010 of a least recent Operation 610 in Operation List 510 with one or more Operations 610 in a corresponding comparative Layer 854 of Neural Network 854. If substantially similar Operation 610 is found in the corresponding comparative Layer 854, Knowledge Structuring Unit 520 may update occurrence count and weight of Connection 853 from that Operation 610 to an Operation 610 in a subsequent Layer 854 (i.e. subsequent higher numbered Layer 854, etc.), and update weights of any other Connections 853 pointing to the Operation 610 in the subsequent Layer 854. On the other hand, if substantially similar Operation 610 is not found, Knowledge Structuring Unit 520 may insert (i.e. copy, store, etc.) the Operation 610 from Operation List 510 into the corresponding comparative Layer 854 of Neural Network 850, and create a Connection 853 from the inserted Operation 610 to an Operation 610 in a subsequent Layer 854 (i.e. subsequent higher numbered Layer 854, etc.) including assigning an occurrence count to the new Connection 853, calculating a weight of the new Connection 853, and updating any other Connections 853 pointing to the Operation 610 in the subsequent Layer 854. Furthermore, inserting an Operation 610 into a Layer 854 of Neural Network 850 may also include creating a Connection 853 between the inserted Operation 610 and an Operation 610 in a prior Layer 854 (i.e. prior lower numbered Layer 854, etc.), thereby fully connecting the inserted Operation 610. Creating the Connection 853 between the inserted Operation 610 and an Operation 610 in the prior Layer 854 may be performed after the next Substantial Similarity Comparison 1010 when the target Operation 610 from the prior Layer 854 is determined.

In one example, Knowledge Structuring Unit 520 can perform Substantial Similarity Comparisons 1010 of Operation 610ae and Operation 610ad from Operation List 510 with separate sequences or paths of Operations 610 in the corresponding Layer 854e and Layer 854d. In the case that Knowledge Structuring Unit 520 does not find a separate sequence or path of Operations 610 in anticipatory Layers 854 that substantially match Operation 610ae and Operation 610ad, Knowledge Structuring Unit 520 may insert Operation 610fe into Layer 854e and copy Operation 610ae into the inserted Operation 610fe, and insert Operation 610fd into Layer 854d and copy Operation 610ad into the inserted Operation 610fd. Knowledge Structuring Unit 520 may also create Connection 853n between Operation 610fd and an Operation 610fe with occurrence count of 1 and weight of 1. Occurrence count and weight can optionally be omitted since Connection 853n is the only connection between Operation 610fd and Operation 610fe. Storing any additional Operations 610 from Operation List 510 into anticipatory Layers 854 of Neural Network 850 collectively as separate sequences or paths follows the same logic or process as the above-described. Knowledge Structuring Unit 520 can then perform Substantial Similarity Comparisons 1010 of Operation 610ac from Operation List 510 and Operations 610 in the corresponding Layer 854c. In the case that Knowledge Structuring Unit 520 does not find a substantially similar match, Knowledge Structuring Unit 520 may insert Operation 610fc into Layer 854c and copy Operation 610ac into the inserted Operation 610fc. Knowledge Structuring Unit 520 may also create Connection 853m between Operation 610fc and Operation 610fd with occurrence count of 1 and weight of 1. Occurrence count and weight can optionally be omitted since Connection 853m is the only connection between Operation 610fc and Operation 610fd. Knowledge Structuring Unit 520 can then perform Substantial Similarity Comparisons 1010 of Operation 610ab from Operation List 510 and Operations 610 in the corresponding Layer 854b. In the case that Knowledge Structuring Unit 520 finds a substantially similar match between Operation 610ab and Operation 610fb, Knowledge Structuring Unit 520 may create a Connection 853l between Operation 610fb and Operation 610fc with occurrence count of 1 and weight of 1. Knowledge Structuring Unit 520 can then perform Substantial Similarity Comparisons 1010 of Operation 610aa from Operation List 510 and Operations 610 in the corresponding Layer 854a. In the case that Knowledge Structuring Unit 520 finds a substantially similar match between Operation 610aa and Operation 610fa, Knowledge Structuring Unit 520 may increase by 1 occurrence count of Connection 853k between Operation 610fa and Operation 610fb, and calculate weight of Connection 853k based on its occurrence count as later described. Knowledge Structuring Unit 520 may also update weights of any other Connections 853 pointing to Operation 610fb as later described. As indicated by the up and down dotted arrows, Operation List 510 can be aligned differently with Layers 854 of Neural Network 850, thereby adjusting the split between comparative and anticipatory Layers 854 in alternate embodiments. Therefore, applying/storing any additional Operations 610 from Operation List 510 onto/into Layers 854 of Neural Network 850 follows the same logic or process as the above-described.

Figure 37A:
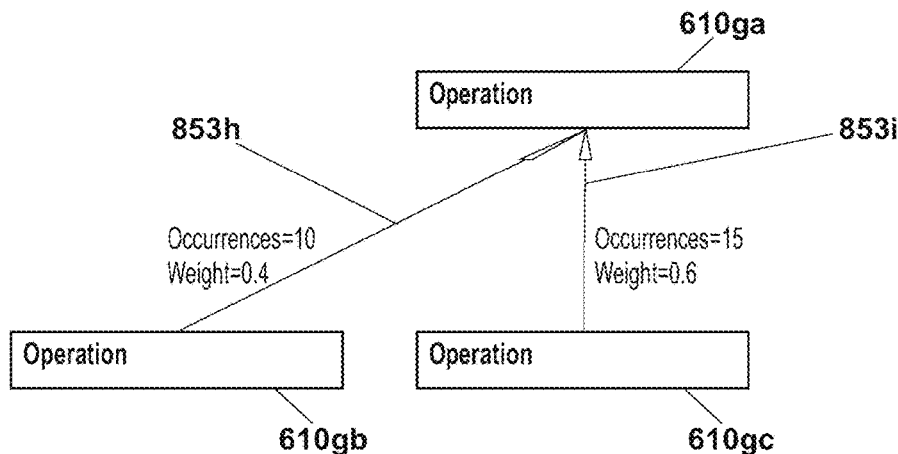
FIG. 37A shows another example of Operations 610 interconnected by Connections 853 in a neural network.
Figure 37B:
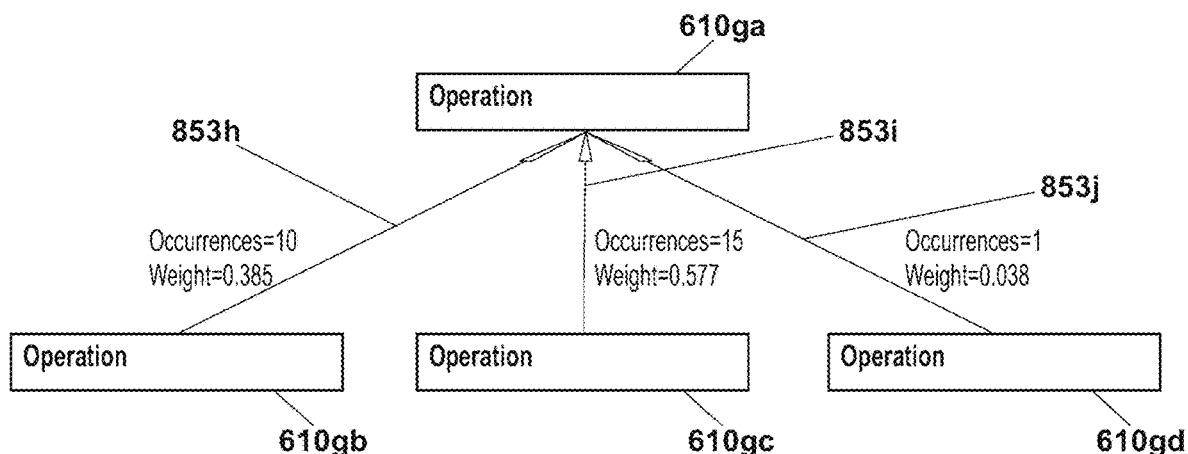
FIG. 37B shows another example of inserting an Operation 610.
Figure 37C:
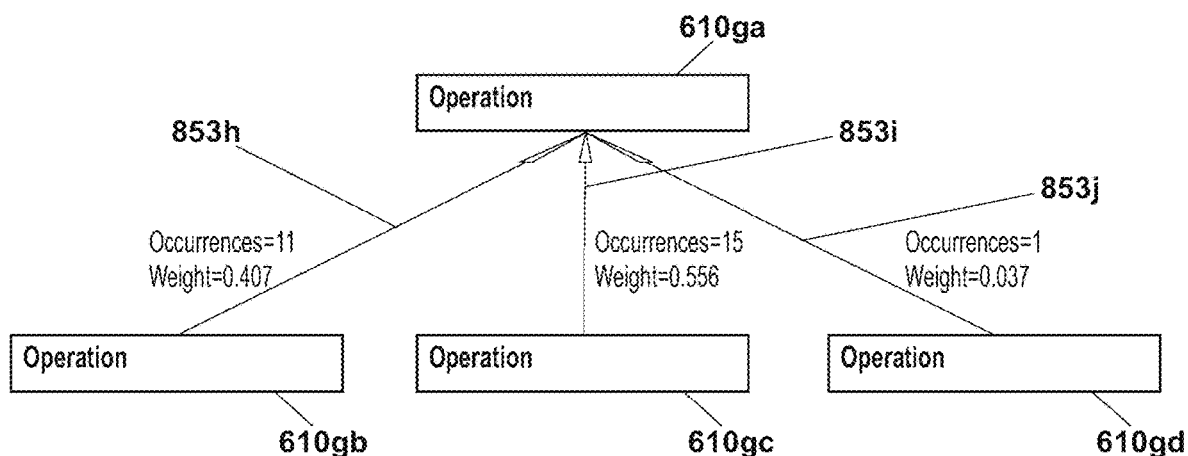
FIG. 37C shows another example of an observation of an additional occurrence of a Connection 853.

Referring to FIG. 37A, FIG. 37B, and FIG. 37C, exemplary embodiments of updating weights of Connections 853 are illustrated. In some aspects, Knowledge Structuring Unit 520 may apply the most recent Operations 610 from Operation List 510 onto Neural Network 850 first and the least recent Operations 610 from Operation List 510 last (i.e. apply Operations 610 from the most recent one to the least recent one, etc.), for example. As shown for example in FIG. 37A, Operation 610ga is connected to Operation 610gb and Operation 610gc by Connection 853h and Connection 853i, respectively. Operation 610ga may reside in one Layer 854 of Neural Network 850, whereas, Operation 610gb and Operation 610gc may reside in another Layer 854. Each of Connection 853h and Connection 853i may include number of occurrences and weight. The number of occurrences may track or store the number of observations that an Operation 610 (or substantially similar Operation 610) was preceded by another Operation 610 (or substantially similar Operation 610) indicating a connection or relationship between them. For example, Operation 610ga (or substantially similar Operation 610 to Operation 610ga) was preceded by Operation 610gb (or substantially similar Operation 610 to Operation 610gb) 10 times as indicated in the number of occurrences of Connection 853h. Also, Operation 610ga (or substantially similar Operation 610 to Operation 610ga) was preceded by Operation 610gc (or substantially similar Operation 610 to Operation 610gc) 15 times as indicated in the number of occurrences of Connection 853i. The weight of Connection 853h can be calculated or determined as the number of occurrences of Connection 853h divided by the sum of occurrences of all connections (i.e. Connection 853h and Connection 853i, etc.) pointing to Operation 610ga. Therefore, the weight of Connection 853h can be calculated or determined as $10/(10+15)=0.4$, for example. Also, the weight of Connection 853i can be calculated or determined as $15/(10+15)=0.6$, for example. Therefore, the sum of weights of Connection 853h, Connection 853i, and/or any other Connections 853 pointing to Operation 610ga may equal to 1 or 100%. As shown for example in FIG. 37B, in the case that Operation 610gd is inserted and an observation is made that Operation 610gd precedes Operation 610ga, Connection 853j can be created between Operation 610gd and Operation 610ga. The occurrence count of Connection 853j can be set to 1 and weight determined as $1/(10+15+1)=0.038$. The weights of all other connections (i.e. Connection 853h, Connection 853i, etc.) pointing to Operation 610ga may be updated to account for the creation of Connection 853j. Therefore, the weight of Connection 853h can be updated as $10/(10+15+1)=0.385$. The weight of Connection 853i can also be updated as $15/(10+15+1)=0.577$. As shown for example in FIG. 37C, in the case that an additional occurrence of Connection 853h is observed (i.e. Operation 610gb preceded Operation 610ga, etc.), occurrence count of Connection 853h and weights of all connections (i.e. Connection 853h, Connection 853i, and Connection 853j, etc.) pointing to Operation 610ga may be updated to account for this observation. The occurrence count of Connection 853*h* can be increased by 1 and its weight updated as 11/(11+15+1)=0.407. The weight of Connection 853*i* can also be updated as 15/(11+15+1)=0.556. The weight of Connection 853*j* can also be updated as 1/(11+15+1)=0.037.

Figure 38:
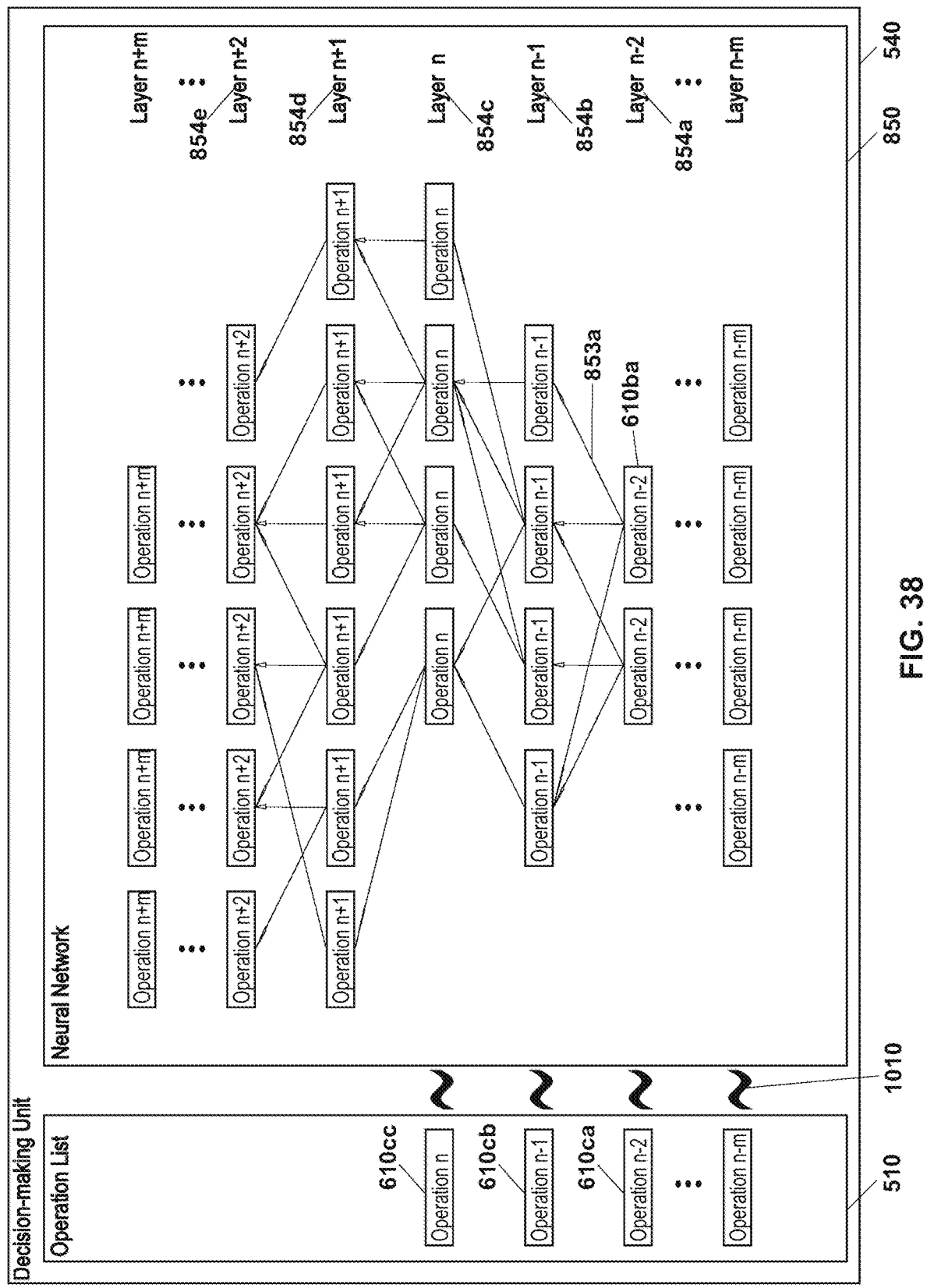
FIG. 38 illustrates an embodiment of Decision-making Unit 540 anticipating Operations 610 or Instruction Sets 600 utilizing Neural Network 850.

Referring to FIG. 38, an embodiment is illustrated of Decision-making Unit 540 anticipating Operations 610 or Instruction Sets 600 utilizing Neural Network 850. In some aspects, the least recent Operations 610 from Operation List 510 were applied onto Neural Network 850 first and the most recent Operations 610 from Operation List 510 were applied onto Neural Network 850 last (i.e. Operations 610 were applied from the least recent one to the most recent one, etc.) in the previously described learning process. In some implementations, Decision-making Unit 540 can perform Substantial Similarity Comparisons 1010 of a number of most recently used or executed Operations 610 (i.e. Operation n, Operation n−1, Operation n−2, etc.) from Operation List 510 with Operations 610 from corresponding comparative Layers 854 (i.e. Layer n, Layer n−1, Layer n−2, etc.) of Neural Network 850. If a substantially similar pattern of most recently used or executed Operations 610 from Operation List 510 is found in comparative Layers 854 of Neural Network 850, subsequent Operations 610 can be anticipated in Operations 610 (i.e. Operation n+1, Operation n+2, etc.) from anticipatory Layers 854 (i.e. Layer n+1, Layer n+2, etc.) of Neural Network 850.

Various techniques, inputs, and/or parameters can be utilized in selecting Operations 610 in a path through comparative Layers 854 of Neural Network 850. In some aspects, Decision-making Unit 540 can start by determining substantial similarity between an initial Operation 610 (i.e. Operation n−2, etc.) from Operation List 510 and one or more Operations 610 (i.e. Operations n−2, etc.) from a corresponding comparative Layer 854 (i.e. Layer n−2, etc.) of Neural Network 850. Decision-making Unit 540 can then perform Substantial Similarity Comparisons 1010 of a next Operation 610 (i.e. Operation n−1, etc.) from Operation List 510 with one or more Operations 610 (i.e. Operations n−1, etc.) from a corresponding comparative Layer 854 (i.e. Layer n−1, etc.) of Neural Network 850, and so on. This is an example of how Operations 610 from Operation List 510 may be processed or compared from the least recent one to the most recent one and/or how Neural Network 850 or a portion thereof can be traversed forward in the decision-making process. Any Operation 610 from Operation List 510 can be used as the initial one to be compared with Operations 610 from a corresponding Layer 854 of Neural Network 850.

In some embodiments, Decision-making Unit 540 may limit Substantial Similarity Comparisons 1010 to only include Operations 610 from comparative Layers 854 that are interconnected by Connections 853. Also, Decision-making Unit 540 can take into account weights of Connections 853 among the interconnected Operations 610 in choosing which Operation 610 to compare first, second, third, and so on. Specifically, for instance, Decision-making Unit 540 can perform Substantial Similarity Comparison 1010 with Operation 610 pointed to by the highest weight Connection 853 first, Operation 610 pointed to by the second highest weight Connection 853 second, and so on. In some aspects, Decision-making Unit 540 can stop performing Substantial Similarity Comparisons 1010 in a particular Layer 854 as soon as it finds a substantially similar Operation 610 interconnected as previously described. In other aspects, Decision-making Unit 540 may only follow the highest weight Connection 853 to arrive at an Operation 610 to be compared, thereby disregarding Connections 853 with less than the highest weight.

In other embodiments, Decision-making Unit 540 may perform Substantial Similarity Comparisons 1010 of an Operation 610 from Operation List 510 with one or more interconnected Operations 610 from a corresponding comparative Layer 854 of Neural Network 850, and utilize the previously described Comparison Accuracy Index 650 in deciding which Operation 610 to select in the path through comparative Layers 854. Comparison Accuracy Index 650 comprises the functionality for storing a measure of how well an Operation 610 to or with which the index is assigned or associated is matched with another Operation 610. Comparison Accuracy Index 650 on a scale of 0-1 can be utilized instead of the previously described Comparison Accuracy Index 650 on a scale of 0-10. The scale of 0-1 is preferable since it corresponds to and is comparable with weights of Connections 853 that are also on a scale of 0-1. In one example, Decision-making Unit 540 may select an Operation 610 having the highest Comparison Accuracy Index 650 from a comparative Layer 854 of Neural Network 850 even if Connection 853 pointing to that Operation 610 has the lowest or less than the highest weight. Therefore, Comparison Accuracy Index 650 or other similar input or parameter can override or disregard the weight of a Connection 853. In another example, Decision-making Unit 540 may select an Operation 610 from a Layer 854 of Neural Network 850 if its Comparison Accuracy Index 650 is higher than or equal to a weight of its Connection 853. In a further example, Decision-making Unit 540 may select an Operation 610 from a Layer 854 of Neural Network 850 if a weight of its Connection 853 is higher than or equal to its Comparison Accuracy Index 650. Therefore, Comparison Accuracy Index 650 can be set to be more, less, or equally important than a weight of a Connection 853. In some aspects, a minimum Comparison Accuracy Index 650 required for substantial similarity with respect to an Operation 610 from a Layer 854 of Neural Network 850 can be set to be different for various Layers 854. For example, a higher minimum Comparison Accuracy Index 650 can be set for comparative Layers 854 comprising the most recently used or executed Operations 610, and decreased for the remaining comparative Layers 854. Any other settings of a minimum Comparison Accuracy Index 650 required for substantial similarity can be utilized in alternate embodiments.

In further embodiments, Decision-making Unit 540 can utilize a bias to adjust weight of a Connection 853, Comparison Accuracy Index 650, and/or other input or parameter used in selecting Operations 610 in a path through comparative Layers 854 of Neural Network 850. In one example, Decision-making Unit 540 may select an Operation 610 from a Layer 854 of Neural Network 850 if its Comparison Accuracy Index 650 multiplied by or adjusted for a bias is higher than or equal to a weight of its Connection 853. In another example, Decision-making Unit 540 may select an Operation 610 from a Layer 854 of Neural Network 850 if the weight of its Connection 853 multiplied by or adjusted for a bias is higher than or equal to its Comparison Accuracy Index 650. In a further example, bias can be used to resolve deadlock situations where Comparison Accuracy Index 650 is equal to a weight of a Connection 853. In some aspects, bias can be expressed in percentages such as 0.3 percent, 1.2 percent, 25.7 percent, 79.8 percent, 99.9 percent, 100.1 percent, 155.4 percent, 298.6 percent, 1105.5 percent, and so on. For example, a bias below 100 percent decreases an input or parameter to which it is applied, a bias equal to 100 percent does not change the input or parameter to which it is applied, and a bias higher than 100 percent increases the input or parameter to which it is applied. In general, any amount of bias can be utilized. Bias can be applied to one or more of a weight of a Connection 853, Comparison Accuracy Index 650, any other input or parameter, and/or all or any combination of them. Also, different biases can be applied to each of a weight of a Connection 853, Comparison Accuracy Index 650, or any other input or parameter. For example, 30 percent bias can be applied to Comparison Accuracy Index 650 and 15 percent bias can be applied to a weight of a Connection 853. Also, different biases can be applied to various Layers 854 of Neural Network 850, and/or other disclosed elements. Bias can be set by a user, by UAIE administrator, or automatically by the system.

Any other technique, input, and/or parameter can be utilized in selecting Operations 610 in a path through the comparative or other Layers 854 of Neural Network 850.

Once the path through comparative Layers 854 of Neural Network 850 is known, Decision-making Unit 540 may then utilize highest weight Connections 853 in deciding which path of Operations 610 to follow through anticipatory Layers 854 of Neural Network 850, for example. Any of the previously described techniques, inputs, and/or parameters such as weights of Connections 853, bias, and/or other inputs or parameters can be utilized as applicable in selecting Operations 610 in the path through anticipatory Layers 854 of Neural Network 850.

Figure 39:
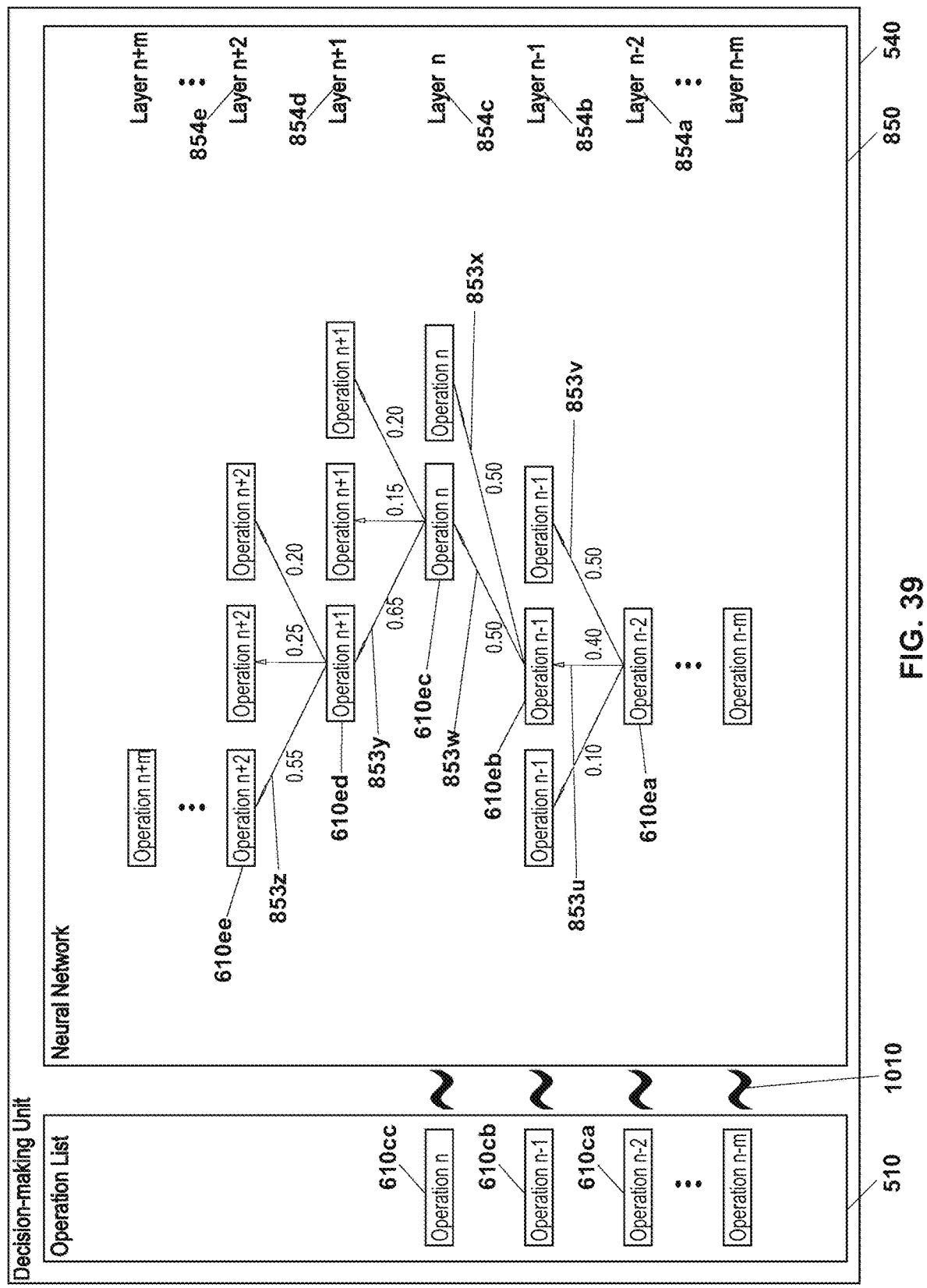
FIG. 39 illustrates an exemplary embodiment of selecting a path of Operations 610 through Neural Network 850.

Referring to FIG. 39, an exemplary embodiment of selecting a path of Operations 610 through Neural Network 850 is illustrated. Decision-making Unit 540 can receive a current Operation List 510. Decision-making Unit 540 may first select a path of Operations 610 through comparative Layers 854 of Neural Network 850. A bias of 110 percent can be applied to increase Comparison Accuracy Indexes 650 of Operations 610 in comparative Layers 854 of Neural Network 850, for example. Decision-making Unit 540 can perform Substantial Similarity Comparisons 1010 of Operation 610ca from Operation List 510 with one or more Operations 610 in corresponding Layer 854a. Operation 610ea from Layer 854a may be found substantially similar to Operation 610ca from Operation List 510 with the highest Comparison Accuracy Index 650 and selected as the initial Operation 610 in the path. Decision-making Unit 540 can then perform Substantial Similarity Comparisons 1010 of Operation 610cb from Operation List 510 with one or more Operations 610 in corresponding Layer 854b connected with Operation 610ea. Operation 610eb from Layer 854b may be found substantially similar to Operation 610cb from Operation List 510 with the highest Comparison Accuracy Index 650 of 0.48, for example. Operation 610eb is selected as the next Operation 610 in the path since bias-adjusted Comparison Accuracy Index 650 of 0.48*1.1=0.528 is higher than the highest weight 0.50 of Connection 853v, even though Connection 853u of Operation 610eb has a lower weight than Connection 853v. This is an example of how a higher Comparison Accuracy Index 650 or adjusted Comparison Accuracy Index 650 can be used to override the highest weight Connection 853 in choosing an Operation 610 in the path. Decision-making Unit 540 can then perform Substantial Similarity Comparisons 1010 of Operation 610cc from Operation List 510 with one or more Operations 610 in corresponding Layer 854c connected with Operation 610eb. Operation 610ec from Layer 854c may be found substantially similar to Operation 610cc from Operation List 510 with the highest Comparison Accuracy Index 650. Operation 610ec is selected as the next Operation 610 in the path since the weight of Connection 853w is equal to the only other Connection 853x originating from Operation 610eb. This is an example of how Comparison Accuracy Index 650 or adjusted Comparison Accuracy Index 650 can be used to resolve a deadlock in equal weights of Connections 853. Decision-making Unit 540 may then select a path of Operations 610 through anticipatory Layers 854 of Neural Network 850. Decision-making Unit 540 may follow Connection 853y with the highest weight leading to Operation 610ed in Layer 854d. Decision-making Unit 540 may then follow Connection 853z with the highest weight leading to Operation 610ee in Layer 854e. Decision-making Unit 540 may implement similar logic or process for any additional Operations 610 in any additional Layers 854 beyond Layer 854e. In some aspects, at each selected Operation 610 in the path through the Layers 854 of Neural Network 850, Decision-making Unit 540 can append a currently selected Operation 610 to a collection of previously selected Operations 610 to assemble a Substantially Similar Path 855 (later described).

The foregoing provides an example of utilizing a combination of weights of Connections 853, Comparison Accuracy Index 650, and bias. It should be understood that any of these techniques, inputs, and/or parameters can be omitted, used in a different combination, or used in combination with other inputs or parameters, in which case the path of Operations 610 through Neural Network 850 would be affected accordingly. In one example, weights of Connections 853 may not be used at all in selecting a path through comparative Layers 854, in which case Comparison Accuracy Index 650 can be solely utilized for deciding which Operations 610 to select in the path. In another example, weights of Connections 853 can be used solely in selecting a path through anticipatory Layers 854 as previously described. In a further example, bias can be omitted in selecting a path through comparative Layers 854, in which case unadjusted Comparison Accuracy Indexes 650 and/or weights of Connections 853 can be utilized for deciding which Operations 610 to select in the path. Any other techniques, inputs, and/or parameters can be utilized to affect the choice of Operations 610 in a path through Neural Network 850. In some aspects, more than one path through Neural Network 850 can be considered or selected using the above-described technique or process, in which case Decision-making Unit 540 may choose the most substantially similar of the considered or selected paths.

In some embodiments, in the case that Operations 610 from Operation List 510 were stored into Neural Network 850 collectively as separate sequences or paths, Decision-making Unit 540 can consider multiple possible separate paths or sequences of Operations 610 in Neural Network 850. In one example, Decision-making Unit 540 can perform Substantial Similarity Comparisons 1010 of a number of most recently used or executed Operations 610 (i.e. Operation n, Operation n−1, Operation n−2, etc.) from Operation List 510 with interconnected Operations 610 from corresponding comparative Layers 854 (i.e. Layer n, Layer n−1, Layer n−2, etc.) of Neural Network 850. There may exist multiple separate substantially similar paths since each path of Operations 610 through comparative Layers 854 includes a separate sequence of Operations 610 that may not be cross-connected with Operations 610 in other paths. Decision-making Unit 540 can then select (i.e. using highest Comparison Accuracy Index 650, etc.) the most substantially similar path from the separate substantially similar paths. Subsequent Operations 610 can then be anticipated in the anticipatory Operations 610 (i.e. Operation n+1, Operation n+2, etc.) of the selected separate substantially similar path (i.e. Substantially Similar Path 855, etc.).

In another example where Operations 610 from Operation List 510 were stored into Neural Network 850 collectively as separate sequences or paths, Decision-making Unit 540 can perform Substantial Similarity Comparisons 1010 of an initial Operation 610 (i.e. Operation n, etc.) from Operation List 510 with one or more Operations 610 from a corresponding comparative Layer 854 (i.e. Layer n, etc.) of Neural Network 850. Decision-making Unit 540 may find multiple Operations 610 from the corresponding comparative Layer 854 that are substantially similar to the initial Operation 610 (i.e. Operation n, etc.) from Operation List 510. Decision-making Unit 540 can then perform Substantial Similarity Comparisons 1010 of a next Operation 610 (i.e. Operation n−1, etc.) from Operation List 510 with one or more interconnected Operations 610 from a corresponding comparative Layer 854 (i.e. Layer n−1, etc.) of Neural Network 850, and so on. This is an example of how Operations 610 from Operation List 510 may be processed or compared from the most recent one to the least recent one and/or how Neural Network 850 or a portion thereof can be traversed backward in the decision-making process. At each Substantial Similarity Comparison 1010, if an Operation 610 from a corresponding comparative Layer 854 is found not to be substantially similar to the compared Operation 610 from Operation List 510, the entire separate sequence or path comprising the non-matching Operation 610 can be removed from consideration of being a substantially similar path. Therefore, each Substantial Similarity Comparison 1010 may reduce the number of potential separate substantially similar paths. At the end of the process, if more than one separate substantially similar paths remain, Decision-making Unit 540 can select (i.e. using highest Comparison Accuracy Index 650, etc.) the most substantially similar path from the separate substantially similar paths. Subsequent Operations 610 can then be anticipated in anticipatory Operations 610 (i.e. Operation n+1, Operation n+2, etc.) of the selected separate substantially similar path (i.e. Substantially Similar Path 855, etc.). In some designs, similar techniques as the above-described can be utilized in selecting a previously described Substantially Similar Knowledge Cell 1110.

Figure 40:
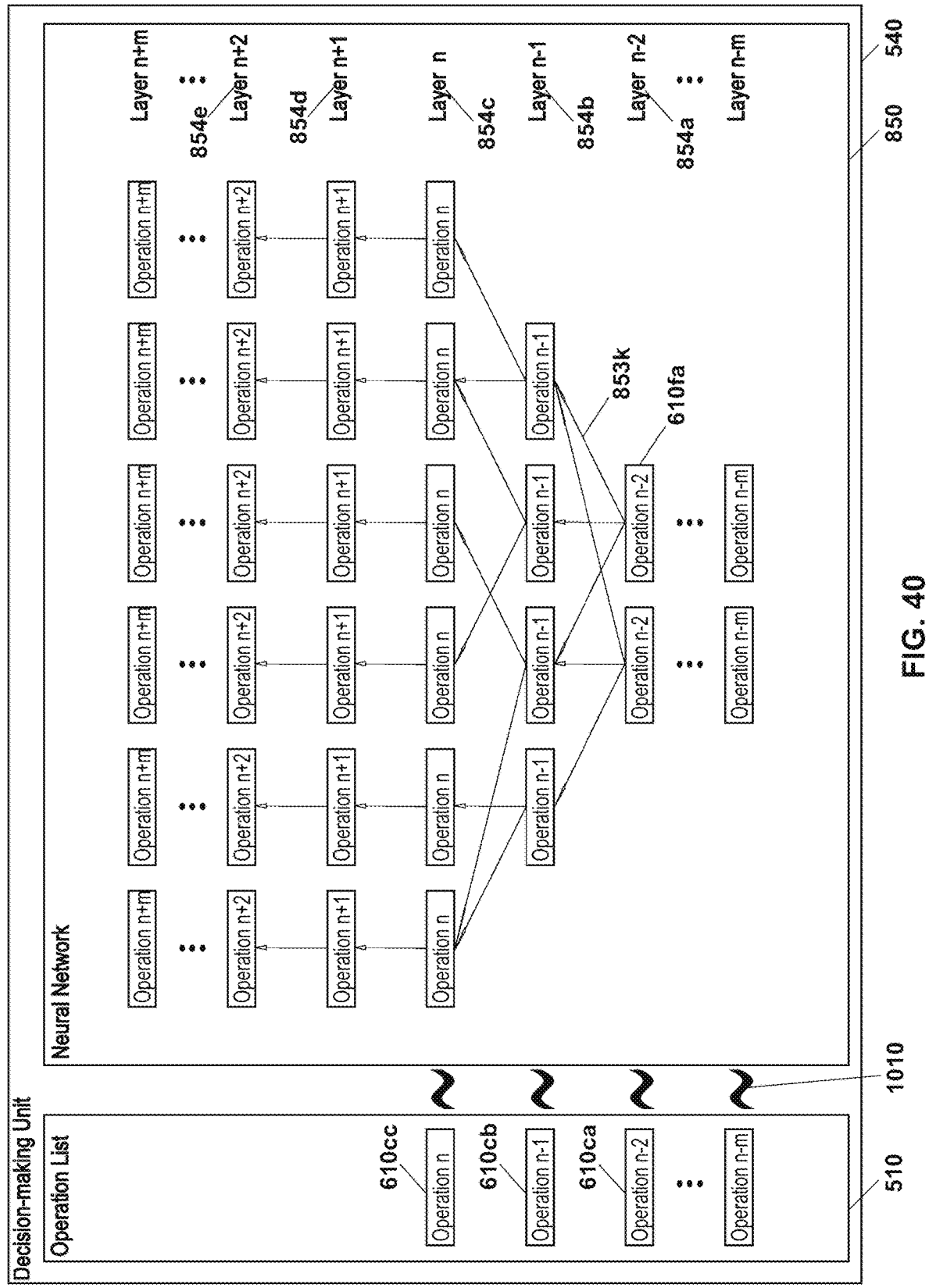
FIG. 40 illustrates another embodiment of Decision-making Unit 540 anticipating Operations 610 or Instruction Sets 600 utilizing Neural Network 850.

Referring to FIG. 40, an embodiment of Decision-making Unit 540 anticipating Operations 610 or Instruction Sets 600 utilizing Neural Network 850 is illustrated. In some aspects, the most recent Operations 610 from Operation List 510 were stored into Neural Network 850 first and the least recent Operations 610 from Operation List 510 were applied onto Neural Network 850 last (i.e. Operations 610 were applied from the most recent one to the least recent one, etc.) in the previously described learning process. Also, the most recent Operations 610 from Operation List 510 were stored into corresponding anticipatory Layers 854 of Neural Network 850 collectively as separate sequences or paths, and the least recent Operations 610 from Operation List 510 were applied onto corresponding comparative Layers 854 of Neural Network 850 individually, for example. In some implementations, Decision-making Unit 540 can perform Substantial Similarity Comparisons 1010 of a number of most recently used or executed Operations 610 (i.e. Operation n, Operation n−1, Operation n−2, etc.) from Operation List 510 with Operations 610 from corresponding comparative Layers 854 (i.e. Layer n, Layer n−1, Layer n−2, etc.) of Neural Network 850. If a substantially similar pattern of most recently used or executed Operations 610 from Operation List 510 is found in comparative Layers 854 of Neural Network 850, subsequent Operations 610 can be anticipated in Operations 610 (i.e. Operation n+1, Operation n+2, etc.) from anticipatory Layers 854 (i.e. Layer n+1, Layer n+2, etc.) of Neural Network 850.

Various techniques, inputs, and/or parameters can be utilized in selecting Operations 610 in a path through comparative Layers 854 of Neural Network 850. In some aspects, Decision-making Unit 540 can start by determining substantial similarity between an initial Operation 610 (i.e. Operation n, etc.) from Operation List 510 and one or more Operations 610 (i.e. Operations n, etc.) from a corresponding comparative Layer 854 (i.e. Layer n, etc.) of Neural Network 850. Decision-making Unit 540 can then perform Substantial Similarity Comparisons 1010 of a next Operation 610 (i.e. Operation n−1, etc.) from Operation List 510 with one or more Operations 610 (i.e. Operations n−1, etc.) from a corresponding comparative Layer 854 (i.e. Layer n−1, etc.) of Neural Network 850, and so on. This is an example of how Operations 610 from Operation List 510 may be processed or compared from the most recent one to the least recent one and/or how Neural Network 850 or a portion thereof can be traversed backward in the decision-making process. Any Operation 610 from Operation List 510 can be used as the initial one to be compared with Operations 610 from corresponding Layers 854 in Neural Network 850.

In some aspects, Decision-making Unit 540 may limit Substantial Similarity Comparisons 1010 to only include Operations 610 from comparative Layers 854 that are interconnected by Connections 853. All features, functionalities, and embodiments of the previously described Connection 853 can be utilized in such implementations. In other aspects, Decision-making Unit 540 may perform Substantial Similarity Comparisons 1010 of an Operation 610 from Operation List 510 with one or more interconnected Operations 610 from a corresponding comparative Layer 854 of Neural Network 850, and utilize the previously described Comparison Accuracy Index 650 in deciding which Operation 610 to select in the path through comparative Layers 854 as previously described. In further aspects, Decision-making Unit 540 can utilize a bias to adjust weight of a Connection 853, Comparison Accuracy Index 650, and/or other input or parameter used in selecting Operations 610 in a path through comparative Layers 854 of Neural Network 850 as previously described. Any other technique, input, and/or parameter can be utilized in selecting Operations 610 in a path through the comparative or other Layers 854 of Neural Network 850. In some aspects, more than one path through comparative Layers 854 of Neural Network 850 can be considered or selected using the above-described techniques, in which case Decision-making Unit 540 may choose the most substantially similar of the considered or selected paths.

Once the path through comparative Layers 854 of Neural Network 850 is known, Decision-making Unit 540 may then utilize sole Connections 853 in selecting a separate sequence or path of Operations 610 through anticipatory Layers 854 of Neural Network 850.

Figure 41:
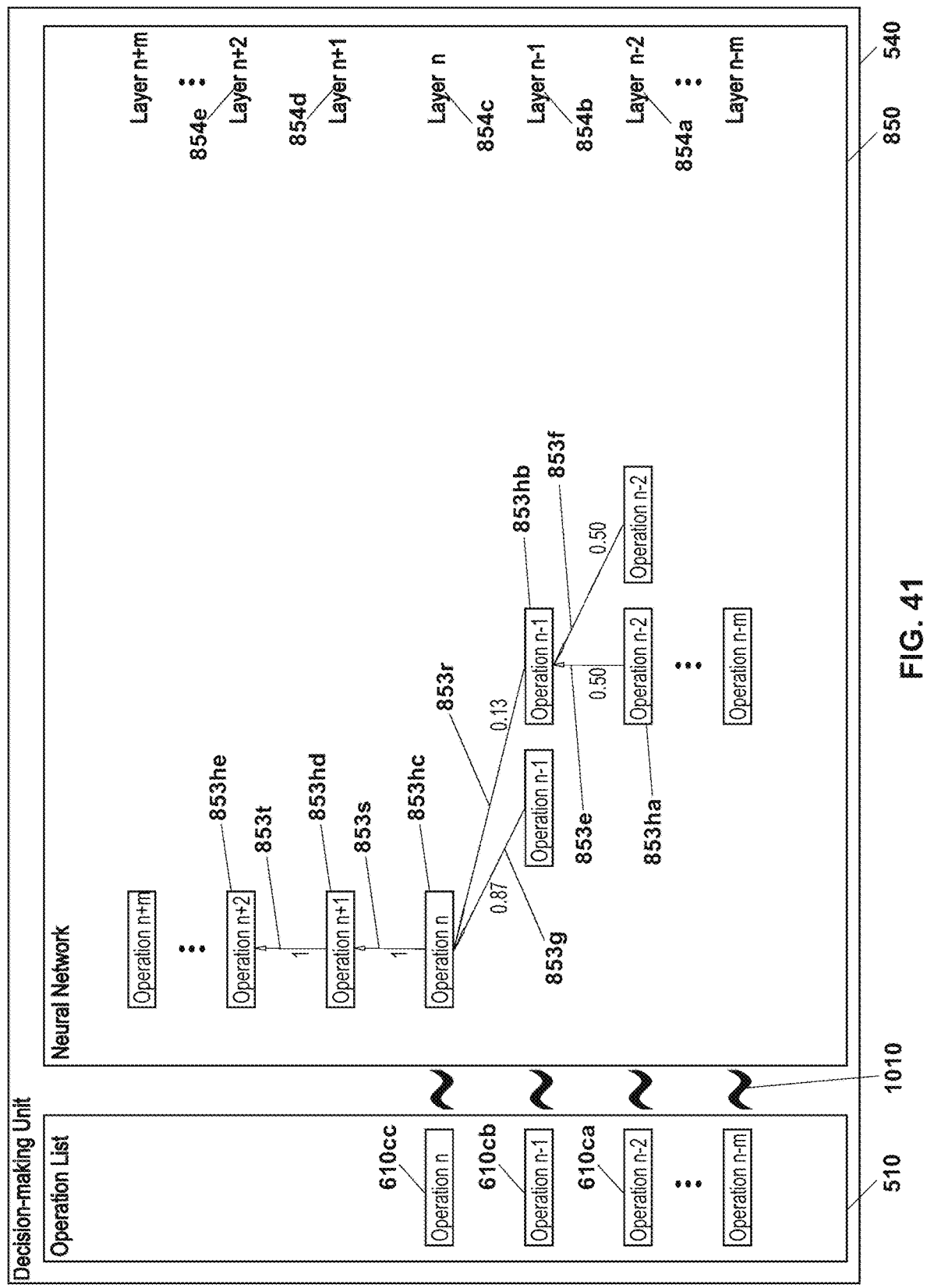
FIG. 41 illustrates another exemplary embodiment of selecting a path of Operations 610 through Neural Network 850.

Referring to FIG. 41, an exemplary embodiment of selecting a path of Operations 610 through Neural Network 850 is illustrated. Decision-making Unit 540 can receive a current Operation List 510. Decision-making Unit 540 may first select a path of Operations 610 through comparative Layers 854 of Neural Network 850. Weights of Connections 853 may be disregarded (and, therefore, optionally omitted from the system, etc.) in the selection of a path through Neural Network 850, for example. A minimum Comparison Accuracy Index 650 of 0.84 may be utilized for comparative Layer 854c, for example. Also, a minimum Comparison Accuracy Index 650 of 0.80 may be utilized for comparative Layer 854b, for example. Further, a minimum Comparison Accuracy Index 650 of 0.76 may be utilized for comparative Layer 854a, for example. Decision-making Unit 540 can perform Substantial Similarity Comparisons 1010 of Operation 610cc from Operation List 510 with one or more Operations 610 in corresponding Layer 854c. Operation 610hc from Layer 854c may be found substantially similar to Operation 610cc from Operation List 510 with the highest Comparison Accuracy Index 650 of 0.85, for example. Operation 610hc is selected as the initial Operation 610 in the path through comparative Layers 854 since Comparison Accuracy Index 650 of 0.85 is higher than the minimum Comparison Accuracy Index 650 of 0.84 required for comparative Layer 854c. Decision-making Unit 540 can then perform Substantial Similarity Comparisons 1010 of Operation 610cb from Operation List 510 with one or more Operations 610 in corresponding Layer 854b connected with Operation 610hc. Operation 610hb from Layer 854b may be found substantially similar to Operation 610cb from Operation List 510 with the highest Comparison Accuracy Index 650 of 0.82, for example. Operation 610hb is selected as the next Operation 610 in the path through comparative Layers 854 since Comparison Accuracy Index 650 of 0.82 is higher than the minimum Comparison Accuracy Index 650 of 0.80 required for comparative Layer 854b. Since weights of Connections 853 are disregarded in this example, higher weight of Connection 853g than the weight of Connection 853r has no effect. Decision-making Unit 540 can then perform Substantial Similarity Comparisons 1010 of Operation 610ca from Operation List 510 with one or more Operations 610 in corresponding Layer 854a. Operation 610ha from Layer 854a may be found substantially similar to Operation 610ca from Operation List 510 with the highest Comparison Accuracy Index 650 of 0.80, for example. Operation 610ha is selected as the next Operation 610 in the path through comparative Layers 854 since Comparison Accuracy Index 650 of 0.80 is higher than the minimum Comparison Accuracy Index 650 of 0.76 required for comparative Layer 854c. Decision-making Unit 540 may then select a path of Operations 610 through anticipatory Layers 854 of Neural Network 850. Decision-making Unit 540 may follow the sole Connection 853s leading to Operation 610hd in Layer 854d. Decision-making Unit 540 may then follow the sole Connection 853t leading to Operation 610he in Layer 854e. Decision-making Unit 540 may implement similar logic or process for any additional Operations 610 in any additional Layers 854 beyond Layer 854e. In some aspects, at each selected Operation 610 in the path through the Layers 854 of Neural Network 850, Decision-making Unit 540 can append a currently selected Operation 610 (i.e. according to its order or Layer 854 in Neural Network 850, etc.) to a collection of previously selected Operations 610 to assemble a Substantially Similar Path 855 (later described).

Figure 42:
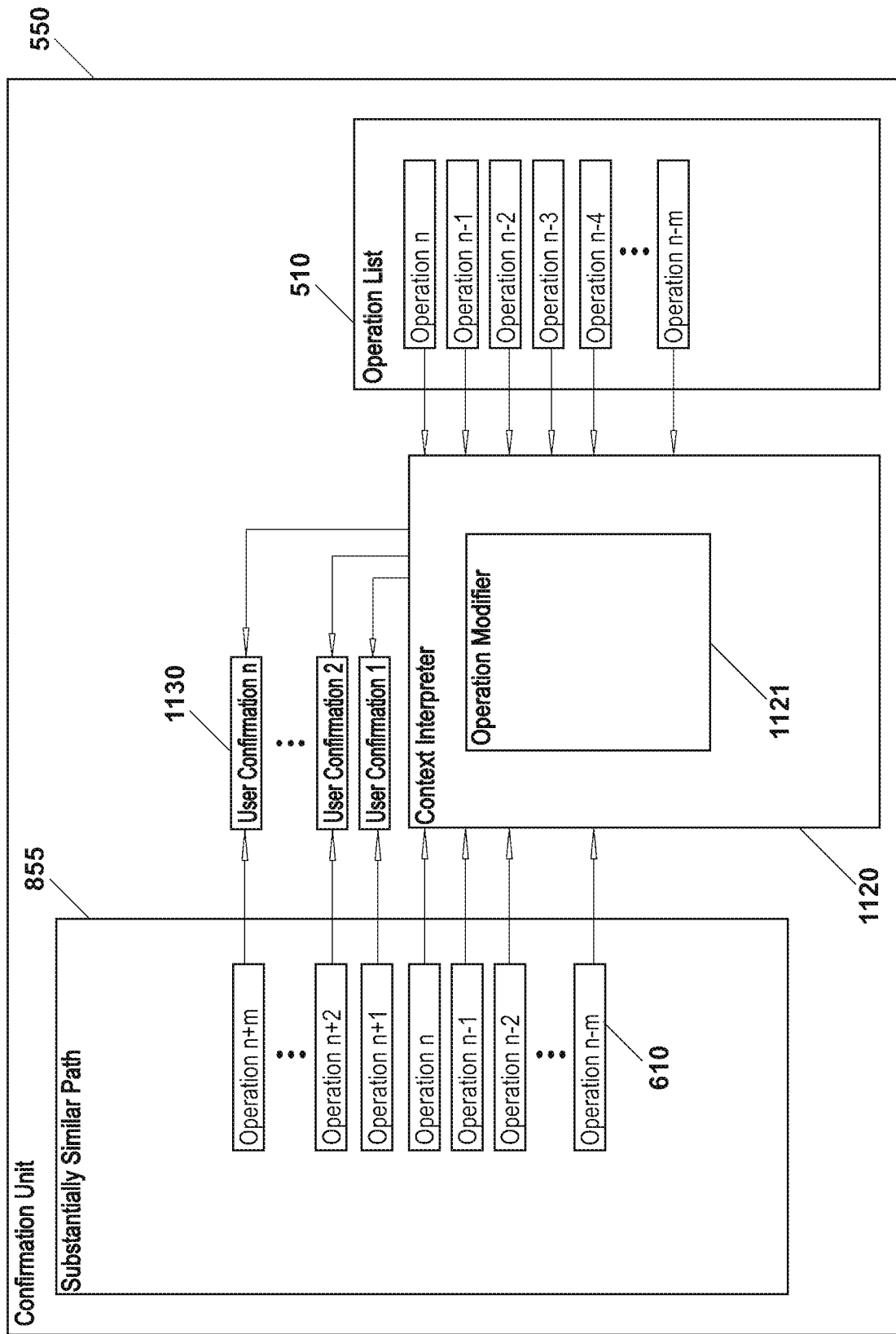
FIG. 42 illustrates an embodiment of Confirmation Unit 550 comprising Substantially Similar Path 855.

Referring to FIG. 42, an embodiment of Confirmation Unit 550 comprising Substantially Similar Path 855 is illustrated. Confirmation Unit 550 comprises Substantially Similar Path 855, Context Interpreter 1120, Operation Modifier 1121, User Confirmation 1130, and Operation List 510. Other additional elements can be included as needed, or some of the disclosed ones can be excluded, or a combination thereof can be utilized in alternate embodiments.

Substantially Similar Path 855 comprises the functionality for storing Operations 610 selected in a path through Neural Network 850, and/or other functionalities. Substantially Similar Path 855 comprises any features, functionalities, and embodiments of the previously described Substantially Similar Knowledge Cell 1110. In some embodiments, a Node 852 comprising an Operation 610 may include a function (i.e. transformation function, etc.) such as a function that appends a currently selected Operation 610 to a collection of previously selected Operations 610 in a path through Neural Network 850. For example, such append function can assemble a list or path (i.e. Substantially Similar Path 855, etc.) of selected Operations 610 while Decision-making Unit 540 traverses Operations 610 through the Layers 854 of Neural Network 850.

In some embodiments, Confirmation Unit 550 can serve as a means of evaluating or rating anticipatory Operations 610 or Instruction Sets 600 if they matched the indented operation of User 50 as previously described. A rating can be stored in the rated anticipatory Operation 610 or Instruction Set 600, in Extra info 630 of the rated anticipatory Operation 610 or Instruction Set 600, in a rated Substantially Similar Path 855, in a neuron or Node 852 of Neural Network 850, and/or in other repository for improvement of future anticipation or matching. In one example, rating of an Operation 610 or Instruction Set 600 can be associated with and/or stored in a neuron or Node 852 comprising the rated Operation 610 or Instruction Set 600 for improvement of future anticipation or matching. In another example, rating of an Operation 610 or Instruction Set 600 may affect (i.e. increase or decrease, etc.) occurrence count and/or weight of a Connection 853 of a neuron or Node 852 comprising the rated Operation 610 or Instruction Set 600, thereby adjusting or fine-tuning the Connection's 853 ability to anticipate the rated Operation 610 or Instruction Set 600 in the future. Any combination of rating and other techniques, inputs, and/or parameters can also be utilized.

In other embodiments, Confirmation Unit 550 can serve as a means of canceling anticipatory Operations 610 or Instruction Sets 600 if they did not match the indented operation of User 50 as previously described. In one example, canceling of an Operation 610 or Instruction Set 600 can be recorded and/or affect a particular Operation's 610 or Instruction Set's 600 rating, which can be used for improved anticipation or matching in the future. In another example, canceling of an Operation 610 or Instruction Set 600 may affect (i.e. reduce) occurrence count and/or weight of a Connection 853 of a neuron or Node 852 comprising the canceled Operation 610 or Instruction Set 600, thereby adjusting or fine-tuning the Connection's 853 ability to anticipate the canceled Operation 610 or Instruction Set 600 in the future. Any combination of canceling and/or other techniques, inputs, or parameters can also be utilized.

Confirmation Unit 550 comprising Substantially Similar Path 855 may include any features, functionalities, and embodiments of the previously described Confirmation Unit 550 comprising Substantially Similar Knowledge Cell 1110.

Figure 43:
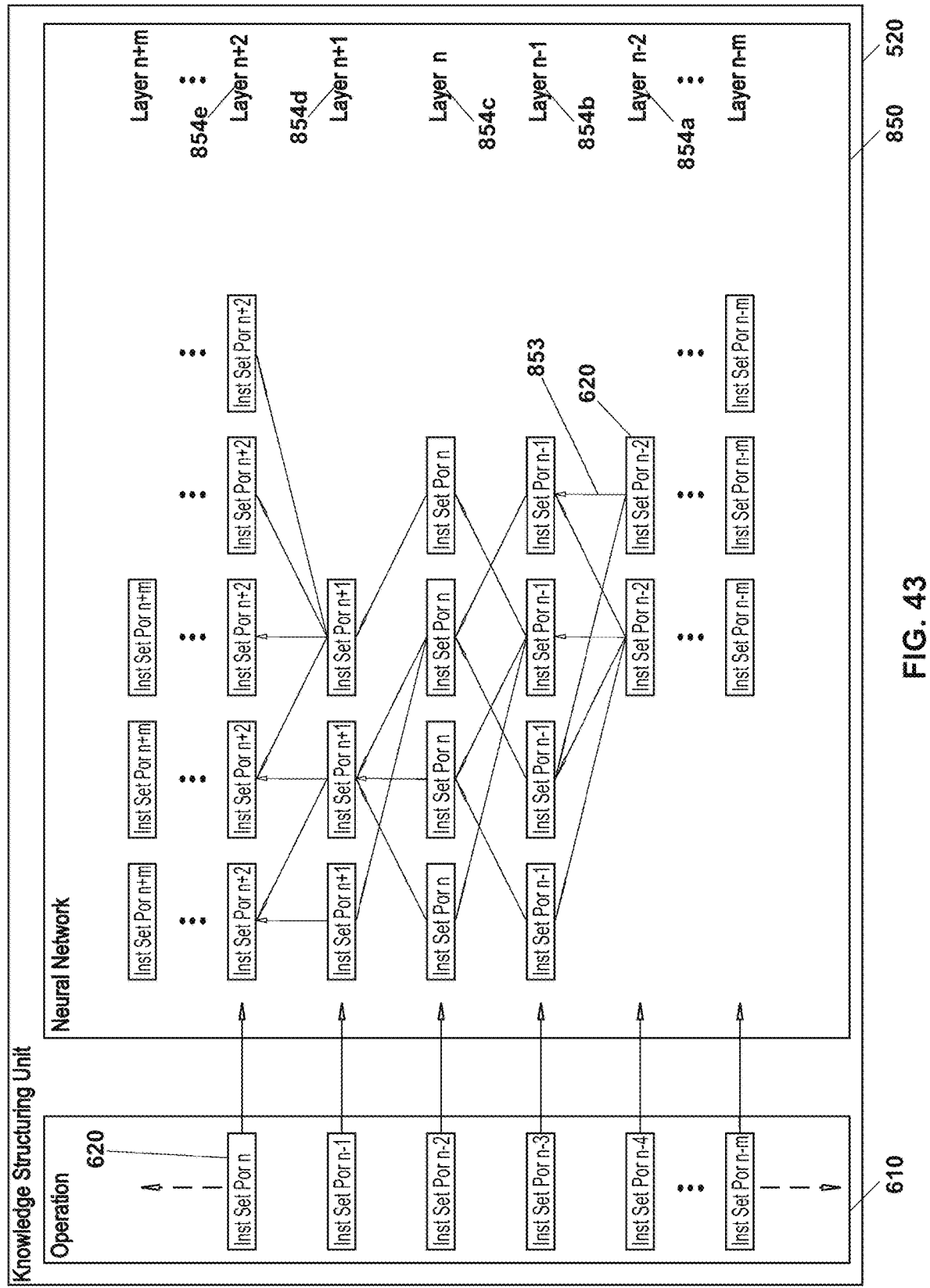
FIG. 43 illustrates an embodiment of Knowledge Structuring Unit 520 learning Instruction Set Portions 620 utilizing Neural Network 850.

Referring to FIG. 43, an embodiment of Knowledge Structuring Unit 520 learning Instruction Set Portions 620 (also referred to as Inst Set Por 620) utilizing Neural Network 850 is illustrated. Similar to the previously described Neural Network 850 comprising Operations 610, Neural Network 850 comprising Instruction Set Portions 620 includes a number of neurons or Nodes 852 interconnected by Connections 853. Instruction Set Portions 620 are shown instead of Nodes 852 to simplify the illustration as Node 852 includes Instruction Set Portion 620, for example. Therefore, Instruction Set Portions 620 and Nodes 852 can be used interchangeably herein depending on context. Also, Extra Info 630 is not shown to simplify the illustration.

However, it should be understood that a Node 852 may include Extra Info 630 as Operation 610 may include both Instruction Set Portions 620 and Extra Info 630. Therefore, learning and other operations with respect to Instruction Set Portions 620 can be similarly implemented with respect to Extra Info 630. One of ordinary skill in art will understand that Node 852 may include other elements and/or functionalities instead of or in addition to Instruction Set Portion 620 or Extra Info 630. In some designs, Neural Network 850 comprises a number of Layers 854 each of which may include one or more Instruction Set Portions 620 and/or Extra Info 630. Instruction Set Portions 620 or Extra Info 630 in successive Layers 854 can be connected by Connections 853. Connection 853 may include occurrence count and weight as previously described.

In some embodiments, Knowledge Structuring Unit 520 may apply (i.e. copy, store, etc.) the most recent Instruction Set Portions 620 (i.e. Instruction Set Portion n, Instruction Set Portion n−1, etc.) from Operation 610 onto anticipatory Layers 854 (i.e. Layer n+2, Layer n+1, etc.) of Neural Network 850 and apply the least recent Instruction Set Portions 620 (i.e. Instruction Set Portion n−2, Instruction Set Portion n−3, Instruction Set Portion n−4, etc.) from Operation 610 onto comparative Layers 854 (i.e. Layer n, Layer n−1, Layer n−2, etc.) of Neural Network 850, for example. The term apply or applying may refer to storing, copying, inserting, or other similar action, therefore, these terms may be used interchangeably herein depending on context. In some aspects, the least recent Instruction Set Portions 620 may include front-most Instruction Set Portions 620 of an Operation 610 and the most recent Instruction Set Portions 620 may include rear-most Instruction Set Portions 620 of an Operation 610. The Operation 610 may include an Operation 610 or Instruction Set 600 that a user is inputting or has caused to be executed. Specifically, for example, Knowledge Structuring Unit 520 can apply Instruction Set Portion n from Operation 610 onto Layer n+2 of Neural Network 850, apply Instruction Set Portion n−1 from Operation 610 onto Layer n+1 of Neural Network 850, apply Instruction Set Portion n−2 from Operation 610 onto Layer n of Neural Network 850, and so forth. Therefore, Instruction Set Portions 620 with an order number greater than n may become anticipatory Instruction Set Portions 620 in their respective anticipatory Layers 854 and the rest of the Instruction Set Portions 620 may become comparative Instruction Set Portions 620 in their respective comparative Layers 854, although this particular split can differ in alternate embodiments as previously described. Also, as indicated by the up and down vertical dotted arrows, applying Instruction Set Portion n from Operation 610 can start at any Layer 854 of Neural Network 850. This way, the number of comparative and anticipatory Layers 854 can be adjusted for a particular application as previously described.

In some embodiments, Knowledge Structuring Unit 520 receives a current Operation 610 and applies/stores front-most Instruction Set Portions 620 from Operation 610 onto/into Neural Network 850 first and rear-most Instruction Set Portions 620 from Operation 610 last (i.e. apply/store Instruction Set Portions 620 from the front-most one to the rear-most one, etc.), thereby implementing learning of Instruction Set Portions 620 from Operation 610 as previously described. In other embodiments, Knowledge Structuring Unit 520 receives a current Operation 610 and applies/stores rear-most Instruction Set Portions 620 from Operation 610 onto/into Neural Network 850 first and front-most Instruction Set Portions 620 from Operation 610 last (i.e. apply/store Instruction Set Portions 620 from the rear-most one to the front-most one, etc.), thereby implementing learning of Instruction Set Portions 620 from Operation 610 as previously described. In further embodiments, Knowledge Structuring Unit 520 can apply Instruction Set Portions 620 from Operation 610 onto Neural Network 850 individually as previously described. In yet further embodiments, Knowledge Structuring Unit 520 can store Instruction Set Portions 620 from Operation 610 into Neural Network 850 collectively as separate sequences or paths as previously described. Any combination of applying Instruction Set Portions 620 from Operation 610 individually and storing Instruction Set Portions 620 from Operation 610 collectively onto/into Neural Network 850 can be implemented in alternate embodiments as previously described.

Figure 44:
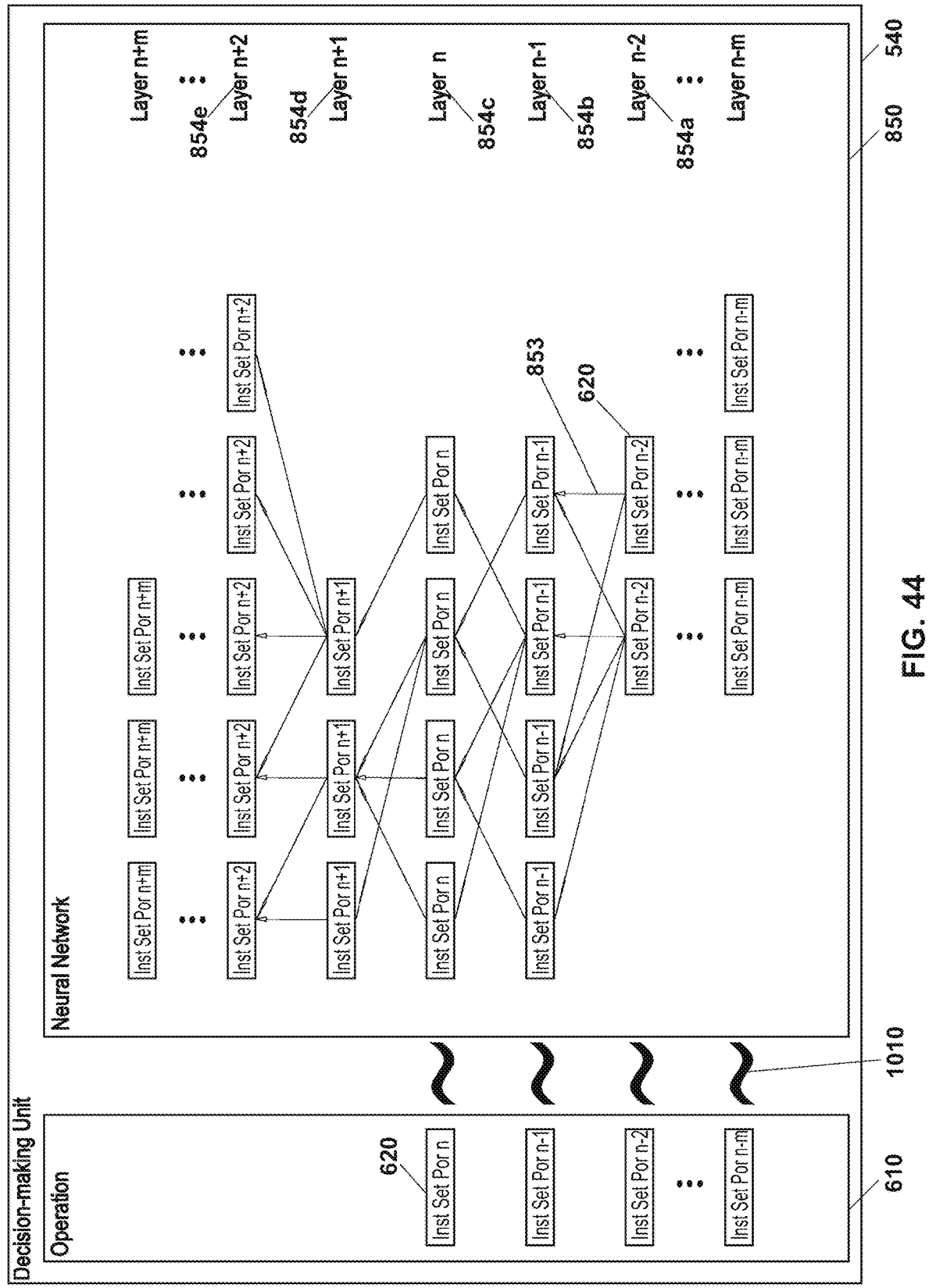
FIG. 44 illustrates an embodiment of Decision-making Unit 540 anticipating Instruction Set Portions 620 utilizing Neural Network 850.

Referring to FIG. 44, an embodiment of Decision-making Unit 540 anticipating Instruction Set Portions 620 utilizing Neural Network 850 is illustrated. In some aspects, Decision-making Unit 540 can perform Substantial Similarity Comparisons 1010 of a number of most recent Instruction Set Portions 620 (i.e. Instruction Set Portion n, Instruction Set Portion n−1, Instruction Set Portion n−2, etc.) from Operation 610 with Instruction Set Portions 620 from corresponding comparative Layers 854 (i.e. Layer n, Layer n−1, Layer n−2, etc.) of Neural Network 850. If a substantially similar pattern of most recent Instruction Set Portions 620 from Operation 610 is found in comparative Layers 854 of Neural Network 850, subsequent Instruction Set Portions 620 can be anticipated in Instruction Set Portions 620 (i.e. Instruction Set Portion n+1, Instruction Set Portion n+2, etc.) from anticipatory Layers 854 (i.e. Layer n+1, Layer n+2, etc.) of Neural Network 850. Therefore, Neural Network 850 comprising Instruction Set Portions 620 can be utilized to anticipate Instruction Set Portions 620 of an Operation 610. For example, as user is inputting Instruction Set Portions 620 of an Instruction Set 600 or Operation 610 such as a SQL statement (i.e. in a manual or form-based database application, etc.), Decision-making Unit 540 can anticipate one or more most likely subsequent Instruction Set Portions 620 that the user may want to use or input. A similar technique can be used for any type of Operation 610 or Instruction Set 600 of any language or code that may be used or inputted in portions. It should be noted that n, m, and/or other such letters or indicia in any of the figures may be different numbers in different elements even where the elements are depicted in the same figure. In general, n, m, and/or other letters or such indicia may follow the immediate sequence and/or context where they are indicated. Therefore, an Instruction Set Portion 620 from Operation 610 having same letter(s) or indicia as an Instruction Set Portion 620 from Neural Network 850 may be a different Instruction Set Portion 620. Also, Instruction Set Portions 620 in a same Layer 854 may be different Instruction Set Portions 620 belonging to that Layer 854.

Any of the previously described techniques, inputs, and/or parameters can be utilized in selecting Instruction Set Portions 620 in a path through comparative Layers 854 of Neural Network 850. In some embodiments, Decision-making Unit 540 can start by determining substantial similarity between an initial Instruction Set Portion 620 (i.e. Instruction Set Portion n−2, etc.) from Operation 610 and one or more Instruction Set Portions 620 (i.e. Instruction Set Portion n−2, etc.) from a corresponding comparative Layer 854 (i.e. Layer n−2, etc.) of Neural Network 850, and traverse the comparative Layers 854 forward as previously described. In other embodiments, Decision-making Unit 540 can start by determining substantial similarity between an initial Instruction Set Portion 620 (i.e. Instruction Set Portion n, etc.) from Operation 610 and one or more Instruction Set Portions 620 (i.e. Instruction Set Portion n, etc.) from a corresponding comparative Layer 854 (i.e. Layer n, etc.) of Neural Network 850, and traverse the comparative Layers 854 backward as previously described. Any Instruction Set Portion 620 from Operation 610 can be used as the initial one to be compared with Instruction Set Portions 620 from corresponding Layers 854 in Neural Network 850. In further embodiments, Decision-making Unit 540 may limit Substantial Similarity Comparisons 1010 to only include Instruction Set Portions 620 from comparative Layers 854 that are interconnected by Connections 853. All features, functionalities, and embodiments of the previously described Connection 853 can be utilized in such implementations. In further embodiments, Decision-making Unit 540 may perform Substantial Similarity Comparisons 1010 of an Instruction Set Portion 620 from Operation 610 with one or more interconnected Instruction Set Portions 620 from a corresponding comparative Layer 854 of Neural Network 850, and utilize the previously described Comparison Accuracy Index 650 in deciding which Instruction Set Portions 620 to select in the path through comparative Layers 854 as previously described. In further embodiments, Decision-making Unit 540 can utilize a bias to adjust weight of a Connection 853, Comparison Accuracy Index 650, and/or other input or parameter used in selecting Instruction Set Portions 620 in a path through the comparative Layers 854 of Neural Network 850 as previously described. Any other technique, input, and/or parameter can be utilized in selecting Instruction Set Portions 620 in a path through the comparative or other Layers 854 of Neural Network 850.

Once the path through comparative Layers 854 of Neural Network 850 is known, Decision-making Unit 540 may utilize highest weight Connections 853 in deciding which path of Instruction Set Portions 620 to follow through anticipatory Layers 854 of Neural Network 850. Also, in the case that Instruction Set Portions 620 in anticipatory Layers 854 of Neural Network 850 were stored as separate sequences or paths, Decision-making Unit 540 may utilize sole Connections 853 in selecting a separate sequence or path of Instruction Set Portions 620 through anticipatory Layers 854 of Neural Network 850. Any of the previously described techniques, inputs, and/or parameters such as weights of Connections 853, bias, and/or other inputs or parameters can be utilized as applicable in selecting Instruction Set Portions 620 in the path through the anticipatory Layers 854 of Neural Network 850.

Neural Network 850 comprising Instruction Set Portions 620 includes any features, functionalities, and embodiments of the previously described Neural Network 850 comprising Operations 610. Also, the operation of Knowledge Structuring Unit 520, Decision-making Unit 540, Confirmation Unit 550, and/or other elements with respect to Neural Network 850 comprising Instruction Set Portions 620 similarly includes any features, functionalities, and embodiments of the previously described operation of Knowledge Structuring Unit 520, Decision-making Unit 540, Confirmation Unit 550, and/or other elements with respect to Neural Network 850 comprising Operations 610.

Figure 45:
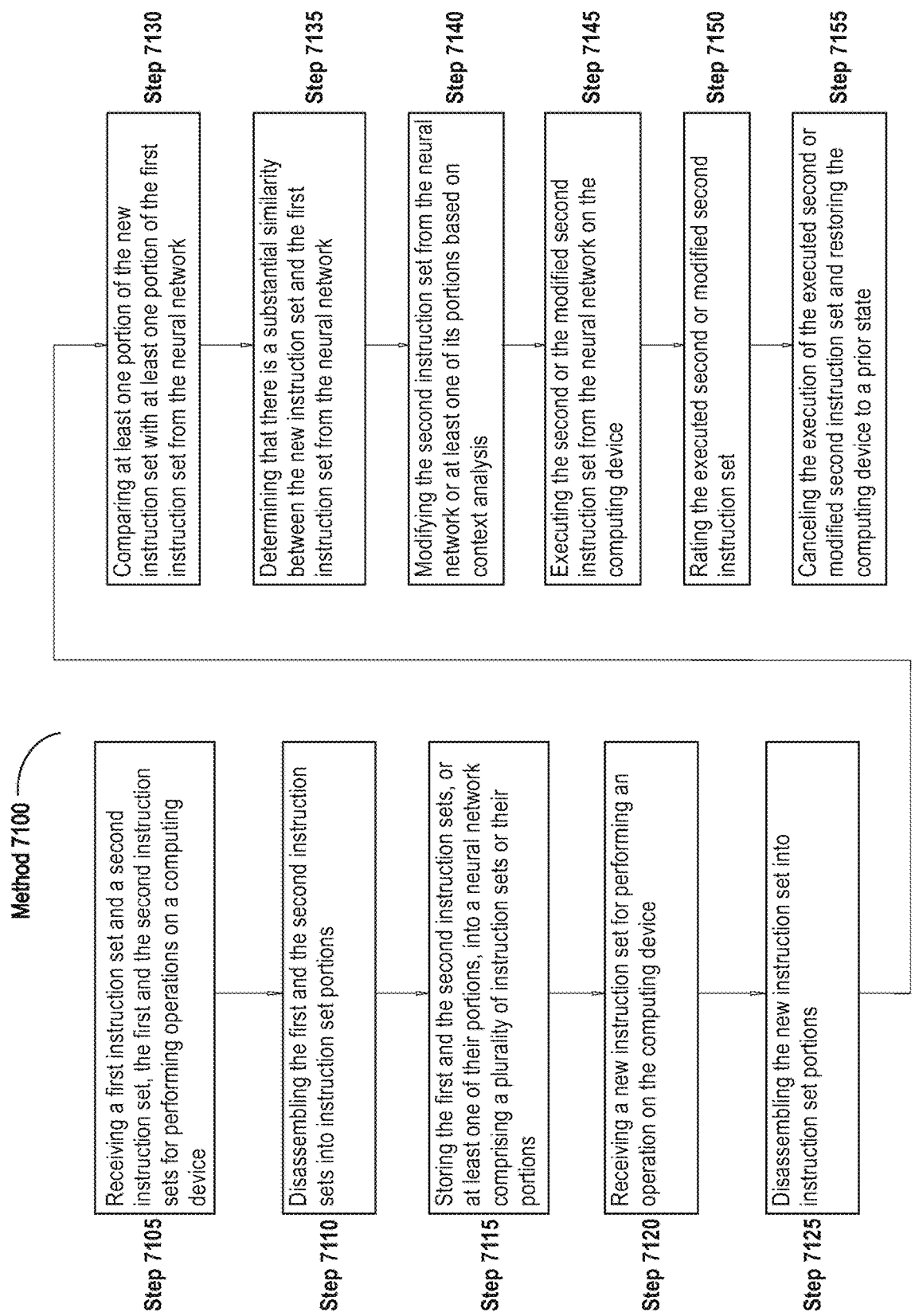
FIG. 45 shows a flow chart diagram of an embodiment of a method 7100 implemented by UAIE.

Referring to FIG. 45, the illustration shows an embodiment of a method 7100 for autonomous application operating based on UAIE functionalities. The method can therefore be used on a computing device to enable autonomous operation of the application with partial, minimal, or no user input. In some embodiments, the method can be used on a computing device operating an interface for UAIE that enables autonomous operation of the application with partial, minimal, or no user input. Method 7100 may include some or all the actions, operations, and embodiments of the previously described method 6100. Due to similarity in some aspects of method 7100 and method 6100, the forthcoming description of method 7100 will be directed to differences between the two methods. Method 7100 may also include any action or operation of any of the other disclosed methods such as, for example, methods 7200, 7300, 7400, and/or others. Other additional steps, actions, or operations can be included as needed, or some of the disclosed ones can be optionally omitted, or a different order thereof can be implemented in alternate embodiments of method 7100.

At step 7105, a first instruction set and a second instruction set are received, the first and the second instruction sets for performing operations on a computing device. Step 7105 may include any action or operation described in step 6105 of method 6100 as applicable, wherein, neural network (i.e. Neural Network 850, etc.) can be utilized instead of knowledgebase (i.e. Knowledgebase 530, etc.).

At step 7110, the first and the second instruction sets are disassembled into instruction set portions. Step 7110 may include any action or operation described in step 6110 of method 6100 as applicable, wherein, neural network can be utilized instead of knowledgebase.

At step 7115, the first and the second instruction sets, or at least one of their portions, are stored into a neural network comprising a plurality of instruction sets or their portions. Step 7115 may include any action or operation described in step 6115 of method 6100 as applicable, wherein, neural network can be utilized instead of knowledgebase. In some implementations, the first and the second instruction sets, or at least one of their portions, can be stored in the neural network so that the first instruction set or at least one of its portions is followed by the second instruction set or at least one of its portions. In other implementations, no such arrangement or relationship between the first and the second instruction sets, or at least one of their portions, is required, and the first and the second instruction sets, or at least one of their portions, can be stored in any other arrangement in the neural network. In some aspects, neural network (i.e. Neural Network 850, etc.) comprises a number of neurons or nodes (i.e. Nodes 852, etc.) interconnected by connections (i.e. Connections 853, etc.). A neuron or node may include an instruction set (i.e. Instruction Set 600, etc.), instruction set portion (i.e. Instruction Set Portion 620, etc.), and/or other element or data, for example. In some designs, neural network comprises a number of layers (i.e. Layers 854, etc.) each of which may include one or more neurons or nodes. In an embodiment of a layered configuration, neurons or nodes in successive layers can be connected by connections. In general, any neurons or nodes can be connected by connections with any other neurons or nodes in alternate embodiments. A connection may include or be associated with occurrence count and weight, for example, although other parameters or variables can be utilized. For example, a list (i.e. Operation List 510, etc.) of recently executed instruction sets and/or their portions can be applied onto a neural network, thereby implementing learning of the instruction sets and/or their portions. Substantial similarity comparisons (i.e. Substantial Similarity Comparisons 1010, etc.) can be performed of an instruction set in the list of recently executed instruction sets with one or more instruction sets in a corresponding layer of the neural network. If substantially similar instruction set is found in the corresponding layer, occurrence count and weight of connection to that instruction set from an instruction set in a prior layer can be updated. Any other connections of the instruction set in the prior layer may also be updated. On the other hand, if a substantially similar instruction set is not found, the instruction set from the list of recently executed instruction sets can be inserted (i.e. copied, stored, etc.) into the corresponding layer of the neural network, and a connection to that instruction set can be created from an instruction set in a prior layer including assigning an occurrence count to the new connection and calculating a weight of the new connection. Any other connections of the instruction set in the prior layer may be updated. Furthermore, inserting an instruction set into a layer of neural network may also include creating a connection between the inserted instruction set and an instruction set in a subsequent layer, thereby fully connecting the inserted instruction set. Creating the connection between the inserted instruction set and an instruction set in the subsequent layer can be performed after the next substantial similarity comparison when the target instruction set from the subsequent layer is determined. In some aspects, the most recent instruction sets (i.e. the second instruction set, etc.) or their portions from a list of recently executed instruction sets can be applied onto anticipatory layers of neural network and the least recent instruction sets (i.e. the first instruction set, etc.) or their portions can be applied onto comparative layers. Therefore, the most recent instruction sets (i.e. the second instruction set, etc.) from the list of recently executed instruction sets may become anticipatory instruction sets in the neural network, whereas, the least recent instruction sets (i.e. the first instruction set, etc.) from the list of recently executed instruction sets may become comparative instruction sets in the neural network. Any of the disclosed storing of instruction sets can also be implemented to store instruction set portions, extra information, and/or any other data or items into the neural network. Storing comprises any action or operation by or for a Neural Network 850, Operation List 510, Knowledge Structuring Unit 520, and/or other disclosed elements.

At step 7120, a new instruction set for performing an operation on the computing device is received. Step 7120 may include any action or operation described in step 7105 or step 6120 of method 6100 as applicable, wherein, neural network can be utilized instead of knowledgebase.

At step 7125, the new instruction set is disassembled into instruction set portions. Step 7125 may include any action or operation described in step 7110 or step 6125 of method 6100 as applicable, wherein, neural network can be utilized instead of knowledgebase.

At step 7130, at least one portion of the new instruction set are compared with at least one portion of the first instruction set from the neural network. Step 7130 may include any action or operation described in step 6130 of method 6100 as applicable, wherein, neural network can be utilized instead of knowledgebase. The first instruction set may be one of plurality of instruction sets stored in the neural network whose portions can be compared with portions of the new instruction set. In some aspects, the at least one portion of the new instruction set can be compared with the at least one portion of instruction sets in comparative layers of the neural network. In one example, substantial similarity comparisons (i.e. Substantial Similarity Comparisons 1010, etc.) can be performed of a number of most recently used or executed instruction sets (i.e. new instruction set, etc.) and/or their portions from a list (i.e. Operation List 510, etc.) of recently executed instruction sets with instruction sets (i.e. first instruction set, etc.) and/or their portions from corresponding comparative layers (i.e. Layers 854, etc.) of the neural network (i.e. Neural Network 850, etc.). In another example, substantial similarity comparisons can be performed of a number of most recently used or executed instruction sets and/or their portions from a list of recently executed instruction sets with interconnected instruction sets and/or their portions from corresponding comparative layers of the neural network. If a substantially similar pattern of most recently used or executed instruction sets from the list of recently executed instruction sets is found in comparative layers of the neural network, subsequent instruction sets can be anticipated in instruction sets (i.e. second instruction set, etc.) from anticipatory layers of the neural network. A substantially similar path (i.e. Substantially Similar Path 855, etc.) may include the instruction sets selected in a path through the comparative and/or anticipatory layers of the neural network.

At step 7135, a determination is made that there is a substantial similarity between the new instruction set and the first instruction set from the neural network. Step 7135 may include any action or operation described in step 6135 of method 6100 as applicable, wherein, neural network can be utilized instead of knowledgebase.

At step 7140, the second instruction set from the neural network or at least one of its portions are modified based on context analysis. Step 7140 may include any action or operation described in step 6140 of method 6100 as applicable, wherein, neural network can be utilized instead of knowledgebase.

At step 7145, the second or the modified second instruction set from the neural network is executed on the computing device. Step 7145 may include any action or operation described in step 6145 of method 6100 as applicable, wherein, neural network can be utilized instead of knowledgebase.

At step 7150, the executed second or modified second instruction set is rated. Step 7150 may include any action or operation described in step 6150 of method 6100 as applicable, wherein, neural network can be utilized instead of knowledgebase. In some aspects, rating of an instruction set can be associated with or stored in a neuron or node comprising the instruction set for improvement of future anticipation or matching. In other aspects, rating of an instruction set may affect (i.e. increase or decrease, etc.) occurrence count and/or weight of a connection of the neuron or node comprising the instruction set, thereby adjusting or fine-tuning the connection's ability to anticipate the instruction set in the future.

At step 7155, the execution of the executed second or modified second instruction set is canceled and the computing device is restored to a prior state. Step 7155 may include any action or operation described in step 6155 of method 6100 as applicable, wherein, neural network can be utilized instead of knowledgebase. In some aspects, canceling of an instruction set can be associated with or stored in a neuron or node comprising the instruction set for improvement of future anticipation or matching. In other aspects, canceling an instruction set may affect (i.e. decrease, etc.) occurrence count and/or weight of a connection of the neuron or node comprising the instruction set, thereby adjusting or fine-tuning the connection's ability to anticipate the instruction set in the future.

Figure 46:
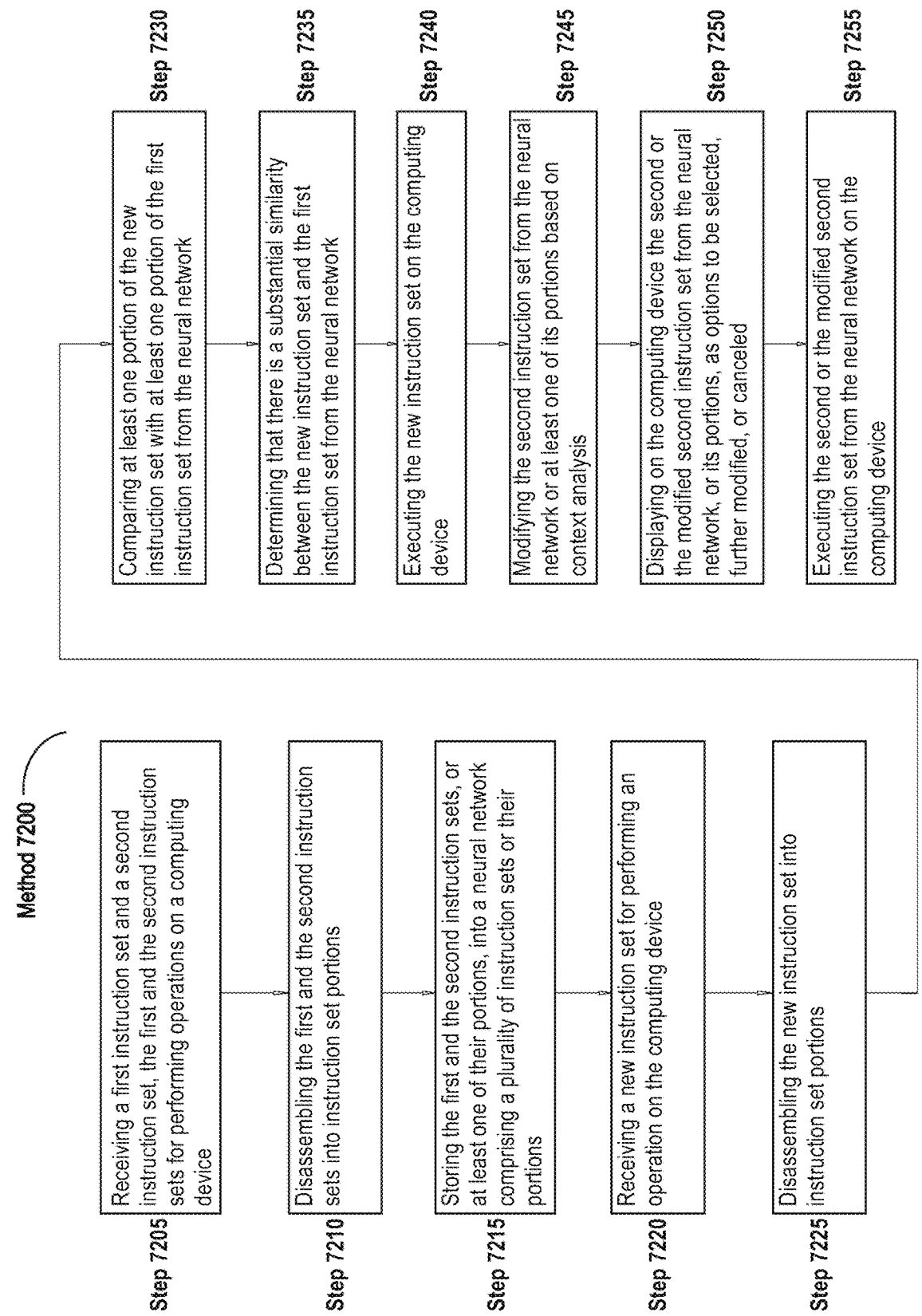
FIG. 46 shows a flow chart diagram of an embodiment of a method 7200 implemented by UAIE.

Referring to FIG. 46, the illustration shows an embodiment of a method 7200 for autonomous application operating based UAIE functionalities. The method can therefore be used on a computing device to enable autonomous operation of the application with partial, minimal, or no user input. In some embodiments, the method may be used on a computing device operating an interface for UAIE that enables autonomous operation of the application with partial, minimal, or no user input. Method 7200 may include any action or operation of any of the disclosed methods such as, for example, methods 7100, 7300, 7400, and/or others. Other additional steps, actions, or operations can be included as needed, or some of the disclosed ones can be optionally omitted, or a different order thereof can be implemented in alternate embodiments of method 7200.

Steps 7205-7235 may include any action or operation described in steps 7105-7135 of method 7100 as applicable.

At step 7240, the new instruction set is executed on the computing device. Step 7240 may include any action or operation described in step 7145 of method 7100 as applicable. In some embodiments, the new instruction set can be executed earlier in the process such as when it is received by UAIE. In other embodiments, the new instruction set can be executed before it is received by UAIE or at any point independent of when it is received by UAIE in which case step 7240 can be omitted.

At step 7245, the second instruction set from the neural network or at least one of its portions are modified based on context analysis. Step 7245 may include any action or operation described in step 7140 of method 7100 as applicable.

At step 7250, the second or the modified second instruction set from the neural network, or its portions, are displayed on the computing device as options to be selected, further modified, or canceled. In some embodiments, the previously automatically modified (if this functionality was enabled and/or if modification was performed, etc.) second instruction set, a copy thereof, and/or its portions can be displayed on the computing device responsive to the determination at step 7235. In some aspects, the previously automatically modified second instruction set, a copy thereof, and/or its portions can be displayed along with one or more anticipatory instruction sets and/or their portions that may immediately follow the second instruction set. The system may include an editor, graphical user interface (GUI), and/or other means through which a user can view and/or manually modify, if user chooses, the previously automatically modified second instruction set and/or its portions. For example, a GUI can be utilized to receive or read the previously automatically modified second instruction set and/or its portions, display (i.e. via text fields, drop-down menus, check boxes, and other GUI components, etc.) the previously automatically modified second instruction set and/or its portions, and ask the user to manually modify the previously automatically modified second instruction set and/or its portions by manipulating GUI components (i.e. changing values in text fields, selecting options in drop-down menus, etc.). In some embodiments, extra or contextual information, and/or other information can be displayed and/or modified by the user as well. In some aspects, user selection of the previously automatically modified second instruction set may effectively serve as user's confirmation of his/her intention to execute the previously modified second instruction set. In other aspects, the user may choose not to approve or implement (i.e. cancel, etc.) any anticipatory instruction sets including the previously modified second instruction set. In yet other aspects, the user may choose to approve or implement some of the anticipatory instruction sets including the previously modified second instruction set, and choose not to approve or implement (i.e. cancel, etc.) others. Depending on the type of application and/or other factors, displaying, selecting, further modifying, and/or canceling can optionally be disabled or omitted in order to provide an uninterrupted operation of the application. For example, a form based application may be suitable for implementing the user confirmation step, whereas, a game is less suitable for implementing such interrupting step due to the real time nature of game playing/execution. Components and/or features of the computing device or its operating system such as display, keyboard, pointing device, touchscreen, microphone, camera, video camera, speech recognition, sound player, video player, tactile input/output device, and/or other components, features, or applications can be utilized to implement the displaying, selecting, further modifying, and/or canceling of the previously automatically modified second instruction set and/or its portions. Displaying, selecting, further modifying, and/or canceling comprise any action or operation by or for Confirmation Unit 550, and/or other disclosed elements. In some aspects, step 7250 may include any action or operation described in steps 7150 and 7155 of method 7100 as applicable.

At step 7255, the second or the modified second instruction set from the neural network is executed on the computing device. Step 7255 may include any action or operation described in step 7145 of method 7100 as applicable.

Figure 47:
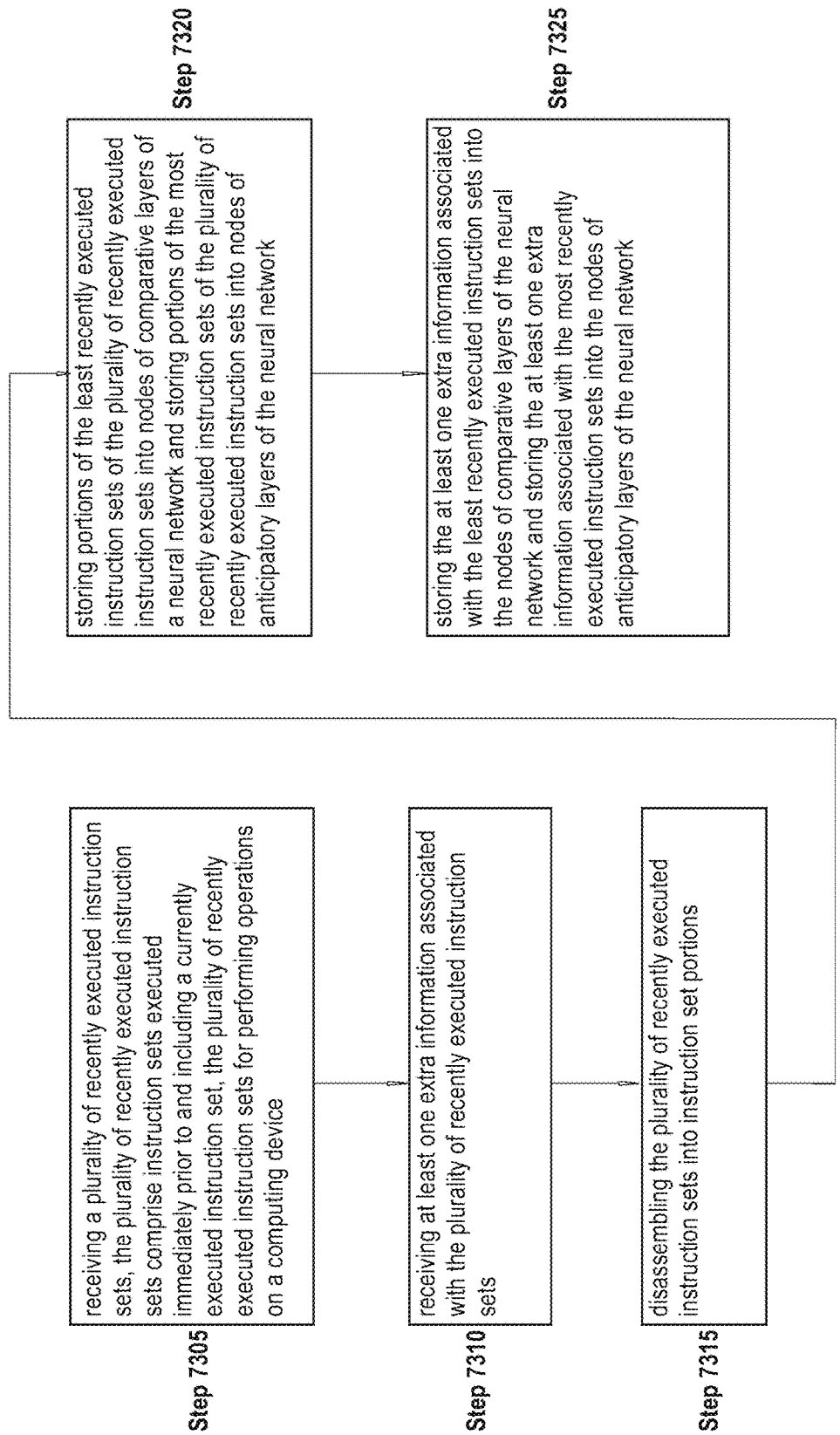
FIG. 47 shows a flow chart diagram of an embodiment of a method 7300 implemented by UAIE.

Referring to FIG. 47, the illustration shows an embodiment of a method 7300 for learning an application's operations based UAIE functionalities. The method can therefore be used on a computing device to structure and/or store knowledge of an application's operations that can be used for anticipation of the application's future operations or autonomous application operating. In some embodiments, the method can be used on a computing device operating an interface for UAIE to structure and/or store knowledge of an application's operations that can be used for anticipation of the application's future operations or autonomous application operating. Method 7300 may include any action or operation of any of the disclosed methods such as, for example, methods 7100, 7200, 7400, and/or others. Other additional steps, actions, or operations can be included as needed, or some of the disclosed ones can be optionally omitted, or a different order thereof can be implemented in alternate embodiments of method 7300.

At step 7305, a plurality of recently executed instruction sets are received, the plurality of recently executed instruction sets comprise instruction sets executed immediately prior to and including a currently executed instruction set, the plurality of recently executed instruction sets for performing operations on a computing device. At step 7310, at least one extra information associated with the plurality of recently executed instruction sets are received. At step 7315, the plurality of recently executed instruction sets are disassembled into instruction set portions. At step 7320, portions of the least recently executed instruction sets of the plurality of recently executed instruction sets are stored into nodes of comparative layers of a neural network and portions of the most recently executed instruction sets of the plurality of recently executed instruction sets are stored into nodes of anticipatory layers of the neural network. At step 7325, the at least one extra information associated with the least recently executed instruction sets are stored into the nodes of comparative layers of the neural network and the at least one extra information associated with the most recently executed instruction sets are stored into the nodes of anticipatory layers of the neural network.

Figure 48:
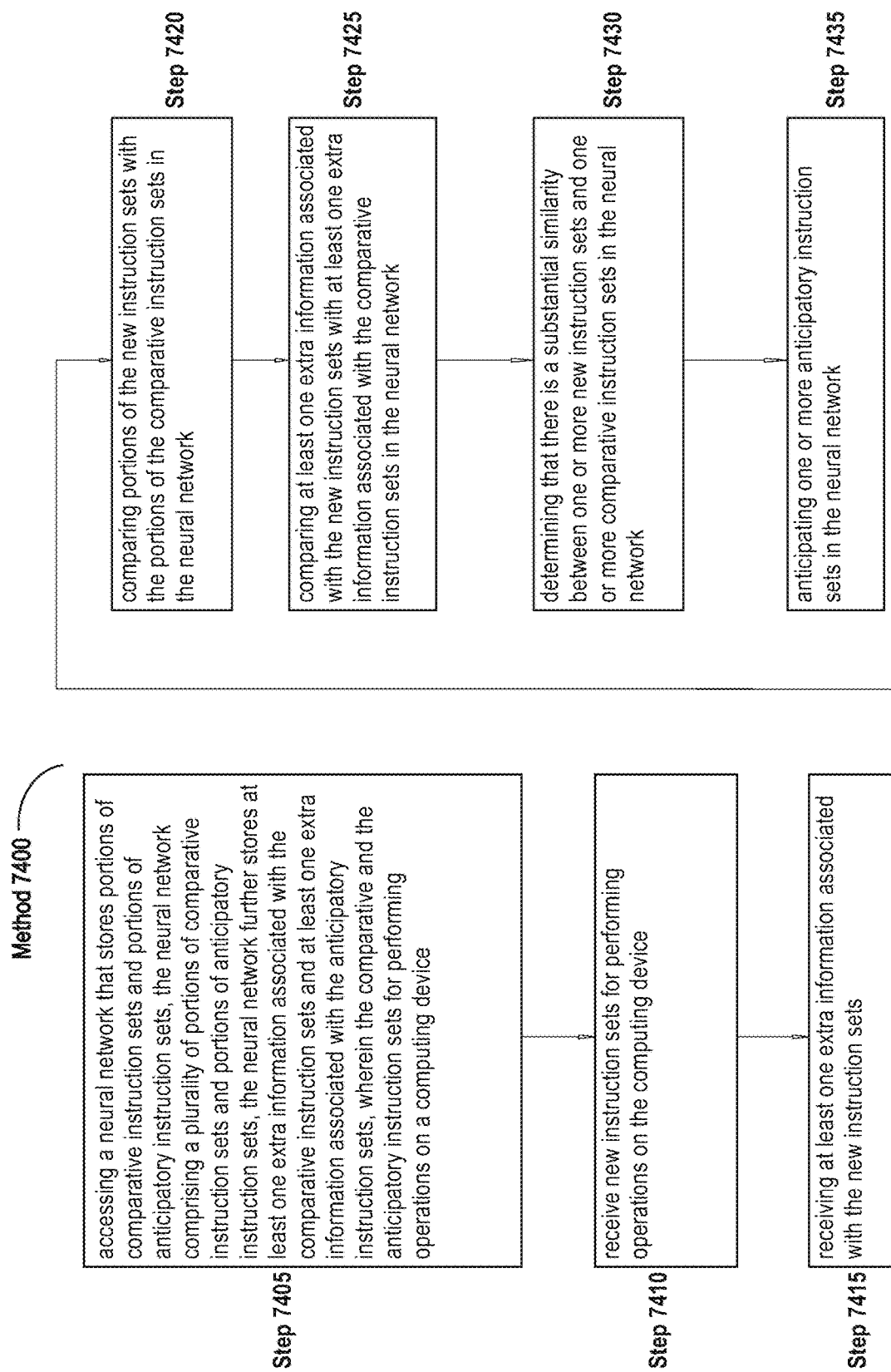
FIG. 48 shows a flow chart diagram of an embodiment of a method 7400 implemented by UAIE.

Referring to FIG. 48, the illustration shows an embodiment of a method 7400 for anticipating an application's operations based UAIE functionalities. The method can therefore be used on a computing device to anticipate an application's operations from stored knowledge of the application's operations. In some embodiments, the method can be used on a computing device operating an interface for UAIE to anticipate an application's operations from stored knowledge of the application's operations. Method 7400 may include any action or operation of any of the disclosed methods such as, for example, methods 7100, 7200, 7300, and/or others. Other additional steps, actions, or operations can be included as needed, or some of the disclosed ones can be optionally omitted, or a different order thereof can be implemented in alternate embodiments of method 7400.

At step 7405, a neural network is accessed that stores portions of comparative instruction sets and portions of anticipatory instruction sets, the neural network comprising a plurality of portions of comparative instruction sets and portions of anticipatory instruction sets, the neural network further stores at least one extra information associated with the comparative instruction sets and at least one extra information associated with the anticipatory instruction sets, wherein the comparative and the anticipatory instruction sets for performing operations on a computing device. At step 7410, new instruction sets for performing operations on the computing device are received. At step 7415, at least one extra information associated with the new instruction sets are received. At step 7420, portions of the new instruction sets are compared with the portions of the comparative instruction sets in the neural network. At step 7425, at least one extra information associated with the new instruction sets are compared with at least one extra information associated with the comparative instruction sets in the neural network. At step 7430, a determination is made that there is a substantial similarity between one or more new instruction sets and one or more comparative instruction sets in the neural network. At step 7435, one or more anticipatory instruction sets in the neural network are anticipated.

Figure 49:
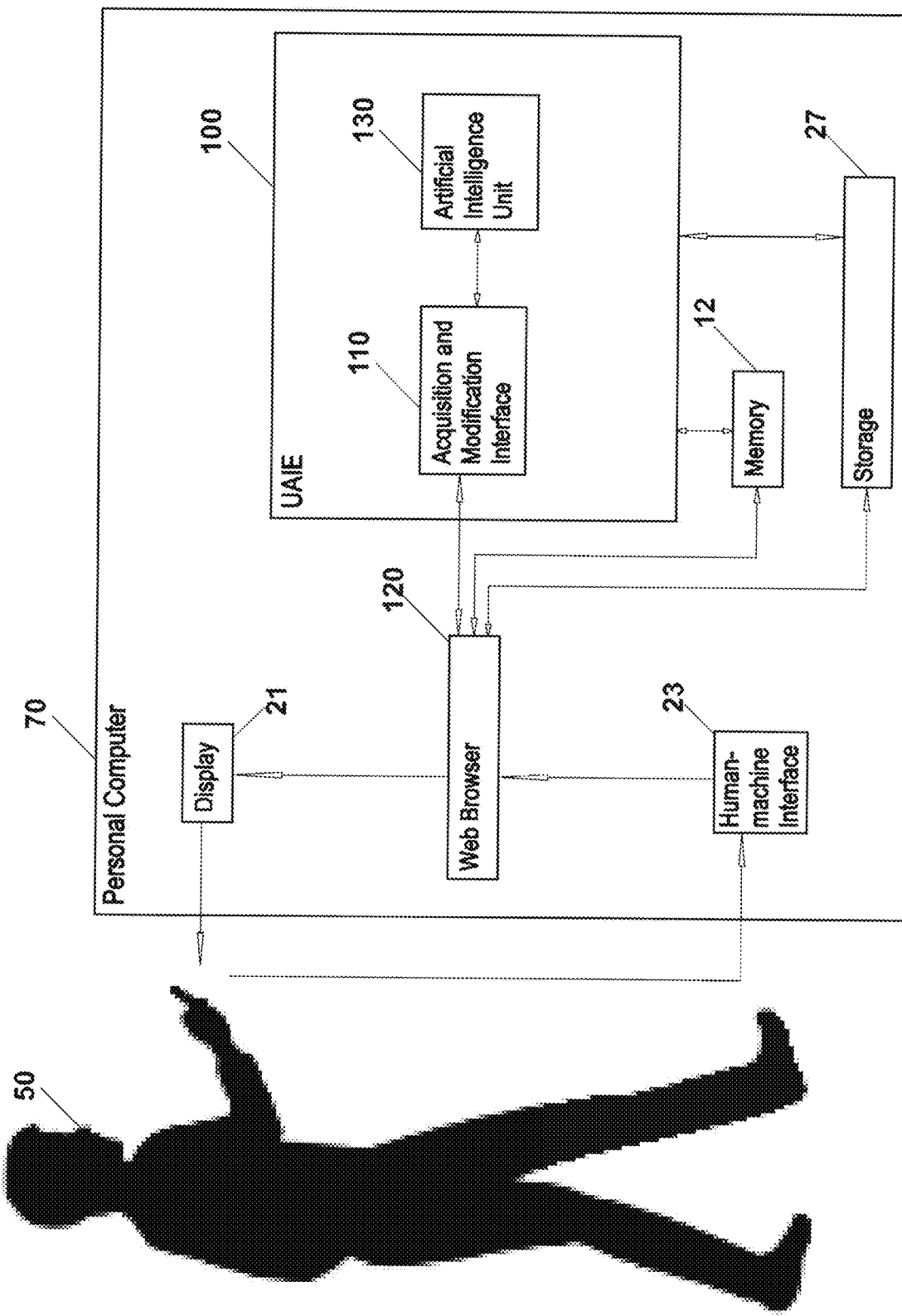
FIG. 49 is a diagram showing an embodiment of UAIE attached to Web Browser 120 executing on Personal Computer 70.

Referring to FIG. 49, the teaching presented by the disclosure can be implemented in exemplary embodiments to provide UAIE functionalities for a web browser. Such embodiments may include artificial intelligence that enables a personal computer or other such device or application to learn the operation of the web browser, store this knowledge in a knowledgebase, neural network, or other repository, and enable autonomous operation of the web browser with partial, minimal, or no user input to help the user in his/her use of the web browser.

UAIE can be used on a Personal Computer 70 (i.e. Computing Device 70, etc.). Personal Computer 70 may include Web Browser 120 (i.e. Software Application 120, etc.), UAIE, Acquisition and Modification Interface 110, Artificial Intelligence Unit 130, Human-machine Interface 23, Display 21, Memory 12, and Storage 27. Other additional elements may be included as needed, or some of the disclosed ones may be excluded, or a combination thereof may be utilized in alternate embodiments.

Personal Computer 70 comprises the functionality for performing computing or processing operations, and/or other functionalities. Examples of Personal Computer 70 include a desktop computer, a mobile computer such as a laptop or tablet computer, computing capable cellular telephone (i.e. smartphone, etc.), server, and/or other computers. Personal Computer 70 can be referred to as and comprises any features, functionalities, and embodiments of Computing Device 70.

In some aspects, Web Browser 120 comprises the functionality for performing web browsing operations on Personal Computer 70, and/or other functionalities. Web Browser 120 comprises the functionality for accessing, presenting, navigating, and/or executing information. Web Browser 120 comprises the functionality for accessing, presenting, navigating, and/or executing information accessible over a network. UAIE can attach to and obtain Web Browser's 120 instructions, data, and/or other information and modify execution and/or functionality of Web Browser 120, thereby providing artificial intelligence functionalities to Web Browser 120 as previously described. Information may include web pages, files, digital repositories, programs, databases, and/or other information or resources. Examples of Web Browsers 120 include Mozila Firefox, Google Chrome, Netscape Navigator, Microsoft Internet Explorer, and others. Information that Web Browser 120 may access, present, navigate, and/or execute can be stored in files, objects, data structures, and/or other such repositories, or in a database, DBMS, server, and/or other such system or repository. A web page, as the most common information format for Web Browsers 120, comprises the functionality for storing information readable by Web Browser 120 or by other software application, device, or system able to read web pages. In one example, a web page can be stored in a file that resides on a Remote Computing Device 1310 accessible over a Network 1300. In another example, a web page can be stored in a file that resides on Personal Computer 70. In yet another example, a web page can be dynamically created by a program and delivered over a network. Examples of web page formats and/or programs that may dynamically create web pages include HTML, XML, DHTML, Java Script, Pert, PhP, Ruby, and others. A web page may include any type of information or content readable by Web Browser 120 such as, for example, textual information, graphical information, sound, video, and/or other information or content readable by Web Browser 120. Web Browser 120 may reside on User's 50 Personal Computer 70 or reside on a Remote Computing Device 1310 accessible over a Network 1300, and if on a Remote Computing Device 1310, Web Browser 120 may be available as a network service (i.e. online web or information browser, etc.). User 50 can operate Web Browser 120 via Human-machine Interface 23, and/or other input device. Web Browser 120 can be referred to as and comprises any features, functionalities, and embodiments of Software Application 120.

In one example, when User 50 wishes to view a web page on Personal Computer 70, User 50 may issue an operating instruction to Web Browser 120 via Human-machine Interface 23 (i.e. keyboard, etc.) to present the web page. Web browser can then retrieve the web page or a reference thereto from Memory 12, Storage 27, Remote Computing Device 1310, or other repository and present it to User 50. In another example, when User 50 wishes to change the view of a particular web page, User 50 may issue an operating instruction to Web Browser 120 via Human-machine Interface 23 (i.e. mouse, etc.) to scroll the view of the web page. In yet another example, when User 50 wishes to find information in a particular web page, User 50 may issue an operating instruction to Web Browser 120 via Human-machine Interface 23 to search (i.e. text search, etc.) for needed information. Various other operating instructions and/or operations can be implemented in Web Browser 120 examples of which include changing text size, zooming in or out, clicking a link, clicking a button, saving a web page, selecting and/or copying a portion of a web page, creating/deleting/editing a bookmark, operating an application within a web browser, viewing or editing information in a web browser, playing/pausing/stopping/rewinding/fast forwarding sound or video, increasing or decreasing volume of sound, and/or other web browser instructions and/or operations. UAIE can learn Web Browser's 120 instructions (i.e. Instruction Sets 600 or Operations 610, etc.) and/or contextual information (i.e. Extra Info 630, etc.) used to implement operations such as web page presenting, scrolling, searching, and/or other operations by storing the instructions (i.e. Instruction Sets 600 or Operations 610, etc.) and/or contextual information (i.e. Extra Info 630, etc.) in Knowledgebase 530, Neural Network 850, or other repository, and anticipate future instructions (i.e. anticipatory Instruction Sets 600 or Operations 610, etc.) as previously described.

In some exemplary embodiments, Personal Computer 70 comprises a smartphone such as Apple's iPhone, Samsung's Galaxy, or other smartphone, or a tablet such as Apple's iPad, Samsung's Galaxy Tab, or other tablet. In one example, User 50 may wish to visit a Youtube web page containing Frank Sinatra's music video such as a web page at "http://www.youtube.com/watch?v=h9ZGKALMMuc". User 50 may then want to increase sound volume by 3 units for each of the stereo, surround sound, or other sound channels. User 50 may then want to scroll down the view of the web page by 5 units to fit the entire area of the video on his/her device's display. While listening to the music, User 50 may want to read more information about Frank Sinatra. User 50 may then decide to create a new tab and visit official Frank Sinatra web page at "http://www.sinatra.com". User's operations may result or be implemented by corresponding Web Browser's 120 instructions such as, for example, the following:

loadPage("http://
        www.youtube.comlwatch?v=h9ZGKALMMuc",
        activeWindow.tabs.activeTab);
    traceAndModifyApplication('loadPage("http://www.y-
        outube.com/watch?v=h9ZGKALMMuc", activeWin-
        dow.tabs.activeTab);');
    adjustSysSound(mainSoundAdapter, 3, 3);
    traceAndModifyApplication('adjustSysSound(main-
        SoundAdapter, 3, 3);');
    scrollPage(activeWindow.tabs.activeTab, 5, 0);
    traceAndModifyApplication('scrollPage(activeWin-
        dow.tabs.activeTab, 5, 0);');
    createNewTab("Tab2");
    traceAndModifyApplication('createNewTab("Tab2");');
    loadPage ("http://www.sinatra.com", activeWindow.tab-
        s.activeTab);
    traceAndModifyApplication('loadPage ("http://www.si-
        natra.com", activeWindow.tabs.activeTab);');

The above code includes various functions (i.e. loadPage, adjustSysSound, scrollPage, createNewTab, etc.) of an application such as Web Browser 120 and an instrumented call to Acquisition and Modification Interface's 110 function (i.e. traceAndModifyApplication, etc.) that can trace (i.e. learn prior function call, etc.) and/or modify (i.e. implement anticipatory instructions, etc.) the application to which UAIE is attached. In some aspects, obtaining Web Browser's 120 instructions, data, and/or other information as well as modifying execution and/or functionality of Web Browser 120 can be implemented in separate functions such as traceApplication and modifyApplication as previously described. One of ordinary skill in art will understand that the above code is not written in any particular language, that it includes a common function call structure used in many programming languages, and that other function call structures are within the scope of this disclosure. One of ordinary skill in art will also understand that the above code is source code and that any other code such as bytecode, assembly code, machine code, and/or any other code can be utilized.

One of ordinary skill in art will also understand that the above code includes function calls and that various other granularities of Web Browser 120 instructions can be traced or utilized such as some or all lines of code, statements, basic blocks, functions/routines/subroutines, any arbitrary code segments, and/or any other code segments. As User 50 operates Web Browser 120 in his/her pursuit of browsing web pages, UAIE can learn Web Browser's 120 instructions (i.e. Instruction Sets 600 or Operations 610, etc.) or functions such as the ones in example above including any contextual information (i.e. Extra Info 630, etc.), and anticipate future instructions (i.e. anticipatory Instruction Sets 600 or Operations 610, etc.) as previously described. The next time User 50 or any user visits same or similar web page (i.e. any other Frank Sinatra or other Youtube web page, etc.) and/or performs other operations, Web Browser 120 can implement one or more of adjusting sound, scrolling the web page, and/or other operations autonomously. In some aspects, Decision-making Unit 540 may search for a Knowledge Cell 800 that includes comparative instructions (i.e. comparative Instruction Sets 600 or Operations 610, etc.) used to implement one or more operations such as visiting a web page and increasing volume. Decision-making Unit 540 may find a Substantially Similar Knowledge Cell 1110 that includes such comparative instructions (i.e. Instruction Sets 600 or Operations 610, etc.). Substantially Similar Knowledge Cell 1110 may also include anticipatory instructions (i.e. anticipatory Instruction Sets 600 or Operations 610, etc.) used to implement subsequent operations such as scrolling down, creating a new tab, visiting a web page in the new tab, and/or other operations. UAIE can then implement the subsequent operations autonomously based on similar operations performed in prior similar circumstances. Web Browser's 120 instructions (i.e. Instruction Sets 600 or Operations 610, etc.) can be stored in a global Knowledgebase 530 available to other users or web browsers. Any Web Browser 120 having access to the global Knowledgebase 530 can implement anticipatory instructions (i.e. anticipatory Instruction Sets 600 or Operations 610, etc.).

In another example, User 50 may visit a web page such as the one containing Frank Sinatra's music video. At the end of the music video in this web page, User 50 may decide to visit or click on a web page containing another Frank Sinatra's music video. At the end of the music video in the second web page, User 50 may want to visit or click on a third web page containing another Frank Sinatra's music video, and so on. As User 50 operates Web Browser 120 in his/her pursuit of browsing web pages, UAIE can learn Web Browser's 120 instructions (i.e. Instruction Sets 600 or Operations 610, etc.) used to implement visiting sequential web pages and/or other operations including any contextual information (i.e. Extra Info 630, etc.), and anticipate future instructions (i.e. anticipatory Instruction Sets 600 or Operations 610, etc.) as previously described. Next time User 50 or any user visits the first web page and/or any of the other visited web pages, Web Browser 120 can implement subsequent web page visits and/or perform other operations autonomously. In some aspects, Decision-making Unit 540 may search for a Knowledge Cell 800 that includes comparative instructions (i.e. comparative Instruction Sets 600 or Operations 610, etc.) used to implement one or more operations such as visiting sequential web pages. Decision-making Unit 540 may find a Substantially Similar Knowledge Cell 1110 that includes such comparative instructions (i.e. Instruction Sets 600 or Operations 610, etc.). Substantially Similar Knowledge Cell 1110 may also include anticipatory instructions (i.e. anticipatory Instruction Sets 600 or Operations 610, etc.) used to implement subsequent operations such as visiting additional web pages, and/or other operations. UAIE can then implement the subsequent operations autonomously based on similar operations performed in prior similar circumstances. If the knowledge of Web Browser's 120 instructions (i.e. Instruction Sets 600 or Operations 610, etc.) that were used to implement User's 50 operations such as visiting sequential web pages is stored in a global Knowledgebase 530, any Web Browser 120 having access to the global Knowledgebase 530 can implement Web Browser's 120 anticipatory instructions (i.e. anticipatory Instruction Sets 600 or Operations 610, etc.).

In other exemplary embodiments, Personal Computer 70 comprises a laptop or desktop computer, or other computer. In one example, User 50 can be a professional or other experienced researcher who uses the Internet as a source of information. User 50 may conduct research on a topic such as subcompact car market, or any other topic. User 50 may decide to input a search phrase such as "subcompact car market" into a search engine such as google.com, yahoo.com, any proprietary search engine, or other search engine. User 50 may then click on various web pages that contain information on the searched topic and open each of the web pages in a new tab or window, for example. User 50 may then highlight keywords, key phrases, or other content of interest in each of the web pages by utilizing Web Browser's 120 search/find, highlight, and/or other features or functionalities. User 50 may also scroll some of the web pages to view or to draw attention to content of interest. As User 50 operates Web Browser 120 in his/her pursuit of browsing web pages, UAIE can learn Web Browser's 120 instructions (i.e. Instruction Sets 600 or Operations 610, etc.) used to implement searching, clicking, opening web pages, highlighting content of interest, scrolling, and/or other operations including any contextual information (i.e. Extra Info 630, etc.). In this and each of the preceding examples, UAIE can learn Web Browser's 120 instructions (i.e. Instruction Sets 600 or Operations 610, etc.) and/or contextual information (i.e. Extra Info 630, etc.) used to implement one or more operations. The instructions (i.e. Instruction Sets 600, etc.) can be disassembled into their portions and stored in Operation 610 or other repository along with any Extra Info 630. Operation 610 can then be stored in Operation List 510 that comprises recently used or implemented (i.e. executed, etc.) Operations 610 or Instruction Sets 600. Knowledge Structuring Unit 520 may create a Knowledge Cell 800 from the Operation List 510 and store the Knowledge Cell 800 in Knowledgebase 530, thereby implementing learning of Web Browser's 120 operations as previously described. Furthermore, Decision-making Unit 540 may search for a Knowledge Cell 800 that includes comparative instructions (i.e. comparative Instruction Sets 600 or Operations 610, etc.) used to implement one or more operations. Decision-making Unit 540 may find a Substantially Similar Knowledge Cell 1110 that includes such comparative instructions (i.e. Instruction Sets 600 or Operations 610, etc.). Substantially Similar Knowledge Cell 1110 may also include anticipatory instructions (i.e. anticipatory Instruction Sets 600 or Operations 610, etc.) used to implement subsequent operations. UAIE can then implement the subsequent operations autonomously based on similar operations performed in prior similar circumstances, thereby implementing anticipation of Web Browser's 120 operations as previously described. If the knowledge (i.e. Knowledge Cells 800, etc.) of Web Browser's 120 instructions (i.e. Instruction Sets 600 or Operations 610, etc.) that were used to implement professional researcher's operations (i.e. searching for a word or phrase, visiting web pages in new tabs or windows, highlighting content of interest, scrolling, etc.) is stored in a global Knowledgebase 530, any Web Browser 120 having access to the global Knowledgebase 530 can implement Web Browser's 120 anticipatory instructions (i.e. anticipatory Instruction Sets 600 or Operations 610, etc.). The knowledge of Web Browser's 120 instructions (i.e. Instruction Sets 600 or Operations 610, etc.) used to implement professional researcher's operations can be stored in a private Knowledgebase 530, file, or other repository. UAIE enables a user such as a professional researcher to record his/her knowledge (i.e. his/her research methodology and/or results, etc.) of searching a particular topic. A user such as a professional researcher can then sell his/her knowledge (i.e. Knowledgebase 530 or Knowledge Cells 800 that include his/her her research methodology and/or results, etc.) to other users who need to conduct similar research and save time. A user can sell his/her knowledge (i.e. Knowledgebase 530 or Knowledge Cells 800, etc.) of searching a particular topic under a commercial or other license. Buyers of the Knowledgebase 530 and/or Knowledge Cells 800 can use them for various purposes such as professionals can use them for their business, academicians can use them for their scholarly work, students can use them for their studies, anyone can use them to gain information on the researched topic, other professional researchers can use them as a start of their own more detailed research, or use them for any other purpose. A buyer can also load the Knowledgebase 530 or Knowledge Cells 800 into his/her own UAIE. Once loaded, Knowledgebase 530 or Knowledge Cells 800 can be initiated or activated manually as an executable sequence or automatically through UAIE's decision making process. Buyer's Web Browser 120 can then implement anticipatory instructions (i.e. anticipatory Instruction Sets 600 or Operations 610, etc.) included in the bought Knowledgebase 530 or Knowledge Cells 800.

Any learning, anticipating, and/or other functionalities implemented using Knowledgebase 530 and/or Knowledge Cells 800 can be similarly implemented using Neural Network 850. In each of the preceding examples, instead of creating Knowledge Cells 800 and storing them into Knowledgebase 530, Knowledge Structuring Unit 520 can apply Operations 610 from Operation List 510 onto a Neural Network 850, thereby implementing learning of Web Browser's 120 operations as previously described. Furthermore, Decision-making Unit 540 can search for a path in Neural Network 850 that includes comparative instructions (i.e. comparative Instruction Sets 600 or Operations 610, etc.) used to implement one or more operations. Decision-making Unit 540 may find a Substantially Similar Path 855 that includes such comparative instructions (i.e. Instruction Sets 600 or Operations 610, etc.). Substantially Similar Path 855 may also include anticipatory instructions (i.e. anticipatory Instruction Sets 600 or Operations 610, etc.) used to implement subsequent operations. UAIE can then implement the subsequent operations autonomously based on similar operations performed in prior similar circumstances, thereby implementing anticipation of Web Browser's 120 operations as previously described.

One of ordinary skill in art will understand that the above exemplary embodiments are merely examples of a web browser's operations and of UAIE functionalities with respect to web browser, and while all possible embodiments are too voluminous to describe, other embodiments are within the scope of this disclosure.

Figure 50:
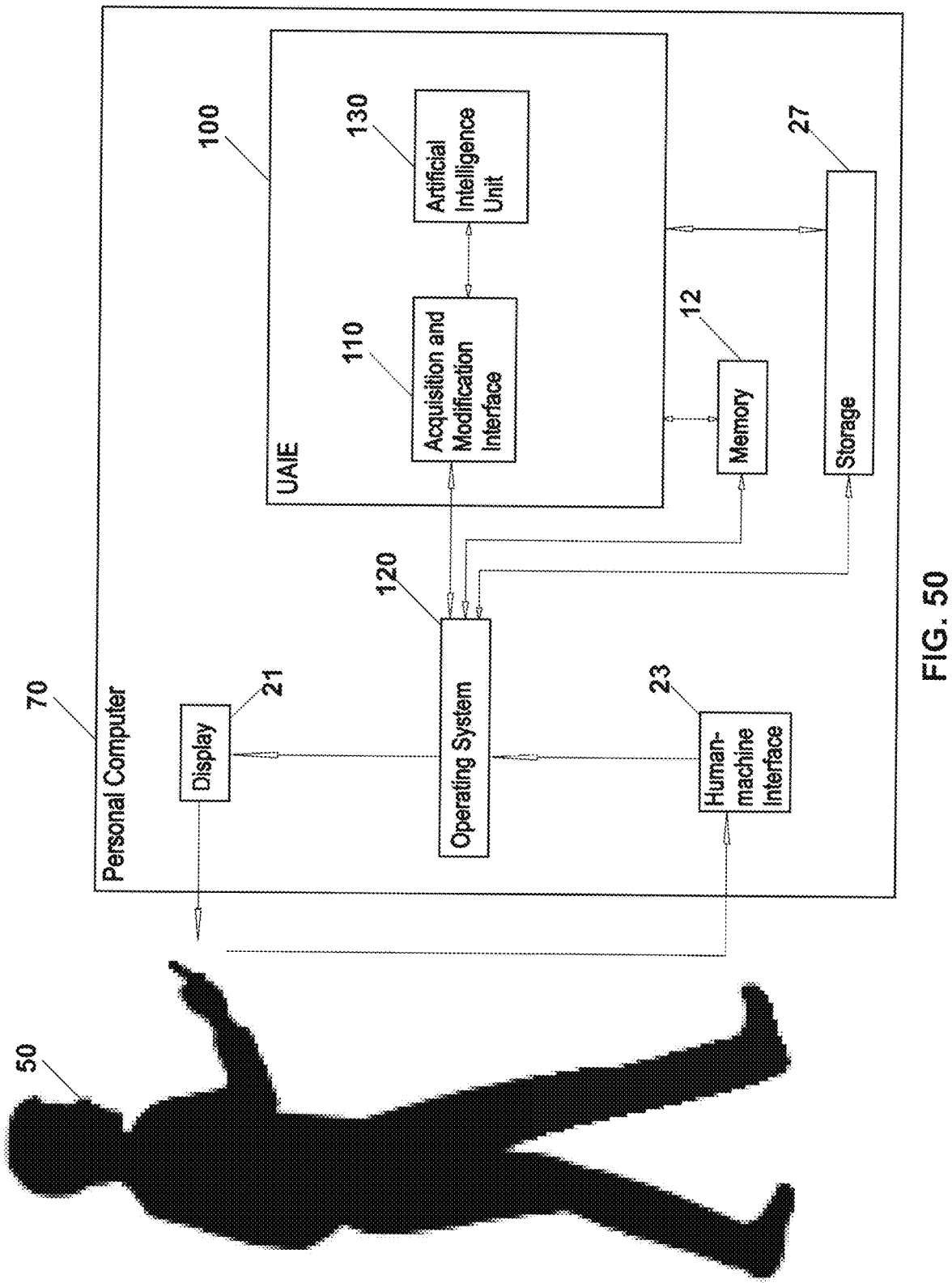
FIG. 50 is a diagram showing an embodiment of UAIE attached to Operating System 120 executing on Personal Computer 70.

Referring to FIG. 50, the teaching presented by the disclosure can be implemented in exemplary embodiments to provide UAIE functionalities for an operating system. Such embodiments may include artificial intelligence that enables a personal computer or other such device or application to learn the operation of the operating system, store this knowledge in a knowledgebase, neural network, or other repository, and enable autonomous operation of the operating system with partial, minimal, or no user input to help the user in his/her use of the operating system.

UAIE can be used on a Personal Computer 70 (i.e. Computing Device 70, etc.). Personal Computer 70 may include Operating System 120 (i.e. Software Application 120, etc.), UAIE, Acquisition and Modification Interface 110, Artificial Intelligence Unit 130, Human-machine Interface 23, Display 21, Memory 12, and Storage 27. Other additional elements can be included as needed, or some of the disclosed ones can be excluded, or a combination thereof can be utilized in alternate embodiments.

In some aspects, Operating System 120 comprises the functionality for performing operating system operations on Personal Computer 70, and/or other functionalities. Operating System 120 comprises the functionality for providing system and/or other functionalities as previously described. UAIE can attach to and obtain Operating System's 120 instructions, data, and/or other information and modify execution and/or functionality of Operating System 120, thereby providing artificial intelligence functionalities to Operating System 120 as previously described. Operating System 120 may reside on Personal Computer 70 or on a Remote Computing Device 1310 accessible over a Network 1300, and if on a Remote Computing Device 1310, Operating System 120 may be available as a network service as previously described. User 50 can operate Operating System 120 via Human-machine Interface 23, and/or other input device.

Operating System 120 can be referred to as and comprises any features, functionalities, and embodiments of Software Application 120.

In one example, when User 50 wishes to copy a file on Personal Computer 70, User 50 can issue an operating instruction to Operating System 120 via Human-machine Interface 23 (i.e. mouse, etc.) to copy the file. Operating System 120 may then access the file or a reference thereto on a Remote Computing Device 1310 or another remote or peripheral device, and make a copy of the file in Storage 27, for example. In another example, when User 50 wishes to connect to a Remote Computing Device 1310 (i.e. to view a particular web page on a web server, etc.), Operating System 120 can enable the connection with the Remote Computing Device 1310. To enable the connection, Operating System 120 may access Personal Computer's 70 network adapter, create new or activate an existing network connection, support or implement a particular network protocol, support or manage the exchange of information, and/or perform other operations. In yet another example, when User 50 wishes to automatically execute a particular application at a specific time, User 50 can issue an operating instruction to Operating System 120 via Human-machine Interface 23 to schedule the execution of the application via Operating System's 120 task scheduler. Various other operating instructions and/or operations can be implemented in Operating System 120 examples of which include managing file or other permissions, managing user accounts, performing hard drive maintenance, managing and monitoring system resources, managing system recovery, managing network connections, managing DBMS/database connections, file browsing, managing backups, managing system security, managing software settings and/or information, managing devices and drivers, managing sound and/or other sensory inputs or outputs, and/or any other operating system instructions and/or operations. UAIE can learn Operating System's 120 instructions (i.e. Instruction Sets 600 or Operations 610, etc.) and/or contextual information (i.e. Extra Info 630, etc.) used to implement operations such as file copying, network connecting, task scheduling, and/or other operations by storing the instructions (i.e. Instruction Sets 600 or Operations 610, etc.) and/or contextual information (i.e. Extra Info 630, etc.) in Knowledgebase 530, Neural Network 850, or other repository, and anticipate future instructions (i.e. anticipatory Instruction Sets 600 or Operations 610, etc.) as previously described.

In some exemplary embodiments, Personal Computer 70 comprises a laptop or desktop computer, or other computer. In one example, User 50 may perform daily, weekly, monthly, yearly, and/or other periodic file backups. After performing one or more of these periodic file backups, UAIE can learn Operating System's 120 instructions (i.e. Instruction Sets 600 or Operations 610, etc.) and/or contextual information (i.e. Extra Info 630, etc.) used to implement the file backups and their timing (i.e. using time stamp, etc.), and then perform future file backups autonomously as previously described. In another example, User 50 may have a preference for setting specific permissions for newly created or copied files. After User 50 creates or copies one or more files, User 50 may access the files' permissions and set them to his preference. UAIE can learn Operating System's 120 instructions (i.e. Instruction Sets 600 or Operations 610, etc.) and/or contextual information (i.e. Extra Info 630, etc.) used to implement file permissions settings, and then perform future file permissions settings autonomously as previously described. In yet another example, User 50 may prefer to be offline when he/she is not browsing Internet (i.e. for security reasons, etc.). After User 50 launches a web browser and connects to the Internet on one or more occasions, UAIE may learn Operating System's 120 instructions (i.e. Instruction Sets 600 or Operations 610, etc.) and/or contextual information (i.e. Extra Info 630, etc.) used to implement web browser launching and Internet connecting, and then autonomously perform future Internet connections following web browser launches as previously described. In yet another example, User 50 may prefer to perform certain tasks at certain stages of Operating System's 120 operation such as checking email at Operating System's 120 start or virus scanning at Operating System's 120 shut-down. After User 50 launches an email application (i.e. Microsoft Outlook, etc.) and/or retrieves email at Operating System's 120 start on one or more occasions, UAIE can learn Operating System's 120 instructions (i.e. Instruction Sets 600 or Operations 610, etc.) and/or contextual information (i.e. Extra Info 630, etc.) used to implement email application's launching and/or email retrieval, and then autonomously perform future email application launches and/or email retrieval as previously described. In this and each of the preceding examples, UAIE can learn Operating System's 120 instructions (i.e. Instruction Sets 600 or Operations 610, etc.) and/or contextual information (i.e. Extra Info 630, etc.) used to implement one or more operations. The instructions (i.e. Instruction Sets 600, etc.) can be disassembled into their portions and stored in Operation 610 or other repository along with any Extra Info 630. Operation 610 can then be stored in Operation List 510 that comprises recently used or implemented (i.e. executed, etc.) Operations 610 or Instruction Sets 600. Knowledge Structuring Unit 520 may create a Knowledge Cell 800 from the Operation List 510 and store the Knowledge Cell 800 in Knowledgebase 530, thereby implementing learning of Operating System's 120 operations as previously described. Furthermore, Decision-making Unit 540 may search for a Knowledge Cell 800 that includes comparative instructions (i.e. comparative Instruction Sets 600 or Operations 610, etc.) used to implement one or more operations. Decision-making Unit 540 may find a Substantially Similar Knowledge Cell 1110 that includes such comparative instructions (i.e. Instruction Sets 600 or Operations 610, etc.). Substantially Similar Knowledge Cell 1110 may also include anticipatory instructions (i.e. anticipatory Instruction Sets 600 or Operations 610, etc.) used to implement subsequent operations. UAIE can then implement the subsequent operations autonomously based on similar operations performed in prior similar circumstances, thereby implementing anticipation of Operating System's 120 operations as previously described.

Any learning, anticipating, and/or other functionalities implemented using Knowledgebase 530 and/or Knowledge Cells 800 can be similarly implemented using Neural Network 850. In each of the preceding examples, instead of creating Knowledge Cells 800 and storing them into Knowledgebase 530, Knowledge Structuring Unit 520 can apply Operations 610 from Operation List 510 onto a Neural Network 850, thereby implementing learning of Operating System's 120 operations as previously described. Furthermore, Decision-making Unit 540 can search for a path in Neural Network 850 that includes comparative instructions (i.e. comparative Instruction Sets 600 or Operations 610, etc.) used to implement one or more operations. Decision-making Unit 540 may find a Substantially Similar Path 855 that includes such comparative instructions (i.e. Instruction Sets 600 or Operations 610, etc.). Substantially Similar Path 855 may also include anticipatory instructions (i.e. anticipatory Instruction Sets 600 or Operations 610, etc.) used to implement subsequent operations. UAIE can then implement the subsequent operations autonomously based on similar operations performed in prior similar circumstances, thereby implementing anticipation of Operating System's 120 operations as previously described.

One of ordinary skill in art will understand that the above exemplary embodiments are merely examples of an operating system's operations and of UAIE functionalities with respect to operating system, and while all possible embodiments are too voluminous to describe, other embodiments are within the scope of this disclosure.

Figure 51:
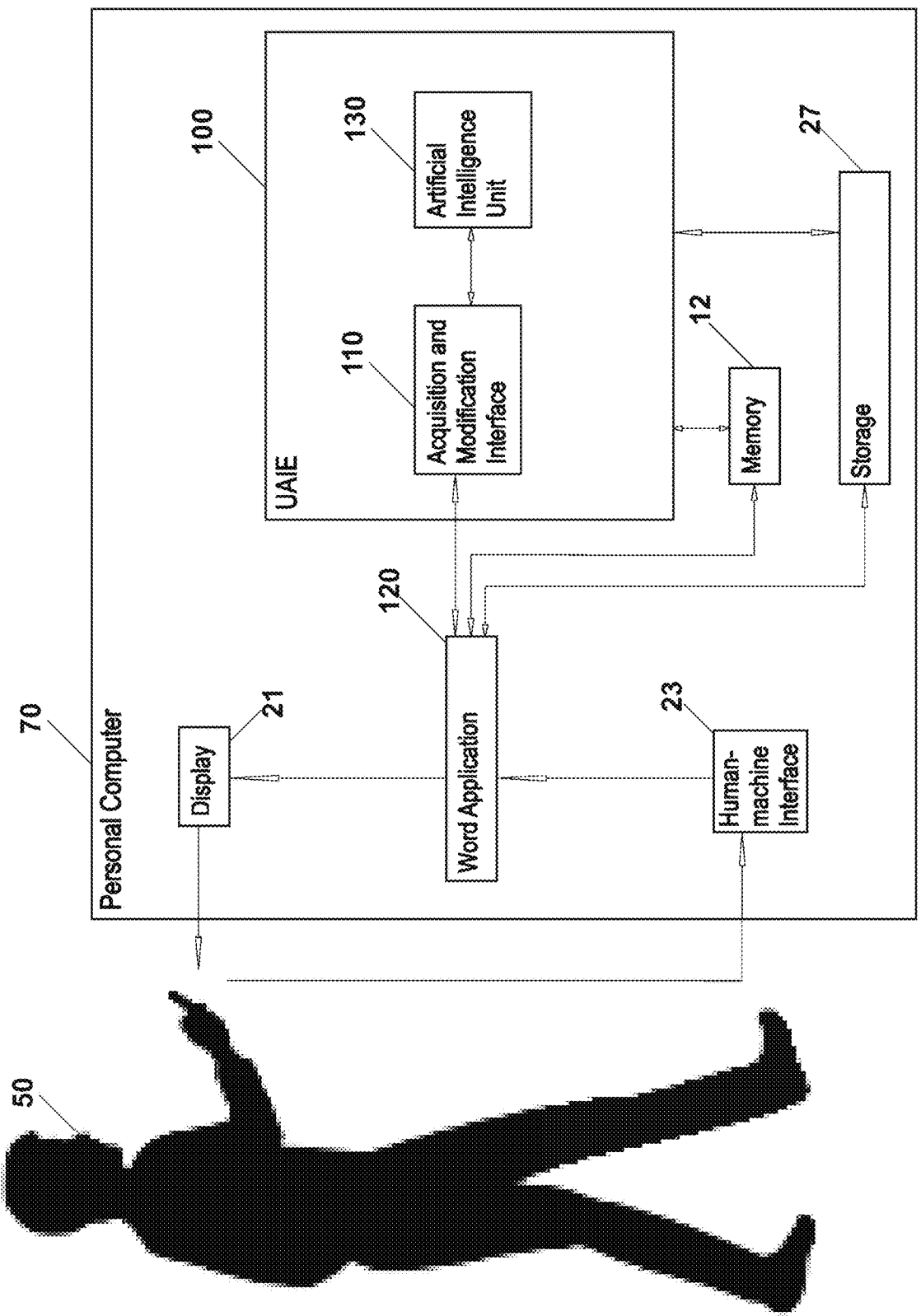
FIG. 51 is a diagram showing an embodiment of UAIE attached to Word Application 120 executing on Personal Computer 70.

Referring to FIG. 51, the teaching presented by the disclosure can be implemented in exemplary embodiments to provide UAIE functionalities for a word processing application (also referred to as text processing application, word application, or other such references, etc.). Such embodiments may include artificial intelligence that enables a personal computer or other such device or application to learn the operation of the word processing application, store this knowledge in a knowledgebase, neural network, or other repository, and enable autonomous operation of the word processing application with partial, minimal, or no user input to help the user in his/her use of the word processing application.

UAIE can be used on a Personal Computer 70 (i.e. Computing Device 70, etc.). Personal Computer 70 may include Word Application 120 (i.e. Software Application 120, etc.), UAIE, Acquisition and Modification Interface 110, Artificial Intelligence Unit 130, Human-machine Interface 23, Display 21, Memory 12, and Storage 27. Other additional elements may be included as needed, or some of the disclosed ones may be excluded, or a combination thereof may be utilized in alternate embodiments.

In some aspects, Word Application 120 comprises the functionality for performing word processing operations on Personal Computer 70, and/or other functionalities. Word Application 120 comprises the functionality for text creation, editing, formatting, printing, publishing, manipulation, and/or other functionalities. Text may include any character, digit, symbol, and/or other similar item, for example. Examples of Word Applications 120 include Microsoft Word, Corel WordPerfect, LibreOffice Writer, KWord, and/or others. UAIE can attach to and obtain Word Application's 120 instructions, data, and/or other information and modify execution and/or functionality of Word Application 120, thereby providing artificial intelligence functionalities to Word Application 120 as previously described. Word Application 120 can reside on User's 50 Personal Computer 70 or on a Remote Computing Device 1310 accessible over a Network 1300, and if on a Remote Computing Device 1310, Word Application 120 may be available as a network service. User 50 can operate Word Application 120 via Human-machine Interface 23, and/or other input device. Word Application 120 can be referred to as and comprises any features, functionalities, and embodiments of Software Application 120.

In one example, when User 50 wishes to input a character, word, phrase, sentence, or another section of text, User 50 can issue an operating instruction to Word Application 120 via Human-machine Interface 23 (i.e. keyboard, etc.) to input the character, word, phrase, sentence, or another section of text. In another example, when User 50 wishes to copy a section of text, User 50 can issue an operating instruction to Word Application 120 via Human-machine Interface 23 (i.e. mouse, etc.) to copy the section of text (i.e. copy from one document into memory for other documents to access, etc.). In yet another example, when User 50 wishes to paste a previously copied section of text, User 50 can issue an operating instruction to Word Application 120 via Human-machine Interface 23 to paste the section of text (i.e. access text in memory and deliver into current document, etc.). In yet another example, when User 50 wishes to set formatting (i.e. color, font, spacing, etc.) for a character, word, phrase, sentence, or another section of text, User 50 can issue an operating instruction to Word Application 120 via Human-machine Interface 23 (i.e. mouse, etc.) to set formatting for the character, word, phrase, sentence, or another section of text. In yet another example, when User 50 wishes to set page layout (i.e. portrait, landscape, margin sizes, etc.), User 50 can issue an operating instruction to Word Application 120 via Human-machine Interface 23 to set page layout. Various other operating instructions and/or operations can be implemented in Word Application 120 examples of which include saving or renaming text files, printing text or other content, publishing text or other content, managing Word Application's 120 settings, managing sound and/or other sensory inputs or outputs, and/or any other word processing application instructions and/or operations. UAIE can learn Word Application's 120 instructions (i.e. Instruction Sets 600 or Operations 610, etc.) and/or contextual information (i.e. Extra Info 630, etc.) used to implement operations such as inputting text, copying text, pasting text, formatting text, setting page layout, and/or other operations by storing the instructions (i.e. Instruction Sets 600 or Operations 610, etc.) and/or contextual information (i.e. Extra Info 630, etc.) in Knowledgebase 530, Neural Network 850, or other repository, and anticipate future instructions (i.e. anticipatory Instruction Sets 600 or Operations 610, etc.) as previously described.

In some exemplary embodiments, Personal Computer 70 comprises a laptop or desktop computer, or other computer. In one example, User 50 may want to copy a section of text from a first to a second document where each of the documents has different text formatting. User 50 may select and copy (i.e. copy into memory or cache, etc.) the section of text from the first document, and paste it into the second document. User may then reformat the pasted section of text to conform to the formatting of the second document. UAIE can learn Word Application's 120 instructions (i.e. Instruction Sets 600 or Operations 610, etc.) and/or contextual information (i.e. Extra Info 630, etc.) used to implement the copying, pasting, reformatting, and/or other operations. UAIE can also learn contextual information (i.e. Extra Info 630, etc.) such as, for example, formatting of the text around the pasted text in the second document prior to and after the reformatting of the pasted text. UAIE can then perform future reformatting (i.e. that follows copying and/or pasting, etc.) autonomously as previously described. In another example, User 50 may have different preferences for page settings for various types of documents such as personal letters, business correspondence, official correspondence, and/or other types of documents. After User 50 creates one or more of the different types of text documents, User 50 may adjust page settings to his/her preference for each type of document. UAIE can learn Word Application's 120 instructions (i.e. Instruction Sets 600 or Operations 610, etc.) and/or contextual information (i.e. Extra Info 630, etc.) used to implement operations such as adjusting page settings, and perform future adjusting of page settings autonomously as previously described.

Figure 52:
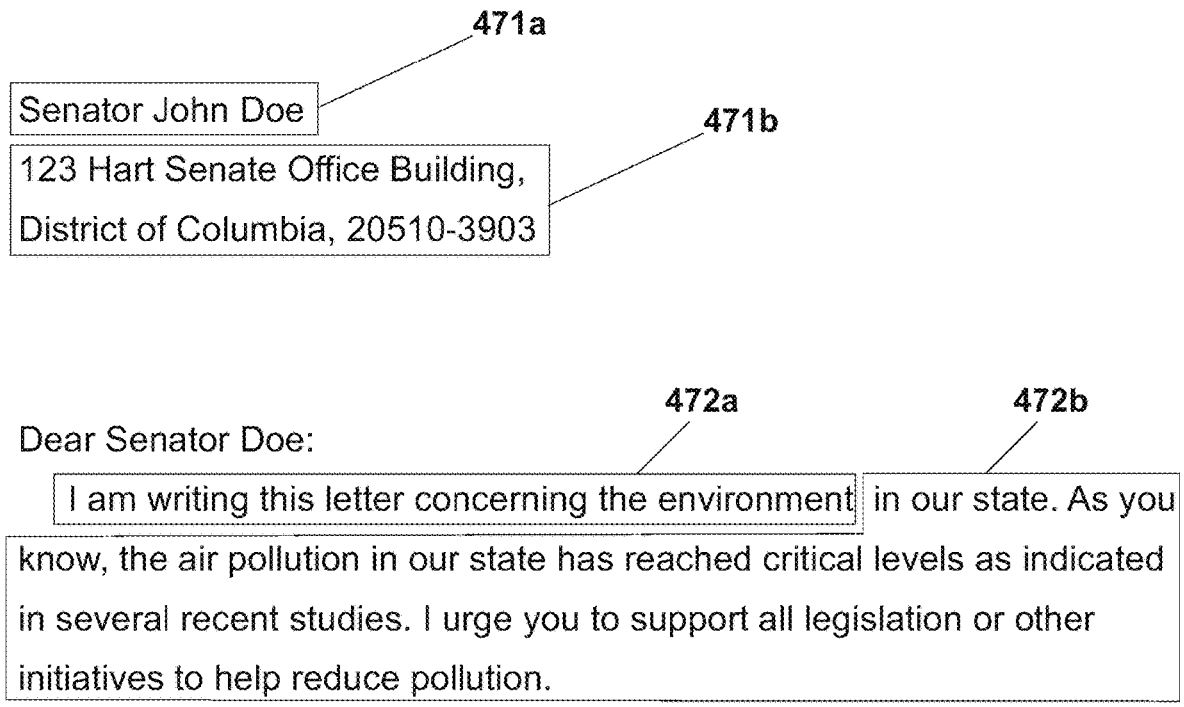
FIG. 52 shows an embodiment of UAIE providing autonomous operation functionalities in Word Application 120.

In yet another example, Personal Computer 70 may be a network connected computer. Word Application 120 may include or access a Knowledgebase 530, which comprises instructions (i.e. Instruction Sets 600 or Operations 610, etc.) implementing past Word Application's 120 operations (i.e. prior written text, formatting, editing, etc.). Either or both Word Application 120 and Knowledgebase 530 can be stored in Personal Computer's 70 Memory 12, Storage 27, and/or other local repository, or on a Remote Computing Device 1310 accessible over a Network 1300. As User 50 operates Word Application 120 in his/her pursuit of writing, UAIE can learn Word Application's 120 instructions (i.e. Instruction Sets 600 or Operations 610, etc.) and/or contextual information (i.e. Extra Info 630, etc.), and anticipate future instructions (i.e. anticipatory Instruction Sets 600 or Operations 610) as previously described. Additionally, a global Knowledgebase 530 including writing knowledge (i.e. Knowledge Cells 800, etc.) of other users may be available to be used in anticipating Word Application's 120 instructions and/or operations. For example, User 50 may want to write a letter to his/her representative (congressman, senator, governor, etc.) concerning a topic. There may exist a global Knowledgebase 530 of writings on the topic that User's 50 Word Application 120 and/or UAIE can access. User 50 may write the letter by inputting characters, words, phrases, sentences, or other text, by performing edits or formatting, or by performing other operations within Word Application 120. Word Application 120 can implement the inputting of characters, words, phrases, sentences, or other text, the edits or formatting, and/or other operations by executing instructions (i.e. Instruction Sets 600 or Operations 610, etc.) of Word Application 120. In this and each of the preceding examples, UAIE can learn Word Application's 120 instructions (i.e. Instruction Sets 600 or Operations 610, etc.) and/or contextual information (i.e. Extra Info 630, etc.) used to implement one or more operations. The instructions (i.e. Instruction Sets 600, etc.) can be disassembled into their portions and stored in Operation 610 or other repository along with any Extra Info 630. Operation 610 can then be stored in Operation List 510 that comprises recently used or implemented (i.e. executed, etc.) Operations 610 or Instruction Sets 600. Knowledge Structuring Unit 520 may create a Knowledge Cell 800 from the Operation List 510 and store the Knowledge Cell 800 in Knowledgebase 530, thereby implementing learning of Word Application's 120 operations as previously described. User 50 may start his/her letter by addressing the representative and writing his/her title, first and last name. In some aspects, as User is writing the representative's title, first and last name, Decision-making Unit 540 can search for a Knowledge Cell 800 that includes comparative instructions (i.e. comparative Instruction Sets 600 or Operations 610, etc.) used to implement similar text (i.e. title, first and last name, etc.) and/or its properties (i.e. formatting, etc.). Decision-making Unit 540 may find a Substantially Similar Knowledge Cell 1110 that includes such comparative instructions (i.e. Instruction Sets 600 or Operations 610, etc.) used to implement similar text (i.e. title, first and last name, etc.) and/or its properties (i.e. formatting, etc.) as in Comparative Section 471*a* shown in FIG. 52, for example. Substantially Similar Knowledge Cell 1110 may also include anticipatory instructions (i.e. anticipatory Instruction Sets 600 or Operations 610, etc.) used to implement subsequent text (i.e. the representative's entire address, etc.) and/or its properties as in Anticipatory Section 471*b*, for example. UAIE can then implement the subsequent text and/or its properties as in Anticipatory Section 471*b* autonomously based on similar text and/or other operations performed in a prior similar letter or writing, thereby implementing anticipation of Word Application's 120 operations as previously described. User 50 may then input additional text (i.e. opening sentence, additional words, sentences, paragraphs, etc.), perform additional edits or formats, or perform other operations within Word Application 120. In some aspects, as User is inputting additional text (i.e. first part of an opening sentence, etc.), performing additional edits or formats, and/or performing other operations, Decision-making Unit 540 may search for a Knowledge Cell 800 that includes comparative instructions (i.e. comparative Instruction Sets 600 or Operations 610, etc.) used to implement similar text (i.e. first part of an opening or other sentence, etc.) and/or its properties (i.e. formatting, etc.). Decision-making Unit 540 may find a Substantially Similar Knowledge Cell 1110 that includes such comparative instructions (i.e. comparative Instruction Sets 600 or Operations 610, etc.) used to implement similar text (i.e. first part of an opening or other sentence, etc.) and/or its properties (i.e. formatting, etc.) as in Comparative Section 472*a* shown in FIG. 52, for example. Substantially Similar Knowledge Cell 1110 may also include anticipatory instructions (i.e. anticipatory Instruction Sets 600 or Operations 610, etc.) used to implement subsequent text (i.e. second part of the opening or other sentence, subsequent words, sentences, paragraphs, subsequent formats or edits, etc.) and/or its properties as in Anticipatory Section 472*b* shown in FIG. 52, for example. UAIE can then implement the subsequent text and/or its properties as in Anticipatory Section 472*b* autonomously based on similar text and/or other operations performed in a prior similar letter or writing, thereby implementing anticipation of Word Application's 120 operations as previously described. Any Anticipatory Section 471*b*, 472*b*, etc. may include any number of characters, words, phrases, sentences, paragraphs, or other text. In some aspects, key words, key phrases, and/or other key items such as representative's name, topic of the letter, and/or other information can be stored in Extra Info 630 or other repository to help identify a global Knowledgebase 530 from which to draw knowledge or information. Key words, phrases, and/or other items may include words, phrases, and/or other items that were most frequently used or used in prominent sections of the letter such as the addressing section, opening sentence, first paragraph, and/or other sections. In one example, after User 50 inputs representative's title, first and last name, UAIE may look for a Knowledgebase 530 containing letters, articles, and/or other writings to or about the particular representative. In another example, after User 50 inputs the topic of the letter (i.e. environment, pollution, etc.) or the topic is extracted from the letter, UAIE may look for a Knowledgebase 530 containing letters, articles, and/or other writings about or including the particular topic.

Any learning, anticipating, and/or other functionalities implemented using Knowledgebase 530 and/or Knowledge Cells 800 can be similarly implemented using Neural Network 850. In each of the preceding examples, instead of creating Knowledge Cells 800 and storing them into Knowledgebase 530, Knowledge Structuring Unit 520 can apply Operations 610 from Operation List 510 onto a Neural Network 850, thereby implementing learning of Word Application's 120 operations as previously described. Furthermore, Decision-making Unit 540 can search for a path in Neural Network 850 that includes comparative instructions (i.e. comparative Instruction Sets 600 or Operations 610, etc.) used to implement one or more operations. Decision-making Unit 540 may find a Substantially Similar Path 855 that includes such comparative instructions (i.e. Instruction Sets 600 or Operations 610, etc.). Substantially Similar Path 855 may also include anticipatory instructions (i.e. anticipatory Instruction Sets 600 or Operations 610, etc.) used to implement subsequent operations. UAIE can then implement the subsequent operations autonomously based on similar operations performed in prior similar circumstances, thereby implementing anticipation of Word Application's 120 operations as previously described.

One of ordinary skill in art will understand that the above exemplary embodiments are merely examples of a word application's operations and of UAIE functionalities with respect to word application, and while all possible embodiments are too voluminous to describe, other embodiments are within the scope of this disclosure.

Figure 53:
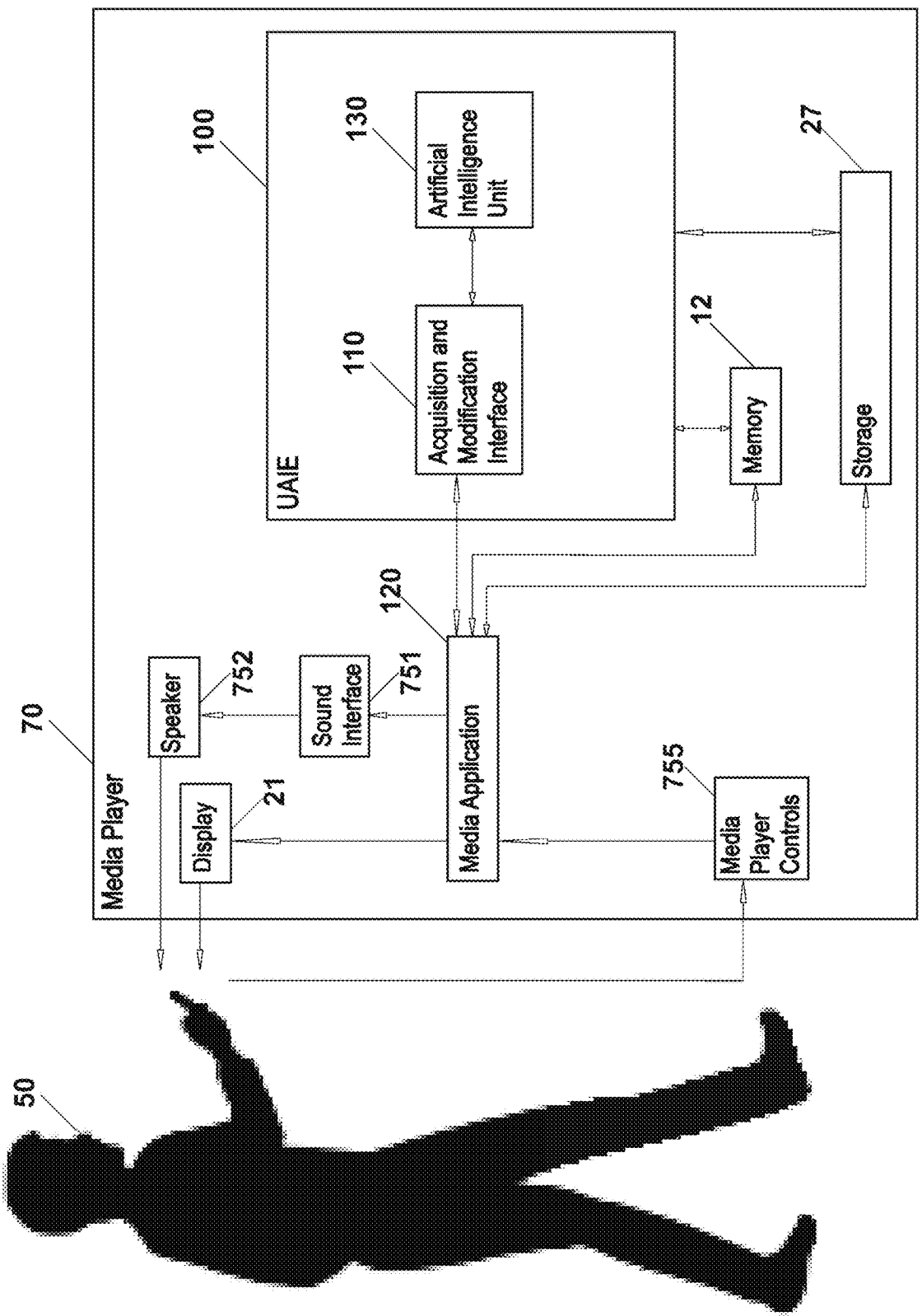
FIG. 53 is a diagram showing an embodiment of UAIE attached to Media Application 120 executing on Media Player 70.

Referring to FIG. 53, the teaching presented by the disclosure can be implemented in exemplary embodiments to provide UAIE functionalities for a media application. Such embodiments may include artificial intelligence that enables a media player or other such device or application to learn the operation of the media application, store this knowledge in a knowledgebase, neural network, or other repository, and enable autonomous operation of the media application with partial, minimal, or no user input to help the user in his/her use of media player.

UAIE can be used on a Media Player 70 (i.e. Computing Device 70, etc.). Media Player 70 may include Media Application 120 (i.e. Software Application 120, etc.), UAIE, Acquisition and Modification Interface 110, Artificial Intelligence Unit 130, Display 21, Memory 12, Storage 27, Sound Interface 751, Speaker 752, and Media Player Controls 755. Other additional elements may be included as needed, or some of the disclosed ones may be excluded, or a combination thereof may be utilized in alternate embodiments.

Media Player 70 comprises the functionality for performing media operations, and/or other functionalities. Media Player 70 comprises the functionality for playing media. Examples of Media Player 70 include a music player such as an iPod, a video player such as a DVD player, a picture player, a television device, a media capable computer, a media capable cellular phone such as a smartphone, a media capable tablet, and/or other media players. Media Player 70 can be referred to as and comprises any features, functionalities, and embodiments of Computing Device 70.

In some aspects, Media Application 120 comprises the functionality for performing media operations on Media Player 70, and/or other functionalities. Media Application 120 comprises the functionality for accessing, playing, managing, manipulating, and/or performing other operations on media or references thereto. Media can be stored in files, objects, data structures, and/or other repositories or in a database, DBMS, and/or other such system or repository. Media comprises sound, video, pictures, and/or other media generally included in digital files. Media files may include additional information such as author, authorship date, copyright information, and/or other additional information pertinent to the media. Media Application 120 and/or media (i.e. media files, etc.) can reside on User's 50 Media Player 70 or on a Remote Computing Device 1310 accessible over a Network 1300, and if on a Remote Computing Device 1310, Media Player 70 and/or media (i.e. media files, etc.) may be available as a network service such as music or video streaming service (i.e. Netflix, Youtube, Pandora, iTunes, etc.). UAIE can attach to and obtain Media Application's 120 instructions, data, and/or other information and modify execution and/or functionality of Media Application 120, thereby providing artificial intelligence functionalities to Media Application 120 as previously described. User 50 can operate Media Application 120 by using Media Player's 70 control means. In one example, User 50 can input his/her music playing instructions by using the music player's native control means such as iPod's control wheel. In another example, User 50 can input his/her channel watching instructions by using television device's native control means such as a remote controller. In yet another example, User 50 can input his/her operating instructions by using Media Player Controls 755. User 50 can input his/her operating instructions by using any other means or methods, or a combination thereof. Media Application 120 can be referred to as and comprises any features, functionalities, and embodiments of Software Application 120.

Media Player Controls 755 comprises the functionality for inputting media operating instructions, data, and/or other inputs, and/or other functionalities. Media Player Controls 755 may include any means of inputting operating instructions, data, and/or other inputs such as by pressing keys or buttons, touching keys or buttons, clicking keys or buttons, sliding physical or graphical components, and/or manipulating other physical, graphical, and/or other elements. Examples of Media Player Controls 755 may include a control wheel (i.e. iPod's control wheel, etc.), a remote controller, a keypad, a touchscreen, a keyboard, a track point, or other input or control device.

Sound Interface 751 comprises the functionality for acoustical processing of output from Media Application 120 (i.e. Software Application 120, etc.) or other disclosed elements, and/or other functionalities. Sound Interface 751 may be or include a sound driver, a sound API, a built-in sound interface, an operating system provided interface, a sound processing device, a sound card, a sound adapter, and/or other sound interface.

Speaker 752 comprises the functionality for producing sound, and/or other functionalities. Speaker 752 can be a built-in or an external speaker, headphone, and/or other sound producing device.

In one example, when User 50 wishes to play a media file on Media Player 70, User 50 can issue an operating instruction to Media Application 120 via Media Player Controls 755 to play the media file. Media Application 120 may then retrieve the media file or a reference thereto from Memory 12, Storage 27, Remote Computing Device 1310, and/or other system or repository and play the media file. In another example, when User 50 wishes to increase or decrease sound volume, User 50 can issue an operating instruction to Media Application 120 via Media Player Controls 755 to increase or decrease sound volume of Speaker 752. In yet another example, when User 50 wishes to skip a specific part of a media file, User 50 can issue an operating instruction to Media Application 120 via Media Player Controls 755 to fast forward a part of the media file. Various other operating instructions and/or operations can be implemented in Media Application 120 examples of which include rewinding, pausing or stopping a media file, changing the view of a media file, renaming a media file, viewing or editing media file information (i.e. Extra Info 630, etc.), deleting a media file, creating, editing or manipulating media file lists, and/or other media player instructions and/or operations. UAIE can learn Media Application's 120 instructions (i.e. Instruction Sets 600 or Operations 610, etc.) and/or contextual information (i.e. Extra Info 630, etc.) used to implement operations such as media file or a reference thereto playing, sound volume changing, fast forwarding, and/or other operations by storing the instructions (i.e. Instruction Sets 600 or Operations 610, etc.) and/or contextual information (i.e. Extra Info 630, etc.) in Knowledgebase 530, Neural Network 850, or other repository, and anticipate future instructions (i.e. anticipatory Instruction Sets 600 or Operations 610, etc.) as previously described.

In some exemplary embodiments, Media Player 70 comprises a music player such as an iPod. Media Application 120 may include or access music files or references thereto stored in Media Player's 70 Memory 12, Storage 27, and/or other local repository, for example. User 50 may listen to a playlist of songs A, B, C, and D. After songs A and B are finished playing, song C would start. After certain time, User 50 may decide that he/she does not like a middle part of song C and User 50 can issue an operating instruction to Media Application 120 to fast forward song C to listen to the ending of song C. Media Application 120 may execute a function such as fastForward (73, . . . ) to implement fast forwarding of song C by 73 seconds, for example. User 50 can then listen to the ending of song C and go on to listen to entire song D in the playlist. UAIE can learn Media Application's 120 function or instruction (i.e. Instruction Set 600 or Operation 610, etc.) used to implement fast forwarding song C. UAIE can also learn contextual information (i.e. Extra Info 630, etc.) such as the name of song C, time offset from the start of song C at which User 50 initiated fast forwarding, and/or other contextual information. UAIE can then anticipate future fast forwarding functions or instructions (i.e. anticipatory Instruction Sets 600 or Operations 610, etc.) as previously described. Next time User 50 plays song C, Media Application 120 can implement fast forwarding and/or other operations autonomously.

In other exemplary embodiments, Media Player 70 may be a desktop computer, smart phone, or network connected television device with web browsing capabilities such as a "smart TV". Media Application 120 may include or access video files or references thereto stored on a Remote Computing Device 1310 accessible over a Network 1300. In one example, the video files can be delivered as a network service such as video or channel streaming service (i.e. Netflix, Google Play, iTunes, etc.). In another example, the video files can be delivered as a network service such as video file downloading service where files are downloaded to Media Player's 70 Memory 12, Storage 27, and/or other local repository and then played. User 50 may prefer specific settings when he/she watches video files on a specific device. For example, User 50 may watch a file from a video streaming service on a desktop computer in his/her office. Upon starting the video file, User 50 may decide to adjust Media Application's 120 window size, volume, subtitles, and/or other settings to his/her preference for a desktop computer and office setting. User 50 may then go to a park on his/her lunch break and watch a file from the video streaming service on a smartphone. Upon starting or continuing a video file, User 50 may decide to adjust Media Application's 120 window size, volume, subtitles, and/or other settings to his/her preference for a smartphone and outdoor setting. User 50 may then go home at the end of the day and watch a file from the video streaming service on a smart TV. Upon starting or continuing a video file, User 50 may decide to adjust Media Application's 120 window size, volume, subtitles, and/or other settings to his/her preference for smart TV and home setting. For each of the Media Players 70 (i.e. desktop computer, smartphone, smart TV, etc.), User 50 can issue operating instructions to Media Application 120 to adjust window size, volume, subtitles, and/or other settings. Media Application 120 may execute functions such as setWindowSize(400, 300, . . . ), setVolume (48, . . . ), and subtitlesOn( ) to implement adjusting window size, volume, and subtitles, for example. UAIE can learn Media Application's 120 functions or instructions (i.e. Instruction Sets 600 or Operations 610, etc.) used to implement adjusting window size, volume, and subtitles. UAIE can also learn contextual information (i.e. Extra Info 630, etc.) such as the type of computing device, display size, and/or other contextual information. UAIE can then anticipate future functions or instructions (i.e. anticipatory Instruction Sets 600 or Operations 610, etc.) as previously described. Next time User 50 watches a video file on a specific Media Player 70 (i.e. desktop computer, smartphone, smart TV, etc.), Media Application 120 can implement adjusting the settings and/or other operations for that particular device autonomously.

In further exemplary embodiments, a global Knowledgebase 530 including video playing knowledge (i.e. Knowledge Cells 800, etc.) of other users may be available to be used in anticipating Media Application's 120 instructions. For example, a Knowledge Cell 800 or other repository may include specific video files and their network locations that users of the global Knowledgebase 530 may find useful in searching for their video content of interest.

In yet other exemplary embodiments, Media Player 70 may be a standard television device without web browsing capabilities. Media Application 120 may include or access cable, satellite, on-the-air, and/or other video channels or references thereto. In one example, User 50 may watch specific channels at specific times (as many television watchers do when they watch daily or weekly scheduled shows), and UAIE can learn the channel switching instructions and their times (i.e. using time stamp, etc.) and autonomously switch to these channels at their specific times. If User 50 is not at home, UAIE can also trigger a recording process learned from User 50 as previously described for later recorded channel watching. In another example, while watching his/her favorite show, User 50 may switch to other channels during commercials in specific time intervals, and UAIE can learn the channel switching instructions and their time intervals (i.e. using time stamp or other Extra Info 630, etc.) and autonomously switch the channels to avoid commercials. In a further example, User 50 may change color, contrast, brightness, and/or other settings based on User's 50 preferences for various types of channels and content (i.e. darker for movies, etc.), and UAIE can learn these settings changing instructions and adjust the settings autonomously. In each of the preceding examples, UAIE can learn Media Application's 120 instructions (i.e. Instruction Sets 600 or Operations 610, etc.) and/or contextual information (i.e. Extra Info 630, etc.) used to implement one or more operations. The instructions (i.e. Instruction Sets 600, etc.) can be disassembled into their portions and stored in Operation 610 or other repository along with any Extra Info 630. Operation 610 can then be stored in Operation List 510 that comprises recently used or implemented (i.e. executed, etc.) Operations 610 or Instruction Sets 600. Knowledge Structuring Unit 520 may create a Knowledge Cell 800 from the Operation List 510 and store the Knowledge Cell 800 in Knowledgebase 530, thereby implementing learning of Media Application's 120 operations as previously described. Furthermore, Decision-making Unit 540 may search for a Knowledge Cell 800 that includes comparative instructions (i.e. comparative Instruction Sets 600 or Operations 610, etc.) used to implement one or more operations. Decision-making Unit 540 may find a Substantially Similar Knowledge Cell 1110 that includes such comparative instructions (i.e. Instruction Sets 600 or Operations 610, etc.). Substantially Similar Knowledge Cell 1110 may also include anticipatory instructions (i.e. anticipatory Instruction Sets 600 or Operations 610, etc.) used to implement subsequent operations. UAIE can then implement the subsequent operations autonomously based on similar operations performed in prior similar circumstances, thereby implementing anticipation of Media Application's 120 operations as previously described.

Any learning, anticipating, and/or other functionalities implemented using Knowledgebase 530 and/or Knowledge Cells 800 can be similarly implemented using Neural Network 850. In each of the preceding examples, instead of creating Knowledge Cells 800 and storing them into Knowledgebase 530, Knowledge Structuring Unit 520 can apply Operations 610 from Operation List 510 onto a Neural Network 850, thereby implementing learning of Media Application's 120 operations as previously described. Furthermore, Decision-making Unit 540 can search for a path in Neural Network 850 that includes comparative instructions (i.e. comparative Instruction Sets 600 or Operations 610, etc.) used to implement one or more operations. Decision-making Unit 540 may find a Substantially Similar Path 855 that includes such comparative instructions (i.e. Instruction Sets 600 or Operations 610, etc.). Substantially Similar Path 855 may also include anticipatory instructions (i.e. anticipatory Instruction Sets 600 or Operations 610, etc.) used to implement subsequent operations. UAIE can then implement the subsequent operations autonomously based on similar operations performed in prior similar circumstances, thereby implementing anticipation of Media Application's 120 operations as previously described.

One of ordinary skill in art will understand that the above exemplary embodiments are merely examples of a media application's operations and of UAIE functionalities with respect to media application, and while all possible embodiments are too voluminous to describe, other embodiments are within the scope of this disclosure.

Figure 54:
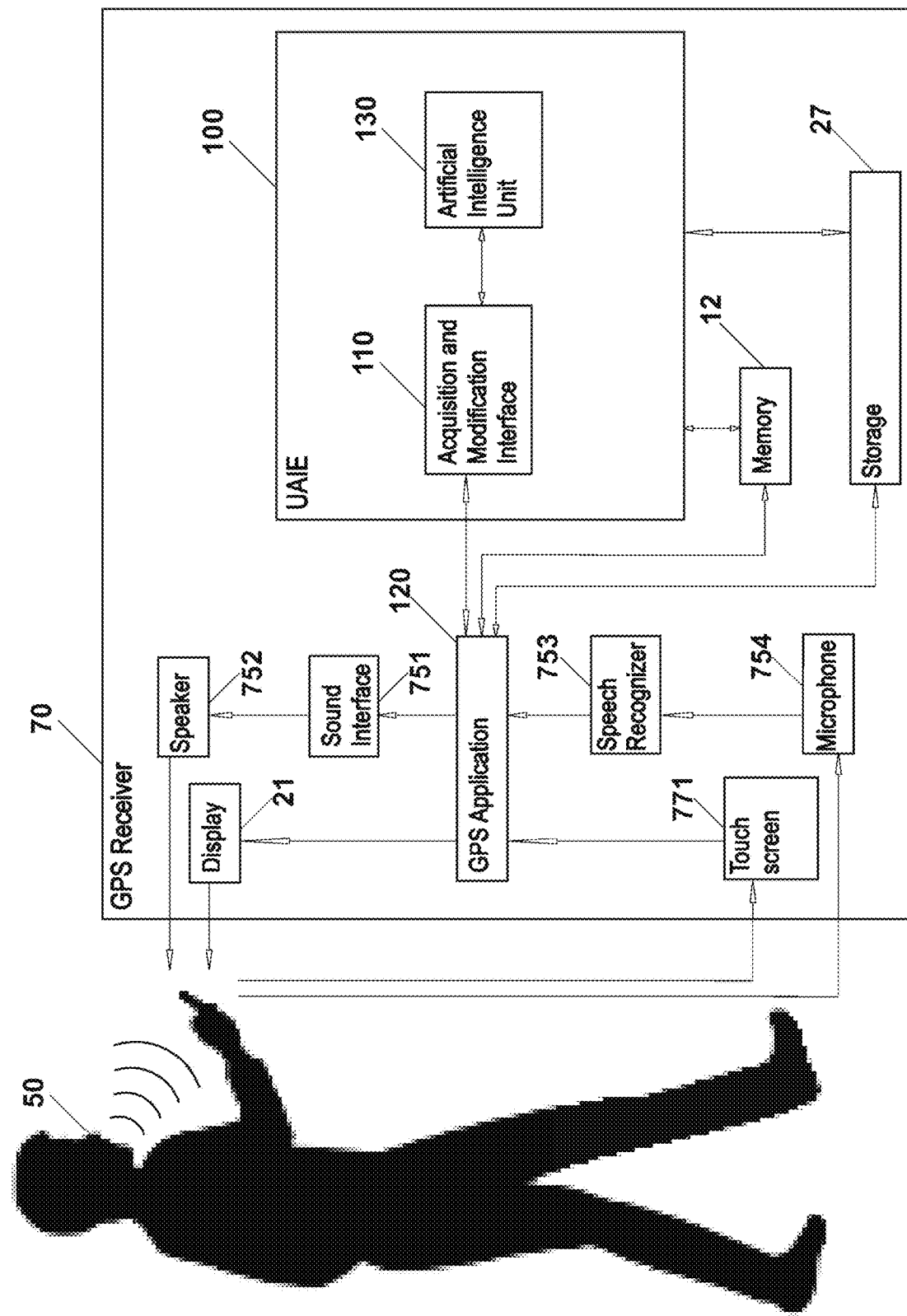
FIG. 54 is a diagram showing an embodiment of UAIE attached to GPS Application 120 executing on GPS Receiver 70.

Referring to FIG. 54, the teaching presented by the disclosure can be implemented in exemplary embodiments to provide UAIE functionalities for a global position system (GPS) application. Such embodiments may include artificial intelligence that enables a GPS receiver or other such device or application to learn the operation of the GPS application, store this knowledge in a knowledgebase, neural network, or other repository, and enable autonomous operation of the GPS application with partial, minimal, or no user input to help the user in his/her use of the GPS receiver.

UAIE can be used on a GPS Receiver 70 (i.e. Computing Device 70, etc.). GPS Receiver 70 may include GPS Application 120 (i.e. Software Application 120, etc.), UAIE, Acquisition and Modification Interface 110, Artificial Intelligence Unit 130, Display 21, Memory 12, Storage 27, Sound Interface 751, Speaker 752, Speech Recognizer 753, Microphone 754, and Touchscreen 771. Other additional elements may be included as needed, or some of the disclosed ones may be excluded, or a combination thereof may be utilized in alternate embodiments.

GPS Receiver 70 comprises the functionality for performing GPS operations, and/or other functionalities. Examples of GPS Receiver 70 include a hand-held GPS receiver, a built-in GPS receiver (i.e. built-in a car or boat, etc.), GPS capable cellular telephone (i.e. smartphone, etc.), and/or other GPS receivers. GPS Receiver 70 can be referred to as and comprises any features, functionalities, and embodiments of Computing Device 70.

In some aspects, GPS Application 120 comprises the functionality for performing GPS operations on GPS Receiver 70, and/or other functionalities. GPS Application 120 comprises the functionality for accessing, managing, manipulating, presenting, performing calculations with, and/or performing other operations on or with location references. Location references can be stored in files, objects, data structures, and/or other such repositories or in a database, DBMS, and/or other such system or repository. A location reference may include latitude/longitude/altitude coordinates, street address, distance from a point, absolute or relative location reference, and/or other location reference. A location reference may also include additional information such as nearby restaurants, museums or other attractions, population information, historic facts, climate/weather information, and/or other additional information pertinent to a specific location reference. GPS Application 120 and/or location references can reside on User's 50 GPS Receiver 70 or on a Remote Computing Device 1310 accessible over a Network 1300, and if on a Remote Computing Device 1310, GPS Application 120 and/or location references may be available as a network service such as online GPS Application 120, web service for updating location references, or other network service. UAIE can attach to and obtain GPS Application's 120 instructions, data, and/or other information and modify execution and/or functionality of GPS Application 120, thereby providing artificial intelligence functionalities to GPS Application 120 as previously described. User 50 can operate GPS Application 120 by using GPS Receiver's 70 control means. In one example, User 50 can input his/her operating instructions by using GPS Receiver's 70 native control means such as Touchscreen 771. In another example, User 50 can input his/her operating instructions by using voice inputs via Microphone 754 and Speech Recognizer 753 that may interpret voice inputs as previously described. User 50 can input his/her operating instructions by using any other means or methods, or a combination thereof. GPS Application 120 can be referred to as and comprises any features, functionalities, and embodiments of Software Application 120.

Touchscreen 771 comprises the functionality for enabling input of operating instructions, data, and/or other inputs, and/or other functionalities. Touchscreen 771 may include any means of inputting operating instructions, data, and/or other inputs such as by touching areas of Touchscreen 771, sliding Touchscreen's 3620 slider components, and/or manipulating other Touchscreen 771 elements.

Speech Recognizer 753 comprises the functionality for processing input events of Microphone 754 for use by GPS Application 120 or other elements, and/or other functionalities. Speech Recognizer 753 comprises the functionality for "listening" to voice events on Microphone 754, interpreting the voice events as User's 50 voice commands, and transmitting the voice commands for use by GPS Application 120 or other elements. Speech Recognizer 753 can be implemented by utilizing, for example, (1) an operating system's speech recognition functionality such as iOS's Voice Services, Siri, etc. which may come inherently as part of the computing device or mobile device package; (2) a Java Speech API (JSAPI) or any of its implementations such as The Cloud Garden, Sphinx, etc.; (3) applications or engines providing speech recognition functionality such as OpenEars, Dragon Mobile, iSpeech, CeedVocal, Flite, Julius, etc.; and/or (4) other systems or techniques including custom ones. Speech Recognizer 753 enables User 50 to issue operating instructions by voice input. In general, Speech Recognizer 753 may identify or recognize speech or sound from Microphone 754 by comparing sample values of digitally sampled sound (or portions thereof) coming from Microphone 754 with sample values of digitally sampled sound from a collection of known sounds. The collection of known sounds can be stored locally on GPS Receiver 70 or remotely on a remote computing device accessible over a network.

Microphone 754 comprises the functionality for receiving and/or detecting User's 50 voice events or inputs, and/or other functionalities. Most modern mobile and computing devices include Microphone 754 as one of the input devices.

In one example, when User 50 wishes to visit a location stored on GPS Receiver 70, User 50 can issue an operating instruction to GPS Application 120 via Touchscreen 771 to calculate a route and provide directions from User's 50 current location to the location User 50 wishes to visit. User's 50 current location can be determined by using satellite signals, cellular signals triangulation, and/or by other methods. In another example, when User 50 wishes to change a route that GPS Application 120 previously calculated, User 50 can issue an operating instruction to GPS Application 120 via Touchscreen 771 to calculate an alternate route and provide directions from User's 50 current location to the location User 50 wishes to visit. In yet another example, when User 50 wishes to view information about a location User 50 wishes to visit (i.e. when User 50 reaches the location, etc.), User 50 can issue an operating instruction to GPS Application 120 via Touchscreen 771 to present location information (i.e. nearby restaurants, museums or other attractions, population information, historic facts, climate/weather information, etc.) on Display 21. Various other operating instructions and/or operations can be implemented in GPS Application 120 examples of which include changing the view of a location reference (i.e. zooming, tilting, moving, etc.), changing the view of a calculated route or directions, increasing or decreasing the volume of any voice directions, adjusting user preferences (i.e. calculating quickest or shortest routes, avoiding toll roads, screen color preferences, language preferences, etc.), updating location references (i.e. updating from a network service, etc.), renaming a location reference, viewing or editing location reference information (i.e. Extra Info 630, etc.), deleting a location reference, and/or any other GPS receiver instructions and/or operations. UAIE can learn GPS Application's 120 instructions (i.e. Instruction Sets 600 or Operations 610, etc.) and/or contextual information (i.e. Extra Info 630, etc.) used to implement operations such as calculating a route, changing a route, viewing a location information, and/or other operations by storing the instructions (i.e. Instruction Sets 600 or Operations 610, etc.) and/or contextual information (i.e. Extra Info 630, etc.) in Knowledgebase 530, Neural Network 850, or other repository, and anticipate future instructions (i.e. anticipatory Instruction Sets 600 or Operations 610, etc.) as previously described.

In some exemplary embodiments, GPS Receiver 70 comprises a network connected GPS receiver. GPS Application 120 may include or access location references stored in GPS Receiver's 70 Memory 12, Storage 27, and/or other local repository, or on a Remote Computing Device 1310 accessible over a Network 1300. As User 50 operates GPS Application 120 in his/her pursuit of visiting locations of interest, UAIE can learn GPS Application's 120 instructions (i.e. Instruction Sets 600 or Operations 610, etc.) and/or contextual information (i.e. Extra Info 630, etc.), and anticipate future instructions (i.e. anticipatory Instruction Sets 600 or Operations 610) as previously described. Additionally, a global Knowledgebase 530 including location visiting knowledge (i.e. Knowledge Cells 800, etc.) of other users may be available to be used in anticipating GPS Application's 120 instructions. For example, a Knowledge Cell 800 or other repository may include specific locations that users of the global Knowledgebase 530 may find useful in searching for their locations of interest to visit. Specifically, for example, User 50 may come to a city for the first time and look for places of interest to visit. After User 50 discovers and visits a great restaurant and/or an interesting museum, UAIE can anticipate User's 50 future location visiting instructions based on location visits of other users in the global Knowledgebase 530 who visited the same or similar restaurant and/or museum. In this and each of the preceding examples, UAIE can learn GPS Application's 120 instructions (i.e. Instruction Sets 600 or Operations 610, etc.) and/or contextual information (i.e. Extra Info 630, etc.) used to implement one or more operations. The instructions (i.e. Instruction Sets 600, etc.) can be disassembled into their portions and stored in Operation 610 or other repository along with any Extra Info 630. Operation 610 can then be stored in Operation List 510 that comprises recently used or implemented (i.e. executed, etc.) Operations 610 or Instruction Sets 600. Knowledge Structuring Unit 520 may create a Knowledge Cell 800 from the Operation List 510 and store the Knowledge Cell 800 in Knowledgebase 530, thereby implementing learning of GPS Application's 120 operations as previously described. Furthermore, Decision-making Unit 540 may search for a Knowledge Cell 800 that includes comparative instructions (i.e. comparative Instruction Sets 600 or Operations 610, etc.) used to implement one or more operations. Decision-making Unit 540 may find a Substantially Similar Knowledge Cell 1110 that includes such comparative instructions (i.e. Instruction Sets 600 or Operations 610, etc.). Substantially Similar Knowledge Cell 1110 may also include anticipatory instructions (i.e. anticipatory Instruction Sets 600 or Operations 610, etc.) used to implement subsequent operations. UAIE can then implement the subsequent operations autonomously based on similar operations performed in prior similar circumstances, thereby implementing anticipation of GPS Application's 120 operations as previously described.

Any learning, anticipating, and/or other functionalities implemented using Knowledgebase 530 and/or Knowledge Cells 800 can be similarly implemented using Neural Network 850. In each of the preceding examples, instead of creating Knowledge Cells 800 and storing them into Knowledgebase 530, Knowledge Structuring Unit 520 can apply Operations 610 from Operation List 510 onto a Neural Network 850, thereby implementing learning of GPS Application's 120 operations as previously described. Furthermore, Decision-making Unit 540 can search for a path in Neural Network 850 that includes comparative instructions (i.e. comparative Instruction Sets 600 or Operations 610, etc.) used to implement one or more operations. Decision-making Unit 540 may find a Substantially Similar Path 855 that includes such comparative instructions (i.e. Instruction Sets 600 or Operations 610, etc.). Substantially Similar Path 855 may also include anticipatory instructions (i.e. anticipatory Instruction Sets 600 or Operations 610, etc.) used to implement subsequent operations. UAIE can then implement the subsequent operations autonomously based on similar operations performed in prior similar circumstances, thereby implementing anticipation of GPS Application's 120 operations as previously described.

One of ordinary skill in art will understand that the above exemplary embodiments are merely examples of a GPS application's operations and of UAIE functionalities with respect to GPS application, and while all possible embodiments are too voluminous to describe, other embodiments are within the scope of this disclosure.

Figure 55:
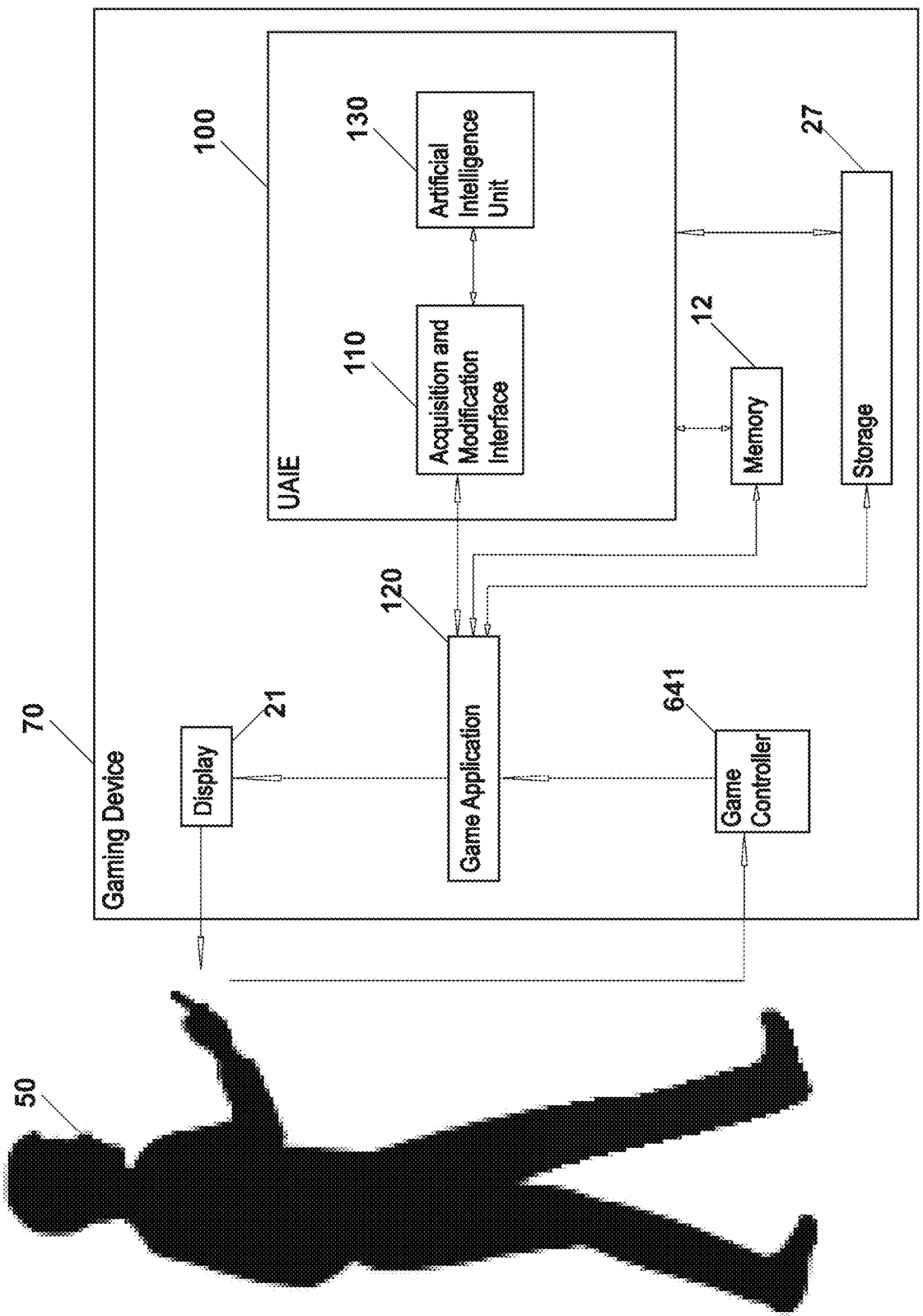
FIG. 55 is a diagram showing an embodiment of UAIE attached to Game Application 120 executing on Gaming Device 70.

Referring to FIG. 55, the teaching presented by the disclosure can be implemented in exemplary embodiments to provide UAIE functionalities for a computer game (also referred to as video game, game application, game, or other such reference, etc.). Such embodiments may include artificial intelligence that enables a gaming device or other such device or application to learn the operation of the computer game and/or any of its objects (i.e. player's avatar, opponent's avatar, computer object, etc.), store this knowledge in a knowledgebase, neural network, or other repository, and enable autonomous operation of the computer game and/or any of its objects with partial, minimal, or no user input to help the user in his/her use of the computer game.

UAIE can be used on Gaming Device 70 (i.e. Computing Device 70, etc.). Gaming Device 70 may include Game Application 120 (i.e. Software Application 120, etc.), UAIE, Acquisition and Modification Interface 110, Artificial Intelligence Unit 130, Display 21, Memory 12, Storage 27, and Game Controller 641. Other additional elements may be included as needed, or some of the disclosed ones may be excluded, or a combination thereof may be utilized in alternate embodiments.

Gaming Device 70 comprises the functionality for processing or implementing computer games (i.e. Game Applications 120, etc.), and/or other functionalities. Examples of Gaming Device 70 include a video game console (i.e. Sony PlayStation, Microsoft Xbox, etc.), arcade machine, laptop or desktop computer, tablet computer, computing capable telephone (i.e. smartphone, cellular phone, etc.), server, and/or other gaming or computing devices. Gaming Device 70 can be referred to as and comprises any features, functionalities, and embodiments of Computing Device 70.

In some aspects, Game Application 120 comprises the functionality for performing gaming operations on Gaming Device 70, and/or other functionalities. Various types of Game Applications 120 exist such as 2D, 3D, single player, multi-player, strategic, action, adventure, word puzzles, mind games, and/or other game types. One of ordinary skill in art will understand that while all possible embodiments of Game Applications 120 or their types are too voluminous to list, they are all within the scope of this disclosure. Examples of some popular Game Applications 120 include Tetris, Pac-man, Solitaire, Super Mario, Doom, Command and Conquer, Grand Theft Auto, and/or others. UAIE can attach to and obtain Game Application's 120 instructions, data, and/or other information and modify execution and/or functionality of Game Application 120, thereby providing artificial intelligence functionalities to Game Application 120 as previously described. Game Application 120 can reside on User's 50 Gaming Device 70 or on a Remote Computing Device 1310 accessible over a Network 1300, and if on a Remote Computing Device 1310, Game Application 120 may be available as a network service such as zynga.com, games.com, and/or other online gaming services. User 50 can operate Game Application 120 by using Gaming Device's 70 control means. In one example, User 50 can input his/her game playing instructions by using Gaming Device's 70 native control means such as Game Controller 641. In another example, User 50 can input his/her game playing instructions by using a camera or other detector that captures User's 50 body movements. In yet another example, User 50 can input his/her game playing instructions by using voice inputs via Microphone 754 and Speech Recognizer 753 that may interpret voice inputs. User 50 can input his/her operating or game playing instructions by using any other means or methods, or a combination thereof. Game Application 120 can be referred to as and comprises any features, functionalities, and embodiments of Software Application 120.

Game Controller 641 comprises the functionality for enabling input of game playing instructions, data, and/or other inputs, and/or other functionalities. Game Controller 641 may include any means of inputting operating instructions, data, and/or other inputs such as by pressing keys or buttons, touching keys or buttons, clicking keys or buttons, moving or sliding physical or graphical components, and/or manipulating other physical, graphical, and/or other elements. Examples of Game Controller 641 include Sony PlayStation or Microsoft Xbox game controller, Sony PlayStation Portable or other handheld game console controller, arcade machine controller, joystick, keyboard, keypad, mouse, steering wheel, glove, weapon (i.e. gun, sword, etc.), touchscreen, control wheel, track point, or other input or control device.

In one example, when User 50 wishes to start a Game Application 120, User 50 can issue an operating instruction to Game Application 120 via Game Controller 641 to start Game Application 120. In another example, when User 50 wishes to move his/her avatar or another object forward in a Game Application 120, User 50 can issue an operating instruction to Game Application 120 via Game Controller 641 to move forward. In yet another example, when User 50 wishes to jump in a Game Application 120, User 50 can issue an operating instruction to Game Application 120 via Game Controller 641 to jump (i.e. elevate player's avatar or another object over an obstacle, etc.). In yet another example, when User 50 wishes to utilize an object in a Game Application 120, User 50 can issue an operating instruction to Game Application 120 via Game Controller 641 to utilize the object (i.e. utilize a shield, open a door, activate a switch, etc.). In yet another example, when User 50 wishes to save a state of a Game Application 120, User 50 can issue an operating instruction to Game Application 120 via Game Controller 641 to save the state of the Game Application 120 (i.e. save the state of a game in a file or other repository for later playing, etc.). Various other game playing or operating instructions and/or operations can be implemented in Game Application 120 examples of which include pausing or stopping a Game Application 120, moving in various directions (i.e. forward, backward, right, left, up, down, angular, diagonal, etc.), selecting or changing appearance of the player's avatar, selecting or utilizing an object, communicating with other players, deleting or renaming a saved game file, and/or other computer game instructions and/or operations. UAIE can learn Game Application's 120 instructions (i.e. Instruction Sets 600 or Operations 610, etc.) and/or contextual information (i.e. Extra Info 630, etc.) used to implement operations such as starting a game, moving forward, jumping, utilizing an object, saving a game state, and/or other operations by storing the instructions (i.e. Instruction Sets 600 or Operations 610, etc.) and/or contextual information (i.e. Extra Info 630, etc.) in Knowledgebase 530, Neural Network 850 or other repository, and anticipate future instructions (i.e. anticipatory Instruction Sets 600 or Operations 610, etc.) as previously described.

In some exemplary embodiments, Gaming Device 70 comprises a video game console such as Sony PlayStation or Microsoft Xbox, handheld game console such as Sony PlayStation Portable or Nintendo 3DS, or other game console. In one example, User 50 can perform various actions or operations to defeat an opponent such as hit the opponent with body parts or objects (i.e. fists, handheld weapons, etc.), shoot the opponent with firearms (i.e. guns, missiles, etc.), use magic on the opponent (i.e. magical objects or weapons, etc.), and/or perform other actions or operations. In some aspects, each type of opponent can be defeated by performing specific actions or operations for that type of opponent such as a fighter in a martial arts game may need to be hit in the head a number of times or in the chest a number of times, or both. In another example, User 50 can perform various moves or maneuvers to overcome an obstacle such as jump over an obstacle, crawl under an obstacle, move around an obstacle, climb over an obstacle, fly over an obstacle, and/or perform other moves or maneuvers. In some aspects, each type of obstacle may be overcome by performing specific moves or maneuvers for that type of obstacle. In yet another example, User 50 can save a state of the game played in regular or other intervals (i.e. every 30 minutes, etc.), after reaching a certain stage in the game (i.e. after completing a level, etc.), or at other times or stages in the game. User 50 may pause the game, select saving operation, select default name or name the file or object into which to save the game, resume the game, and/or perform other operations. In yet another example, User 50 can have a preference for specific game settings (i.e. number of players, game difficulty, etc.), game object settings (i.e. appearance of player's avatar, player's avatar's weapons, etc.), and/or other game settings. As User 50 performs actions, operations, moves, or maneuvers in each of the examples above, UAIE can learn Game Application's 120 instructions (i.e. Instruction Set 600 or Operation 610, etc.) and/or contextual information (i.e. Extra Info 630, etc.) used to implement actions, operations, moves or maneuvers such as to defeat opponent, to overcome an obstacle, to save a game, to adjust game settings, and/or other actions, operations, moves, or maneuvers. UAIE can also anticipate future instructions (i.e. anticipatory Instruction Sets 600 or Operations 610, etc.) to defeat opponent, to overcome an obstacle, to save a game, to adjust game settings, and/or to perform other actions, operations, moves, or maneuvers autonomously as previously described.

Figure 56:
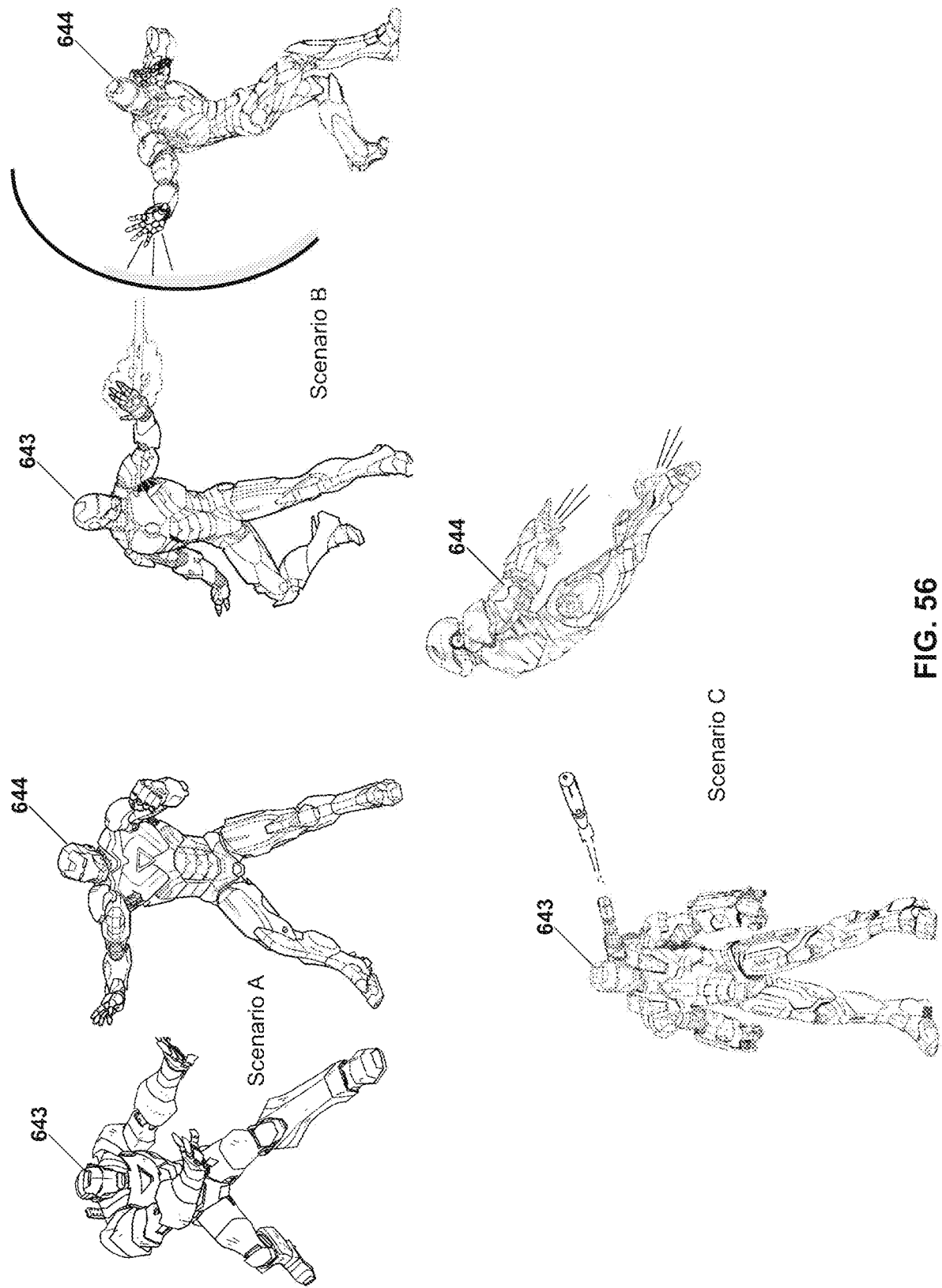
FIG. 56 shows an embodiment of User's Avatar 643 performing various actions, moves, maneuvers, behaviors, and/or other operations while engaging Opponent 644.

Referring to FIG. 56, in some exemplary embodiments, User 50 may play a game (i.e. Game Application 120, etc.) in which User's Avatar 643 is near Opponent 644 and User 50 may want to engage Opponent 644 to defeat it. User 50 may want to perform various actions, moves, maneuvers, behaviors, and/or other operations while engaging Opponent 644 such as moving toward Opponent 644 (i.e. walking, running, flying, etc.), blocking attacks, shooting at Opponent 644, utilizing objects (i.e. utilizing shield, sword, or other objects, etc.), and/or performing other defensive, offensive, evasive, or other actions or operations User 50 deems a good strategy to defeat Opponent 644 or achieve other game goals. Each of the operations can be performed by User's 50 issuing operating instructions to direct User's Avatar 643 on how to act and behave. Once User's 50 operating instructions are received, Game Application 120 can implement the corresponding User's Avatar's 643 actions or operations by executing one or more instructions (i.e. Instruction Sets 600 or Operations 610, etc.) that cause User's Avatar 643 to behave as User 50 directed. UAIE can learn Game Application's 120 instructions (i.e. Instruction Set 600 or Operation 610, etc.) and/or contextual information (i.e. Extra Info 630, etc.) used to implement User's Avatar's 643 or other object's actions. In one example, a User's Avatar's 643 action includes one or more instructions (i.e. Instruction Sets 600 or Operations 610, etc.) to implement showing User's Avatar's 643 head, arms, legs, and/or other body parts on Display 21 such as showing in upright body position with arms extended toward opponent. In another example, a User's Avatar's 643 action includes one or more instructions (i.e. Instruction Sets 600 or Operations 610, etc.) to implement showing any objects that User's Avatar 643 may be using on Display 21 such as showing a handgun in User's Avatar's 643 hands. In yet another example, a User's Avatar's 643 action includes one or more instructions (i.e. Instruction Sets 600 or Operations 610, etc.) to implement showing any effects of User's Avatar's 643 actions on Display 21 such as showing smoke after shooting. A User's Avatar's 643 action may include one or more instructions (i.e. Instruction Sets 600 or Operations 610, etc.) to implement any other action or operation. One or more instructions (i.e. Instruction Sets 600 or Operations 610, etc.) can be included in a function. In some aspects, a function includes all instructions (i.e. Instruction Sets 600 or Operations 610, etc.) needed to implement a certain action or operation and, therefore, a call to the function can implement that action or operation.

In addition to instructions (i.e. Instruction Sets 600 or Operations 610, etc.), UAIE can also learn contextual, geo-spatial, situational, environmental, and/or other information about User's Avatar 643 and/or other objects in a game application. In some aspects, this contextual, geo-spatial, situational, environmental, and/or other information can be stored in Extra Info 630 as previously described. In one example, Extra Info 630 includes any information about User's Avatar 643 such as its location (i.e. coordinates, vector-defined position, absolute or relative position, etc.), its direction (i.e. north, southwest, 13 degrees angular, etc.), its speed, and/or other information. In another example, Extra Info 630 includes any information about objects in a game such as objects name, object's type (i.e. player, rock, forest, pond, building, tank, etc.), object's location (i.e.

coordinates, vector-defined position, absolute or relative position, etc.), object's direction (i.e. east, northwest, 118 degrees angular, etc.), object's speed, and/or other information. In yet another example, Extra Info 630 includes any information about relationships among objects in a game such as distance among objects, allegiance among objects (i.e. opponent, friend, etc.), and/or other information. Extra Info 630 may include any information about a game application or any objects in a game application in alternate embodiments. Such Extra Info 630 can then provide geo-spatial and situational awareness and/or other capabilities. In some aspects, Decision-making Unit 540 and/or other disclosed elements can utilize Extra Info 630 to best anticipate future Game Application's 120 instructions (i.e. anticipatory Instruction Sets 600 or Operations 610, etc.) as previously described.

Contextual, geo-spatial, situational, environmental, and/or other information about User's Avatar 643 and/or other objects in a Game Application 120 can be obtained by utilizing functions or methods of the 2D or 3D engine or environment in which the Game Application 120 is implemented. For example, location (i.e. coordinates, vector-defined position, absolute or relative position, etc.) of an avatar or other object in a 2D or 3D environment can be obtained by utilizing a function such as GameObject.Find ("ObjectN").transform.position in Unity 3D Engine, GetActorLocation( ) in Unreal Engine, getPosition( ) in Torque 3D, and/or other similar function or method in other 2D and 3D engines or environments. Furthermore, location (i.e. coordinates, etc.) of an avatar or other object on a screen can be obtained by utilizing WorldToScreen( ) or similar function or method in various 2D or 3D engines or environments. An avatar's or other object's direction, speed, trajectory, and/or other information can then be computed from its coordinates. Other information (i.e. name, type, allegiance, etc.) about an avatar or other object in a Game Application 120 can similarity be obtained by utilizing functions or methods of the 2D or 3D engine or environment in which the Game Application 120 is implemented or by utilizing functions or methods of custom built objects within the Game Application 120.

Once UAIE has learned instructions (i.e. Instruction Sets 600 or Operations 610, etc.) and/or contextual, geo-spatial, situational, environmental, and/or other information (i.e. Extra Info 630, etc.), in future instances where User's Avatar 643 or other object encounters a similar situation including Opponent 644 and/or other objects, UAIE can enable autonomous operation of User's Avatar 643 or other objects by causing Game Application 120 to implement instructions (i.e. anticipatory Instruction Sets 600 or Operations 610, etc.) autonomously as previously described. Therefore, UAIE enables learning of a particular player's (i.e. User's 50, etc.) methodology or style of playing the game. In some aspects, learning of a particular player's (i.e. User's 50, etc.) methodology or style of playing the game includes learning the player's (i.e. User's 50, etc.) directing or operating User's Avatar 643 in certain contextual, geo-spatial, situational, environmental, and/or other circumstances. For example, one player may shoot opponent while another player may strike the opponent with a sword. Also, one player may jump over an obstacle while another player may move around the obstacle. Further, one player may drive fast in a racing game while another player may drive cautiously, etc. The knowledge of User's 50 methodology or style of playing the game can be used to provide autonomous functionalities such as auto-pilot and/or other automatic playing functionalities to Game Application 120, User's Avatar 643, and/or other objects in the game. In one example, auto-pilot, automatic, and/or other autonomous playing functionalities can be utilized in games where User 50 may need to direct or operate more than one avatar such as games in which User 50 can switch among avatars and operate an active avatar while other user's avatars operate automatically or autonomously. In another example, auto-pilot, automatic, and/or other autonomous playing functionalities can be utilized in situations where user may want to allow his/her avatar to operate automatically or autonomously such as in situations when user is distracted (i.e. gets a phone cal, etc.) and does not want to pause the game, and/or in other situations. Auto-pilot, automatic, and/or other autonomous playing functionalities can be activated to take control manually by User 50 such as user's switching to another avatar, or automatically by the system such as Decision-making Unit's 540 finding a Knowledge Cell 800 with high degree of matching accuracy and executing it. Auto-pilot, automatic, and/or other autonomous playing functionalities can be effective for any number of actions or operations such as for a single or multiple actions or operations, or for any period of time such as for a second, for a number of minutes, or continuously. Furthermore, knowledge of User's 50 methodology or style of playing the game can be utilized to enable operation of artificially intelligent avatars that operate with full or partial autonomy. An artificially intelligent avatar may exemplify User's 50 methodology or style of playing the game as learned from User 50. One or more artificially intelligent avatars can be utilized in Game Application 120 to assist User 50 in defeating Opponent 644 or achieving another game goal. In one example, User 50 can utilize a team or army of artificially intelligent avatars each of which may exemplify User's 50 methodology or style of playing the game. Artificially intelligent avatars may be dispersed around User's Avatar 643 within a specific radius and follow User's Avatar's 643 movement. In another example, artificially intelligent avatars may move autonomously toward a certain point or goal in a game. In yet other example, artificially intelligent avatars can be completely autonomous and move without any directions and rely completely on the knowledge learned from User's 50 methodology or style of playing the game.

In some embodiments, UAIE enables a professional or other experienced game player to record his/her methodology or style of playing a game. The knowledge (i.e. Knowledge Cells 800, etc.) of User's 50 methodology or style of playing a game can be stored in Knowledgebase 530 or other repository. If the knowledge (i.e. Knowledge Cells 800, etc.) of User's 50 methodology or style of playing a game is stored in a global Knowledgebase 530, any Game Application 120 or UAIE having access (i.e. over a network, etc.) to the global Knowledgebase 530 can implement User's 50 methodology or style of playing a game as previously described. User 50 can sell his/her knowledge (i.e. Knowledge Cells 800 or entire Knowledgebase 530, etc.) to other users who may want to implement User's 50 methodology or style of playing a game. User 50 can sell his/her knowledge (i.e. Knowledge Cells 800 or entire Knowledgebase 530, etc.) under a commercial or other license. Buyers of the Knowledge Cells 800 or Knowledgebase 530 can use it for various purposes such as to improve their own actions, moves, maneuvers, behaviors, and/or other operations in playing the game, to enable other characters (i.e. support characters, avatars, or other objects, etc.) to act, move, maneuver, behave, and/or perform other operations according to the methodology or style of User 50, or use it for any other purpose. In some aspects, a buyer can load the bought Knowledge Cells 800 or Knowledgebase 530 into his/her UAIE. Once loaded, the Knowledge Cells 800 or Knowledgebase 530 can be initiated or activated manually as an executable sequence or automatically through UAIE's decision making process. Buyer's Game Application 120 can then implement anticipatory instructions (i.e. anticipatory Instruction Sets 600 or Operations 610, etc.) included in the bought Knowledge Cells 800 or Knowledgebase 530 as previously described. Any learning, anticipating, and/or other functionalities implemented using Knowledgebase 530 and/or Knowledge Cells 800 can be similarly implemented using Neural Network 850 as previously described. For example, instead of storing User's 50 methodology or style of playing a game in Knowledgebase 530 and/or Knowledge Cells 800, User's 50 methodology or style of playing a game can be stored in Neural Network 850 as previously described.

In further embodiments, location, distance, direction, movement, and/or other features or attributes of objects in Game Application 120 or other application may include or be determined from coordinates or other location-defining techniques. Such coordinates may include x (i.e. latitude, etc.), y (i.e. longitude, etc.), z (i.e. altitude, etc.), and/or other coordinates. Any other systems of coordinates or location-defining techniques can be used such as, for example, a vector-based method, angle and distance from a reference point, intersecting angles from various reference points, triangulation, absolute position, relative position, and/or other systems or techniques.

In further embodiments, objects within a game (i.e. player's avatar, opponent's avatar, forest, rock, pond, building, tank, etc.) can be implemented as data objects in Game Application's 120 design or code. In some aspects, UAIE can be selective in learning Game Application's 120 instructions (i.e. Instruction Sets 600 or Operations 610, etc.) and/or contextual information (i.e. Extra Info 630, etc.) to include those instructions and/or contextual information implemented or related to a specific object. In one example, UAIE can learn Game Application's 120 instructions (i.e. Instruction Sets 600 or Operations 610, etc.) and/or contextual information (i.e. Extra Info 630, etc.) implemented or related to User's Avatar 643. In another example, UAIE can learn Game Application's 120 instructions (i.e. Instruction Sets 600 or Operations 610, etc.) and/or contextual information (i.e. Extra Info 630, etc.) implemented or related to Opponent 644 even if Opponent 644 may be a computer-directed or another-player-directed object. In yet another example, UAIE can learn Game Application's 120 instructions (i.e. Instruction Sets 600 or Operations 610, etc.) and/or contextual information (i.e. Extra Info 630, etc.) implemented or related to any other object (i.e. forest, pond, rock, building, tank, etc.).

In examples shown in FIG. 56, User's Avatar 643 may confront Opponent 644 as in scenarios A, B, and C. In an example in scenario A, Opponent 644 may attempt a physical attack on User's Avatar 643 such as an attempt to punch User's Avatar 643 as shown. User 50 may decide to move User's Avatar 643 into a blocking position or posture to block the incoming punch. Game Application's 120 instructions (i.e. Instruction Sets 600 or Operations 610, etc.) that implement the blocking posture may include a function such as blockPunch(Param1, Param2, . . . ) that can be disassembled and stored along with any contextual, geo-spatial, situational, environmental, and/or other information (i.e. Extra Info 630, etc.) as previously described. In an example in scenario B, Opponent 644 may utilize an object such as a shield to deflect incoming projectiles as shown. User 50 may decide to direct User's Avatar 643 to shoot Opponent 644 with a laser beam that Opponent's 644 shield cannot deflect. Game Application's 120 instructions (i.e. Instruction Sets 600 or Operations 610, etc.) that implement a laser shooting action may include a function such as shootLaser (Param1, Param2, . . . ) that can be disassembled and stored along with any contextual, geo-spatial, situational, environmental, and/or other information (i.e. Extra Info 630, etc.) as previously described. In an example in scenario C, Opponent 644 may fly near User's Avatar 643 as shown. User 50 may decide to direct User's Avatar 643 to shoot Opponent 644 with a missile (i.e. homing missile, etc.) that can reach Opponent 644 in flight. Game Application's 120 instructions (i.e. Instruction Sets 600 or Operations 610, etc.) that implement a missile shooting action may include a function such as shootMissile(Param1, Param2, . . . ) that can be disassembled and stored along with any contextual, geo-spatial, situational, environmental, and/or other information (i.e. Extra Info 630, etc.) as previously described. In scenarios A, B, C, and/or other various scenarios, Game Application 120 can implement any number of instructions (i.e. Instruction Sets 600, etc.) or functions that can be disassembled into their portions and stored into Operation 610 or other repository along with any contextual, geo-spatial, situational, environmental, and/or other information (i.e. Extra Info 630, etc.). Operation 610 can then be stored in Operation List 510 that comprises recently used or implemented (i.e. executed, etc.) Operations 610 or Instruction Sets 600. Knowledge Structuring Unit 520 may create a Knowledge Cell 800 from the Operation List 510 and store the Knowledge Cell 800 in Knowledgebase 530, thereby implementing learning of User's Avatar's 643 operations within Game Application 120. Any learning, anticipating, and/or other functionalities implemented using Knowledgebase 530 and/or Knowledge Cells 800 can be similarly implemented using Neural Network 850. In each of the preceding examples, instead of creating Knowledge Cells 800 and storing them into Knowledgebase 530, Knowledge Structuring Unit 520 can apply Operations 610 from Operation List 510 onto a Neural Network 850, thereby implementing learning of Game Application's 120 operations as previously described.

In some aspects, Autonomous Avatar 648 or other autonomous object may include autonomous user's avatar, any other autonomous avatar or character, and/or any autonomous object whether controlled by UAIE or other method, system, or function. Autonomous Avatar 648 or other autonomous object may include knowledge (i.e. Knowledge Cells 800, etc.) of actions, moves, maneuvers, behaviors, and/or other operations learned from User 50. In one example, Autonomous Avatar 648 or other autonomous object may encounter Opponent 644 as in or similar to scenario A in FIG. 56. Decision-making Unit 540 may search for a Knowledge Cell 800 that includes similar object (i.e. Opponent 644, etc.) and/or its properties (i.e. punching posture, etc.) in Autonomous Avatar's 648 surrounding. Substantial Similarity Comparison 1010 (i.e. performed by or for Decision-making Unit, etc.) may find a Substantially Similar Knowledge Cell 1110 that includes Opponent 644 or other similar object in a punching or other similar posture, and that includes instructions (i.e. Instruction Sets 600 or Operations 610, etc.) used to implement a blocking action as in scenario A when User 50 directed User's Avatar 643. UAIE can then implement the blocking action autonomously based on similar operations performed in prior similar circumstances, thereby implementing anticipation of Game Application's 120 operations as previously described. In another example, Autonomous Avatar 648 or other autonomous object may encounter Opponent 644 as in or similar to scenario B in FIG. 56. Decision-making Unit 540 may search for a Knowledge Cell 800 that includes a similar object (i.e. Opponent 644, etc.) and/or its properties (i.e. utilizing a shield, etc.) in Autonomous Avatar's 648 surrounding. Substantial Similarity Comparison 1010 (i.e. performed by or for Decision-making Unit, etc.) may find a Substantially Similar Knowledge Cell 1110 that includes Opponent 644 or other similar object utilizing a shield or other similar item, and that includes instructions (i.e. Instruction Sets 600 or Operations 610, etc.) used to implement a laser shooting action as in scenario B when User 50 directed User's Avatar 643. UAIE can then implement the laser shooting action autonomously based on similar operations performed in prior similar circumstances, thereby implementing anticipation of Game Application's 120 operations as previously described. In another example, Autonomous Avatar 648 or other autonomous object may encounter Opponent 644 as in or similar to scenario C in FIG. 56. Decision-making Unit 540 may search for a Knowledge Cell 800 that includes similar object (i.e. Opponent 644, etc.) and/or its properties (i.e. flying, etc.) in Autonomous Avatar's 648 surrounding. Substantial Similarity Comparison 1010 (i.e. performed by or for Decision-making Unit, etc.) may find a Substantially Similar Knowledge Cell 1110 that includes Opponent 644 or other similar object flying or performing other similar maneuver, and that includes instructions (i.e. Instruction Sets 600 or Operations 610, etc.) used to implement a missile shooting action as in scenario B when User 50 directed User's Avatar 643. UAIE can then implement the missile shooting action autonomously based on similar operations performed in prior similar circumstances, thereby implementing anticipation of Game Application's 120 operations as previously described. Any learning, anticipating, and/or other functionalities implemented using Knowledgebase 530 and/or Knowledge Cells 800 can be similarly implemented using Neural Network 850. In each of the preceding examples, Decision-making Unit 540 can search for a path in Neural Network 850 that includes similar objects and/or their properties in Autonomous Avatar's 648 surrounding. Decision-making Unit 540 may find a Substantially Similar Path 855 that includes such similar objects and/or their properties, and that includes instructions (i.e. Instruction Sets 600 or Operations 610, etc.) used to implement User's 50 operations in similar circumstances. UAIE can then implement the operations autonomously based on similar operations performed in prior similar circumstances, thereby implementing anticipation of Game Application's 120 operations as previously described.

Figure 57:
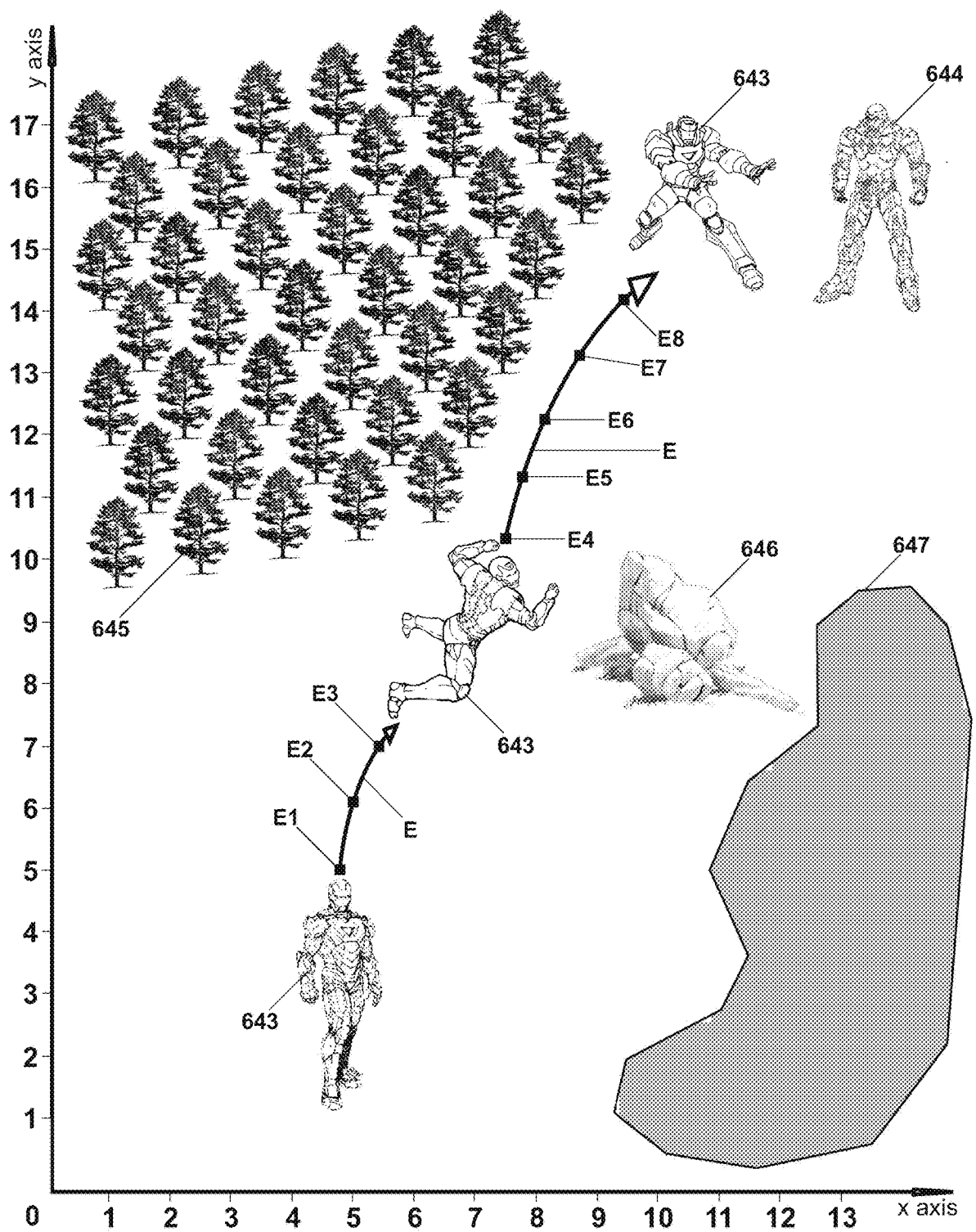
FIG. 57 shows an embodiment of User's Avatar 643 moving and performing other operations on a path toward Opponent 644.

In a game application example shown in FIG. 57, User 50 may detect Opponent 644 and choose to move User's Avatar 643 on Path E toward Opponent 644 to confront Opponent 644. User's Avatar 643 may be in upright posture in Location E1 with coordinates [5,5]. User 50 may decide to move User's Avatar 643 into Location E2 with coordinates [5.2,6] on Path E toward Opponent 644 as shown. Game Application's 120 instructions (i.e. Instruction Sets 600 or Operations 610, etc.) that implement the move may include a function such as moveAvatar(5.2, 6, . . . ) that can be disassembled and stored along with any contextual, geo-spatial, situational, environmental, and/or other information (i.e. Extra Info 630, etc.) as previously described. In one example, information that can be stored in Extra Info 630 includes User's Avatar's 643 current (i.e. [5.2,6]) and prior (i.e. [5,5]) coordinates from which direction of movement (i.e. northeast, 87 degrees, etc.) or other information can be computed (i.e. computed contextual information, etc.) later in the process. In some aspects, direction of movement or other computed information can be pre-computed such as at a time when the instruction (i.e. Instruction Set 600 or Operation 610, etc.) implementing the move is disassembled, and the pre-computed direction of movement or other computed information can be stored as Extra Info 630 so no calculation is necessary later in the process. In another example, Extra Info 630 may store User's Avatar's 643 body position or posture such as upright posture, crawling posture, and/or other postures. In another example, Extra Info 630 may store coordinates of objects surrounding User's Avatar 643 such as Opponent's 644 coordinates [13,16], Forest 645 coordinates [5,14], Rock 646 coordinates [10,8], Pond 647 coordinates [13,4], and/or other objects' coordinates or locations. In some aspects, coordinates of the center or any other point of a large object such as Forest 645, Rock 646, Pond 647, and/or others can be utilized to provide information on the object's location. In other aspects, coordinates of more than one point of a large object that spans multiple screens such as Forest 645, Pond 647, and/or others can be utilized to provide information on the object's location. In yet other aspects, coordinates of the boundaries or points thereon of a large object such as Forest 645, Rock 646, Pond 647, and/or others can be utilized to provide information on the shape of the object in addition to its location. In yet another example, Extra Info 630 may store types of objects surrounding User's Avatar 643 such as Opponent 644 being robot object type, Forest 645 being camouflage object type, Rock 646 being cover object type, Pond 647 being camouflage object type, and/or other object types. Objects types may be different in different games such as Pond 647 may be body-of-water object type in other games. Any other object types can be used depending on the game. Any other contextual, geo-spatial, environmental, situational, and/or other information about User's Avatar 643 and/or objects in the game can be stored in Extra Info 630. User 50 may then decide to move User's Avatar 643 into Location E3 with coordinates [5.5,7] toward Opponent 644. Game Application 120 can implement a function such as moveAvatar(5.5, 7, . . . ) that can be stored along with any Extra Info 630 as previously described. User's Avatar 643 may be approaching Opponent's 644 detection area or line of sight and User 50 may decide to position User's Avatar 643 in a crawling posture to avoid detection. Game Application 120 can implement a function such as changePosture ('Crawling', . . . ) that can be stored along with any Extra Info 630 as previously described. User 50 may then decide to move User's Avatar 643 into Location E4 with coordinates [7.5, 10] toward Opponent 644. Game Application 120 can implement a function such as moveAvatar(7.5, 10, . . . ) that can be stored along with any Extra Info 630 as previously described. In some aspects, a single function can be used to implement the change of posture and the move such as moveAvatar("Crawling", 7.5, 10, . . . ) or moveAvatarCrawling(7.5, 10, . . . ). When User's Avatar 643 reaches Opponent 644, User 50 may decide to place User's Avatar 643 into a defensive posture to get ready for close combat as shown. Game Application 120 can implement a function such as changePosture('Defensive', . . . ) that can be stored along with any Extra Info 630 as previously described. In some aspects, User's Avatar's 643 movement may include a single movement such as from Location E1 to Location E8. In other aspects, User's Avatar's 643 movement may include a set of sub-movements such as from Location E1 to Location E2, from Location E2 to Location E3, and so on as shown. In some embodiments, in each Location E1, E2, E3, E4, E5, E6, E7, E8, etc. Game Application 120 can implement a move function, posture changing function, and/or other instruction (i.e. Instruction Set 600, etc.) or function that can be disassembled into its portions and stored in Operation 610 or other repository along with any Extra Info 630. Operation 610 can then be stored in Operation List 510 that comprises recently used or implemented (i.e. executed, etc.) Operations 610 or Instruction Sets 600. Knowledge Structuring Unit 520 may create a Knowledge Cell 800 from the Operation List 510 and store the Knowledge Cell 800 in Knowledgebase 530, thereby implementing learning of User's Avatar's 643 operations within Game Application 120. Any learning, anticipating, and/or other functionalities implemented using Knowledgebase 530 and/or Knowledge Cells 800 can be similarly implemented using Neural Network 850. In each of the preceding examples, instead of creating Knowledge Cells 800 and storing them into Knowledgebase 530, Knowledge Structuring Unit 520 can apply Operations 610 from Operation List 510 onto a Neural Network 850, thereby implementing learning of Game Application's 120 operations as previously described.

Figure 58:
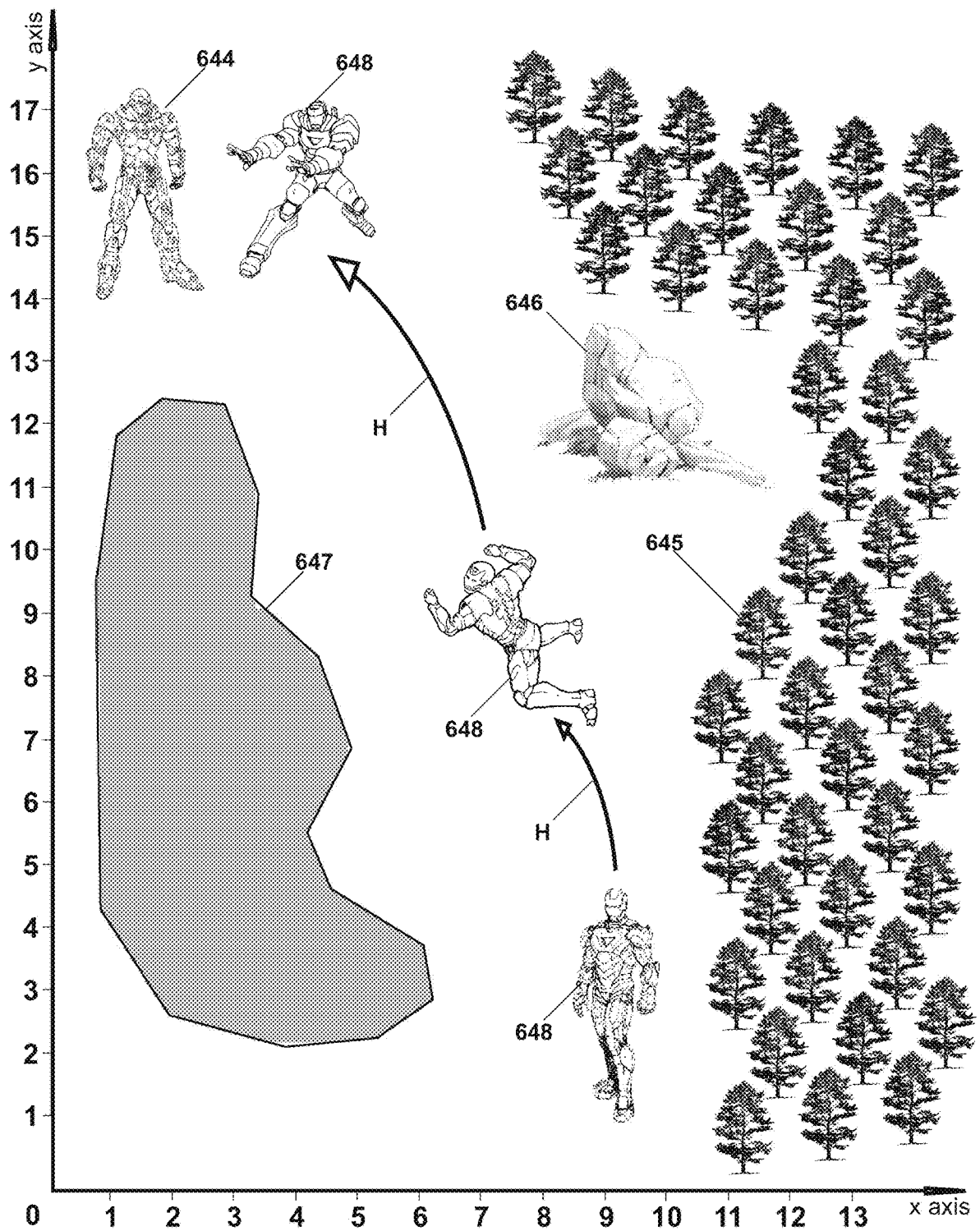
FIG. 58 shows an embodiment of Autonomous Avatar 648 moving and performing other operations on a path toward Opponent 644 based on learned information.

In an example shown in FIG. 58, Autonomous Avatar 648 or other autonomous object may include UAIE functionalities comprising knowledge (i.e. Knowledge Cells 800, etc.) of moves, postures, actions, behaviors, and/or other operations learned from User 50 in past circumstances such as circumstances shown in FIG. 57. Autonomous Avatar 648 or other autonomous object may be near Opponent 644 and/or other objects as shown. Decision-making Unit 540 may search for a Knowledge Cell 800 that includes one or more similar objects (i.e. Opponent 644, Forest 645, Rock 646, Pond 647, etc.) and/or their properties as in Autonomous Avatar's 648 surrounding shown in FIG. 58, for example. Substantial Similarity Comparison 1010 (i.e. performed by or for Decision-making Unit, etc.) may find a Substantially Similar Knowledge Cell 1110 that includes Opponent 644 or other similar object, and that includes instructions (i.e. Instruction Sets 600 or Operations 610, etc.) used to implement User's Avatar's 643 moves, actions, postures, behaviors, and/or other operations in similar circumstances. UAIE can then autonomously implement moves, actions, postures, behaviors, and/or other operations of Autonomous Avatar 648 such as those on Path H in FIG. 58 based on similar moves, actions, postures, behaviors, and/or other operations decided by User 50 in prior similar circumstances (i.e. circumstances shown in FIG. 57, etc.). Any learning, anticipating, and/or other functionalities implemented using Knowledgebase 530 and/or Knowledge Cells 800 can be similarly implemented using Neural Network 850. For example, Decision-making Unit 540 may search for a path in Neural Network 850 that includes one or more similar objects (i.e. Opponent 644, Forest 645, Rock 646, Pond 647, etc.) and/or their properties as in Autonomous Avatar's 648 surrounding shown in FIG. 58. Decision-making Unit 540 may find a Substantially Similar Path 855 that includes Opponent 644 or other similar object, and that includes instructions (i.e. Instruction Sets 600 or Operations 610, etc.) used to implement User's Avatar's 643 moves, actions, postures, behaviors, and/or other operations in similar circumstances. UAIE can then autonomously implement moves, actions, postures, behaviors, and/or other operations of Autonomous Avatar 648 such as those on Path H in FIG. 58 based on similar moves, actions, postures, behaviors, and/or other operations decided by User 50 in prior similar circumstances (i.e. circumstances shown in FIG. 57, etc.).

In some aspects, the moves, actions, postures, behaviors, and/or other operations can be absolute in which case Autonomous Avatar 648 or other autonomous object may perform the same exact moves, actions, postures, behaviors, and/or other operations as the ones stored in Substantially Similar Knowledge Cell 1110 for given circumstances. Absolute moves, actions, postures, behaviors, and/or other operations can be implemented by absolute Instruction Sets 600 or Operations 610. Absolute moves, actions, postures, behaviors, and/or other operations can be suitable for certain types of games such as, for example, pinball simulations, driving simulations, tetris-like games, chess-like games, and/or others where terrain or number or types of objects does not change substantially, and/or where moves, actions, postures, behaviors, and/or other operations are limited in variety. In other aspects, context reliant games such as 3D games, flight simulations, strategic games, and/or others may require performance of moves, actions, postures, behaviors, and/or other operations relative to other objects in the game where the terrain or circumstances change rapidly. Relative moves, actions, postures, behaviors, and/or other operations can be implemented by relative Instruction Sets 600 or Operations 610. As such, importance (i.e. as indicated by Importance Index 640 or another importance ranking technique, etc.) or weight of contextual information (i.e. Extra Info 630, etc.) may be more important than that of Instruction Set Portions 620 in Substantial Similarity Comparisons 1010, for example. Context analysis or interpretation can also be used in context reliant games or other applications. In one example, Decision-making Unit 540, Context Interpreter 1120, and/or other element can analyze one or more Substantially Similar Knowledge Cells 1110 and/or other information and infer that User 50 moved User's Avatar 643 toward Opponent 644 and used various postures or behaviors (i.e. upright, crawling, defensive, etc.). The inference that User's Avatar 643 moved toward Opponent 644 can be drawn by computing that the distance between User's Avatar 643 and Opponent 644 decreased and/or that User's Avatar 643 maintained direction of movement toward Opponent 644. The inference on the timing of User's Avatar's 643 posture changes such as the change from upright into crawling posture can be drawn by computing User's Avatar's 643 distance from Opponent 644 to be approaching Opponent's 644 detection area or line of sight. In some aspects, the computations can be performed using coordinates of User's Avatar 643, coordinates of Opponent 644 or other objects, and/or other attributes, properties, Extra Info 630, or information. Distance, direction, and/or other information can be computed or estimated by using Pythagorean theorem, Eudidean distance formula, trigonometry, and/or other theorems, formulas, or disciplines.

In other aspects, Autonomous Avatar's 648 or other autonomous object's moves, actions, postures, behaviors, and/or other operations can be based on any non-UAIE system or process know in art such as, for example, moving toward opponent or other object as soon as detected, moving toward or through closest camouflage type object (i.e. Forest 645, Pond 647, etc.), moving toward or taking cover in closest cover type object (i.e. Rock 646, building, etc.), taking shortest path to target, taking fastest path to target, taking best way around an obstacle, performing evasive or other maneuvers, and/or other systems, processes, or functions. Such non-UAIE systems or processes may include instructions (i.e. Instruction Sets 600 or Operations 610, etc.) that User 50 did not perform (i.e. not learned from User 50, etc.). In some aspects, these instructions (i.e. Instruction Sets 600 or Operations 610, etc.) can override User 50 learned instructions (i.e. Instruction Sets 600 or Operations 610, etc.). The override functionality enables Autonomous Avatar 648 or other autonomous object to implement strategies, actions, moves, postures, behaviors, and/or other operations that were not learned through UAIE such as, for example, a strategy to engage opponent wherever it may be in the current field of view, a strategy to engage the closest object (i.e. hide in a forest if forest is closest, cover behind a rock if rock is closest, etc.), a strategy to engage a preferred type of object first (i.e. hide in a forest if forest is within sight, cover behind a rock if rock is in between user's avatar and opponent, etc.), and/or other strategies, actions, moves, postures, behaviors, and/or other operations. A non-UAIE system or process may include any instruction (i.e. Instruction Sets 600 or Operations 610, etc.) or function that was not learned or generated through UAIE. In one example, if Autonomous Avatar 648 comes within a certain distance from a specific type of object (i.e. Forest 645, etc.), Game Application 120 may direct Autonomous Avatar 648 into Forest 645 based on forest preference method or function. In another example where both Forest 645 and Opponent 644 are within Autonomous Avatar's 648 detection area, if Opponent 644 is closer than Forest 645, Game Application 120 may implement movement toward Opponent 644 based on shortest path to target method or function. In yet another example where Rock 646 and Opponent 644 are within Autonomous Avatar's 648 detection area, if Rock 646 is closer than and located in a general direction of Opponent 644, Game Application 120 may implement movement toward Rock 646 based on finding cover method or function.

In yet other aspects, a combination of methods or functions can be utilized to direct moves, actions, postures, behaviors, and/or other operations of Autonomous Avatar 648 or other autonomous object. In one example, a non-UAIE system or process can be utilized to direct Autonomous Avatar 648 or other autonomous object in patrolling a specific area in the game in a traversing, roaming, east to west, circular, rectangular, zig-zag, spherical, or other pattern. When Autonomous Avatar 648 or other autonomous object encounters circumstances similar to any of the prior learned circumstances, UAIE can take control and implement instructions (i.e. anticipatory Instruction Sets 600 or Operations 610, etc.) to direct Autonomous Avatar 648 or other autonomous object according to the stored knowledge on how to move, act, behave, and/or otherwise operate in those particular or similar circumstances. In another example, while patrolling an area based on a non-UAIE system or process, Autonomous Avatar 648 or other autonomous object may detect an opponent type object. UAIE may recognize the circumstances as one of the previously stored circumstances and take control from User 50, or another system or process. Autonomous Avatar 648 or other autonomous object may defeat opponent under the control of UAIE at which point UAIE can switch control to User 50, or another system or process. In yet another example, UAIE can take control from User 50, or a non-UAIE system or process at any point such as to place Autonomous Avatar 648 or other autonomous object into a crawling posture when it reaches Opponent's 644 detection area or line of sight as shown in FIG. 58. In yet another example, UAIE can release control to User 50, or to a non-UAIE system or process at any point such as to allow User 50, or a non-UAIE system or process to move Autonomous Avatar 648 or other autonomous object further toward Opponent 644 after UAIE has implemented a crawling posture. In general, UAIE can take control over or release control from any of its related objects at any time, remain in control for any period of time, and share control with other systems or processes as needed.

Figure 59:
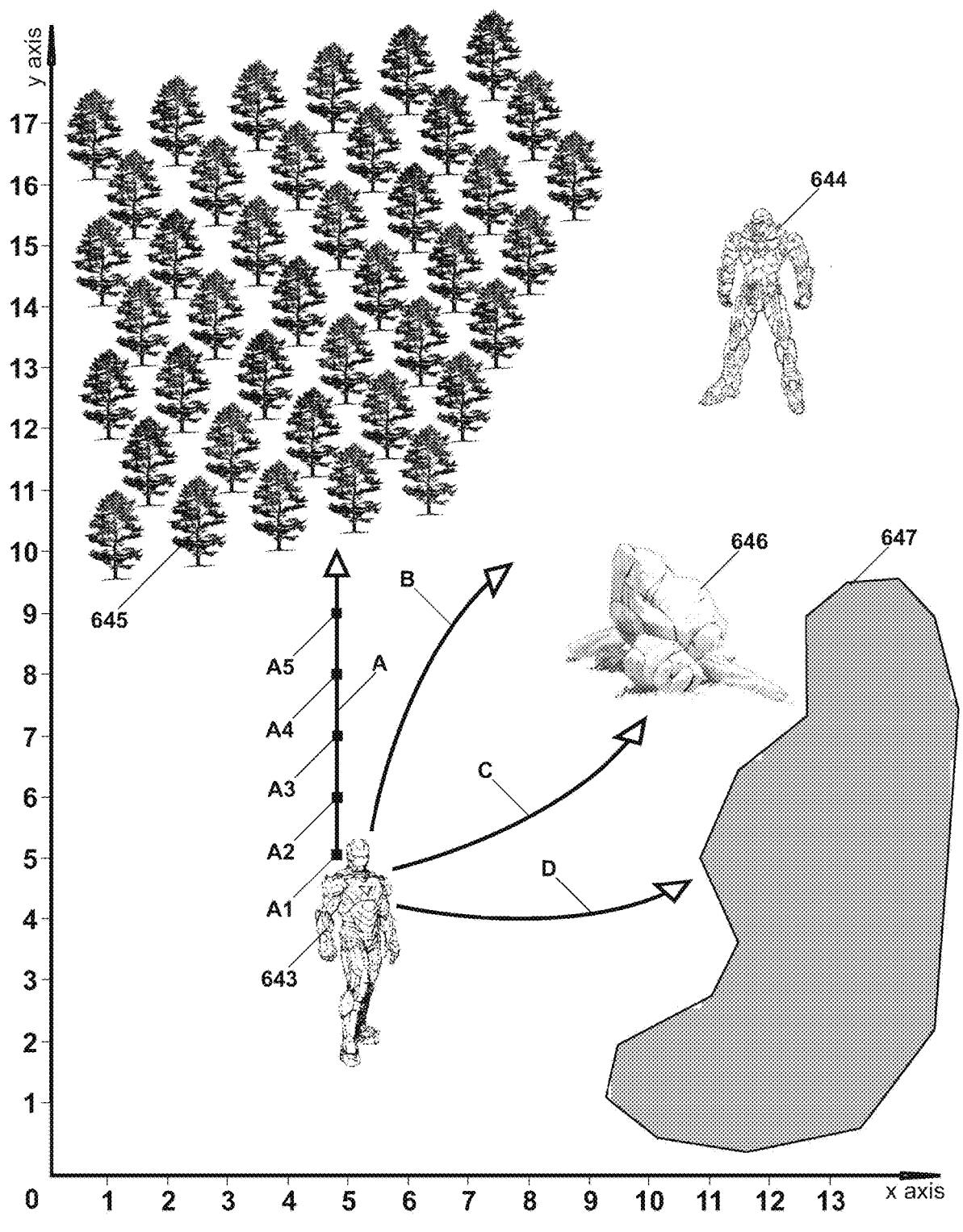
FIG. 59 shows an embodiment of User's Avatar 643 faced with a choice of paths toward Opponent 644.

In an example shown in FIG. 59, User 50 may consider several paths of movement. User 50 may consider moving User's Avatar 643 on Path A through Forest 645 that provides camouflage. User 50 may consider moving User's Avatar 643 on Path B directly toward Opponent 644. User 50 may consider moving User's Avatar 643 on Path C toward Rock 646 that provides cover. User 50 may consider moving User's Avatar 643 on Path D through Pond 647 that provides camouflage. User 50 can move User's Avatar 643 on any other path that User 50 deems a good strategy to defeat Opponent 644 or achieve other game goals. User's Avatar 643 may be in Location A1 with coordinates [5,5]. User 50 may decide to move User's Avatar 643 into Location A2 with coordinates [5,6] on Path A toward Forest 645. Game Application's 120 instructions (i.e. Instruction Sets 600 or Operations 610, etc.) that implement the move may include a function such as moveAvatar(5, 6, . . . ) that can be stored along with any contextual, geo-spatial, situational, environmental, and/or other information (i.e. Extra Info 630, etc.) as previously described. For example, Extra Info 630 can store User's Avatar's 643 current and prior coordinates, User's Avatar's 643 posture, (i.e. upright posture, crawling posture, etc.), coordinates of objects (i.e. Opponent 644, Forest 645, Rock 646, Pond 647, etc.) surrounding User's Avatar 643, types of objects surrounding User's Avatar 643, and/or other contextual, geo-spatial, environmental, situational, and/or other information. User 50 may then decide to move User's Avatar 643 into Location A3 with coordinates [5,7] toward Forest 645, and so on. In some embodiments, in each Location A1, A2, A3, A4, A5, etc., Game Application 120 can implement a move function, and/or other instruction (i.e. Instruction Set 600, etc.) or function that can be disassembled into its portions and stored in Operation 610 or other repository along with any Extra Info 630. Operation 610 can then be stored in Operation List 510 that comprises recently used or implemented (i.e. executed, etc.) Operations 610 or Instruction Sets 600. Knowledge Structuring Unit 520 may create a Knowledge Cell 800 from the Operation List 510 and store the Knowledge Cell 800 in Knowledgebase 530, thereby implementing learning of User's Avatar's 643 operations within Game Application 120 as previously described. Any learning, anticipating, and/or other functionalities implemented using Knowledgebase 530 and/or Knowledge Cells 800 can be similarly implemented using Neural Network 850. For example, instead of creating Knowledge Cells 800 and storing them into Knowledgebase 530, Knowledge Structuring Unit 520 can apply Operations 610 from Operation List 510 onto a Neural Network 850, thereby implementing learning of Game Application's 120 operations as previously described. In some aspects, while on the chosen path (i.e. path A, etc.), User 50 may also decide to perform various defensive, offensive, evasive, and/or other maneuvers and/or other operations such as, for example, curved, circular, rectangular, zig-zag, or other maneuvers and/or other operations that can also be learned as described.

Figure 60:
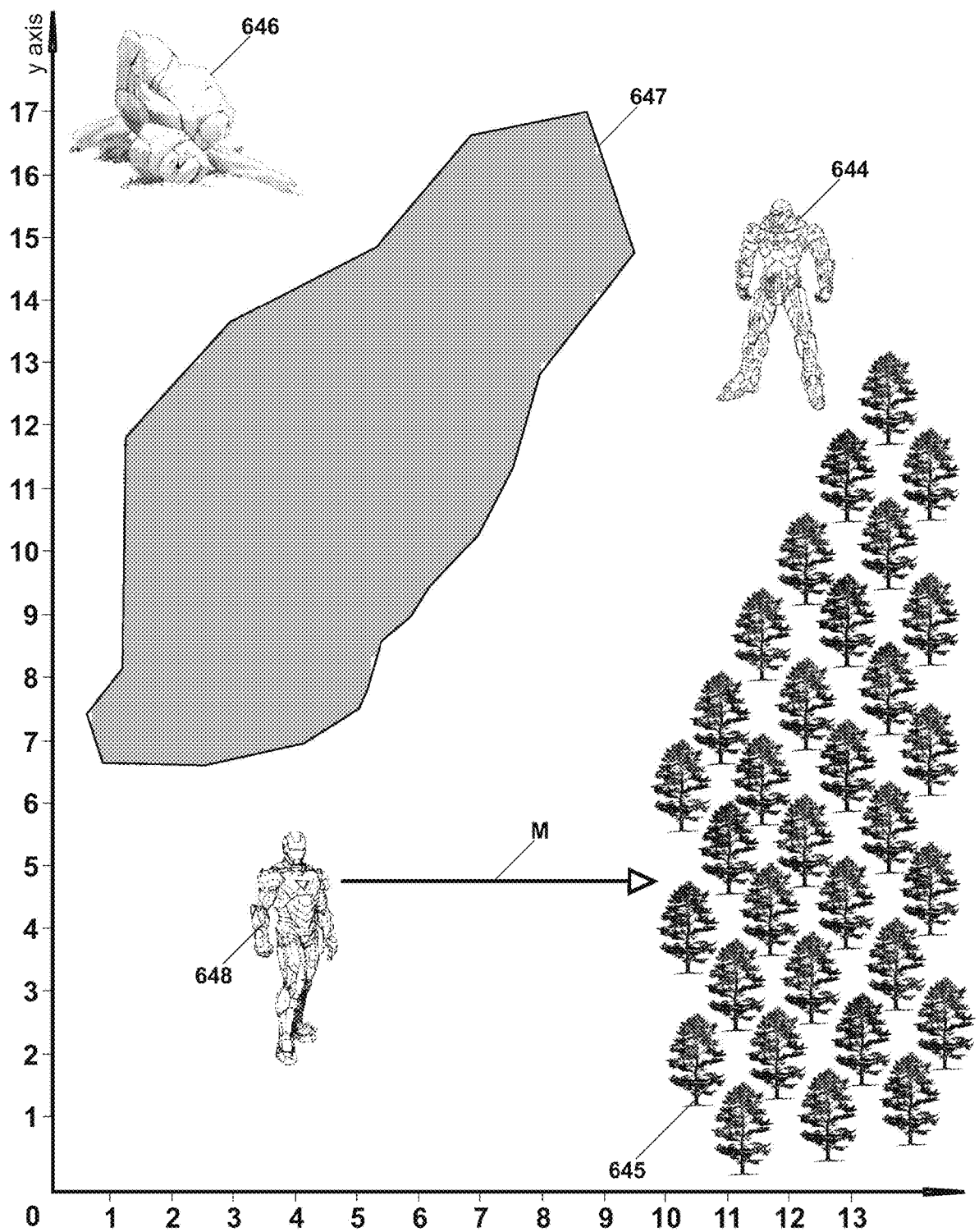
FIG. 60 shows an embodiment of Autonomous Avatar 648 moving on a path toward Forest 645 based on learned information and an inference drawn.

In an example shown in FIG. 60, Autonomous Avatar 648 or other autonomous object may include UAIE functionalities comprising knowledge (i.e. Knowledge Cells 800, etc.) of moves, postures, actions, behaviors, and/or other operations learned from User 50 in past circumstances such as circumstances shown in FIG. 59. Autonomous Avatar 648 or other autonomous object may be near Opponent 644, Forest 645, Rock 646, Pond 647, and/or other objects. Decision-making Unit 540 can search for a Knowledge Cell 800 that includes one or more similar objects and/or their properties as in Autonomous Avatar's 648 surrounding shown in FIG. 60, for example. Importance Index 640 or weight of Extra Info 630 may be increased, as high, or higher than that of Instruction Set Portions 620 for the type of game application in question. Using these Importance Indexes 640 or weights, Substantial Similarity Comparison 1010 (i.e. performed by or for Decision-making Unit, etc.) may find a Substantially Similar Knowledge Cell 1110 that includes same or similar objects, and that includes instructions (i.e. Instruction Sets 600 or Operations 610, etc.) used to implement User's Avatar's 643 moves, actions, postures, behaviors, and/or other operations in similar circumstances. UAIE can then autonomously implement moves, actions, postures, behaviors, and/or other operations of Autonomous Avatar 648 such as those on Path M in FIG. 60 based on similar moves, actions, postures, behaviors, and/or other operations decided by User 50 in prior similar circumstances (i.e. circumstances shown in FIG. 59, etc.) as previously described. Any learning, anticipating, and/or other functionalities implemented using Knowledgebase 530 and/or Knowledge Cells 800 can be similarly implemented using Neural Network 850. For example, Decision-making Unit 540 may search for a path in Neural Network 850 that includes one or more similar objects and/or their properties as in Autonomous Avatar's 648 surrounding shown in FIG. 60. Decision-making Unit 540 may find a Substantially Similar Path 855 that includes Opponent 644 or other similar object, and that includes instructions (i.e. Instruction Sets 600 or Operations 610, etc.) used to implement User's Avatar's 643 moves, actions, postures, behaviors, and/or other operations in similar circumstances. UAIE can then autonomously implement moves, actions, postures, behaviors, and/or other operations of Autonomous Avatar 648 such as those on Path M in FIG. 60 based on similar moves, actions, postures, behaviors, and/or other operations decided by User 50 in prior similar circumstances (i.e. circumstances shown in FIG. 59, etc.) as previously described. Decision-making Unit 540, Context Interpreter 1120, and/or other element with context interpreting functionalities can analyze one or more Substantially Similar Knowledge Cells 1110 and/or other information and infer that User 50 moved User's Avatar 643 north toward Forest 645. The inference that User's Avatar 643 moved north toward Forest 645 can be drawn by computing that the distance between User's Avatar 643 and Forest 645 decreased and/or that User's Avatar 643 maintained direction of movement north toward Forest 645. A determination can also be made that Forest 645 is located east of Autonomous Avatar 648. As such, movement coordinates stored in Substantially Similar Knowledge Cell 1110 may be modified or replaced to direct Autonomous Avatar 648 east toward Forest 645. UAIE can then autonomously implement moves, actions, postures, behaviors, and/or other operations of Autonomous Avatar 648 or other autonomous object such as moves on Path M in FIG. 60 based on similar moves, actions, postures, behaviors, and/or other operations decided by User 50 in prior similar circumstances (i.e. circumstances shown in FIG. 59, etc.) adjusted for contextual information as previously described.

Figure 61:
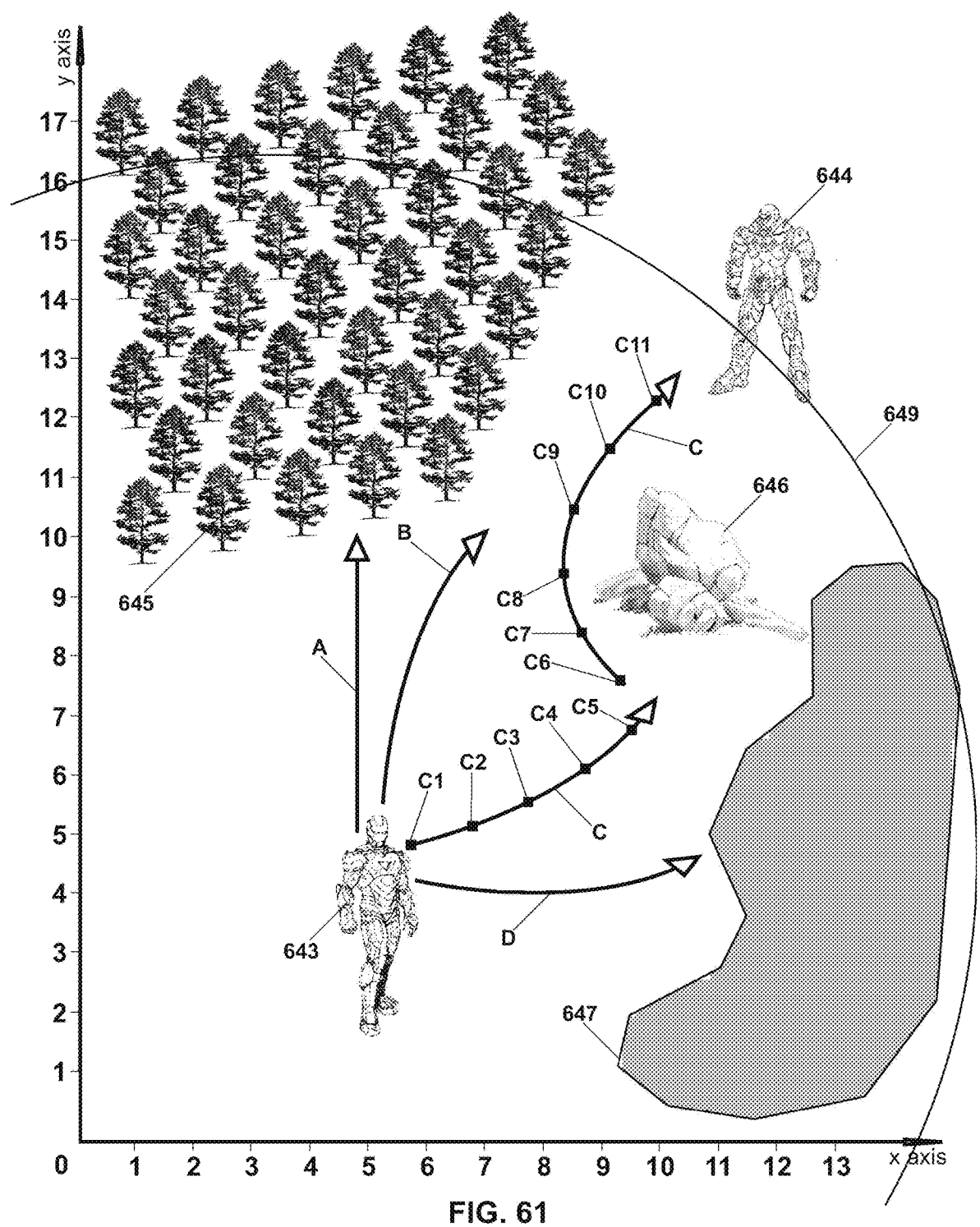
FIG. 61 shows an embodiment of User's Avatar 643 moving toward Opponent 644 and utilizing Area of Interest 649.

In an example shown in FIG. 61, User 50 may consider several paths of movement such as Path A through Forest 645 that provides camouflage, Path B directly toward Opponent 644, Path C toward Rock 646 that provides cover, Path D through Pond 647 that provide camouflage, and/or other path that User 50 deems a good strategy to defeat Opponent 644 or achieve other game goals. User's Avatar 643 may be in Location C1 with coordinates [5.5,5]. User 50 may decide to move User's Avatar 643 into Locations C2, C3, C4, C5, etc. on Path C toward Rock 646. Game Application's 120 instructions (i.e. Instruction Sets 600 or Operations 610, etc.) that implement the moves may include a function such as moveAvatar(5.5, 5, . . . ) that can be disassembled and stored along with any contextual, geo-spatial, situational, environmental, and/or other information (i.e. Extra Info 630, etc.) as previously described. In some aspects, Opponent 644, Forest 645, Rock 646, Pond 647, or other objects and/or their properties within Area of Interest 649 can be stored as Extra Info 630. Once covered behind Rock 646, User 50 may decide to wait a period of time for Opponent 644 to approach. In some aspects, Opponent 644 can be a computer-operated character programmed to engage User's Avatar 643 as soon as detected and, therefore, it may approach User's Avatar 643 around Rock 646. User 50 may then direct User's Avatar 643 to shoot or otherwise confront Opponent 644. In other aspects, Opponent 644 can be a human-operated character whose user may decide to wait for User's Avatar 643 to approach first. After waiting a period of time, User 50 may decide to move User's Avatar 643 from around Rock 646 toward Opponent 644 such as in Locations C6, C7, C8, C9, C10, C11, etc. on Path C. In addition to the moves, User 50 may also decide to perform various defensive, offensive, evasive, and/or other moves, maneuvers, actions, behaviors, postures, and/or other operations as previously described such as curved, circular, rectangular, zig-zag, and/or other maneuvers; walking, running, flying, and/or other movements; upright, crawling, and/or other postures; utilizing objects, blocking attacks, shooting at opponent, waiting, and/or other actions or operations. Each move, maneuver, action, behavior, posture, and/or other operation can be implemented by Game Application 120 through one or more instructions (i.e. Instruction Sets 600, etc.) or functions that can be disassembled into their portions and stored in Operation 610 or other repository along with any Extra Info 630. Operation 610 can then be stored in Operation List 510 that comprises recently used or implemented (i.e. executed, etc.) Operations 610 or Instruction Sets 600. Knowledge Structuring Unit 520 may create a Knowledge Cell 800 from the Operation List 510 and store the Knowledge Cell 800 in Knowledgebase 530, thereby implementing learning of User's Avatar's 643 operations within Game Application 120 as previously described. Any learning, anticipating, and/or other functionalities implemented using Knowledgebase 530 and/or Knowledge Cells 800 can be similarly implemented using Neural Network 850. For example, instead of creating Knowledge Cells 800 and storing them into Knowledgebase 530, Knowledge Structuring Unit 520 can apply Operations 610 from Operation List 510 onto a Neural Network 850, thereby implementing learning of Game Application's 120 operations as previously described.

Figure 62:
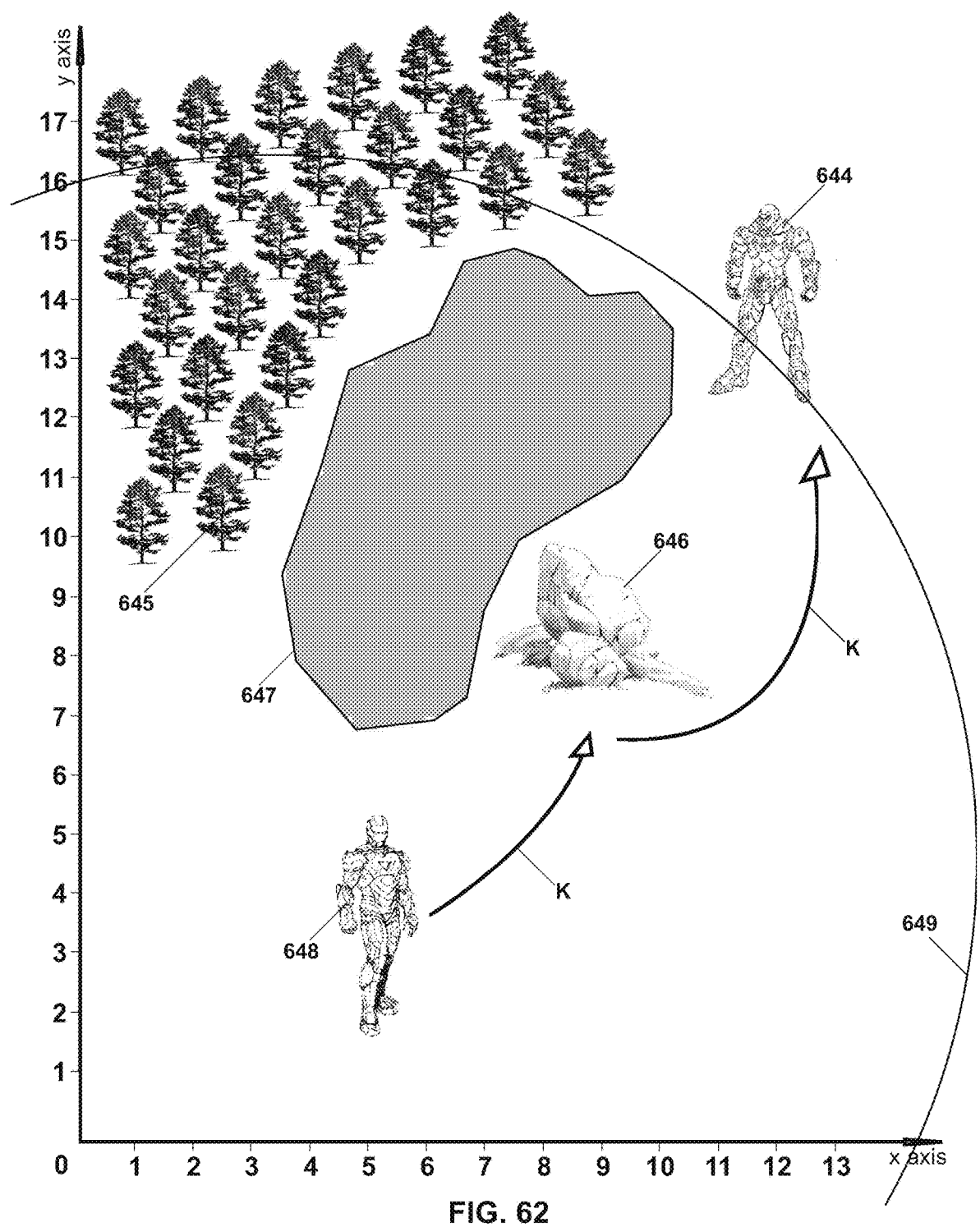
FIG. 62 shows an embodiment of Autonomous Avatar 648 moving toward Opponent 644 and taking cover behind Rock 646 based on learned information and an inference drawn while utilizing Area of Interest 649.

In an example shown in FIG. 62, Autonomous Avatar 648 or other autonomous object may include UAIE functionalities comprising knowledge (i.e. Knowledge Cells 800, etc.) of moves, postures, actions, behaviors, and/or other operations learned from User 50 in past circumstances such as circumstances shown in FIG. 61. Opponent 644, Forest 645, Rock 646, Pond 647, and/or other objects may be within Autonomous Avatar's 648 or other autonomous object's Area of Interest 649. Decision-making Unit 540 can search for a Knowledge Cell 800 that includes one or more similar objects and/or their properties as in Autonomous Avatar's 648 Area of Interest 649 shown in FIG. 62, for example. Importance Index 640 or weight of Extra Info 630 may be increased, as high, or higher than that of Instruction Set Portions 620 for the type of game application in question. Using these Importance Indexes 640 or weights, Substantial Similarity Comparison 1010 (i.e. performed by or for Decision-making Unit, etc.) may find a Substantially Similar Knowledge Cell 1110 that includes same or similar objects as those in Autonomous Avatar's 648 Area of Interest 649, and that includes instructions (i.e. Instruction Sets 600 or Operations 610, etc.) used to implement User's Avatar's 643 moves, actions, postures, behaviors, and/or other operations in similar circumstances. UAIE can then autonomously implement moves, actions, postures, behaviors, and/or other operations of Autonomous Avatar 648 such as those on Path K in FIG. 62 based on similar moves, actions, postures, behaviors, and/or other operations decided by User 50 in prior similar circumstances (i.e. circumstances shown in FIG. 61, etc.) as previously described. Any learning, anticipating, and/or other functionalities implemented using Knowledgebase 530 and/or Knowledge Cells 800 can be similarly implemented using Neural Network 850. For example, Decision-making Unit 540 may search for a path in Neural Network 850 that includes one or more similar objects and/or their properties as in Autonomous Avatar's 648 surrounding shown in FIG. 62. Decision-making Unit 540 may find a Substantially Similar Path 855 that includes Opponent 644 or other similar object, and that includes instructions (i.e. Instruction Sets 600 or Operations 610, etc.) used to implement User's Avatar's 643 moves, actions, postures, behaviors, and/or other operations in similar circumstances. UAIE can then autonomously implement moves, actions, postures, behaviors, and/or other operations of Autonomous Avatar 648 such as those on Path K in FIG. 62 based on similar moves, actions, postures, behaviors, and/or other operations decided by User 50 in prior similar circumstances (i.e. circumstances shown in FIG. 61, etc.) as previously described. Decision-making Unit 540, Context Interpreter 1120, and/or other element with context interpreting functionalities can analyze one or more Substantially Similar Knowledge Cells 1110 and/or other information and infer that User 50 moved User's Avatar 643 toward Opponent 644 and took cover behind Rock 646. The inference that User's Avatar 643 moved toward Opponent 644 and took cover behind Rock 646 can be drawn by computing that the distance between User's Avatar 643 and both Opponent 644 and Rock 646 decreased and/or that User's Avatar 643 maintained general direction of movement toward both Opponent 644 and Rock 646. In some aspects, a tolerance or threshold can be utilized in the computation or analysis to indicate whether Rock 646 may be too far from the path toward Opponent 644 for Rock 646 to be of use as a cover object or for an accurate inference to be drawn. A determination can also be made that Rock 646 is closer to Autonomous Avatar 648 than Opponent 644 and that Rock 646 is located in a general direction (i.e. within certain tolerance, etc.) of Opponent 644. As such, movement coordinates stored in Substantially Similar Knowledge Cell 1110 can be modified or replaced to direct Autonomous Avatar 648 toward Opponent 644 while bending Autonomous Avatar's 648 path to take cover behind Rock 646. UAIE can then autonomously implement moves, actions, postures, behaviors, and/or other operations of Autonomous Avatar 648 or other autonomous object such as moves on Path K in FIG. 62 based on similar moves, actions, postures, behaviors, and/or other operations decided by User 50 in prior similar circumstances (i.e. circumstances shown in FIG. 61, etc.) adjusted for contextual information as previously described.

In some embodiments, User's Avatar 643, Autonomous Avatar 648 or other autonomous object, or other object may not need to track or be aware of all objects and/or their properties in the game or on the screen, but track or be aware of objects and/or their properties within an Area of Interest 649. This approach can save computing resources. In one example, Area of Interest 649 may include a radial, circular, elliptical, or other such area around User's Avatar 643, Autonomous Avatar 648 or other autonomous object, or other object. In another example, Area of Interest 649 may include a triangular, rectangular, octagonal or other such area around User's Avatar 643, Autonomous Avatar 648 or other autonomous object, or other object. In yet another example, Area of Interest 649 may include a spherical, cubical, pyramid-like or other such area around User's Avatar 643, Autonomous Avatar 648 or other autonomous object, or other object. Any other Area of Interest 649 shape can be utilized. In some aspects, Area of Interest 649 can be subdivided into sub-areas (i.e. sub-circles, sub-rectangles, sub-spheres, etc.). Sub-areas can be used to classify objects by distance from User's Avatar 643, Autonomous Avatar 648 or other autonomous object, or other object. For example, objects closer to User's Avatar 643 may be more important and may be assigned higher Importance Index 640 or weight when stored as Extra Info 630. User's Avatar 643, Autonomous Avatar 648 or other autonomous object, or other object can scan its surrounding by utilizing Area of Interest 649 or detection area. In some embodiments, Area of Interest 649 can be used to activate autonomous operation of User's Avatar 643, Autonomous Avatar 648 or other autonomous object, or other object. In one example, Autonomous Avatar 648 or other autonomous object may be operated by a non-UAIE system or process (i.e. traversing system or process, etc.) until UAIE finds a Knowledge Cell 800 that includes similar objects and/or their properties as in current Area of Interest 649 at which point UAIE can take control. In another example, User's Avatar 643 or other object may be operated by User 50 until UAIE finds a Knowledge Cell 800 that includes similar objects and/or their properties as in current Area of Interest 649 at which point UAIE can take control. In yet another example, Autonomous Avatar 648 or other autonomous object may be operated by a non-UAIE system or process (i.e. traversing system or process, etc.) until the system finds sufficient number or types of objects and/or their properties to invoke UAIE functionalities at which point UAIE can take control.

UAIE functionalities can be implemented in any type of game application. In one example, learning a user's steering wheel moves and/or other operations for various road circumstances and performing autonomous steering wheel moves and/or other operations in a car or other racing game can be implemented. In another example, learning a user's moves, actions, postures, behaviors, and/or other operations given various objects' movements or other properties and performing autonomous operations in a 3D game (i.e. first shooter game, flight simulation, etc.) can be implemented. In yet another example, learning a user's moves, actions, postures, behaviors, and/or other operations given certain objects' positions or other attributes and performing autonomous moves, actions, postures, behaviors, and/or other operations in a strategic game can be implemented. In yet another example, learning a user's moves, actions, and/or other operations given certain items' existence, arrangement, relationship, or other properties and performing autonomous moves, actions, and/or other operations in a tetris-like, word puzzle, or mind game can be implemented.

One of ordinary skill in art will understand that the above exemplary embodiments are merely examples of a game application's operations and of UAIE functionalities with respect to game application, and while all possible embodiments are too voluminous to describe, other embodiments are within the scope of this disclosure.

Figure 63:
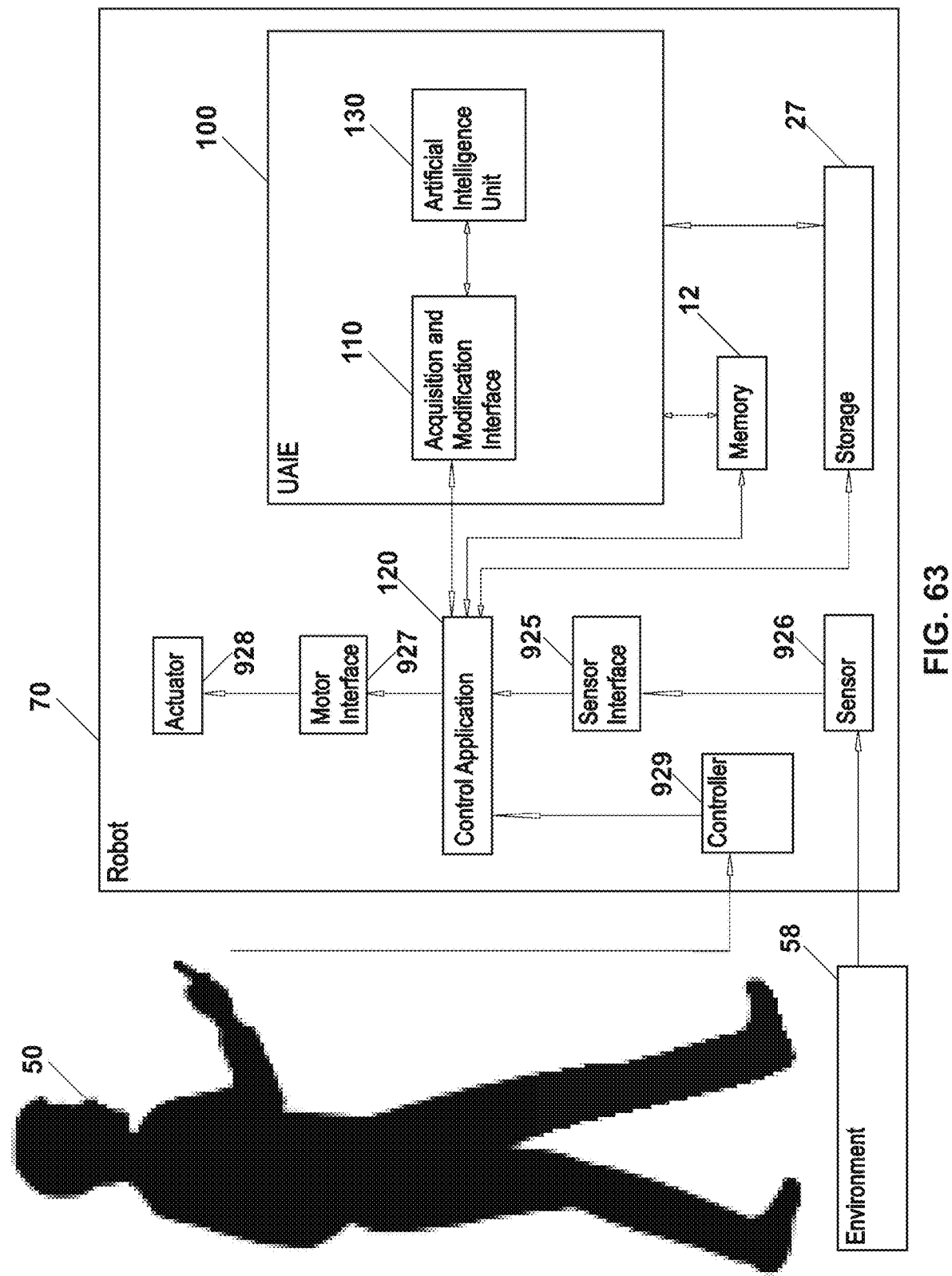
FIG. 63 is a diagram showing an embodiment of UAIE attached to Control Application 120 executing on Robot 70.

Referring to FIG. 63, the teaching presented by the disclosure can be implemented in exemplary embodiments to provide UAIE functionalities for a robot control application or robotic application. Such embodiments may include artificial intelligence that enables a robot or other such device or application to learn the operation of the robot control application and/or the robot, store this knowledge in a knowledgebase, neural network, or other repository, and enable autonomous operation of the robot control application and/or the robot with partial, minimal, or no input from a user and/or the environment.

UAIE can be used in a Robot 70 (i.e. Computing Device 70, etc.). Robot 70 may include Control Application 120 (i.e. Software Application 120, etc.), UAIE, Acquisition and Modification Interface 110, Artificial Intelligence Unit 130, Controller 929, Sensor Interface 925, Sensor 926, Motor Interface 927, Actuator 928, Memory 12, and Storage 27. Other additional elements may be included as needed, or some of the disclosed ones may be excluded, or a combination thereof may be utilized in alternate embodiments.

Robot 70 comprises the functionality for performing robotic operations, and/or other functionalities. Robot 70 comprises the functionality for performing mechanical, physical, or other operations. Robot 70 may include an interface that enables Robot 70 to perform robotic functionalities or mechanical operations. Robot 70 may include any mechanical device with remote control capabilities. In some aspects, Robot 70 can be a User 50 controlled robot. In other aspects, Robot 70 can be a partially autonomous robot. In other aspects, Robot 70 can be a fully autonomous robot. Examples of Robot 70 include industrial robots, military robots, factory robots, domestic robots, personal robots, medical robots, and/or other robots. Additional examples of robots include remote controlled ground, aerial, or water vehicles, remote controlled toys, telesurgery (i.e. remote surgery, etc.) systems, and/or other such devices. Further examples of robots include auto-pilot capable machines where control may be shared between a software application and a user, and/or other such devices. Robot 70 can be referred to as and comprises any features, functionalities, and embodiments of Computing Device 70.

In some aspects, Control Application 120 comprises the functionality for performing robotic operations on Robot 70, and/or other functionalities. Control Application 120 comprises the functionality for controlling Robot 70. Control Application 120 may receive inputs from a user and/or the environment, employ some logic or rules, and implement instructions to enable Robot 70 to perform various operations for a given set of inputs or circumstances. UAIE can attach to and obtain Control Application's 120 instructions, data, and/or other information and modify execution and/or functionality of Control Application 120, thereby providing artificial intelligence functionalities to Control Application 120 as previously described. Control Application 120 can reside in Robot 70 or on a Remote Computing Device 1310 accessible over a Network 1300, and if on a Remote Computing Device 1310, Control Application 120 may be available as a network service as previously described. In some aspects, Control Application 120 can be implemented in electronic circuitry as a hardware component such as a chip, microcontroller, microprocessor, or other such device. User 50 can operate Control Application 120 via Controller 929, Human-machine Interface 23, microphone, and/or other input device. In addition to User 50 inputs, Control Application 120 may receive sensory or other inputs from the environment. Control Application 120 can control any element of Robot 70 such as engage a motor or other elements to enable Robot 70 to perform operations for which it was designed. Control Application 120 can be referred to as and comprises any features, functionalities, and embodiments of Software Application 120.

Controller 929 comprises the functionality for enabling input of robot operating instructions, data, and/or other inputs, and/or other functionalities. Controller 929 may include any means of inputting operating instructions, data, and/or other inputs such as by pressing keys or buttons, touching keys or buttons, clicking keys or buttons, moving or sliding physical or graphical components, and/or manipulating other physical, graphical, and/or other elements. Examples of Controller 929 include a joystick, a keyboard, a keypad, a mouse, a steering wheel, a glove, a touchscreen, a control wheel, a track point, a remote controller, or other input or control device. In some aspects, Controller 929 may include Microphone 754 and Speech Recognizer 753 for user's voice input as previously described.

Sensor 926 comprises the functionality for detecting objects, events, or other activities in the sensor's environment, and/or other functionalities. Robot 70 may include one or more Sensors 926 to enable Robot 70 to perceive and/or interact with its environment (i.e. Environment 58, etc.). Examples of Sensor 926 include vision (i.e. video or other camera, etc.), sound (i.e. microphone, etc.), tactile, motion, physical contact, smell, taste, magnetic, electro-magnetic, radio (i.e. radio antenna, etc.), radar, sonar, and/or other sensors or detectors.

Sensor Interface 925 comprises the functionality for processing input events of Sensor 926 and/or other input devices for use by Control Application 120 or other disclosed elements, and/or other functionalities. Examples of Sensor Interface 925 include a sensor listener, a device driver (i.e. audio, video, or other driver), a speech recognizer, a video interpreter, and/or other interface.

Actuator 928 comprises the functionality for moving an object to which it is attached, and/or other functionalities. Robot 70 may include one or more Actuators 928 to enable Robot 70 to perform mechanical, physical, or other operations and/or to interact with its environment (i.e. Environment 58, etc.). Actuators 928 can be utilized for implementing movements, actions, behaviors, maneuvers, and/or other operations as directed by Control Application 120. In some aspects, Actuator 928 itself can act upon the environment. In other aspects, Actuator 928 can be connected to or coupled with an element such as a wheel, arm, or other element to act upon the environment. Examples of Actuator 928 include a motor, a linear motor, a servomotor, a hydraulic element, a pneumatic element, an electro-magnetic element, a spring element, and/or other actuators. Examples of types of Actuator 928 include a rotary actuator, a linear actuator, and/or other types of actuators.

Motor Interface 927 comprises the functionality for processing output from Control Application 120 or other elements for use by Actuator 928, and/or other functionalities. Motor Interface 927 comprises the functionality for processing control signals or instructions from Control Application 120 or other disclosed elements to control Actuator 928. Examples of Motor Interface 927 include a microcontroller, a device driver, a device programming interface, and/or other interfaces.

In one example, when User 50 wishes to move Robot 70, User 50 can issue an operating instruction to Control Application 120 via Controller 929 and Control Application 120 may engage a motor (i.e. Actuator 928, etc.) to move Robot 70. In another example, when User 50 wishes to lift an arm of Robot 70, User 50 may issue an operating instruction to Control Application 120 via Controller 929 and Control Application 120 may engage a hydraulic element (i.e. Actuator 928, etc.) to lift the arm. In yet another example, when User 50 wishes to pick up an object with Robot 70, User 50 may issue an operating instruction to Control Application 120 via Controller 929 and Control Application 120 may engage one or more motors, hydraulic, pneumatic, or other elements (i.e. Actuators 928, etc.) to pick up the object. Various other operating instructions and/or operations can be implemented with Robot 70 examples of which include pausing Robot 70, stopping Robot 70, moving Robot 70 in various directions (i.e. forward, backward, right, left, up, down, angular, diagonal, etc.), selecting or utilizing an object with Robot 70, communicating with other robots or devices, and/or other instructions or operations. UAIE can learn Control Application's 120 instructions (i.e. Instruction Sets 600 or Operations 610, etc.) and/or contextual information (i.e. Extra Info 630, etc.) used to implement operations such as moving Robot 70, lifting Robot's 70 arm, picking up an object with Robot 70, and/or other operations by storing them in Knowledgebase 530, Neural Network 850, or other repository, and anticipate future instructions (i.e. anticipatory Instruction Sets 600 or Operations 610, etc.) as previously described.

In some exemplary embodiments, Robot 70 comprises an industrial machine such as a loader with computing capabilities and/or ability to run Control Application 120 that controls or assists in controlling the loader. A loader may be a type of heavy machine with a mounted bucket used to move material (i.e. sand, gravel, snow, etc.) from one location to another. In one example, User 50 may direct the loader (i.e. Robot 70, etc.) to pick up material with the bucket from a pile. In another example, User 50 may direct the loader to move to a delivery location. In yet another example, User 50 may direct the loader to perform various moves, maneuvers, and/or other operations to overcome an obstacle such as move around the obstacle, move the obstacle, and/or perform other moves, maneuvers, and/or operations with respect to the obstacle. In yet another example, the loader may detect a moving object or person through a sensor (i.e. video or motion sensor, etc.) and alert User 50, and User 50 may direct loader to move around the object or person, stop and wait for the object or person to pass, and/or perform other moves, maneuvers, and/or operations with respect to the object or person. In yet another example, the loader may detect a moving object or person through a sensor (i.e. video or motion sensor, etc.) and Control Application 120 may direct loader to move around the object or person, stop and wait for the object or person to pass, and/or perform other moves, maneuvers, and/or operations with respect to the object or person based on a function or program. In some aspects, each type of obstacle or object can be overcome by performing specific moves, maneuvers, and/or other operations for that type of obstacle or object. In yet another example, User 50 may direct loader (i.e. Robot 70, etc.) to unload material from the bucket to a delivery location. In yet another example, User 50 may direct the loader to move back into the original location to pick up additional material. As User 50 directs the loader to perform moves, maneuvers, and/or other operations in each of the examples above, UAIE can learn Control Application's 120 instructions (i.e. Instruction Set 600 or Operation 610, etc.) and/or contextual information (i.e. Extra Info 630, etc.) used to implement moves, maneuvers, and/or other operations such as picking up material, moving the loader, overcoming an obstacle or object, unloading material, moving into original location, and/or other moves, maneuvers, or operations. UAIE can also anticipate future instructions (i.e. anticipatory Instruction Sets 600 or Operations 610, etc.) for picking up material, moving the loader, overcoming an obstacle or object, unloading material, moving into original location, and/or performing other moves, maneuvers, or operations autonomously as previously described.

In other exemplary embodiments, similar to the previously described game application examples, Sensor 926 (i.e. video or other camera, etc.) can be utilized to detect objects in Robot's 70 surrounding or area of interest. Objects in Robot's 70 surrounding can be detected and/or tracked by any of the object recognition systems, techniques, or tools known in art examples of which include deep neural networks, convolutional neural networks, OpenCV (Open Source Computer Vision) library, CamFind API, Kooaba, 6px API, Dextro API, and/or others. In some aspects, object recognition techniques or tools may generally involve identifying and/or analyzing object features such as lines, edges, ridge, corners or blobs, regions, and/or their relative positions, sizes, shapes, etc., which may then be used to search for images with matching features. Also, similar to the previously described game application examples, User 50 may consider several paths of movement relative to objects in Robot's 70 surrounding. User 50 may choose a path that best accomplishes User's 50 goals. In one example, User 50 may direct Robot 70 (i.e. loader, etc.) to move around the back of a moving truck (i.e. truck is in Robot's 70 way, etc.) in order to safely reach Robot's 70 target (i.e. a pie of material, etc.). In another example, User 50 may direct Robot 70 (i.e. loader, etc.) to stop for a person to pass and then continue on its path to Robot's 70 target. Control Application's 120 instructions (i.e. Instruction Sets 600 or Operations 610, etc.) that implement the moves may include a function such as moveRobot(Angle, Distance, . . . ) that can be stored along with any contextual, geo-spatial, situational, environmental, and/or other information (i.e. Extra Info 630, etc.) as previously described. For example, Extra Info 630 can store Robot's 70 current and prior positions (i.e. positions relative to an object or reference point, GPS coordinates, etc.), positions of objects in Robot's 70 surrounding, types (i.e. truck, person, etc.) of objects in Robot's 70 surrounding, and/or other contextual, geo-spatial, environmental, situational, and/or other information. In some embodiments, for each move, action, behavior, maneuver, and/or other operation, Control Application 120 can implement a move function and/or other instruction (i.e. Instruction Set 600, etc.) or function that can be disassembled into its portions and stored in Operation 610 or other repository along with any Extra Info 630. Operation 610 can then be stored in Operation List 510 that comprises recently used or implemented (i.e. executed, etc.) Operations 610 or Instruction Sets 600. Knowledge Structuring Unit 520 may create a Knowledge Cell 800 from the Operation List 510 and store the Knowledge Cell 800 in Knowledgebase 530, thereby implementing learning of Control Application's 120 operations as previously described. Also, similar to the previously described game application examples, autonomous Robot 70 (i.e. Robot 70 controlled by UAIE, etc.) may include UAIE functionalities comprising knowledge (i.e. Knowledge Cells 800, etc.) of moves, actions, behaviors, maneuvers, and/or other operations learned from User 50 in past circumstances such as circumstances including the truck, person, or other objects described above. Autonomous Robot 70 may encounter a truck, person, and/or other objects in future circumstances. Decision-making Unit 540 can search for a Knowledge Cell 800 that includes one or more similar objects and/or their properties as in autonomous Robot's 70 surrounding. Decision-making Unit may find a Substantially Similar Knowledge Cell 1110 that includes same or similar objects, and that includes instructions (i.e. Instruction Sets 600 or Operations 610, etc.) used to implement Robot's 70 moves, actions, behaviors, maneuvers, and/or other operations in similar circumstances. UAIE can then autonomously implement moves, actions, behaviors, maneuvers, and/or other operations of autonomous Robot 70 such as moving around the back of the truck, stopping for a person, or performing other operations based on similar moves, actions, behaviors, maneuvers, and/or other operations decided by User 50 in prior similar circumstances as previously described.

In further exemplary embodiments, Robot 70 may be a remote controlled toy such as a remote controlled vehicle with computing capabilities and/or ability to run Control Application 120 that controls or assists in controlling the remote controlled vehicle. In one example, User 50 may direct the remote controlled vehicle (i.e. Robot 70, etc.) to back away from an object after colliding with it. In another example, User 50 may direct the remote controlled vehicle to perform various moves, maneuvers, and/or other operations when moving over stairs or other types of terrains. In yet another example, the remote controlled vehicle may detect stairs or other type of terrain through a sensor (i.e. video sensor, radar, etc.) and Control Application 120 may direct remote controlled vehicle to perform various moves, maneuvers, and/or other operations when moving over stairs or other types of terrains based on a function or program. In some aspects, each type of terrain can be handled by performing specific moves, maneuvers, and/or other operations for that type of terrain. In yet another example, User 50 may direct remote controlled vehicle (i.e. Robot 70, etc.) to perform various flips or other tricks that User 50 finds amusing. In yet another example, User 50 may direct remote controlled vehicle (i.e. Robot 70, etc.) to a charging station to be recharged. As User 50 performs moves, maneuvers, and/or other operations in each of the examples above, UAIE can learn Control Application's 120 instructions (i.e. Instruction Set 600 or Operation 610, etc.) and/or contextual information (i.e. Extra Info 630, etc.) used to implement the moves, maneuvers, and/or other operations such as backing away after colliding with an object, performing specific moves for specific types of terrains, performing flips or other tricks, moving into a charging station, and/or other moves, maneuvers, or operations. UAIE can also anticipate future instructions (i.e. anticipatory Instruction Sets 600 or Operations 610, etc.) for backing away after colliding with an object, performing specific moves for specific types of terrains, performing flips or other tricks, moving into a charging station, and/or performing other moves, maneuvers, or operations autonomously as previously described.

In further exemplary embodiments, Robot 70 may be an autonomous robot. As such, Robot 70 can be controlled by Control Application 120 that provides autonomous functionalities to Robot 70 through various non-UAIE systems or processes. In one example, Robot 70 may detect an object through its physical contact sensor and Control Application 120 may execute one or more instructions (i.e. Instruction Sets 600 or Operations 610, etc.) to move Robot 70 around the object. In another example, Robot 70 may detect an object through its vision sensor (i.e. video or other camera, etc.) and Control Application 120 may execute one or more instructions (i.e. Instruction Sets 600 or Operations 610, etc.) to move Robot 70 closer to the object. In yet another example, Robot 70 may detect sound through its sound sensor (i.e. microphone, etc.) and Control Application 120 may execute one or more instructions (i.e. Instruction Sets 600 or Operations 610, etc.) to stop Robot 70 for best speech recognition. In yet another example, Robot 70 may detect a radio signal through its radio sensor (i.e. radio antenna, etc.) and Control Application 120 may execute one or more instructions (i.e. Instruction Sets 600 or Operations 610, etc.) to position Robot 70 for best radio signal reception. Any other sensory inputs can be received and corresponding operations can be performed in other examples. In some embodiments involving autonomous robots, UAIE can serve as a learning system to learn or record Control Application's 120 instructions (i.e. Instruction Sets 600 or Operations 610, etc.) and/or contextual information (i.e. Extra Info 630, etc.) used to implement autonomous Robot's 70 operations in various circumstances. This knowledge (i.e. Knowledgebase 530, Knowledge Cells 800, etc.) can be loaded into another robot, device, machine, and/or application to provide pre-learned knowledge as previously described. The robot, device, machine, and/or application into which the knowledge is loaded may then implement anticipatory instructions (i.e. anticipatory Instruction Sets 600 or Operations 610, etc.) included in the loaded Knowledgebase 530 or Knowledge Cells 800. In some aspects, UAIE can take control from or release control to Control Application 120 and/or any non-UAIE system or process and therefore control Robot 70 as previously described. Similar to Knowledgebase 530 and/or Knowledge Cells 800, Neural network 850 can also be used to store and/or transfer knowledge of Control Application's 120 operations among various robots, devices, machines, and/or applications to provide pre-learned knowledge. In each of the preceding examples, UAIE can learn Control Application's 120 instructions (i.e. Instruction Sets 600 or Operations 610, etc.) and/or contextual information (i.e. Extra Info 630, etc.) used to implement one or more operations. The instructions (i.e. Instruction Sets 600, etc.) can be disassembled into their portions and stored in Operation 610 or other repository along with any Extra Info 630. Operation 610 can then be stored in Operation List 510 that comprises recently used or implemented (i.e. executed, etc.) Operations 610 or Instruction Sets 600. Knowledge Structuring Unit 520 may create a Knowledge Cell 800 from the Operation List 510 and store the Knowledge Cell 800 in Knowledgebase 530, thereby implementing learning of Control Application's 120 operations as previously described. Furthermore, Decision-making Unit 540 may search for a Knowledge Cell 800 that includes comparative instructions (i.e. comparative Instruction Sets 600 or Operations 610, etc.) used to implement one or more operations. Decision-making Unit 540 may find a Substantially Similar Knowledge Cell 1110 that includes such comparative instructions (i.e. Instruction Sets 600 or Operations 610, etc.). Substantially Similar Knowledge Cell 1110 may also include anticipatory instructions (i.e. anticipatory Instruction Sets 600 or Operations 610, etc.) used to implement subsequent operations. UAIE can then implement the subsequent operations autonomously based on similar operations performed in prior similar circumstances, thereby implementing anticipation of Control Application's 120 operations as previously described.

Any learning, anticipating, and/or other functionalities implemented using Knowledgebase 530 and/or Knowledge Cells 800 can be similarly implemented using Neural Network 850. In each of the preceding examples, instead of creating Knowledge Cells 800 and storing them into Knowledgebase 530, Knowledge Structuring Unit 520 can apply Operations 610 from Operation List 510 onto a Neural Network 850, thereby implementing learning of Control Application's 120 operations as previously described. Furthermore, Decision-making Unit 540 can search for a path in Neural Network 850 that includes comparative instructions (i.e. comparative Instruction Sets 600 or Operations 610, etc.) used to implement one or more operations. Decision-making Unit 540 may find a Substantially Similar Path 855 that includes such comparative instructions (i.e. Instruction Sets 600 or Operations 610, etc.). Substantially Similar Path 855 may also include anticipatory instructions (i.e. anticipatory Instruction Sets 600 or Operations 610, etc.) used to implement subsequent operations. UAIE can then implement the subsequent operations autonomously based on similar operations performed in prior similar circumstances, thereby implementing anticipation of Control Application's 120 operations as previously described.

One of ordinary skill in art will understand that the above exemplary embodiments are merely examples of a robot's and/or robot control application's operations and of UAIE functionalities with respect to robot and/or robot control application, and while all possible embodiments are too voluminous to describe, other embodiments are within the scope of this disclosure.

Figure 64:
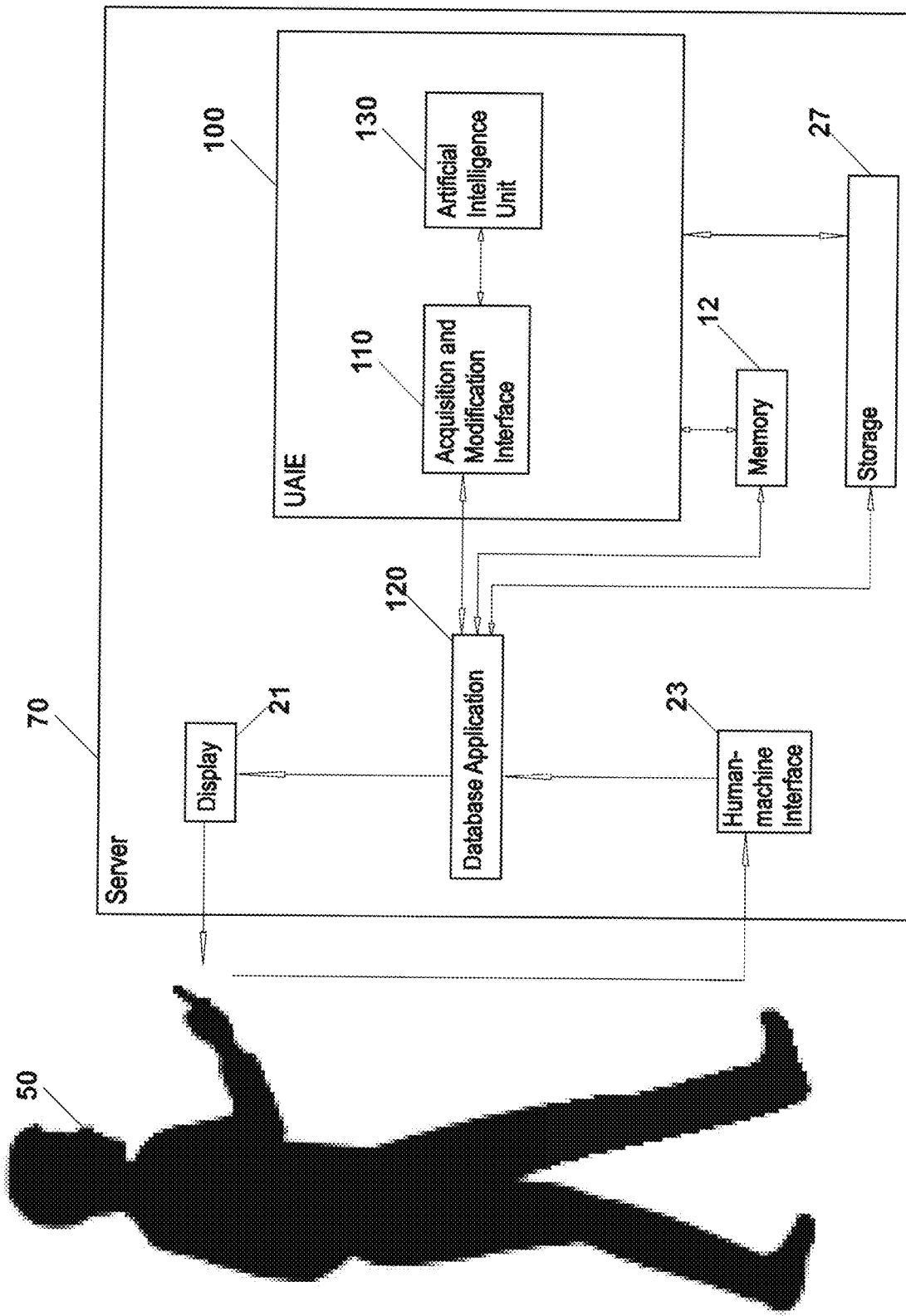
FIG. 64 is a diagram showing an embodiment of UAIE attached to Database Application 120 executing on Server 70.

Referring to FIG. 64, the teaching presented by the disclosure can be implemented in exemplary embodiments to provide UAIE functionalities for a database application. Such embodiments may include artificial intelligence that enables a server (i.e. database server, computer, etc.) or other such device or application to learn the operation of the database application, store this knowledge in a knowledgebase, neural network 850, or other repository, and enable autonomous operation of the database application with partial, minimal, or no user input to help the user in his/her use of the database application.

UAIE can be used on a Server 70 (i.e. Computing Device 70, etc.). Server 70 may include Database Application 120 (i.e. Software Application 120, etc.), UAIE, Acquisition and Modification Interface 110, Artificial Intelligence Unit 130, Display 21, Human-machine Interface 23, Memory 12, and Storage 27. Other additional elements may be included as needed, or some of the disclosed ones may be excluded, or a combination thereof may be utilized in alternate embodiments.

Server 70 comprises the functionality for performing computing or processing operations, and/or other functionalities. Server 70 comprises any computing device capable of running or executing Database Application 120. Server 70 can be implemented as a local server on the user's computing device (i.e. Computing Device 70, etc.) as shown. Server 70 can also be implemented as a remote server or Remote Computing Device 1310 accessible via Network 1300 as previously described. Server 70 can be referred to as and comprises any features, functionalities, and embodiments of Computing Device 70.

In some aspects, Database Application 120 comprises the functionality for performing database operations on Server 70 or other computing device, and/or other functionalities. Database Application 120 comprises the functionality for storing, managing, and/or manipulating data. Examples of Database Application 120 include a database management system (DBMS), any database, an application or program using a DBMS or a database as the underlying data source, an interface for managing data, any data management application, and/or other database applications. UAIE can attach to and obtain Database Application's 120 instructions, data, and/or other information and modify execution and/or functionality of Database Application 120, thereby providing artificial intelligence functionalities to Database Application 120 as previously described. Database Application 120 can reside on Server 70 or on Remote Computing Device 1310 accessible over Network 1300 as a network service as previously described. Database Application 120 can also reside locally on user's personal computing device in alternate embodiments. User 50 can operate Database Application 120 via Human-machine Interface 23, and/or other input device. Database Application 120 can be referred to as and comprises any features, functionalities, and embodiments of Software Application 120.

In one example, when User 50 wishes to create a database in Database Application 120, User 50 may issue an operating instruction (i.e. CREATE DATABASE SQL statement, etc.) to Database Application 120 via Human-machine Interface 23 (i.e. keyboard, etc.) to create the database. Database Application 120 can then execute the SQL statement, create the new database in its internal file and/or data structure, and make the new database available to the user. In another example, when User 50 wishes to delete a table in Database Application 120, User 50 may issue an operating instruction (i.e. DROP TABLE SQL statement, etc.) to Database Application 120 via Human-machine Interface 23 to delete the table. Database Application 120 can then execute the SQL statement and delete the table from its internal file and/or data structure. In a further example, when User 50 wishes to insert data (i.e. one or more rows of data, etc.) into a table in Database Application 120, User 50 may issue an operating instruction (i.e. INSERT SQL statement, etc.) to Database Application 120 via Human-machine Interface 23 to insert the data. Database Application 120 can then execute the SQL statement and insert the data into the table. In a further example, when User 50 wishes to delete data (i.e. one or more rows of data, etc.) from a table in Database Application 120, User 50 may issue an operating instruction (i.e. DELETE SQL statement, etc.) to Database Application 120 via Human-machine Interface 23 to delete the data. Database Application 120 can then execute the SQL statement and delete the data from the table. Various other operating instructions and/or operations can be implemented in Database Application 120 examples of which include accessing, modifying, creating, or deleting a database; accessing, modifying, creating, or deleting a table of a database; accessing, modifying, creating, deleting, searching, sorting, or rearranging of a row, column, or cell (i.e. also referred to as data, etc.) within a table; accessing, modifying, creating, or deleting a report/view, relation, user account, setting, and/or other elements or objects. Any of the operating instructions (i.e. SQL statements, etc.) given to Database Application 120 by User 50 can be inputted by User 50 as text or issued through an application that generates operating instructions (i.e. SQL statements, etc.) understood by Database Application 120. Examples of such applications include a report generating application (i.e. Chrystal Reports, etc.), a visual database application (i.e. Microsoft Access, etc.), and/or other applications that provide a graphical user interface comprising input fields, selectable lists, drop-down menus, buttons, or other graphical elements to enable a User 50 to issue operating instructions to Database Application 120 in a point and click manner without typing SQL code. UAIE can learn Database Application's 120 instructions (i.e. Instruction Sets 600 or Operations 610, etc.) and/or contextual information (i.e. Extra Info 630, etc.) used to implement operations such as creating a database, deleting a table, inserting data, deleting data, and/or other operations by storing them in Knowledgebase 530, Neural Network 850, or other repository, and anticipate future instructions (i.e. anticipatory Instruction Sets 600 or Operations 610, etc.) as previously described.

In some exemplary embodiments, Server 70 comprises a computer running Database Application 120. In one example, User 50 may perform insert, update, delete, and/or other operations on one or more tables in Database Application 120. Such operations on Database Application 120 can be performed in a business setting when an event occurs such as procurement of an item (i.e. raw material, etc.), production of an item (i.e. finished good, etc.), change of an item, sale of an item, and/or other event. Such operations on Database Application 120 can also be performed in a person's daily activities when an event occurs such as download of an item (i.e. song, picture, movie, etc.), creation of an item (i.e. captured photograph, etc.), change of an item, sale of an item, or other event. After performing one or more of these operations, UAIE can learn Database Application's 120 instructions (i.e. Instruction Sets 600 or Operations 610, etc.) and/or contextual information (i.e. Extra Info 630, etc.) used to implement these operations, and then perform future insert, update, delete, and/or other operations autonomously as previously described. In another example, User 50 may perform daily, weekly, monthly, yearly, and/or other periodic maintenance tasks on Database Application 120 such as performing backup of one or more tables. After performing one or more periodic table backups, UAIE can learn Database Application's 120 instructions (i.e. Instruction Sets 600 or Operations 610, etc.) and/or contextual information (i.e. Extra Info 630, etc.) used to implement the table backups and their timing (i.e. using time stamp, etc.), and then perform future table backups autonomously as previously described. In yet another example, User 50 may perform reporting from Database Application 120 such as creating financial reports. This type of reporting is often a daily, weekly, monthly, and/or yearly scheduled process of creating same or similar reports with updated times, dates, or other filtering information. After creating one or more of these periodic reports, UAIE can learn Database Application's 120 instructions (i.e. Instruction Sets 600 or Operations 610, etc.) and/or contextual information (i.e. Extra Info 630, etc.) used to create the reports and their timing (i.e. using time stamp, etc.), and then create future reports autonomously as previously described. In each of the preceding examples, UAIE can learn Database Application's 120 instructions (i.e. Instruction Sets 600 or Operations 610, etc.) and/or contextual information (i.e. Extra Info 630, etc.) used to implement one or more operations. The instructions (i.e. Instruction Sets 600, etc.) can be disassembled into their portions and stored in Operation 610 or other repository along with any Extra Info 630. Operation 610 can then be stored in Operation List 510 that comprises recently used or implemented (i.e. executed, etc.) Operations 610 or Instruction Sets 600. Knowledge Structuring Unit 520 may create a Knowledge Cell 800 from the Operation List 510 and store the Knowledge Cell 800 in Knowledgebase 530, thereby implementing learning of Database Application's 120 operations as previously described. Furthermore, Decision-making Unit 540 may search for a Knowledge Cell 800 that includes comparative instructions (i.e. comparative Instruction Sets 600 or Operations 610, etc.) used to implement one or more operations. Decision-making Unit 540 may find a Substantially Similar Knowledge Cell 1110 that includes such comparative instructions (i.e. Instruction Sets 600 or Operations 610, etc.). Substantially Similar Knowledge Cell 1110 may also include anticipatory instructions (i.e. anticipatory Instruction Sets 600 or Operations 610, etc.) used to implement subsequent operations. UAIE can then implement the subsequent operations autonomously based on similar operations performed in prior similar circumstances, thereby implementing anticipation of Database Application's 120 operations as previously described.

Any learning, anticipating, and/or other functionalities implemented using Knowledgebase 530 and/or Knowledge Cells 800 can be similarly implemented using Neural Network 850. In each of the preceding examples, instead of creating Knowledge Cells 800 and storing them into Knowledgebase 530, Knowledge Structuring Unit 520 can apply Operations 610 from Operation List 510 onto a Neural Network 850, thereby implementing learning of Database Application's 120 operations as previously described. Furthermore, Decision-making Unit 540 can search for a path in Neural Network 850 that includes comparative instructions (i.e. comparative Instruction Sets 600 or Operations 610, etc.) used to implement one or more operations. Decision-making Unit 540 may find a Substantialy Similar Path 855 that includes such comparative instructions (i.e. Instruction Sets 600 or Operations 610, etc.). Substantially Similar Path 855 may also include anticipatory instructions (i.e. anticipatory Instruction Sets 600 or Operations 610, etc.) used to implement subsequent operations. UAIE can then implement the subsequent operations autonomously based on similar operations performed in prior similar circumstances, thereby implementing anticipation of Database Application's 120 operations as previously described.

One of ordinary skill in art will understand that the above exemplary embodiments are merely examples of a database application's operations and of UAIE functionalities with respect to database application, and while all possible embodiments are too voluminous to describe, other embodiments are within the scope of this disclosure.

One of ordinary skill in art will also understand that the teaching presented by the disclosure enables learning and/or anticipation of any other items such as any data, data structures, or objects by utilizing the previously described Knowledge Cells 800, Knowledgebase 530, Neural Network 850, and/or other elements or functionalities.

It must be noted that as used herein and in the appended claims, the singular forms "a", "an", and "the" include plural referents unless the context clearly dictates otherwise.

A number of embodiments have been described herein. While this disclosure contains many specific implementation details, these should not be construed as limitations on the scope of any inventions or of what may be claimed, but rather as descriptions of features specific to particular embodiments. It should be understood that various modifications can be made without departing from the spirit and scope of the invention. The logic flows depicted in the figures do not require the particular order shown, or sequential order, to achieve desirable results. In addition, other or additional steps, elements, or connections can be included, or some of the steps, elements, or connections can be eliminated, or a combination thereof can be utilized in the described flows, illustrations, or descriptions. Further, the various aspects of the disclosed devices, apparatuses, systems, and/or methods can be combined in whole or in part with each other to produce additional implementations. Moreover, separation of various components in the embodiments described herein should not be understood as requiring such separation in all embodiments, and it should be understood that the described components can generally be integrated together in a single software product or packaged into multiple software products. Accordingly, other embodiments are within the scope of the following claims.

The invention claimed is:

1. A system comprising:
   one or more processors; and
   one or more non-transitory machine readable media storing machine readable code that, when executed by the one or more processors, causes the one or more processors to perform at least:
   accessing at least one of: a first knowledge cell that includes a plurality of instruction sets for operating a first device, or a second knowledge cell that includes a plurality of instruction sets for operating the first device;
   determining at least a second subset of the plurality of instruction sets of the second knowledge cell based on at least partial match between a new one or more instruction sets and a first subset of the plurality of instruction sets of the second knowledge cell, or
   receiving a selection of at least a second subset of the plurality of instruction sets of the second knowledge cell; and
   at least in response to the determining or the receiving, causing the first device or a second device to perform one or more operations defined by the at least the second subset of the plurality of instruction sets of the second knowledge cell at least by executing the at least the second subset of the plurality of instruction sets of the second knowledge cell.

2. The system of claim 1, wherein one or more instruction sets of the plurality of instruction sets of the first knowledge cell are obtained via an acquisition interface, and wherein one or more instruction sets of the plurality of instruction sets of the second knowledge cell are obtained via: the acquisition interface, or another acquisition interface.

3. The system of claim 1, wherein the executing the at least the second subset of the plurality of instruction sets of the second knowledge cell is performed via: a modification interface, or an execution interface.

4. The system of claim 1, wherein: at least one instruction set of the first subset of the plurality of instruction sets of the second knowledge cell is the same as at least one instruction set of the second subset of the plurality of instruction sets of the second knowledge cell, or at least one instruction set of the first subset of the plurality of instruction sets of the second knowledge cell is different than at least one instruction set of the second subset of the plurality of instruction sets of the second knowledge cell, and wherein the first subset of the plurality of instruction sets of the second knowledge cell includes one or more instruction sets of the plurality of instruction sets of the second knowledge cell, and wherein the second subset of the plurality of instruction sets of the second knowledge cell includes one or more instruction sets of the plurality of instruction sets of the second knowledge cell.

5. The system of claim 1, wherein the second device performs the one or more operations defined by the at least the second subset of the plurality of instruction sets of the second knowledge cell.

6. The system of claim 1, wherein the determining the at least the second subset of the plurality of instruction sets of the second knowledge cell based on the at least partial match between the new one or more instruction sets and the first subset of the plurality of instruction sets of the second knowledge cell includes:
   determining that a number of at least partially matching portions of the new one or more instruction sets and portions of the first subset of the plurality of instruction sets of the second knowledge cell exceeds a threshold number, or
   determining that a percentage of at least partially matching portions of the new one or more instruction sets and portions of the first subset of the plurality of instruction sets of the second knowledge cell exceeds a threshold percentage.

7. The system of claim 1, wherein the executing the at least the second subset of the plurality of instruction sets of the second knowledge cell includes causing an application for operating the first device or an application for operating the second device to execute the at least the second subset of the plurality of instruction sets of the second knowledge cell.

8. The system of claim 1, wherein the at least the second subset of the plurality of instruction sets of the second knowledge cell includes an instruction set for operating a portion of the first device, and wherein the causing the first device or the second device to perform the one or more operations defined by the at least the second subset of the plurality of instruction sets of the second knowledge cell includes causing the portion of the first device or a portion of the second device to perform one or more operations defined by the instruction set for operating the portion of the first device, and wherein the portion of the first device includes a physical portion of the first device, and wherein the portion of the second device includes a physical portion of the second device.

9. The system of claim 1, wherein at least some elements of the system are included in: a single device, or multiple devices, and wherein the one or more processors include: one or more microcontrollers, one or more computing devices, or one or more electronic devices, and wherein the first knowledge cell is stored in or on one selected from the group comprising: at least one non-transitory machine readable medium of the one or more non-transitory machine readable media, another one or more non-transitory machine readable media, one or more volatile memories, one or more non-volatile memories, one or more storage devices, and one or more storage systems, and wherein the second knowledge cell is stored in or on one selected from the group comprising: at least one non-transitory machine readable medium of the one or more non-transitory machine readable media, another one or more non-transitory machine readable media, one or more volatile memories, one or more non-volatile memories, one or more storage devices, and one or more storage systems, and wherein the first device includes: a robot, a vehicle, an appliance, an electronic device, or a mechanical machine, and wherein the second device includes: a robot, a vehicle, an appliance, an electronic device, or a mechanical machine.

10. The system of claim 1, wherein the executing the at least the second subset of the plurality of instruction sets of the second knowledge cell is performed at least in response to receiving, via an input device, a user confirmation of the executing the at least the second subset of the plurality of instruction sets of the second knowledge cell.

11. The system of claim 1, wherein the machine readable code, when executed by the one or more processors, causes the one or more processors to further perform at least:
   modifying: the at least the second subset of the plurality of instruction sets of the second knowledge cell, or a copy of the at least the second subset of the plurality of instruction sets of the second knowledge cell based on a context relating to at least one of: the first subset of the plurality of instruction sets of the second knowledge cell, the at least the second subset of the plurality of instruction sets of the second knowledge cell, the new one or more instruction sets, another one or more instruction sets, the first device, or the second device, and wherein the causing the first device or the second device to perform the one or more operations defined by the at least the second subset of the plurality of instruction sets of the second knowledge cell includes: causing the first device or the second device to perform one or more operations defined by the modified the at least the second subset of the plurality of instruction sets of the second knowledge cell, or causing the first device or the second device to perform one or more operations defined by the modified the copy of the at least the second subset of the plurality of instruction sets of the second knowledge cell, and wherein the executing the at least the second subset of the plurality of instruction sets of the second knowledge cell includes: executing the modified the at least the second subset of the plurality of instruction sets of the second knowledge cell, or executing the modified the copy of the at least the second subset of the plurality of instruction sets of the second knowledge cell.

12. The system of claim 1, wherein at least one instruction set of the plurality of instruction sets of the first knowledge cell includes one or more information about one or more states of the first device, and wherein at least one instruction set of the plurality of instruction sets of the second knowledge cell includes one or more information about one or more states of the first device.

13. A system comprising:
   a memory that stores: a first knowledge cell that includes a plurality of instruction sets for operating a first device, and a second knowledge cell that includes a plurality of instruction sets for operating the first device;
   means for: determining at least a second subset of the plurality of instruction sets of the second knowledge cell based on at least partial match between a new one or more instruction sets and a first subset of the plurality of instruction sets of the second knowledge cell, or
   receiving a selection of at least a second subset of the plurality of instruction sets of the second knowledge cell; and
   means for causing, at least in response to the determining or the receiving, the first device or a second device to perform one or more operations defined by the at least the second subset of the plurality of instruction sets of the second knowledge cell at least by executing the at least the second subset of the plurality of instruction sets of the second knowledge cell.

14. The system of claim 13, wherein the means for: the determining, or the receiving includes one or more processors, and wherein the means for the causing includes one or more processors.

15. The system of claim 1, wherein the selection of the at least the second subset of the plurality of instruction sets of the second knowledge cell includes a user selection, via an input device, of the at least the second subset of the plurality of instruction sets of the second knowledge cell.

16. The system of claim 1, wherein the first knowledge cell is a data structure for storing, structuring, or organizing the first plurality of instruction sets, and wherein the second knowledge cell is a data structure for storing, structuring, or organizing the second plurality of instruction sets.

17. A method implemented using a computing system that includes one or more processors, the method comprising:
   accessing a memory that stores: a first knowledge cell that includes a plurality of instruction sets for operating a first device, and a second knowledge cell that includes a plurality of instruction sets for operating the first device;
   determining at least a second subset of the plurality of instruction sets of the second knowledge cell based on at least partial match between a new one or more instruction sets and a first subset of the plurality of instruction sets of the second knowledge cell, or
   receiving a selection of at least a second subset of the plurality of instruction sets of the second knowledge cell;
   executing the at least the second subset of the plurality of instruction sets of the second knowledge cell, the executing performed at least in response to the determining or the receiving; and
   performing, by the first device or by a second device, one or more operations defined by the at least the second subset of the plurality of instruction sets of the second knowledge cell.

18. The system of claim 1, wherein one or more instruction sets of the plurality of instruction sets of the first knowledge cell are caused to be executed at least partially by a first user prior to the accessing, and wherein one or more instruction sets of the plurality of instruction sets of the second knowledge cell are caused to be executed at least partially by the first user prior to the accessing.

19. The system of claim 2, wherein one or more instruction sets of the plurality of instruction sets of the first knowledge cell are caused to be executed at least partially by a first user prior to the accessing, and wherein one or more instruction sets of the plurality of instruction sets of the second knowledge cell are caused to be executed at least partially by a second user prior to the accessing.

20. The system of claim 1, wherein the first knowledge cell and the second knowledge cell are included in a repository, and wherein the repository further includes a third knowledge cell that includes a plurality of instruction sets for operating: the second device, or a third device, and wherein one or more instruction sets of the plurality of instruction sets of the first knowledge cell are caused to be executed at least partially by a first user prior to the accessing, and wherein one or more instruction sets of the plurality of instruction sets of the third knowledge cell are caused to be executed at least partially by a second user prior to the accessing.

* * * * *